US012054422B2

(12) United States Patent
Guo et al.

(10) Patent No.: US 12,054,422 B2
(45) **Date of Patent: *Aug. 6, 2024**

(54) COLORED GLASS ARTICLES HAVING IMPROVED MECHANICAL DURABILITY

(71) Applicant: CORNING INCORPORATED, Corning, NY (US)

(72) Inventors: Xiaoju Guo, Pittsford, NY (US); Jesse Kohl, Horseheads, NY (US); Nicole Taylor Wiles, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,849

(22) Filed: Mar. 22, 2023

(65) Prior Publication Data

US 2023/0357073 A1 Nov. 9, 2023

Related U.S. Application Data

(63) Continuation-in-part of application No. 17/691,813, filed on Mar. 10, 2022, now Pat. No. 11,634,354, and a continuation of application No. PCT/US2022/033917, filed on Jun. 17, 2022, which is a continuation-in-part of application No. 17/677,345, filed on Feb. 22, 2022, now Pat. No. 11,597,674, and a continuation-in-part of application No. 17/677,375, filed on Feb. 22, 2022, now Pat. No. 11,560,329, and a continuation-in-part of application No. 17/691,813, filed on Mar. 10, 2022, now Pat. No. 11,634,354.

(60) Provisional application No. 63/212,179, filed on Jun. 18, 2021, provisional application No. 63/212,191, filed on Jun. 18, 2021, provisional application No. 63/251,785, filed on Oct. 4, 2021, provisional application No. 63/283,600, filed on Nov. 29, 2021, provisional application No. 63/286,316, filed on Dec. 6, 2021, provisional application No. 63/304,807, filed on Jan. 31, 2022, provisional application No. 63/318,553, filed on Mar. 10, 2022, provisional application No. 63/347,095, filed on May 31, 2022, provisional application No. 63/347,157, filed on May 31, 2022, provisional application No. 63/347,201, filed on May 31, 2022.

(51) Int. Cl.

| | |
|---|---|
| ***C03C 3/091*** | (2006.01) |
| ***C03C 3/083*** | (2006.01) |
| ***C03C 4/02*** | (2006.01) |
| ***C03C 21/00*** | (2006.01) |

(52) U.S. Cl.
CPC .............. *C03C 3/091* (2013.01); *C03C 3/083* (2013.01); *C03C 4/02* (2013.01); *C03C 21/002* (2013.01)

(58) Field of Classification Search
CPC ........... C03C 3/087; C03C 3/091; C03C 4/02; C03C 21/002
See application file for complete search history.

(56) References Cited

U.S. PATENT DOCUMENTS

| | | | |
|---|---|---|---|
| 2,418,605 | A | 4/1947 | Shepherd et al. |
| 3,524,737 | A | 8/1970 | Doyle et al. |
| 3,751,238 | A | 8/1973 | Grego et al. |
| 3,778,335 | A | 12/1973 | Boyd |
| 3,788,865 | A | 1/1974 | Busdiecker et al. |
| 3,902,881 | A | 9/1975 | Pirooz |
| 4,086,089 | A | 4/1978 | Seward, III et al. |
| 4,102,664 | A | 7/1978 | Dumbaugh, Jr. |
| 4,240,836 | A | 12/1980 | Borrelli et al. |
| 4,251,278 | A | 2/1981 | Hares |
| 4,298,389 | A | 11/1981 | Johnson et al. |
| 4,786,305 | A | 11/1988 | Ball et al. |
| 4,814,297 | A | 3/1989 | Beall et al. |

(Continued)

FOREIGN PATENT DOCUMENTS

| | | | |
|---|---|---|---|
| CN | 102960081 | A | 3/2013 |
| CN | 104640820 | A | 5/2015 |

(Continued)

OTHER PUBLICATIONS

James E Shelby, Introduction to Glass Science and Technology, 2005, The Royal Society of Chemistry, 2nd Edition, pages i-xvi, 26-50, 283-291. (Year: 2005).*

"Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992),".

"Infrared Sensors Market Set To Show Upsurge With Rise In Home Automated Products—IndustryARC Analysis", 2017, Retreived from: https://globenewswire.com/news-release/2017/03/21/942857/0/en/Infrared-Sensors-Market-Set-To-Show-Upsurge-With-Rise-In-Home-Automated-Products-IndustryARC-Analysis.html, Retreived on Jan. 16, 2023.

(Continued)

*Primary Examiner* — Elizabeth A. Bolden

(57) ABSTRACT

A colored glass article may include 50-80 mol % $SiO_2$; 7-20 mol % $Al_2O_3$; 1-35 mol % $R_2O$, wherein $R_2O$ comprises at least one of $Li_2O$, $Na_2O$, and $K_2O$; $1\times10^{-6}$-10 mol % of a colorant, wherein the colorant comprises at least one of $Cr_2O_3$, Au, Ag, CuO, NiO, $Co_3O_4$, $TiO_2$, $CeO_2$; and 12-24 mol % of $Al_2O_3$+MgO+CaO+ZnO. The colored glass article may have a transmittance color coordinate in the CIELAB color space with an L* value of 55 to 96.5. The colored glass article may have a compressive stress profile with a depth of compression ≥0.15 t a thickness t from 0.4 mm-5 mm, a compressive stress ≥200 MPa, and a central tension ≥60 MPa. The colored glass article may have a dielectric constant from 5.6 to 6.4 over the frequency range from 10 GHz to 60 GHz.

19 Claims, 38 Drawing Sheets

(56) References Cited

U.S. PATENT DOCUMENTS

| | | | |
|---|---|---|---|
| 5,300,465 | A | 4/1994 | Grateau et al. |
| 6,333,286 | B1 | 12/2001 | Kurachi et al. |
| 6,340,647 | B1 | 1/2002 | Koyama et al. |
| 6,365,534 | B1 | 4/2002 | Koyama et al. |
| 6,376,403 | B1 | 4/2002 | Koyama et al. |
| 6,532,770 | B2 | 3/2003 | Uhlik et al. |
| 6,547,980 | B1 | 4/2003 | Kurachi et al. |
| 7,192,898 | B2 | 3/2007 | Mori et al. |
| 7,659,221 | B2 | 2/2010 | Arbab et al. |
| 7,666,511 | B2 | 2/2010 | Ellison et al. |
| 8,127,571 | B2 | 3/2012 | Martin et al. |
| 8,168,313 | B2 | 5/2012 | Endo et al. |
| 8,232,218 | B2 | 7/2012 | Dejneka et al. |
| 8,455,066 | B2 | 6/2013 | Heithoff et al. |
| 8,962,503 | B2 | 2/2015 | Nagai et al. |
| 9,053,734 | B2 | 6/2015 | Kajita et al. |
| 9,156,725 | B2 | 10/2015 | Dejneka et al. |
| 9,199,876 | B2 | 12/2015 | Wang et al. |
| 9,284,215 | B2 | 3/2016 | Yamamoto et al. |
| 9,403,716 | B2 | 8/2016 | Dejneka et al. |
| 9,595,960 | B2 | 3/2017 | Wilford |
| 9,701,570 | B2 | 7/2017 | Mauro et al. |
| 9,790,124 | B2 | 10/2017 | Dejneka et al. |
| 9,963,378 | B2 | 5/2018 | Yamamoto |
| 10,081,568 | B2 | 9/2018 | Plevacova et al. |
| 10,246,371 | B1 | 4/2019 | Dejneka et al. |
| 10,577,275 | B2 | 3/2020 | Lambricht et al. |
| 10,626,043 | B2 | 4/2020 | Lambricht et al. |
| 10,656,454 | B2 | 5/2020 | Bazemore et al. |
| 11,059,739 | B2 | 7/2021 | Wolfinger et al. |
| 11,072,557 | B2 | 7/2021 | Weiss et al. |
| 11,161,768 | B2 | 11/2021 | Lambricht et al. |
| 11,192,817 | B2 | 12/2021 | Ono |
| 11,267,748 | B2 | 3/2022 | Siebers et al. |
| 11,390,560 | B2 | 7/2022 | Murayama et al. |
| 11,420,898 | B2 | 8/2022 | He et al. |
| 11,560,329 | B1 | 1/2023 | Guo et al. |
| 11,613,497 | B2 | 3/2023 | Finkeldey et al. |
| 11,634,354 | B2 * | 4/2023 | Guo ........................ C03C 3/091 501/71 |
| 2003/0210535 | A1 | 11/2003 | Gaides |
| 2007/0158317 | A1 | 7/2007 | Brix et al. |
| 2012/0135848 | A1 | 5/2012 | Beall et al. |
| 2013/0128434 | A1 | 5/2013 | Yamamoto et al. |
| 2013/0136909 | A1 | 5/2013 | Mauro et al. |
| 2014/0066285 | A1 | 3/2014 | Beall et al. |
| 2014/0087194 | A1 | 3/2014 | Dejneka et al. |
| 2014/0243183 | A1 | 8/2014 | Beall et al. |
| 2014/0285956 | A1 | 9/2014 | Russell-Clarke et al. |
| 2015/0064474 | A1 | 3/2015 | Dejneka et al. |
| 2015/0166400 | A1 | 6/2015 | Yamamoto |
| 2015/0166403 | A1 | 6/2015 | Yamamoto |
| 2015/0368149 | A1 | 12/2015 | Guo et al. |
| 2016/0090321 | A1 | 3/2016 | Bookbinder et al. |
| 2016/0168023 | A1 | 6/2016 | Baum et al. |
| 2016/0326045 | A1 | 11/2016 | Li |
| 2017/0166478 | A1 | 6/2017 | Gross et al. |
| 2017/0184764 | A1 | 6/2017 | Matsuyuki et al. |
| 2017/0217825 | A1 | 8/2017 | Hasegawa et al. |
| 2017/0291849 | A1 | 10/2017 | Dejneka et al. |
| 2017/0305786 | A1 | 10/2017 | Roussev et al. |
| 2017/0355636 | A1 | 12/2017 | Borrelli et al. |
| 2018/0148370 | A1 | 5/2018 | Baker et al. |
| 2018/0162768 | A1 | 6/2018 | Boek et al. |
| 2018/0362390 | A1 | 12/2018 | Claireaux et al. |
| 2019/0071345 | A1 | 3/2019 | Mauro et al. |
| 2019/0177206 | A1 | 6/2019 | Dejneka et al. |
| 2019/0177209 | A1 | 6/2019 | Dejneka et al. |
| 2019/0263713 | A1 | 8/2019 | Murayama et al. |
| 2019/0300422 | A1 | 10/2019 | Guo et al. |
| 2020/0140322 | A1 | 5/2020 | Comte et al. |
| 2020/0189962 | A1 | 6/2020 | Dejneka et al. |
| 2020/0377404 | A1 | 12/2020 | Beall et al. |
| 2020/0398539 | A1 | 12/2020 | Brennan et al. |
| 2021/0155530 | A1 | 5/2021 | Cui et al. |
| 2021/0155531 | A1 | 5/2021 | Dejneka et al. |
| 2022/0135466 | A1 | 5/2022 | Maeda et al. |
| 2022/0371942 | A1 | 11/2022 | Ping et al. |
| 2022/0402804 | A1 | 12/2022 | Guo et al. |
| 2022/0402805 | A1 | 12/2022 | Guo et al. |
| 2022/0402808 | A1 | 12/2022 | Guo et al. |
| 2023/0056403 | A1 | 2/2023 | Nguyen et al. |
| 2023/0159383 | A1 | 5/2023 | Leukel et al. |

FOREIGN PATENT DOCUMENTS

| | | | |
|---|---|---|---|
| CN | 107935410 | A | 4/2018 |
| CN | 108715510 | A | 10/2018 |
| CN | 109970362 | A | 7/2019 |
| CN | 110216384 | A | 9/2019 |
| CN | 110255896 | A | 9/2019 |
| CN | 110615610 | A | 12/2019 |
| CN | 113845302 | A | 12/2021 |
| DE | 10141666 | A1 | 3/2003 |
| EP | 1593658 | A1 | 11/2005 |
| EP | 2764320 | A2 | 8/2014 |
| EP | 3390311 | B1 | 8/2019 |
| GB | 1124001 | A | 8/1968 |
| JP | 55-045501 | A | 3/1980 |
| JP | 60-145930 | A | 8/1985 |
| JP | 63-166736 | A | 7/1988 |
| JP | 2000-203872 | A | 7/2000 |
| JP | 2003-306348 | A | 10/2003 |
| JP | 2004-002057 | A | 1/2004 |
| JP | 4192232 | B2 | 12/2008 |
| JP | 4303999 | B2 | 7/2009 |
| JP | 7136100 | B2 | 9/2022 |
| RU | 2645687 | C1 | 2/2018 |
| WO | 2013/050727 | A2 | 4/2013 |
| WO | 2013/099994 | A1 | 7/2013 |
| WO | 2014/136751 | A1 | 9/2014 |
| WO | 2017/218468 | A1 | 12/2017 |
| WO | 2019/064280 | A1 | 4/2019 |
| WO | 2019/083937 | A2 | 5/2019 |
| WO | 2019/127818 | A1 | 7/2019 |
| WO | 2021/010376 | A1 | 1/2021 |
| WO | 2021/136726 | A1 | 7/2021 |
| WO | 2023/107409 | A1 | 6/2023 |

OTHER PUBLICATIONS

"Near Infrared Imaging Market—Global Forecast to 2020", Fast Market Research, 2022, Retreived from: http://www.sbwire.com/press-releases/just-published-near-infrared-imaging-market-global-672492.htm, Retreived on Jan. 16, 2023.

"Plexiglass Acrylic Sheets", Retrieved from: http://www.eplastics.com/Plastic/Plexiglass_Acrylic_Sheet_Infrared_Transmitting?gclid=EAlalQobChMIsL6mu7jp2AIVxRuBCh1EIQyVEAYYASABEgLs_ID_BWE, Retrieved on: Jan. 12, 2023.

"Reddy, K. P. R. et al, "Fracture Toughness Measurement of Glass and Ceramic Materials Using Chevron-Notched Specimens," J. Am. Ceram. Soc., 71 [6], C-310-C-313 (1988)".

Alan R. Frank, "Near-Infrared Image Sensor Targets IoT Camera Market", Mar. 2016, Retrieved from: http://electronics360.globalspec.com/article/6487/near-infrared-image-sensor-targets-iot-camera-market, Retrieve on: Jan. 12, 2023.

ASTM C1351M-96(2017) "Standard Test Method for Measurement of Viscosity of Glass Between 104 Pas and 108 Pas by Viscous Compression of a Solid Right Cylinder".

ASTM C829-81 (2015), titled "Standard Practice for Measurement of L-iquidus Temperature of Glass by the Gradient Furnace Method."

ASTM E228-85 (1989), "Standard Test Method for Linear Thermal Expansion of Solid Materials With a Vitreous Silica Dilatometer".

ASTM standard C770-16, entitled "Standard Test Method for Measurement of Glass Stress-Optical Coefficient,".

Berezhnoi A.I.,Ivanova V.I., "Synthesis and study of some thermo-physical properties of photo-glass-ceramics in the system R2O—ZnO—Al2O3—SiO2" (in Russian), Elektron. Tekh., Ser. 14, Materialy, 1971, No. 4, p. 48-55.

(56) References Cited

OTHER PUBLICATIONS

David Ashkenasi, Andreas Lemke, "Picosecond laser-induced color centers in glass optics", J. Laser Appl. 23, 012007 (2011).
Hirao et al., "Crystallization effect on non-linear optical response of silicate glass and glass-ceramics containing gold nanoparticles." Journal of non-crystalline solids, vol. 290, No. 1, 2001, pp. 49-56.
Llordes, et al., "Tunable near-infrared and visible-light transmittance in nanocrystals-in-glass composites", Nat. Lett., vol. 500, 2013, pp. 323-327.
Sasai, Jun, and Kazuyuki Hirao. "Crystallization effect on non-linear optical response of silicate glass and glass-ceramics containing gold nanoparticles." Journal of non-crystalline solids 290, No. 1 (2001): 49-56.
Sheng, J., K. Kadono, and T. Yazawa. "Easily recyclable coloured glass by x-ray irradiation induced coloration." Glass technology 43, No. 6 (2002): 238-244.
Sheng, Jiawei, Kohei Kadono, and Tetsuo Yazawa. "Nanosized gold clusters formation in selected areas of soda-lime silicate glass." Journal of non-crystalline solids 324, No. 3 (2003): 295-299.
Stookey, S. D. "Coloration of glass by gold, silver, and copper." Journal of the American Ceramic Society, vol. 32, No. 8, 1949, pp. 246-249.
Yamashita, Masaru, Zhidong Yao, Yoshinobu Matsumoto, Yasushi Utagawa, Kohei Kadono, and Tetsuo Yazawa. "X-ray irradiation-induced coloration of manganese in soda-lime silicate glass." Journal of non-crystalline solids 333, No. 1 (2004): 37-43.

* cited by examiner

COLORED GLASS ARTICLES HAVING IMPROVED MECHANICAL DURABILITY

CROSS REFERENCE TO RELATED APPLICATIONS

The present Application is a continuation-in-part of U.S. application Ser. No. 17/691,813 filed Mar. 10, 2022, which claims the priority benefit of U.S. Application Nos. 63/304,807 filed Jan. 31, 2022; 63/286,316 filed Dec. 6, 2021; 63/251,785 filed Oct. 4, 2021; 63/212,191 filed Jun. 18, 2021; and 63/212,179 filed Jun. 18, 2021, and the present Application is also a continuation of International Application No. PCT/US2022/033917 filed Jun. 17, 2022, which is a continuation-in-part of U.S. application Ser. No. 17/691,813 filed Mar. 10, 2022; 17/677,345 filed Feb. 22, 2022; 17/677,375 filed Feb. 22, 2022; and claims the priority benefit of U.S. Application Nos. 63/347,095 filed May 31, 2022; 63/347,157 filed May 31, 2022, 63/347,201 filed May 31, 2022; 63/318,553 filed Mar. 10, 2022; 63/304,807 filed Jan. 31, 2022; 63/286,316 filed Dec. 6, 2021; 63/283,600 filed Nov. 29, 2021; 63/251,785 filed Oct. 4, 2021; 63/212,179 filed Jun. 18, 2021; and 63/212,191 filed Jun. 18, 2021, and each of the above applications in incorporated by reference into the present Application in its entirety.

FIELD

The present specification generally relates to glass compositions and glass articles and, in particular, to glass compositions and ion-exchangeable, colored glass articles formed therefrom.

TECHNICAL BACKGROUND

Aluminosilicate glass articles may exhibit superior ion-exchangeability and drop performance. Various industries, including the consumer electronics industry, desire colored materials with the same or similar strength and fracture toughness properties as existing, non-colored, ion-exchange strengthened glasses. However, simply including colorants in conventional aluminosilicate glass compositions may not produce the desired color.

Accordingly, a need exists for an alternative colored glass articles having high strength and fracture toughness.

SUMMARY

Aspect A1 includes a colored glass article comprising: greater than or equal to 50 mol % and less than or equal to 80 mol % $SiO_2$; greater than or equal to 7 mol % and less than or equal to 20 mol % $Al_2O_3$; greater than or equal to 1 mol % and less than or equal to 35 mol % $R_2O$, wherein $R_2O$ comprises at least one of $Li_2O$, $Na_2O$, and $K_2O$; greater than $1\times10^{-6}$ mol % and less than or equal to 10 mol % of a colorant, wherein the colorant comprises at least one of $Cr_2O_3$, Au, Ag, CuO, NiO, $Co_3O_4$, $TiO_2$, $CeO_2$; and greater than or equal to 12 mol % and less than or equal to 24 mol % of $Al_2O_3$+MgO+CaO+ZnO, wherein the colored glass article comprises: a transmittance color coordinate in the CIELAB color space comprising an L* value greater than or equal to 55 and less than or equal to 96.5 as measured under F2 illumination and a 10° standard observer angle; a compressive stress profile with a depth of compression greater than or equal to 0.15 t where tis a thickness of the colored glass article, a compressive stress greater than or equal to 200 MPa, and a central tension greater than or equal to 60 MPa; a dielectric constant from 5.6 to 6.4 over a frequency range from 10 GHz to 60 GHz; and the thickness t is greater than or equal to 0.4 mm and less than or equal to 5 mm.

Aspect A2 includes the colored glass article of aspect A1, wherein the thickness t is greater than or equal to 0.5 mm and less than or equal to 5 mm.

Aspect A3 includes the colored glass article of any preceding aspect, wherein a colored glass article having the same composition and microstructure as a center of the colored glass article has a fracture toughness $K_{IC}$ greater than or equal to 0.7 $MPa\cdot m^{1/2}$.

Aspect A4 includes the colored glass article of any preceding aspect comprising an average transmittance of greater than or equal to 10% and less than or equal to 92% over the wavelength range of 380 nm to 750 nm.

Aspect A5 includes the colored glass article of any preceding aspect further comprising at least one crystalline phase.

Aspect A6 includes the colored glass article of any preceding aspect comprising a crystallinity of less than 10 wt %.

Aspect A7 includes the colored glass article of any preceding aspect, wherein the depth of compression is less than or equal to 0.3 t.

Aspect A8 includes the colored glass article of any preceding aspect, wherein the surface compressive stress is greater than or equal to 400 MPa.

Aspect A9 includes the colored glass article of any preceding aspect, wherein the central tension is greater than or equal to 70 MPa.

Aspect A10 includes the colored glass article of any preceding aspect, wherein the transmittance color coordinate in the CIELAB color space comprises an a* value and |a*| is ≥0.3.

Aspect A11 includes the colored glass article of any preceding aspect, wherein the transmittance color coordinate in the CIELAB color space comprises a b* value and |b*| is ≥0.5.

Aspect A12 includes the colored glass article of any preceding aspect, wherein the transmittance color coordinate in the CIELAB color space comprises an a* value and a b* value, wherein |a*| is ≥0.3 and |b*| is ≥0.5.

Aspect A13 includes the colored glass article of any preceding aspect, wherein the transmittance color coordinate in the CIELAB color space comprises a* and b* values within a region of a plot of a* vs. b* bound by the intersection of lines: $b^*=0.2879\cdot a^*+27.818$; $b^*=7.0833\cdot a^*-94.5$; $b^*=0.45\cdot a^*+104.5$; and $b^*=15.3\cdot a^*+253$.

Aspect A14 includes the colored glass article of aspect A13, wherein the colorant comprises Ag.

Aspect A15 includes the colored glass article of any of aspects A1-A12, wherein the transmittance color coordinate in the CIELAB color space comprises a* and b* values within a region of a plot of a* vs. b* bound by the intersection of lines: $b^*=7.0833\cdot a^*-94.5$; $b^*=-0.9583\cdot a^*+146.75$; $b^*=2.6957\cdot a^*-50.565$; and $b^*=33$.

Aspect A16 includes the colored glass article of aspect A15 wherein the colorant comprises Ag.

Aspect A17 includes the colored glass article of any of aspects A1-A12, wherein the transmittance color coordinate in the CIELAB color space comprises a* and b* values within a region of a plot of a* vs. b* bound by the intersection of lines: $b^*=2.6957\cdot a^*-50.565$; $a^*=54$; $b^*=1.0769\cdot a^*-17.154$; and $b^*=6.6667\cdot a^*-173.67$.

Aspect A18 includes the colored glass article of aspect A17 wherein the colorant comprises Ag.

Aspect A19 includes the colored glass article of any of aspects A1-A12, wherein the transmittance color coordinate in the CIELAB color space comprises a* and b* values within a region of a plot of a* vs. b* bound by the intersection of lines: b*=0.2879·a*+27.818; a*=0; b*=−1.375·a*+1; and b*=9.333·a*+86.667, exclusive of a* greater than −0.3 and less than 0.3 and exclusive of b* greater than −0.5 and less than 0.5.

Aspect A20 includes the colored glass article of aspect A19, wherein the colorant comprises Ag.

Aspect A21 includes the colored glass article of any of aspects A1-A12, wherein the transmittance color coordinate in the CIELAB color space comprises a* and b* values within a region of a plot of a* vs. b* bound by the intersection of lines: b*=0.0833·a*+20.833; b*=2.1182·a*−32.073; b*=−0.3; and b*=1.5929·a*−0.3, exclusive of a* greater than −0.3 and less than 0.3 and exclusive of b* greater than −0.5 and less than 0.5.

Aspect A22 includes the colored glass article of aspect A21, wherein the colorant comprises Ag.

Aspect A23 includes the colored glass article of any of aspects A1-A12, wherein the transmittance color coordinate in the CIELAB color space comprises a* values greater than or equal to −18 and less than or equal to 0.3 and b* values greater than or equal to 0.5 and less than or equal to 82.

Aspect A24 includes the colored glass article of claim A23, wherein the colorant comprises $Cr_2O_3$.

Aspect A25 includes the colored glass article of any of aspects A1-A12, wherein the transmittance color coordinate in the CIELAB color space comprises a* values greater than or equal to −18 and less than or equal to 18, exclusive of a* greater than −0.3 and less than 0.3, and b* greater than or equal to 0.5 and less than or equal to 82.

Aspect A26 includes the colored glass article of aspect A25, wherein the colorant comprises $Cr_2O_3$ and NiO.

Aspect A27 includes the colored glass article of any of aspects A1-A12, wherein the transmittance color coordinate in the CIELAB color space comprises a* values greater than or equal to −20 and less than or equal to 60, exclusive of a* greater than −0.3 and less than 0.3, and b* greater than or equal to −90 and less than or equal to 85, exclusive of b* values greater than −0.5 and less than 0.5.

Aspect A28 includes the colored glass article of aspect A27, wherein the colorant comprises $Cr_2O_3$ and $Co_3O_4$.

Aspect A29 includes the colored glass article of any of aspects A1-A12, wherein the transmittance color coordinate in the CIELAB color space comprises a* values greater than or equal to −35 and less than or equal to −0.3, and b* values greater than or equal to 0.5 and less than or equal to 82.

Aspect A30 includes the colored glass article of aspect A29, wherein the colorant comprises $Cr_2O_3$ and CuO.

Aspect A31 includes the colored glass article of any of aspects A1-A12, wherein the transmittance color coordinate in the CIELAB color space comprises a* values greater than or equal to −35 and less than or equal to 20, exclusive of a* greater than −0.3 and less than 0.3, and b* values greater than or equal to 0.5 and less than or equal to 75.

Aspect A32 includes the colored glass article of aspect A31, wherein the colorant comprises $Cr_2O_3$, NiO, and CuO.

Aspect A33 includes the colored glass article of any of aspects A1-A12, wherein the transmittance color coordinate in the CIELAB color space comprises a* values greater than or equal to −15 and less than or equal to 65, exclusive of a* greater than −0.3 and less than 0.3, and b* values greater than or equal to −90 and less than or equal to 80, exclusive of b* greater than −0.5 and less than 0.5.

Aspect A34 includes the colored glass article of aspect A33, wherein the colorant comprises $Cr_2O_3$, NiO, and $Co_3O_4$.

Aspect A35 includes the colored glass article of any of aspects A1-A12, wherein the transmittance color coordinate in the CIELAB color space comprises a* values greater than or equal to −35 and less than or equal to 60, exclusive of a* greater than −0.3 and less than 0.3, and b* values greater than or equal to −90 and less than or equal to 80, exclusive of b* greater than −0.5 and less than 0.5.

Aspect A36 includes the colored glass article of aspect A35, wherein the colorant comprises $Cr_2O_3$, CuO, and $Co_3O_4$.

Aspect A37 includes the colored glass article of any of aspects A1-A12, wherein the transmittance color coordinate in the CIELAB color space comprises a* values greater than or equal to −35 and less than or equal to 60, exclusive of a* greater than −0.3 and less than 0.3, and b* values greater than or equal to −90 and less than or equal to 80, exclusive of b* greater than −0.5 and less than 0.5.

Aspect A38 includes the colored glass article of aspect A37, wherein the colorant comprises $Cr_2O_3$, NiO, CuO, and $Co_3O_4$.

Aspect A39 includes the colored glass article of any of aspects A1-A12, wherein the transmittance color coordinate in the CIELAB color space comprises a* values greater than or equal to −15 and less than or equal to −0.3 and b* values greater than or equal to −10 and less than or equal to 10, exclusive of b* greater than −0.5 and less than 0.5.

Aspect A40 includes the colored glass article of aspect A39, wherein the colorant comprises at least one of NiO, CuO, $TiO_2$, $Co_3O_4$, $Cr_2O_3$, and $CeO_2$.

Aspect A41 includes the colored glass article of any of aspects A1-A12, wherein the transmittance color coordinate in the CIELAB color space comprises a* values greater than or equal to −5 and less than or equal to 25, exclusive of a* greater than −0.3 and less than 0.3, and b* greater than or equal to −20 and less than or equal to 5, exclusive of b* greater than −0.5 and less than 0.5.

Aspect A42 includes the colored glass article of aspect A41, wherein the colorant comprises Au.

Aspect A43 includes the colored glass article of any of aspects A1-A12, wherein the transmittance color coordinate in the CIELAB color space comprises a* values greater than or equal to −10 and less than or equal to 25, exclusive of a* greater than −0.3 and less than 0.3, and b* values greater than or equal to −20 and less than or equal to 5, exclusive of b* greater than −0.5 and less than 0.5.

Aspect A44 includes the colored glass article of aspect A43, wherein the colorant comprises Au.

Aspect A45 includes the colored glass article of any of aspects A1-A12, wherein the transmittance color coordinate in the CIELAB color space comprises a* values greater than or equal to −15 and less than or equal to −0.3, and b* values greater than or equal to −10 and less than or equal to 10, exclusive of b* greater than −0.5 and less than 0.5.

Aspect A46 includes the colored glass article of aspect A45, wherein the colorant comprises at least one of $Cr_2O_3$, Au, Ag, CuO, NiO, $Co_3O_4$, $TiO_2$, and $CeO_2$.

Aspect A47 includes an electronic device comprising a housing, the housing comprising a colored glass article according to any preceding aspect.

Aspect A48 includes a colored glass article comprising: greater than or equal to 50 mol % and less than or equal to 80 mol % $SiO_2$; greater than or equal to 7 mol % and less than or equal to 20 mol % $Al_2O_3$; greater than or equal to 1 mol % and less than or equal to 35 mol % $R_2O$, wherein $R_2O$ comprises at least one of $Li_2O$, $Na_2O$, and $K_2O$; greater than $1\times10^{-6}$ mol % and less than or equal to 10 mol % of a colorant, wherein the colorant comprises at least one of $Cr_2O_3$, Au, Ag, CuO, NiO, $Co_3O_4$, $TiO_2$, $CeO_2$; and greater than or equal to 10 mol % and less than or equal to 30 mol % of $Al_2O_3$+MgO+CaO+ZnO, wherein the colored glass article comprises: a transmittance color coordinate in the CIELAB color space comprising an L* value greater than or equal to 55 and less than or equal to 96.5 as measured under F2 illumination and a 10° standard observer angle; a compressive stress profile with a depth of compression greater than or equal to 0.15 t where tis a thickness of the colored glass article, a compressive stress greater than or equal to 200 MPa, and a central tension greater than or equal to 60 MPa; a dielectric constant from 5.6 to 6.4 over a frequency range from 10 GHz to 60 GHz; and the thickness t is greater than or equal to 0.4 mm and less than or equal to 5 mm.

Aspect A49 includes the colored glass article of aspect A48, wherein the thickness t is greater than or equal to 0.5 mm and less than or equal to 5 mm.

Aspect A50 includes the colored glass article of any preceding aspect, wherein a colored glass article having the same composition and microstructure as a center of the colored glass article has a fracture toughness $K_{IC}$ greater than or equal to 0.7 $MPa\cdot m^{1/2}$.

Aspect A51 includes the colored glass article of any preceding aspect comprising an average transmittance of greater than or equal to 10% and less than or equal to 92% over the wavelength range of 380 nm to 750 nm.

Aspect A52 includes the colored glass article of any preceding aspect further comprising at least one crystalline phase.

Aspect A53 includes the colored glass article of any preceding aspect comprising a crystallinity of less than 10 wt %.

Aspect A54 includes the colored glass article of any preceding aspect, wherein the depth of compression is less than or equal to 0.3 t.

Aspect A55 includes the colored glass article of any preceding aspect, wherein the surface compressive stress is greater than or equal to 400 MPa.

Aspect A56 includes the colored glass article of any preceding aspect, wherein the central tension is greater than or equal to 70 MPa.

Aspect A57 includes the colored glass article of any preceding aspect, wherein the transmittance color coordinate in the CIELAB color space comprises an a* value and |a*| is ≥0.3.

Aspect A58 includes the colored glass article of any preceding aspect, wherein the transmittance color coordinate in the CIELAB color space comprises a b* value and |b*| is ≥0.5.

Aspect A59 includes the colored glass article of any preceding aspect, wherein the transmittance color coordinate in the CIELAB color space comprises an a* value and a b* value, wherein |a*| is ≥0.3 and |b*| is ≥0.5.

Aspect A60 includes the colored glass article of any preceding aspect, wherein the transmittance color coordinate in the CIELAB color space comprises a* and b* values within a region of a plot of a* vs. b* bound by the intersection of lines: b*=0.2879·a*+27.818; b*=7.0833·a*−94.5; b*=0.45·a*+104.5; and b*=15.3·a*+253.

Aspect A61 includes the colored glass article of aspect A60, wherein the colorant comprises Ag.

Aspect A61 includes the colored glass article of any of aspects A48-A59, wherein the transmittance color coordinate in the CIELAB color space comprises a* and b* values within a region of a plot of a* vs. b* bound by the intersection of lines: b*=7.0833·a*−94.5; b*=−0.9583·a*+146.75; b*=2.6957·a*−50.565; and b*=33.

Aspect A62 includes the colored glass article of aspect A61 wherein the colorant comprises Ag.

Aspect A63 includes the colored glass article of any of aspects A48-A59, wherein the transmittance color coordinate in the CIELAB color space comprises a* and b* values within a region of a plot of a* vs. b*bound by the intersection of lines: b*=2.6957·a*−50.565; a*=54; b*=1.0769·a*−17.154; and b*=6.6667·a*−173.67.

Aspect A64 includes the colored glass article of aspect A63 wherein the colorant comprises Ag.

Aspect A65 includes the colored glass article of any of aspects A48-A59, wherein the transmittance color coordinate in the CIELAB color space comprises a* and b* values within a region of a plot of a* vs. b* bound by the intersection of lines: b*=0.2879·a*+27.818; a*=0; b*=−1.375·a*+1; and b*=9.333·a*+86.667, exclusive of a* greater than −0.3 and less than 0.3 and exclusive of b* greater than −0.5 and less than 0.5.

Aspect A66 includes the colored glass article of aspect A65, wherein the colorant comprises Ag.

Aspect A67 includes the colored glass article of any of aspects A48-A59, wherein the transmittance color coordinate in the CIELAB color space comprises a* and b* values within a region of a plot of a* vs. b* bound by the intersection of lines: b*=0.0833·a*+20.833; b*=2.1182·a*−32.073; b*=−0.3; and b*=1.5929·a*−0.3, exclusive of a* greater than −0.3 and less than 0.3 and exclusive of b* greater than −0.5 and less than 0.5.

Aspect A68 includes the colored glass article of aspect A67, wherein the colorant comprises Ag.

Aspect A69 includes the colored glass article of any of aspects A58-A59, wherein the transmittance color coordinate in the CIELAB color space comprises a* values greater than or equal to −18 and less than or equal to 0.3 and b* values greater than or equal to 0.5 and less than or equal to 82.

Aspect A70 includes the colored glass article of claim A69, wherein the colorant comprises $Cr_2O_3$.

Aspect A71 includes the colored glass article of any of aspects A48-A59, wherein the transmittance color coordinate in the CIELAB color space comprises a* values greater than or equal to −18 and less than or equal to 18, exclusive of a* greater than −0.3 and less than 0.3, and b* greater than or equal to 0.5 and less than or equal to 82.

Aspect A72 includes the colored glass article of aspect A71, wherein the colorant comprises $Cr_2O_3$ and NiO.

Aspect A73 includes the colored glass article of any of aspects A48-A59, wherein the transmittance color coordinate in the CIELAB color space comprises a* values greater than or equal to −20 and less than or equal to 60, exclusive of a* greater than −0.3 and less than 0.3, and b* greater than or equal to −90 and less than or equal to 85, exclusive of b* values greater than −0.5 and less than 0.5.

Aspect A74 includes the colored glass article of aspect A73, wherein the colorant comprises $Cr_2O_3$ and $Co_3O_4$.

Aspect A75 includes the colored glass article of any of aspects A48-A59, wherein the transmittance color coordinate in the CIELAB color space comprises a* values greater than or equal to −35 and less than or equal to −0.3, and b* values greater than or equal to 0.5 and less than or equal to 82.

Aspect A76 includes the colored glass article of aspect A75, wherein the colorant comprises $Cr_2O_3$ and CuO.

Aspect A77 includes the colored glass article of any of aspects A48-A59, wherein the transmittance color coordinate in the CIELAB color space comprises a* values greater than or equal to −35 and less than or equal to 20, exclusive of a* greater than −0.3 and less than 0.3, and b* values greater than or equal to 0.5 and less than or equal to 75.

Aspect A78 includes the colored glass article of aspect A77, wherein the colorant comprises $Cr_2O_3$, NiO, and CuO.

Aspect A79 includes the colored glass article of any of aspects A48-A59, wherein the transmittance color coordinate in the CIELAB color space comprises a* values greater than or equal to −15 and less than or equal to 65, exclusive of a* greater than −0.3 and less than 0.3, and b* values greater than or equal to −90 and less than or equal to 80, exclusive of b* greater than −0.5 and less than 0.5.

Aspect A80 includes the colored glass article of aspect A79, wherein the colorant comprises $Cr_2O_3$, NiO, and $Co_3O_4$.

Aspect A81 includes the colored glass article of any of aspects A48-A59, wherein the transmittance color coordinate in the CIELAB color space comprises a* values greater than or equal to −35 and less than or equal to 60, exclusive of a* greater than −0.3 and less than 0.3, and b* values greater than or equal to −90 and less than or equal to 80, exclusive of b* greater than −0.5 and less than 0.5.

Aspect A82 includes the colored glass article of aspect A81, wherein the colorant comprises $Cr_2O_3$, CuO, and $Co_3O_4$.

Aspect A83 includes the colored glass article of any of aspects A48-A59, wherein the transmittance color coordinate in the CIELAB color space comprises a* values greater than or equal to −35 and less than or equal to 60, exclusive of a* greater than −0.3 and less than 0.3, and b* values greater than or equal to −90 and less than or equal to 80, exclusive of b* greater than −0.5 and less than 0.5.

Aspect A84 includes the colored glass article of aspect A83, wherein the colorant comprises $Cr_2O_3$, NiO, CuO, and $Co_3O_4$.

Aspect A84 includes the colored glass article of any of aspects A48-A59, wherein the transmittance color coordinate in the CIELAB color space comprises a*values greater than or equal to −15 and less than or equal to −0.3 and b* values greater than or equal to −10 and less than or equal to 10, exclusive of b* greater than −0.5 and less than 0.5.

Aspect A85 includes the colored glass article of aspect A84, wherein the colorant comprises at least one of NiO, CuO, $TiO_2$, $Co_3O_4$, $Cr_2O_3$, and $CeO_2$.

Aspect A86 includes the colored glass article of any of aspects A48-A59, wherein the transmittance color coordinate in the CIELAB color space comprises a* values greater than or equal to −5 and less than or equal to 25, exclusive of a* greater than −0.3 and less than 0.3, and b* greater than or equal to −20 and less than or equal to 5, exclusive of b* greater than −0.5 and less than 0.5.

Aspect A87 includes the colored glass article of aspect A86, wherein the colorant comprises Au.

Aspect A88 includes the colored glass article of any of aspects A48-A59, wherein the transmittance color coordinate in the CIELAB color space comprises a* values greater than or equal to −10 and less than or equal to 25, exclusive of a* greater than −0.3 and less than 0.3, and b* values greater than or equal to −20 and less than or equal to 5, exclusive of b* greater than −0.5 and less than 0.5.

Aspect A89 includes the colored glass article of aspect A88, wherein the colorant comprises Au.

Aspect A90 includes the colored glass article of any of aspects A48-A59, wherein the transmittance color coordinate in the CIELAB color space comprises a* values greater than or equal to −15 and less than or equal to −0.3, and b* values greater than or equal to −10 and less than or equal to 10, exclusive of b* greater than −0.5 and less than 0.5.

Aspect A91 includes the colored glass article of aspect A90, wherein the colorant comprises at least one of $Cr_2O_3$, Au, Ag, CuO, NiO, $Co_3O_4$, $TiO_2$, and $CeO_2$.

Aspect A92 includes an electronic device comprising a housing, the housing comprising a colored glass article according to any preceding aspect.

Additional features and advantages of the colored glass articles described herein will be set forth in the detailed description that follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
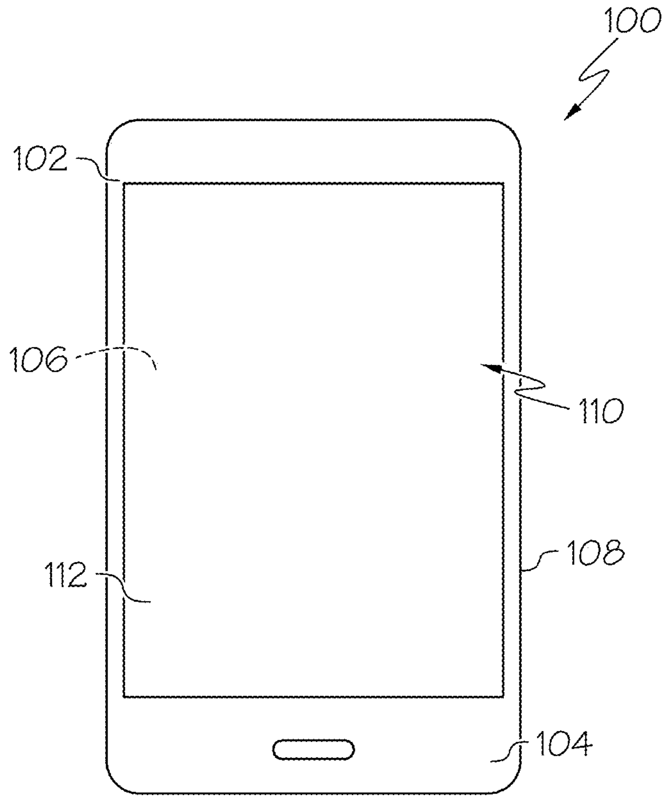
FIG. 1 is a plan view of an electronic device incorporating any of the colored glass articles according to one or more embodiments described herein.

Reference will now be made in detail to various embodiments of glass compositions and colored glass articles formed therefrom having a desired color. According to embodiments, a colored glass article includes: greater than or equal to 50 mol % and less than or equal to 80 mol % $SiO_2$; greater than or equal to 7 mol % and less than or equal to 20 mol % $Al_2O_3$; greater than or equal to 1 mol % and less than or equal to 35 mol % $R_2O$, wherein $R_2O$ comprises at least one of $Li_2O$, $Na_2O$, and $K_2O$; greater than $1\times10^{-6}$ mol % and less than or equal to 10 mol % of a colorant, wherein the colorant comprises at least one of $Cr_2O_3$, Au, Ag, CuO, NiO, $Co_3O_4$, $TiO_2$, $CeO_2$; and greater than or equal to 12 mol % and less than or equal to 24 mol % of $Al_2O_3$+MgO+CaO+ZnO. The colored glass article may further include a transmittance color coordinate in the CIELAB color space comprising an L* value greater than or equal to 55 and less than or equal to 96.5 as measured under F2 illumination and a 10° standard observer angle; a compressive stress profile with a depth of compression greater than or equal to 0.15 t where tis a thickness of the colored glass article, a compressive stress greater than or equal to 200 MPa, and a central tension greater than or equal to 60 MPa; a dielectric constant from 5.6 to 6.4 over a frequency range from 10 GHz to 60 GHz; and the thickness t is greater than or equal to 0.4 mm and less than or equal to 5 mm. Various embodiments of colored glass articles will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions and the resultant colored glass articles described herein, the concentrations of constituent components in oxide form (e.g., $SiO_2$, $Al_2O_3$, and the like) are specified in mole percent (mol %) on an oxide basis, unless otherwise specified.

In embodiments of the glass compositions and the resultant colored glass articles described herein, the concentrations of Au and Cl are specified in mole percent (mol %), unless otherwise specified.

In embodiments of the glass compositions and the resultant colored glass articles described herein, the concentration of a cation "M" is specified in mole percent (mol %), unless otherwise specified.

The term "substantially free," when used to describe the concentration and/or absence of a particular constituent component in a glass composition and the resultant colored glass article, means that the constituent component is not intentionally added to the glass composition and the resultant colored glass article. However, the glass composition and the resultant colored glass article may contain traces of the constituent component as a contaminant or tramp in amounts of less than 200 ppm unless specified otherwise herein. It is noted that the definition of "substantially free" is exclusive of gold (Au) which may be intentionally added to the glass composition in relatively small amounts such as, for example and without limitation, amounts less than 200 ppm (or the equivalent in mol %) to achieve a desired color in the resultant colored glass article.

The terms "0 mol %" and "free," when used to describe the concentration and/or absence of a particular constituent component in a glass composition, means that the constituent component is not present in the glass composition.

Fracture toughness ($K_{IC}$) represents the ability of a glass composition to resist fracture. Fracture toughness is measured on a non-strengthened glass article, such as measuring the $K_{IC}$ value prior to ion exchange (IOX) treatment of the glass article, thereby representing a feature of a glass substrate prior to IOX. The fracture toughness test methods described herein are not suitable for glasses that have been exposed to IOX treatment. Accordingly, where the fracture toughness of an ion exchanged article is referred to, it means the fracture toughness of a non-ion exchanged article with the same composition and microstructure (when present) as the center (i.e., a point located at least 0.5 t from every surface of the article or substrate where t is the thickness of the article or substrate) of the ion exchanged article (which corresponds to the portion of the ion exchanged article least affected by the ion exchange process and, hence, a composition and microstructure comparable to a non-ion exchanged glass). Fracture toughness is measured by the chevron notched short bar method. The chevron notched short bar (CNSB) method is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that Y*m is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). Unless otherwise specified, all fracture toughness values were measured by chevron notched short bar (CNSB) method.

Figure 49:
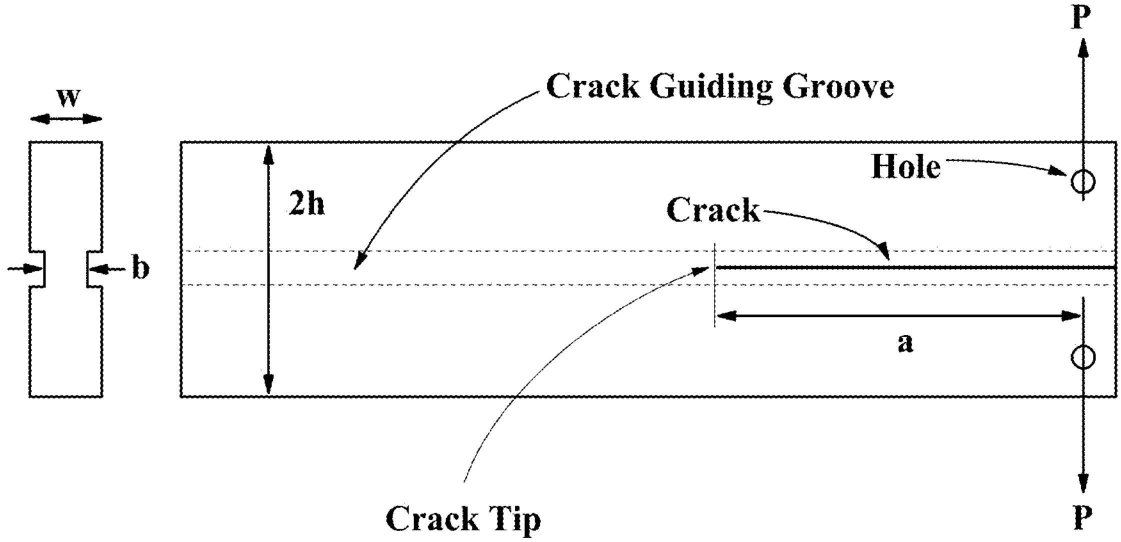
FIG. 49 is a schematic representation of a sample utilized in the double cantilever beam (DCB) procedure to determine the fracture toughness $K_{IC}$ and a cross-section thereof.

Alternative $K_{IC}$ fracture toughness measurements were performed on some samples with the double cantilever beam (DCB) procedure. The DCB specimen geometry is shown in FIG. 49 with parameters being the crack length a, applied load P, cross-sectional dimensions w and 2 h, and the thickness of the crack-guiding groove b. The samples were cut into rectangles of width 2 h=1.25 cm and a thickness ranging from, w=0.3 mm to 1 mm, with the overall length of the sample, which is not a critical dimension, varying from 5 cm to 10 cm. A hole was drilled on both ends with a diamond drill to provide a means of attaching the sample to a sample holder and to the load. A crack "guiding groove" was cut down the length of the sample on both flat faces using a wafer dicing saw with a diamond blade, leaving a "web" of material, approximately half the total plate thickness (dimension b in FIG. 49), with a height of 180 μm corresponding to the blade thickness. The high precision dimensional tolerances of the dicing saw allow for minimal sample-to-sample variation. The dicing saw was also used to cut an initial crack where a=15 mm. As a consequence of this final operation a very thin wedge of material was created near the crack tip (due to the blade curvature) allowing for easier crack initiation in the sample. The samples were mounted in a metal sample holder with a steel wire in the bottom hole of the sample. The samples were also supported on the opposite end to keep the samples level under low loading conditions. A spring in series with a load cell (FUTEK, LSB200) was hooked to the upper hole which was then extended, to gradually apply load, using rope and a high precision slide. The crack was monitored using a microscope having a 5 μm resolution attached to a digital camera and a computer. The applied stress intensity, $K_P$, was calculated using the following equation:

$$K_P = \left[\frac{P \cdot a}{(w \cdot b)^{0.5} h^{1.5}}\right]\left[3.47 + 2.32\frac{h}{a}\right]$$

For each sample, a crack was first initiated at the tip of the web, and then the starter crack was carefully sub-critically grown until the ratio of dimensions a/h was greater than 1.5 to accurately calculate stress intensity. At this point the crack length, a, was measured and recorded using a traveling microscope with 5 μm resolution. A drop of toluene was then placed into the crack groove and wicked along the length of the groove by capillary forces, pinning the crack from moving until the fracture toughness is reached. The load was then increased until sample fracture occurred, and the critical stress intensity $K_{IC}$ calculated from the failure load and sample dimensions, with $K_P$ being equivalent to $K_{IC}$ due to the measurement method.

The viscosity of the glass composition, as described herein, is measured according to ASTM C965-96.

The term "melting point," as used herein, refers to the temperature at which the viscosity of the glass composition is 200 poise.

The term "softening point," as used herein, refers to the temperature at which the viscosity of the glass composition is $1\times10^{7.6}$ poise. The softening point is measured according to the parallel plate viscosity method which measures the viscosity of inorganic glass from 107 to 109 poise as a function of temperature, similar to ASTM C1351M.

The term "annealing point" as used herein, refer to the temperature at which the viscosity of the glass composition is $1\times10^{13.18}$ poise.

The term "strain point," as used herein, refers to the temperature at which the viscosity of the glass composition is $1\times10^{14.68}$ poise.

The term "coefficient of thermal expansion" and "CTE," as described herein, is measured in accordance with ASTM E228-85 over the temperature range of 25° C. to 300° C. and is expressed in terms of "$\times10^{-7}$/° ° C." as an average over the temperature range.

The term "liquidus viscosity," as used herein, refers to the viscosity of the glass composition at the onset of devitrification (i.e., at the liquidus temperature as determined with the gradient furnace method according to ASTM C829-81).

The term "liquidus temperature," as used herein, refers to the temperature at which the glass composition begins to devitrify as determined with the gradient furnace method according to ASTM C829-81.

Surface compressive stress is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass article. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The term "depth of compression" (DOC), as used herein, refers to the position in the article where compressive stress transitions to tensile stress.

Transmittance data (total transmittance and diffuse transmittance) in the visible spectrum is measured with a Lambda 950 UV/Vis/NIR Spectrophotometer manufactured by PerkinElmer Inc. (Waltham, Massachusetts USA). The Lambda 950 apparatus was fitted with a 150 mm integrating sphere. Data was collected using an open beam baseline and a Spectralon R reference reflectance disk. For total transmittance (Total Tx), the sample is fixed at the integrating sphere entry point.

The term "average transmittance," as used herein with respect to the visible spectrum, refers to the average of transmittance measurements made within a given wavelength range with each whole numbered wavelength weighted equally. In embodiments described herein, the "average transmittance" with respect to the visible spectrum is reported over the wavelength range from 380 nm to 750 nm (inclusive of endpoints). Unless otherwise specified, the average transmittance is indicated for article thicknesses from 0.4 mm to 5 mm, inclusive of endpoints. Unless otherwise specified, when average transmittance is indicated, this means that each thickness within the range of thicknesses from 0.4 mm to 5 mm has an average transmittance as specified. For example, colored glass articles having average transmittances of 10% to 92% over the wavelength range from 380 nm to 750 nm means that each thickness within the range of 0.4 mm to 5 mm (e.g., 0.6 mm, 0.9 mm, 2 mm, etc.) has an average transmittance in the range of 10% to 92% for the wavelength range from 380 nm to 750 nm.

The term "CIELAB color space," as used herein, refers to a color space defined by the International Commission on Illumination (CIE) in 1976. It expresses color as three values: L* for the lightness from black (0) to white (100), a* from green (−) to red (+), and b* from blue (−) to yellow (+). Unless otherwise specified, the L*, a*, and b* values are indicated for article thicknesses of 0.4 mm to 5 mm (inclusive of endpoints) in the thickness direction of the sample under F2 illumination and a 10° standard observer angle. Unless otherwise specified, this means that each thickness within the range of thicknesses has L*, a*, and b* coordinates falling within the specified range(s) for L*, a*, and b* coordinates. For example, a colored glass article having an L* value within the range from 55 to 96.5 means that each thickness within the range of 0.4 mm to 5 mm (e.g., 0.6 mm, 0.9 mm, 2 mm, etc.) has an L* in the range of 55 to 96.5.

The term "color gamut," as used herein, refers to the pallet of colors that may be achieved by the colored glass articles within the CIELAB color space.

The "optical transmission spectra," described herein, were obtained using an Agilent Cary 60 spectrophotometer with a scan range of 250 nm to 800 nm, a scan step of 2 nm, a signal average of 0.5 s, and a spot size of 2 mm. The optical transmission data obtained were used to plot coordinates in the CIELAB color space as described in R. S. Berns, *Billmeyer and Saltzman's Principles of Color Technology*, 3rd. Ed., John Wiley & Sons, New York (2000).

The term "projected color gamut," as used herein, refers to the line, surface, volume, or overlapping volume occupied by the colored glass article within the three-dimensional CIELAB color space and represents the pallet of colors that may be achieved by the colored glass articles within the CIELAB color space based upon the concentration of colorant(s) present in the colored glass article. The projected color gamuts shown herein were produced using the plotting routine Gnuplot Version 5.4. Specifically, Gnuplot was used to display projections of the CIELAB color coordinates for the transmitted colors under F2 illumination for the CIE 1976 10° Standard Observer. The transmittance spectrum through a flat sheet of glass is given by the following expression:

$$T(\lambda)=\frac{[1-R(\lambda)]^2\times\exp\left[-\sum_i N_i\sigma_i(\lambda)t\right]}{1-R(\lambda)^2\times\exp\left[-2\sum_i N_i\sigma_i(\lambda)t\right]},$$

where R is the Fresnel intensity reflection coefficient of the glass, $N_i$ and $\sigma_i$ represent the number density and absorption cross section, respectively, for the individual dopants, A is the optical wavelength, and t is the thickness of the glass. The color coordinates were calculated from the transmittance spectra through 1.5 mm of the colored glass article. The expression for the transmittance was evaluated by varying the dopant concentrations ($N_i$) for the combinations of the colorants from 0 to a maximum value. As described herein, the maximum values for $Cr_2O_3$, NiO, CuO, and $Co_3O_4$ were set to 2 mol %, 4 mol %, 20 mol %, and 2 mol %, respectively for purposes of determining the projected color gamut.

The dielectric constant of the colored glass articles may be measured using a split post dielectric resonator (SPDR), as is known in the art, at a frequency of 10 GHz. The dielectric constant was measured on samples of the colored glass article having a length of 3 inches (76.2 mm), a width of 3 inches (76.2 mm), and a thickness of less than 0.9 mm.

The dielectric constant of the colored glass articles may also be measured over a range of frequencies from 10 GHz to 60 GHz using a double concave reflecting mirror Fabry-Perot open resonator, as is known in the art. The dielectric constant can be measured at different frequencies by adjusting the mirror spacing in the open resonator. The dielectric constant may be measured on samples of the colored glass article having a length of 120 mm, a width of 120 mm, and a thickness of 2 mm or less. While not wishing to be bound by theory, it is believed that the dielectric constant of the colored glass articles measured at 10 GHz approximates the dielectric constant at each frequency in the range from 10 GHz to 60 GHz.

The dielectric constant Dk of the colored glass article may be calculated according to the equation:

$$Dk=3.802946+0.01747*B_2O_3(\text{mol }\%)+0.058769*Al_2O_3(\text{mol }\%)+0.080876*Li_2O(\text{mol }\%)+0.148433*Na_2O(\text{mol }\%)+0.153264*K_2O(\text{mol }\%)+0.045179*MgO(\text{mol }\%)+0.080113*CaO(\text{mol }\%).$$

Colorants have been added to conventional aluminosilicate glass compositions to achieve glass articles having a desired color. However, such glass articles may not have the desired mechanical or electrical properties suitable for some end user applications. For example, glasses used in the housings of consumer electronic devices may require robust mechanical properties to withstand the rigors of day-to-day use and/or dielectric properties to allow for reception of wireless signals by the device.

Moreover, it may be desirable to have colored glass articles having mechanical and dielectric properties such that the glass article is suitable for use with consumer electronic devices while also providing the same colored glass articles in a range of different colors. However, simply including colorants in aluminosilicate glass compositions may not produce the desired color. For example, some colorants may have relatively low vaporization temperatures and may vaporize and diffuse out of the glass during manufacturing. The relatively low retention of the colorant limits the color gamut that may be achieved.

Disclosed herein are glass compositions and colored glass articles formed therefrom having superior ion-exchange performance. The colored glass articles also have dielectric properties, such as dielectric constants, such that the glass articles are suitable for use as enclosures for consumer electronic devices such as smart phones, tablets, and computers. The use of various colorants and combinations of colorants expands the color gamut that may be achieved in the resultant colored glass articles The glass compositions and colored glass articles described herein may be described as aluminoborosilicate glass compositions and colored glass articles and comprise $SiO_2$, $Al_2O_3$, and $B_2O_3$. In addition to $SiO_2$, $Al_2O_3$, and $B_2O_3$, the glass compositions and colored glass articles described herein include one or more colorants in a colorant package to impart a desired color to the resultant colored glass article. The glass compositions and colored glass articles described herein also include alkali oxides, such as $Li_2O$ and $Na_2O$, to enable the ion-exchangeability of the colored glass articles. In embodiments, the glass compositions and colored glass articles described herein may further include other components to improve colorant retention and produce colored glass articles having the desired color. In embodiments, the difference between $R_2O$ and $Al_2O_3$ (i.e. $R_2O$ (mol %)-$Al_2O_3$ (mol %)) in the glass compositions and resultant colored glass articles described herein may be adjusted to produce a desired observable color (e.g., pink, purple, red, orange, or blue). In embodiments, the viscosity of the glass composition may be adjusted to prevent devitrification of the glass composition.

$SiO_2$ is the primary glass former in the glass compositions described herein and may function to stabilize the network structure of the colored glass articles. The concentration of $SiO_2$ in the glass compositions and resultant colored glass articles should be sufficiently high (e.g., greater than or equal to 40 mol %) to enhance the chemical durability of the glass composition and, in particular, the resistance of the glass composition to degradation upon exposure to acidic solutions, basic solutions, and in water. The amount of $SiO_2$ may be limited (e.g., to less than or equal to 80 mol %) to control the melting point of the glass composition, as the melting point of pure $SiO_2$ or high $SiO_2$ glasses is undesirably high. Thus, limiting the concentration of $SiO_2$ may aid in improving the meltability and the formability of the resultant colored glass article.

In embodiments, the glass composition and the resultant colored glass article may comprise greater than or equal to 40 mol % and less than or equal to 80 mol % $SiO_2$ or even 50 mol % and less than or equal to 80 mol % $SiO_2$. In embodiments, the glass composition and the resultant colored glass article may comprise greater than or equal to 45 mol % and less than or equal to 67 mol % $SiO_2$ or even greater than or equal to 53 mol % and less than or equal to 67 mol % $SiO_2$. In embodiments, the concentration of $SiO_2$ in the glass composition and the resultant colored glass article may be greater than or equal to 40 mol %, greater than or equal to 45 mol %, greater than or equal to 50 mol %, greater than or equal to 52 mol %, greater than or equal to 53 mol %, greater than or equal to 54 mol %, greater than or equal to 55 mol %, greater than or equal to 56 mol %, greater than or equal to 57 mol %, greater than or equal to 58 mol %, or even greater than or equal to 60 mol %. In embodiments, the concentration of $SiO_2$ in the glass composition and the colored resultant glass article may be less than or equal to 80 mol %, less than or equal to 75 mol %, less than or equal to 73 mol %, less than or equal to 71 mol %, less than or equal to 70 mol %, less than or equal to 68 mol %, less than or equal to 67 mol %, less than or equal to 66 mol %, less than or equal to 65 mol %, less than or equal to 64 mol %, less than or equal to 63 mol %, less than or equal to 62 mol %, less than or equal to 61 mol %, less than or equal to 60 mol %, or even less than or equal to 59 mol %. In embodiments, the concentration of $SiO_2$ in the glass composition and the resultant colored glass article may be greater than or equal to 40 mol % and less than or equal to 70 mol %, greater than or equal to 40 mol % and less than or equal to 67 mol %, greater than or equal to 40 mol % and less than or equal to 65 mol % greater than or equal to 40 mol % and less than or equal to 63 mol %, greater than or equal to 40 mol % and less than or equal to 62 mol %, greater than or equal to 40 mol % and less than or equal to 61 mol %, greater than or equal to 40 mol % and less than or equal to 60 mol %, greater than or equal to 45 mol % and less than or equal to 70 mol %, greater than or equal to 45 mol % and less than or equal to 67 mol %, greater than or equal to 45 mol % and less than or equal to 65 mol % greater than or equal to 45 mol % and less than or equal to 63 mol %, greater than or equal to 45 mol % and less than or equal to 62 mol %, greater than or equal to 45 mol % and less than or equal to 61 mol %, greater than or equal to 45 mol % and less than or equal to 60 mol %, greater than or equal to 50 mol % and less than or equal to 70 mol %, greater than or equal to 50 mol % and less than or equal to 67 mol %, greater than or equal to 50 mol % and less than or equal to 65 mol %, greater than or equal to 50 mol % and less than or equal to 63 mol %, greater than or equal to 50 mol % and less than or equal to 62 mol %, greater than or equal to 50 mol % and less than or equal to 61 mol %, greater than or equal to 50 mol % and less than or equal to 60 mol %, greater than or equal to 50 mol % and less than or equal to 59 mol %, greater than or equal to 53 mol % and less than or equal to 70 mol %, greater than or equal to 53 mol % and less than or equal to 67 mol %, greater than or equal to 53 mol % and less than or equal to 65 mol % greater than or equal to 53 mol % and less than or equal to 63 mol %, greater than or equal to 53 mol % and less than or equal to 62 mol %, greater than or equal to 53 mol % and less than or equal to 61 mol %, greater than or equal to 53 mol % and less than or equal to 60 mol %, greater than or equal to 53 mol % and less than or equal to 59 mol %, greater than or equal to 55 mol % and less than or equal to 70 mol %, greater than or equal to 55 mol % and less than or equal to 67 mol %, greater than or equal to 55 mol % and less than or equal to 65 mol % greater than or equal to 55 mol % and less than or equal to 63 mol %, greater than or equal to 55 mol % and less than or equal to 62 mol %, greater than or equal to 55 mol % and less than or equal to 61 mol %, greater than or equal to 55 mol % and less than or equal to 60 mol %, greater than or equal to 55 mol % and less than or equal to 59 mol %, greater than or equal to 56 mol % and less than or equal to 70 mol %, greater than or equal to 56 mol % and less than or equal to 67 mol %, greater than or equal to 56 mol % and less than or equal to 65 mol % greater than or equal to 56 mol % and less than or equal to 63 mol %, greater than or equal to 56 mol % and less than or equal to 62 mol %, greater than or equal to 56 mol % and less than or equal to 61 mol %, greater than or equal to 56 mol % and less than or equal to 60 mol %, greater than or equal to 56 mol % and less than or equal to 59 mol %, greater than or equal to 57 mol % and less than or equal to 70 mol %, greater than or equal to 57 mol % and less than or equal to 67 mol %, greater than or equal to 57 mol % and less than or equal to 65 mol % greater than or equal to 57 mol % and less than or equal to 63 mol %, greater than or equal to 57 mol % and less than or equal to 62 mol %, greater than or equal to 57 mol % and less than or equal to 61 mol %, greater than or equal to 57 mol % and less than or equal to 60 mol %, or even greater than or equal to 57 mol % and less than or equal to 59 mol %, or any and all sub-ranges formed from any of these endpoints. In embodiments, the concentration of $SiO_2$ in the glass composition and the resultant colored glass article may be greater than or equal to 50 mol % and less than or equal to 80 mol %, greater than or equal to 50 mol % and less than or equal to 75 mol %, greater than or equal to 50 mol % and less than or equal to 73 mol %, greater than or equal to 50 mol % and less than or equal to 71 mol %, greater than or equal to 50 mol % and less than or equal to 69 mol %, greater than or equal to 52 mol % and less than or equal to 80 mol %, greater than or equal to 52 mol % and less than or equal to 75 mol %, greater than or equal to 52 mol % and less than or equal to 73 mol %, greater than or equal to 52 mol % and less than or equal to 71 mol %, greater than or equal to 52 mol % and less than or equal to 69 mol %, greater than or equal to 54 mol % and less than or equal to 80 mol %, greater than or equal to 54 mol % and less than or equal to 75 mol %, greater than or equal to 54 mol % and less than or equal to 73 mol %, greater than or equal to 54 mol % and less than or equal to 71 mol %, greater than or equal to 54 mol % and less than or equal to 69 mol %, greater than or equal to 56 mol % and less than or equal to 80 mol %, greater than or equal to 56 mol % and less than or equal to 75 mol %, greater than or equal to 56 mol % and less than or equal to 73 mol %, greater than or equal to 56 mol % and less than or equal to 71 mol %, greater than or equal to 56 mol % and less than or equal to 69 mol %, greater than or equal to 58 mol % and less than or equal to 80 mol %, greater than or equal to 58 mol % and less than or equal to 75 mol %, greater than or equal to 58 mol % and less than or equal to 73 mol %, greater than or equal to 58 mol % and less than or equal to 71 mol %, greater than or equal to 58 mol % and less than or equal to 69 mol %, greater than or equal to 50 mol % and less than or equal to 80 mol %, greater than or equal to 60 mol % and less than or equal to 75 mol %, greater than or equal to 60 mol % and less than or equal to 73 mol %, greater than or equal to 60 mol % and less than or equal to 71 mol %, or even greater than or equal to 60 mol % and less than or equal to 69 mol %, or any and all sub-ranges formed from any of these endpoints. In embodiments, the concentration of $SiO_2$ in the glass composition and the resultant colored glass article may be greater than or equal to 52 mol % and less than or equal to 70 mol %, greater than or equal to 52 mol % and less than or equal to 68 mol %, greater than or equal to 52 mol % and less than or equal to 66 mol %, greater than or equal to 52 mol % and less than or equal to 65 mol %, greater than or equal to 52 mol % and less than or equal to 64 mol %, greater than or equal to 53 mol % and less than or equal to 70 mol %, greater than or equal to 53 mol % and less than or equal to 68 mol %, greater than or equal to 53 mol % and less than or equal to 66 mol %, greater than or equal to 53 mol % and less than or equal to 65 mol %, or greater than or equal to 53 mol % and less than or equal to 64 mol %, greater than or equal to 54 mol % and less than or equal to 70 mol %, greater than or equal to 54 mol % and less than or equal to 68 mol %, greater than or equal to 54 mol % and less than or equal to 66 mol %, greater than or equal to 54 mol % and less than or equal to 65 mol %, or greater than or equal to 54 mol % and less than or equal to 64 mol %, or any and all sub-ranges formed from these endpoints.

Like $SiO_2$, $Al_2O_3$ may also stabilize the glass network and additionally provides improved mechanical properties and chemical durability to the glass composition and the resultant colored glass article. The amount of $Al_2O_3$ may also be tailored to control the viscosity of the glass composition. $Al_2O_3$ may be included such that the resultant glass composition has the desired fracture toughness (e.g., greater than or equal to 0.7 $MPa \cdot m^{1/2}$). However, if the amount of $Al_2O_3$ is too high (e.g., greater than 25 mol %), the viscosity of the glass melt may increase, thereby diminishing the formability of the colored glass article. In embodiments, if the amount of $Al_2O_3$ is too high, the solubility of one or more colorants of the colorant package in the glass melt may decrease, resulting in the formation of undesirable crystal phases in the glass. For example and without limitation, when the colorant package includes $Cr_2O_3$, the solubility of $Cr_2O_3$ in the glass melt may decrease with increasing $Al_2O_3$ concentrations (e.g., concentrations greater than or equal to 17.5 mol %), leading to the precipitation of undesirable crystal phases. Without wishing to be bound by theory, it is hypothesized that similar behavior may occur with colorants other than $Cr_2O_3$.

Accordingly, in embodiments, the glass composition and the resultant colored glass article may comprise greater than or equal to 7 mol % and less than or equal to 25 mol % $Al_2O_3$, greater than or equal to 7 mol % and less than or equal to 20 mol % $Al_2O_3$, or even greater than or equal to 8 mol % and less than or equal to 20 mol % $Al_2O_3$. In embodiments, the glass composition and the resultant colored glass article may comprise greater than or equal to 10 mol % and less than or equal to 20 mol % $Al_2O_3$, greater than or equal to 10 mol % and less than or equal to 17.5 mol % $Al_2O_3$, or even greater than or equal to 12 mol % and less than or equal to 17.25 mol % $Al_2O_3$. In embodiments, the glass composition and the resultant colored glass article may comprise greater than or equal to 11 mol % and less than or equal to 19 mol % $Al_2O_3$ or greater than or equal to 14 mol % and less than or equal to 17 mol % $Al_2O_3$. In embodiments, the concentration of $Al_2O_3$ in the glass composition and the resultant colored glass article may be greater than or equal to 7 mol %, greater than or equal to 8 mol %, greater than or equal to 9 mol %, greater than or equal to 10 mol %, greater than or equal to 11 mol %, greater than or equal to 12 mol %, greater than or equal to 12.5 mol %, greater than or equal to 13 mol %, greater than or equal to 13.5 mol %, greater than or equal to 14 mol %, greater than or equal to 14.5 mol %, greater than or equal to 15 mol %, greater than or equal to 15.5 mol %, or even greater than or equal to 16 mol %. In embodiments, the concentration of $Al_2O_3$ in the glass composition and the resultant colored glass article may be less than or equal to 25 mol %, less than or equal to 23 mol %, less than or equal to 20 mol %, less than or equal to 19 mol %, less than or equal to 18 mol %, less than or equal to 17.5 mol %, less than or equal to 17.25 mol %, less than or equal to 17 mol %, less than or equal to 16.75 mol %, or even less than or equal to 16 mol %. In embodiments, the concentration of $Al_2O_3$ in the glass composition and the resultant colored glass article may be greater than or equal to 8 mol % and less than or equal to 20 mol %, greater than or equal to 8 mol % and less than or equal to 18 mol % greater than or equal to 8 mol % and less than or equal to 17.5 mol %, greater than or equal to 8 mol % and less than or equal to 17 mol %, greater than or equal to 10 mol % and less than or equal to 20 mol %, greater than or equal to 10 mol % and less than or equal to 18 mol % greater than or equal to 10 mol % and less than or equal to 17.5 mol %, greater than or equal to 10 mol % and less than or equal to 17 mol %, greater than or equal to 12 mol % and less than or equal to 20 mol %, greater than or equal to 12 mol % and less than or equal to 18 mol % greater than or equal to 12 mol % and less than or equal to 17.5 mol %, greater than or equal to 12 mol % and less than or equal to 17 mol %, greater than or equal to 12.5 mol % and less than or equal to 20 mol %, greater than or equal to 12.5 mol % and less than or equal to 18 mol % greater than or equal to 12.5 mol % and less than or equal to 17.5 mol %, greater than or equal to 12.5 mol % and less than or equal to 17 mol %, greater than or equal to 13 mol % and less than or equal to 20 mol %, greater than or equal to 13 mol % and less than or equal to 18 mol % greater than or equal to 13 mol % and less than or equal to 17.5 mol %, greater than or equal to 13 mol % and less than or equal to 17 mol %, greater than or equal to 13.5 mol % and less than or equal to 20 mol %, greater than or equal to 13.5 mol % and less than or equal to 18 mol % greater than or equal to 13.5 mol % and less than or equal to 17.5 mol %, greater than or equal to 13.5 mol % and less than or equal to 17 mol %, greater than or equal to 14 mol % and less than or equal to 20 mol %, greater than or equal to 14 mol % and less than or equal to 18 mol % greater than or equal to 14 mol % and less than or equal to 17.5 mol %, or even greater than or equal to 14 mol % and less than or equal to 17 mol %, or any and all sub-ranges formed from any of these endpoints. In embodiments, the concentration of $Al_2O_3$ in the glass composition and the resultant colored glass article may be greater than or equal to 7 mol % and less than or equal to 25 mol %, greater than or equal to 7 mol % and less than or equal to 23 mol %, greater than or equal to 7 mol % and less than or equal to 20 mol %, greater than or equal to 7 mol % and less than or equal to 17 mol %, greater than or equal to 9 mol % and less than or equal to 25 mol %, greater than or equal to 9 mol % and less than or equal to 23 mol %, greater than or equal to 9 mol % and less than or equal to 20 mol %, greater than or equal to 9 mol % and less than or equal to 17 mol %, greater than or equal to 11 mol % and less than or equal to 25 mol %, greater than or equal to 11 mol % and less than or equal to 23 mol %, greater than or equal to 11 mol % and less than or equal to 20 mol %, greater than or equal to 11 mol % and less than or equal to 17 mol %, greater than or equal to 13 mol % and less than or equal to 25 mol %, greater than or equal to 13 mol % and less than or equal to 23 mol %, greater than or equal to 13 mol % and less than or equal to 20 mol %, greater than or equal to 13 mol % and less than or equal to 17 mol %, or any and all sub-ranges formed from any of these endpoints. In embodiments, the concentration of $Al_2O_3$ in the glass composition and the resultant colored glass article may be greater than or equal to 10 mol % and less than or equal to 17.5 mol %, greater than or equal to 10 mol % and less than or equal to 17.25 mol %, greater than or equal to 10 mol % and less than or equal to 17 mol %, greater than or equal to 10 mol % and less than or equal to 16.75 mol %, greater than or equal to 12 mol % and less than or equal to 17.5 mol %, greater than or equal to 12 mol % and less than or equal to 17.25 mol %, greater than or equal to 12 mol % and less than or equal to 17 mol %, greater than or equal to 12 mol % and less than or equal to 16.75 mol %, greater than or equal to 14 mol % and less than or equal to 17.5 mol %, greater than or equal to 14 mol % and less than or equal to 17.25 mol %, greater than or equal to 14 mol % and less than or equal to 17 mol %, greater than or equal to 14 mol % and less than or equal to 16.75 mol %, greater than or equal to 14.5 mol % and less than or equal to 17.5 mol %, greater than or equal to 14.5 mol % and less than or equal to 17.25 mol %, greater than or equal to 14.5 mol % and less than or equal to 17 mol %, greater than or equal to 14.5 mol % and less than or equal to 16.75 mol %, greater than or equal to 15 mol % and less than or equal to 17.5 mol %, greater than or equal to 15 mol % and less than or equal to 17.25 mol %, greater than or equal to 15 mol % and less than or equal to 17 mol %, greater than or equal to 15 mol % and less than or equal to 16.75 mol %, greater than or equal to 15.5 mol % and less than or equal to 17.5 mol %, greater than or equal to 15.5 mol % and less than or equal to 17.25 mol %, greater than or equal to 15.5 mol % and less than or equal to 17 mol %, greater than or equal to 15.5 mol % and less than or equal to 16.75 mol %, greater than or equal to 16 mol % and less than or equal to 17.5 mol %, greater than or equal to 16 mol % and less than or equal to 17.25 mol %, greater than or equal to 16 mol % and less than or equal to 17 mol %, or even greater than or equal to 16 mol % and less than or equal to 16.75 mol %, or any and all sub-ranges formed from any of these endpoints. In embodiments, the concentration of $Al_2O_3$ in the glass composition and the resultant colored glass article may be greater than or equal to 10 mol % and less than or equal to 20 mol %, greater than or equal to 10 mol % and less than or equal to 19 mol %, greater than or equal to 10 mol % and less than or equal to 18 mol %, greater than or equal to 10 mol % and less than or equal to 17 mol %, greater than or equal to 10 mol % and less than or equal to 16 mol %, greater than or equal to 11 mol % and less than or equal to 20 mol %, greater than or equal to 11 mol % and less than or equal to 19 mol %, greater than or equal to 11 mol % and less than or equal to 18 mol %, greater than or equal to 11 mol % and less than or equal to 17 mol %, greater than or equal to 11 mol % and less than or equal to 16 mol %, greater than or equal to 12 mol % and less than or equal to 20 mol %, greater than or equal to 12 mol % and less than or equal to 19 mol %, greater than or equal to 12 mol % and less than or equal to 18 mol %, greater than or equal to 12 mol % and less than or equal to 17 mol %, greater than or equal to 12 mol % and less than or equal to 16 mol %, greater than or equal to 13 mol % and less than or equal to 20 mol %, greater than or equal to 13 mol % and less than or equal to 19 mol %, greater than or equal to 13 mol % and less than or equal to 18 mol %, greater than or equal to 13 mol % and less than or equal to 17 mol %, greater than or equal to 13 mol % and less than or equal to 16 mol %, greater than or equal to 14 mol % and less than or equal to 20 mol %, greater than or equal to 14 mol % and less than or equal to 19 mol %, greater than or equal to 14 mol % and less than or equal to 18 mol %, greater than or equal to 14 mol % and less than or equal to 17 mol %, greater than or equal to 14 mol % and less than or equal to 16 mol %, or any and all sub-ranges formed from any of these endpoints.

$B_2O_3$ decreases the melting point of the glass composition, which may improve retention of certain colorants in the glass, such as, for example and without limitation, Au. Without wishing to be bound by theory, itis hypothesized that similar behavior may occur with colorants other than Au. $B_2O_3$ may also improve the damage resistance of the resultant colored glass article. In addition, $B_2O_3$ may be added to reduce the formation of non-bridging oxygen, the presence of which may reduce fracture toughness. The concentration of $B_2O_3$ should be sufficiently high (e.g., greater than or equal to 1 mol %) to reduce the melting point of the glass composition, improve the formability, and increase the fracture toughness of the colored glass article. However, if $B_2O_3$ is too high (e.g., greater than 15 mol %), the annealing point and strain point may decrease, which increases stress relaxation and reduces the overall strength of the colored glass article.

In embodiments, the glass composition and the resultant colored glass article may comprise greater than or equal to 1 mol % and less than or equal to 15 mol % $B_2O_3$, greater than or equal to 1 mol % and less than or equal to 10 mol % $B_2O_3$, greater than or equal to 3 mol % and less than or equal to 10 mol % $B_2O_3$, greater than or equal to 3.5 mol % and less than or equal to 9 mol % $B_2O_3$. In embodiments, the glass composition and the resultant colored glass article may comprise greater than or equal to 2 mol % and less than or equal to 12 mol % $B_2O_3$ or even greater than or equal to 2 mol % and less than or equal to 8 mol % $B_2O_3$. In embodiments, the concentration of $B_2O_3$ in the glass composition and the resultant colored glass article may be greater than or equal to 1 mol %, greater than or equal to 2 mol %, greater than or equal to 3 mol %, greater than or equal to 3.5 mol %, greater than or equal to 4 mol %, greater than or equal to 4.5 mol %, greater than or equal to 5 mol %, or even greater than or equal to 5.5 mol %. In embodiments, the concentration of $B_2O_3$ in the glass composition and the resultant colored glass article may be less than or equal to 15 mol %, less than or equal to 12 mol %, less than or equal to 10 mol %, less than or equal to 9 mol %, less than or equal to 8 mol %, less than or equal to 7.5 mol %, less than or equal to 7 mol %, less than or equal to 6.5 mol %, or even less than or equal to 6 mol %. In embodiments, the concentration of $B_2O_3$ in the glass composition and the resultant colored glass article may be greater than or equal to 1 mol % and less than or equal to 15 mol %, greater than or equal to 1 mol % and less than or equal to 12 mol %, greater than or equal to 1 mol % and less than or equal to 10 mol %, greater than or equal to 1 mol % and less than or equal to 9 mol %, greater than or equal to 1 mol % and less than or equal to 8 mol %, greater than or equal to 1 mol % and less than or equal to 7.5 mol %, greater than or equal to 1 mol % and less than or equal to 7 mol %, greater than or equal to 1 mol % and less than or equal to 6.5 mol %, greater than or equal to 1 mol % and less than or equal to 6 mol %, greater than or equal to 2 mol % and less than or equal to 15 mol %, greater than or equal to 2 mol % and less than or equal to 12 mol %, greater than or equal to 2 mol % and less than or equal to 10 mol %, greater than or equal to 2 mol % and less than or equal to 9 mol %, greater than or equal to 2 mol % and less than or equal to 8 mol %, greater than or equal to 2 mol % and less than or equal to 7.5 mol %, greater than or equal to 2 mol % and less than or equal to 7 mol %, greater than or equal to 2 mol % and less than or equal to 6.5 mol %, greater than or equal to 2 mol % and less than or equal to 6 mol %, greater than or equal to 3 mol % and less than or equal to 15 mol %, greater than or equal to 3 mol % and less than or equal to 12 mol %, greater than or equal to 3 mol % and less than or equal to 10 mol %, greater than or equal to 3 mol % and less than or equal to 9 mol %, greater than or equal to 3 mol % and less than or equal to 8 mol %, greater than or equal to 3 mol % and less than or equal to 7.5 mol %, greater than or equal to 3 mol % and less than or equal to 7 mol %, greater than or equal to 3 mol % and less than or equal to 6.5 mol %, greater than or equal to 3 mol % and less than or equal to 6 mol %, greater than or equal to 3.5 mol % and less than or equal to 15 mol %, greater than or equal to 3.5 mol % and less than or equal to 12 mol %, greater than or equal to 3.5 mol % and less than or equal to 10 mol %, greater than or equal to 3.5 mol % and less than or equal to 9 mol %, greater than or equal to 3.5 mol % and less than or equal to 8 mol %, greater than or equal to 3.5 mol % and less than or equal to 7.5 mol %, greater than or equal to 3.5 mol % and less than or equal to 7 mol %, greater than or equal to 3.5 mol % and less than or equal to 6.5 mol %, greater than or equal to 3.5 mol % and less than or equal to 6 mol %, greater than or equal to 4 mol % and less than or equal to 15 mol %, greater than or equal to 4 mol % and less than or equal to 12 mol %, greater than or equal to 4 mol % and less than or equal to 10 mol %, greater than or equal to 4 mol % and less than or equal to 9 mol %, greater than or equal to 4 mol % and less than or equal to 8 mol %, greater than or equal to 4 mol % and less than or equal to 7.5 mol %, greater than or equal to 4 mol % and less than or equal to 7 mol %, greater than or equal to 4 mol % and less than or equal to 6.5 mol %, greater than or equal to 4 mol % and less than or equal to 6 mol %, greater than or equal to 4.5 mol % and less than or equal to 10 mol %, greater than or equal to 4.5 mol % and less than or equal to 9 mol %, greater than or equal to 4.5 mol % and less than or equal to 8 mol %, greater than or equal to 4.5 mol % and less than or equal to 7.5 mol %, greater than or equal to 4.5 mol % and less than or equal to 7 mol %, greater than or equal to 4.5 mol % and less than or equal to 6.5 mol %, greater than or equal to 5 mol % and less than or equal to 10 mol %, greater than or equal to 5 mol % and less than or equal to 9 mol %, greater than or equal to 5 mol % and less than or equal to 8 mol %, greater than or equal to 5 mol % and less than or equal to 7.5 mol %, greater than or equal to 5 mol % and less than or equal to 7 mol %, greater than or equal to 5 mol % and less than or equal to 6.5 mol %, greater than or equal to 5.5 mol % and less than or equal to 10 mol %, greater than or equal to 5.5 mol % and less than or equal to 9 mol %, greater than or equal to 5.5 mol % and less than or equal to 8 mol %, greater than or equal to 5.5 mol % and less than or equal to 7.5 mol %, greater than or equal to 5.5 mol % and less than or equal to 7 mol %, or even greater than or equal to 5.5 mol % and less than or equal to 6.5 mol %, or any and all sub-ranges formed from any of these endpoints.

As described hereinabove, the glass compositions and the resultant colored glass articles may contain alkali oxides, such as $Li_2O$, $Na_2O$, and $K_2O$, to enable the ion-exchangeability of the colored glass articles.

$Li_2O$ aids in the ion-exchangeability of the colored glass article and also reduces the softening point of the glass composition, thereby increasing the formability of the colored glass articles. The addition of $Li_2O$ facilitates the exchange of both $Na^+$ and $K^+$ cations into the glass for strengthening the glass and also facilitates producing a relatively high surface compressive stress and relatively deep depth of compression, improving the mechanical characteristics of the resultant colored glass article. In addition, $Li_2O$ decreases the melting point of the glass composition, which may improve retention of colorants in the glass, such as, for example and without limitation, Au. Without wishing to be bound by theory, it is hypothesized that similar behavior may occur with colorants other than Au. The concentration of $Li_2O$ in the glass compositions and resultant colored glass articles should be sufficiently high (e.g., greater than or equal to 1 mol %) to reduce the melting point of the glass composition and achieve the desired maximum central tension (e.g., greater than or equal to 40 MPa) following ion exchange. However, if the amount of $Li_2O$ is too high (e.g., greater than 20 mol %), the liquidus temperature may increase, thereby diminishing the manufacturability of the colored glass article.

In embodiments, the glass composition and the resultant colored glass article may comprise greater than or equal to 1 mol % and less than or equal to 20 mol % $Li_2O$ or even greater than or equal to 1 mol % and less than or equal to 18 mol % $Li_2O$. In embodiments, the glass composition and the resultant colored glass article may comprise greater than or equal to 3 mol % and less than or equal to 18 mol % $Li_2O$, greater than or equal to 7 mol % and less than or equal to 18 mol % $Li_2O$, greater than or equal to 8.8 mol % and less than or equal to 14 mol % $Li_2O$, or even greater than or equal to 9 mol % and less than or equal to 13.5 mol % $Li_2O$. In embodiments, the concentration of $Li_2O$ in the glass composition and the resultant colored glass article may be greater than or equal to 1 mol %, greater than or equal to 3 mol %, greater than or equal to 5 mol %, greater than or equal to 7 mol %, greater than or equal to 7.5 mol %, greater than or equal to 8 mol %, greater than or equal to 8.5 mol %, greater than or equal to 8.8 mol %, greater than or equal to 9 mol %, greater than or equal to 9.2 mol %, greater than or equal to 9.4 mol %, greater than or equal to 9.6 mol %, greater than or equal to 9.8 mol %, greater than or equal to 10 mol %, greater than or equal to 11 mol %, greater than or equal to 11.5 mol %, or even greater than or equal to 12 mol %. In embodiments, the concentration of $Li_2O$ in the glass composition and the resultant colored glass article may be less than or equal to 20 mol %, less than or equal to 18 mol %, less than or equal to 17 mol %, less than or equal to 16 mol %, less than or equal to 15 mol %, less than or equal to 14 mol %, less than or equal to 13.5 mol %, less than or equal to 13 mol %, less than or equal to 12.5 mol %, less than or equal to 12 mol %, less than or equal to 11.5 mol %, or even less than or equal to 11 mol %. In embodiments, the concentration of $Li_2O$ in the glass composition and the resultant colored glass article may be greater than or equal to 1 mol % and less than or equal to 20 mol %, greater than or equal to 1 mol % and less than or equal to 18 mol %, greater than or equal to 1 mol % and less than or equal to 16 mol %, greater than or equal to 1 mol % and less than or equal to 14 mol %, greater than or equal to 1 mol % and less than or equal to 12.5 mol %, greater than or equal to 1 mol % and less than or equal to 12 mol %, greater than or equal to 1 mol % and less than or equal 11.5 mol %, greater than or equal to 1 mol % and less than or equal to 11 mol %, greater than or equal to 3 mol % and less than or equal to 20 mol %, greater than or equal to 3 mol % and less than or equal to 18 mol %, greater than or equal to 3 mol % and less than or equal to 16 mol %, greater than or equal to 3 mol % and less than or equal to 14 mol %, greater than or equal to 3 mol % and less than or equal to 12.5 mol %, greater than or equal to 3 mol % and less than or equal to 12 mol %, greater than or equal to 3 mol % and less than or equal 11.5 mol %, greater than or equal to 3 mol % and less than or equal to 11 mol %, greater than or equal to 5 mol % and less than or equal to 20 mol %, greater than or equal to 5 mol % and less than or equal to 18 mol %, greater than or equal to 5 mol % and less than or equal to 16 mol %, greater than or equal to 5 mol % and less than or equal to 14 mol %, greater than or equal to 5 mol % and less than or equal to 12.5 mol %, greater than or equal to 5 mol % and less than or equal to 12 mol %, greater than or equal to 5 mol % and less than or equal 11.5 mol %, greater than or equal to 5 mol % and less than or equal to 11 mol %, greater than or equal to 7 mol % and less than or equal to 20 mol %, greater than or equal to 7 mol % and less than or equal to 18 mol %, greater than or equal to 7 mol % and less than or equal to 16 mol %, greater than or equal to 7 mol % and less than or equal to 15 mol %, greater than or equal to 7 mol % and less than or equal to 14 mol %, greater than or equal to 7 mol % and less than or equal to 13 mol %, greater than or equal to 7 mol % and less than or equal to 12.5 mol %, greater than or equal to 7 mol % and less than or equal to 12 mol %, greater than or equal to 7 mol % and less than or equal 11.5 mol %, greater than or equal to 7 mol % and less than or equal to 11 mol %, greater than or equal to 7.5 mol % and less than or equal to 20 mol %, greater than or equal to 7.5 mol % and less than or equal to 18 mol %, greater than or equal to 7.5 mol % and less than or equal to 16 mol %, greater than or equal to 7.5 mol % and less than or equal to 14 mol %, greater than or equal to 7.5 mol % and less than or equal to 12.5 mol %, greater than or equal to 7.5 mol % and less than or equal to 12 mol %, greater than or equal to 7.5 mol % and less than or equal 11.5 mol %, greater than or equal to 7.5 mol % and less than or equal to 11 mol %, greater than or equal to 8 mol % and less than or equal to 20 mol %, greater than or equal to 8 mol % and less than or equal to 18 mol %, greater than or equal to 8 mol % and less than or equal to 16 mol %, greater than or equal to 8 mol % and less than or equal to 15 mol %, greater than or equal to 8 mol % and less than or equal to 14 mol %, greater than or equal to 8 mol % and less than or equal to 13 mol %, greater than or equal to 8 mol % and less than or equal to 12.5 mol %, greater than or equal to 8 mol % and less than or equal to 12 mol %, greater than or equal to 8 mol % and less than or equal 11.5 mol %, greater than or equal to 8 mol % and less than or equal to 11 mol %, greater than or equal to 8.5 mol % and less than or equal to 20 mol %, greater than or equal to 8.5 mol % and less than or equal to 18 mol %, greater than or equal to 8.5 mol % and less than or equal to 16 mol %, greater than or equal to 8.5 mol % and less than or equal to 14 mol %, greater than or equal to 8.5 mol % and less than or equal to 12.5 mol %, greater than or equal to 8.5 mol % and less than or equal to 12 mol %, greater than or equal to 8.5 mol % and less than or equal 11.5 mol %, greater than or equal to 8.5 mol % and less than or equal to 11 mol %, greater than or equal to 9 mol % and less than or equal to 20 mol %, greater than or equal to 9 mol % and less than or equal to 18 mol %, greater than or equal to 9 mol % and less than or equal to 16 mol %, greater than or equal to 9 mol % and less than or equal to 15 mol %, greater than or equal to 9 mol % and less than or equal to 14 mol %, greater than or equal to 9 mol % and less than or equal to 13 mol %, greater than or equal to 9 mol % and less than or equal to 12.5 mol %, greater than or equal to 9 mol % and less than or equal to 12 mol %, greater than or equal to 9 mol % and less than or equal 11.5 mol %, or even greater than or equal to 9 mol % and less than or equal to 11 mol %, or any and all sub-ranges formed from any of these endpoints. In embodiments, the concentration of $Li_2O$ in the glass composition and the resultant colored glass article may be greater than or equal to 8.8 mol % and less than or equal to 14 mol %, greater than or equal to 8.8 mol % and less than or equal to 13.5 mol %, greater than or equal to 8.8 mol % and less than or equal to 13 mol %, greater than or equal to 8.8 mol % and less than or equal to 12.5 mol %, greater than or equal to 8.8 mol % and less than or equal to 12 mol %, greater than or equal to 8.8 mol % and less than or equal to 11.5 mol %, greater than or equal to 9 mol % and less than or equal to 14 mol %, greater than or equal to 9 mol % and less than or equal to 13.5 mol %, greater than or equal to 9 mol % and less than or equal to 13 mol %, greater than or equal to 9 mol % and less than or equal to 12.5 mol %, greater than or equal to 9 mol % and less than or equal to 12 mol %, greater than or equal to 9 mol % and less than or equal to 11.5 mol %, greater than or equal to 9.2 mol % and less than or equal to 14 mol %, greater than or equal to 9.2 mol % and less than or equal to 13.5 mol %, greater than or equal to 9.2 mol % and less than or equal to 13 mol %, greater than or equal to 9.2 mol % and less than or equal to 12.5 mol %, greater than or equal to 9.2 mol % and less than or equal to 12 mol %, greater than or equal to 9.2 mol % and less than or equal to 11.5 mol %, greater than or equal to 9.4 mol % and less than or equal to 14 mol %, greater than or equal to 9.4 mol % and less than or equal to 13.5 mol %, greater than or equal to 9.4 mol % and less than or equal to 13 mol %, greater than or equal to 9.4 mol % and less than or equal to 12.5 mol %, greater than or equal to 9.4 mol % and less than or equal to 12 mol %, greater than or equal to 9.4 mol % and less than or equal to 11.5 mol %, greater than or equal to 9.6 mol % and less than or equal to 14 mol %, greater than or equal to 9.6 mol % and less than or equal to 13.5 mol %, greater than or equal to 9.6 mol % and less than or equal to 13 mol %, greater than or equal to 9.6 mol % and less than or equal to 12.5 mol %, greater than or equal to 9.6 mol % and less than or equal to 12 mol %, greater than or equal to 9.6 mol % and less than or equal to 11.5 mol %, greater than or equal to 9.8 mol % and less than or equal to 14 mol %, greater than or equal to 9.8 mol % and less than or equal to 13.5 mol %, greater than or equal to 9.8 mol % and less than or equal to 13 mol %, greater than or equal to 9.8 mol % and less than or equal to 12.5 mol %, greater than or equal to 9.8 mol % and less than or equal to 12 mol %, greater than or equal to 9.8 mol % and less than or equal to 11.5 mol %, greater than or equal to 10 mol % and less than or equal to 14 mol %, greater than or equal to 10 mol % and less than or equal to 13.5 mol %, greater than or equal to 10 mol % and less than or equal to 13 mol %, greater than or equal to 10 mol % and less than or equal to 12.5 mol %, greater than or equal to 10 mol % and less than or equal to 12 mol %, or even greater than or equal to 10 mol % and less than or equal to 11.5 mol %, or any and all sub-ranges formed from any of these endpoints. In embodiments, the concentration of $Li_2O$ in the glass composition and the resultant colored glass article may be greater than or equal to 10 mol % and less than or equal to 17 mol %, greater than or equal to 10 mol % and less than or equal to 16 mol %, greater than or equal to 10 mol % and less than or equal to 15 mol %, greater than or equal to 10 mol % and less than or equal to 14 mol %, greater than or equal to 10 mol % and less than or equal to 13 mol %, greater than or equal to 10 mol % and less than or equal to 12 mol %, greater than or equal to 11 mol % and less than or equal to 17 mol %, greater than or equal to 11 mol % and less than or equal to 16 mol %, greater than or equal to 11 mol % and less than or equal to 15 mol %, greater than or equal to 11 mol % and less than or equal to 14 mol %, greater than or equal to 11 mol % and less than or equal to 13 mol %, greater than or equal to 11 mol % and less than or equal to 12 mol %, greater than or equal to 11.1 mol % and less than or equal to 17 mol %, greater than or equal to 11.1 mol % and less than or equal to 16 mol %, greater than or equal to 11.1 mol % and less than or equal to 15 mol %, greater than or equal to 11.1 mol % and less than or equal to 14 mol %, greater than or equal to 11.1 mol % and less than or equal to 13 mol %, greater than or equal to 11.1 mol % and less than or equal to 12 mol %, greater than or equal to 11.5 mol % and less than or equal to 17 mol %, greater than or equal to 11.5 mol % and less than or equal to 16 mol %, greater than or equal to 11.5 mol % and less than or equal to 15 mol %, greater than or equal to 11.5 mol % and less than or equal to 14 mol %, greater than or equal to 11.5 mol % and less than or equal to 13 mol %, greater than or equal to 11.5 mol % and less than or equal to 12 mol %, greater than or equal to 12 mol % and less than or equal to 17 mol %, greater than or equal to 12 mol % and less than or equal to 16 mol %, greater than or equal to 12 mol % and less than or equal to 15 mol %, greater than or equal to 12 mol % and less than or equal to 14 mol %, greater than or equal to 12 mol % and less than or equal to 13 mol %, greater than or equal to 13 mol % and less than or equal to 17 mol %, greater than or equal to 13 mol % and less than or equal to 16 mol %, greater than or equal to 13 mol % and less than or equal to 15 mol %, greater than or equal to 13 mol % and less than or equal to 14 mol %, or any and all sub-ranges formed from any of these endpoints.

$Na_2O$ improves diffusivity of alkali ions in the glass and thereby reduces ion-exchange time and helps achieve the desired surface compressive stress (e.g., greater than or equal to 300 MPa). The addition of $Na_2O$ also facilitates the exchange of $K^+$ cations into the glass for strengthening and improving the mechanical characteristics of the resultant colored glass article. $Na_2O$ also improves the formability of the colored glass article. In addition, $Na_2O$ decreases the melting point of the glass composition, which may improve retention of certain colorants in the glass, such as, for example, Au. Without wishing to be bound by theory, it is hypothesized that similar behavior may occur with colorants other than Au. However, if too much $Na_2O$ is added to the glass composition, the melting point may be too low. In embodiments, the concentration of $Li_2O$ present in the glass composition and the resultant colored glass article may be greater than the concentration of $Na_2O$ present in the glass composition and the resultant colored glass article.

In embodiments, the glass composition and the resultant colored glass article may comprise greater than 0 mol % or greater than or equal to 0.01 mol % and less than or equal to 15 mol % $Na_2O$, greater than or equal to 0.5 mol % and less than or equal to 15 mol % $Na_2O$ or even greater than or equal to 1 mol % and less than or equal to 15 mol % $Na_2O$. In embodiments, the glass composition and the resultant colored glass article may comprise greater than or equal to 1 mol % and less than or equal to 12 mol % $Na_2O$ or even greater than or equal to 2 mol % and less than or equal to 10 mol % $Na_2O$. In embodiments, the glass composition and the resultant colored glass article may comprise greater than or equal to 0.01 mol % and less than or equal to 4 mol % $Na_2O$. In embodiments, the glass composition and the resultant colored glass article may comprise greater than or equal to 1.5 mol % and less than or equal to 8 mol % $Na_2O$ or even greater than or equal to 2 mol % and less than or equal to 7.5 mol % $Na_2O$. In embodiments, the concentration of $Na_2O$ in the glass composition and the resultant colored glass article may be greater than 0 mol %, greater than or equal to 0.01 mol %, greater than or equal to 0.5 mol %, greater than or equal to 1 mol %, greater than or equal to 1.5 mol %, greater than or equal to 2 mol %, greater than or equal to 2.5 mol %, greater than or equal to 3 mol %, greater than or equal to 3.5 mol %, greater than or equal to 4 mol %, or even greater than or equal to 4.5 mol %. In embodiments, the concentration of $Na_2O$ in the glass composition and the resultant colored glass article may be less than or equal to 15 mol %, less than or equal to 12 mol %, less than or equal to 10 mol %, less than or equal to 9 mol %, less than or equal to 8.5 mol %, less than or equal to 8 mol %, less than or equal to 7.5 mol %, less than or equal to less than or equal to 7 mol %, less than or equal to 6.5 mol %, less than or equal to 6 mol %, less than or equal to less than or equal to 5.5 mol %, less than or equal to 5 mol %, less than or equal to 4.5 mol %, or even less than or equal to 4 mol %. In embodiments, the concentration of $Na_2O$ in the glass composition and the resultant colored glass article may be greater than 0 mol % and less than or equal to 15 mol %, greater than 0 mol % and less than or equal to 12 mol %, greater than 0 mol % and less than or equal to 10 mol %, greater than 0 mol % and less than or equal to 8 mol %, greater than 0 mol % and less than or equal to 6 mol %, greater than 0 mol % and less than or equal to 5.5 mol %, greater than 0 mol % and less than or equal to 5 mol %, greater than 0 mol % and less than or equal to 4.5 mol %, greater than 0 mol % and less than or equal to 4 mol %, greater than or equal to 0.01 mol % and less than or equal to 15 mol %, greater than or equal to 0.01 mol % and less than or equal to 12 mol %, greater than or equal to 0.01 mol % and less than or equal to 10 mol %, greater than or equal to 0.01 mol % and less than or equal to 8 mol %, greater than or equal to 0.01 mol % and less than or equal to 6 mol %, greater than or equal to 0.01 mol % and less than or equal to 5.5 mol %, greater than or equal to 0.01 mol % and less than or equal to 5 mol %, greater than or equal to 0.01 mol % and less than or equal to 4.5 mol %, greater than or equal to 0.01 mol % and less than or equal to 4 mol %, greater than or equal to 0.5 mol % and less than or equal to 15 mol %, greater than or equal to 0.5 mol % and less than or equal to 12 mol %, greater than or equal to 0.5 mol % and less than or equal to 10 mol %, greater than or equal to 0.5 mol % and less than or equal to 8 mol %, greater than or equal to 0.5 mol % and less than or equal to 6 mol %, greater than or equal to 1 mol % and less than or equal to 15 mol %, greater than or equal to 1 mol % and less than or equal to 12 mol %, greater than or equal to 1 and less than or equal to 10 mol %, greater than or equal to 1 and less than or equal to 9 mol %, greater than or equal to 1 mol % and less than or equal to 8 mol %, greater than or equal to 1 mol % and less than or equal to 7.5 mol %, greater than or equal to 1 mol % and less than or equal to 7 mol %, greater than or equal to 1 mol % and less than or equal to 6.5 mol %, greater than or equal to 1 mol % and less than or equal to 6 mol %, greater than or equal to 1 mol % and less than or equal to 5.5 mol %, greater than or equal to 1.5 mol % and less than or equal to 15 mol %, greater than or equal to 1.5 mol % and less than or equal to 12 mol %, greater than or equal to 1.5 and less than or equal to 10 mol %, greater than or equal to 1.5 and less than or equal to 9 mol %, greater than or equal to 1.5 mol % and less than or equal to 8 mol %, greater than or equal to 1.5 mol % and less than or equal to 7.5 mol %, greater than or equal to 1.5 mol % and less than or equal to 7 mol %, greater than or equal to 1.5 mol % and less than or equal to 6.5 mol %, greater than or equal to 1.5 mol % and less than or equal to 6 mol %, greater than or equal to 1.5 mol % and less than or equal to 5.5 mol %, greater than or equal to 2 mol % and less than or equal to 15 mol %, greater than or equal to 2 mol % and less than or equal to 12 mol %, greater than or equal to 2 and less than or equal to 10 mol %, greater than or equal to 2 and less than or equal to 9 mol %, greater than or equal to 2 mol % and less than or equal to 8 mol %, greater than or equal to 2 mol % and less than or equal to 7.5 mol %, greater than or equal to 2 mol % and less than or equal to 7 mol %, greater than or equal to 2 mol % and less than or equal to 6.5 mol %, greater than or equal to 2 mol % and less than or equal to 6 mol %, greater than or equal to 2 mol % and less than or equal to 5.5 mol %, greater than or equal to 2.5 mol % and less than or equal to 15 mol %, greater than or equal to 2.5 mol % and less than or equal to 12 mol %, greater than or equal to 2.5 and less than or equal to 10 mol %, greater than or equal to 2.5 and less than or equal to 9 mol %, greater than or equal to 2.5 mol % and less than or equal to 8 mol %, greater than or equal to 2.5 mol % and less than or equal to 7.5 mol %, greater than or equal to 2.5 mol % and less than or equal to 7 mol %, greater than or equal to 2.5 mol % and less than or equal to 6.5 mol %, greater than or equal to 2.5 mol % and less than or equal to 6 mol %, greater than or equal to 2.5 mol % and less than or equal to 5.5 mol %, greater than or equal to 3 mol % and less than or equal to 15 mol %, greater than or equal to 3 mol % and less than or equal to 12 mol %, greater than or equal to 3 and less than or equal to 10 mol %, greater than or equal to 3 and less than or equal to 9 mol %, greater than or equal to 3 and less than or equal to 8.5 mol %, greater than or equal to 3 mol % and less than or equal to 8 mol %, greater than or equal to 3 mol % and less than or equal to 7.5 mol %, greater than or equal to 3 mol % and less than or equal to 7 mol %, greater than or equal to 3 mol % and less than or equal to 6.5 mol %, greater than or equal to 3 mol % and less than or equal to 6 mol %, greater than or equal to 3 mol % and less than or equal to 5.5 mol %, greater than or equal to 3.5 mol % and less than or equal to 15 mol %, greater than or equal to 3.5 mol % and less than or equal to 12 mol %, greater than or equal to 3.5 and less than or equal to 10 mol %, greater than or equal to 3.5 and less than or equal to 9 mol %, greater than or equal to 3.5 mol % and less than or equal to 8 mol %, greater than or equal to 3.5 mol % and less than or equal to 7.5 mol %, greater than or equal to 3.5 mol % and less than or equal to 7 mol %, greater than or equal to 3.5 mol % and less than or equal to 6.5 mol %, greater than or equal to 3.5 mol % and less than or equal to 6 mol %, greater than or equal to 3.5 mol % and less than or equal to 5.5 mol %, greater than or equal to 4 mol % and less than or equal to 15 mol %, greater than or equal to 4 mol % and less than or equal to 12 mol %, greater than or equal to 4 and less than or equal to 10 mol %, greater than or equal to 4 and less than or equal to 9 mol %, greater than or equal to 4 mol % and less than or equal to 8 mol %, greater than or equal to 4 mol % and less than or equal to 7.5 mol %, greater than or equal to 4 mol % and less than or equal to 7 mol %, greater than or equal to 4 mol % and less than or equal to 6.5 mol %, greater than or equal to 4 mol % and less than or equal to 6 mol %, greater than or equal to 4 mol % and less than or equal to 5.5 mol %, greater than or equal to 4.5 mol % and less than or equal to 15 mol %, greater than or equal to 4.5 mol % and less than or equal to 12 mol %, greater than or equal to 4.5 and less than or equal to 10 mol %, greater than or equal to 4.5 mol % and less than or equal to 8 mol %, greater than or equal to 4.5 mol % and less than or equal to 7.5 mol %, greater than or equal to 4.5 mol % and less than or equal to 7 mol %, greater than or equal to 4.5 mol % and less than or equal to 6.5 mol %, greater than or equal to 4.5 mol % and less than or equal to 6 mol %, or even greater than or equal to 4.5 mol % and less than or equal to 5.5 mol %, or any and all sub-ranges formed from any of these endpoints.

The concentration of $Li_2O$+$Na_2O$ in the glass composition and the resultant colored glass article may determine the ability of the glass composition and the colored glass article to be strengthened through an ion exchange process. Generally, the ion exchange process strengthens the glass by replacing alkali ions in the glass with larger alkali ions. For example, a glass containing $Li_2O$ and/or $Na_2O$ may be strengthened by ion exchange such that potassium ions ($K^+$) replace the $Li^+$ or $Na^+$ ions in the glass. In this manner, the ability of the colored glass article to be strengthened by an ion exchange process relates directly to the content of $Li_2O$+$Na_2O$, and if the $Li_2O$+$Na_2O$ content is too low (e.g., less than about 8 mol %) the resultant colored glass article may not be able to be sufficiently strengthened by ion exchange processes.

In embodiments, the concentration of $Li_2O$+$Na_2O$ in the glass composition and the resultant colored glass article may be greater than or equal to than or equal to 8 mol %, such as greater than or equal to 10 mol % and less than or equal to than or equal to 19 mol %. In embodiments, the concentration of $Li_2O$+$Na_2O$ in the glass composition and the resultant colored glass article may be greater than or equal to than or equal to 9 mol %, greater than or equal to 10 mol %, greater than or equal to 12 mol %, greater than or equal to 14 mol %, greater than or equal to 16 mol %, or more. In embodiments, the concentration of $Li_2O$+$Na_2O$ in the glass composition and the colored glass article is less than or equal to than or equal to 20 mol %, less than or equal to than or equal to 18 mol %, less than or equal to than or equal to 16 mol %, less than or equal to than or equal to 14 mol %, less than or equal to than or equal to 12 mol %, less than or equal to than or equal to 10 mol %, or less. In embodiments, the concentration of $Li_2O$+$Na_2O$ in the glass composition and the colored glass article may be greater than or equal to 8 mol % and less than or equal to than or equal to 20 mol %, greater than or equal to 9 mol % and less than or equal to than or equal to 19 mol %, greater than or equal to 10 mol % and less than or equal to than or equal to 18 mol %, greater than or equal to 11 mol % and less than or equal to than or equal to 17 mol %, greater than or equal to 12 mol % and less than or equal to than or equal to 16 mol %, greater than or equal to 13 mol % and less than or equal to than or equal to 15 mol %, greater than or equal to 8 mol % and less than or equal to than or equal to 14 mol %, or any and all sub-ranges formed from any of these endpoints.

$K_2O$, when included, promotes ion-exchange and may increase the depth of compression and decrease the melting point to improve the formability of the colored glass article. However, adding too much $K_2O$ may cause the surface compressive stress and melting point to be too low. Accordingly, in embodiments, the amount of $K_2O$ added to the glass composition may be limited.

In embodiments, the glass composition and the resultant colored glass article may optionally comprise greater than or equal to 0 mol % and less than or equal to 3 mol % $K_2O$, greater than or equal to 0 mol % and less than or equal to 1 mol % $K_2O$, greater than or equal to 0.01 mol % and less than or equal to 1 mol % $K_2O$ or even greater than or equal to 0.1 mol % and less than or equal to 1 mol % $K_2O$. In embodiments, the glass composition and the resultant colored glass article may optionally comprise greater than 0.1 mol % and less than or equal to 0.5 mol % $K_2O$. In embodiments, the concentration of $K_2O$ in the glass composition and the resultant colored glass article may be greater than or equal to 0 mol %, greater than or equal to 0.01 mol %, greater than or equal to 0.1 mol %, greater than or equal to 0.2 mol %, greater than or equal to 0.25 mol %, greater than or equal to 0.4 mol %, or even greater than or equal to 0.5 mol %. In embodiments, the concentration of $K_2O$ in the glass composition and the resultant colored glass article may be less than or equal to 3 mol %, less than or equal to 2.5 mol %, less than or equal to 2 mol %, less than or equal to 1.5 mol %, less than or equal to 1 mol %, less than or equal to 0.75 mol %, less than or equal to 0.5 mol %, or even less than or equal to 0.25 mol %. In embodiments, the concentration of $K_2O$ in the glass composition and the resultant colored glass article may be greater than or equal to 0 mol % and less than or equal to 3 mol %, greater than or equal to 0 mol % and less than or equal to 2.5 mol %, greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.75 mol %, greater than or equal to 0 mol % and less than or equal to 0.7 mol %, greater than or equal to 0 mol % and less than or equal to 0.5 mol %, greater than or equal to 0 mol % and less than or equal to 0.25 mol %, greater than or equal to 0.01 mol % and less than or equal to 3 mol %, greater than or equal to 0.01 mol % and less than or equal to 2.5 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.7 mol %, greater than or equal to 0.01 mol % and less than or equal to 0.5 mol %, greater than or equal to 0.1 mol % and less than or equal to 3 mol %, greater than or equal to 0.1 mol % and less than or equal to 2.5 mol %, greater than or equal to 0.1 mol % and less than or equal to 2 mol %, greater than or equal to 0.1 mol % and less than or equal to 1.5 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.7 mol %, greater than or equal to 0.1 mol % and less than or equal to 0.5 mol %, greater than or equal to 0.2 mol % and less than or equal to 3 mol %, greater than or equal to 0.2 mol % and less than or equal to 2.5 mol %, greater than or equal to 0.2 mol % and less than or equal to 2 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.75 mol %, greater than or equal to 0.2 mol % and less than or equal to 0.7 mol %, greater than or equal to 0.2 mol % and less than or equal to 0.5 mol %, greater than or equal to 0.25 mol % and less than or equal to 3 mol %, greater than or equal to 0.25 mol % and less than or equal to 2.5 mol %, greater than or equal to 0.25 mol % and less than or equal to 2 mol %, greater than or equal to 0.25 mol % and less than or equal to 1.5 mol %, greater than or equal to 0.25 mol % and less than or equal to 1 mol %, greater than or equal to 0.25 mol % and less than or equal to 0.75 mol %, greater than or equal to 0.25 mol % and less than or equal to 0.7 mol %, greater than or equal to 0.25 mol % and less than or equal to 0.5 mol %, greater than or equal to 0.3 mol % and less than or equal to 3 mol %, greater than or equal to 0.3 mol % and less than or equal to 2.5 mol %, greater than or equal to 0.3 mol % and less than or equal to 2 mol %, greater than or equal to 0.3 mol % and less than or equal to 1.5 mol %, greater than or equal to 0.3 mol % and less than or equal to 1 mol %, greater than or equal to 0.3 mol % and less than or equal to 0.75 mol %, greater than or equal to 0.3 mol % and less than or equal to 0.7 mol %, greater than or equal to 0.3 mol % and less than or equal to 0.5 mol %, greater than or equal to 0.4 mol % and less than or equal to 3 mol %, greater than or equal to 0.4 mol % and less than or equal to 2.5 mol %, greater than or equal to 0.4 mol % and less than or equal to 2 mol %, greater than or equal to 0.4 mol % and less than or equal to 1.5 mol %, greater than or equal to 0.4 mol % and less than or equal to 1 mol %, greater than or equal to 0.4 mol % and less than or equal to 0.75 mol %, greater than or equal to 0.4 mol % and less than or equal to 0.7 mol %, or even greater than or equal to 0.4 mol % and less than or equal to 0.5 mol %, greater than or equal to 0.5 mol % and less than or equal to 1 mol %, or any and all sub-ranges formed from any of these endpoints. In embodiments, the glass composition and the resultant colored glass article may be substantially free or free of $K_2O$.

In embodiments, the concentration of $K_2O$ in the glass composition and the resultant colored glass article may be greater than or equal to 0 mol %, greater than or equal to 0.01 mol %, greater than or equal to 0.1 mol %, greater than or equal to 0.2 mol %, greater than or equal to 0.25 mol %, greater than or equal to 0.4 mol %, or even greater than or equal to 0.5 mol %. In embodiments, the concentration of $K_2O$ in the glass composition and the resultant colored glass article may be less than or equal to 5 mol %, less than or equal to 4 mol %, less than or equal to 3 mol %, less than or equal to 2 mol %, or even less than or equal to 1 mol %. In embodiments, the concentration of $K_2O$ in the glass composition and the resultant colored glass article may be greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0 mol % and less than or equal to 2 mol %, greater than or equal to 0 mol % and less than or equal to 1 mol %, greater than or equal to 0.01 mol % and less than or equal to 5 mol %, greater than or equal to 0.01 mol % and less than or equal to 4 mol %, greater than or equal to 0.01 mol % and less than or equal to 3 mol %, greater than or equal to 0.01 mol % and less than or equal to 2 mol %, greater than or equal to 0.01 mol % and less than or equal to 1 mol %, greater than or equal to 0.1 mol % and less than or equal to 5 mol %, greater than or equal to 0.1 mol % and less than or equal to 4 mol %, greater than or equal to 0.1 mol % and less than or equal to 3 mol %, greater than or equal to 0.1 mol % and less than or equal to 2 mol %, greater than or equal to 0.1 mol % and less than or equal to 1 mol %, greater than or equal to 0.2 mol % and less than or equal to 5 mol %, greater than or equal to 0.2 mol % and less than or equal to 4 mol %, greater than or equal to 0.2 mol % and less than or equal to 3 mol %, greater than or equal to 0.2 mol % and less than or equal to 2 mol %, greater than or equal to 0.2 mol % and less than or equal to 1 mol %, greater than or equal to 0.25 mol % and less than or equal to 5 mol %, greater than or equal to 0.25 mol % and less than or equal to 4 mol %, greater than or equal to 0.25 mol % and less than or equal to 3 mol %, greater than or equal to 0.25 mol % and less than or equal to 2 mol %, greater than or equal to 0.25 mol % and less than or equal to 1 mol %, greater than or equal to 0.3 mol % and less than or equal to 5 mol %, greater than or equal to 0.3 mol % and less than or equal to 5 mol %, greater than or equal to 0.3 mol % and less than or equal to 3 mol %, greater than or equal to 0.3 mol % and less than or equal to 2 mol %, greater than or equal to 0.3 mol % and less than or equal to 1 mol %, greater than or equal to 0.4 mol % and less than or equal to 5 mol %, greater than or equal to 0.4 mol % and less than or equal to 4 mol %, greater than or equal to 0.4 mol % and less than or equal to 3 mol %, greater than or equal to 0.4 mol % and less than or equal to 2 mol %, greater than or equal to 0.4 mol % and less than or equal to 1 mol %, greater than or equal to equal to 0.5 mol % and less than or equal to 5 mol %, greater than or equal to equal to 0.5 mol % and less than or equal to 4 mol %, greater than or equal to equal to 0.5 mol % and less than or equal to 3 mol %, greater than or equal to equal to 0.5 mol % and less than or equal to 2 mol %, or even greater than or equal to equal to 0.5 mol % and less than or equal to 1 mol %, or any and all sub-ranges formed from any of these endpoints.

$R_2O$, as used herein, is the sum (in mol %) of $Li_2O$, $Na_2O$, and $K_2O$ present in the glass composition and the resultant colored glass article (i.e., $R_2O$=$Li_2O$ (mol %)+$Na_2O$ (mol %)+$K_2O$ (mol %). Like $B_2O_3$, the alkali oxides aid in decreasing the softening point and molding temperature of the glass composition, thereby offsetting the increase in the softening point and molding temperature of the glass composition due to higher amounts of $SiO_2$ in the glass composition, for example. The softening point and molding temperature may be further reduced by including combinations of alkali oxides (e.g., two or more alkali oxides) in the glass composition, a phenomenon referred to as the "mixed alkali effect." However, it has been found that if the amount of alkali oxide is too high, the average coefficient of thermal expansion of the glass composition increases to greater than $100\times10^{-7}/°$ C., which may be undesirable.

In embodiments, the concentration of $R_2O$ in the glass composition and the resultant colored glass article may be greater than or equal to 1 mol % and less than or equal to 35 mol %. In embodiments, the concentration of $R_2O$ in the glass composition and the resultant colored glass article may be greater than or equal to 6 mol % and less than or equal to 25 mol % or even greater than or equal to 8 mol % and less than or equal to 23 mol %. In embodiments, the concentration of $R_2O$ in the glass composition and the resultant colored glass article may be greater than or equal to 2 mol %, greater than or equal to 4 mol %, greater than 6 mol %, greater than or equal to 8 mol %, greater than or equal to 10 mol %, greater than or equal to 10.3 mol %, greater than or equal to 11 mol %, greater than or equal to 12 mol %, greater than or equal to 13 mol %, greater than or equal to 12 mol %, or even greater than or equal to 14 mol %. In embodiments, the concentration of $R_2O$ in the glass composition and the resultant colored glass article may be less than or equal to 35 mol %, less than or equal to 30 mol %, less than or equal to 25 mol %, less than or equal to 23 mol %, less than or equal to 22 mol %, less than or equal to 21 mol %, less than or equal to 20 mol %, less than or equal to 19 mol %, less than or equal to 18 mol %, less than or equal to 17 mol %, or even less than or equal to 16 mol %. In embodiments, the concentration of $R_2O$ in the glass composition and the resultant colored glass article may be greater than or equal to 1 mol % and less than or equal to 35 mol %, greater than or equal to 1 mol % and less than or equal to 30 mol %, greater than or equal to 1 mol % and less than or equal to 25 mol %, greater than or equal to 1 mol % and less than or equal to 23 mol %, greater than or equal to 1 mol % and less than or equal to 22 mol %, greater than or equal to 1 mol % and less than or equal to 21 mol %, greater than or equal to 1 mol % and less than or equal to 20 mol %, greater than or equal to 1 mol % and less than or equal to 19 mol %, greater than or equal to 1 mol % and less than or equal to 18 mol %, greater than or equal to 1 mol % and less than or equal to 17 mol %, greater than or equal to 1 mol % and less than or equal to 16 mol %, greater than or equal to 2 mol % and less than or equal to 35 mol %, greater than or equal to 2 mol % and less than or equal to 30 mol %, greater than or equal to 2 mol % and less than or equal to 25 mol %, greater than or equal to 2 mol % and less than or equal to 23 mol %, greater than or equal to 2 mol % and less than or equal to 22 mol %, greater than or equal to 2 mol % and less than or equal to 21 mol %, greater than or equal to 2 mol % and less than or equal to 20 mol %, greater than or equal to 2 mol % and less than or equal to 19 mol %, greater than or equal to 2 mol % and less than or equal to 18 mol %, greater than or equal to 2 mol % and less than or equal to 17 mol %, greater than or equal to 2 mol % and less than or equal to 16 mol %, greater than or equal to 4 mol % and less than or equal to 35 mol %, greater than or equal to 4 mol % and less than or equal to 30 mol %, greater than or equal to 4 mol % and less than or equal to 25 mol %, greater than or equal to 4 mol % and less than or equal to 23 mol %, greater than or equal to 4 mol % and less than or equal to 22 mol %, greater than or equal to 4 mol % and less than or equal to 21 mol %, greater than or equal to 4 mol % and less than or equal to 20 mol %, greater than or equal to 4 mol % and less than or equal to 19 mol %, greater than or equal to 4 mol % and less than or equal to 18 mol %, greater than or equal to 4 mol % and less than or equal to 17 mol %, greater than or equal to 4 mol % and less than or equal to 16 mol %, greater than or equal to 6 mol % and less than or equal to 35 mol %, greater than or equal to 6 mol % and less than or equal to 30 mol %, greater than or equal to 6 mol % and less than or equal to 25 mol %, greater than or equal to 6 mol % and less than or equal to 23 mol %, greater than or equal to 6 mol % and less than or equal to 22 mol %, greater than or equal to 6 mol % and less than or equal to 21 mol %, greater than or equal to 6 mol % and less than or equal to 20 mol %, greater than or equal to 6 mol % and less than or equal to 19 mol %, greater than or equal to 6 mol % and less than or equal to 18 mol %, greater than or equal to 6 mol % and less than or equal to 17 mol %, greater than or equal to 6 mol % and less than or equal to 16 mol %, greater than or equal to 8 mol % and less than or equal to 35 mol %, greater than or equal to 8 mol % and less than or equal to 30 mol %, greater than or equal to 8 mol % and less than or equal to 25 mol %, greater than or equal to 8 mol % and less than or equal to 23 mol %, greater than or equal to 8 mol % and less than or equal to 22 mol %, greater than or equal to 8 mol % and less than or equal to 21 mol %, greater than or equal to 8 mol % and less than or equal to 20 mol %, greater than or equal to 8 mol % and less than or equal to 19 mol %, greater than or equal to 8 mol % and less than or equal to 18 mol %, greater than or equal to 8 mol % and less than or equal to 17 mol %, greater than or equal to 8 mol % and less than or equal to 16 mol %, greater than or equal to 10 mol % and less than or equal to 35 mol %, greater than or equal to 10 mol % and less than or equal to 30 mol %, greater than or equal to 10 mol % and less than or equal to 25 mol %, greater than or equal to 10 mol % and less than or equal to 23 mol %, greater than or equal to 10 mol % and less than or equal to 22 mol %, greater than or equal to 10 mol % and less than or equal to 21 mol %, greater than or equal to 10 mol % and less than or equal to 20 mol %, greater than or equal to 10 mol % and less than or equal to 19 mol %, greater than or equal to 10 mol % and less than or equal to 18 mol %, greater than or equal to 10 mol % and less than or equal to 17 mol %, greater than or equal to 10 mol % and less than or equal to 16 mol %, greater than or equal to 11 mol % and less than or equal to 35 mol %, greater than or equal to 11 mol % and less than or equal to 30 mol %, greater than or equal to 11 mol % and less than or equal to 25 mol %, greater than or equal to 11 mol % and less than or equal to 23 mol %, greater than or equal to 11 mol % and less than or equal to 22 mol %, greater than or equal to 11 mol % and less than or equal to 21 mol %, greater than or equal to 11 mol % and less than or equal to 20 mol %, greater than or equal to 11 mol % and less than or equal to 19 mol %, greater than or equal to 11 mol % and less than or equal to 18 mol %, greater than or equal to 11 mol % and less than or equal to 17 mol %, greater than or equal to 11 mol % and less than or equal to 16 mol %, greater than or equal to 12 mol % and less than or equal to 35 mol %, greater than or equal to 12 mol % and less than or equal to 30 mol %, greater than or equal to 12 mol % and less than or equal to 25 mol %, greater than or equal to 12 mol % and less than or equal to 23 mol %, greater than or equal to 12 mol % and less than or equal to 22 mol %, greater than or equal to 12 mol % and less than or equal to 21 mol %, greater than or equal to 12 mol % and less than or equal to 20 mol %, greater than or equal to 12 mol % and less than or equal to 19 mol %, greater than or equal to 12 mol % and less than or equal to 18 mol %, greater than or equal to 12 mol % and less than or equal to 17 mol %, greater than or equal to 12 mol % and less than or equal to 16 mol %, greater than or equal to 13 mol % and less than or equal to 35 mol %, greater than or equal to 13 mol % and less than or equal to 30 mol %, greater than or equal to 13 mol % and less than or equal to 25 mol %, greater than or equal to 13 mol % and less than or equal to 23 mol %, greater than or equal to 13 mol % and less than or equal to 22 mol %, greater than or equal to 13 mol % and less than or equal to 21 mol %, greater than or equal to 13 mol % and less than or equal to 20 mol %, greater than or equal to 13 mol % and less than or equal to 19 mol %, greater than or equal to 13 mol % and less than or equal to 18 mol %, greater than or equal to 13 mol % and less than or equal to 17 mol %, greater than or equal to 13 mol % and less than or equal to 16 mol %, greater than or equal to 14 mol % and less than or equal to 35 mol %, greater than or equal to 14 mol % and less than or equal to 30 mol %, greater than or equal to 14 mol % and less than or equal to 25 mol %, greater than or equal to 14 mol % and less than or equal to 23 mol %, greater than or equal to 14 mol % and less than or equal to 22 mol %, greater than or equal to 14 mol % and less than or equal to 21 mol %, greater than or equal to 14 mol % and less than or equal to 20 mol %, greater than or equal to 14 mol % and less than or equal to 19 mol %, greater than or equal to 14 mol % and less than or equal to 18 mol %, greater than or equal to 14 mol % and less than or equal to 17 mol %, or even greater than or equal to 14 mol % and less than or equal to 16 mol %, or any and all sub-ranges formed from any of these endpoints.

In embodiments, the difference between $R_2O$ and $Al_2O_3$ (i.e. $R_2O$ (mol %)-$Al_2O_3$ (mol %)) in the glass composition may be adjusted to produce a desired observable color (e.g, pink, purple, red, orange, or blue). The analyzed $R_2O$—$Al_2O_3$ of the resultant colored glass article, along with the added colorant package, may correlate with the observable color of the colored glass article after heat treatment, as discussed herein. In embodiments, $R_2O$—$Al_2O_3$ in the glass composition and the resultant colored glass article may be greater than or equal to −5 mol % and less than or equal to 7 mol % or even greater than or equal to −3 mol % and less than or equal to 2 mol %. In embodiments, $R_2O$—$Al_2O_3$ in the glass composition and the resultant colored glass article may be greater than or equal to −3 mol % and less than or equal to 6 mol %. In embodiments, $R_2O$—$Al_2O_3$ in the glass composition and the resultant colored glass article may be greater than or equal to −1 mol % and less than or equal to 5 mol %. In embodiments, $R_2O$—$Al_2O_3$ in the glass composition and the resultant colored glass article may be greater than or equal to −5 mol % and less than or equal to 1.5 mol %. In embodiments, $R_2O$—$Al_2O_3$ in the glass composition and the resultant colored glass article may be greater than or equal to −3 mol % and less than or equal to 1.5 mol %. In embodiments, $R_2O$—$Al_2O_3$ in the glass composition and the resultant colored glass article may be greater than or equal to 1.5 mol % and less than or equal to 7 mol %. In embodiments, $R_2O$—$Al_2O_3$ in the glass composition and the resultant colored glass article may be greater than or equal to 1.5 mol % and less than or equal to 5 mol %. In embodiments, $R_2O$—$Al_2O_3$ in the glass composition and the resultant colored glass article may be greater than or equal to −5 mol %, greater than or equal to −4 mol %, greater than or equal to −3 mol %, greater than or equal to −2.5 mol %, greater than or equal to −2 mol %, greater than or equal to −1.5 mol %, greater than or equal to 0.2 mol %, greater than or equal to 0.5 mol %, greater than or equal to 1 mol %, greater than or equal to 1.5 mol %, or even greater than or equal to 2 mol %. In embodiments, $R_2O$—$Al_2O_3$ in the glass composition and the resultant colored glass article may be less than or equal to 7 mol %, less than or equal to 6.5 mol %, less than or equal to 6 mol %, less than or equal to 5.5 mol %, less than or equal to 5 mol %, less than or equal to 4.5 mol %, less than or equal to 4 mol %, less than or equal to 3.5 mol %, less than or equal to 3 mol %, less than or equal to 2.5 mol %, less than or equal to 2 mol %, less than or equal to 1.5 mol %, less than or equal to 1 mol %, or even less than or equal to 0.5 mol %. In embodiments, $R_2O$—$Al_2O_3$ in the glass composition and the resultant colored glass article may be greater than or equal to −5 mol % and less than or equal to 7 mol %, greater than or equal to −5 mol % and less than or equal to 5 mol %, greater than or equal to −5 mol % and less than or equal to 3 mol %, greater than or equal to −5 mol % and less than or equal to 1.5 mol %, greater than or equal to −3 mol % and less than or equal to 7 mol %, greater than or equal to −3 mol % and less than or equal to 5 mol %, greater than or equal to −3 mol % and less than or equal to 3 mol %, greater than or equal to −3 mol % and less than or equal to 1.5 mol %, greater than or equal to −1 mol % and less than or equal to 7 mol %, greater than or equal to −1 mol % and less than or equal to 5 mol %, greater than or equal to −1 mol % and less than or equal to 3 mol %, greater than or equal to −1 mol % and less than or equal to 1.5 mol %, greater than or equal to 0 mol % and less than or equal to 7 mol %, greater than or equal to 0 mol % and less than or equal to 5 mol %, greater than or equal to 0 mol % and less than or equal to 3 mol %, greater than or equal to 0 mol % and less than or equal to 1.5 mol %, greater than or equal to 1.5 mol % and less than or equal to 7 mol %, greater than or equal to 1.5 mol % and less than or equal to 5 mol %, or even greater than or equal to 1.5 mol % and less than or equal to 3 mol %, or any and all sub-ranges formed from any of these endpoints. In embodiments, $R_2O$—$Al_2O_3$ in the glass composition and the resultant colored glass article may be greater than or equal to −3 mol % and less than or equal to 2 mol %, greater than or equal to −3 mol % and less than or equal to 1.5 mol %, greater than or equal to −3 mol % and less than or equal to 1 mol %, greater than or equal to −3 mol % and less than or equal to 0.5 mol %, greater than or equal to −2.5 mol % and less than or equal to 2 mol %, greater than or equal to −2.5 mol % and less than or equal to 1.5 mol %, greater than or equal to −2.5 mol % and less than or equal to 1 mol %, greater than or equal to −2.5 mol % and less than or equal to 0.5 mol %, greater than or equal to −2 mol % and less than or equal to 2 mol %, greater than or equal to −2 mol % and less than or equal to 1.5 mol %, greater than or equal to −2 mol % and less than or equal to 1 mol %, greater than or equal to −2 mol % and less than or equal to 0.5 mol %, greater than or equal to −1.5 mol % and less than or equal to 2 mol %, greater than or equal to −1.5 mol % and less than or equal to 1.5 mol %, greater than or equal to −1.5 mol % and less than or equal to 1 mol %, or even greater than or equal to −1.5 mol % and less than or equal to 0.5 mol %, or any and all sub-ranges formed from any of these endpoints. In embodiments, the difference between the concentrations of $R_2O$ and $Al_2O_3$ in the glass composition and the resultant colored glass article may be greater than or equal to 0.2 mol % and less than or equal to 5 mol %, greater than or equal to 0.2 mol % and less than or equal to 4.5 mol %, greater than or equal to 0.2 mol % and less than or equal to 4 mol %, greater than or equal to 0.2 mol % and less than or equal to 3.5 mol %, greater than or equal to 0.2 mol % and less than or equal to 3 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 0.5 mol % and less than or equal to 3 mol %, greater than or equal to 1 mol % and less than or equal to 5 mol %, greater than or equal to 1 mol % and less than or equal to 4.5 mol %, greater than or equal to 1 mol % and less than or equal to 4 mol %, greater than or equal to 1 mol % and less than or equal to 3.5 mol %, greater than or equal to 1 mol % and less than or equal to 3 mol %, greater than or equal to 1.5 mol % and less than or equal to 5 mol %, greater than or equal to 1.5 mol % and less than or equal to 4.5 mol %, greater than or equal to 1.5 mol % and less than or equal to 4 mol %, greater than or equal to 1.5 mol % and less than or equal to 3.5 mol %, greater than or equal to 1.5 mol % and less than or equal to 3 mol %, greater than or equal to 2 mol % and less than or equal to 5 mol %, greater than or equal to 2 mol % and less than or equal to 4.5 mol %, greater than or equal to 2 mol % and less than or equal to 4 mol %, greater than or equal to 2 mol % and less than or equal to 3.5 mol %, greater than or equal to 2 mol % and less than or equal to 3 mol %, or any and all sub-ranges formed from any of these endpoints.

In embodiments, the glass compositions and the resultant colored glass articles described herein further include MgO and/or ZnO to improve retention of colorants in the glass, such as Au or the like, by lowering the melting point of the glass composition. Decreasing the melting point of the glass composition may help improve colorant retention because the glass compositions may be melted at relatively lower temperatures and the evaporation of colorants from the glass, such as gold, may be reduced. While not wishing to be bound by theory, it is also believed that partially replacing $Li_2O$ and/or $Na_2O$ with MgO and/or ZnO may also help improve retention of the colorants. Specifically, $Li_2O$ and/or $Na_2O$ is included in the batch glass composition as lithium carbonate and sodium carbonate, respectively. Upon melting the glass composition, carbonate gas is released from the glass composition. Colorants such as Au escape from the glass composition within the carbonate gas. Therefore, the improved colorant retention may be due to the reduced amount of carbonate. Further, it is believed that MgO and/or ZnO may improve the solubility of some colorants in the glass (such as $Cr_2O_3$, for example), thereby avoiding the formation of undesirable crystal phases (such as Cr-spinel crystals) and expanding the color gamut that may be achieved by the resultant colored glass articles. For example, in embodiments where the colorant includes $Cr_2O_3$, the sum of MgO and ZnO present in the glass composition and the resultant colored glass article (i.e., MgO (mol %)+ZnO (mol %)) may be greater than or equal to 0 mol % and less than or equal to 6 mol % or even less than or equal to 4.5 mol %. Without wishing to be bound by theory, it is hypothesized that similar behavior may occur with colorants other than Au and $Cr_2O_3$.

In embodiments, the sum (in mol %) of MgO and ZnO present in the glass composition and the resultant colored glass article (i.e., MgO (mol %)+ZnO (mol %)) may be greater than or equal to 0 mol % and less than or equal to 8 mol %, greater than or equal to 0.1 mol % and less than or equal to 8 mol %, greater than or equal to 0 mol % and less than or equal to 6 mol %, greater than or equal to 0.1 mol % and less than or equal to 6 mol %, or even greater than or equal to 0 mol % and less than or equal to 4.5 mol %. In embodiments, the sum of MgO and ZnO in the glass composition and the resultant colored glass article may be greater than or equal to 0.5 mol % and less than or equal to 5.5 mol %. In embodiments, the sum of MgO and ZnO in the glass composition and the resultant colored glass article may be greater than or equal to 0 mol %, greater than or equal to 0.01 mol %, greater than or equal to 0.1 mol %, greater than or equal to 0.5 mol %, greater than or equal to 1 mol %, greater than or equal to 1.5 mol %, greater than or equal to 2 mol %, greater than or equal to 2.5 mol %, greater than or equal to 3 mol %, or even greater than or equal to 3.5 mol %. In embodiments, the sum of MgO and ZnO in the glass composition and the resultant colored glass article may be less than or equal to 8 mol %, less than or equal to 7 mol %, less than or equal to 6 mol %, less than or equal to 5.5 mol %, less than or equal to 5 mol %, less than or equal to 4.5 mol %, less than or equal to 4.25 mol %, or even less than or equal to 4 mol %. In embodiments, the sum of MgO and ZnO in the glass composition and the resultant colored glass article may be greater than or equal to 0 mol % and less than or equal to 8 mol %, greater than or equal to 0 mol % and less than or equal to 7 mol %, greater than or equal to 0 mol % and less than or equal to 6 mol %, greater than or equal to 0 mol % and less than or equal to 5.5 mol %, greater than or equal to 0 mol % and less than or equal to 5 mol %, greater than or equal to 0 mol % and less than or equal to 4.5 mol %, greater than or equal to 0 mol % and less than or equal to 4.25 mol %, greater than or equal to 0 mol % and less than or equal to 4 mol %, greater than or equal to 0.1 mol % and less than or equal to 8 mol %, greater than or equal to 0.1 mol % and less than or equal to 7 mol %, greater than or equal to 0.1 mol % and less than or equal to 6 mol %, greater than or equal to 0.1 mol % and less than or equal to 5.5 mol %, greater than or equal to 0.1 mol % and less than or equal to 5 mol %, greater than or equal to 0.1 mol % and less than or equal to 4.5 mol %, greater than or equal to 0.1 mol % and less than or equal to 4.25 mol %, greater than or equal to 0.1 mol % and less than or equal to 4 mol %, greater than or equal to 0.5 mol % and less than or equal to 8 mol %, greater than or equal to 0.5 mol % and less than or equal to 7 mol %, greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4.25 mol %, greater than or equal to 0.5 mol % and less than or equal to 4 mol %, greater than or equal to 1 mol % and less than or equal to 8 mol %, greater than or equal to 1 mol % and less than or equal to 7 mol %, greater than or equal to 1 mol % and less than or equal to 6 mol %, greater than or equal to 1 mol % and less than or equal to 5.5 mol %, greater than or equal to 1 mol % and less than or equal to 5 mol %, greater than or equal to 1 mol % and less than or equal to 4.5 mol %, greater than or equal to 1 mol % and less than or equal to 4.25 mol %, greater than or equal to 1 mol % and less than or equal to 4 mol %, greater than or equal to 1.5 mol % and less than or equal to 8 mol %, greater than or equal to 1.5 mol % and less than or equal to 7 mol %, greater than or equal to 1.5 mol % and less than or equal to 6 mol %, greater than or equal to 1.5 mol % and less than or equal to 5.5 mol %, greater than or equal to 1.5 mol % and less than or equal to 5 mol %, greater than or equal to 1.5 mol % and less than or equal to 4.5 mol %, greater than or equal to 1.5 mol % and less than or equal to 4.25 mol %, greater than or equal to 1.5 mol % and less than or equal to 4 mol %, greater than or equal to 2 mol % and less than or equal to 8 mol %, greater than or equal to 2 mol % and less than or equal to 7 mol %, greater than or equal to 2 mol % and less than or equal to 6 mol %, greater than or equal to 2 mol % and less than or equal to 5.5 mol %, greater than or equal to 2 mol % and less than or equal to 5 mol %, greater than or equal to 2 mol % and less than or equal to 4.5 mol %, greater than or equal to 2 mol % and less than or equal to 4.25 mol %, greater than or equal to 2 mol % and less than or equal to 4 mol %, greater than or equal to 2.5 mol % and less than or equal to 8 mol %, greater than or equal to 2.5 mol % and less than or equal to 7 mol %, greater than or equal to 2.5 mol % and less than or equal to 6 mol %, greater than or equal to 2.5 mol % and less than or equal to 5.5 mol %, greater than or equal to 2.5 mol % and less than or equal to 5 mol %, greater than or equal to 2.5 mol % and less than or equal to 4.5 mol %, greater than or equal to 2.5 mol % and less than or equal to 4.25 mol %, greater than or equal to 2.5 mol % and less than or equal to 4 mol %, greater than or equal to 3 mol % and less than or equal to 8 mol %, greater than or equal to 3 mol % and less than or equal to 7 mol %, greater than or equal to 3 mol % and less than or equal to 6 mol %, greater than or equal to 3 mol % and less than or equal to 5.5 mol %, greater than or equal to 3 mol % and less than or equal to 5 mol %, greater than or equal to 3 mol % and less than or equal to 4.5 mol %, greater than or equal to 3 mol % and less than or equal to 4.25 mol %, greater than or equal to 3 mol % and less than or equal to 4 mol %, greater than or equal to 3 mol % and less than or equal to 8 mol %, greater than or equal to 3 mol % and less than or equal to 7 mol %, greater than or equal to 3.5 mol % and less than or equal to 6 mol %, greater than or equal to 3.5 mol % and less than or equal to 5.5 mol %, greater than or equal to 3.5 mol % and less than or equal to 5 mol %, or even greater than or equal to 3.5 mol % and less than or equal to 4.5 mol %, greater than or equal to 3.5 mol % and less than or equal to 4.25 mol %, greater than or equal to 3.5 mol % and less than or equal to 4 mol %, or any and all sub-ranges formed from any of these endpoints.

In addition to improving colorant retention, MgO lowers the viscosity of the glass compositions, which enhances the formability, the strain point, and the Young's modulus, and may improve ion-exchangeability. However, when too much MgO is added to the glass composition, the diffusivity of sodium and potassium ions in the glass composition decreases which, in turn, adversely impacts the ion-exchange performance (i.e., the ability to ion-exchange) of the resultant colored glass article.

In embodiments, the glass composition and the resultant colored glass article may comprise greater than or equal to 0 mol % and less than or equal to 8 mol % MgO or even greater than or equal to 0 mol % and less than or equal to 4.5 mol % MgO. In embodiments, the glass composition and the resultant colored glass article may comprise greater than or equal to 0.5 mol % and less than or equal to 7 mol % MgO. In embodiments, the concentration of MgO in the glass composition may be greater than or equal to 0 mol %, greater than or equal to 0.5 mol %, greater than or equal to 1 mol %, greater than or equal to 1.5 mol %, greater than or equal to 2 mol %, or even greater than or equal to 2.5 mol %. In embodiments, the concentration of MgO in the glass composition may be less than or equal to 8 mol %, less than or equal to 7 mol %, less than or equal to 6 mol %, less than or equal to 5.5 mol %, less than or equal to 5 mol %, less than or equal to 4.5 mol %, less than or equal to 4 mol %, less than or equal to 3.5 mol %, less than or equal to 3 mol %, less than or equal to 2.5 mol %, less than or equal to 2 mol %, less than or equal to 1.5 mol %, or even less than or equal to 1 mol %. In embodiments, the concentration of MgO in the glass composition may be greater than or equal to 0 mol % and less than or equal to 8 mol %, greater than or equal to 0 mol % and less than or equal to 7 mol %, greater than or equal to 0 mol % and less than or equal to 6 mol %, greater than or equal to 0 mol % and less than or equal to 5.5 mol %, greater than or equal to 0 mol % and less than or equal to 5 mol %, greater than or equal to 0 mol % and less than or equal to 4.5 mol %, greater than or equal to 0 mol % and less than or equal to 4 mol %, greater than or equal to 0 mol % and less than or equal to 3.5 mol %, greater than or equal to 0 mol % and less than or equal to 3 mol %, greater than or equal to 0 mol % and less than or equal to 2.5 mol %, greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.5 mol %, greater than or equal to 0.5 mol % and less than or equal to 8 mol %, greater than or equal to 0.5 mol % and less than or equal to 7 mol %, greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 0.5 mol % and less than or equal to 3 mol %, greater than or equal to 0.5 mol % and less than or equal to 2.5 mol %, greater than or equal to 0.5 mol % and less than or equal to 2 mol %, greater than or equal to 0.5 mol % and less than or equal to 1.5 mol %, greater than or equal to 0.5 mol % and less than or equal to 1 mol %, greater than or equal to 1 mol % and less than or equal to 8 mol %, greater than or equal to 1 mol % and less than or equal to 7 mol %, greater than or equal to 1 mol % and less than or equal to 6 mol %, greater than or equal to 1 mol % and less than or equal to 5.5 mol %, greater than or equal to 1 mol % and less than or equal to 5 mol %, greater than or equal to 1 mol % and less than or equal to 4.5 mol %, greater than or equal to 1 mol % and less than or equal to 4 mol %, greater than or equal to 1 mol % and less than or equal to 3.5 mol %, greater than or equal to 1 mol % and less than or equal to 3 mol %, greater than or equal to 1 mol % and less than or equal to 2.5 mol %, greater than or equal to 1 mol % and less than or equal to 2 mol %, greater than or equal to 1 mol % and less than or equal to 1.5 mol %, greater than or equal to 1.5 mol % and less than or equal to 8 mol %, greater than or equal to 1.5 mol % and less than or equal to 7 mol %, greater than or equal to 1.5 mol % and less than or equal to 6 mol %, greater than or equal to 1.5 mol % and less than or equal to 5.5 mol %, greater than or equal to 1.5 mol % and less than or equal to 5 mol %, greater than or equal to 1.5 mol % and less than or equal to 4.5 mol %, greater than or equal to 1.5 mol % and less than or equal to 4 mol %, greater than or equal to 1.5 mol % and less than or equal to 3.5 mol %, greater than or equal to 1.5 mol % and less than or equal to 3 mol %, greater than or equal to 1.5 mol % and less than or equal to 2.5 mol %, greater than or equal to 1.5 mol % and less than or equal to 2 mol %, greater than or equal to 2 mol % and less than or equal to 8 mol %, greater than or equal to 2 mol % and less than or equal to 7 mol %, greater than or equal to 2 mol % and less than or equal to 6 mol %, greater than or equal to 2 mol % and less than or equal to 5.5 mol %, greater than or equal to 2 mol % and less than or equal to 5 mol %, greater than or equal to 2 mol % and less than or equal to 4.5 mol %, greater than or equal to 2 mol % and less than or equal to 4 mol %, greater than or equal to 2 mol % and less than or equal to 3.5 mol %, greater than or equal to 2 mol % and less than or equal to 3 mol %, greater than or equal to 2 mol % and less than or equal to 2.5 mol %, greater than or equal to 0 mol % and less than or equal to 8 mol %, greater than or equal to 2.5 mol % and less than or equal to 7 mol %, greater than or equal to 2.5 mol % and less than or equal to 6 mol %, greater than or equal to 2.5 mol % and less than or equal to 5.5 mol %, greater than or equal to 2.5 mol % and less than or equal to 5 mol %, greater than or equal to 2.5 mol % and less than or equal to 4.5 mol %, greater than or equal to 2.5 mol % and less than or equal to 4 mol %, greater than or equal to 2.5 mol % and less than or equal to 3.5 mol %, or even greater than or equal to 2.5 mol % and less than or equal to 3 mol %, or any and all sub-ranges formed from any of these endpoints. In embodiments, the glass composition and the resultant colored glass article may be substantially free or free of MgO.

In embodiments, the glass composition and the resultant colored glass article may comprise greater than or equal to 0 mol % and less than or equal to 6 mol % MgO. In embodiments, the glass composition and the resultant colored glass article may comprise greater than or equal to 0.1 mol % and less than or equal to 5 mol % MgO. In embodiments, the concentration of MgO in the glass composition may be greater than or equal to 0 mol %, greater than or equal to 0.1 mol %, or even greater than or equal to 0.5 mol %. In embodiments, the concentration of MgO in the glass composition may be less than or equal to 6 mol %, less than or equal to 5 mol %, less than or equal to 4 mol %, less than or equal to 3 mol %, less than or equal to 2 mol %, or even less than or equal to 1 mol %. In embodiments, the concentration of MgO in the glass composition may be greater than or equal to 0 mol % and less than or equal to 6 mol %, greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0 mol % and less than or equal to 2 mol %, greater than or equal to 0 mol % and less than or equal to 1 mol %, greater than or equal to 0.1 mol % and less than or equal to 6 mol %, greater than or equal to 0.1 mol % and less than or equal to 5 mol %, greater than or equal to 0.1 mol % and less than or equal to 4 mol %, greater than or equal to 0.1 mol % and less than or equal to 3 mol %, greater than or equal to 0.1 mol % and less than or equal to 2 mol %, greater than or equal to 0.1 mol % and less than or equal to 1 mol %, greater than or equal to 0.5 mol % and less than or equal to 6 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 0.5 mol % and less than or equal to 2 mol %, or even greater than or equal to 0.5 mol % and less than or equal to 1 mol %, or any and all sub-ranges formed from any of these endpoints. In embodiments, the glass composition and the resultant colored glass article may be substantially free or free of MgO.

In addition to improving colorant retention, ZnO lowers the viscosity of the glass compositions, which enhances the formability, the strain point, and the Young's modulus, and may improve ion-exchangeability. However, when too much ZnO is added to the glass composition, the diffusivity of sodium and potassium ions in the glass composition decreases which, in turn, adversely impacts the ion-exchange performance (i.e., the ability to ion-exchange) of the resultant colored glass article.

In embodiments, the glass composition and the resultant colored glass article may comprise greater than or equal to 0 mol % and less than or equal to 5 mol % ZnO or even greater than or equal to 0 mol % and less than or equal to 4.5 mol % ZnO. In embodiments, the glass composition and the resultant colored glass article may comprise greater than or equal to 0.1 mol % and less than or equal to 4 mol % ZnO. In embodiments, the concentration of ZnO in the glass composition may be greater than or equal to 0 mol %, greater than or equal to 0.1 mol %, greater than or equal to 0.25 mol %, greater than or equal to 0.5 mol %, greater than or equal to 0.75 mol %, greater than or equal to 1 mol %, greater than or equal to 1.5 mol %, or even greater than or equal to 2 mol %. In embodiments, the concentration of ZnO in the glass composition may be less than or equal to 5 mol %, less than or equal to 4.5 mol %, less than or equal to 4 mol %, less than or equal to 3.5 mol %, less than or equal to 3 mol %, less than or equal to 2.5 mol %, less than or equal to 2 mol %, less than or equal to 1.75 mol %, less than or equal to 1.5 mol %, less than or equal to 1.25 mol %, or even less than or equal to 1 mol %. In embodiments, the concentration of ZnO in the glass composition may be greater than or equal to 0 mol % and less than or equal to 5 mol %, greater than or equal to 0 mol % and less than or equal to 4.5 mol %, greater than or equal to 0 mol % and less than or equal to 4 mol %, greater than or equal to 0 mol % and less than or equal to 3.5 mol %, greater than or equal to 0 mol % and less than or equal to 3 mol %, greater than or equal to 0 mol % and less than or equal to 2.5 mol %, greater than or equal to 0 mol % and less than or equal to 2 mol %, greater than or equal to 0 mol % and less than or equal to 1.75 mol %, greater than or equal to 0 mol % and less than or equal to 1.5 mol %, greater than or equal to 0 mol % and less than or equal to 1.25 mol %, greater than or equal to 0 mol % and less than or equal to 1 mol %, greater than or equal to 0.1 mol % and less than or equal to 5 mol %, greater than or equal to 0.1 mol % and less than or equal to 4.5 mol %, greater than or equal to 0.1 mol % and less than or equal to 4 mol %, greater than or equal to 0.1 mol % and less than or equal to 3.5 mol %, greater than or equal to 0.1 mol % and less than or equal to 3 mol %, greater than or equal to 0.1 mol % and less than or equal to 2.5 mol %, greater than or equal to 0.1 mol % and less than or equal to 2 mol %, greater than or equal to 0.1 mol % and less than or equal to 1.75 mol %, greater than or equal to 0.1 mol % and less than or equal to 1.5 mol %, greater than or equal to 0.1 mol % and less than or equal to 1.25 mol %, greater than or equal to 0.1 mol % and less than or equal to 1 mol %, greater than or equal to 0.25 mol % and less than or equal to 5 mol %, greater than or equal to 0.25 mol % and less than or equal to 4.5 mol %, greater than or equal to 0.25 mol % and less than or equal to 4 mol %, greater than or equal to 0.25 mol % and less than or equal to 3.5 mol %, greater than or equal to 0.25 mol % and less than or equal to 3 mol %, greater than or equal to 0.25 mol % and less than or equal to 2.5 mol %, greater than or equal to 0.25 mol % and less than or equal to 2 mol %, greater than or equal to 0.25 mol % and less than or equal to 1.75 mol %, greater than or equal to 0.25 mol % and less than or equal to 1.5 mol %, greater than or equal to 0.25 mol % and less than or equal to 1.25 mol %, greater than or equal to 0.25 mol % and less than or equal to 1 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 0.5 mol % and less than or equal to 3 mol %, greater than or equal to 0.5 mol % and less than or equal to 2.5 mol %, greater than or equal to 0.5 mol % and less than or equal to 2 mol %, greater than or equal to 0.5 mol % and less than or equal to 1.75 mol %, greater than or equal to 0.5 mol % and less than or equal to 1.5 mol %, greater than or equal to 0.5 mol % and less than or equal to 1.25 mol %, greater than or equal to 0.5 mol % and less than or equal to 1 mol %, greater than or equal to 0.75 mol % and less than or equal to 5 mol %, greater than or equal to 0.75 mol % and less than or equal to 4 mol %, greater than or equal to 0.75 mol % and less than or equal to 3 mol %, greater than or equal to 0.75 mol % and less than or equal to 2.5 mol %, greater than or equal to 0.75 mol % and less than or equal to 2 mol %, greater than or equal to 0.75 mol % and less than or equal to 1.75 mol %, greater than or equal to 0.75 mol % and less than or equal to 1.5 mol %, greater than or equal to 0.75 mol % and less than or equal to 1.25 mol %, greater than or equal to 1 mol % and less than or equal to 1 mol %, greater than or equal to 1 mol % and less than or equal to 5 mol %, greater than or equal to 1 mol % and less than or equal to 4.5 mol %, greater than or equal to 1 mol % and less than or equal to 4 mol %, greater than or equal to 1 mol % and less than or equal to 3.5 mol %, greater than or equal to 1 mol % and less than or equal to 3 mol %, greater than or equal to 1 mol % and less than or equal to 2.5 mol %, greater than or equal to 1 mol % and less than or equal to 2 mol %, greater than or equal to 1 mol % and less than or equal to 1.75 mol %, greater than or equal to 1 mol % and less than or equal to 1.5 mol %, greater than or equal to 1 mol % and less than or equal to 1.25 mol %, greater than or equal to 1.5 mol % and less than or equal to 5 mol %, greater than or equal to 1.5 mol % and less than or equal to 4.5 mol %, greater than or equal to 1.5 mol % and less than or equal to 4 mol %, greater than or equal to 1.5 mol % and less than or equal to 3.5 mol %, greater than or equal to 1.5 mol % and less than or equal to 3 mol %, greater than or equal to 1.5 mol % and less than or equal to 2.5 mol %, greater than or equal to 1.5 mol % and less than or equal to 2 mol %, greater than or equal to 1.5 mol % and less than or equal to 1.75 mol %, greater than or equal to 2 mol % and less than or equal to 5 mol %, greater than or equal to 2 mol % and less than or equal to 4.5 mol %, greater than or equal to 2 mol % and less than or equal to 4 mol %, greater than or equal to 2 mol % and less than or equal to 3.5 mol %, greater than or equal to 2 mol % and less than or equal to 3 mol %, or even greater than or equal to 2 mol % and less than or equal to 2.5 mol %, or any and all sub-ranges formed from any of these endpoints. In embodiments, the glass composition and the resultant colored glass article may be substantially free or free of ZnO.

Like ZnO and the alkaline earth oxide MgO, other alkaline earth oxides, such as CaO, SrO and BaO, decrease the melting point of the glass composition. Accordingly, CaO, SrO, and/or BaO may be included in the glass composition and the resultant colored glass articles to lower the melting point of the glass composition, which may help improve colorant retention.

In embodiments, the glass compositions and the resultant colored glass articles described herein may further comprise CaO. CaO lowers the viscosity of a glass composition, which enhances the formability, the strain point and the Young's modulus, and may improve the ion-exchangeability. However, when too much CaO is added to the glass composition, the diffusivity of sodium and potassium ions in the glass composition decreases which, in turn, adversely impacts the ion-exchange performance (i.e., the ability to ion-exchange) of the resultant glass.

In embodiments, the concentration of CaO in the glass composition and the resultant colored glass article may be greater than or equal to 0 mol %, greater than or equal to 0.25 mol %, greater than or equal to 0.5 mol %, or even greater than or equal to 0.75 mol %. In embodiments, the concentration of CaO in the glass composition and the resultant colored glass article may be less than or equal to 7 mol %, less than or equal to 6.5 mol %, less than or equal to 6 mol %, less than or equal to 5.5 mol %, less than or equal to 5 mol %, less than or equal to 4.5 mol %, less than or equal to 4 mol %, less than or equal to 3.5 mol %, less than or equal to 3 mol %, less than or equal to 2.5 mol %, less than or equal to 2 mol %, less than or equal to 1.75 mol %, less than or equal to 1.5 mol %, less than or equal to 1.25 mol %, or even less than or equal to 1 mol %. In embodiments, the concentration of CaO in the glass composition and the resultant colored glass article may be greater than or equal to 0 mol % and less than or equal to 7 mol %, greater than or equal to 0 mol % and less than or equal to 6.5 mol %, greater than or equal to 0 mol % and less than or equal to 6 mol %, greater than or equal to 0 mol % and less than or equal to 5.5 mol %, greater than or equal to 0 mol % and less than or equal to 5 mol %, greater than or equal to 0 mol % and less than or equal to 4.5 mol %, greater than or equal to 0 mol % and less than or equal to 4 mol %, greater than or equal to 0 mol % and less than or equal to 3.5 mol %, greater than or equal to 0 mol % and less than or equal to 3 mol %, greater than or equal to 0 mol % and less than or equal to 2.5 mol %, greater than or equal to 0 mol % and less than or equal to 2 mol %, greater than or equal to 0 mol % and less than or equal to 1.75 mol %, greater than or equal to 0 mol % and less than or equal to 1.5 mol %, greater than or equal to 0 mol % and less than or equal to 1.25 mol %, greater than or equal to 0 mol % and less than or equal to 1 mol %, greater than or equal to 0.25 mol % and less than or equal to 7 mol %, greater than or equal to 0.25 mol % and less than or equal to 6.5 mol %, greater than or equal to 0.25 mol % and less than or equal to 6 mol %, greater than or equal to 0.25 mol % and less than or equal to 5.5 mol %, greater than or equal to 0.25 mol % and less than or equal to 5 mol %, greater than or equal to 0.25 mol % and less than or equal to 4.5 mol %, greater than or equal to 0.25 mol % and less than or equal to 4 mol %, greater than or equal to 0.25 mol % and less than or equal to 3.5 mol %, greater than or equal to 0.25 mol % and less than or equal to 3 mol %, greater than or equal to 0.25 mol % and less than or equal to 2.5 mol %, greater than or equal to 0.25 mol % and less than or equal to 2 mol %, greater than or equal to 0.25 mol % and less than or equal to 1.75 mol %, greater than or equal to 0.25 mol % and less than or equal to 1.5 mol %, greater than or equal to 0.25 mol % and less than or equal to 1.25 mol %, greater than or equal to 0.25 mol % and less than or equal to 1 mol %, greater than or equal to 0.5 mol % and less than or equal to 7 mol %, greater than or equal to 0.5 mol % and less than or equal to 6.5 mol %, greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 0.5 mol % and less than or equal to 3 mol %, greater than or equal to 0.5 mol % and less than or equal to 2.5 mol %, greater than or equal to 0.5 mol % and less than or equal to 2 mol %, greater than or equal to 0.5 mol % and less than or equal to 1.75 mol %, greater than or equal to 0.5 mol % and less than or equal to 1.5 mol %, greater than or equal to 0.5 mol % and less than or equal to 1.25 mol %, greater than or equal to 0.5 mol % and less than or equal to 1 mol %, greater than or equal to 0.75 mol % and less than or equal to 7 mol %, greater than or equal to 0.75 mol % and less than or equal to 6.5 mol %, greater than or equal to 0.75 mol % and less than or equal to 6 mol %, greater than or equal to 0.75 mol % and less than or equal to 5.5 mol %, greater than or equal to 0.75 mol % and less than or equal to 5 mol %, greater than or equal to 0.75 mol % and less than or equal to 4.5 mol %, greater than or equal to 0.75 mol % and less than or equal to 4 mol %, greater than or equal to 0.75 mol % and less than or equal to 3.5 mol %, greater than or equal to 0.75 mol % and less than or equal to 3 mol %, greater than or equal to 0.75 mol % and less than or equal to 2.5 mol %, greater than or equal to 0.75 mol % and less than or equal to 2 mol %, greater than or equal to 0.75 mol % and less than or equal to 1.75 mol %, greater than or equal to 0.75 mol % and less than or equal to 1.5 mol %, greater than or equal to 0.75 mol % and less than or equal to 1.25 mol %, or even greater than or equal to 0.75 mol % and less than or equal to 1 mol %, or any and all sub-ranges formed from any of these endpoints. In embodiments, the glass composition and the resultant colored glass article may be substantially free or free of CaO.

In embodiments, the concentration of SrO in the glass composition and the resultant colored glass article may be greater than or equal to 0 mol %, greater than or equal to 0.25 mol %, greater than or equal to 0.5 mol %, or even greater than or equal to 0.75 mol %. In embodiments, the concentration of SrO in the glass composition and the resultant colored glass article may be less than or equal to 2 mol %, less than or equal to 1.75 mol %, less than or equal to 1.5 mol %, less than or equal to 1.25 mol %, or even less than or equal to 1 mol %. In embodiments, the concentration of SrO in the glass composition and the resultant colored glass article may be greater than or equal to 0 mol % and less than or equal to 2 mol %, greater than or equal to 0 mol % and less than or equal to 1.75 mol %, greater than or equal to 0 mol % and less than or equal to 1.5 mol %, greater than or equal to 0 mol % and less than or equal to 1.25 mol %, greater than or equal to 0 mol % and less than or equal to 1 mol %, greater than or equal to 0.25 mol % and less than or equal to 2 mol %, greater than or equal to 0.25 mol % and less than or equal to 1.75 mol %, greater than or equal to 0.25 mol % and less than or equal to 1.5 mol %, greater than or equal to 0.25 mol % and less than or equal to 1.25 mol %, greater than or equal to 0.25 mol % and less than or equal to 1 mol %, greater than or equal to 0.5 mol % and less than or equal to 2 mol %, greater than or equal to 0.5 mol % and less than or equal to 1.75 mol %, greater than or equal to 0.5 mol % and less than or equal to 1.5 mol %, greater than or equal to 0.5 mol % and less than or equal to 1.25 mol %, greater than or equal to 0.5 mol % and less than or equal to 1 mol %, greater than or equal to 0.75 mol % and less than or equal to 2 mol %, greater than or equal to 0.75 mol % and less than or equal to 1.75 mol %, greater than or equal to 0.75 mol % and less than or equal to 1.5 mol %, greater than or equal to 0.75 mol % and less than or equal to 1.25 mol %, or even greater than or equal to 0.75 mol % and less than or equal to 1 mol %, or any and all sub-ranges formed from any of these endpoints. In embodiments, the glass composition and the resultant colored glass article may be substantially free or free of SrO.

In embodiments, the concentration of BaO in the glass composition and the resultant colored glass article may be greater than or equal to 0 mol %, greater than or equal to 0.25 mol %, greater than or equal to 0.5 mol %, or even greater than or equal to 0.75 mol %. In embodiments, the concentration of BaO in the glass composition and the resultant colored glass article may be less than or equal to 2 mol %, less than or equal to 1.75 mol %, less than or equal to 1.5 mol %, less than or equal to 1.25 mol %, or even less than or equal to 1 mol %. In embodiments, the concentration of BaO in the glass composition and the resultant colored glass article may be greater than or equal to 0 mol % and less than or equal to 2 mol %, greater than or equal to 0 mol % and less than or equal to 1.75 mol %, greater than or equal to 0 mol % and less than or equal to 1.5 mol %, greater than or equal to 0 mol % and less than or equal to 1.25 mol %, greater than or equal to 0 mol % and less than or equal to 1 mol %, greater than or equal to 0.25 mol % and less than or equal to 2 mol %, greater than or equal to 0.25 mol % and less than or equal to 1.75 mol %, greater than or equal to 0.25 mol % and less than or equal to 1.5 mol %, greater than or equal to 0.25 mol % and less than or equal to 1.25 mol %, greater than or equal to 0.25 mol % and less than or equal to 1 mol %, greater than or equal to 0.5 mol % and less than or equal to 2 mol %, greater than or equal to 0.5 mol % and less than or equal to 1.75 mol %, greater than or equal to 0.5 mol % and less than or equal to 1.5 mol %, greater than or equal to 0.5 mol % and less than or equal to 1.25 mol %, greater than or equal to 0.5 mol % and less than or equal to 1 mol %, greater than or equal to 0.75 mol % and less than or equal to 2 mol %, greater than or equal to 0.75 mol % and less than or equal to 1.75 mol %, greater than or equal to 0.75 mol % and less than or equal to 1.5 mol %, greater than or equal to 0.75 mol % and less than or equal to 1.25 mol %, or even greater than or equal to 0.75 mol % and less than or equal to 1 mol %, or any and all sub-ranges formed from any of these endpoints. In embodiments, the glass composition and the resultant colored glass article may be substantially free or free of BaO.

R'O, as used herein, is the sum (in mol %) of MgO, ZnO, CaO, BaO, and SrO (i.e. R'O=MgO (mol %)+ZnO (mol %)+CaO (mol %)+BaO (mol %)+SrO (mol %)). In embodiments, the concentration of R'O in the glass composition and the resultant colored glass article may be greater than or equal to 0 mol %, greater than or equal to 0.5 mol %, greater than or equal to 1 mol %, greater than or equal to 1.5 mol %, greater than or equal to 2 mol %, or even greater than or equal to 2.5 mol %. In embodiments, the concentration of R'O in the glass composition and the resultant colored glass article may be less than or equal to 8 mol %, less than or equal to 7.5 mol %, less than or equal to 7 mol %, less than or equal to 6.5 mol %, less than or equal to 6 mol %, less than or equal to 5 mol %, less than or equal to 5 mol %, less than or equal to 4.5 mol %, less than or equal to 4 mol %, or even less than or equal to 3.5 mol %. In embodiments, the concentration of R'O in the glass composition and the resultant colored glass article may be greater than or equal to 0 mol % and less than or equal to 8 mol %, greater than or equal to 0 mol % and less than or equal to 7.5 mol %, greater than or equal to 0 mol % and less than or equal to 7 mol %, greater than or equal to 0 mol % and less than or equal to 6.5 mol %, greater than or equal to 0 mol % and less than or equal to 6 mol %, greater than or equal to 0 mol % and less than or equal to 5.5 mol %, greater than or equal to 0 mol % and less than or equal to 5 mol %, greater than or equal to 0 mol % and less than or equal to 4.5 mol %, greater than or equal to 0 mol % and less than or equal to 4 mol %, greater than or equal to 0 mol % and less than or equal to 3.5 mol %, greater than or equal to 0.5 mol % and less than or equal to 8 mol %, greater than or equal to 0.5 mol % and less than or equal to 7.5 mol %, greater than or equal to 0.5 mol % and less than or equal to 7 mol %, greater than or equal to 0.5 mol % and less than or equal to 6.5 mol %, greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 0.5 mol % and less than or equal to 8 mol %, greater than or equal to 1 mol % and less than or equal to 7.5 mol %, greater than or equal to 0.5 mol % and less than or equal to 7 mol %, greater than or equal to 1 mol % and less than or equal to 6.5 mol %, greater than or equal to 0.5 mol % and less than or equal to 6 mol %, greater than or equal to 1 mol % and less than or equal to 5.5 mol %, greater than or equal to 1 mol % and less than or equal to 5 mol %, greater than or equal to 1 mol % and less than or equal to 4.5 mol %, greater than or equal to 1 mol % and less than or equal to 4 mol %, greater than or equal to 1 mol % and less than or equal to 3.5 mol %, greater than or equal to 1.5 mol % and less than or equal to 8 mol %, greater than or equal to 1.5 mol % and less than or equal to 7.5 mol %, greater than or equal to 1.5 mol % and less than or equal to 7 mol %, greater than or equal to 1.5 mol % and less than or equal to 6.5 mol %, greater than or equal to 1.5 mol % and less than or equal to 6 mol %, greater than or equal to 1.5 mol % and less than or equal to 5.5 mol %, greater than or equal to 1.5 mol % and less than or equal to 5 mol %, greater than or equal to 1.5 mol % and less than or equal to 4.5 mol %, greater than or equal to 1.5 mol % and less than or equal to 4 mol %, greater than or equal to 1.5 mol % and less than or equal to 3.5 mol %, greater than or equal to 2 mol % and less than or equal to 8 mol %, greater than or equal to 2 mol % and less than or equal to 7.5 mol %, greater than or equal to 2 mol % and less than or equal to 7 mol %, greater than or equal to 2 mol % and less than or equal to 6.5 mol %, greater than or equal to 2 mol % and less than or equal to 6 mol %, greater than or equal to 2 mol % and less than or equal to 5.5 mol %, greater than or equal to 2 mol % and less than or equal to 5 mol %, greater than or equal to 2 mol % and less than or equal to 4.5 mol %, greater than or equal to 2 mol % and less than or equal to 4 mol %, greater than or equal to 2 mol % and less than or equal to 3.5 mol %, greater than or equal to 2.5 mol % and less than or equal to 8 mol %, greater than or equal to 2.5 mol % and less than or equal to 7.5 mol %, greater than or equal to 2.5 mol % and less than or equal to 7 mol %, greater than or equal to 2.5 mol % and less than or equal to 6.5 mol %, greater than or equal to 2.5 mol % and less than or equal to 6 mol %, greater than or equal to 2.5 mol % and less than or equal to 5.5 mol %, greater than or equal to 2.5 mol % and less than or equal to 5 mol %, greater than or equal to 2.5 mol % and less than or equal to 4.5 mol %, greater than or equal to 2.5 mol % and less than or equal to 4 mol %, or even greater than or equal to 2.5 mol % and less than or equal to 3.5 mol %, or any and all sub-ranges formed from any of these endpoints.

In embodiments, the sum of $R_2O$, CaO, MgO, and ZnO ($R_2O$ (mol %)+CaO (mol %)+MgO (mol %)+ZnO (mol %) may be less than or equal to 35 mol %. While not wishing to be bound by theory, it is believed that minimizing the combination of $R_2O$, CaO, MgO, and ZnO in the glass composition may provide the resultant colored glass article with a desirable dielectric constant, such as when the colored glass article is used as a portion of a housing for an electronic device. In embodiments, $R_2O$ (mol %)+CaO (mol %)+MgO (mol %)+ZnO (mol %) may be greater than or equal to 1 mol % and less than or equal to 35 mol %, greater than or equal to 1 mol % and less than or equal to 30 mol %, greater than or equal to 1 mol % and less than or equal to 25 mol %, greater than or equal to 1 mol % and less than or equal to 20 mol %, greater than or equal to 1 mol % and less than or equal to 15 mol %, greater than or equal to 1 mol % and less than or equal to 10 mol %, greater than or equal to 2 mol % and less than or equal to 35 mol %, greater than or equal to 2 mol % and less than or equal to 30 mol %, greater than or equal to 2 mol % and less than or equal to 25 mol %, greater than or equal to 2 mol % and less than or equal to 20 mol %, greater than or equal to 2 mol % and less than or equal to 15 mol %, greater than or equal to 2 mol % and less than or equal to 10 mol %, greater than or equal to 3 mol % and less than or equal to 35 mol %, greater than or equal to 3 mol % and less than or equal to 30 mol %, greater than or equal to 3 mol % and less than or equal to 25 mol %, greater than or equal to 3 mol % and less than or equal to 20 mol %, greater than or equal to 3 mol % and less than or equal to 15 mol %, greater than or equal to 3 mol % and less than or equal to 10 mol %, greater than or equal to 4 mol % and less than or equal to 35 mol %, greater than or equal to 4 mol % and less than or equal to 30 mol %, greater than or equal to 4 mol % and less than or equal to 25 mol %, greater than or equal to 4 mol % and less than or equal to 20 mol %, greater than or equal to 4 mol % and less than or equal to 15 mol %, greater than or equal to 4 mol % and less than or equal to 10 mol %, greater than or equal to 4 mol % and less than or equal to 35 mol %, greater than or equal to 5 mol % and less than or equal to 30 mol %, greater than or equal to 5 mol % and less than or equal to 25 mol %, greater than or equal to 5 mol % and less than or equal to 20 mol %, greater than or equal to 5 mol % and less than or equal to 15 mol %, greater than or equal to 5 mol % and less than or equal to 10 mol %, greater than or equal to 6 mol % and less than or equal to 35 mol %, greater than or equal to 6 mol % and less than or equal to 30 mol %, greater than or equal to 6 mol % and less than or equal to 25 mol %, greater than or equal to 6 mol % and less than or equal to 20 mol %, greater than or equal to 6 mol % and less than or equal to 15 mol %, greater than or equal to 6 mol % and less than or equal to 10 mol %, greater than or equal to 7 mol % and less than or equal to 35 mol %, greater than or equal to 7 mol % and less than or equal to 30 mol %, greater than or equal to 7 mol % and less than or equal to 25 mol %, greater than or equal to 7 mol % and less than or equal to 20 mol %, greater than or equal to 7 mol % and less than or equal to 15 mol %, greater than or equal to 7 mol % and less than or equal to 10 mol %, greater than or equal to 8 mol % and less than or equal to 35 mol %, greater than or equal to 8 mol % and less than or equal to 30 mol %, greater than or equal to 8 mol % and less than or equal to 25 mol %, greater than or equal to 8 mol % and less than or equal to 20 mol %, greater than or equal to 8 mol % and less than or equal to 15 mol %, or even greater than or equal to 8 mol % and less than or equal to 10 mol %.

In embodiments, the sum of $Al_2O_3$, MgO, and ZnO present in the glass composition and the resultant colored glass article (i.e., $Al_2O_3$ (mol %)+MgO (mol %)+ZnO (mol %)) may be greater than or equal to 12 mol % and less than or equal to 22 mol %. While not wishing to be bound by theory, it is believed that combinations of $Al_2O_3$, MgO, and ZnO within this range may aid in avoiding the formation of undesired crystal phases in the resultant colored glass articles. For example and without limitation, when the colorant package in the glass composition and the resultant colored glass article includes $Cr_2O_3$, combinations of $Al_2O_3$, MgO, and ZnO within this range may avoid the formation of Cr-spinel crystals by increasing the solubility of the $Cr_2O_3$ colorant and thereby expanding the color gamut that may be achieved in the resultant colored glass articles. Without wishing to be bound by theory, it is hypothesized that similar behavior may occur with colorants other than $Cr_2O_3$.

In embodiments, the sum of $Al_2O_3$, MgO, and ZnO in the glass composition and the resultant colored glass article may be greater than or equal to 13 mol % and less than or equal to 21.5 mol %. In embodiments, the sum of $Al_2O_3$, MgO, and ZnO in the glass composition and the resultant colored glass article may be greater than or equal to 12 mol %, greater than or equal to 13 mol %, greater than or equal to 14 mol %, greater than or equal to 15 mol %, or even greater than or equal to 16 mol %. In embodiments, the sum of $Al_2O_3$, MgO, and ZnO in the glass composition and the resultant colored glass article may be less than or equal to 22 mol %, less than or equal to 21.5 mol %, less than or equal to 21 mol %, less than or equal to 20.5 mol %, or even less than or equal to 20 mol %. In embodiments, the sum of $Al_2O_3$, MgO, and ZnO in the glass composition and the resultant colored glass article may be greater than or equal to 12 mol % and less than or equal to 22 mol %, greater than or equal to 12 mol % and less than or equal to 21.5 mol %, greater than or equal to 12 mol % and less than or equal to 21 mol %, greater than or equal to 12 mol % and less than or equal to 20.5 mol %, greater than or equal to 12 mol % and less than or equal to 20 mol %, greater than or equal to 13 mol % and less than or equal to 22 mol %, greater than or equal to 13 mol % and less than or equal to 21.5 mol %, greater than or equal to 13 mol % and less than or equal to 21 mol %, greater than or equal to 13 mol % and less than or equal to 20.5 mol %, greater than or equal to 13 mol % and less than or equal to 20 mol %, greater than or equal to 14 mol % and less than or equal to 22 mol %, greater than or equal to 14 mol % and less than or equal to 21.5 mol %, greater than or equal to 14 mol % and less than or equal to 21 mol %, greater than or equal to 14 mol % and less than or equal to 20.5 mol %, greater than or equal to 15 mol % and less than or equal to 20 mol %, greater than or equal to 15 mol % and less than or equal to 22 mol %, greater than or equal to 15 mol % and less than or equal to 21.5 mol %, greater than or equal to 15 mol % and less than or equal to 21 mol %, greater than or equal to 15 mol % and less than or equal to 20.5 mol %, greater than or equal to 15 mol % and less than or equal to 20 mol %, greater than or equal to 16 mol % and less than or equal to 22 mol %, greater than or equal to 16 mol % and less than or equal to 21.5 mol %, greater than or equal to 16 mol % and less than or equal to 21 mol %, greater than or equal to 16 mol % and less than or equal to 20.5 mol %, or even greater than or equal to 16 mol % and less than or equal to 20 mol %, or any and all sub-ranges formed from any of these endpoints.

In embodiments, the sum of $Al_2O_3$, MgO, CaO, and ZnO present in the glass composition and the resultant colored glass article (i.e., $Al_2O_3$ (mol %)+MgO (mol %)+CaO (mol %)+ZnO (mol %)) may be greater than or equal to 12 mol % and less than or equal to 24 mol %. While not wishing to be bound by theory, it is believed that combinations of $Al_2O_3$, MgO, CaO and ZnO within this range may aid in avoiding the formation of undesired crystal phases in the resultant colored glass articles. In addition, a relatively high concentration of high field strength modifiers, such as Mg, Ca, and Zn cations, may also improve the mechanical properties, such as fracture toughness, elastic modulus and drop test performance, of the resultant colored glass article.

In embodiments, the sum of $Al_2O_3$, MgO, CaO and ZnO in the glass composition and the resultant colored glass article may be greater than or equal to 12 mol % and less than or equal to 24 mol %. In embodiments, the sum of $Al_2O_3$, MgO, CaO and ZnO in the glass composition and the resultant colored glass article may be greater than or equal to 12 mol %, greater than or equal to 13 mol %, greater than or equal to 14 mol %, greater than or equal to 15 mol %, or even greater than or equal to 16 mol %. In embodiments, the sum of $Al_2O_3$, MgO, CaO and ZnO in the glass composition and the resultant colored glass article may be less than or equal to 24 mol %, less than or equal to 23 mol %, less than or equal to 22 mol %, less than or equal to 21.5 mol %, less than or equal to 21 mol %, less than or equal to 20.5 mol %, or even less than or equal to 20 mol %. In embodiments, the sum of $Al_2O_3$, MgO, CaO and ZnO in the glass composition and the resultant colored glass article may be greater than or equal to 12 mol % and less than or equal to 24 mol %, greater than or equal to 12 mol % and less than or equal to 23 mol %, greater than or equal to 12 mol % and less than or equal to 22 mol %, greater than or equal to 12 mol % and less than or equal to 21.5 mol %, greater than or equal to 12 mol % and less than or equal to 21 mol %, greater than or equal to 12 mol % and less than or equal to 20.5 mol %, greater than or equal to 12 mol % and less than or equal to 20 mol %, greater than or equal to 13 mol % and less than or equal to 24 mol %, greater than or equal to 13 mol % and less than or equal to 23 mol %, greater than or equal to 13 mol % and less than or equal to 22 mol %, greater than or equal to 13 mol % and less than or equal to 21.5 mol %, greater than or equal to 13 mol % and less than or equal to 21 mol %, greater than or equal to 13 mol % and less than or equal to 20.5 mol %, greater than or equal to 13 mol % and less than or equal to 20 mol %, greater than or equal to 14 mol % and less than or equal to 24 mol %, greater than or equal to 14 mol % and less than or equal to 23 mol %, greater than or equal to 14 mol % and less than or equal to 22 mol %, greater than or equal to 14 mol % and less than or equal to 21.5 mol %, greater than or equal to 14 mol % and less than or equal to 21 mol %, greater than or equal to 14 mol % and less than or equal to 20.5 mol %, greater than or equal to 15 mol % and less than or equal to 24 mol %, greater than or equal to 15 mol % and less than or equal to 23 mol %, greater than or equal to 15 mol % and less than or equal to 22 mol %, greater than or equal to 15 mol % and less than or equal to 21.5 mol %, greater than or equal to 15 mol % and less than or equal to 21 mol %, greater than or equal to 15 mol % and less than or equal to 20.5 mol %, greater than or equal to 15 mol % and less than or equal to 20 mol %, greater than or equal to 16 mol % and less than or equal to 24 mol %, greater than or equal to 16 mol % and less than or equal to 23 mol %, greater than or equal to 16 mol % and less than or equal to 22 mol %, greater than or equal to 16 mol % and less than or equal to 21.5 mol %, greater than or equal to 16 mol % and less than or equal to 21 mol %, greater than or equal to 16 mol % and less than or equal to 20.5 mol %, or even greater than or equal to 16 mol % and less than or equal to 20 mol %, or any and all sub-ranges formed from any of these endpoints.

In embodiments, the sum of $Al_2O_3$, MgO, CaO and ZnO in the glass composition and the resultant colored glass article may be greater than or equal to 10 mol %, greater than or equal to 11 mol %, or even greater than or equal to 12 mol %. In embodiments, the sum of $Al_2O_3$, MgO, CaO and ZnO in the glass composition and the resultant colored glass article may be less than or equal to 30 mol %, less than or equal to 27 mol %, or even less than or equal to 24 mol %. In embodiments, the sum of $Al_2O_3$, MgO, CaO and ZnO in the glass composition and the resultant colored glass article may be greater than or equal to 10 mol % and less than or equal to 30 mol %, greater than or equal to 10 mol % and less than or equal to 27 mol %, greater than or equal to 10 mol % and less than or equal to 24 mol %, greater than or equal to 11 mol % and less than or equal to 30 mol %, greater than or equal to 11 mol % and less than or equal to 27 mol %, greater than or equal to 11 mol % and less than or equal to 24 mol %, greater than or equal to 12 mol % and less than or equal to 30 mol %, greater than or equal to 12 mol % and less than or equal to 27 mol %, or even greater than or equal to 12 mol % and less than or equal to 24 mol %, or any and all sub-ranges formed form any of these endpoints.

In embodiments, the glass composition and the resultant colored glass article may optionally include Cl, which may enable growth of particular crystal phases containing colorant. For example, when the colorant package included in the glass comprises Au, the inclusion of Cl may enable the growth of certain Au crystals. In embodiments, the concentration of Cl in the glass composition and the resultant colored glass article may be greater than or equal to 0 mol % or even greater than or equal to 0.1 mol %. In embodiments, the concentration of Cl in the glass composition and the resultant colored glass article may be less than or equal to 0.5 mol % or even less than or equal to 0.25 mol %. In embodiments, the concentration of Cl in the glass composition and the resultant colored glass article may be greater than or equal to 0 mol % and less than or equal to 0.5 mol %, greater than or equal to 0 mol % and less than or equal to 0.25 mol %, greater than or equal to 0.1 mol % and less than or equal to 0.5 mol %, or even greater than or equal to 0.1 mol % and less than or equal to 0.25 mol %, or any and all sub-ranges formed from any of these endpoints. In embodiments, the glass composition and the resultant colored glass article may be substantially free or free of Cl. In embodiments where the colorant package comprises Ag, the glass composition and resultant colored glass article include less than 100 ppm of halides, including Cl.

In embodiments, the glass compositions and the resultant colored glass articles described herein may further comprise $ZrO_2$. While not wishing to be bound by theory, it is believed that $ZrO_2$ may act as a multivalent species that serves as redox couples to supply oxygen to certain colorants, for example Au, during relatively low-temperature heat treatment, which helps improve retention of the colorant. Without wishing to be bound by theory, it is hypothesized that similar behavior may occur with colorants other than Au. $ZrO_2$ may also act as an additional colorant, producing colored glass articles that may be, for example, red in color. In embodiments, the glass composition and the resultant colored glass article may comprise greater than or equal to 0.01 mol % and less than or equal to 2 mol % $ZrO_2$. In embodiments, the glass composition and the resultant colored glass article may comprise greater than or equal to 0.01 mol % and less than or equal to 2 mol % $ZrO_2$. In embodiments, the glass composition and the resultant colored glass article may comprise greater than or equal to 0.1 mol % and less than or equal to 1.5 mol % $ZrO_2$. In embodiments, the glass composition and the resultant colored glass article may comprise greater than or equal to 0.25 mol % and less than or equal to 1.5 mol % $ZrO_2$. In embodiments, the concentration of $ZrO_2$ in the glass composition may be greater than or equal to 0 mol %, greater than or equal to 0.01 mol %, greater than or equal to 0.1 mol %, or even greater than or equal to 0.2 mol %. In embodiments, the concentration of $ZrO_2$ in the glass composition may be less than or equal to 2 mol %, less than or equal to 1.5 mol %, less than or equal to 1 mol %, less than or equal to 0.75 mol %, or even less than or equal to 0.5 mol %. In embodiments, the concentration of $ZrO_2$ in the glass composition may be greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.1 mol % and less than or equal to 2 mol %, greater than or equal to 0.1 mol % and less than or equal to 1.5 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, greater than or equal to 0.2 mol % and less than or equal to 2 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.75 mol %, or even greater than or equal to 0.2 mol % and less than or equal to 0.5 mol %, or any and all sub-ranges formed from any of these endpoints. In embodiments, the glass composition and the resultant colored glass article may be substantially free or free of $ZrO_2$.

In embodiments, the glass compositions and the resultant colored glass articles described herein may further comprise $Fe_2O_3$, which may help improve colorant retention. $Fe_2O_3$ is a multivalent species that serves as redox couples to supply oxygen to certain colorants, for example Au, during relatively low-temperature heat treatment, which helps improve retention of the colorant. Without wishing to be bound by theory, it is hypothesized that similar behavior may occur with colorants other than Au. $Fe_2O_3$ may also act as a colorant, producing colored glass articles that may, for example, be pink or red in color. In embodiments, the glass composition and the resultant colored glass article may comprise greater than or equal to 0.01 mol % and less than or equal to 1 mol % $Fe_2O_3$ or even greater than or equal to 0.1 mol % and less than or equal to 1 mol % $Fe_2O_3$. In embodiments, the concentration of $Fe_2O_3$ in the glass composition may be greater than or equal to 0 mol %, greater than or equal to 0.01 mol %, or even greater than or equal to 0.1 mol %. In embodiments, the concentration of $Fe_2O_3$ in the glass composition may be less than or equal to 1 mol %, less than or equal to 0.75 mol %, less than or equal to 0.5 mol %, or even less than or equal to 0.25 mol %. In embodiments, the concentration of $Fe_2O_3$ in the glass composition may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.25 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.05 mol % and less than or equal to 1 mol %, greater than or equal to 0.05 mol % and less than or equal to 0.75 mol %, greater than or equal to 0.05 mol % and less than or equal to 0.5 mol %, greater than or equal to 0.05 mol % and less than or equal to 0.25 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, greater than or equal to 0.1 mol % and less than or equal to 0.25 mol %, or any and all sub-ranges formed from any of these endpoints. In embodiments, the glass composition and the resultant colored glass article may be substantially free or free of $Fe_2O_3$.

In embodiments, the concentration of $Fe_2O_3$ in the glass composition and the resultant colored glass article may be greater than or equal to 0 mol %, greater than or equal to 0.001 mol %, or even greater than or equal to 0.005 mol %. In embodiment, the concentration of $Fe_2O_3$ in the glass composition and the resultant colored glass article may be less than or equal to 0.5 mol %, less than or equal to 0.1 mol %, less than or equal to 0.05 mol %, or even less than or equal to 0.01 mol %. In embodiments, the composition and the resultant colored glass article may be greater than or equal to 0 mol % and less than or equal to 0.5 mol %, greater than or equal to 0 mol % and less than or equal to 0.1 mol %, greater than or equal to 0 mol % and less than or equal to 0.05 mol %, greater than or equal to 0 mol % and less than or equal to 0.01 mol %, greater than or equal to 0.001 mol % and less than or equal to 0.5 mol %, greater than or equal to 0.001 mol % and less than or equal to 0.1 mol %, greater than or equal to 0.001 mol % and less than or equal to 0.05 mol %, greater than or equal to 0.001 mol % and less than or equal to 0.01 mol %, greater than or equal to 0.005 mol % and less than or equal to 0.5 mol %, greater than or equal to 0.005 mol % and less than or equal to 0.1 mol %, greater than or equal to 0.005 mol % and less than or equal to 0.05 mol %, or even greater than or equal to 0.005 mol % and less than or equal to 0.01 mol %, or any and all sub-ranges formed from any of these endpoints.

In embodiments, the glass compositions and the resultant colored glass articles described herein may further comprise $SnO_2$, $Sb_2O_3$, and/or $Bi_2O_3$. Like MgO and ZnO, $SnO_2$, $Sb_2O_3$, and $Bi_2O_3$ may help lower the melting point of the glass composition. Accordingly, $SnO_2$, $Sb_2O_3$, and/or $Bi_2O_3$ may be included in the glass composition and the resultant colored glass articles to lower the melting point and improve colorant retention. In embodiments in which the colorant package includes Ag, $SnO_2$ also aids in the reduction of Ag in the glass leading to the formation of silver particles in the glass. While not wishing to be bound by theory, in embodiments where the colorant package includes Au, it is believed that additions of $SnO_2$ may also aid in the reduction of Au in the glass, leading to the formation of gold particles. In embodiments that include $SnO_2$ and/or $Sb_2O_3$, the $SnO_2$ and/or $Sb_2O_3$ may also function as a fining agent.

In embodiments, the glass composition and the resultant colored glass article may comprise greater than or equal to 0.01 mol % and less than or equal to 1 mol % $SnO_2$. In embodiments, the glass composition and the resultant colored glass article may comprise greater than or equal to 0.05 mol % and less than or equal to 0.75 mol % $SnO_2$, greater than or equal to 0.05 mol % and less than or equal to 0.5 mol % $SnO_2$, or even greater than or equal to 0.1 mol % and less than or equal to 0.25 mol % $SnO_2$. In embodiments, the concentration of $SnO_2$ in the glass composition and the resultant colored glass article may be greater than or equal to 0 mol %, greater than or equal to 0.01 mol %, greater than or equal to 0.05 mol %, or even greater than or equal to 0.1 mol %. In embodiments, the concentration of $SnO_2$ in the glass composition and the resultant colored glass article may be less than or equal to 1 mol %, less than or equal to 0.75 mol %, less than or equal to 0.5 mol %, or even less than or equal to 0.25 mol %. In embodiments, the concentration of $SnO_2$ in the glass composition and the resultant colored glass article may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.25 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.05 mol % and less than or equal to 1 mol %, greater than or equal to 0.05 mol % and less than or equal to 0.75 mol %, greater than or equal to 0.05 mol % and less than or equal to 0.5 mol %, greater than or equal to 0.05 mol % and less than or equal to 0.25 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, or even greater than or equal to 0.1 mol % and less than or equal to 0.25 mol %, or any and all sub-ranges formed from any of these endpoints. In embodiments, the glass composition and the resultant colored glass article may be substantially free or free of $SnO_2$.

In embodiments, the concentration of $Sb_2O_3$ in the glass composition and the resultant colored glass article may be greater than or equal to 0 mol %, greater than or equal to 0.01 mol %, greater than or equal to 0.05 mol %, or even greater than or equal to 0.1 mol %. In embodiments, the concentration of $Sb_2O_3$ in the glass composition and the resultant colored glass article may be less than or equal to 1 mol %, less than or equal to 0.75 mol %, less than or equal to 0.5 mol %, or even less than or equal to 0.25 mol %. In embodiments, the concentration of $Sb_2O_3$ in the glass composition and the resultant colored glass article may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.25 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.05 mol % and less than or equal to 1 mol %, greater than or equal to 0.05 mol % and less than or equal to 0.75 mol %, greater than or equal to 0.05 mol % and less than or equal to 0.5 mol %, greater than or equal to 0.05 mol % and less than or equal to 0.25 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, or even greater than or equal to 0.1 mol % and less than or equal to 0.25 mol %, or any and all sub-ranges formed from any of these endpoints. In embodiments, the glass composition and the resultant colored glass article may be substantially free or free of $Sb_2O_3$.

The glass composition and the resultant colored glass article may comprise $Bi_2O_3$ as an additional component in the color package for the purposes of achieving a desired color, such as a yellow color. In embodiments, the concentration of $Bi_2O_3$ in the glass composition and the resultant colored glass article may be greater than or equal to 0 mol %, greater than or equal to 0.01 mol %, greater than or equal to 0.05 mol %, or even greater than or equal to 0.1 mol %. In embodiments, the concentration of $Bi_2O_3$ in the glass composition and the resultant colored glass article may be less than or equal to 1 mol %, less than or equal to 0.75 mol %, less than or equal to 0.5 mol %, or even less than or equal to 0.25 mol %. In embodiments, the concentration of $Bi_2O_3$ in the glass composition and the resultant colored glass article may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.25 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.05 mol % and less than or equal to 1 mol %, greater than or equal to 0.05 mol % and less than or equal to 0.75 mol %, greater than or equal to 0.05 mol % and less than or equal to 0.5 mol %, greater than or equal to 0.05 mol % and less than or equal to 0.25 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, or even greater than or equal to 0.1 mol % and less than or equal to 0.25 mol %, or any and all sub-ranges formed from any of these endpoints. In embodiments, the glass composition and the resultant colored glass article may be substantially free or free of $Bi_2O_3$.

The glass compositions and the resultant colored glass articles described herein may further comprise $SO_3$ as a fining agent. $SO_3$ may be utilized as a fining agent without impacting the color or color stability of the colored glass article. In embodiments, the concentration of $SO_3$ in the glass composition and the resultant colored glass article may be less than or equal to 0.1 mol %, less than or equal to 0.01 mol %, or even less than or equal to 0.001 mol %. In embodiments, the glass composition and the resultant colored glass article may be substantially free or free of $SO_3$. In embodiments, the glass composition and the resultant glass colored article may comprise greater than or equal to 0 mol % to less than or equal to 1 mol % $SO_3$.

The glass composition and the resultant colored glass article may comprise $WO_3$ as an additional component in the color package for the purposes of achieving a desired color, such as a yellow color. In embodiments, the concentration of $WO_3$ in the glass composition and the resultant colored glass article may be greater than or equal to 0 mol % and less than or equal to 1 mol %, such as greater than or equal to 0 mol % and less than or equal to 0.5 mol %, greater than 0 mol % and less than or equal to 0.1 mol %, greater than or equal to 0.001 mol % and less than or equal to 0.01 mol %, and all sub-ranges formed from any of these endpoints. In embodiments, the glass composition and the resultant colored glass article may be substantially free or free of $WO_3$.

The glass composition and the resultant colored glass article may comprise $Nb_2O_5$ as an additional component in the color package for the purposes of achieving a desired color, such as a yellow color. In embodiments, the concentration of $Nb_2O_5$ in the glass composition and the resultant colored glass article may be greater than or equal to 0 mol % and less than or equal to 1 mol %, such as greater than or equal to 0 mol % and less than or equal to 0.5 mol %, greater than 0 mol % and less than or equal to 0.1 mol %, greater than or equal to 0.001 mol % and less than or equal to 0.01 mol %, and all sub-ranges formed from any of these endpoints. In embodiments, the glass composition and the resultant colored glass article may be substantially free or free of $Nb_2O_5$.

The glass composition and the colored glass article may comprise $MoO_3$ as an additional component in the color package for the purposes of achieving a desired color, such as a yellow color. In embodiments, the concentration of $MoO_3$ in the glass composition and the resultant colored glass article may be greater than or equal to 0 mol % and less than or equal to 1 mol %, such as greater than or equal to 0 mol % and less than or equal to 0.5 mol %, greater than 0 mol % and less than or equal to 0.1 mol %, greater than or equal to 0.001 mol % and less than or equal to 0.01 mol %, and all sub-ranges formed from any of these endpoints. In embodiments, the glass composition and the resultant colored glass article may be substantially free or free of $MoO_3$.

The glass composition and the colored glass article may comprise $La_2O_3$ as an additional component in the color package for the purposes of achieving a desired color, such as a yellow color. In embodiments, the concentration of $La_2O_3$ in the glass composition and the resultant colored glass article may be greater than or equal to 0 mol % and less than or equal to 3 mol %, such as greater than or equal to 0 mol % and less than or equal to 2 mol %, greater than 0 mol % and less than or equal to 1 mol %, greater than or equal to 0.001 mol % and less than or equal to 0.1 mol %, and all sub-ranges formed from any of these endpoints. In embodiments, the glass composition and the colored glass article may be substantially free or free of $La_2O_3$.

In embodiments, the glass compositions and the resultant colored glass articles described herein may further comprise a reduced concentration or be substantially free or free of $P_2O_5$. In embodiments where $P_2O_5$ is included, the $P_2O_5$ may enhance the ion exchange characteristics of the resultant colored glass article. However, an increased concentration (i.e., greater than 1 mol %) of $P_2O_5$ may reduce the retention of one or more colorants in the colorant package. While not wishing to be bound by theory, itis believed that $P_2O_5$ may be more volatile than other glass network formers, such as $SiO_2$, which may contribute to reduced retention of colorants in the colorant package. In embodiments, the glass composition and the resultant colored glass article may comprise greater than or equal to 0.1 mol % and less than or equal to 1 mol % $P_2O_5$. In embodiments, the concentration of $P_2O_5$ in the glass composition and the resultant colored glass article may be greater than or equal to 0 mol %, greater than or equal to 0.1 mol %, greater than or equal to 0.25 mol %, or even greater than or equal to 0.5 mol %. In embodiments, the concentration of $P_2O_5$ in the glass composition and the resultant colored glass article may be less than or equal to 1 mol % or even less than or equal to 0.75 mol %. In embodiments, the concentration of $P_2O_5$ in the glass composition and the resultant colored glass article may be greater than or equal to 0 mol % and less than or equal to 1 mol %, greater than or equal to 0 mol % and less than or equal to 0.75 mol %, greater than or equal to 0.1 mol % and less than or equal to 1 mol %, greater than or equal to 0.1 mol % and less than or equal to 0.75 mol %, greater than or equal to 0.25 mol % and less than or equal to 1 mol %, greater than or equal to 0.25 mol % and less than or equal to 0.75 mol %, greater than or equal to 0.5 mol % and less than or equal to 1 mol %, or even greater than or equal to 0.5 mol % and less than or equal to 0.75 mol %, or any and all sub-ranges formed from any of these endpoints. In embodiments, the glass composition and the resultant colored glass article may be substantially free or free of $P_2O_5$.

In embodiments, the glass composition and the resultant colored glass article may comprise greater than or equal to 0 mol % and less than or equal to 3 mol % $P_2O_5$. In embodiments, the concentration of $P_2O_5$ in the glass composition and the resultant colored glass article may be greater than or equal to 0 mol %, greater than or equal to 0.1 mol %, greater than or equal to 0.25 mol %, or even greater than or equal to 0.5 mol %. In embodiments, the concentration of $P_2O_5$ in the glass composition and the resultant colored glass article may be less than or equal to 3 mol %, less than or equal to 2, or even less than or equal to 1 mol %. In embodiments, the concentration of $P_2O_5$ in the glass composition and the resultant colored glass article may be greater than or equal to 0 mol % and less than or equal to 3 mol %, greater than or equal to 0 mol % and less than or equal to 2 mol %, greater than or equal to 0 mol % and less than or equal to 1 mol %, greater than or equal to 0.1 mol % and less than or equal to 3 mol %, greater than or equal to 0.1 mol % and less than or equal to 2 mol %, greater than or equal to 0.1 mol % and less than or equal to 1 mol %, greater than or equal to 0.25 mol % and less than or equal to 3 mol %, greater than or equal to 0.25 mol % and less than or equal to 2 mol %, greater than or equal to 0.25 mol % and less than or equal to 1 mol %, greater than or equal to 0.5 mol % and less than or equal to 3 mol %, greater than or equal to 0.5 mol % and less than or equal to 2 mol %, or even greater than or equal to 0.5 mol % and less than or equal to 1 mol %, or any and all sub-ranges formed from any of these endpoints.

In the embodiments described herein, the glass compositions and resultant colored glass articles further comprise at least one colorant in a colorant package that functions to impart a desired color to the resultant colored glass article. In embodiments, the colorant package may comprise at least one of Au, Ag, $Cr_2O_3$, transition metal oxides (e.g., CuO, NiO, $Co_3O_4$, $TiO_2$, $Cr_2O_3$), rare earth metal oxides (e.g., $CeO_2$), and/or combinations thereof as colorants in the colorant package. In embodiments, the colorants in the colorant package may be selected from the group consisting of Au, Ag, $Cr_2O_3$, transition metal oxides (e.g., CuO, NiO, $Co_3O_4$, $TiO_2$, $Cr_2O_3$), rare earth metal oxides (e.g., $CeO_2$), and combinations thereof. In embodiments, the glass compositions and resultant colored glass articles may include greater than or equal to $1\times10^{-6}$ mol % and less than or equal to 10 mol % of colorant (i.e., the sum of all colorants in the colorant package). In embodiments, the concentration of the colorant package in the glass compositions and resultant colored glass articles may be greater than or equal to $1\times10^{-6}$ mol % and less than or equal to 9.5 mol %, greater than or equal to $1\times10^{-6}$ mol % and less than or equal to 9 mol %, greater than or equal to $1\times10^{-6}$ mol % and less than or equal to 8.5 mol %, greater than or equal to $1\times10^{-6}$ mol % and less than or equal to 8 mol %, greater than or equal to $1\times10^{-6}$ mol % and less than or equal to 7.5 mol %, greater than or equal to $1\times10^{-6}$ mol % and less than or equal to 7 mol %, greater than or equal to $1\times10^{-6}$ mol % and less than or equal to 6.5 mol %, greater than or equal to $1\times10^{-6}$ mol % and less than or equal to 6 mol %, greater than or equal to $1\times10^{-6}$ mol % and less than or equal to 5.5 mol %, greater than or equal to $1\times10^{-6}$ mol % and less than or equal to 5 mol %, greater than or equal to $1\times10^{-6}$ mol % and less than or equal to 4.5 mol %, greater than or equal to $1\times10^{-6}$ mol % and less than or equal to 4 mol %, greater than or equal to $1\times10^{-6}$ mol % and less than or equal to 3.5 mol %, greater than or equal to $1\times10^{-6}$ mol % and less than or equal to 3 mol %, greater than or equal to $1\times10^{-6}$ mol % and less than or equal to 2.5 mol %, greater than or equal to $1\times10^{-6}$ mol % and less than or equal to 2 mol %, greater than or equal to $1\times10^{-6}$ mol % and less than or equal to 1.5 mol %, greater than or equal to $1\times10^{-6}$ mol % and less than or equal to 1 mol %, greater than or equal to $1\times10^{-6}$ mol % and less than or equal to 0.5 mol %, greater than or equal to 0.0005 mol % and less than or equal to 10 mol %, greater than or equal to 0.0005 mol % and less than or equal to 9.5 mol %, greater than or equal to 0.0005 mol % and less than or equal to 9 mol %, greater than or equal to 0.0005 mol % and less than or equal to 8.5 mol %, greater than or equal to 0.0005 mol % and less than or equal to 8 mol %, greater than or equal to 0.0005 mol % and less than or equal to 7.5 mol %, greater than or equal to 0.0005 mol % and less than or equal to 7 mol %, greater than or equal to 0.0005 mol % and less than or equal to 6.5 mol %, greater than or equal to 0.0005 mol % and less than or equal to 6 mol %, greater than or equal to 0.0005 mol % and less than or equal to 5.5 mol %, greater than or equal to 0.0005 mol % and less than or equal to 5 mol %, greater than or equal to 0.0005 mol % and less than or equal to 4.5 mol %, greater than or equal to 0.0005 mol % and less than or equal to 4 mol %, greater than or equal to 0.0005 mol % and less than or equal to 3.5 mol %, greater than or equal to 0.0005 mol % and less than or equal to 3 mol %, greater than or equal to 0.0005 mol % and less than or equal to 2.5 mol %, greater than or equal to 0.0005 mol % and less than or equal to 2 mol %, greater than or equal to 0.0005 mol % and less than or equal to 1.5 mol %, greater than or equal to 0.0005 mol % and less than or equal to 1 mol %, greater than or equal to 0.0005 mol % and less than or equal to 0.5 mol %, greater than or equal to 0.001 mol % and less than or equal to 9.5 mol %, greater than or equal to 0.001 mol % and less than or equal to 9 mol %, greater than or equal to 0.001 mol % and less than or equal to 8.5 mol %, greater than or equal to 0.001 mol % and less than or equal to 8 mol %, greater than or equal to 0.001 mol % and less than or equal to 7.5 mol %, greater than or equal to 0.001 mol % and less than or equal to 7 mol %, greater than or equal to 0.001 mol % and less than or equal to 6.5 mol %, greater than or equal to 0.001 mol % and less than or equal to 6 mol %, greater than or equal to 0.001 mol % and less than or equal to 5.5 mol %, greater than or equal to 0.001 mol % and less than or equal to 5 mol %, greater than or equal to 0.001 mol % and less than or equal to 4.5 mol %, greater than or equal to 0.001 mol % and less than or equal to 4 mol %, greater than or equal to 0.001 mol % and less than or equal to 3.5 mol %, greater than or equal to 0.001 mol % and less than or equal to 3 mol %, greater than or equal to 0.001 mol % and less than or equal to 2.5 mol %, greater than or equal to 0.001 mol % and less than or equal to 2 mol %, greater than or equal to 0.001 mol % and less than or equal to 1.5 mol %, greater than or equal to 0.001 mol % and less than or equal to 1 mol %, greater than or equal to 0.001 mol % and less than or equal to 0.5 mol %, greater than or equal to 0.01 mol % and less than or equal to 9.5 mol %, greater than or equal to 0.01 mol % and less than or equal to 9 mol %, greater than or equal to 0.01 mol % and less than or equal to 8.5 mol %, greater than or equal to 0.01 mol % and less than or equal to 8 mol %, greater than or equal to 0.01 mol % and less than or equal to 7.5 mol %, greater than or equal to 0.01 mol % and less than or equal to 7 mol %, greater than or equal to 0.01 mol % and less than or equal to 6.5 mol %, greater than or equal to 0.01 mol % and less than or equal to 6 mol %, greater than or equal to 0.01 mol % and less than or equal to 5.5 mol %, greater than or equal to 0.01 mol % and less than or equal to 5 mol %, greater than or equal to 0.01 mol % and less than or equal to 4.5 mol %, greater than or equal to 0.01 mol % and less than or equal to 4 mol %, greater than or equal to 0.01 mol % and less than or equal to 3.5 mol %, greater than or equal to 0.01 mol % and less than or equal to 3 mol %, greater than or equal to 0.01 mol % and less than or equal to 2.5 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.5 mol %, or any and all sub-ranges formed from any of these endpoints.

Colorant: Transition Metal Oxides and/or Rare Earth Oxides

In embodiments, the colorant package in the glass compositions and the resultant colored glass articles may include colorants that comprise or consist of transition metal oxides, rare earth oxides, or combinations thereof, to achieve a desired color. In embodiments, transition metal oxides and/or rare earth oxides may be included in the glass compositions as the sole colorant or in combination with other colorants. In embodiments, colorants based on transition metal oxides and/or rare earth oxides may include NiO, $Co_3O_4$, $Cr_2O_3$, CuO, $CeO_2$, $TiO_2$ and/or combinations thereof. In embodiments, colorants based on transition metal oxides and/or rare earth oxides may further include oxides of V, Mn, Fe, Cu, Zr, Nb, Mo, Tc, Ru, Rh, Pd, Cd, Hf, Ta, W, Re, Os, Ir, Pt, Pr, Nd, Sm, Eu, Gd, Tb, Dy, Ho, and Er.

In embodiments, the glass composition and the resultant colored glass article may comprise greater than or equal to 0.001 mol %, such as greater than or equal to 0.001 mol % and less than or equal to 10 mol %, $NiO+Co_3O_4+Cr_2O_3+CuO+CeO_2+TiO_2$. In embodiments, the concentration of $NiO+Co_3O_4+Cr_2O_3+CuO+CeO_2+TiO_2$ in the glass composition and the resultant colored glass article may be greater than or equal to 0.001 mol % and less than or equal to 5 mol %, greater than or equal to 0.001 mol % and less than or equal to 4 mol %, greater than or equal to 0.001 mol % and less than or equal to 3 mol %, greater than or equal to 0.001 mol % and less than or equal to 2.5 mol %, greater than or equal to 0.001 mol % and less than or equal to 2 mol %, greater than or equal to 0.001 mol % and less than or equal to 1.5 mol %, greater than or equal to 0.01 mol % and less than or equal to 5 mol %, greater than or equal to 0.01 mol % and less than or equal to 4 mol %, greater than or equal to 0.01 mol % and less than or equal to 3 mol %, greater than or equal to 0.01 mol % and less than or equal to 2.5 mol %, greater than or equal to 0.01 mol % and less than or equal to 2 mol %, greater than or equal to 0.01 mol % and less than or equal to 1.5 mol %, greater than or equal to 0.02 mol % and less than or equal to 5 mol %, greater than or equal to 0.02 mol % and less than or equal to 4 mol %, greater than or equal to 0.02 mol % and less than or equal to 3 mol %, greater than or equal to 0.02 mol % and less than or equal to 2.5 mol %, greater than or equal to 0.02 mol % and less than or equal to 2 mol %, greater than or equal to 0.02 mol % and less than or equal to 1.5 mol %, greater than or equal to 0.1 mol % and less than or equal to 5 mol %, greater than or equal to 0.1 mol % and less than or equal to 4 mol %, greater than or equal to 0.1 mol % and less than or equal to 3 mol %, greater than or equal to 0.1 mol % and less than or equal to 2.5 mol %, greater than or equal to 0.1 mol % and less than or equal to 2 mol %, greater than or equal to 0.1 mol % and less than or equal to 1.5 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 0.5 mol % and less than or equal to 2.5 mol %, greater than or equal to 0.5 mol % and less than or equal to 2 mol %, greater than or equal to 0.5 mol % and less than or equal to 1.5 mol %, greater than or equal to 0.7 mol % and less than or equal to 5 mol %, greater than or equal to 0.7 mol % and less than or equal to 4 mol %, greater than or equal to 0.7 mol % and less than or equal to 3 mol %, greater than or equal to 0.7 mol % and less than or equal to 2.5 mol %, greater than or equal to 0.7 mol % and less than or equal to 2 mol %, greater than or equal to 0.7 mol % and less than or equal to 1.5 mol %, greater than or equal to 0.9 mol % and less than or equal to 5 mol %, greater than or equal to 0.9 mol % and less than or equal to 4 mol %, greater than or equal to 0.9 mol % and less than or equal to 3 mol %, greater than or equal to 0.9 mol % and less than or equal to 2.5 mol %, greater than or equal to 0.9 mol % and less than or equal to 2 mol %, greater than or equal to 0.9 mol % and less than or equal to 1.5 mol %, or any and all sub-ranges formed from any of these endpoints. In embodiments, the glass composition and resultant glass article may comprise 0 mol % of one or more of NiO, $Co_3O_4$, $Cr_2O_3$, CuO, $CeO_2$, and/or $TiO_2$.

In embodiments, the glass composition and the resultant colored glass article may comprise greater than or equal to 0.001 mol %, such as greater than or equal to 0.001 mol % and less than or equal to 3 mol %, $NiO+Co_3O_4+Cr_2O_3+CuO$. In embodiments, the concentration of $NiO+Co_3O_4+Cr_2O_3+CuO$ in the glass composition and the resultant colored glass article may be greater than or equal to 0.001 mol % and less than or equal to 2.5 mol %, greater than or equal to 0.001 mol % and less than or equal to 2 mol %, greater than or equal to 0.001 mol % and less than or equal to 1.5 mol %, greater than or equal to 0.001 mol % and less than or equal to 1 mol %, greater than or equal to 0.001 mol % and less than or equal to 0.5 mol %, greater than or equal to 0.001 mol % and less than or equal to 0.4 mol %, greater than or equal to 0.01 mol % and less than or equal to 2.5 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.5 mol %, greater than or equal to 0.01 mol % and less than or equal to 0.4 mol %, greater than or equal to 0.02 mol % and less than or equal to 2.5 mol %, greater than or equal to 0.02 mol % and less than or equal to 2 mol %, greater than or equal to 0.02 mol % and less than or equal to 1.5 mol %, greater than or equal to 0.02 mol % and less than or equal to 1 mol %, greater than or equal to 0.02 mol % and less than or equal to 0.5 mol %, greater than or equal to 0.02 mol % and less than or equal to 0.4 mol %, greater than or equal to 0.1 mol % and less than or equal to 2.5 mol %, greater than or equal to 0.1 mol % and less than or equal to 2 mol %, greater than or equal to 0.1 mol % and less than or equal to 1.5 mol %, greater than or equal to 0.1 mol % and less than or equal to 1 mol %, greater than or equal to 0.1 mol % and less than or equal to 0.5 mol %, greater than or equal to 0.1 mol % and less than or equal to 0.4 mol %, greater than or equal to 0.2 mol % and less than or equal to 2.5 mol %, greater than or equal to 0.2 mol % and less than or equal to 2 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.5 mol %, greater than or equal to 0.2 mol % and less than or equal to 0.4 mol %, or any and all sub-ranges formed from any of these endpoints. In embodiments, the glass composition and resultant glass article may comprise 0 mol % of one or more of NiO, $Co_3O_4$, $Cr_2O_3$, and/or CuO.

In embodiments, the glass composition and the resultant colored glass article may comprise greater than or equal to 0 mol % $TiO_2$, such as greater than or equal to 0 mol % and less than or equal to 2 mol % or even greater than or equal to 0.01 mol % and less than or equal to 2 mol %, $TiO_2$. In embodiments, the concentration of $TiO_2$ in the glass composition and the resultant colored glass article may be greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.4 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.4 mol %, greater than or equal to 0.1 mol % and less than or equal to 2 mol %, greater than or equal to 0.1 mol % and less than or equal to 1.5 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, greater than or equal to 0.1 mol % and less than or equal to 0.4 mol %, greater than or equal to 0.2 mol % and less than or equal to 2 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.75 mol %, greater than or equal to 0.2 mol % and less than or equal to 0.5 mol %, greater than or equal to 0.2 mol % and less than or equal to 0.4 mol %, greater than or equal to 0.3 mol % and less than or equal to 2 mol %, greater than or equal to 0.3 mol % and less than or equal to 1.5 mol %, greater than or equal to 0.3 mol % and less than or equal to 1 mol %, greater than or equal to 0.3 mol % and less than or equal to 0.75 mol %, greater than or equal to 0.3 mol % and less than or equal to 0.5 mol %, greater than or equal to 0.3 mol % and less than or equal to 0.4 mol %, or any and all sub-ranges formed from any of these endpoints.

In embodiments, the glass composition and the resultant colored glass article may comprise greater than or equal to 0.1 mol %, such as greater than or equal to 0.1 mol % and less than or equal to 2 mol %, $CeO_2$. In embodiments, the concentration of $CeO_2$ in the glass composition and the resultant colored glass article may be greater than or equal to 0.1 mol % and less than or equal to 1.5 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, greater than or equal to 0.1 mol % and less than or equal to 0.4 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.75 mol %, greater than or equal to 0.2 mol % and less than or equal to 0.5 mol %, greater than or equal to 0.2 mol % and less than or equal to 0.4 mol %, greater than or equal to 0.3 mol % and less than or equal to 1.5 mol %, greater than or equal to 0.3 mol % and less than or equal to 1 mol %, greater than or equal to 0.3 mol % and less than or equal to 0.75 mol %, greater than or equal to 0.3 mol % and less than or equal to 0.5 mol %, greater than or equal to 0.3 mol % and less than or equal to 0.4 mol %, or any and all sub-ranges formed from any of these endpoints. In embodiments, the glass composition and the resultant colored glass article may comprise greater than 0 mol % and less than or equal to 2 mol % $CeO_2$.

In embodiments, the glass composition and the resultant colored glass article may comprise greater than or equal to 0 mol %, such as greater than or equal to 0.01 mol % and less than or equal to 0.05 mol %, NiO. In embodiments, the concentration of NiO in the glass composition and the resultant colored glass article may be greater than or equal to 0 mol % and less than or equal to 0.05 mol %, greater than or equal to 0 mol % and less than or equal to 0.04 mol %, greater than or equal to 0 mol % and less than or equal to 0.035 mol %, greater than or equal to 0 mol % and less than or equal to 0.03 mol %, greater than or equal to 0 mol % and less than or equal to 0.025 mol %, greater than or equal to 0 mol % and less than or equal to 0.02 mol %, greater than or equal to 0 mol % and less than or equal to 0.015 mol %, greater than or equal to 0.01 mol % and less than or equal to 0.05 mol %, greater than or equal to 0.01 mol % and less than or equal to 0.04 mol %, greater than or equal to 0.01 mol % and less than or equal to 0.035 mol %, greater than or equal to 0.01 mol % and less than or equal to 0.03 mol %, greater than or equal to 0.01 mol % and less than or equal to 0.025 mol %, greater than or equal to 0.01 mol % and less than or equal to 0.02 mol %, greater than or equal to 0.01 mol % and less than or equal to 0.015 mol %, greater than or equal to 0.015 mol % and less than or equal to 0.05 mol %, greater than or equal to 0.015 mol % and less than or equal to 0.04 mol %, greater than or equal to 0.015 mol % and less than or equal to 0.035 mol %, greater than or equal to 0.015 mol % and less than or equal to 0.03 mol %, greater than or equal to 0.015 mol % and less than or equal to 0.025 mol %, or even greater than or equal to 0.015 mol % and less than or equal to 0.02 mol %, and all sub-ranges formed from any of these endpoints.

In embodiments, the glass composition and the resultant colored glass article may comprise greater than or equal to 0 mol %, such as greater than or equal to 0.1 mol % and less than or equal to 0.5 mol %, CuO. In embodiments, the concentration of CuO in the glass composition and the resultant colored glass article may be greater than or equal to 0.1 mol % and less than or equal to 0.5 mol %, greater than or equal to 0.1 mol % and less than or equal to 0.4 mol %, greater than or equal to 0.1 mol % and less than or equal to 0.35 mol %, greater than or equal to 0.1 mol % and less than or equal to 0.3 mol %, greater than or equal to 0.1 mol % and less than or equal to 0.25 mol %, greater than or equal to 0.1 mol % and less than or equal to 0.2 mol %, greater than or equal to 0.1 mol % and less than or equal to 0.15 mol %, greater than or equal to 0.15 mol % and less than or equal to 0.5 mol %, greater than or equal to 0.15 mol % and less than or equal to 0.4 mol %, greater than or equal to 0.15 mol % and less than or equal to 0.35 mol %, greater than or equal to 0.15 mol % and less than or equal to 0.3 mol %, greater than or equal to 0.15 mol % and less than or equal to 0.25 mol %, or even greater than or equal to 0.15 mol % and less than or equal to 0.2 mol %, and all sub-ranges formed from any of these endpoints.

In embodiments, the glass composition and the resultant colored glass article may comprise greater than or equal to 0 mol %, such as greater than or equal to 0.0001 mol % and less than or equal to 0.01 mol %, $Co_3O_4$. In embodiments, the concentration of $Co_3O_4$ in the glass composition and the resultant colored glass article may be greater than or equal to 0 mol % and less than or equal to 0.01 mol %, greater than or equal to 0 mol % and less than or equal to 0.0095 mol %, greater than or equal to 0 mol % and less than or equal to 0.009 mol %, greater than or equal to 0 mol % and less than or equal to 0.0085 mol %, greater than or equal to 0 mol % and less than or equal to 0.0075 mol %, greater than or equal to 0 mol % and less than or equal to 0.007 mol %, greater than or equal to 0 mol % and less than or equal to 0.0065 mol %, greater than or equal to 0 mol % and less than or equal to 0.006 mol %, greater than or equal to 0 mol % and less than or equal to 0.0055 mol %, greater than or equal to 0 mol % and less than or equal to 0.005 mol %, greater than or equal to 0 mol % and less than or equal to 0.0045 mol %, greater than or equal to 0 mol % and less than or equal to 0.004 mol %, greater than or equal to 0 mol % and less than or equal to 0.0035 mol %, greater than or equal to 0 mol % and less than or equal to 0.003 mol %, greater than or equal to 0 mol % and less than or equal to 0.0025 mol %, greater than or equal to 0 mol % and less than or equal to 0.002 mol %, greater than or equal to 0.0001 mol % and less than or equal to 0.01 mol %, greater than or equal to 0.0001 mol % and less than or equal to 0.0095 mol %, greater than or equal to 0.0001 mol % and less than or equal to 0.009 mol %, greater than or equal to 0.0001 mol % and less than or equal to 0.0085 mol %, greater than or equal to 0.0001 mol % and less than or equal to 0.0075 mol %, greater than or equal to 0.0001 mol % and less than or equal to 0.007 mol %, greater than or equal to 0.0001 mol % and less than or equal to 0.0065 mol %, greater than or equal to 0.0001 mol % and less than or equal to 0.006 mol %, greater than or equal to 0.0001 mol % and less than or equal to 0.0055 mol %, greater than or equal to 0.0001 mol % and less than or equal to 0.005 mol %, greater than or equal to 0.0001 mol % and less than or equal to 0.0045 mol %, greater than or equal to 0.0001 mol % and less than or equal to 0.004 mol %, greater than or equal to 0.0001 mol % and less than or equal to 0.0035 mol %, greater than or equal to 0.0001 mol % and less than or equal to 0.003 mol %, greater than or equal to 0.0001 mol % and less than or equal to 0.0025 mol %, greater than or equal to 0.0001 mol % and less than or equal to 0.002 mol %, greater than or equal to 0.001 mol % and less than or equal to 0.01 mol %, greater than or equal to 0.001 mol % and less than or equal to 0.0095 mol %, greater than or equal to 0.001 mol % and less than or equal to 0.009 mol %, greater than or equal to 0.001 mol % and less than or equal to 0.0085 mol %, greater than or equal to 0.001 mol % and less than or equal to 0.0075 mol %, greater than or equal to 0.001 mol % and less than or equal to 0.007 mol %, greater than or equal to 0.001 mol % and less than or equal to 0.0065 mol %, greater than or equal to 0.001 mol % and less than or equal to 0.006 mol %, greater than or equal to 0.001 mol % and less than or equal to 0.0055 mol %, greater than or equal to 0.001 mol % and less than or equal to 0.005 mol %, greater than or equal to 0.001 mol % and less than or equal to 0.0045 mol %, greater than or equal to 0.001 mol % and less than or equal to 0.004 mol %, greater than or equal to 0.001 mol % and less than or equal to 0.0035 mol %, greater than or equal to 0.001 mol % and less than or equal to 0.003 mol %, greater than or equal to 0.001 mol % and less than or equal to 0.0025 mol %, greater than or equal to 0.001 mol % and less than or equal to 0.002 mol %, and all sub-ranges formed from any of these endpoints.

In embodiments, the glass composition and the resultant colored glass article may comprise greater than or equal to 0 mol %, such as greater than or equal to 0.01 mol % and less than or equal to 0.05 mol %, $Cr_2O_3$. In embodiments, the concentration of $Cr_2O_3$ in the glass composition and the resultant colored glass article may be greater than or equal to 0 mol % and less than or equal to 0.05 mol %, greater than or equal to 0 mol % and less than or equal to 0.04 mol %, greater than or equal to 0 mol % and less than or equal to 0.035 mol %, greater than or equal to 0 mol % and less than or equal to 0.03 mol %, greater than or equal to 0 mol % and less than or equal to 0.025 mol %, greater than or equal to 0 mol % and less than or equal to 0.02 mol %, greater than or equal to 0 mol % and less than or equal to 0.015 mol %, greater than or equal to 0.01 mol % and less than or equal to 0.05 mol %, greater than or equal to 0.01 mol % and less than or equal to 0.04 mol %, greater than or equal to 0.01 mol % and less than or equal to 0.035 mol %, greater than or equal to 0.01 mol % and less than or equal to 0.03 mol %, greater than or equal to 0.01 mol % and less than or equal to 0.025 mol %, greater than or equal to 0.01 mol % and less than or equal to 0.02 mol %, greater than or equal to 0.01 mol % and less than or equal to 0.015 mol %, greater than or equal to 0.015 mol % and less than or equal to 0.05 mol %, greater than or equal to 0.015 mol % and less than or equal to 0.04 mol %, greater than or equal to 0.015 mol % and less than or equal to 0.035 mol %, greater than or equal to 0.015 mol % and less than or equal to 0.03 mol %, greater than or equal to 0.015 mol % and less than or equal to 0.025 mol %, or even greater than or equal to 0.015 mol % and less than or equal to 0.02 mol %, and all sub-ranges formed from any of these endpoints.

In embodiments, the glass composition and the resultant colored glass article may comprise at least one of: greater than or equal to 0.001 mol % $NiO+Co_3O_4+Cr_2O_3+CuO$, such as greater than or equal to 0.001 mol % and less than or equal to 3 mol % $NiO+Co_3O_4+Cr_2O_3+CuO$ (or any of the ranges of $NiO+Co_3O_4+Cr_2O_3+CuO$ described herein); greater than or equal to 0.1 mol % $CeO_2$, such as greater than or equal to 0.1 mol % and less than or equal to 1.5 mol % $CeO_2$ (or any of the ranges of $CeO_2$ described herein); and greater than or equal to 0.1 mol % $TiO_2$, such as greater than or equal to 0.1 mol % and less than or equal to 2 mol % $TiO_2$ (or any of the ranges of $TiO_2$ described herein).

The glass composition and the resultant colored glass article may include sufficient $TiO_2+CeO_2$ to provide a desired yellow color. In embodiments, the concentration of $TiO_2+CeO_2$ in the glass composition and the resultant colored glass article may be greater than or equal to 0.2 mol %, greater than or equal to 0.3 mol %, greater than or equal to 0.4 mol %, greater than or equal to 0.5 mol %, greater than or equal to 0.6 mol %, greater than or equal to 0.7 mol %, greater than or equal to 0.8 mol %, or more. In embodiments, the concentration of $TiO_2+CeO_2$ in the glass composition and the resultant colored glass article may be less than or equal to 3 mol %, less than or equal to 2.5 mol %, less than or equal to 2 mol %, less than or equal to 1.5 mol %, less than or equal to 1 mol %, or less. In embodiments, the concentration of $TiO_2+CeO_2$ in the glass composition and the resultant colored glass article may be greater than or equal to 0.2 mol % and less than or equal to 3 mol %, such as greater than or equal to 0.3 mol % and less than or equal to 2.5 mol %, greater than or equal to 0.4 mol % and less than or equal to 2 mol %, greater than or equal to 0.5 mol % and less than or equal to 2.0 mol %, greater than or equal to 0.5 mol % and less than or equal to 1.5 mol %, greater than or equal to 0.6 mol % and less than or equal to 1 mol %, greater than or equal to 0.7 mol % and less than or equal to 0.9 mol %, greater than or equal to 0.8 mol % and less than or equal to 1.5 mol %, or any and all sub-ranges formed from any of these endpoints.

In embodiments, the glass composition and the resultant colored glass article may include at least one of $Er_2O_3$ and $Nd_2O_3$ as colorants for the purposes of providing the desired color. The inclusion of $Er_2O_3$ and $Nd_2O_3$ in the glass compositions may allow for colors to be achieved that are not possible with other transition metal colorants and do not require a post-forming heat treatment to achieve the desired colors, unlike some glasses that utilize Au, Ag, or Cu as colorants. The $Er_2O_3$ and $Nd_2O_3$ may also be combined with other colorants to tune the color of the colored glass article.

In embodiments, the glass compositions and the resultant colored glass articles may include $Er_2O_3$ in an amount greater than or equal to 0 mol % to less than or equal to 4 mol %, such as greater than 0 mol % to less than or equal to 4 mol %, or greater than or equal to 0.1 mol % to less than or equal to 2 mol %. In embodiments, the glass compositions and the resultant colored glass articles may include $Er_2O_3$ in an amount greater than or equal to 0 mol %, greater than 0 mol %, greater than or equal to 0.1 mol %, greater than or equal to 0.2 mol %, greater than or equal to 0.5 mol %, greater than or equal to 1 mol %, or more. In embodiments, the glass compositions and the resultant colored glass articles include $Er_2O_3$ in an amount less than or equal to 4 mol %, less than or equal to 3 mol %, less than or equal to 2 mol %, less than or equal to 1 mol %, less than or equal to 0.5 mol %, or less. In embodiments, the glass compositions and the resultant colored glass articles include $Er_2O_3$ in an amount greater than or equal to 0 mol % to less than or equal to 4 mol %, greater than 0 mol % to less than or equal to 3.5 mol %, greater than or equal to 0.1 mol % to less than or equal to 3 mol %, greater than or equal to 0.2 mol % to less than or equal to 2.5 mol %, greater than or equal to 0.3 mol % to less than or equal to 2 mol %, greater than or equal to 0.4 mol % to less than or equal to 1.9 mol %, greater than or equal to 0.5 mol % to less than or equal to 1.8 mol %, greater than or equal to 0.6 mol % to less than or equal to 1.7 mol %, greater than or equal to 0.7 mol % to less than or equal to 1.6 mol %, greater than or equal to 0.8 mol % to less than or equal to 1.5 mol %, greater than or equal to 0.9 mol % to less than or equal to 1.4 mol %, greater than or equal to 1.0 mol % to less than or equal to 1.3 mol %, greater than or equal to 1.1 mol % to less than or equal to 1.2 mol %, or any and all sub-ranges formed from the foregoing endpoints. In embodiments, the glass compositions and the resultant colored glass articles may be substantially free or free of $Er_2O_3$.

In embodiments, the glass compositions and the resultant colored glass articles may include $Nd_2O_3$ in an amount greater than or equal to 0 mol % to less than or equal to 4 mol %, such as greater than 0 mol % to less than or equal to 4 mol %, or greater than or equal to 0.1 mol % to less than or equal to 3 mol %. In embodiments, the glass compositions and the resultant colored glass articles may include $Nd_2O_3$ in an amount greater than or equal to 0 mol %, greater than 0 mol %, greater than or equal to 0.1 mol %, greater than or equal to 0.2 mol %, greater than or equal to 0.5 mol %, greater than or equal to 1 mol %, or more. In embodiments, the glass compositions and the resultant colored glass articles may include $Nd_2O_3$ in an amount less than or equal to 4 mol %, less than or equal to 3 mol %, less than or equal to 2 mol %, less than or equal to 1 mol %, less than or equal to 0.5 mol %, or less. In embodiments, the glass compositions and the resultant colored glass articles include $Nd_2O_3$ in an amount greater than or equal to 0 mol % to less than or equal to 4 mol %, greater than 0 mol % to less than or equal to 3.5 mol %, greater than or equal to 0.1 mol % to less than or equal to 3 mol %, greater than or equal to 0.2 mol % to less than or equal to 2.5 mol %, greater than or equal to 0.3 mol % to less than or equal to 2 mol %, greater than or equal to 0.4 mol % to less than or equal to 1.9 mol %, greater than or equal to 0.5 mol % to less than or equal to 1.8 mol %, greater than or equal to 0.6 mol % to less than or equal to 1.7 mol %, greater than or equal to 0.7 mol % to less than or equal to 1.6 mol %, greater than or equal to 0.8 mol % to less than or equal to 1.5 mol %, greater than or equal to 0.9 mol % to less than or equal to 1.4 mol %, greater than or equal to 1.0 mol % to less than or equal to 1.3 mol %, greater than or equal to 1.1 mol % to less than or equal to 1.2 mol %, or any and all sub-ranges formed from the foregoing endpoints. In embodiments, the glass compositions and the resultant colored glass articles may be substantially free or free of $Nd_2O_3$.

Colorant: Gold

In embodiments, the colorant package in the glass compositions and the resultant colored glass articles may comprise or consist of Au as a colorant to achieve a desired color. In embodiments, Au may be included in the glass compositions as the sole colorant or in combination with other colorants. As described herein, in embodiments, the glass compositions and the resultant colored glass articles may be formulated to improve the retention of Au, thereby expanding the color gamut achievable in the resultant colored glass articles.

In embodiments, the glass composition and the resultant colored glass article may comprise greater than 0.0005 mol % and less than or equal to 1 mol % Au. In embodiments, the glass composition and the resultant colored glass article may comprise greater than 0.001 mol % and less than or equal to 0.5 mol % Au. In embodiments, the concentration of Au in the glass composition and the resultant colored glass article may be greater than or equal to 0.0005 mol %, greater than or equal to 0.001 mol %, greater than or equal to 0.002 mol % Au, greater than or equal to 0.005 mol %, or even greater than or equal to 0.01 mol %. In embodiments, the concentration of Au in the glass composition and the resultant colored glass article may be less than or equal to 1 mol %, less than or equal to 0.75 mol %, less than or equal to 0.5 mol %, less than or equal to 0.25 mol %, less than or equal to 0.1 mol %, or even less than or equal to 0.05 mol %. In embodiments, the concentration of Au in the glass composition and the resultant colored glass article may be greater than or equal to 0.0005 mol % and less than or equal to 1 mol %, greater than or equal to 0.0005 mol % and less than or equal to 0.75 mol %, greater than or equal to 0.0005 mol % and less than or equal to 0.5 mol %, greater than or equal to 0.0005 mol % and less than or equal to 0.25 mol %, greater than or equal to 0.0005 mol % and less than or equal to 0.1 mol %, greater than or equal to 0.0005 mol % and less than or equal to 0.05 mol %, greater than or equal to 0.001 mol % and less than or equal to 1 mol %, greater than or equal to 0.001 mol % and less than or equal to 0.75 mol %, greater than or equal to 0.001 mol % and less than or equal to 0.5 mol %, greater than or equal to 0.001 mol % and less than or equal to 0.25 mol %, greater than or equal to 0.001 mol % and less than or equal to 0.1 mol %, greater than or equal to 0.001 mol % and less than or equal to 0.05 mol %, greater than or equal to 0.002 mol % and less than or equal to 1 mol %, greater than or equal to 0.002 mol % and less than or equal to 0.75 mol %, greater than or equal to 0.002 mol % and less than or equal to 0.5 mol %, greater than or equal to 0.002 mol % and less than or equal to 0.25 mol %, greater than or equal to 0.002 mol % and less than or equal to 0.1 mol %, greater than or equal to 0.002 mol % and less than or equal to 0.05 mol %, greater than or equal to 0.005 mol % and less than or equal to 1 mol %, greater than or equal to 0.005 mol % and less than or equal to 0.75 mol %, greater than or equal to 0.005 mol % and less than or equal to 0.5 mol %, greater than or equal to 0.005 mol % and less than or equal to 0.25 mol %, greater than or equal to 0.005 mol % and less than or equal to 0.1 mol %, greater than or equal to 0.005 mol % and less than or equal to 0.05 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.01 mol % and less than or equal to 0.1 mol %, or even greater than or equal to 0.01 mol % and less than or equal to 0.05 mol %, or any and all sub-ranges formed from any of these endpoints.

In embodiments, the glass composition and the resultant colored glass article may comprise greater than or equal to $1\times10^{-6}$ mol % and less than or equal to 1 mol % Au. In embodiments, the glass composition and the resultant colored glass article may comprise greater than or equal to $1\times10^{-6}$ mol % and less than or equal to 0.01 mol % Au. In embodiments, the concentration of Au in the glass composition and the resultant colored glass article may be greater than or equal to $1\times10^{-6}$ mol %, greater than or equal to $1\times10^{-5}$ mol %, greater than or equal to 0.0001 mol %, greater than or equal to 0.0005 mol %, or even greater than or equal to 0.001 mol %. In embodiments, the concentration of Au in the glass composition and the resultant colored glass article may be less than or equal to 1 mol %, less than or equal to 0.75 mol %, less than or equal to 0.5 mol %, less than or equal to 0.25 mol %, less than or equal to 0.1 mol %, less than or equal to 0.05 mol %, or even less than or equal to 0.01. In embodiments, the concentration of Au in the glass composition and the resultant colored glass article may be greater than or equal to $1\times10^{-6}$ mol % and less than or equal to 0.75 mol %, greater than or equal to $1\times10^{-6}$ mol % and less than or equal to 0.5 mol %, greater than or equal to $1\times10^{-6}$ mol % and less than or equal to 0.25 mol %, greater than or equal to $1\times10^{-6}$ mol % and less than or equal to 0.1 mol %, greater than or equal to $1\times10^{-6}$ mol % and less than or equal to 0.05 mol %, greater than or equal to $1\times10^{-6}$ mol % and less than or equal to 0.01 mol %, greater than or equal to $1\times10^{-5}$ mol % and less than or equal to 1 mol %, greater than or equal to $1\times10^{-5}$ mol % and less than or equal to 0.75 mol %, greater than or equal to $1\times10^{-5}$ mol % and less than or equal to 0.5 mol %, greater than or equal to $1\times10^{-5}$ mol % and less than or equal to 0.25 mol %, greater than or equal to $1\times10^{-5}$ mol % and less than or equal to 0.1 mol %, greater than or equal to $1\times10^{-5}$ mol % and less than or equal to 0.05 mol %, greater than or equal to $1\times10^{-5}$ mol % and less than or equal to 0.01 mol %, greater than or equal to 0.0001 mol % and less than or equal to 1 mol %, greater than or equal to 0.0001 mol % and less than or equal to 0.75 mol %, greater than or equal to 0.0001 mol % and less than or equal to 0.5 mol %, greater than or equal to 0.0001 mol % and less than or equal to 0.25 mol %, greater than or equal to 0.0001 mol % and less than or equal to 0.1 mol %, greater than or equal to 0.0001 mol % and less than or equal to 0.05 mol %, greater than or equal to 0.0001 mol % and less than or equal to 0.01 mol %, greater than or equal to 0.0005 mol % and less than or equal to 1 mol %, greater than or equal to 0.0005 mol % and less than or equal to 0.75 mol %, greater than or equal to 0.0005 mol % and less than or equal to 0.5 mol %, greater than or equal to 0.0005 mol % and less than or equal to 0.25 mol %, greater than or equal to 0.0005 mol % and less than or equal to 0.1 mol %, greater than or equal to 0.0005 mol % and less than or equal to 0.05 mol %, greater than or equal to 0.0005 mol % and less than or equal to 0.01 mol %, greater than or equal to 0.001 mol % and less than or equal to 1 mol %, greater than or equal to 0.001 mol % and less than or equal to 0.75 mol %, greater than or equal to 0.001 mol % and less than or equal to 0.5 mol %, greater than or equal to 0.001 mol % and less than or equal to 0.25 mol %, greater than or equal to 0.001 mol % and less than or equal to 0.1 mol %, greater than or equal to 0.001 mol % and less than or equal to 0.05 mol %, or even greater than or equal to 0.001 mol % and less than or equal to 0.01 mol %, or any and all sub-ranges formed from any of these endpoints.

A different color gamut may be achieved by including secondary colorants in addition to Au. For example, in embodiments, the glass composition and resultant colored glass article may comprise greater than or equal to 0 mol % and less than or equal to 1 mol % of a cation "M", wherein "M" is at least one of F, Cl, Br, Ti, V, Cr, Mn, Fe, Co, Ni, Cu, Se, Nb, Mo, Ru, Rh, Pd, Ag, Cd, In, Te, W, Ir, Pt, Ce, Pr, Nd, Sm, Eu, Gd, Tb, Dy, Ho, and Er.

Colorant: $Cr_2O_3$

In embodiments, the colorant package used in the glass compositions and the resultant colored glass articles described herein may comprise or consist of $Cr_2O_3$ as a colorant to achieve a desired color. In embodiments, $Cr_2O_3$ may be included in the glass compositions as the sole colorant or in combination with other colorants. For example, in embodiments where $Cr_2O_3$ is utilized as a colorant, other transition metal oxides may be included in the glass composition to modify the color imparted to the glass, including, for example and without limitation, CuO, NiO, and/or $Co_3O_4$. As described herein, in embodiments, the glass compositions and the resultant colored glass articles may be formulated to improve the solubility of $Cr_2O_3$, thereby expanding the color gamut achievable in the resultant colored glass articles.

In embodiments, the glass composition and the resultant colored glass article may comprise greater than or equal to 0 mol % and less than or equal to 2 mol % $Cr_2O_3$. In embodiments, the glass composition and the resultant colored glass article may comprise greater than or equal to 0.001 mol % and less than or equal to 1.5 mol % $Cr_2O_3$. In embodiments, the concentration of $Cr_2O_3$ in the glass composition and the resultant colored glass article may be greater than or equal to 0 mol %, greater than or equal to 0.001 mol %, greater than or equal to 0.005 mol %, greater than or equal to 0.01 mol %, or even greater than or equal to 0.05 mol %. In embodiments, the concentration of $Cr_2O_3$ in the glass composition and the resultant colored glass article may be less than or equal to 2 mol %, less than or equal to 1.5 mol %, less than or equal to 1 mol %, less than or equal to 0.5 mol %, or even less than or equal to 0.1 mol %. In embodiments, the concentration of $Cr_2O_3$ in the glass composition and the resultant colored glass article may be greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.5 mol %, greater than or equal to 0 mol % and less than or equal to 0.1 mol %, greater than or equal to 0.001 mol % and less than or equal to 2 mol %, greater than or equal to 0.001 mol % and less than or equal to 1.5 mol %, greater than or equal to 0.001 mol % and less than or equal to 1 mol %, greater than or equal to 0.001 mol % and less than or equal to 0.5 mol %, greater than or equal to 0.001 mol % and less than or equal to 0.1 mol %, greater than or equal to 0.005 mol % and less than or equal to 2 mol %, greater than or equal to 0.005 mol % and less than or equal to 1.5 mol %, greater than or equal to 0.005 mol % and less than or equal to 1 mol %, greater than or equal to 0.005 mol % and less than or equal to 0.5 mol %, greater than or equal to 0.005 mol % and less than or equal to 0.1 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.5 mol %, greater than or equal to 0.01 mol % and less than or equal to 0.1 mol %, greater than or equal to 0.05 mol % and less than or equal to 2 mol %, greater than or equal to 0.05 mol % and less than or equal to 1.5 mol %, greater than or equal to 0.05 mol % and less than or equal to 1 mol %, greater than or equal to 0.05 mol % and less than or equal to 0.5 mol %, or even greater than or equal to 0.05 mol % and less than or equal to 0.1 mol %, or any and all sub-ranges formed from any of these endpoints.

In embodiments where the colorant package includes $Cr_2O_3$ as a colorant, the glass compositions and the resultant colored glass articles are per-alkali (i.e., $R_2O$ (mol %)+R'O (mol %)-$Al_2O_3$ (mol %) is greater than or equal to 0.5 mol %) to increase the solubility of $Cr_2O_3$ and avoid Cr-spinel crystal formation. However, when the glass composition has an excessive amount of alkali after charge balancing $Al_2O_3$, the alkali may form non-bridging oxygen around $SiO_2$, which degrades fracture toughness. Accordingly, in embodiments, $R_2O$+R'O—$Al_2O_3$ in the glass composition and the resultant colored glass article may be limited (e.g., less than or equal to 6 mol %) to prevent a reduction in fracture toughness.

In embodiments, $R_2O$+R'O—$Al_2O_3$ in the glass composition and the resultant colored glass article may be greater than or equal to 0.5 mol % and less than or equal to 6 mol %. In embodiments, $R_2O$+R'O—$Al_2O_3$ in the glass composition and the resultant colored glass article may be greater than or equal to 1 mol % and less than or equal to 5.5 mol %. In embodiments, $R_2O$+R'O—$Al_2O_3$ in the glass composition and the colored resultant glass article may be greater than or equal to 0.5 mol %, greater than or equal to 1 mol %, greater than or equal to 1.5 mol %, or even greater than or equal to 2 mol %. In embodiments, $R_2O$+R'O—$Al_2O_3$ in the glass composition and the resultant colored glass article may be less than or equal to 6 mol %, less than or equal to 5.5 mol %, less than or equal to 5 mol %, less than or equal to 4.5 mol %, less than or equal to 4 mol %, less than or equal to 3.5 mol %, or even less than or equal to 3 mol %. In embodiments, $R_2O$+R'O—$Al_2O_3$ in the glass composition and the resultant colored glass article may be greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 0.5 mol % and less than or equal to 3 mol %, greater than or equal to 1 mol % and less than or equal to 6 mol %, greater than or equal to 1 mol % and less than or equal to 5.5 mol %, greater than or equal to 1 mol % and less than or equal to 5 mol %, greater than or equal to 1 mol % and less than or equal to 4.5 mol %, greater than or equal to 1 mol % and less than or equal to 4 mol %, greater than or equal to 1 mol % and less than or equal to 3.5 mol %, greater than or equal to 1 mol % and less than or equal to 3 mol %, greater than or equal to 1.5 mol % and less than or equal to 6 mol %, greater than or equal to 1.5 mol % and less than or equal to 5.5 mol %, greater than or equal to 1.5 mol % and less than or equal to 5 mol %, greater than or equal to 1.5 mol % and less than or equal to 4.5 mol %, greater than or equal to 1.5 mol % and less than or equal to 4 mol %, greater than or equal to 1.5 mol % and less than or equal to 3.5 mol %, greater than or equal to 1.5 mol % and less than or equal to 3 mol %, greater than or equal to 2 mol % and less than or equal to 6 mol %, greater than or equal to 2 mol % and less than or equal to 5.5 mol %, greater than or equal to 2 mol % and less than or equal to 5 mol %, greater than or equal to 2 mol % and less than or equal to 4.5 mol %, greater than or equal to 2 mol % and less than or equal to 4 mol %, greater than or equal to 2 mol % and less than or equal to 3.5 mol %, or even greater than or equal to 2 mol % and less than or equal to 3 mol %, or any and all sub-ranges formed from any of these endpoints.

In embodiments where the colorant package comprises $Cr_2O_3$ as a colorant, the glass compositions and the resultant colored glass articles may satisfy at least one of the following conditions and achieve the desired color: (1) less than or equal to 17.5 mol % $Al_2O_3$ and/or $R_2O$+R'O—$Al_2O_3$ greater than or equal to 0.5 mol %; (2) $Al_2O_3$+MgO+ZnO less than or equal to 22 mol %; and (3) MgO+ZnO less than or equal to 4.5 mol %.

In embodiments where the colorant comprises $Cr_2O_3$, different color gamuts may be achieved by including other colorants in addition to $Cr_2O_3$. For example, in embodiments, the glass composition and resultant colored glass article may comprise NiO, $Co_3O_4$, CuO, or combinations thereof in addition to $Cr_2O_3$.

In embodiments, the glass composition and the resultant colored glass article may comprise greater than or equal to 0 mol % and less than or equal to 4 mol % NiO as a colorant in addition to $Cr_2O_3$. In embodiments, the concentration of NiO in the glass composition and the resultant colored glass article may be greater than or equal to 0 mol %, greater than or equal to 0.01 mol %, or even greater than or equal to 0.05 mol %. In embodiments, the concentration of NiO in the glass composition and the resultant colored glass article may be less than or equal to 4 mol %, less than or equal to 3 mol %, less than or equal to 2 mol %, less than or equal to 1 mol %, less than or equal to 0.5 mol %, less than or equal to 0.25 mol %, or even less than or equal to 0.1 mol %. In embodiments, the concentration of NiO in the glass composition and the resultant colored glass article may be greater than or equal to 0 mol % and less than or equal to 4 mol %, greater than or equal to 0 mol % and less than or equal to 3 mol %, greater than or equal to 0 mol % and less than or equal to 2 mol %, greater than or equal to 0 mol % and less than or equal to 1 mol %, greater than or equal to 0 mol % and less than or equal to 0.5 mol %, greater than or equal to 0 mol % and less than or equal to 0.25 mol %, greater than or equal to 0 mol % and less than or equal to 0.1 mol %, greater than or equal to 0.01 mol % and less than or equal to 4 mol %, greater than or equal to 0.01 mol % and less than or equal to 3 mol %, greater than or equal to 0.01 mol % and less than or equal to 2 mol %, greater than or equal to 0.01 mol % and less than or equal to 1 mol %, greater than or equal to 0.01 mol % and less than or equal to 0.5 mol %, greater than or equal to 0.01 mol % and less than or equal to 0.25 mol %, greater than or equal to 0.01 mol % and less than or equal to 0.1 mol %, greater than or equal to 0.05 mol % and less than or equal to 4 mol %, greater than or equal to 0.05 mol % and less than or equal to 3 mol %, greater than or equal to 0.05 mol % and less than or equal to 2 mol %, greater than or equal to 0.05 mol % and less than or equal to 1 mol %, greater than or equal to 0.05 mol % and less than or equal to 0.5 mol %, greater than or equal to 0.05 mol % and less than or equal to 0.25 mol %, or even greater than or equal to 0.05 mol % and less than or equal to 0.1 mol %, or any and all sub-ranges formed between any of these endpoints.

In embodiments, the glass composition and the resultant colored glass article may comprise greater than or equal to 0 mol % and less than or equal to 2 mol % $Co_3O_4$ as a colorant in addition to $Cr_2O_3$. In embodiments, the concentration of $Co_3O_4$ in the glass composition and the resultant colored glass article may be greater than or equal to 0 mol %, greater than or equal to 0.001 mol %, greater than or equal to 0.005 mol %, or even greater than or equal to 0.01 mol %. In embodiments, the concentration of $Co_3O_4$ in the glass composition and the resultant colored glass article may be less than or equal to 2 mol %, less than or equal to 1.5 mol %, less than or equal to 1 mol %, less than or equal to 0.5 mol %, less than or equal to 0.1 mol %, or even less than or equal to 0.05 mol %. In embodiments, the concentration of $Co_3O_4$ in the glass composition and the resultant colored glass article may greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.5 mol %, greater than or equal to 0 mol % and less than or equal to 0.1 mol %, greater than or equal to 0 mol % and less than or equal to 0.05 mol %, greater than or equal to 0.001 mol % and less than or equal to 2 mol %, greater than or equal to 0.001 mol % and less than or equal to 1.5 mol %, greater than or equal to 0.001 mol % and less than or equal to 1 mol %, greater than or equal to 0.001 mol % and less than or equal to 0.5 mol %, greater than or equal to 0.001 mol % and less than or equal to 0.1 mol %, greater than or equal to 0.001 mol % and less than or equal to 0.05 mol %, greater than or equal to 0.005 mol % and less than or equal to 2 mol %, greater than or equal to 0.005 mol % and less than or equal to 1.5 mol %, greater than or equal to 0.005 mol % and less than or equal to 1 mol %, greater than or equal to 0.005 mol % and less than or equal to 0.5 mol %, greater than or equal to 0.005 mol % and less than or equal to 0.1 mol %, greater than or equal to 0.005 mol % and less than or equal to 0.05 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.5 mol %, greater than or equal to 0.01 mol % and less than or equal to 0.1 mol %, or even greater than or equal to 0.01 mol % and less than or equal to 0.05 mol %, or any and all sub-ranges formed from any of these endpoints.

In embodiments, the glass composition and the resultant colored glass article may comprise greater than or 0 mol % and less than or equal to 5 mol % CuO as a colorant in addition to $Cr_2O_3$. In embodiments, the concentration of CuO in the glass composition and the resultant colored glass article may be greater than or equal 0 mol %, greater than or equal to 0.05 mol %, greater than or equal to 0.1 mol %, greater than or equal to 0.5 mol %, or even greater than or equal to 1 mol %. In embodiments, the concentration of CuO in the glass composition and the resultant colored glass article may be less than or equal to 5 mol %, less than or equal to 4 mol %, less than or equal to 3 mol %, or even less than or equal to 2 mol %. In embodiments, the concentration of CuO in the glass composition and the resultant colored glass article may be greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0 mol % and less than or equal to 2 mol, greater than or equal to 0.05 mol % and less than or equal to 5 mol %, greater than or equal to 0.05 mol % and less than or equal to 4 mol %, greater than or equal to 0.05 mol % and less than or equal to 3 mol %, greater than or equal to 0.05 mol % and less than or equal to 2 mol %, greater than or equal to 0.1 mol % and less than or equal to 5 mol %, greater than or equal to 0.1 mol % and less than or equal to 4 mol %, greater than or equal to 0.1 mol % and less than or equal to 3 mol %, greater than or equal to 0.1 mol % and less than or equal to 2 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 0.5 mol % and less than or equal to 2 mol %, greater than or equal to 1 mol % and less than or equal to 5 mol %, greater than or equal to 1 mol % and less than or equal to 4 mol %, greater than or equal to 1 mol % and less than or equal to 3 mol %, or even greater than or equal to 1 mol % and less than or equal to 2 mol %, or any and all sub-ranges formed from any of these endpoints.

Colorant: Silver

In embodiments, the colorant package used in the glass compositions and the resultant colored glass articles may comprise or consist of Ag as a colorant to achieve a desired color. As described herein, in embodiments, the glass compositions and the resultant colored glass articles may be formulated to improve the retention of Ag, thereby expanding the color gamut achievable in the resultant colored glass articles. In embodiments, Ag may be included in the glass compositions as the sole colorant or in combination with other colorants. In embodiments where Ag is utilized as a colorant in the glass composition, the color is created by the presence of anisotropic silver particles in the colored glass article that are formed from the reduction of silver ions in the glass composition.

Accordingly, in embodiments, the glass composition and the resultant colored glass article may comprise greater than or equal to 0.01 mol % and less than or equal to 5 mol % Ag. In embodiments, the glass composition and the resultant colored glass article may comprise greater than or equal to 0.05 mol % and less than or equal to 2.5 mol % Ag, greater than or equal to 0.1 mol % and less than or equal to 1 mol % Ag, greater than or equal to 0.1 mol % and less than or equal to 0.75 mol % Ag, greater than or equal to 0.1 mol % and less than or equal to 0.5 mol % Ag, or greater than or equal to 0.1 mol % and less than or equal to 0.25 mol % Ag. In embodiments, the concentration of Ag in the glass composition and the resultant colored glass article may be greater than or equal to 0.01 mol %, greater than or equal to 0.05 mol %, or greater than or equal to 0.1 mol %. In embodiments, the concentration of Ag in the glass composition and the resultant colored glass article may be less than or equal to 5 mol %, less than or equal to 2.5 mol %, less than or equal to 1 mol %, less than or equal to 0.75 mol %, less than or equal to 0.5 mol %, or less than or equal to 0.25 mol %. In embodiments, the concentration of Ag in the glass composition and the resultant colored glass article may be greater than or equal to 0.01 mol % and less than or equal to 5 mol %, greater than or equal to 0.01 mol % and less than or equal to 2.5 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.5 mol %, greater than or equal to 0.05 mol % and less than or equal to 5 mol %, greater than or equal to 0.05 mol % and less than or equal to 2.5 mol %, greater than or equal to 0.05 mol % and less than or equal to 1 mol %, greater than or equal to 0.05 mol % and less than or equal to 0.75 mol %, greater than or equal to 0.05 mol % and less than or equal to 0.5 mol %, greater than or equal to 0.05 mol % and less than or equal to 0.25 mol %, greater than or equal to 0.1 mol % and less than or equal to 5 mol %, greater than or equal to 0.1 mol % and less than or equal to 2.5 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, greater than or equal to 0.1 mol % and less than or equal to 0.25 mol %, or any and all sub-ranges formed from any of these endpoints.

Conventionally, halide-free colored glass articles that comprise silver in as-formed condition (i.e., colored glass articles that have not been subjected to mechanical stretching) produce only yellow, orange, and red colors upon a suitable heat treatment applied to the glass article in as-formed condition. These colors are generated by the formation of isotropic (i.e., nominally spherical) silver particles in the conventional, halide-free colored glass article. These isotropic silver particles support a single localized surface plasmon resonance. Isotropic silver particles are the most energetically favorable to form because they have the lowest surface area to volume ratio and, as a result, they are the most common geometry observed in colored glass articles that comprise silver.

In contrast, colored glass articles that comprise anisotropic silver particles can produce a much broader range of colors, such as pink, purple, blue, green, brown and black. As used herein, anisotropic silver particles refer to silver particles having an aspect ratio greater than 1, where the aspect ratio is the ratio of longest dimension of the particle to the shortest dimension of the particle (e.g., a ratio of the length of the particle to the width of the particle is greater than 1). This is in contrast to an isotropic silver particle in which the aspect ratio is 1. The broader color gamut produced in glasses having anisotropic silver particles is because anisotropic silver particles support two distinct plasmonic modes: a higher energy transverse mode, and a lower energy longitudinal mode. These two distinct plasmonic modes can be observed via absorption spectra of the colored glass articles, which typically have at least two distinct peaks when anisotropic silver particles are present in the glass. By varying the aspect ratio of anisotropic particles, the resonant absorption of these two plasmonic modes can be tuned and, as a result, the color shifted.

Conventionally, the formation of anisotropic metallic silver particles in glass can be either induced by elongating spherical particles of silver through shear forces (e.g., by stretching the colored glass article via re-draw) using mechanical stretching processes. The mechanical stretching process results in a glass article having silver particles that are generally aligned in parallel with one another along the stretching direction (i.e., the glass is polarized).

A conventional alternative to mechanical stretching processes for creating anisotropic metallic particles in a glass article is the incorporation of halides (e.g., F, Cl, and Br) in the glass composition. In halide-containing colored glass articles, anisotropic silver particles are formed by templating the particles on elongated and/or pyramidal-shaped halide crystals. However, the inclusion of halides in the glass composition may be undesirable.

In contrast, the colored glass articles comprising Ag as a colorant described herein may generate a broad range of colors, such as yellow, orange, red, green, pink, purple, brown, and black without the inclusion of halides in the glass composition or the use of mechanical stretching processes. Without being bound by any particular theory, it is believed that anisotropic silver particles may form in the colored glass articles of the present disclosure due to a mechanism similar to the template growth caused by the inclusion of halides in the glass composition. However, instead of templating on a halide-containing crystal or mechanically stretching isotropic silver particles, it has been unexpectedly found that anisotropic silver crystals may form on nano-sized crystals of spodumene, lithium silicate, and/or beta quartz during heat treatment of the glass article in its as formed condition. Additionally and/or alternatively, it is believed that anisotropic silver particles may precipitate at the interfaces between phase separated regions of the colored glass article and/or regions that are only partially crystalized. Further, these crystals and/or phase separated regions may form a nucleation site for the growth of anisotropic silver particles.

Accordingly, in embodiments, the glass composition and the resultant colored glass article including silver as a colorant may comprise less than 100 parts per million (ppm) of halides. For example, the glass compositions and the resultant colored glass articles comprising Ag as a colorant may comprise less than 100 ppm halides, such as less than 50 ppm halides, less than 25 ppm halides, less than 10 ppm halides, or even 0 ppm halides.

As noted previously, colored glass articles comprising Ag produced using mechanical stretching processes generally include anisotropic silver particles similar to those of the colored glass article of the present application. However, it should be noted that these mechanical stretching processes also result in the anisotropic silver particles being ordered and aligned (e.g., the longer dimensions of each anisotropic silver particles are facing in the same direction, such as in the direction of mechanical stretching). Put more simply, the colored glass articles produced using mechanical stretching processes are polarized due to the alignment of the anisotropic silver particles in the glass as a result of mechanical stretching.

In contrast, in the embodiments described herein, the colored glass articles comprising Ag as a colorant, which are not subjected to mechanical stretching processes, are non-polarized. In embodiments, the anisotropic silver particles of the colored glass article are not aligned (e.g., the longer dimensions of two or more anisotropic silver particles are facing in different directions) and, instead, the anisotropic silver particles are randomly aligned in the glass.

The term “length,” as used herein, refers to the longest dimension of the anisotropic silver particles. In embodiments, the anisotropic silver particles in the colored glass articles described herein have a length greater than or equal to 10 nm, greater than or equal to 12 nm, greater than or equal to 14 nm, greater than or equal to 16 nm, greater than or equal to 18 nm, greater than or equal to 10 nm, greater than or equal to 22 nm, greater than or equal to 24 nm, greater than or equal to 26 nm, greater than or equal to 28 nm, greater than or equal to 30 nm, greater than or equal to 32 nm, greater than or equal to 34 nm, greater than or equal to 36 nm, or even greater than or equal to 38 nm. The length of the anisotropic silver particles may be measured using image analysis on electron micrographs obtained from samples of the colored glass articles using software such as ImageJ software. To obtain the length and width of the anisotropic silver particles, a calibration is set by measuring the scale bar on the electron micrograph, converting each pixel to the appropriate unit length. The image is then converted into a grayscale image. A software measuring tool is then used to measure the number of pixels from one end to the other of each particle as well as the number of pixels across the greatest width of the particle. In embodiments an automated script is run to measure the length and aspect ratios of multiple particles automatically. In embodiments, the anisotropic silver particles in the colored glass articles described herein have a length less than or equal to 40 nm, less than or equal to 38 nm, less than or equal to 36 nm, less than or equal to 34 nm, less than or equal to 32 nm, less than or equal to 30 nm, less than or equal to 28 nm, less than or equal to 26 nm, less than or equal to 24 nm, less than or equal to 22 nm, or even less than or equal to 20 nm. In embodiments, the anisotropic silver particles in the colored glass articles described herein have a length greater than or equal to 10 nm and less than or equal to 40 nm, greater than or equal to 12 nm and less than or equal to 36 nm, greater than or equal to 14 nm and less than or equal to 34 nm, greater than or equal to 14 nm and less than or equal to 32 nm, greater than or equal to 14 nm and less than or equal to 28 nm, greater than or equal to 14 nm and less than or equal to 26 nm, greater than or equal to 16 nm and less than or equal to 26 nm, greater than or equal to 16 nm and less than or equal to 24 nm, greater than or equal to 16 nm and less than or equal to 22 nm, greater than or equal to 16 nm and less than or equal to 20 nm, or any and all sub-ranges formed from any of these endpoints.

The term "width," as used herein, refers to the dimension of the anisotropic particles in a direction perpendicular to the longest dimension of the anisotropic particles (i.e., the dimension in a direction perpendicular to the length). In embodiments, the anisotropic silver particles in the colored glass articles described herein have a width greater than or equal to 6 nm, greater than or equal to 8 nm, greater than or equal to 10 nm, greater than or equal to 12 nm, or even greater than or equal to 14 nm. In embodiments, the anisotropic silver particles in the colored glass articles described herein have a width less than or equal to 20 nm, less than or equal to 18 nm, less than or equal to 16 nm, less than or equal to 12 nm, or even less than or equal to 10 nm. In embodiments, the anisotropic silver particles in the colored glass articles described herein have a width greater than or equal to 6 nm and less than or equal to 20 nm, greater than or equal to 6 nm and less than or equal to 18 nm, greater than or equal to 6 nm and less than or equal to 16 nm, greater than or equal to 8 nm and less than or equal to 20 nm, greater than or equal to 8 nm and less than or equal to 18 nm, greater than or equal to 8 nm and less than or equal to 16 nm, greater than or equal to 10 nm and less than or equal to 20 nm, greater than or equal to 10 nm and less than or equal to 18 nm, greater than or equal to 10 nm and less than or equal to 16 nm, greater than or equal to 10 nm and less than or equal to 14 nm, or any and all sub-ranges formed from any of these endpoints.

In embodiments, the anisotropic silver particles in the colored glass articles described herein have an aspect ratio (i.e., the ratio of the length to the width of the anisotropic silver nanoparticles) greater than 1, greater than or equal to 1.5, greater than or equal to 2, or even greater than or equal to 2.5. In embodiments, the anisotropic silver particles in the colored glass articles described herein have an aspect ratio less than or equal to 3, less than or equal to 2.5, less than or equal to 2, or even less than or equal to 1.5. In embodiments, the anisotropic silver particles in the colored glass articles described herein have an aspect ratio greater than 1 and less than or equal to 3, greater than 1 and less than or equal to 2.5, greater than 1 and less than or equal to 2, greater than 1 and less than or equal to 1.5, greater than or equal to 1.5 and less than or equal to 3, greater than or equal to 1.5 and less than or equal to 2.5, greater than or equal to 1.5 and less than or equal to 2, greater than or equal to 2 and less than or equal to 3, greater than or equal to 2 and less than or equal to 2.5, or any and all sub-ranges formed from any of these endpoints.

The glass compositions and the resultant colored glass articles that include Ag as a colorant may further comprise one or more rare-earth oxides, such as $CeO_2$, $Nd_2O_3$, $Er_2O_3$. Rare-earth oxides may be added to provide additional visible light absorbance to the glass (in addition to that imparted by the silver) to further alter the color of the glass. Rare-earth oxides may also be added to increase the Young's modulus and/or the annealing point of the resultant glass.

In embodiments, the glass compositions and the resultant colored glass articles that include Ag as a colorant may further comprise greater than or equal to 0 mol % and less than or equal to 4 mol % of $CeO_2$, In embodiments, the glass compositions and the resultant colored glass articles that include Ag as a colorant may further comprise greater than or equal to 0 mol % and less than or equal to 3 mol % $CeO_2$, greater than or equal to 0 mol % and less than or equal to 1 mol % of $CeO_2$, greater than or equal to 0.05 mol % and less than or equal to 1 mol % of $CeO_2$, or greater than or equal to 0.05 mol % and less than or equal to 0.5 mol % of $CeO_2$. In embodiments, the concentration of $CeO_2$ in the glass compositions and the resultant colored glass articles that comprise Ag as a colorant may be greater than or equal to 0 mol %, or even greater than or equal to 0.05 mol %. In embodiments, the concentration of $CeO_2$ in the glass compositions and the resultant colored glass articles that comprise Ag as a colorant may be less than or equal to 4 mol %, less than or equal to 3 mol %, less than or equal to 2 mol %, less than or equal to 1 mol % or less than or equal to 0.5 mol %. In embodiments, the concentration of $CeO_2$ in the glass compositions and the resultant colored glass articles that include Ag as a colorant may be greater than or equal to 0 mol % and less than or equal to 4 mol %, greater than or equal to 0 mol % and less than or equal to 3 mol %, greater than or equal to 0 mol % and less than or equal to 2 mol %, greater than or equal to 0 mol % and less than or equal to 1 mol %, greater than or equal to 0 mol % and less than or equal to 0.5 mol %, greater than or equal to 0.05 mol % and less than or equal to 4 mol %, greater than or equal to 0.05 mol % and less than or equal to 3 mol %, greater than or equal to 0.05 mol % and less than or equal to 2 mol %, greater than or equal to 0.05 mol % and less than or equal to 1 mol %, or even greater than or equal to 0.05 mol % and less than or equal to 0.5 mol %, or any and all sub-ranges formed from any of these endpoints.

In embodiments, the glass compositions and the resultant colored glass articles that include Ag as a colorant may comprise greater than or equal to 0 mol % and less than or equal to 4 mol % of $Nd_2O_3$, In embodiments, the glass compositions and the resultant colored glass articles that include Ag as a colorant may comprise greater than or equal to 0 mol % and less than or equal to 3 mol % $Nd_2O_3$, greater than or equal to 0 mol % and less than or equal to 1 mol % of $Nd_2O_3$, greater than or equal to 0 mol % and less than or equal to 1 mol % of $Nd_2O_3$, greater than or equal to 0.1 mol % and less than or equal to 1 mol % of $Nd_2O_3$, greater than or equal to 0.1 mol % and less than or equal to 1.5 mol % of $Nd_2O_3$, or greater than or equal to 0.1 mol % and less than or equal to 0.5 mol % of $Nd_2O_3$. In embodiments, the concentration of $Nd_2O_3$ in the glass compositions and the resultant colored glass articles that include Ag as a colorant may be greater than or equal to 0 mol %, or even greater than or equal to 0.1 mol %. In embodiments, the concentration of $Nd_2O_3$ in the glass compositions and the resultant colored glass articles that include Ag as a colorant may be less than or equal to 4 mol %, less than or equal to 3 mol %, less than or equal to 2 mol %, less than or equal to 1 mol % or less than or equal to 0.5 mol %. In embodiments, the concentration of one or more of $Nd_2O_3$ in the glass compositions and the resultant colored glass articles that include Ag as a colorant may be greater than or equal to 0 mol % and less than or equal to 4 mol %, greater than or equal to 0 mol % and less than or equal to 3 mol %, greater than or equal to 0 mol % and less than or equal to 2 mol %, greater than or equal to 0 mol % and less than or equal to 1 mol %, greater than or equal to 0 mol % and less than or equal to 1.5 mol %, greater than or equal to 0 mol % and less than or equal to 0.5 mol %, greater than or equal to 0.1 mol % and less than or equal to 4 mol %, greater than or equal to 0.1 mol % and less than or equal to 3 mol %, greater than or equal to 0.1 mol % and less than or equal to 2 mol %, greater than or equal to 0.1 mol % and less than or equal to 1.5 mol %, greater than or equal to 0.1 mol % and less than or equal to 1 mol %, or even greater than or equal to 0.1 mol % and less than or equal to 0.5 mol %, or any and all sub-ranges formed from any of these endpoints.

In embodiments, the glass compositions and the resultant colored glass articles that include Ag as a colorant may comprise greater than or equal to 0 mol % and less than or equal to 4 mol % of $Er_2O_3$. In embodiments, the glass compositions and the resultant colored glass articles that include Ag as a colorant may comprise greater than or equal to 0 mol % and less than or equal to 3 mol % $Er_2O_3$, greater than or equal to 0 mol % and less than or equal to 1.5 mol % of $Er_2O_3$, greater than or equal to 0 mol % and less than or equal to 1 mol % of $Er_2O_3$, greater than or equal to 0.1 mol % and less than or equal to 1.5 mol % of $Er_2O_3$, greater than or equal to 0.1 mol % and less than or equal to 1 mol % of $Er_2O_3$, or greater than or equal to 0.1 mol % and less than or equal to 0.5 mol % of $Er_2O_3$. In embodiments, the concentration of $Er_2O_3$ in the glass compositions and the resultant colored glass articles that include Ag as a colorant may be greater than or equal to 0 mol %, or even greater than or equal to 0.1 mol %. In embodiments, the concentration of $Er_2O_3$ in the glass compositions and the resultant colored glass articles that include Ag as a colorant may be less than or equal to 4 mol %, less than or equal to 3 mol %, less than or equal to 2 mol %, less than or equal to 1 mol % or less than or equal to 0.5 mol %. In embodiments, the concentration of one or more of $Er_2O_3$ in the glass compositions and the resultant colored glass articles that include Ag as a colorant may be greater than or equal to 0 mol % and less than or equal to 4 mol %, greater than or equal to 0 mol % and less than or equal to 3 mol %, greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.5 mol %, greater than or equal to 0.1 mol % and less than or equal to 4 mol %, greater than or equal to 0.1 mol % and less than or equal to 3 mol %, greater than or equal to 0.1 mol % and less than or equal to 2 mol %, greater than or equal to 0.1 mol % and less than or equal to 1.5 mol %, greater than or equal to 0.1 mol % and less than or equal to 1 mol %, or even greater than or equal to 0.1 mol % and less than or equal to 0.5 mol %, or any and all sub-ranges formed from any of these endpoints.

In embodiments, the glass compositions and the resultant colored glass articles described herein may further include tramp materials such as $TiO_2$, MnO, $MoO_3$, $WO_3$, $Y_2O_3$, CdO, $As_2O_3$, sulfur-based compounds, such as sulfates, halogens, or combinations thereof. In embodiments, the glass composition and the resultant colored glass article may be substantially free or free of tramp materials such as $TiO_2$, MnO, $MoO_3$, $WO_3$, $Y_2O_3$, CdO, $As_2O_3$, sulfur-based compounds, such as sulfates, halogens, or combinations thereof.

In embodiments described herein, decreasing the melting point of the glass composition may help improve colorant retention because the glass compositions may be melted at relatively lower temperatures and colorant evaporation may be reduced. Accordingly, the glass compositions and the resultant colored glass articles described herein may optionally include MgO and/or ZnO, which help lower the melting point of the glass composition. $B_2O_3$, $Li_2O$, and $Na_2O$ also decrease the melting point of the glass composition. As described herein, other components may be added to the glass composition to lower the melting point thereof, such as $SnO_2$, $Sb_2O_3$, and $Bi_2O_3$. In embodiments, the glass composition may have a melting point less than or equal to 1550° C. In embodiments, the glass composition may have a melting point greater than or equal to 1300° C., greater than or equal to 1325° C., greater than or equal to 1350° C., greater than or equal to 1375° C., or even greater than or 1400° C. In embodiments, the glass composition may have a melting point less than or equal to 1550° C., less than or equal to 1525° C., less than or equal 1500° C., less than or equal to 1475° C., or even less than or equal to 1450° C. In embodiments, the melting point of the glass composition may be greater than or equal to 1300° C. and less than or equal to 1550° C., greater than or equal to 1300° C. and less than or equal to 1525° C., greater than or equal to 1300° ° C. and less than or equal to 1500° C., greater than or equal to 1300° C. and less than or equal to 1475° C., greater than or equal to 1300° C. and less than or equal to 1450° C., greater than or equal to 1325° C. and less than or equal to 1550° C., greater than or equal to 1325° C. and less than or equal to 1525° C., greater than or equal to 1325° C. and less than or equal to 1500° C., greater than or equal to 1325° C. and less than or equal to 1475° C., greater than or equal to 1325° C. and less than or equal to 1450° C., greater than or equal to 1350° C. and less than or equal to 1550° C., greater than or equal to 1350° C. and less than or equal to 1525° C., greater than or equal to 1350° C. and less than or equal to 1500° C., greater than or equal to 1350° C. and less than or equal to 1475° C., greater than or equal to 1350° C. and less than or equal to 1450° C., greater than or equal to 1375° C. and less than or equal to 1550° C., greater than or equal to 1375° C. and less than or equal to 1525° C., greater than or equal to 1375° C. and less than or equal to 1500° C., greater than or equal to 1375° C. and less than or equal to 1475° C., greater than or equal to 1375° C. and less than or equal to 1450° C., greater than or equal to 1400° C. and less than or equal to 1550° C., greater than or equal to 1400° C. and less than or equal to 1525° C., greater than or equal to 1400° ° C. and less than or equal to 1500° C., greater than or equal to 1400° C. and less than or equal to 1475° C., or even greater than or equal to 1400° C. and less than or equal to 1450° C., or any and all sub-ranges formed from any of these endpoints.

In embodiments, a liquidus temperature of the glass composition may be greater than or equal to 1000° C., greater than or equal to 1050° ° C., or even greater than or equal to 1100° C. In embodiments, a liquidus temperature of the precursor glass composition may be less than or equal to 1400° C., less than or equal to 1350° C. or even less than or equal to 1300° C. In embodiments, a liquidus temperature of the glass composition may be greater than or equal to 1000° C. and less than or equal to 1400° C., greater than or equal to 1000° C. and less than or equal to 1350° C., greater than or equal to 1000° C. and less than or equal to 1300° C., greater than or equal to 1050° C. and less than or equal to 1400° C., greater than or equal to 1050° C. and less than or equal to 1350° C., greater than or equal to 1000° C. and less than or equal to 1300° C., greater than or equal to 1100° C. and less than or equal to 1400° C., greater than or equal to 1100° C. and less than or equal to 1350° C., or even greater than or equal to 1100° C. and less than or equal to 1300° C., or any and all sub-ranges formed from any of these endpoints.

In embodiments, the viscosity of the glass composition may be adjusted to prevent devitrification of the glass composition and formation of colorant particles, such as Au particles, during melting and forming. Formation of colorant particles during melting and forming may limit the color gamut that may be achieved by heat treatment. In embodiments, to achieve the desired viscosity and thereby prevent formation of colorant particles before melting, the glass compositions and the resultant glass articles described herein may satisfy the relationship 5.72* $Al_2O_3$ (mol %)-21.4*ZnO (mol %)-2.5*$P_2O_5$ (mol %)-35*$Li_2O$ (mol %)-16.6*$B_2O_3$ (mol %)-20.5*MgO (mol %)-23.3*$Na_2O$ (mol %)-27.9*SrO (mol %)-18.5*$K_2O$ (mol %)-26.3*CaO (mol %) is greater than −609 mol %. While not wishing to be bound by theory, it is believe that this relationship may also hold true for glass compositions containing colorants other than Au, such as when the colorant comprises Ag (which may also form colorant particles in the glass). In embodiments, the glass compositions and the resultant glass articles described herein may satisfy the relationship 5.72*$Al_2O_3$ (mol %)-21.4*ZnO (mol %)-2.5*$P_2O_5$ (mol %)-35*$Li_2O$ (mol %)-16.6*$B_2O_3$ (mol %)-20.5*MgO (mol %)-23.3*$Na_2O$ (mol %)-27.9*SrO (mol %)-18.5*$K_2O$ (mol %)-26.3*CaO (mol %) is greater than −609 mol %, greater than or equal to −575 mol %, greater than or equal to −550 mol %, or even greater than or equal to −525 mol %. In embodiments, the glass compositions and the resultant glass articles described herein may satisfy the relationship 5.72*$Al_2O_3$ (mol %)-21.4*ZnO (mol %)-2.5*$P_2O_5$ (mol %)-35*$Li_2O$ (mol %)-16.6*$B_2O_3$ (mol %)-20.5*MgO (mol %)-23.3*$Na_2O$ (mol %)-27.9*SrO (mol %)-18.5*$K_2O$ (mol %)-26.3*CaO (mol %) is less than or equal to −400 mol %, less than or equal to −425 mol %, or even less than or equal to −450 mol %. In embodiments, the glass compositions and the resultant glass articles described herein may satisfy the relationship 5.72* $Al_2O_3$ (mol %)-21.4*ZnO (mol %)-2.5*$P_2O_5$ (mol %)-35*$Li_2O$ (mol %)-16.6*$B_2O_3$ (mol %)-20.5*MgO (mol %)-23.3*$Na_2O$ (mol %)-27.9*SrO (mol %)-18.5*$K_2O$ (mol %)-26.3*CaO (mol %) is greater than −609 mol % and less than or equal to −400 mol %, greater than −609 mol % and less than or equal to −425 mol %, greater than −609 mol % and less than or equal to −450 mol %, greater than or equal to −575 mol % and less than or equal to −400 mol %, greater than or equal to −575 mol % and less than or equal to −425 mol %, greater than or equal to −575 mol % and less than or equal to −450 mol %, greater than or equal to −550 mol % and less than or equal to −400 mol %, greater than or equal to −550 mol % and less than or equal to −425 mol %, greater than or equal to −550 mol % and less than or equal to −450 mol %, greater than or equal to −525 mol % and less than or equal to −400 mol %, greater than or equal to −525 mol % and less than or equal to −425 mol %, or even greater than or equal to −525 mol % and less than or equal to −450 mol %, or any and all sub-ranges formed from any of these endpoints.

In embodiments, the colored glass articles may be formed by first melting a glass composition comprising a combination of constituent glass components as described herein and one or more colorants in a colorant package. Thereafter, the molten glass is formed into a precursor glass article using conventional forming techniques and, thereafter, cooled. The precursor glass article may take on any number of forms including, without limitation, sheets, tubes, rods, containers (e.g., vials, bottles, jars, etc.) or the like. In embodiments, the precursor glass article may be exposed to a heat treatment to produce color in the glass. For example and without limitation, the heat treatment may induce the formation of colorant particles in the glass which, in turn, cause the glass to become colored. In some embodiments, the glass may appear clear (i.e., colorless) prior to heat treatment. Examples of colorant particles may include, for example and without limitation, Au particles (such as when the colorant package in the glass comprises Au), randomly oriented, anisotropic silver particles (such as when the colorant package comprises Ag) and/or the like, thereby forming a colored glass article. The time and/or temperature of the heat treatment may be specifically selected to produce a colored glass article having a desired color. Without wishing to be bound by theory, it is believed that a desired color is a result of the morphology of the particles precipitated in the glass which, in turn, is dependent on the time and/or temperature of the heat treatment. Accordingly, it should be understood that a single glass composition can be used to form colored glass articles having different colors based on the time and/or temperature of the applied heat treatment in addition to the composition of the colorant package included in the glass.

Specifically, different color coordinates within the color gamut may be achieved by altering the heat treatment cycle of the glass composition used to produce the resultant colored glass articles. The heat treatment cycle is characterized by the temperature of the environment (i.e., the oven) and the duration of the cycle (i.e., the time exposed to the heated environment). As used herein, the phrase "temperature of the heat treatment cycle" refers to the temperature of the environment (i.e., the oven). In embodiments, glass articles formed from the glass compositions described herein are heat treated in an isothermal oven to produce the resultant colored glass articles.

In embodiments, the temperature of the heat treatment cycle is greater than or equal to 500° C., greater than or equal to 550° C., greater than or equal to 575° C., greater than or equal to 600° C., greater than or equal to 625° C., or even greater than or equal to 650° C. In embodiments, the temperature of the heat treatment cycle is less than or equal to 800° C., less than or equal to 775° C., less than or equal to 750° C., less than or equal to 725° C., or even less than or equal to 700° C. In embodiments, the temperature of the heat treatment cycle is greater than or equal to 500° C. and less than or equal to 800° C., greater than or equal to 500° C. and less than or equal to 775° C., greater than or equal to 500° C. and less than or equal to 750° C., greater than or equal to 500° C. and less than or equal to 725° C., greater than or equal to 550° C. and less than or equal to 700° C., greater than or equal to 550° ° C. and less than or equal to 800° C., greater than or equal to 550° ° C. and less than or equal to 775° C., greater than or equal to 550° C. and less than or equal to 750° C., greater than or equal to 550° C. and less than or equal to 725° C., greater than or equal to 550° C. and less than or equal to 700° C., greater than or equal to 575° C. and less than or equal to 800° C., greater than or equal to 575° C. and less than or equal to 775° C., greater than or equal to 575° C. and less than or equal to 750° C., greater than or equal to 575° C. and less than or equal to 725° C., greater than or equal to 575° C. and less than or equal to 700° C., greater than or equal to 600° C. and less than or equal to 800° C., greater than or equal to 600° C. and less than or equal to 775° C., greater than or equal to 600° C. and less than or equal to 750° C., greater than or equal to 600° C. and less than or equal to 725° C., greater than or equal to 600° C. and less than or equal to 700° C., greater than or equal to 625° C. and less than or equal to 800° C., greater than or equal to 625° ° C. and less than or equal to 775° C., greater than or equal to 625° C. and less than or equal to 750° C., greater than or equal to 625° C. and less than or equal to 725° C., greater than or equal to 625° C. and less than or equal to 700° ° C., greater than or equal to 650° C. and less than or equal to 800° C., greater than or equal to 650° C. and less than or equal to 775° C., greater than or equal to 650° C. and less than or equal to 750° C., greater than or equal to 650° ° C. and less than or equal to 725° C., or even greater than or equal to 650° C. and less than or equal to 700° C., or any and all sub-ranges formed from any of these endpoints.

In embodiments, the duration of the heat treatment cycle is greater than or equal to 0.15 hour, greater than or equal to 0.25 hour, greater than or equal to 0.5 hour, greater than or equal 1 hour, or even greater than or equal to 2 hours. In embodiments, the durations of the heat treatment cycle is less than or equal to 24 hours, less than or equal to 16 hours, less than or equal to 8 hours, less than or equal to 6 hours, less than or equal to 4 hours, or even less than or equal to 3 hours. In embodiments, the duration of the heat treatment cycle is greater than or equal to 0.25 hour and less than or equal to 24 hours, greater than or equal to 0.25 hour and less than or equal to 16 hours, greater than or equal to 0.25 hour and less than or equal to 8 hours, greater than or equal to 0.25 hour and less than or equal to 4 hours, greater than or equal to 0.5 hour and less than or equal to 24 hours, greater than or equal to 0.5 hour and less than or equal to 16 hours, greater than or equal to 0.5 hour and less than or equal to 8 hours, greater than or equal to 0.5 hour and less than or equal to 4 hours, greater than or equal to 1 hour and less than or equal to 24 hours, greater than or equal to 1 hour and less than or equal to 16 hours, greater than or equal to 1 hour and less than or equal to 8 hours, greater than or equal to 1 hour and less than or equal to 4 hours, greater than or equal to 2 hours and less than or equal to 24 hours, greater than or equal to 2 hours and less than or equal to 16 hours, greater than or equal to 2 hours and less than or equal to 8 hours, or even greater than or equal to 2 hours and less than or equal to 4 hours, or any and all sub-ranges formed from any of these endpoints.

In embodiments, the heat treatment may comprise ramping up to a heat treatment temperature at a heating rate and cooling down from the heat treatment temperature at a cooling rate. In embodiments, the selected heating rate and cooling rate may effect the color coordinates of the resultant colored glass articles.

In embodiments, the heating rate of the heat treatment may be greater than or equal to 2° C./min or even greater than or equal to 3° C./min. In embodiments, the heating rate of the heat treatment may be less than equal to 10° C./min, less than or equal to 7° C./min, or even less than or equal to 5° C./min. In embodiments, the heating rate of the heat treatment may be greater than or equal to 2° C./min and less than or equal to 10° C./min, greater than or equal to 2° C./min and less than or equal to 7° C./min, greater than or equal to 2° C./min and less than or equal to 5° C./min, greater than or equal to 3° C./min and less than or equal to 10° C./min, greater than or equal to 3° C./min and less than or equal to 7° C./min, or even greater than or equal to 3° C./min and less than or equal to 5° C./min, or any and all sub-ranges formed from any of these endpoints.

In embodiments, the cooling rate of the heat treatment may be greater than or equal to 1° C./min or even greater than or equal to 2° C./min. In embodiments, the cooling rate of the heat treatment may be less than or equal to 10° C./min, less than or equal to 8° C./min, less than or equal to 6° C./min, or even less than or equal to 4° C./min. In embodiments, the cooling rate of the heat treatment may be greater than or equal to 1° C./min and less than or equal to 10° C./min, greater than or equal to 1° C./min and less than or equal to 8° C./min, greater than or equal to 1° C./min and less than or equal to 6° C./min, greater than or equal to 1° C./min and less than or equal to 4° C./min, greater than or equal to 2° C./min and less than or equal to 10° C./min, greater than or equal to 2° C./min and less than or equal to 8° C./min, greater than or equal to 2° C./min and less than or equal to 6° C./min, or even greater than or equal to 2° C./min and less than or equal to 4° C./min, or any and all sub-ranges formed from any of these endpoints.

For example and without limitation, in embodiments in which the glass composition comprises Ag, colored glass articles having an orange color may be formed by heat treating the precursor glass article at a heat treatment temperature from about 590° C. to about 610° C. for a heat treatment time from about 45 minutes to about 180 minutes.

For example and without limitation, in embodiments in which the glass composition comprises Ag, colored glass articles having a red color may be formed by heat treating the precursor glass article at a heat treatment temperature from about 600° C. to about 615° C. for a heat treatment time from about 180 minutes to about 300 minutes.

For example and without limitation, in embodiments in which the glass composition comprises Ag, colored glass articles having a green color may be formed by heat treating the precursor glass article at a heat treatment temperature from about 620° ° C. to about 640° ° C. for a heat treatment time from about 20 minutes to about 40 minutes.

For example and without limitation, in embodiments in which the glass composition comprises Ag, colored glass articles having a brown color may be formed by heat treating the precursor glass article at a heat treatment temperature from about 640° C. to about 660° C. for a heat treatment time from about 30 minutes to about 90 minutes.

For example and without limitation, in embodiments in which the glass composition comprises Ag, colored glass articles having a purple color may be formed by heat treating the precursor glass article at a heat treatment temperature from about 625° C. to about 650° C. for a heat treatment time from about 30 minutes to about 90 minutes.

While some embodiments of the glasses described herein require a heat treatment to impart color to the glass, it is noted that other embodiments of glasses described herein do not require a heat treatment to impart color to the glass. For example, some glasses containing transition metal oxides and/or rare earth oxides may not require a heat treatment to impart color to the glass. As such, it should be understood that the heat treatment is optional.

Following heat treatment (if required), the glasses described herein are colored and, as such, are referred to as colored glass articles. In embodiments, the colored glass articles are predominantly glass (i.e., predominantly non-crystalline), but may include particles (such as colorant particles) that have crystalline morphology. As such, the colored glass articles may include at least one crystalline phase. In embodiments, the crystalline phase may be, for example and without limitation, an Au crystalline phase and/or a Ag crystalline phase. However, it should be understood that other crystalline phases are possible and may be present as an alternative to an Au crystalline phase and/or an Ag crystalline phase or instead of an Au crystalline phase and/or an Ag crystalline phase. In embodiments, the crystallinity of the colored glass article is less than or equal to 10 wt. %, less than or equal to 9 wt. %, less than or equal to 8 wt. %, less than or equal to 7 wt. %, less than or equal to 6 wt. %, less than or equal to 5 wt. %, less than or equal to 4 wt. %, less than or equal to 3 wt. %, less than or equal to 2 wt. %, or even less than or equal to 1 wt. % by weight of the glass article.

In embodiments, the colored glass articles may have a transmittance color coordinate in the CIELAB color space of L* greater than or equal to 20 and less than or equal to 96.5. In embodiments, the colored glass articles may have a transmittance color coordinate in the CIELAB color space of absolute value of a* (i.e., |a*|) greater than or equal to 0.3. In embodiments, the colored glass articles may have a transmittance color coordinate in the CIELAB color space of absolute value of b* (i.e., |b*|) greater than or equal to 0.5. In embodiments, the colored glass articles may have a transmittance color coordinate in the CIELAB color space of: L* greater than or equal to 20 and less than or equal to 96.5; absolute value of a* (i.e., |a*|) greater than or equal to 0.3; and absolute value of b* (i.e., |b*|) greater than or equal to 0.5. In these embodiments, L* may be greater than or equal to 25, greater than or equal to 30, greater than or equal to 35, greater than or equal to 40, greater than or equal to 45, greater than or equal to 50, or even greater than or equal to 55. As noted herein, unless otherwise specified, the transmittance color coordinates in the CIELAB color space are specified for article thicknesses of 0.4 to 5 mm (inclusive of endpoints) under F2 illumination and a 10° standard observer angle.

Without wishing to be bound by theory, it is believed that glasses having CIELAB color coordinates within the range of L* greater than or equal to 20 and less than or equal to 96.5 are transparent to wavelengths of visible light (i.e., wavelengths of light from 380 nm to 750 nm, inclusive of endpoints) rather than opaque. However, as the value of L* decreases, the color of the colored glass articles becomes more saturated and the glasses become more opaque (i.e., less transparent). As the value for L* increases, the color of the colored glass articles becomes less saturated and, when the L* value exceeds 96.5, the colored glass article may appear colorless.

In embodiments, the colored glass articles may have a transmittance color coordinate in the CIELAB color space of L* greater than or equal to 55 and less than or equal to 96.5, a* greater than or equal to −5 and less than or equal to 25 (exclusive of a* greater than −0.3 and less than 0.3), and b* greater than or equal to −20 and less than or equal to 5 (exclusive of b* greater than −0.5 and less than 0.5).

In embodiments, the colored glass articles may have a transmittance color coordinate in the CIELAB color space of L* greater than or equal to 55 and less than or equal to 96.5, a* greater than or equal to −10 and less than or equal to 25 (exclusive of a* greater than −0.3 and less than 0.3), and b*greater than or equal to −20 and less than or equal to 5 (exclusive of b* greater than −0.5 and less than 0.5).

In embodiments, the colored glass articles may have a transmittance color coordinate in the CIELAB color space of L* greater than or equal to 55 and less than or equal to 96.5, a* greater than or equal to −18 and less than or equal to 0.3, and b* greater than or equal to 0.5 and less than or equal to 82.

In embodiments, the colored glass articles may have a transmittance color coordinate in the CIELAB color space of L* greater than or equal to 55 and less than or equal to 96.5, a* greater than or equal to −18 and less than or equal to 18 (exclusive of a* greater than −0.3 and less than 0.3), and b* greater than or equal to 0.5 and less than or equal to 82.

In embodiments, the colored glass articles may have a transmittance color coordinate in the CIELAB color space of L* greater than or equal to 55 and less than or equal to 96.5, a* greater than or equal to −20 and less than or equal to 60 (exclusive of a* greater than −0.3 and less than 0.3), and b* greater than or equal to −90 and less than or equal to 85 (exclusive of b* greater than −0.5 and less than 0.5).

In embodiments, the colored glass articles may have a transmittance color coordinate in the CIELAB color space of L* greater than or equal to 55 and less than or equal to 96.5, a* greater than or equal to −35 and less than or equal to −0.3, and b* greater than or equal to 0.5 and less than or equal to 82.

In embodiments, the colored glass articles may have a transmittance color coordinate in the CIELAB color space of L* greater than or equal to 55 and less than or equal to 96.5, a* greater than or equal to −35 and less than or equal to 20 (exclusive of a* greater than −0.3 and less than 0.3), and b* greater than or equal to 0.5 and less than or equal to 75.

In embodiments, the colored glass articles may have a transmittance color coordinate in the CIELAB color space of L* greater than or equal to 55 and less than or equal to 96.5, a* greater than or equal to −15 and less than or equal to 65 (exclusive of a* greater than −0.3 and less than 0.3), and b* greater than or equal to −90 and less than or equal to 80 (exclusive of b* greater than −0.5 and less than 0.5).

In embodiments, the colored glass articles may have a transmittance color coordinate in the CIELAB color space of L* greater than or equal to 55 and less than or equal to 96.5, a* greater than or equal to −35 and less than or equal to 60 (exclusive of a* greater than −0.3 and less than 0.3), and b* greater than or equal to −90 and less than or equal to 80 (exclusive of b* greater than −0.5 and less than 0.5).

In embodiments, the colored glass articles may have a transmittance color coordinate in the CIELAB color space of L* greater than or equal to 55 and less than or equal to 96.5, a* greater than or equal to −35 and less than or equal to 60 (exclusive of a* greater than −0.3 and less than 0.3), and b* greater than or equal to −90 and less than or equal to 80 (exclusive of b* greater than −0.5 and less than 0.5).

In embodiments, the colored glass articles may have a transmitted color coordinate in the CIELAB color space of L* greater than or equal to 55 and less than or equal to 96.5, a* greater than or equal to −11.12 and less than or equal to 60 (exclusive of a* greater than −0.3 and less than 0.3), and b* greater than or equal to −20 and less than or equal to 120 (exclusive of b* greater than −0.5 and less than 0.5).

In embodiments, the transmitted color coordinates of the CIELAB color space may be described in terms of a range of L* values and a region of the a* (horizontal axis or x-axis) and b* (vertical axis or y-axis) color space. The region of the a* vs. b* color space may be defined by the intersection of a plurality of lines defined by a* and b*.

In embodiments, colored glass articles that appear yellow in color may have a transmitted color coordinate in the CIELAB color space of L* greater than or equal to 20 and less than or equal to 90 and a* and b* values within a region of the a* vs. b* color space bound by the intersection of the lines: $b^*=0.2879\cdot a^*+27.818$; $b^*=7.0833\cdot a^*-94.5$; $b^*=0.45\cdot a^*+104.5$; and $b^*=15.3\cdot a^*+253$. This region is graphically depicted in FIG. 20 as the region being bound by lines A, B, C, and D.

In embodiments, colored glass articles that appear orange in color may have a transmitted color coordinate in the CIELAB color space of L* greater than or equal to 20 and less than or equal to 90 and a* and b*values within a region of the a* vs. b* color space bound by the intersection of the lines: $b^*=7.0833 \cdot a^*-94.5$; $b^*=-0.9583 \cdot a^*+146.75$; $b^*=2.6957 \cdot a^*-50.565$; and $b^*=33$. This region is graphically depicted in FIG. 20 as the region being bound by lines B, E, F and G.

In embodiments, colored glass articles that appear red in color may have a transmitted color coordinate in the CIELAB color space of L* greater than or equal to 20 and less than or equal to 90 and a* and b* values within a region of the a* vs. b* color space bound by the intersection of the lines: $b^*=2.6957 \cdot a^*-50.565$; $a^*=54$; $b^*=1.0769 \cdot a^*-17.154$; and $b^*=6.6667 \cdot a^*-173.67$. This region is graphically depicted in FIG. 20 as the region being bound by lines F, H, I and J.

In embodiments, colored glass articles that appear green in color may have a transmitted color coordinate in the CIELAB color space of L* greater than or equal to 4 and less than or equal to 80 and a* and b*values within a region of the a* vs. b* color space bound by the intersection of the lines: $b^*=0.2879 \cdot a^*+27.818$; $a^*=0$; $b^*=-1.375 \cdot a^*+1$; and $b^*=9.333 \cdot a^*+86.667$, exclusive of a* greater than −0.3 and less than 0.3 and exclusive of b* greater than −0.5 and less than 0.5. This region is graphically depicted in FIG. 20 as the region being bound by lines A, K, L, and M.

In embodiments, colored glass articles that appear pink/purple in color may have a transmitted color coordinate in the CIELAB color space of L* greater than or equal to 10 and less than or equal to 80 and a* and b*values within a region of the a* vs. b* color space bound by the intersection of the lines: $b^*=0.0833 \cdot a^*+20.833$; $b^*=2.1182 \cdot a^*-32.073$; $b^*=-0.3$; and $b^*=1.5929 \cdot a^*-0.3$, exclusive of a* greater than −0.3 and less than 0.3 and exclusive of b* greater than −0.5 and less than 0.5. This region is graphically depicted in FIG. 20 as the region being bound by lines N, O, P and Q.

In embodiments, colored glass articles may have a transmittance color coordinate in the CIELAB color space of L* greater than or equal to 55 and less than or equal to 96.5, a* greater than or equal to −15 and less than or equal to −0.3, and b* greater than or equal to −10 and less than or equal to 10 (exclusive of b*greater than −0.5 and less than 0.5).

In embodiments, colored glass articles may have a transmittance color coordinate in the CIELAB color space of L* greater than or equal to 85 and less than or equal to 96.5, a* greater than or equal to −10 and less than −0.3, and b* greater than or equal to −5 and less than or equal to 5 (exclusive of b* greater than −0.5 and less than 0.5).

In embodiments of the colored glass articles described herein in which the colorant package includes Au, the concentrations of $R_2O$ and $Al_2O_3$ may be adjusted such that the difference $R_2O—Al_2O_3$, in combination with Au, produces colored glass articles having the desired color (e.g., pink, purple, red, orange, etc.). In embodiments, the colored glass article may have a transmittance color coordinate in the CIELAB color space of: L* greater than or equal to 55 and less than or equal to 96.5; a* greater than or equal to −15 and less than or equal to 25; and b* greater than or equal to −25 and less than or equal to 25, exclusive of a* greater than −0.3 and less than 0.3 and exclusive of b* greater than −0.5 and less than 0.5.

In embodiments where the colorant package comprises Au, relatively smaller concentrations of $R_2O—Al_2O_3$ (e.g., less than or equal to 1.5 mol %) may result in a blue or purple glass article. Relatively higher concentrations of $R_2O—Al_2O_3$ (e.g., greater than 1.5 mol %) may result in an orange or red glass article.

For example, in embodiments in which the colorant package includes Au, $R_2O—Al_2O_3$ may be greater than or equal to −5 mol % and less than or equal to 1.5 mol % and b* may be greater than or equal to −25 and less than or equal to 10, exclusive of b* greater than −0.5 and less than 0.5. In embodiments, $R_2O—Al_2O_3$ may greater than or equal to −3 mol % and less than or equal to 1.5 mol % and b* may be greater than or equal to −15 and less than or equal to 7, exclusive of b* greater than −0.5 and less than 0.5. In embodiments, $R_2O—Al_2O_3$ may be greater than or equal to −5 mol % and less than or equal to 1.5 mol %, greater than or equal to −3 mol % and less than or equal to 1.5 mol %, greater than or equal to −1 mol % and less than or equal to 1.5 mol %, or even greater than or equal to 0 mol % and less than or equal to 1.5 mol %, or any and all sub-ranges formed from any of these endpoints; and b* may be greater than or equal to −25 and less than or equal to 10 (exclusive of b* greater than −0.5 and less than 0.5), greater than or equal to −25 and less than or equal to 7, greater than or equal to −25 and less than or equal to 5 (exclusive of b* greater than −0.5 and less than 0.5), greater than or equal to −15 and less than or equal to 10 (exclusive of b* greater than −0.5 and less than 0.5), greater than or equal to −15 and less than or equal to 7 (exclusive of b* greater than −0.5 and less than 0.5), greater than or equal to −15 and less than or equal to 5 (exclusive of b* greater than −0.5 and less than 0.5), greater than or equal to −10 and less than or equal to 10 (exclusive of b* greater than −0.5 and less than 0.5), greater than or equal to −10 and less than or equal to 7 (exclusive of b* greater than −0.5 and less than 0.5), or even greater than or equal to −10 and less than or equal to 5 (exclusive of b* greater than −0.5 and less than 0.5), or any and all sub-ranges formed from any of these endpoints.

In embodiments in which the colorant package includes Au, $R_2O—Al_2O_3$ may be greater than 1.5 mol % and less than or equal to 7 mol % and b* may be greater than or equal to 0.5 and less than or equal to 25. In embodiments, $R_2O—Al_2O_3$ may be greater than 1.5 mol % and less than or equal to 5 mol % and b* may be greater than or equal to 0.5 and less than or equal to 15. In embodiments, $R_2O—Al_2O_3$ may be greater than 1.5 mol % and less than or equal to 7 mol %, greater than 1.5 mol % and less than or equal to 5 mol %, or even greater than 1.5 mol % and less than or equal to 3 mol %, or any and all sub-ranges formed from any of these endpoints; and b* may be greater than or equal to 0.5 and less than or equal to 25, greater than or equal to 0.5 and less than or equal to 15, greater than or equal to 0.5 and less than or equal to 10, greater than or equal to 2.5 and less than or equal to 25, greater than or equal to 2.5 and less than or equal to 15, greater than or equal to 2.5 and less than or equal to 10, greater than or equal to 5 and less than or equal to 25, greater than or equal to 5 and less than or equal to 15, or even greater than or equal to 5 and less than or equal to 10, or any and all sub-ranges formed from any of these endpoints.

In embodiments, the colored glass articles including Au as a colorant may have a transmittance color coordinate in the CIELAB color space of L* greater than or equal to 55 and less than or equal to 96.5, a* greater than or equal to −5 and less than or equal to 25 (exclusive of a* greater than −0.3 and less than 0.3), and b* greater than or equal to −20 and less than or equal to 5 (exclusive of b* greater than −0.5 and less than 0.5).

In embodiments, the colored glass articles including Au as a colorant may have a transmittance color coordinate in the CIELAB color space of L* greater than or equal to 55 and less than or equal to 96.5, a* greater than or equal to −10 and less than or equal to 25 (exclusive of a* greater than −0.3 and less than 0.3), and b* greater than or equal to −20 and less than or equal to 5 (exclusive of b*greater than −0.5 and less than 0.5).

In embodiments, the colored glass articles including $Cr_2O_3$ as a colorant may have a transmittance color coordinate in the CIELAB color space of L* greater than or equal to 55 and less than or equal to 96.5, a* greater than or equal to −18 and less than or equal to 0.3, and b* greater than or equal to 0.5 and less than or equal to 82.

In embodiments, the colored glass articles including $Cr_2O_3$ and NiO as a colorant may have a transmittance color coordinate in the CIELAB color space of L* greater than or equal to 55 and less than or equal to 96.5, a* greater than or equal to −18 and less than or equal to 18 (exclusive of a* greater than −0.3 and less than 0.3), and b* greater than or equal to 0.5 and less than or equal to 82.

In embodiments, the colored glass articles including $Cr_2O_3$ and $Co_3O_4$ as a colorant may have a transmittance color coordinate in the CIELAB color space of L* greater than or equal to 55 and less than or equal to 96.5, a* greater than or equal to −20 and less than or equal to 60 (exclusive of a* greater than −0.3 and less than 0.3), and b* greater than or equal to −90 and less than or equal to 85 (exclusive of b* greater than −0.5 and less than 0.5).

In embodiments, the colored glass articles including $Cr_2O_3$ and CuO as a colorant may have a transmittance color coordinate in the CIELAB color space of L* greater than or equal to 55 and less than or equal to 96.5, a* greater than or equal to −35 and less than or equal to −0.3, and b* greater than or equal to 0.5 and less than or equal to 82.

In embodiments, the colored glass articles including $Cr_2O_3$, NiO, and CuO as a colorant may have a transmittance color coordinate in the CIELAB color space of L* greater than or equal to 55 and less than or equal to 96.5, a greater than or equal to −35 and less than or equal to 20 (exclusive of a* greater than −0.3 and less than 0.3), and b* greater than or equal to 0.5 and less than or equal to 75.

In embodiments, the colored glass articles including $Cr_2O_3$, NiO, and $Co_3O_4$ as a colorant may have a transmittance color coordinate in the CIELAB color space of L* greater than or equal to 55 and less than or equal to 96.5, a* greater than or equal to −15 and less than or equal to 65 (exclusive of a* greater than −0.3 and less than 0.3), and b* greater than or equal to −90 and less than or equal to 80 (exclusive of b*greater than −0.5 and less than 0.5).

In embodiments, the colored glass articles including $Cr_2O_3$, CuO, and $Co_3O_4$ as a colorant may have a transmittance color coordinate in the CIELAB color space of L* greater than or equal to 55 and less than or equal to 96.5, a* greater than or equal to −35 and less than or equal to 60 (exclusive of a* greater than −0.3 and less than 0.3), and b* greater than or equal to −90 and less than or equal to 80 (exclusive of b*greater than −0.5 and less than 0.5).

In embodiments, the colored glass articles including $Cr_2O_3$, NiO, CuO, and $Co_3O_4$ as a colorant may have a transmittance color coordinate in the CIELAB color space of L* greater than or equal to 55 and less than or equal to 96.5, a* greater than or equal to −35 and less than or equal to 60 (exclusive of a* greater than −0.3 and less than 0.3), and b* greater than or equal to −90 and less than or equal to 80 (exclusive of b* greater than −0.5 and less than 0.5).

In embodiments, the colored glass articles including Ag as a colorant may have a transmitted color coordinate in the CIELAB color space of L* greater than or equal to 55 and less than or equal to 96.5, a* greater than or equal to −11.12 and less than or equal to 60 (exclusive of a* greater than −0.3 and less than 0.3), and b* greater than or equal to −20 and less than or equal to 120 (exclusive of b* greater than −0.5 and less than 0.5).

In embodiments, the transmitted color coordinates of the CIELAB color space may be described in terms of a range of L* values and a region of the a* (horizontal axis or x-axis) and b* (vertical axis or y-axis) color space. The region of the a* vs. b* color space may be defined by the intersection of a plurality of lines defined by a* and b*.

For example, in embodiments, colored glass articles comprising Ag as a colorant that appear yellow in color may have a transmitted color coordinate in the CIELAB color space of L* greater than or equal to 20 and less than or equal to 90 and a* and b* values within a region of the a* vs. b* color space bound by the intersection of the lines: b*=0.2879·a*+27.818; b*=7.0833·a*−94.5; b*=0.45·a*+104.5; and b*=15.3·a*+253. This region is graphically depicted in FIG. 20 as the region being bound by lines A, B, C, and D.

In embodiments, colored glass articles comprising Ag as a colorant that appear orange in color may have a transmitted color coordinate in the CIELAB color space of L* greater than or equal to 20 and less than or equal to 90 and a* and b* values within a region of the a* vs. b* color space bound by the intersection of the lines: b*=7.0833·a*−94.5; b*=−0.9583·a*+146.75; b*=2.6957·a*−50.565; and b*=33. This region is graphically depicted in FIG. 20 as the region being bound by lines B, E, F and G.

In embodiments, colored glass articles comprising Ag as a colorant that appear red in color may have a transmitted color coordinate in the CIELAB color space of L* greater than or equal to 20 and less than or equal to 90 and a* and b*values within a region of the a* vs. b* color space bound by the intersection of the lines: b*=2.6957·a*−50.565; a*=54; b*=1.0769·a*−17.154; and b*=6.6667·a*−173.67. This region is graphically depicted in FIG. 20 as the region being bound by lines F, H, I and J.

In embodiments, colored glass articles comprising Ag as a colorant that appear green in color may have a transmitted color coordinate in the CIELAB color space of L* greater than or equal to 4 and less than or equal to 80 and a* and b* values within a region of the a* vs. b* color space bound by the intersection of the lines: b*=0.2879·a*+27.818; a*=0; b*=−1.375·a*+1; and b*=9.333·a*+86.667, exclusive of a* greater than −0.3 and less than 0.3 and exclusive of b* greater than −0.5 and less than 0.5. This region is graphically depicted in FIG. 20 as the region being bound by lines A, K, L, and M.

In embodiments, colored glass articles comprising Ag as a colorant that appear pink/purple in color may have a transmitted color coordinate in the CIELAB color space of L* greater than or equal to 10 and less than or equal to 80 and a* and b* values within a region of the a* vs. b* color space bound by the intersection of the lines: b*=0.0833·a*+20.833; b*=2.1182·a*−32.073; b*=−0.3; and b*=1.5929·a*−0.3, exclusive of a* greater than −0.3 and less than 0.3 and exclusive of b*greater than −0.5 and less than 0.5. This region is graphically depicted in FIG. 20 as the region being bound by lines N, O, P and Q.

In embodiments, colored glass articles that include a transition metal oxides and/or rare earth metal oxides as a colorant (such as NiO, CuO, $TiO_2$, $Co_3O_4$, $Cr_2O_3$, and/or $CeO_2$) may have a transmittance color coordinate in the CIELAB color space of L* greater than or equal to 55 and less than or equal to 96.5, a* greater than or equal to −15 and less than or equal to −0.3, and b* greater than or equal to −10 and less than or equal to 10 (exclusive of b* greater than −0.5 and less than 0.5).

In embodiments, colored glass articles that include a transition metal oxides and/or rare earth metal oxides as a colorant (such as NiO, CuO, $TiO_2$, $Co_3O_4$, $Cr_2O_3$, and/or $CeO_2$) may have a transmittance color coordinate in the CIELAB color space of L* greater than or equal to 85 and less than or equal to 96.5, a* greater than or equal to −10 and less than −0.3, and b* greater than or equal to −5 and less than or equal to 5 (exclusive of b* greater than −0.5 and less than 0.5).

In some embodiments, the colored glass articles have an average transmittance of greater than or equal to 10% and less than or equal to 92% of light over the wavelength range from 380 nm to 750 nm. As noted herein, unless otherwise specified, the average transmittance is indicated for article thicknesses of 0.4 to 5 mm, inclusive of endpoints. In embodiments, the colored glass articles have an average transmittance greater than or equal to 15% and less than or equal to 92% over the wavelength range of 380 nm to 750 nm. In embodiments, the colored glass articles have an average transmittance greater than or equal to 20% and less than or equal to 92% for light over the wavelength range of 380 nm to 750 nm. In embodiments, the colored glass articles have an average transmittance greater than or equal to 25% and less than or equal to 92% for light over the wavelength range of 380 nm to 750 nm. In embodiments, the colored glass articles have an average transmittance greater than or equal to 30% and less than or equal to 92% for light over the wavelength range of 380 nm to 750 nm. In embodiments, the colored glass articles have an average transmittance greater than or equal to 19% and less than or equal to 88% over the wavelength range of 380 nm to 750 nm. In embodiments, the colored glass articles have an average transmittance greater than or equal to 15% and less than or equal to 88% over the wavelength range of 380 nm to 750 nm. In embodiments, the colored glass articles have an average transmittance greater than or equal to 20% and less than or equal to 88% for light over the wavelength range of 380 nm to 750 nm. In embodiments, the colored glass articles have an average transmittance greater than or equal to 25% and less than or equal to 88% for light over the wavelength range of 380 nm to 750 nm. In embodiments, the colored glass articles have an average transmittance greater than or equal to 30% and less than or equal to 88% for light over the wavelength range of 380 nm to 750 nm.

In embodiments, the colored glass articles described herein may have a dielectric constant Dk at 10 GHz of less than or equal to 6.4, such as less than or equal to 6.4 and greater than or equal to 5.6. In embodiments, the dielectric constant of the colored glass article may be less than or equal to 6.4 and greater than or equal to 5.7, less than or equal to 6.4 and greater than or equal to 5.8, less than or equal to 6.4 and greater than or equal to 5.9, less than or equal to 6.4 and greater than or equal to 6.0, less than or equal to 6.4 and greater than or equal to 6.2, less than or equal to 6.3 and greater than or equal to 5.6, less than or equal to 6.3 and greater than or equal to 5.7, less than or equal to 6.3 and greater than or equal to 5.8, less than or equal to 6.3 and greater than or equal to 5.9, less than or equal to 6.3 and greater than or equal to 6.0, less than or equal to 6.3 and greater than or equal to 6.2, less than or equal to 6.2 and greater than or equal to 5.7, less than or equal to 6.2 and greater than or equal to 5.8, less than or equal to 6.2 and greater than or equal to 5.9, less than or equal to 6.2 and greater than or equal to 6.0, or even less than or equal to 6.2 and greater than or equal to 6.1. As noted herein, while not wishing to be bound by theory, it is believed that the dielectric constant of the colored glass articles measured at 10 GHz approximates the dielectric constant at each frequency in the range from 10 GHz to 60 GHz. Accordingly, a dielectric constant reported for a colored glass article at a frequency of 10 GHz approximates the dielectric constant of the colored glass article at each frequency over the frequency range of 10 GHz to 60 GHZ, inclusive of endpoints.

The colored glass articles formed from the glass compositions described herein may be any suitable thickness, which may vary depending on the particular application of the colored glass article. In embodiments, the colored glass articles may have a thickness greater than or equal to 200 μm and less than or equal to 6 mm, greater than or equal to 200 μm and less than or equal to 4 mm, greater than or equal to 200 μm and less than or equal to 2 mm, greater than or equal to 200 μm and less than or equal to 1 mm, greater than or equal to 200 μm and less than or equal to 750 μm, greater than or equal to 200 μm and less than or equal to 650 μm, greater than or equal to 200 μm and less than or equal to 600 μm, greater than or equal to 200 μm and less than or equal to 550 μm, greater than or equal to 200 μm and less than or equal to 500 μm, greater than or equal to 250 μm and less than or equal to 6 mm, greater than or equal to 250 μm and less than or equal to 4 mm, greater than or equal to 250 μm and less than or equal to 2 mm, greater than or equal to 250 μm and less than or equal to 1 mm, greater than or equal to 250 μm and less than or equal to 750 μm, greater than or equal to 250 μm and less than or equal to 650 μm, greater than or equal to 250 μm and less than or equal to 600 μm, greater than or equal to 250 μm and less than or equal to 550 μm, greater than or equal to 250 μm and less than or equal to 500 μm, greater than or equal to 300 μm and less than or equal to 6 mm, greater than or equal to 300 μm and less than or equal to 4 mm, greater than or equal to 300 μm and less than or equal to 2 mm, greater than or equal to 300 μm and less than or equal to 1 mm, greater than or equal to 300 μm and less than or equal to 750 μm, greater than or equal to 300 μm and less than or equal to 650 μm, greater than or equal to 300 μm and less than or equal to 600 μm, greater than or equal to 300 μm and less than or equal to 550 μm, greater than or equal to 300 μm and less than or equal to 500 μm, greater than or equal to 350 μm and less than or equal to 6 mm, greater than or equal to 350 μm and less than or equal to 4 mm, greater than or equal to 350 μm and less than or equal to 2 mm, greater than or equal to 350 μm and less than or equal to 1 mm, greater than or equal to 350 μm and less than or equal to 750 μm, greater than or equal to 350 μm and less than or equal to 650 μm, greater than or equal to 350 μm and less than or equal to 600 μm, greater than or equal to 350 μm and less than or equal to 550 μm, greater than or equal to 350 μm and less than or equal to 500 μm, greater than or equal to 400 μm and less than or equal to 6 mm, greater than or equal to 400 μm and less than or equal to 4 mm, greater than or equal to 400 μm and less than or equal to 2 mm, greater than or equal to 400 μm and less than or equal to 1 mm, greater than or equal to 400 μm and less than or equal to 750 μm, greater than or equal to 400 μm and less than or equal to 650 μm, greater than or equal to 400 μm and less than or equal to 600 μm, greater than or equal to 400 μm and less than or equal to 550 μm, greater than or equal to 400 μm and less than or equal to 500 μm, greater than or equal to 450 μm and less than or equal to 6 mm, greater than or equal to 450 μm and less than or equal to 4 mm, greater than or equal to 450 μm and less than or equal to 2 mm, greater than or equal to 450 μm and less than or equal to 1 mm, greater than or equal to 450 μm and less than or equal to 750 μm, greater than or equal to 450 μm and less than or equal to 650 μm, greater than or equal to 450 μm and less than or equal to 600 μm, greater than or equal to 450 μm and less than or equal to 550 μm, greater than or equal to 450 μm and less than or equal to 500 μm, greater than or equal to 500 μm and less than or equal to 6 mm, greater than or equal to 500 μm and less than or equal to 4 mm, greater than or equal to 500 μm and less than or equal to 2 mm, greater than or equal to 500 μm and less than or equal to 1 mm, greater than or equal to 500 μm and less than or equal to 750 μm, greater than or equal to 750 μm and less than or equal to 6 mm, greater than or equal to 750 μm and less than or equal to 4 mm, greater than or equal to 750 μm and less than or equal to 2 mm, greater than or equal to 750 μm and less than or equal to 1 mm, greater than or equal to 1 mm and less than or equal to 6 mm, greater than or equal to 1 mm and less than or equal to 4 mm, greater than or equal to 1 mm and less than or equal to 2 mm, greater than or equal to 2 mm and less than or equal to 6 mm, greater than or equal to 2 mm and less than or equal to 4 mm, or even greater than or equal to 4 mm and less than or equal to 6 mm, or any and all sub-ranges formed from any of these endpoints.

As discussed hereinabove, colored glass articles formed from the glass compositions described herein may have an increased fracture toughness such that the colored glass articles are more resistant to damage. In embodiments, the colored glass article may have a $K_{IC}$ fracture toughness as measured by a CNSB method, prior to ion exchange, greater than or equal to 0.7 MPa·m$^{1/2}$. In embodiments, the colored glass article may have a $K_{IC}$ fracture toughness, prior to ion exchange as measured by a CNSB method greater than or equal to 0.7 MPa·m$^{1/2}$, greater than or equal to 0.8 MPa·m$^{1/2}$, greater than or equal to 0.9 MPa·m$^{1/2}$, or even greater than or equal to 1.0 MPa·m$^{1/2}$.

As discussed hereinabove, colored glass articles formed from the glass compositions described herein may have an increased fracture toughness such that the colored glass articles are more resistant to damage. In embodiments, the colored glass article may have a $K_{IC}$ fracture toughness as measured by a DCB method, prior to ion exchange, greater than or equal to 0.7 MPa·m$^{1/2}$. In embodiments, the colored glass article may have a $K_{IC}$ fracture toughness, prior to ion exchange as measured by a DCB method greater than or equal to 0.7 MPa·m$^{1/2}$, greater than or equal to 0.8 MPa·m$^{1/2}$, greater than or equal to 0.9 MPa·m$^{1/2}$, or even greater than or equal to 1.0 MPa·m$^{1/2}$.

In embodiments, the glass compositions described herein are ion-exchangeable to facilitate strengthening the colored glass articles made from the glass compositions. In typical ion-exchange processes, smaller metal ions in the glass compositions are replaced or "exchanged" with larger metal ions of the same valence within a layer that is close to the outer surface of the colored glass article made from the glass composition. The replacement of smaller ions with larger ions creates a compressive stress within the layer of the colored glass article made from the glass composition. In embodiments, the metal ions are monovalent metal ions (e.g., $Li^+$, $Na^+$, $K^+$, and the like), and ion-exchange is accomplished by immersing the glass article made from the glass composition in a bath comprising at least one molten salt of the larger metal ion that is to replace the smaller metal ion in the colored glass article. Alternatively, other monovalent ions such as $Ag^+$, $Tl^+$, $Cu^+$, and the like may be exchanged for monovalent ions. The ion-exchange process or processes that are used to strengthen the colored glass article made from the glass composition may include contacting the colored glass article with an ion-exchange medium. In embodiments, the ion-exchange medium may be a molten salt bath. For example, the ion-exchange process may include, but is not limited to, immersion in a single bath or multiple baths of like or different compositions with optional washing and/or annealing steps between immersions.

Upon exposure to the colored glass article, the ion-exchange solution (e.g., $KNO_3$ and/or $NaNO_3$ molten salt bath) may, according to embodiments, be at a temperature greater than or equal to 350° C. and less than or equal to 500° C., greater than or equal to 360° C. and less than or equal to 450° C., greater than or equal to 370° C. and less than or equal to 440° C., greater than or equal to 360° C. and less than or equal to 420° C., greater than or equal to 370° C. and less than or equal to 400° C., greater than or equal to 375° C. and less than or equal to 475° C., greater than or equal to 400° C. and less than or equal to 500° C., greater than or equal to 410° C. and less than or equal to 490° C., greater than or equal to 420° C. and less than or equal to 480° C., greater than or equal to 430° C. and less than or equal to 470° C., or even greater than or equal to 440° C. and less than or equal to 460° C., or any and all sub-ranges between the foregoing values. In embodiments, the colored glass article may be exposed to the ion-exchange solution for a duration greater than or equal to 2 hours and less than or equal to 24 hours, greater than or equal to 2 hours and less than or equal to 12 hours, greater than or equal to 2 hours and less than or equal to 6 hours, greater than or equal to 8 hours and less than or equal to 24 hours, greater than or equal to 6 hours and less than or equal to 24 hours, greater than or equal to 6 hours and less than or equal to 12 hours, greater than or equal to 8 hours and less than or equal to 24 hours, or even greater than or equal to 8 hours and less than or equal to 12 hours, or any and all sub-ranges formed from any of these endpoints.

In embodiments, a colored glass article made from a glass composition may be ion-exchanged to achieve a depth of compression of 10 μm or greater, 20 μm or greater, 30 μm or greater, 40 μm or greater, 50 μm or greater, 60 μm or greater, 70 μm or greater, 80 μm or greater, 90 μm or greater, or 100 μm or greater. In embodiments, the colored glass article made from the glass composition may have a thickness "t" and may be ion-exchanged to achieve a depth of compression greater than or equal to 0.15 t, greater than or equal to 0.17 t, or even greater than or equal to 0.2 t. In embodiments, the colored glass article made from the glass composition may have a thickness "t" and may be ion-exchanged to achieve a depth of compression less than or equal to 0.3 t, less than or equal to 0.27 t, or even less than or equal to 0.25 t. In embodiments, the colored glass article made from the glass composition described herein may have a thickness "t" and may be ion-exchanged to achieve a depth of compression greater than or equal to 0.15 t and less than or equal to 0.3 t, greater than or equal to 0.15 t and less than or equal to 0.27 t, greater than or equal to 0.15 t and less than or equal to 0.25 t, greater than or equal to 0.17 t and less than or equal to 0.3 t, greater than or equal to 0.17 t and less than or equal to 0.27 t, greater than or equal to 0.17 t and less than or equal to 0.25 t, greater than or equal to 0.2 t and less than or equal to 0.3 t, greater than or equal to 0.2 t and less than or equal to 0.27 t, or even greater than or equal to 0.2 t and less than or equal to 0.25 t, or any and all sub-ranges formed from any of these endpoints.

The development of this surface compression layer is beneficial for achieving a better crack resistance and higher flexural strength compared to non-ion-exchanged materials. The surface compression layer has a higher concentration of the ions exchanged into the colored glass article in comparison to the concentration of the ions exchanged into the colored glass article for the body (i.e., the area not including the surface compression) of the colored glass article. In embodiments, the colored glass article made from the glass composition may have a surface compressive stress after ion-exchange strengthening greater than or equal to 300 MPa, greater than or equal to 400 MPa, greater than or equal to 500 MPa, or even greater than or equal to 600 MPa. In embodiments, the colored glass article made from the glass composition may have a surface compressive stress after ion-exchange strengthening less than or equal to 1 GPa, less than or equal to 900 MPa, or even less than or equal to 800 MPa. In embodiments, the colored glass article made from the glass composition may have a surface compressive stress after ion-exchange strengthening greater than or equal to 300 MPa and less than or equal to 1 GPa, greater than or equal to 300 MPa and less than or equal to 900 MPa, greater than or equal to 300 MPa and less than or equal to 800 MPa, greater than or equal to 400 MPa and less than or equal to 1 GPa, greater than or equal to 400 MPa and less than or equal to 900 MPa, greater than or equal to 400 MPa and less than or equal to 800 MPa, greater than or equal to 500 MPa and less than or equal to 1 GPa, greater than or equal to 500 MPa and less than or equal to 900 MPa, greater than or equal to 500 MPa and less than or equal to 800 MPa, greater than or equal to 600 MPa and less than or equal to 1 GPa, greater than or equal to 600 MPa and less than or equal to 900 MPa, greater than or equal to 600 MPa and less than or equal to 800 MPa.

In embodiments, the colored glass articles made from the glass composition may have a maximum central tension after ion-exchange strengthening greater than or equal to 40 MPa, greater than or equal to 60 MPa, greater than or equal to 80 MPa, or even greater than or equal to 100 MPa. In embodiments, the colored glass article made from the glass composition may have a maximum central tension after ion-exchange strengthening less than or equal to 250 MPa, less than or equal to 200 MPa, or even less than or equal to 150 MPa. In embodiments, the colored glass article made from the glass composition may have a maximum central tension after ion-exchange strengthening greater than or equal to 40 MPa and less than or equal to 250 MPa, greater than or equal to 40 MPa and less than or equal to 200 MPa, greater than or equal to 40 MPa and less than or equal to 150 MPa, greater than or equal to 60 MPa and less than or equal to 250 MPa, greater than or equal to 60 MPa and less than or equal to 200 MPa, greater than or equal to 60 MPa and less than or equal to 150 MPa, greater than or equal to 80 MPa and less than or equal to 250 MPa, greater than or equal to 80 MPa and less than or equal to 200 MPa, greater than or equal to 80 MPa and less than or equal to 150 MPa, greater than or equal to 100 MPa and less than or equal to 250 MPa, greater than or equal to 100 MPa and less than or equal to 200 MPa, or even greater than or equal to 100 MPa and less than or equal to 150 MPa, or any and all sub-ranges formed from any of these endpoints. As utilized herein, central tension refers to a maximum central tension value unless otherwise indicated.

As described herein, in embodiments, the glass compositions described herein may be formulated to increase the retention of Au, which increases the concentration of Au in the resultant colored glass articles, thereby expanding the color gamut achievable by the colored glass articles. In embodiments, a colored glass article having greater than or equal to 0.01 mol % and less than or equal to 1 mol % Au may have a transmittance color coordinate in the CIELAB color space of L* greater than or equal to 55 and less than or equal to 96.5, a* greater than or equal to −5 and less than or equal to 25, exclusive of a* greater than −0.3 and less than 0.3, and b* greater than or equal to −20 and less than or equal to 5, exclusive of b*greater than −0.5 and less than 0.5. In embodiments, colored glass article having greater than or equal to $1\times10^{-6}$ mol % and less than or equal to 1 mol % Au may have a transmittance color coordinate in the CIELAB color space of L* greater than or equal to 55 and less than or equal to 96.5, a* greater than or equal to −10 and less than or equal to 25 exclusive of a* greater than −0.3 and less than 0.3, and b* greater than or equal to −20 and less than or equal to 5 exclusive of b* greater than −0.5 and less than 0.5.

In embodiments, the glass composition and the resultant colored glass article may comprise greater than or equal to 60 mol % and less than or equal to 70 mol % $SiO_2$; greater than or equal to 11 mol % and less than or equal to 17 mol % $Al_2O_3$; greater than or equal to 2 mol % and less than or equal to 8 mol % $B_2O_3$; greater than or equal to 9 mol % and less than or equal to 14 mol % $Li_2O$; greater than or equal to 2 mol % and less than or equal to 6 mol % $Na_2O$; greater than or equal to 0.1 mol % and less than or equal to 2 mol % MgO; greater than or equal to 0.1 mol % and less than or equal to 2 mol % ZnO; and greater than or equal to $1\times10^{-6}$ mol % and less than or equal to 0.01 mol % Au. In these embodiments, MgO+ZnO is greater than or equal to 0.1 mol % and less than or equal to 4.5 mol %.

In embodiments, the glass composition and the resultant colored glass article may comprise greater than or equal to 60 mol % and less than or equal to 70 mol % $SiO_2$; greater than or equal to 11 mol % and less than or equal to 17 mol % $Al_2O_3$; greater than or equal to 2 mol % and less than or equal to 8 mol % $B_2O_3$; greater than or equal to 9 mol % and less than or equal to 14 mol % $Li_2O$; greater than or equal to 2 mol % and less than or equal to 6 mol % $Na_2O$; greater than or equal to 0.1 mol % and less than or equal to 0.5 mol % $K_2O$; and greater than or equal to $1\times10^{-6}$ mol % and less than or equal to 0.05 mol % Au. In these embodiments, $R_2O—Al_2O_3$ is greater than or equal to 0 mol % and less than or equal to 3 mol %, $R_2O$ being the sum of $Li_2O$, $Na_2O$, and $K_2O$.

In embodiments, the glass composition and the resultant colored glass article may comprise greater than or equal to 40 mol % and less than or equal to 70 mol % $SiO_2$; greater than or equal to 8 mol % and less than or equal to 20 mol % $Al_2O_3$; greater than or equal to 1 mol % and less than or equal to 10 mol % $B_2O_3$; greater than or equal to 1 mol % and less than or equal to 20 mol % $Li_2O$; greater than or equal to 1 mol % and less than or equal to 15 mol % $Na_2O$; greater than or equal to 0 mol % and less than or equal to 8 mol % MgO; greater than or equal to 0 mol % and less than or equal to 5 mol % ZnO; and greater than or equal to 0.0005 mol % and less than or equal to 1 mol % Au, wherein: MgO+ZnO is greater than or equal to 0.1 mol % and less than or equal to 6 mol %.

In embodiments, the glass composition and the resultant colored glass article may comprise greater than or equal to 40 mol % and less than or equal to 70 mol % $SiO_2$; greater than or equal to 8 mol % and less than or equal to 20 mol % $Al_2O_3$; greater than or equal to 1 mol % and less than or equal to 10 mol % $B_2O_3$; greater than or equal to 1 mol % and less than or equal to 20 mol % $Li_2O$; greater than or equal to 1 mol % and less than or equal to 15 mol % $Na_2O$; greater than or equal to 0 mol % and less than or equal to 6 mol % MgO; greater than or equal to 0 mol % and less than or equal to 5 mol % ZnO; and greater than or equal to $1\times10^{-6}$ mol % and less than or equal to 1 mol % Au, wherein: MgO+ZnO is greater than or equal to 0.1 mol % and less than or equal to 6 mol %.

In embodiments, the glass composition and the resultant colored glass article may comprise greater than or equal to 50 mol % and less than or equal to 80 mol % $SiO_2$; greater than or equal to 7 mol % and less than or equal to 25 mol % $Al_2O_3$; greater than or equal to 1 mol % and less than or equal to 15 mol % $B_2O_3$; greater than or equal to 5 mol % and less than or equal to 20 mol % $Li_2O$; greater than or equal to 0.5 mol % and less than or equal to 15 mol % $Na_2O$; greater than 0 mol % and less than or equal to 1 mol % $K_2O$; and greater than or equal to $1\times10^{-6}$ mol % and less than or equal to 1 mol % Au, wherein: $R_2O$—$Al_2O_3$ is greater than or equal to −5 mol % and less than or equal to 7 mol %, $R_2O$ being the sum of $Li_2O$, $Na_2O$, and $K_2O$.

In embodiments, the glass composition and the resultant colored glass article may comprise greater than or equal to 50 mol % and less than or equal to 70 mol % $SiO_2$; greater than or equal to 10 mol % and less than or equal to 17.5 mol % $Al_2O_3$; greater than or equal to 3 mol % and less than or equal to 10 mol % $B_2O_3$; greater than or equal to 8.8 mol % and less than or equal to 14 mol % $Li_2O$; greater than or equal to 1.5 mol % and less than or equal to 8 mol % $Na_2O$; and greater than 0 mol % and less than or equal to 2 mol % $Cr_2O_3$, wherein: $R_2O$+R'O—$Al_2O_3$ is greater than or equal to 0.5 mol % and less than or equal to 6 mol %, wherein $R_2O$ is the sum of $Li_2O$, $Na_2O$, and $K_2O$ and R'O is the sum of MgO, ZnO, and CaO; and $Al_2O_3$+MgO+ZnO is greater than or equal to 12 mol % and less than or equal to 22 mol %.

In embodiments, the glass composition and the resultant colored glass article may comprise greater than or equal to 50 mol. % and less than or equal to 70 mol. % $SiO_2$; greater than or equal to 10 mol. % and less than or equal to 20 mol. % $Al_2O_3$; greater than or equal to 4 mol. % and less than or equal to 10 mol. % $B_2O_3$; greater than or equal to 7 mol. % and less than or equal to 17 mol. % $Li_2O$; greater than or equal to 1 mol. % and less than or equal to 9 mol. % $Na_2O$; greater than or equal to 0.01 mol. % and less than or equal to 1 mol. % $SnO_2$; and greater than or equal to 0.01 mol. % and less than or equal to 5 mol. % Ag, wherein $R_2O$—$Al_2O_3$ is greater than 0.2 mol. % and less than or equal to 5.00 mol. % and $R_2O$ is the sum of $Li_2O$, $Na_2O$, and $K_2O$.

In embodiments, the glass composition and the resultant colored glass article may comprise greater than or equal to 50 mol % and less than or equal to 70 mol % $SiO_2$; greater than or equal to 10 mol % and less than or equal to 20 mol % $Al_2O_3$; greater than or equal to 1 mol % and less than or equal to 10 mol % $B_2O_3$; greater than or equal to 7 mol % and less than or equal to 14 mol % $Li_2O$; greater than or equal to 0.01 mol % and less than or equal to 8 mol % $Na_2O$; greater than or equal to 0.01 mol % and less than or equal to 1 mol % $K_2O$; greater than or equal to 0 mol % and less than or equal to 7 mol % CaO; and greater than or equal to 0 mol % and less than or equal to 8 mol % MgO, wherein $Li_2O$+$K_2O$+$Na_2O$+CaO+MgO+ZnO is less than or equal to 25 mol % and at least one of: CuO+NiO+$Co_3O_4$+$Cr_2O_3$ is greater than or equal to 0.001 mol %, $CeO_2$ is greater than or equal to 0.1 mol %, and $TiO_2$ is greater than or equal to 0.1 mol %.

In embodiments, the glass composition and the resultant colored glass article may comprise greater than or equal to 53 mol % to less than or equal to 66 mol % $SiO_2$; greater than or equal to 9 mol % to less than or equal to 18 mol % $Al_2O_3$; greater than or equal to 0 mol % to less than or equal to 15 mol % $B_2O_3$; greater than or equal to 0 mol % to less than or equal to 3 mol % $P_2O_5$; greater than or equal to 0 mol % to less than or equal to 16 mol % $Li_2O$; greater than or equal to 0 mol % to less than or equal to 15 mol % $Na_2O$; greater than or equal to 0 mol % to less than or equal to 5 mol % $K_2O$; greater than or equal to 0 mol % to less than or equal to 6 mol % MgO; greater than or equal to 0 mol % to less than or equal to 6 mol % CaO; greater than or equal to 0 mol % to less than or equal to 3 mol % ZnO; greater than or equal to 0 mol % to less than or equal to 2 mol % $TiO_2$; greater than 0 mol % to less than or equal to 2 mol % $CeO_2$; greater than or equal to 0 mol % to less than or equal to 1 mol % $Fe_2O_3$; greater than or equal to 0 mol % to less than or equal to 0.5 mol % $SnO_2$; greater than or equal to 0 mol % to less than or equal to 0.05 mol % $SO_3$; greater than or equal to 0 mol % to less than or equal to 1 mol % $WO_3$; greater than or equal to 0 mol % to less than or equal to 1 mol % $Nb_2O_5$; greater than or equal to 0 mol % to less than or equal to 1 mol % $Bi_2O_3$; greater than or equal to 0 mol % to less than or equal to 1 mol % $MoO_3$; and greater than or equal to 0 mol % to less than or equal to 3 mol % $La_2O_3$, wherein: $TiO_2$+$CeO_2$ is greater than or equal to 0.2 mol %; and $Li_2O$+$Na_2O$ is greater than or equal to 8 mol %.

In embodiments, the glass composition and the resultant colored glass article may comprise greater than or equal to 50 mol % and less than or equal to 70 mol % $SiO_2$; greater than or equal to 10 mol % and less than or equal to 20 mol % $Al_2O_3$; greater than or equal to 1 mol % and less than or equal to 10 mol % $B_2O_3$; greater than or equal to 7 mol % and less than or equal to 14 mol % $Li_2O$; greater than 0 mol % and less than or equal to 8 mol % $Na_2O$; greater than or equal to 0 mol % and less than or equal to 1 mol % $K_2O$; greater than or equal to 0 mol % and less than or equal to 7 mol % CaO; greater than or equal to 0 mol % and less than or equal to 8 mol % MgO; and at least one of: greater than 0 mol % to less than or equal to 4 mol % $Er_2O_3$, and greater than 0 mol % to less than or equal to 4 mol % $Nd_2O_3$.

In embodiments, the colored glass articles may have an average CTE of less than about $85\times10^{-7}$ $C^{-1}$, less than about $80\times10^{-7}$ $C^{-1}$, less than about $75\times10^{-7}$ $C^{-1}$, less than about $70\times10^{-7}$ $C^{-1}$, less than about $65\times10^{-7}$ $C^{-1}$, or even less than about $60\times10^{-7}$ $C^{-1}$. These relatively low CTE values improve the survivability of the glass to thermal cycling or thermal stress conditions relative to articles with higher CTEs.

In embodiments, the colored glass articles described herein may generally have a strain point greater than or equal to about 400° C. and less than or equal to about 550° C.

In embodiments, the colored glass articles described herein may generally have an anneal point greater than or equal to about 450° C. and less than or equal to about 650° C.

In embodiments, the colored glass articles described herein may generally have a softening point greater than or equal to about 700° C. and less than or equal to about 900° C.

The colored glass articles described herein may be used for a variety of applications including, for example, for housings for consumer electronic devices; for architectural glass applications; for automotive or vehicular glass applications; or for commercial or household appliance applications. In embodiments, a consumer electronic device (e.g., smartphones, tablet computers, watches, personal computers, ultrabooks, televisions, and cameras), an architectural glass, and/or an automotive glass may comprise a colored glass article as described herein.

Figure 2:
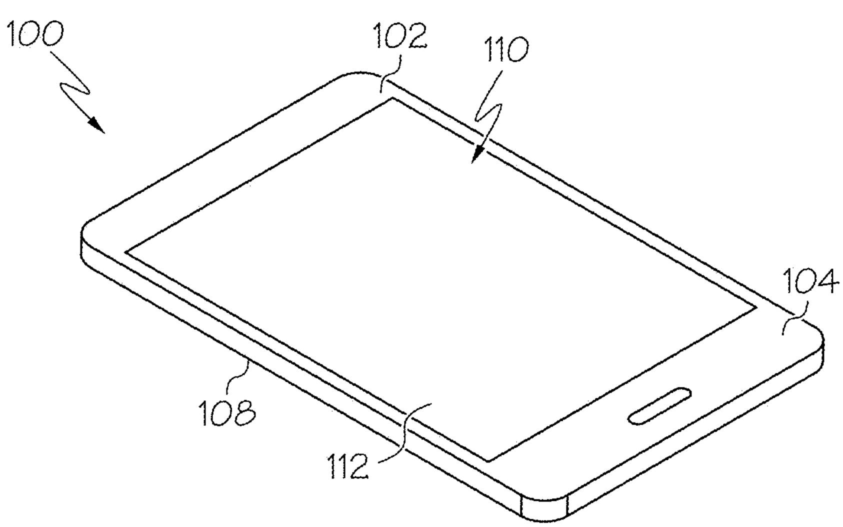
FIG. 2 is a perspective view of the electronic device of FIG. 1.
Figure 3A:
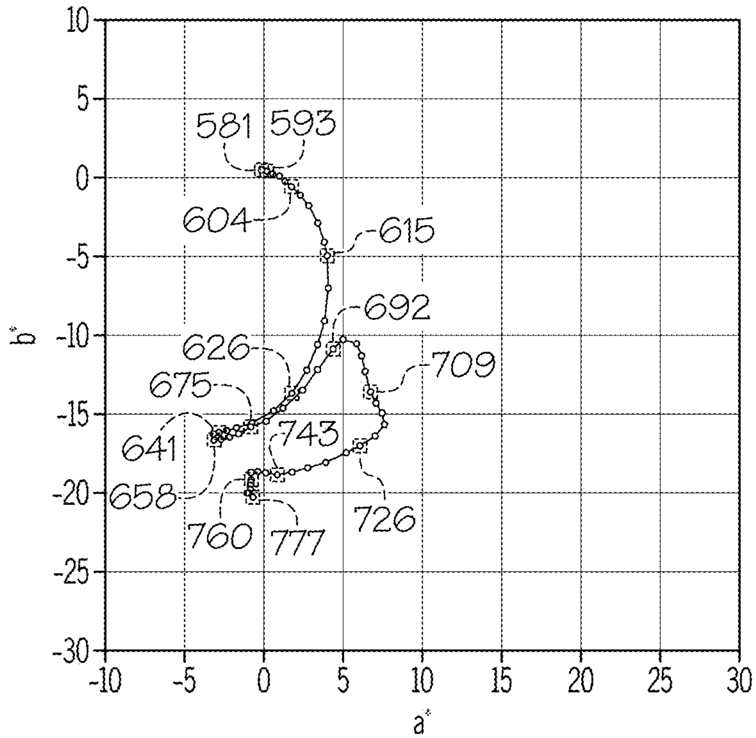
FIG. 3A is a plot of a* vs. b* CIELAB space (x-axis: a*; y-axis: b*) as a function of a heat treatment temperature of a colored glass article made from a glass composition according to one or more embodiments described herein.
Figure 3B:
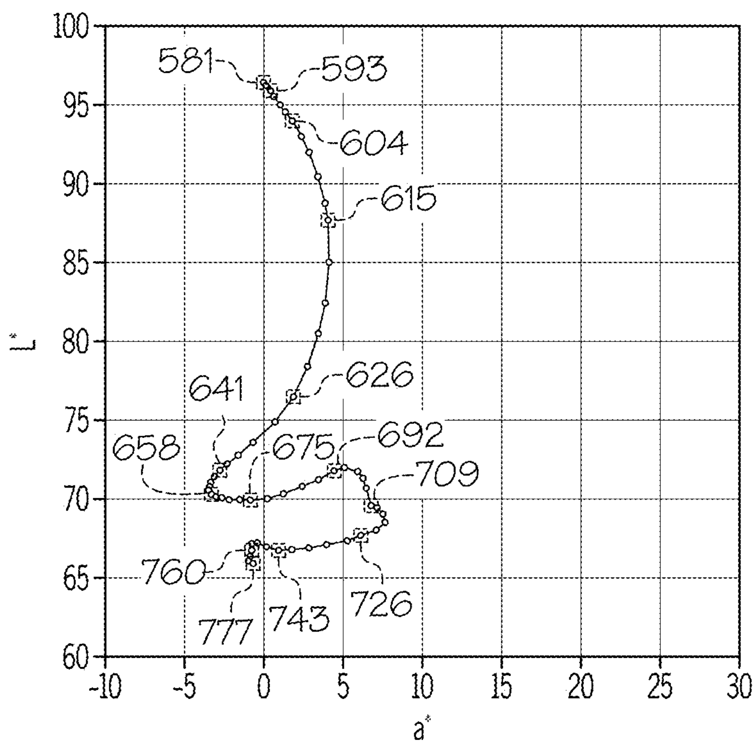
FIG. 3B is a plot of a projected a* vs. L* CIELAB space (x-axis: a*; y-axis: L*) of the colored glass article of FIG. 3A.
Figure 3C:
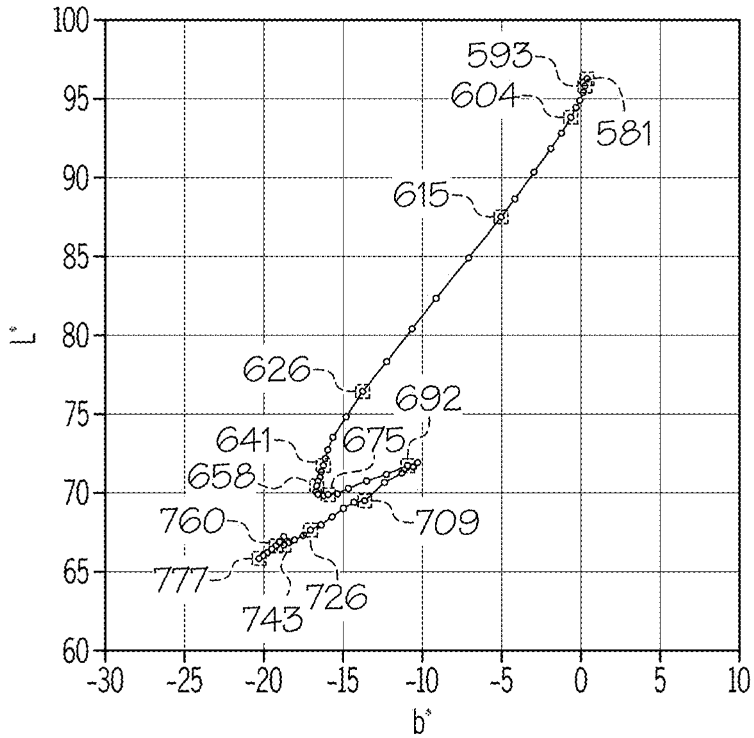
FIG. 3C is a plot of a projected b* vs. L* CIELAB space (x-axis: b*; y-axis: L*) of the colored glass article of FIG. 3A.
Figure 4A:
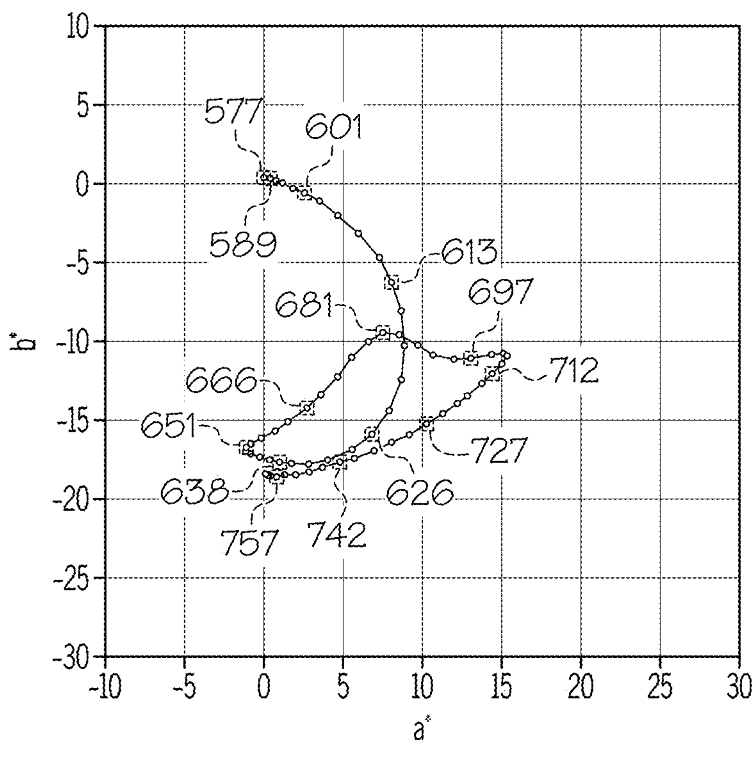
FIG. 4A is a plot of a* vs. b* CIELAB space (x-axis: a*; y-axis: b*) as a function of a heat treatment temperature of a colored glass article made from a glass composition according to one or more embodiments described herein.
Figure 4B:
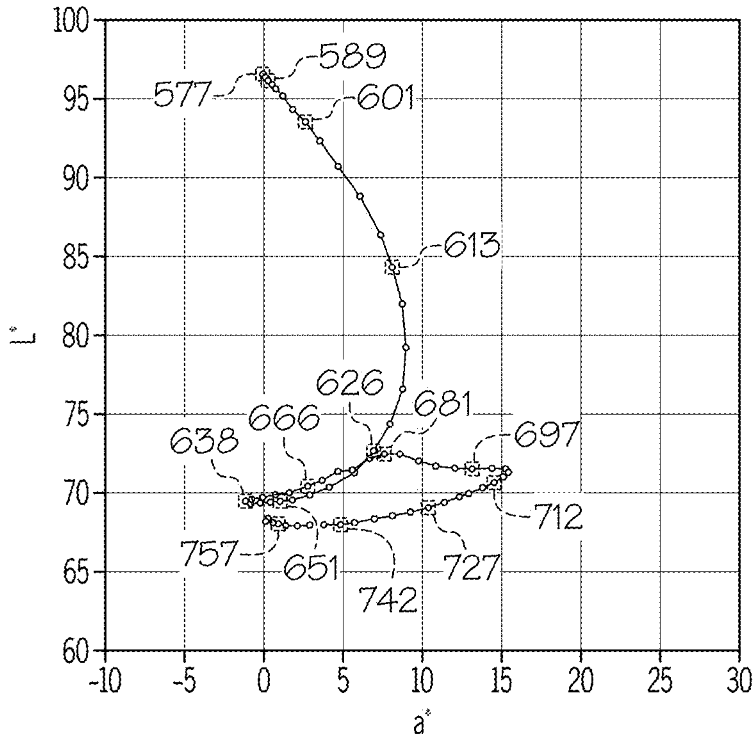
FIG. 4B is a plot of a projected a* vs. L* CIELAB space (x-axis: a*; y-axis: L*) of the colored glass article of FIG. 4A.
Figure 4C:
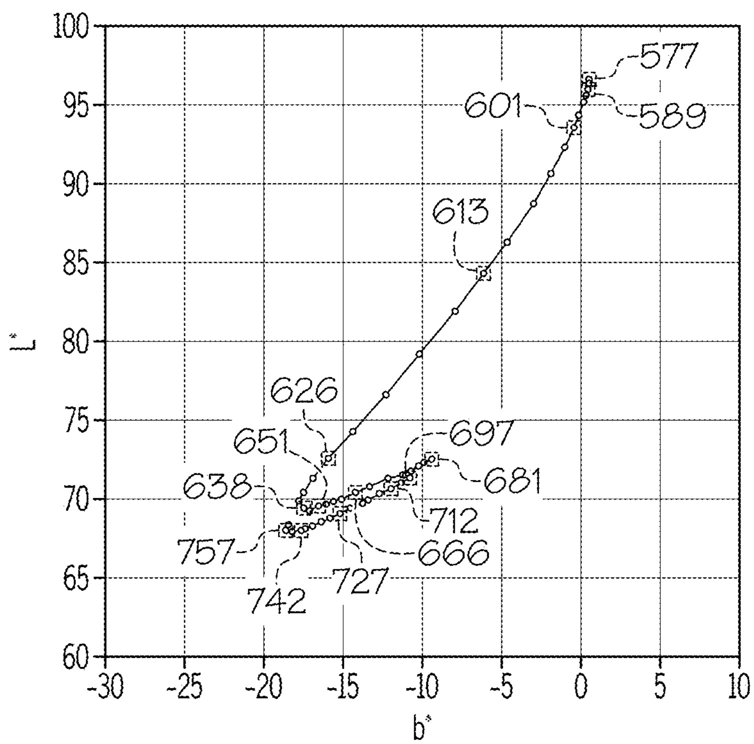
FIG. 4C is a plot of a projected b* vs. L* CIELAB space (x-axis: b*; y-axis: L*) of the colored glass article of FIG. 4A.
Figure 5A:
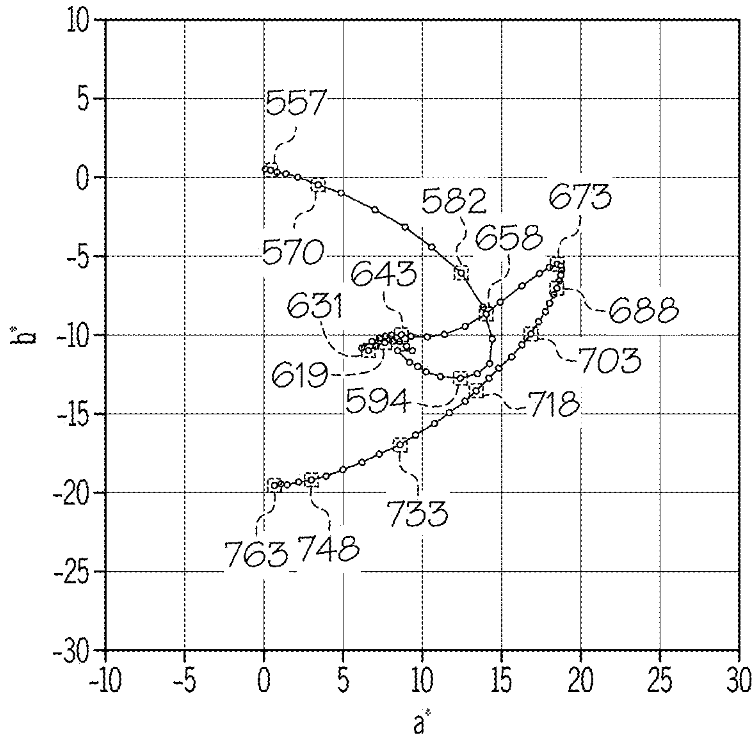
FIG. 5A is a plot of a* vs. b* CIELAB space (x-axis: a*; y-axis: b*) as a function of a heat treatment temperature of a colored glass article made from a glass composition according to one or more embodiments described herein.
Figure 5B:
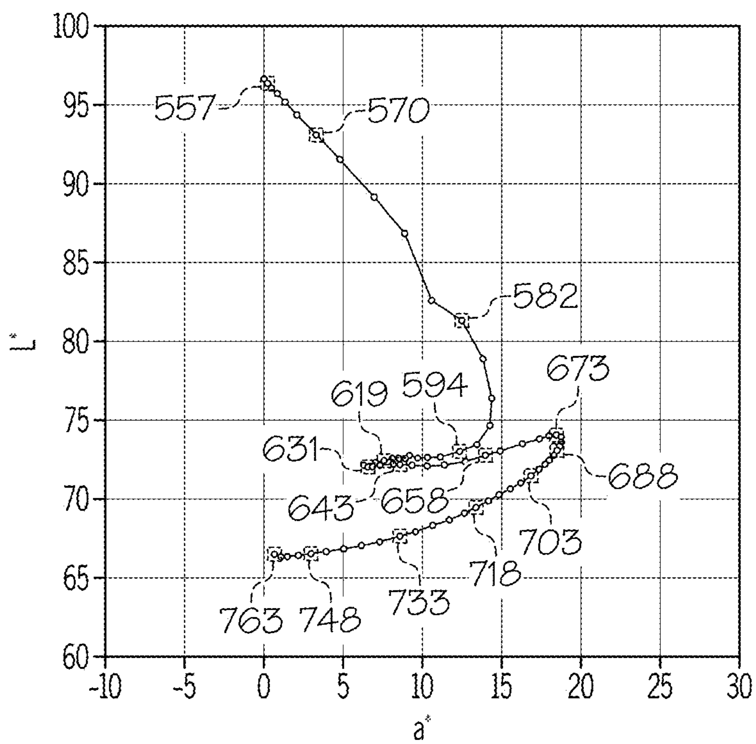
FIG. 5B is a plot of a projected a* vs. L* CIELAB space (x-axis: a*; y-axis: L*) of the colored glass article of FIG. 5A.
Figure 5C:
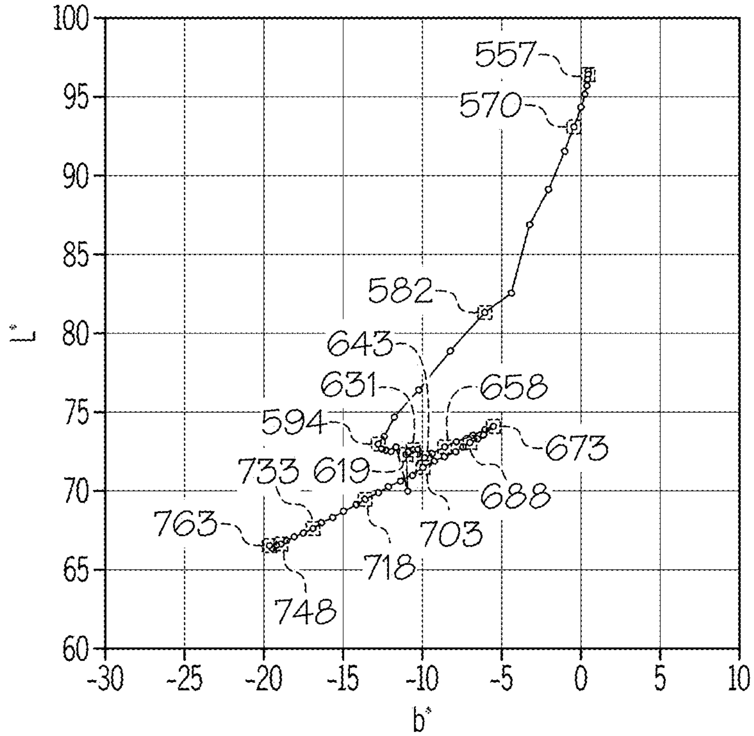
FIG. 5C is a plot of a projected b* vs. L* CIELAB space (x-axis: b*; y-axis: L*) of the colored glass article of FIG. 5A.

An example article incorporating any of the colored glass articles disclosed herein is shown in FIGS. 1 and 2. Specifically, FIGS. 1 and 2 show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In embodiments, at least a portion of housing 102, such as the back 106, may include any of the colored glass articles disclosed herein.

EXAMPLES

In order that various embodiments be more readily understood, reference is made to the following examples, which illustrate various embodiments of the colored glass articles described herein.

Heat Treatment—The heat treatment of the Examples below included placing the glass articles between a SiC setter, placing the glass articles in an oven and heating the oven to the indicated heat treatment temperature at a rate of 4° C./min, and cooling from the heat treatment temperature after the heat treatment time had lapsed at a cooling rate of 3° C./min.

Table 1 shows comparative examples Comp. 1 and Comp. 2 and examples 1-30, with the batch compositions utilized to form each example reported (in terms of mol %). Table 1 also reports the heat treatment used to produce colored glass articles from the batch compositions and the analyzed Au concentration (in terms of mol %) of the resultant colored glass articles.

TABLE 1

| | Example | | | | | |
|---|---|---|---|---|---|---|
| | 1 | 2 | 3 | Comp. 1 | Comp. 2 | 4 |
| $SiO_2$ | 58.8 | 58.8 | 58.8 | 58.5 | 58.5 | 58.5 |
| $Al_2O_3$ | 16.5 | 16.5 | 16.5 | 16.5 | 16.5 | 16.5 |
| $B_2O_3$ | 6.0 | 6.0 | 6.0 | 6.0 | 6.0 | 6.0 |
| $Li_2O$ | 10.0 | 10.0 | 10.0 | 12.0 | 12.0 | 10.0 |
| $Na_2O$ | 4.5 | 4.5 | 4.5 | 6.5 | 6.5 | 4.5 |
| $K_2O$ | 0.2 | 0.2 | 0.2 | 0.5 | 0.5 | 0.5 |
| MgO | 3.0 | 3.0 | 3.0 | — | — | 3.0 |
| ZnO | 1.0 | 1.0 | 1.0 | — | — | 1.0 |
| $ZrO_2$ | — | — | — | — | — | — |
| $P_2O_5$ | — | — | — | — | — | — |
| $SnO_2$ | — | — | — | — | — | — |
| $Fe_2O_3$ | — | — | — | — | — | — |
| Au | 0.005 | 0.005 | 0.005 | 0.010 | 0.020 | 0.010 |
| $R_2O$ | 14.7 | 14.7 | 14.7 | 19.0 | 19.0 | 15.0 |
| MgO + ZnO | 4.0 | 4.0 | 4.0 | 0.0 | 0.0 | 4.0 |
| $R_2O - Al_2O_3$ | −1.8 | −1.8 | −1.8 | 2.5 | 2.5 | −1.5 |
| 5.72*Al2O3 − 21.4*ZnO − 2.5*P2O5 − 35*Li2O − 16.6*B2O3 − 20.5*MgO − 23.3*Na2O − 27.9*SrO − 18.5*K2O − 26.3*CaO | −546.7 | −546.7 | −546.7 | −585.9 | −585.9 | −552.2 |
| HEAT TREATMENT | | | | | | |
| Meltingtemperature (° C.) | 1550 | 1500 | 1450 | 1450 | 1450 | 1450 |
| Meltingtime (hours) | 18 | 18 | 18 | 18 | 18 | 18 |
| Analyzed Au (mol %) | 0.0009 | 0.0017 | 0.0018 | 0.0013 | 0.0023 | 0.0030 |
| % of Au retained | 18.0 | 34.0 | 36.0 | 13.0 | 11.5 | 30.0 |

| Example | 5 | 6 | 7 | 8 | 9 | 10 |
|---|---|---|---|---|---|---|
| $SiO_2$ | 58.5 | 60.7 | 60.7 | 60.7 | 60.7 | 60.7 |
| $Al_2O_3$ | 16.5 | 14.5 | 14.5 | 14.5 | 14.5 | 14.5 |
| $B_2O_3$ | 6.0 | 6.0 | 6.0 | 6.0 | 6.0 | 6.0 |
| $Li_2O$ | 10.0 | 10.0 | 10.0 | 10.0 | 10.0 | 10.0 |
| $Na_2O$ | 4.5 | 4.5 | 4.5 | 4.5 | 4.5 | 4.5 |
| $K_2O$ | 0.5 | 0.5 | 0.5 | 0.5 | 0.5 | 0.2 |
| MgO | 3.0 | 3.0 | 3.0 | 3.0 | 3.0 | 3.0 |
| ZnO | 1.0 | 1.0 | 1.0 | 1.0 | 1.0 | 1.0 |
| $ZrO_2$ | — | — | 0.5 | — | 0.5 | 0.5 |
| $P_2O_5$ | — | — | — | 1.0 | 1.0 | — |
| $SnO_2$ | — | 0.10 | 0.10 | 0.10 | 0.10 | 0.05 |
| $Fe_2O_3$ | — | — | — | — | — | — |
| Au | 0.020 | 0.005 | 0.005 | 0.005 | 0.005 | 0.005 |
| $R_2O$ | 15.0 | 15.0 | 15.0 | 15.0 | 15.0 | 14.7 |
| MgO + ZnO | 4.0 | 4.0 | 4.0 | 4.0 | 4.0 | 4.0 |
| $R_2O - Al_2O_3$ | −1.5 | 0.5 | 0.5 | 0.5 | 0.5 | 0.2 |
| $5.72*Al_2O_3$ − 21.4*ZnO − | −552.2 | −563.7 | −563.7 | −566.2 | −566.2 | −558.1 |

TABLE 1-continued

| | | | | | | |
|---|---|---|---|---|---|---|
| $2.5*P_2O_5$ − $35*Li_2O$ − $16.6*B_2O_3$ − $20.5*MgO$ − $23.3*Na_2O$ − $27.9*SrO$ − $18.5*K_2O$ − $26.3*CaO$ | | | | | | |
| Meltingtemperature (° C.) | 1450 | 1550 | 1550 | 1550 | 1550 | 1550 |
| Meltingtime (hours) | 18 | 18 | 18 | 18 | 18 | 18 |
| Analyzed Au (mol %) | 0.0043 | 0.0013 | 0.0018 | 0.0006 | 0.0007 | 0.0019 |
| % of Au retained | 21.5 | 26.0 | 36.0 | 12.0 | 14.0 | 38.0 |

| | Example | | | | | |
|---|---|---|---|---|---|---|
| | 11 | 12 | 13 | 14 | 15 | 16 |
| $SiO_2$ | 60.7 | 60.7 | 60.7 | 61.8 | 61.8 | 61.8 |
| $Al_2O_3$ | 14.5 | 14.5 | 14.5 | 14.5 | 14.5 | 14.5 |
| $B_2O_3$ | 6.0 | 6.0 | 6.0 | 6.0 | 6.0 | 6.0 |
| $Li_2O$ | 10.0 | 10.0 | 10.0 | 6.5 | 6.5 | 6.5 |
| $Na_2O$ | 4.5 | 4.5 | 4.5 | 8.0 | 8.0 | 8.0 |
| $K_2O$ | 0.2 | 0.2 | 0.2 | 0.2 | 0.2 | 0.2 |
| MgO | 3.0 | 3.0 | 3.0 | 2.0 | 2.0 | 2.0 |
| ZnO | 1.0 | 1.0 | 1.0 | 1.0 | 1.0 | 1.0 |
| $ZrO_2$ | 0.2 | 0.3 | 0.5 | — | — | 0.2 |
| $P_2O_5$ | — | — | — | — | — | — |
| $SnO_2$ | 0.01 | 0.03 | 0.05 | — | 0.05 | 0.05 |
| $Fe_2O_3$ | — | — | — | — | — | — |
| Au | 0.005 | 0.005 | 0.005 | 0.005 | 0.005 | 0.005 |
| $R_2O$ | 14.7 | 14.7 | 14.7 | 14.7 | 14.7 | 14.7 |
| MgO + ZnO | 4.0 | 4.0 | 4.0 | 3.0 | 3.0 | 3.0 |
| $R_2O - Al_2O_3$ | 0.2 | 0.2 | 0.2 | 0.2 | 0.2 | 0.2 |
| $5.72*Al_2O_3$ − $21.4*ZnO$ − $2.5*P_2O_5$ − $35*Li_2O$ − $16.6*B_2O_3$ − $20.5*MgO$ − $23.3*Na_2O$ − $27.9*SrO$ − $18.5*K_2O$ − $26.3*CaO$ | −558.1 | −558.1 | −558.1 | −496.7 | −496.7 | −496.7 |
| HEAT TREATMENT | | | | | | |
| Meltingtemperature (° C.) | 1550 | 1550 | 1550 | 1500 | 1500 | 1500 |
| Meltingtime (hours) | 18 | 18 | 18 | 18 | 18 | 18 |
| Analyzed Au (mol %) | 0.0013 | 0.0016 | 0.0017 | 0.0009 | 0.0010 | 0.0012 |
| % of Au retained | 26.0 | 32.0 | 34.0 | 18.0% | 20.0% | 24.0% |

| | Example | | | | | |
|---|---|---|---|---|---|---|
| | 17 | 18 | 19 | 20 | 21 | 22 |
| $SiO_2$ | 61.8 | 61.8 | 61.8 | 60.8 | 60.8 | 60.8 |
| $Al_2O_3$ | 14.5 | 14.5 | 14.5 | 15.5 | 15.5 | 15.5 |
| $B_2O_3$ | 6.0 | 6.0 | 6.0 | 6.0 | 6.0 | 6.0 |
| $Li_2O$ | 6.5 | 6.5 | 6.5 | 6.5 | 6.5 | 6.5 |
| $Na_2O$ | 8.0 | 8.0 | 8.0 | 8.0 | 8.0 | 8.0 |
| $K_2O$ | 0.2 | 0.2 | 0.2 | 0.2 | 0.2 | 0.2 |
| MgO | 2.0 | 2.0 | 2.0 | 2.0 | 2.0 | 2.0 |
| ZnO | 1.0 | 1.0 | 1.0 | 1.0 | 1.0 | 1.0 |
| $ZrO_2$ | — | — | 0.2 | — | — | 0.2 |
| $P_2O_5$ | — | — | — | — | — | — |
| $SnO_2$ | — | 0.05 | 0.05 | — | 0.05 | 0.05 |
| $Fe_2O_3$ | — | — | — | — | — | — |
| Au | 0.005 | 0.005 | 0.005 | 0.005 | 0.005 | 0.005 |
| $R_2O$ | 14.7 | 14.7 | 14.7 | 14.7 | 14.7 | 14.7 |
| MgO + ZnO | 3.0 | 3.0 | 3.0 | 3.0 | 3.0 | 3.0 |
| $R_2O - Al_2O_3$ | 0.2 | 0.2 | 0.2 | −0.8 | −0.8 | −0.8 |

TABLE 1-continued

| | | | | | | |
|---|---|---|---|---|---|---|
| $5.72*Al_2O_3$ − $21.4*ZnO$ − $2.5*P_2O_5$ − $35*Li_2O$ − $16.6*B_2O_3$ − $20.5*MgO$ − $23.3*Na_2O$ − $27.9*SrO$ − $18.5*K_2O$ − $26.3*CaO$ | −496.7 | −496.7 | −496.7 | −490.9 | −490.9 | −490.9 |
| HEAT TREATMENT | | | | | | |
| Meltingtemperature (° C.) | 1500 | 1500 | 1500 | 1500 | 1500 | 1500 |
| Meltingtime (hours) | 18 | 18 | 18 | 18 | 18 | 18 |
| Analyzed Au (mol %) | 0.0010 | 0.0011 | 0.0014 | 0.0012 | 0.0012 | 0.0012 |
| % of Au retained | 20.0% | 22.0% | 28.0% | 24.0% | 24.0% | 24.0% |

| | Example | | | | | |
|---|---|---|---|---|---|---|
| | 23 | 24 | 25 | 26 | 27 | 28 |
| $SiO_2$ | 61.2 | 61.2 | 60.7 | 60.7 | 60.7 | 60.7 |
| $Al_2O_3$ | 14.5 | 14.5 | 14.5 | 14.5 | 14.5 | 14.5 |
| $B_2O_3$ | 6.0 | 6.0 | 6.0 | 6.0 | 6.0 | 6.0 |
| $Li_2O$ | 6.5 | 6.5 | 8.0 | 9.0 | 9.0 | 9.0 |
| $Na_2O$ | 8.0 | 8.0 | 4.5 | 4.5 | 4.5 | 4.5 |
| $K_2O$ | 0.8 | 0.8 | 0.2 | 0.2 | 0.2 | 0.2 |
| MgO | 2.0 | 2.0 | 4.0 | 4.0 | 3.0 | 4.0 |
| ZnO | 1.0 | 1.0 | 2.0 | 1.0 | 2.0 | 1.0 |
| $ZrO_2$ | — | — | — | — | — | — |
| $P_2O_5$ | — | — | — | — | — | — |
| $SnO_2$ | 0.10 | 0.10 | 0.05 | 0.05 | 0.05 | 0.05 |
| $Fe_2O_3$ | 0.05 | 0.05 | 0.10 | 0.05 | 0.05 | 0.10 |
| Au | 0.005 | 0.005 | 0.005 | 0.005 | 0.005 | 0.005 |
| $R_2O$ | 15.3 | 15.3 | 12.7 | 13.7 | 13.7 | 13.7 |
| MgO + ZnO | 3.0 | 3.0 | 6.0 | 5.0 | 5.0 | 5.0 |
| $R_2O$ − $Al_2O_3$ | 0.8 | 0.8 | −1.8 | −0.8 | −0.8 | −0.8 |
| $5.72*Al_2O_3$ − $21.4*ZnO$ − $2.5*P_2O_5$ − $35*Li_2O$ − $16.6*B_2O_3$ − $20.5*MgO$ − $23.3*Na_2O$ − $27.9*SrO$ − $18.5*K_2O$ − $26.3*CaO$ | −506.8 | −506.8 | −530.0 | −543.6 | −544.5 | −543.6 |
| HEAT TREATMENT | | | | | | |
| Meltingtemperature (° C.) | 1500 | 1500 | 1500 | 1500 | 1500 | 1500 |
| Meltingtime (hours) | 16 | 16 | 18 | 18 | 18 | 18 |
| Analyzed Au (mol %) | 0.0016 | 0.0017 | 0.0005 | 0.0009 | 0.0005 | 0.0006 |
| % of Au retained | 32.0% | 34.0% | 10.0% | 18.0% | 10.0% | 12.0% |

| | Example | |
|---|---|---|
| | 29 | 30 |
| $SiO_2$ | 61.2 | 61.2 |
| $Al_2O_3$ | 14.5 | 14.5 |
| $B_2O_3$ | 6.0 | 6.0 |
| $Li_2O$ | 6.5 | 6.5 |
| $Na_2O$ | 8.0 | 8.0 |
| $K_2O$ | 0.8 | 0.8 |
| MgO | 2.0 | 2.0 |
| ZnO | 1.0 | 1.0 |
| $ZrO_2$ | — | — |
| $P_2O_5$ | — | — |
| $SnO_2$ | 0.10 | 0.10 |
| $Fe_2O_3$ | 0.05 | 0.05 |

TABLE 1-continued

| | | |
|---|---|---|
| Au | 0.005 | 0.005 |
| R20 | 15.3 | 15.3 |
| MgO + ZnO | 3.0 | 3.0 |
| $R_2O - Al_2O_3$ | −0.8 | −0.8 |
| $5.72*Al_2O_3 - 21.4*ZnO - 2.5*P_2O_5 - 35*Li_2O - 16.6*B_2O_3 - 20.5*MgO - 23.3*Na_2O - 27.9*SrO - 18.5*K_2O - 26.3*CaO$ | −544.5 | −544.5 |
| HEAT TREATMENT | | |
| Meltingtemperature (° C.) | 1500 | 1500 |
| Meltingtime (hours) | 18 | 18 |
| Analyzed Au (mol %) | 0.0006 | 0.0013 |
| % of Au retained | 12.0% | 26.0% |

Referring to Table 1, Examples 1-3 were formed from the same glass composition, but melted at different temperatures. Example 1, which was melted at 1550° C., had an Au retention of 18.0%. Examples 2 and 3, which were melted at 1500° C. and 1450° C., respectively, had Au retentions of 34.0% and 36.0%, respectively. As indicated by Examples 1-3, a lower melting temperature favors Au retention. Therefore, it may be desirable to form a glass composition having a lower melting point such that Au retention during processing may be improved.

Comparative Examples Comp. 1 and Comp. 2 had an Au retention of 13.0% and 11.5%, respectively, after being melted at 1450° C. for 18 hours. Examples 4 and 5, which were similar to Comparative Examples Comp. 1 and Comp. 2, respectively, but included MgO and ZnO, had Au retentions of 30.0% and 21.5%, respectively, after being melted at 1450° C. for 18 hours. As indicated by Comparative Examples Comp. 1 and Comp. 2 and Examples 4 and 5, including MgO and ZnO in the glass composition improves Au retention of the resultant colored glass article.

Example 6 had an Au retention of 26.0% after being melted at 1550° C. for 18 hours. Example 7, which was similar to Example 3 but included $ZrO_2$, had an Au retention of 36.0% after being melted at 1550° C. for 18 hours. As indicated by Examples 6 and 7, including $ZrO_2$ in addition to MgO and ZnO in the glass composition improves Au retention of the resultant colored glass article.

Examples 8 and 9, which were similar to Examples 6 and 7, respectively, but included $P_2O_5$, had lower Au retentions of 12.0% and 14.0%, respectively, after being melted at 1550° C. for 18 hours. As indicated by Examples 6-9, including $P_2O_5$ in the glass composition impairs Au retention of the resultant colored glass article.

Examples 10-13, which included $ZrO_2$ and $SnO_2$, had relatively higher Au retentions of 38.0%, 26.0%, 32.0%, and 34%, respectively, after being melted at 1550° C. for 18 hours. As indicated by Examples 10-13, including $SnO_2$ in addition to MgO, ZnO, and $ZrO_2$ in the glass compositions improves Au retention of the resultant colored glass article.

Examples 14 and 17 had an Au retention of 18.0% and 20.0%, respectively, after being melted at 1550° C. for 18 hours. Examples 15 and 18, which were similar to Examples 14 and 17, but included $SnO_2$, had an Au retention of 20.0% and 22%, respectively, after being melted at 1550° C. for 18 hours. As indicated by Examples 15 and 18, including $SnO_2$ in addition to MgO and ZnO in the glass composition improves Au retention of the resultant colored glass article.

Examples 16 and 19, which included $ZrO_2$ and $SnO_2$, had relatively higher Au retentions of 24.0% and 28.0%, respectively, after being melted at 1550° ° C. for 18 hours. As indicated by Examples 16 and 19, including $SnO_2$ in addition to MgO, ZnO, and $ZrO_2$ in the glass compositions improves Au retention of the resultant colored glass article.

Examples 23 and 24, which included $Fe_2O_3$, had relatively higher Au retentions of 32.0% and 34.0%, respectively, after being melted at 1550° C. for 18 hours. As indicated by Examples 23 and 24, including $Fe_2O_3$ in addition to MgO, ZnO, and $ZrO_2$ in the glass compositions improves Au retention of the resultant colored glass article.

Figure 6A:
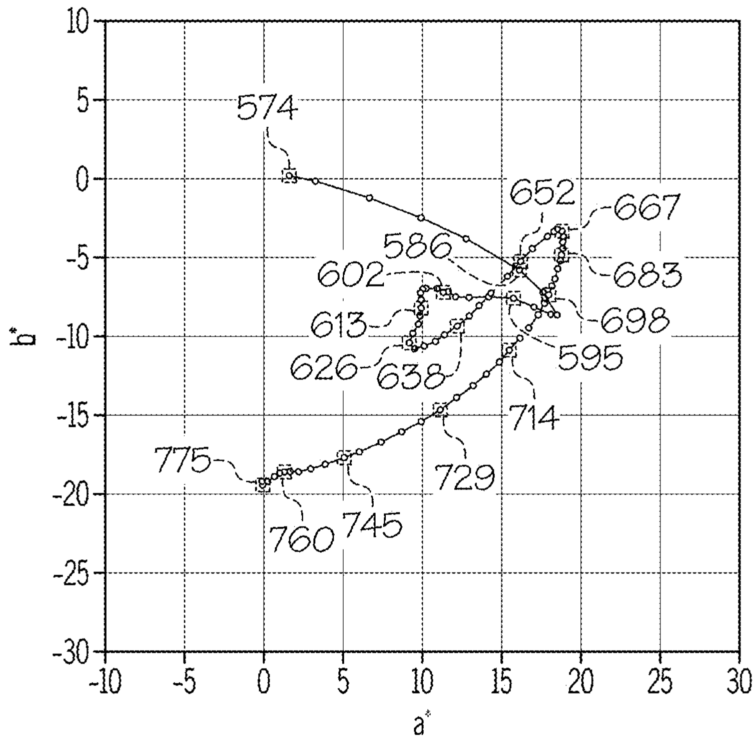
FIG. 6A is a plot of a* vs. b* CIELAB space (x-axis: a*; y-axis: b*) as a function of a heat treatment temperature of a colored glass article made from a glass composition according to one or more embodiments described herein.
Figure 6B:
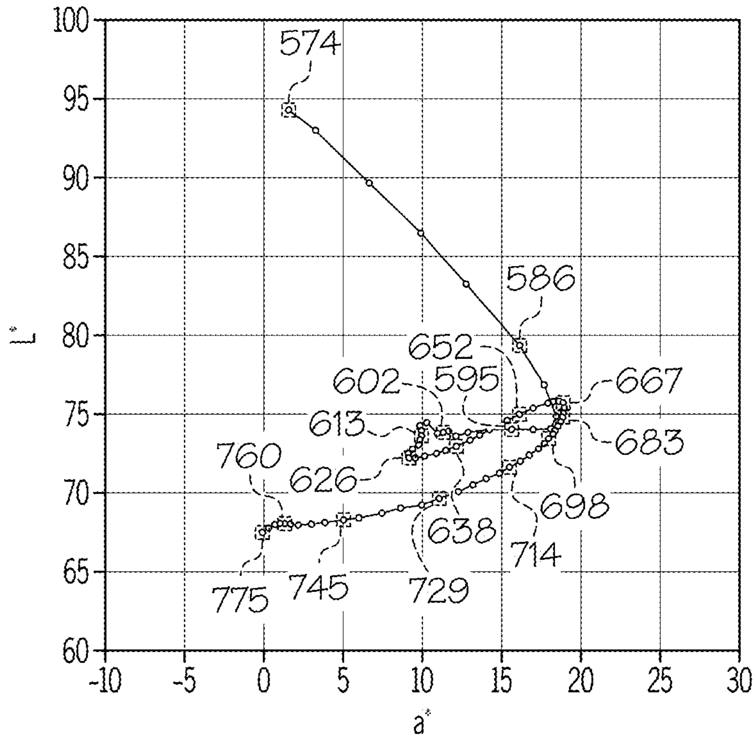
FIG. 6B is a plot of a projected a* vs. L* CIELAB space (x-axis: a*; y-axis: L*) of the colored glass article of FIG. 6A.
Figure 6C:
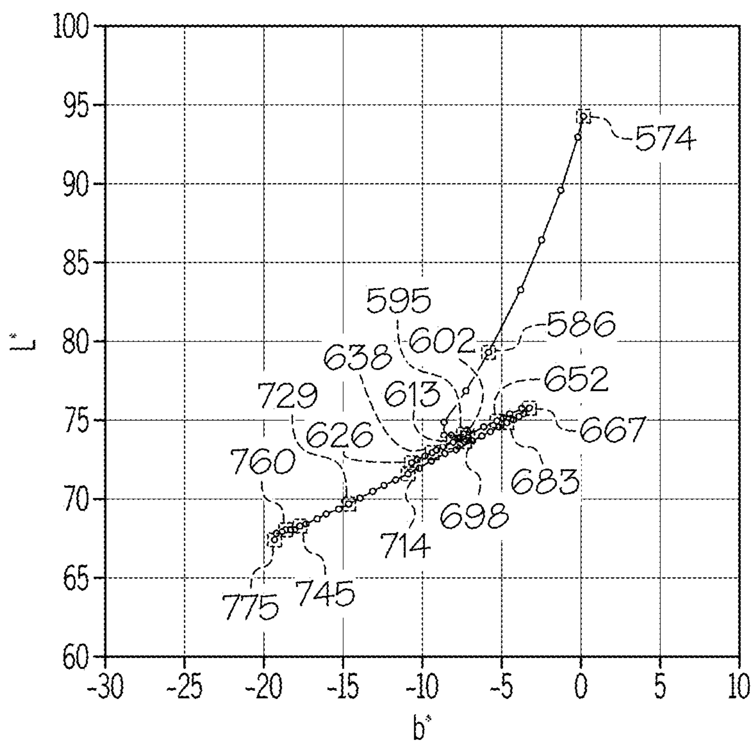
FIG. 6C is a plot of a projected b* vs. L* CIELAB space (x-axis: b*; y-axis: L*) of the colored glass article of FIG. 6A.

Referring now to FIGS. 3A-3C, 4A-4C, 5A-5C, and 6A-6C, a gradient-temperature approach was used to identify the heat treatment cycle parameters (i.e., temperature and duration) to achieve the desired color coordinates. Specifically, a 12 cm long and 1.5 mm thick sample formed from the glass composition of Example 11 was placed in a gradient-temperature oven and held at a heat treatment temperature, which varied along the length of the sample, for the prescribed duration. The sample was then rapidly cooled to quench the sample and the precipitated Au particles therein. Optical transmission spectra were then measured every 2 mm along the direction of the gradient. The coordinates in the CIELAB color space were plotted, as measured under F2 illumination and a 10° standard observer angle, in which the heat treatment temperature moved through the color space with separate plots for the four different heat treatment durations: 0.25 hour (FIGS. 3A-3C), 0.5 hour (FIGS. 4A-4C), 1 hour (FIGS. 5A-5C), and 1.5 hour (FIGS. 6A-6C). As indicated by FIGS. 3A-3C, 4A-4C, 5A-5C, and 6A-6C, different heat treatment temperatures and durations may be used to achieve the desired color.

Note that, as described herein, processing of the glass compositions to produce the resultant colored glass articles may occur in an isothermal oven. However, a gradient-temperature oven was used in these examples to investigate a range of temperatures simultaneously. A gradient-temperature oven produces similar results as an isothermal oven at the desired temperature.

Table 2 shows examples 31-65, with the analyzed concentration (in terms of mol %) of the resultant colored glass articles.

TABLE 2

| Example | 31 | 32 | 33 | 34 | 35 | 36 |
|---|---|---|---|---|---|---|
| $SiO_2$ | 61.09 | 61.03 | 61.08 | 60.99 | 60.87 | 60.73 |
| $Al_2O_3$ | 14.51 | 14.50 | 14.51 | 14.49 | 14.44 | 14.58 |
| $B_2O_3$ | 6.00 | 6.00 | 5.86 | 5.93 | 5.91 | 5.94 |
| $Li_2O$ | 9.94 | 9.94 | 10.07 | 10.10 | 10.01 | 10.10 |
| $Na_2O$ | 4.30 | 4.33 | 4.28 | 4.28 | 4.25 | 4.31 |
| $K_2O$ | 0.19 | 0.19 | 0.19 | 0.19 | 0.45 | 0.19 |
| MgO | 2.89 | 2.90 | 2.89 | 2.89 | 2.89 | 2.93 |
| ZnO | 1.00 | 1.00 | 0.99 | 0.99 | 0.99 | 1.05 |
| $ZrO_2$ | 0.22 | 0.30 | 0.45 | 0.50 | 0.03 | 0.00 |
| $P_2O_5$ | — | — | — | — | — | — |
| $SnO_2$ | 0.02 | 0.03 | 0.05 | 0.07 | 0.11 | 0.11 |
| $Fe_2O_3$ | 0.02 | 0.02 | 0.02 | 0.02 | 0.02 | 0.00 |
| Au | 0.0013 | 0.0015 | 0.0017 | 0.0019 | 0.0013 | 0.0009 |
| $R_2O$ | 14.43 | 14.46 | 14.54 | 14.57 | 14.71 | 14.60 |
| MgO + ZnO | 3.89 | 3.90 | 3.88 | 3.88 | 3.88 | 3.98 |
| $R_2O - Al_2O_3$ | −0.08 | −0.04 | 0.03 | 0.08 | 0.27 | 0.02 |
| $5.72{*}Al_2O_3 - 21.4{*}ZnO - 2.5{*}P_2O_5 - 35{*}Li_2O - 16.6{*}B_2O_3 - 20.5{*}MgO - 23.3{*}Na_2O - 27.9{*}SrO - 18.5{*}K_2O - 26.3{*}CaO$ | −548.9 | −549.8 | −550.4 | −552.7 | −553.6 | −555.2 |

| Example | 37 | 38 | 39 | 40 | 41 | 42 |
|---|---|---|---|---|---|---|
| $SiO_2$ | 61.26 | 60.71 | 59.87 | 60.15 | 59.28 | 61.36 |
| $Al_2O_3$ | 14.38 | 14.65 | 14.86 | 15.43 | 15.07 | 15.72 |
| $B_2O_3$ | 5.89 | 5.95 | 5.95 | 5.88 | 5.70 | 6.00 |
| $Li_2O$ | 10.00 | 10.05 | 10.14 | 10.01 | 9.80 | 10.21 |
| $Na_2O$ | 4.28 | 4.30 | 4.31 | 4.27 | 6.03 | 4.34 |
| $K_2O$ | 0.19 | 0.19 | 0.19 | 0.19 | 0.18 | 0.20 |
| MgO | 2.86 | 2.93 | 3.11 | 2.89 | 2.80 | 0.97 |
| ZnO | 1.01 | 1.06 | 1.09 | 1.02 | 0.99 | 1.05 |
| $ZrO_2$ | 0.00 | 0.00 | 0.32 | 0.00 | 0.00 | 0.00 |
| $P_2O_5$ | — | — | — | — | — | — |
| $SnO_2$ | 0.06 | 0.05 | 0.05 | 0.11 | 0.10 | 0.11 |
| $Fe_2O_3$ | 0.00 | 0.07 | 0.07 | 0.00 | 0.00 | 0.00 |
| Au | 0.0007 | 0.0005 | 0.0007 | 0.0008 | 0.0005 | 0.0010 |
| $R_2O$ | 14.47 | 14.54 | 14.64 | 14.47 | 16.01 | 14.75 |
| MgO + ZnO | 3.87 | 3.99 | 4.20 | 3.91 | 3.79 | 2.02 |
| $R_2O - Al_2O_3$ | 0.09 | −0.11 | −0.22 | −0.96 | 0.94 | −0.97 |
| $5.72{*}Al_2O_3 - 21.4{*}ZnO - 2.5{*}P_2O_5 - 35{*}Li_2O - 16.6{*}B_2O_3 - 20.5{*}MgO - 23.3{*}Na_2O - 27.9{*}SrO - 18.5{*}K_2O - 26.3{*}CaO$ | −549.0 | −553.2 | −559.7 | −543.8 | −573.8 | −514.2 |

| Example | 43 | 44 | 45 | 46 | 47 | 48 |
|---|---|---|---|---|---|---|
| $SiO_2$ | 60.94 | 59.36 | 60.40 | 60.59 | 60.56 | 60.64 |
| $Al_2O_3$ | 16.51 | 16.42 | 15.52 | 15.32 | 15.23 | 15.08 |
| $B_2O_3$ | 5.89 | 5.78 | 6.05 | 6.04 | 6.04 | 6.01 |
| $Li_2O$ | 10.05 | 9.90 | 10.66 | 10.65 | 10.63 | 10.74 |
| $Na_2O$ | 4.27 | 4.22 | 4.77 | 4.79 | 4.89 | 4.90 |
| $K_2O$ | 0.19 | 0.19 | 0.19 | 0.19 | 0.20 | 0.20 |
| MgO | 0.97 | 2.94 | 0.97 | 0.97 | 0.98 | 0.97 |
| ZnO | 1.03 | 1.03 | 1.02 | 1.02 | 1.05 | 1.05 |
| $ZrO_2$ | 0.00 | 0.00 | 0.31 | 0.32 | 0.31 | 0.32 |
| $P_2O_5$ | — | — | — | — | — | — |
| $SnO_2$ | 0.10 | 0.11 | 0.05 | 0.06 | 0.06 | 0.05 |
| $Fe_2O_3$ | — | — | — | — | — | — |
| Au | 0.0010 | 0.0006 | 0.0008 | 0.0008 | 0.0008 | 0.0007 |
| $R_2O$ | 14.51 | 14.31 | 15.62 | 15.63 | 15.72 | 15.84 |
| MgO + ZnO | 2.00 | 3.97 | 1.99 | 1.99 | 2.03 | 2.02 |

TABLE 2-continued

| | | | | | | |
|---|---|---|---|---|---|---|
| $R_2O - Al_2O_3$ | −2.00 | −2.11 | 0.10 | 0.31 | 0.49 | 0.76 |
| $5.72{*}Al_2O_3 - 21.4{*}ZnO - 2.5{*}P_2O_5 - 35{*}Li_2O - 16.6{*}B_2O_3 - 20.5{*}MgO - 23.3{*}Na_2O - 27.9{*}SrO - 18.5{*}K_2O - 26.3{*}CaO$ | −500.0 | −532.7 | −541.1 | −542.2 | −545.4 | −549.6 |

| Example | 49 | 50 | 51 | 52 | 53 | 54 |
|---|---|---|---|---|---|---|
| $SiO_2$ | 60.94 | 59.36 | 60.40 | 60.59 | 62.14 | 62.08 |
| $Al_2O_3$ | 16.51 | 16.42 | 15.52 | 15.32 | 14.95 | 14.98 |
| $B_2O_3$ | 5.89 | 5.78 | 6.05 | 6.04 | 6.06 | 5.93 |
| $Li_2O$ | 10.05 | 9.90 | 10.66 | 10.65 | 10.51 | 10.69 |
| $Na_2O$ | 4.27 | 4.22 | 4.77 | 4.79 | 4.29 | 4.31 |
| $K_2O$ | 0.19 | 0.19 | 0.19 | 0.19 | 0.14 | 0.14 |
| MgO | 0.97 | 2.94 | 0.97 | 0.97 | 0.50 | 0.50 |
| ZnO | 1.03 | 1.03 | 1.02 | 1.02 | 1.03 | 1.00 |
| $ZrO_2$ | 0.00 | 0.00 | 0.31 | 0.32 | 0.29 | 0.29 |
| $P_2O_5$ | — | — | — | — | — | — |
| $SnO_2$ | 0.10 | 0.11 | 0.05 | 0.06 | 0.04 | 0.04 |
| $Fe_2O_3$ | — | — | — | — | 0.04 | 0.04 |
| Au | 0.0008 | 0.0010 | 0.0012 | 0.0015 | 0.0014 | 0.0011 |
| $R_2O$ | 14.51 | 14.31 | 15.62 | 15.63 | 14.94 | 15.14 |
| MgO + ZnO | 2.00 | 3.97 | 1.99 | 1.99 | 1.54 | 1.51 |
| $R_2O - Al_2O_3$ | −2.00 | −2.11 | 0.10 | 0.31 | −0.01 | 0.16 |
| $5.72{*}Al_2O_3 - 21.4{*}ZnO - 2.5{*}P_2O_5 - 35{*}Li_2O - 16.6{*}B_2O_3 - 20.5{*}MgO - 23.3{*}Na_2O - 27.9{*}SrO - 18.5{*}K_2O - 26.3{*}CaO$ | −556.1 | −558.4 | −557.7 | −558.9 | −517.8 | −521.6 |

| Example | 55 | 56 | 57 | 58 | 59 | 60 |
|---|---|---|---|---|---|---|
| $SiO_2$ | 62.06 | 61.95 | 61.95 | 61.67 | 61.01 | 60.66 |
| $Al_2O_3$ | 14.92 | 14.87 | 14.88 | 14.88 | 14.96 | 15.03 |
| $B_2O_3$ | 5.92 | 5.91 | 5.92 | 5.93 | 6.04 | 6.06 |
| $Li_2O$ | 10.86 | 11.03 | 11.04 | 11.06 | 11.18 | 11.21 |
| $Na_2O$ | 4.25 | 4.24 | 4.24 | 4.25 | 4.26 | 4.28 |
| $K_2O$ | 0.14 | 0.14 | 0.14 | 0.14 | 0.14 | 0.14 |
| MgO | 0.50 | 0.50 | 0.49 | 0.50 | 0.50 | 0.50 |
| ZnO | 1.01 | 1.02 | 1.01 | 1.02 | 1.03 | 1.03 |
| $ZrO_2$ | 0.28 | 0.28 | 0.28 | 0.28 | 0.28 | 0.28 |
| $P_2O_5$ | — | — | — | 0.21 | 0.56 | 0.76 |
| $SnO_2$ | 0.04 | 0.04 | 0.04 | 0.04 | 0.04 | 0.04 |
| $Fe_2O_3$ | 0.02 | 0.01 | — | — | — | — |
| Au | 0.0010 | 0.0010 | 0.0011 | 0.0010 | 0.0010 | 0.0010 |
| $R_2O$ | 15.25 | 15.41 | 15.42 | 15.46 | 15.58 | 15.63 |
| MgO + ZnO | 1.51 | 1.52 | 1.50 | 1.52 | 1.53 | 1.54 |
| $R_2O - Al_2O_3$ | 0.33 | 0.54 | 0.55 | 0.58 | 0.62 | 0.60 |
| $5.72{*}Al_2O_3 - 21.4{*}ZnO - 2.5{*}P_2O_5 - 35{*}Li_2O - 16.6{*}B_2O_3 - 20.5{*}MgO - 23.3{*}Na_2O - 27.9{*}SrO - 18.5{*}K_2O - 26.3{*}CaO$ | −526.5 | −532.6 | −532.8 | −534.9 | −541.5 | −543.7 |

| | Example | | | | |
|---|---|---|---|---|---|
| | 61 | 62 | 63 | 64 | 65 |
| $SiO_2$ | 60.51 | 60.49 | 60.80 | 60.94 | 61.47 |
| $Al_2O_3$ | 15.06 | 15.02 | 14.76 | 14.61 | 14.60 |
| $B_2O_3$ | 6.06 | 6.07 | 6.05 | 5.97 | 5.91 |
| $Li_2O$ | 11.21 | 11.22 | 11.20 | 11.17 | 11.12 |
| $Na_2O$ | 4.30 | 4.30 | 4.29 | 4.29 | 4.27 |
| $K_2O$ | 0.14 | 0.14 | 0.14 | 0.15 | 0.15 |

TABLE 2-continued

| | | | | | |
|---|---|---|---|---|---|
| MgO | 0.51 | 0.51 | 0.51 | 0.51 | 0.50 |
| ZnO | 1.03 | 1.04 | 1.03 | 1.03 | 1.04 |
| $ZrO_2$ | 0.28 | 0.28 | 0.28 | 0.48 | 0.50 |
| $P_2O_5$ | 0.86 | 0.89 | 0.90 | 0.81 | 0.40 |
| $SnO_2$ | 0.04 | 0.04 | 0.04 | 0.04 | 0.04 |
| $Fe_2O_3$ | — | — | — | — | — |
| Au | 0.0009 | 0.0010 | 0.0009 | 0.0011 | 0.0010 |
| $R_2O$ | 15.65 | 15.67 | 15.63 | 15.61 | 15.53 |
| MgO + ZnO | 1.54 | 1.54 | 1.53 | 1.54 | 1.54 |
| $R_2O - Al_2O_3$ | 0.59 | 0.65 | 0.87 | 1.00 | 0.93 |
| $5.72*Al_2O_3 - 21.4*ZnO - 2.5*P_2O_5 - 35*Li_2O - 16.6*B_2O_3 - 20.5*MgO - 23.3*Na_2O - 27.9*SrO - 18.5*K_2O - 26.3*CaO$ | −544.2 | −545.2 | −545.1 | −543.6 | −539.3 |

Referring now to Table 3, example glass articles 31-35 having the concentrations shown in Table 2 were subjected to isothermal heat treatment between 600° C. and 660° C. The observable colors of the resultant colored glass articles are shown in Table 3. Heat treating example glass articles 31, 32, and 33 having an analyzed $R_2O—Al_2O_3$ of −0.08 mol %, −0.04 mol %, and 0.03 mol %, respectively, resulted in observably pink, purple, and red colored glass articles. Heat treating example glass articles 34 and 35, having an analyzed $R_2O—Al_2O_3$ of 0.08 mol % and 0.27 mol %, respectively, resulted in observably red and orange colored glass articles. As indicated by Tables 2 and 3, the analyzed $R_2O—Al_2O_3$ of a glass article may be adjusted and the glass article may be subjected to a certain heat treatment to provide a desired colored glass article.

TABLE 3

| | Example | | | | |
|---|---|---|---|---|---|
| | 31 | 32 | 33 | 34 | 35 |
| Observable colors | pink, purple | pink, purple | pink, purple | pink, red, purple | orange, red |

Referring now to Table 4, example glass articles 36-48 having the analyzed concentrations shown in Table 2 were subjected to heat treatment at the temperature and for the period of time shown in Table 4. The observable colors of the resultant colored glass articles are shown in Table 4.

TABLE 4

| Heat treatment | 550° C. for 2 hrs. | 575° C. for 2 hrs. | 600° C. for 2 hrs. | 625° C. for 2 hrs. | 650° C. for 2 hrs. |
|---|---|---|---|---|---|
| 36 | purple | purple | purple | purple | — |
| 37 | clear, purple | purple | purple | red | — |

TABLE 4-continued

| Heat treatment | 550° C. for 2 hrs. | 575° C. for 2 hrs. | 600° C. for 2 hrs. | 625° C. for 2 hrs. | 650° C. for 2 hrs. |
|---|---|---|---|---|---|
| 38 | pink | pink | pink | pink | — |
| 39 | red | red | red | red | — |
| 40 | clear, purple | purple | purple | purple | — |
| 41 | orange | orange | orange | orange | — |
| 42 | clear, purple | purple | purple | purple | — |
| 43 | clear | clear | purple | purple | — |
| 44 | clear | clear | purple | purple | — |
| 45 | purple | purple | purple | red | red |
| 46 | clear, purple | purple | purple | red | red |
| 47 | purple | purple | red | red | red |
| 48 | purple | purple | red | red | red |

Example glass article 41, having an analyzed $R_2O—Al_2O_3$ of 0.94 mol %, was the only glass article to result in an observably orange colored glass article after heat treatment. Example glass articles 36-40 and 42-48 had an $R_2O—Al_2O_3$ of 0.76 mol % or less. Heat treating glass article 38, including $Fe_2O_3$, resulted in an observably pink colored glass article. Heat treating glass articles 39 and 45-48, including $ZrO_2$, resulted in red colored glass articles. As indicated by Tables 2 and 4, the analyzed $R_2O—Al_2O_3$ may be adjusted, additional components may be added to the glass composition, and the glass article may be subjected to a certain heat treatment to provide a desired colored glass article.

Table 5 shows examples 66-75, with the analyzed concentration (in terms of mol %) of the resultant colored glass articles.

TABLE 5

| Example | 66 | 67 | 68 | 69 | 70 | 71 |
|---|---|---|---|---|---|---|
| $SiO_2$ | 62.15 | 62.27 | 62.22 | 62.19 | 62.08 | 61.95 |
| $Al_2O_3$ | 14.93 | 14.97 | 14.90 | 14.95 | 14.98 | 14.87 |
| $B_2O_3$ | 6.09 | 5.98 | 6.03 | 6.03 | 5.93 | 5.91 |
| $Li_2O$ | 10.50 | 10.45 | 10.53 | 10.50 | 10.69 | 11.03 |
| $Na_2O$ | 4.30 | 4.30 | 4.28 | 4.27 | 4.31 | 4.24 |
| $K_2O$ | 0.14 | 0.14 | 0.14 | 0.14 | 0.14 | 0.14 |
| MgO | 0.50 | 0.50 | 0.50 | 0.50 | 0.50 | 0.50 |
| ZnO | 1.03 | 1.00 | 1.03 | 1.04 | 1.00 | 1.02 |

TABLE 5-continued

| | | | | | | |
|---|---|---|---|---|---|---|
| $ZrO_2$ | 0.28 | 0.29 | 0.28 | 0.29 | 0.29 | 0.28 |
| $P_2O_5$ | 0.00 | 0.00 | 0.00 | 0.00 | 0.00 | 0.00 |
| $SnO_2$ | 0.04 | 0.04 | 0.04 | 0.04 | 0.04 | 0.04 |
| $Fe_2O_3$ | 0.04 | 0.04 | 0.04 | 0.04 | 0.04 | 0.01 |
| Au | $6.0 \times 10^{-6}$ | $9.0 \times 10^{-6}$ | $1.2 \times 10^{-5}$ | $1.1 \times 10^{-5}$ | $8.0 \times 10^{-6}$ | $1.0 \times 10^{-5}$ |
| $R_2O$ | 14.94 | 14.89 | 14.95 | 14.91 | 15.14 | 15.41 |
| MgO + ZnO | 1.53 | 1.50 | 1.53 | 1.54 | 1.50 | 1.52 |
| $R_2O - Al_2O_3$ | 0.01 | −0.08 | 0.05 | −0.04 | 0.16 | 0.54 |
| $5.72{*}Al_2O_3 - 21.4{*}ZnO - 2.5{*}P_2O_5 - 35{*}Li_2O - 16.6{*}B_2O_3 - 20.5{*}MgO - 23.3{*}Na_2O - 27.9{*}SrO - 18.5{*}K_2O - 26.3{*}CaO$ | −518.27 | −513.82 | −518.03 | −516.67 | −521.57 | −532.56 |

| Example | 72 | 73 | 74 | 75 |
|---|---|---|---|---|
| $SiO_2$ | 61.67 | 61.47 | 62.75 | 61.67 |
| $Al_2O_3$ | 14.88 | 14.60 | 14.47 | 14.88 |
| $B_2O_3$ | 5.93 | 5.91 | 5.88 | 5.93 |
| $Li_2O$ | 11.06 | 11.12 | 11.07 | 11.06 |
| $Na_2O$ | 4.25 | 4.27 | 4.27 | 4.25 |
| $K_2O$ | 0.14 | 0.15 | 0.15 | 0.14 |
| MgO | 0.50 | 0.50 | 0.29 | 0.50 |
| ZnO | 1.02 | 1.04 | 0.47 | 1.02 |
| $ZrO_2$ | 0.28 | 0.50 | 0.52 | 0.28 |
| $P_2O_5$ | 0.21 | 0.40 | 0.08 | 0.21 |
| $SnO_2$ | 0.04 | 0.04 | 0.04 | 0.04 |
| $Fe_2O_3$ | 0.00 | 0.00 | 0.00 | 0.00 |
| Au | $8.3 \times 10^{-6}$ | $8.3 \times 10^{-6}$ | $8.3 \times 10^{-6}$ | $8.3 \times 10^{-6}$ |
| $R_2O$ | 15.45 | 15.54 | 15.49 | 15.45 |
| MgO + ZnO | 1.52 | 1.54 | 0.76 | 1.52 |
| $R_2O - Al_2O_3$ | 0.57 | 0.94 | 1.02 | 0.57 |
| $5.72{*}Al_2O_3 - 21.4{*}ZnO - 2.5{*}P_2O_5 - 35{*}Li_2O - 16.6{*}B_2O_3 - 20.5{*}MgO - 23.3{*}Na_2O - 27.9{*}SrO - 18.5{*}K_2O - 26.3{*}CaO$ | −534.64 | −539.57 | −520.76 | −534.64 |

Referring now to Table 6, example glass articles 66 and 68-75 having the analyzed concentrations shown in Table 5 were subjected to heat treatment at the temperature and for the period of time shown in Table 6. The observable colors of the resultant colored glass articles are shown in Table 6.

Example glass articles 71-75, having an analyzed $R_2O$—$Al_2O_3$ of greater than or equal to 0.54 mol %, had a relatively limited achievable color gamut after being subjected to different heat treatments. As indicated by Table 6,

TABLE 6

| Heat treatment | 550 ° C. for 2 hrs. | 575 ° C. for 2 hrs. | 600 ° C. for 2 hrs. | 625 ° C. for 2 hrs. | 650 ° C. for 2 hrs. | 550 ° C. for 8 hrs. | 575 ° C. for 8 hrs. |
|---|---|---|---|---|---|---|---|
| 66 | — | blue | blue | blue | — | — | — |
| 68 | — | blue | blue | red | — | — | — |
| 69 | — | purple | purple | red | — | — | — |
| 70 | red | purple | blue | blue | — | — | — |
| 71 | clear, purple | blue | blue | purple | — | — | — |
| 72 | clear, purple | purple | purple | purple | — | — | — |
| 73 | clear, purple | purple | purple | purple | — | — | — |
| 74 | clear, purple | purple | purple | red | red | red | red |
| 75 | — | — | purple | red | red | purple | red |

a relatively increased $R_2O—Al_2O_3$ may limit the achievable color gamut of the colored glass article.

Referring now to Table 7, example glass article 66 having the analyzed concentrations shown in Table 5 and the thicknesses shown in Table 7 were subjected to heat treatment at the temperature and for the period of time shown in Table 7. The transmittance color coordinate in the CIELAB color space, as measured at the indicated article thickness under F2 illumination and a 10° standard observer angle, and the observable color of the resultant colored glass articles are shown in Table 7.

TABLE 7

| Thickness | | 525° C. for 6 hrs. | 535° C. for 6 hrs. | 535° C. for 10 hrs. | 545° C. for 10 hrs. | 575° C. for 2 hrs. |
|---|---|---|---|---|---|---|
| | L* | 96.39 | 95.09 | 92.01 | 91.06 | 92.75 |
| | a* | 0.15 | 1.68 | 4.21 | 2.53 | −0.60 |
| | b* | 0.27 | −0.12 | −2.12 | −3.64 | −2.62 |
| | Observable color | clear | pink | pink | purple | blue |
| 1.33 mm | L* | 96.14 | 94.18 | 86.80 | 84.96 | 87.95 |
| | a* | 0.31 | 2.60 | 8.81 | 3.50 | −1.67 |
| | b* | 0.42 | −0.09 | −4.55 | −7.99 | −5.86 |
| | Observable color | clear | pink | pink | purple | blue |
| 2.06 mm | L* | 95.69 | 90.65 | 83.19 | 78.95 | 83.25 |
| | a* | 0.55 | 6.37 | 13.52 | 6.58 | −3.01 |
| | b* | 0.63 | −0.97 | −4.53 | −11.46 | −8.40 |
| | Observable color | clear | pink | pink | purple | blue |

| Thickness | | 600° C. for 2 hrs. | 625° C. for 2 hrs. |
|---|---|---|---|
| 0.6 mm | L* | 93.60 | 92.21 |
| | a* | −0.61 | −0.12 |
| | b* | −0.60 | −1.91 |
| | Observable color | blue | blue |
| 1.33 mm | L* | 90.23 | 87.41 |
| | a* | −1.34 | −0.15 |
| | b* | −1.72 | −4.02 |
| | Observable color | blue | blue |
| | L* | 86.49 | 82.29 |
| | a* | −2.05 | −0.24 |
| | b* | −2.30 | −5.93 |
| | Observable color | blue | blue |

Referring now to Table 8, example glass article 68 having the analyzed concentrations shown in Table 5 and the thicknesses shown in Table 8 were subjected to heat treatment at the temperature and for the period of time shown in Table 8. The transmittance color coordinate in the CIELAB color space, as measured at the indicated article thickness under F2 illumination and a 10° standard observer angle, and the observable color of the resultant colored glass articles are shown in Table 8.

TABLE 8

| Thickness | | 545° C. for 2 hrs. | 550° C. for 2 hrs. | 555° C. for 1.5 hrs. | 535° C. for 10 hrs. | 545° C. for 4 hrs. |
|---|---|---|---|---|---|---|
| 0.6 mm | L* | 93.11 | 92.14 | 91.56 | 91.16 | 90.79 |
| | a* | 3.74 | 4.82 | 4.74 | 6.02 | 5.90 |
| | b* | −0.62 | −1.31 | −2.06 | −0.27 | −1.33 |
| | Observable color | pink | pink | pink | red | pink |
| 1.33 mm | L* | 89.09 | 87.26 | 86.79 | 85.12 | 84.78 |
| | a* | 7.98 | 9.84 | 9.46 | 12.00 | 11.74 |
| | b* | −1.42 | −2.58 | −3.64 | −0.72 | −2.32 |
| | Observable color | pink | purple | pink | red | pink |
| 2.06 mm | L* | 84.41 | 81.51 | 81.40 | 79.52 | 78.50 |
| | a* | 12.63 | 15.29 | 14.09 | 17.14 | 17.21 |
| | b* | −2.25 | −4.01 | −5.39 | −0.26 | −3.16 |

TABLE 8-continued

| | Observable color | pink | purple | pink | red | red |
|---|---|---|---|---|---|---|
| Thickness | | 560° C. for 0.75 hrs. | 555° C. for 4 hrs. | 570° C. for 0.75 hrs. | 625° C. for 3 hrs. | 600° C. for 2 hrs. |
| 0.6 mm | L* | 92.14 | 89.13 | 88.96 | 88.74 | 89.18 |
| | a* | 4.61 | 5.00 | 4.90 | 2.75 | −1.05 |
| | b* | −1.57 | −3.95 | −4.51 | −4.49 | −4.32 |
| | Observable color | pink | purple | purple | purple | purple |
| 1.33 mm | L* | 85.56 | 81.32 | 79.76 | 80.41 | 79.58 |
| | a* | 10.56 | 10.79 | 7.38 | 5.66 | −2.04 |
| | b* | −4.34 | −7.51 | −10.45 | −9.10 | −9.85 |
| | Observable color | pink | purple | purple | purple | purple |
| 2.06 mm | L* | 77.01 | 74.55 | 70.91 | 71.91 | 71.33 |
| | a* | 16.22 | 16.05 | 8.60 | 8.16 | −2.76 |
| | b* | −8.50 | −9.19 | −15.68 | −13.36 | −14.14 |
| | Observable color | pink | pink | purple | purple | purple |

| Thickness | | 575° C. for 2 hrs. | 575° C. for 4 hrs. |
|---|---|---|---|
| 0.6 mm | L* | 88.09 | 88.92 |
| | a* | −01.8 | 1.77 |
| | b* | −5.64 | −4.80 |
| | Observable color | blue | blue |
| 1.33 mm | L* | 78.27 | 80.57 |
| | a* | 0.17 | 3.42 |
| | b* | −11.89 | −9.88 |
| | Observable color | blue | blue |
| 2.06 mm | L* | 70.17 | 72.06 |
| | a* | −0.58 | 4.74 |
| | b* | −16.48 | −14.79 |
| | Observable color | blue | blue |

Referring now to Table 9, example glass article 68 having the analyzed concentrations shown in Table 5 and the thicknesses shown in Table 9 were subjected to heat treatment at the temperature and for the period of time shown in Table 9. The transmittance color coordinate in the CIELAB color space, as measured at the indicated article thickness under F2 illumination and a 10° standard observer angle, and the observable color of the resultant colored glass articles are shown in Table 9.

TABLE 9

| Thickness | | 530° C. for 3 hrs. | 535° C. for 6 hrs. | 545° C. for 2 hrs. | 550° C. for 2 hrs. | 555° C. for 1.5 hrs. |
|---|---|---|---|---|---|---|
| 0.6 mm | L* | 94.72 | 90.50 | 89.99 | 88.79 | 88.58 |
| | a* | 1.96 | 6.78 | 7.30 | 7.58 | 7.50 |
| | b* | 0.34 | 0.18 | −0.85 | −1.80 | −2.57 |
| | Observable color | pink | pink | pink | pink | pink |
| 1.33 mm | L* | 92.64 | 84.15 | 83.50 | 80.52 | 79.57 |
| | a* | 3.99 | 13.49 | 14.01 | 14.51 | 14.41 |
| | b* | 0.62 | 0.67 | −0.95 | −3.71 | −5.60 |
| | Observable color | pink | red | red | pink | pink |
| 2.06 mm | L* | 90.49 | 77.92 | 74.81 | 72.37 | 71.79 |
| | a* | 6.07 | 19.65 | 21.74 | 20.56 | 21.07 |
| | b* | 0.97 | 1.59 | −1.98 | −5.27 | −6.54 |

TABLE 9-continued

| | Observable color | pink | red | pink | pink | pink |
|---|---|---|---|---|---|---|
| Thickness | | 555° C. for 4 hrs. | 650° C. for 2 hrs. | 540° C. for 3 hrs. | 565° C. for 1.75 hrs. | 585° C. for 2 hrs. |
| 0.6 mm | L* | 88.59 | 87.25 | 88.03 | 86.62 | 87.36 |
| | a* | 6.20 | 7.01 | 4.98 | 3.98 | 2.37 |
| | b* | −2.50 | −4.14 | −4.41 | −5.65 | −5.52 |
| | Observable color | purple | purple | purple | purple | purple |
| 1.33 mm | L* | 80.63 | 77.89 | 78.78 | 76.92 | 77.59 |
| | a* | 13.13 | 13.81 | 10.10 | 8.92 | 5.17 |
| | b* | −3.71 | −7.35 | −8.78 | −10.22 | −10.98 |
| | Observable color | purple | purple | purple | purple | purple |
| 2.06 mm | L* | 71.87 | 68.47 | 70.21 | 67.15 | 68.17 |
| | a* | 18.44 | 19.71 | 14.96 | 12.94 | 7.47 |
| | b* | −6.46 | −10.62 | −12.00 | −14.54 | −15.73 |
| | Observable color | purple | purple | purple | purple | purple |

| Thickness | | 560° C. for 0.75 hrs. | 600° C. for 2 hrs. |
|---|---|---|---|
| 0.6 mm | L* | 87.04 | 87.56 |
| | a* | 0.99 | 1.39 |
| | b* | −6.09 | −5.32 |
| | Observable | blue | blue |

TABLE 9-continued

| | | | |
|---|---|---|---|
| | vable color | | |
| 1.33 mm | L* | 77.03 | 77.57 |
| | a* | 3.32 | 2.56 |
| | b* | −11.99 | −10.84 |
| | Observable color | blue | blue |
| 2.06 mm | L* | 67.17 | 68.30 |
| | a* | 3.12 | 4.07 |
| | b* | −17.38 | −15.38 |
| | Observable color | blue | blue |

As indicated in Tables 7-9, colored glass articles including Au may be subjected to different heat treatment to achieve a desired observable color.

Table 10 shows the surface compressive stress CS, depth of layer DOL, and maximum central tension CT of example glass article 67 after being subjected to heat treatment at 545° C. for 2 hrs. and then being subjected to ion-exchange under the conditions listed in Table 10.

TABLE 10

| | | | | | | | |
|---|---|---|---|---|---|---|---|
| IOX temp. (° C.) | 400 | 400 | 400 | 400 | 400 | 400 | 400 |
| IOX time (hrs.) | 5 | 6 | 7 | 8 | 6 | 6.5 | 6.5 |
| $KNO_3$ in IOX bath (wt %) | 83.0 | 83.0 | 83.0 | 83.0 | 83.0 | 83.0 | 80.0 |
| $NaNO_3$ in IOX bath (wt %) | 15.4 | 15.4 | 15.4 | 15.4 | 15.6 | 15.0 | 18.0 |
| $LiNO_3$ in IOX bath (wt %) | 1.6 | 1.6 | 1.6 | 1.6 | 1.4 | 2.0 | 2.0 |
| CS (MPa) | 720 | 643 | 632 | 623 | 657 | 621 | 611 |
| DOL (μm) | 4.46 | 4.86 | 5.36 | 5.44 | 5.00 | 5.04 | 4.85 |
| CT (MPa) | 111.1 | 117.4 | 116.3 | 115.6 | 119.2 | 109.1 | 118.2 |

Table 11 shows example compositions C1-C26, with the analyzed concentration (in terms of mol %) of the resultant colored glass articles.

TABLE 11

| Composition | C1 | C2 | C3 | C4 | C5 | C6 |
|---|---|---|---|---|---|---|
| $SiO_2$ | 61.21 | 61.94 | 62.86 | 61.81 | 61.91 | 61.36 |
| $Al_2O_3$ | 14.46 | 14.48 | 14.52 | 15.56 | 15.54 | 15.75 |
| $B_2O_3$ | 5.84 | 5.95 | 5.92 | 5.88 | 5.89 | 5.91 |
| $Li_2O$ | 11.79 | 10.95 | 11.01 | 11.05 | 11.02 | 11.17 |
| $Na_2O$ | 6.34 | 6.32 | 5.34 | 5.34 | 5.34 | 5.42 |
| $K_2O$ | 0.19 | 0.19 | 0.19 | 0.19 | 0.19 | 0.19 |
| MgO | 0.01 | 0.02 | 0.01 | 0.02 | 0.02 | 0.02 |
| CaO | — | — | — | — | — | — |
| ZnO | — | — | — | — | — | — |
| $ZrO_2$ | — | — | — | — | — | — |
| $SnO_2$ | 0.11 | 0.11 | 0.10 | 0.11 | 0.05 | 0.06 |
| $Fe_2O_3$ | — | — | — | — | — | 0.07 |
| Cl | 0.02 | 0.03 | 0.02 | 0.03 | 0.02 | 0.02 |
| Au | 0.0005 | 0.0007 | 0.0009 | 0.0008 | 0.0007 | 0.0005 |
| $R_2O$ | 18.32 | 17.46 | 16.54 | 16.58 | 16.55 | 16.78 |
| $R_2O—Al_2O_3$ | 3.86 | 2.98 | 2.02 | 1.02 | 1.01 | 1.03 |
| $5.72*Al_2O_3$-21.4*ZnO-2.5*$P_2O_5$-35*$Li_2O$-16.6*$B_2O_3$-20.5*MgO-23.3*$Na_2O$-27.9*SrO-18.5*$K_2O$-26.3*CaO | −578.32 | −550.38 | −528.71 | −523.70 | −522.93 | −529.18 |

| Composition | C7 | C8 | C9 | C10 | C11 | C12 |
|---|---|---|---|---|---|---|
| $SiO_2$ | 61.24 | 60.87 | 60.67 | 60.54 | 60.56 | 60.70 |
| $Al_2O_3$ | 15.66 | 16.54 | 16.47 | 16.52 | 16.36 | 16.27 |
| $B_2O_3$ | 5.89 | 5.85 | 5.84 | 5.99 | 6.04 | 6.01 |
| $Li_2O$ | 11.15 | 11.08 | 10.97 | 11.06 | 11.13 | 11.12 |
| $Na_2O$ | 5.38 | 5.34 | 5.35 | 5.27 | 5.28 | 5.28 |
| $K_2O$ | 0.19 | 0.19 | 0.19 | 0.20 | 0.20 | 0.19 |
| MgO | 0.01 | 0.02 | 0.02 | 0.02 | 0.02 | 0.02 |
| CaO | — | — | — | — | — | — |
| ZnO | — | — | — | — | — | — |
| $ZrO_2$ | 0.32 | — | 0.31 | 0.32 | 0.32 | 0.32 |
| $SnO_2$ | 0.05 | 0.06 | 0.05 | 0.05 | 0.05 | 0.05 |
| $Fe_2O_3$ | 0.07 | — | 0.07 | — | — | — |
| Cl | 0.02 | 0.02 | 0.02 | — | — | — |
| Au | 0.0005 | 0.0007 | 0.0005 | 0.0007 | 0.0008 | 0.0008 |
| $R_2O$ | 16.72 | 16.61 | 16.51 | 16.53 | 16.61 | 16.59 |
| $R_2O—Al_2O_3$ | 1.06 | 0.07 | 0.04 | 0.01 | 0.25 | 0.32 |
| $5.72*Al_2O_3$-21.4*ZnO- | −527.52 | −518.65 | −515.27 | −518.94 | −523.37 | −522.85 |

TABLE 11-continued

| | | | | | | |
|---|---|---|---|---|---|---|
| $2.5*P_2O_5$-$35*Li_2O$-$16.6*B_2O_3$-$20.5*MgO$-$23.3*Na_2O$-$27.9*SrO$-$18.5*K_2O$-$26.3*CaO$ | | | | | | |

| Composition | C13 | C14 | C15 | C16 | C17 | C18 |
|---|---|---|---|---|---|---|
| $SiO_2$ | 60.64 | 60.64 | 63.76 | 65.01 | 65.86 | 67.01 |
| $Al_2O_3$ | 16.07 | 15.42 | 14.39 | 14.29 | 14.28 | 13.47 |
| $B_2O_3$ | 6.01 | 6.04 | 5.86 | 5.09 | 4.36 | 4.13 |
| $Li_2O$ | 11.37 | 11.50 | 11.02 | 10.96 | 10.95 | 10.92 |
| $Na_2O$ | 5.28 | 5.76 | 4.24 | 4.23 | 4.22 | 4.20 |
| $K_2O$ | 0.19 | 0.19 | 0.14 | 0.14 | 0.14 | 0.14 |
| MgO | 0.02 | 0.02 | 0.04 | 0.03 | 0.02 | 0.02 |
| CaO | — | — | — | — | 0.01 | 0.01 |
| ZnO | — | — | 0.02 | — | — | — |
| $ZrO_2$ | 0.32 | 0.32 | 0.48 | 0.20 | 0.10 | 0.04 |
| $SnO_2$ | 0.05 | 0.05 | 0.04 | 0.04 | 0.04 | 0.04 |
| $Fe_2O_3$ | — | — | — | — | — | — |
| Cl | — | — | — | — | — | — |
| Au | 0.0008 | 0.0008 | 0.0011 | 0.0010 | 0.0010 | 0.0010 |
| $R_2O$ | 16.84 | 17.45 | 15.41 | 15.33 | 15.31 | 15.26 |
| $R_2O$—$Al_2O_3$ | 0.77 | 2.03 | 1.01 | 1.04 | 1.03 | 1.79 |
| $5.72*Al_2O_3$-$21.4*ZnO$-$2.5*P_2O_5$-$35*Li_2O$-$16.6*B_2O_3$-$20.5*MgO$-$23.3*Na_2O$-$27.9*SrO$-$18.5*K_2O$-$26.3*CaO$ | −532.74 | −552.69 | −503.22 | −488.03 | −475.55 | −474.86 |

| Composition | C19 | C20 | C21 | C22 | C23 |
|---|---|---|---|---|---|
| $SiO_2$ | 67.59 | 67.75 | 67.84 | 67.89 | 67.63 |
| $Al_2O_3$ | 13.13 | 13.01 | 12.96 | 12.99 | 13.15 |
| $B_2O_3$ | 3.93 | 3.92 | 3.92 | 3.92 | 3.94 |
| $Li_2O$ | 10.94 | 10.91 | 10.88 | 10.77 | 10.69 |
| $Na_2O$ | 4.17 | 4.17 | 4.17 | 4.20 | 4.21 |
| $K_2O$ | 0.14 | 0.14 | 0.14 | 0.14 | 0.15 |
| MgO | 0.02 | 0.02 | 0.01 | 0.01 | 0.01 |
| CaO | 0.01 | 0.01 | 0.01 | 0.01 | 0.10 |
| ZnO | 0.00 | 0.00 | 0.00 | 0.00 | 0.00 |
| $ZrO_2$ | 0.02 | 0.02 | 0.01 | 0.01 | 0.02 |
| $SnO_2$ | 0.04 | 0.04 | 0.04 | 0.04 | 0.04 |
| $Fe_2O_3$ | 0.00 | 0.00 | 0.00 | 0.00 | 0.00 |
| Cl | 0.00 | 0.00 | 0.00 | 0.00 | 0.00 |
| Au | 0.0011 | 0.0014 | 0.0016 | 0.0006 | 0.0001 |
| $R_2O$ | 15.25 | 15.22 | 15.20 | 15.11 | 15.04 |
| $R_2O$—$Al_2O_3$ | 2.13 | 2.21 | 2.24 | 2.12 | 1.90 |
| $5.72*Al_2O_3$-$21.4*ZnO$-$2.5*P_2O_5$-$35*Li_2O$-$16.6*B_2O_3$-$20.5*MgO$-$23.3*Na_2O$-$27.9*SrO$-$18.5*K_2O$-$26.3*CaO$ | −473.41 | −473.02 | −472.32 | −468.73 | −468.03 |

| Composition | C24 | C25 | C26 |
|---|---|---|---|
| $SiO_2$ | 63.76 | 65.86 | 67.59 |
| $Al_2O_3$ | 14.39 | 14.28 | 13.13 |
| $B_2O_3$ | 5.86 | 4.36 | 3.93 |
| $Li_2O$ | 11.02 | 10.95 | 10.94 |
| $Na_2O$ | 4.24 | 4.22 | 4.17 |
| $K_2O$ | 0.14 | 0.14 | 0.14 |
| MgO | 0.04 | 0.02 | 0.02 |
| CaO | 0.00 | 0.00 | 0.00 |
| ZnO | 0.02 | 0.00 | 0.00 |
| $ZrO_2$ | 0.48 | 0.10 | 0.02 |
| $SnO_2$ | 0.04 | 0.04 | 0.04 |
| $Fe_2O_3$ | 0.00 | 0.00 | 0.00 |
| Cl | 0.00 | 0.00 | 0.00 |
| Au | $8.3 \times 10^{-6}$ | $7.7\times 10^{-6}$ | $8.0 \times 10^{-6}$ |
| $R_2O$ | 15.40 | 15.31 | 15.25 |
| $R_2O$—$Al_2O_3$ | 1.01 | 1.03 | 2.12 |
| $5.72*Al_2O_3$- | −503.30 | −475.27 | −473.20 |

TABLE 11-continued

| |
|---|
| 21.4*ZnO-<br>2.5*$P_2O_5$-35*$Li_2O$-<br>16.6*$B_2O_3$-<br>20.5*MgO-<br>23.3*$Na_2O$-<br>27.9*SrO-18.5*$K_2O$-<br>26.3*CaO |

Referring now to Table 12, example glass articles A1-A52 were formed from example compositions C2-C9 and C15-C23 shown in Table 11 and were subjected to heat treatment at the temperature and for the period of time shown in Table 12. The transmittance color coordinate in the CIELAB color space, as measured at an article thickness of 1.33 mm under F2 illumination and a 10° standard observer angle, and the observable color of the resultant colored glass articles are shown in Table 12.

TABLE 12

| Glass Article | A1 | A2 | A3 | A4 | A5 | A6 |
|---|---|---|---|---|---|---|
| Composition | C18 | C19 | C20 | C21 | C22 | C23 |
| Heat treatment temp. (° C.) | 550 | 550 | 550 | 550 | 550 | 550 |
| Heat treatment time (hr.) | 8 | 8 | 8 | 8 | 8 | 8 |
| L* | 87.39 | 88.12 | 86.98 | 86.12 | 91.39 | 96.68 |
| a* | 7.72 | 7.34 | 8.39 | 9.23 | 4.78 | 0.00 |
| b* | 1.87 | 4.93 | 8.07 | 9.58 | 3.81 | 0.80 |
| Observable color | orange | orange | orange | orange | orange | light yellow |
| **Glass Article** | **A7** | **A8** | **A9** | **A10** | **A11** | **A12** |
| Composition | C15 | C16 | C17 | C18 | C18 | C19 |
| Heat treatment temp. (° C.) | 575 | 575 | 575 | 575 | 575 | 575 |
| Heat treatment time (hr.) | 2 | 2 | 2 | 8 | 2 | 8 |
| L* | 83.48 | 92.46 | 85.94 | 88.08 | 91.19 | 88.2 |
| a* | 0.19 | 0.98 | 1.68 | 8.15 | 3.07 | 7.80 |
| b* | −6.06 | −0.93 | −4.63 | 5.71 | −0.47 | 6.51 |
| Observable color | blue | purple | purple | orange | pink | orange |
| **Glass Article** | **A13** | **A14** | **A15** | **A16** | **A17** | **A18** |
| Composition | C19 | C20 | C20 | C21 | C22 | C22 |
| Heat treatment temp. (° C.) | 575 | 575 | 575 | 575 | 575 | 575 |
| Heat treatment time (hr.) | 2 | 8 | 2 | 8 | 8 | 2 |
| L* | 89.96 | 86.7 | 86.9 | 85.72 | 90.59 | 90.98 |
| a* | 4.42 | 8.49 | 8.50 | 8.98 | 5.51 | 4.33 |
| b* | −0.06 | 9.06 | 6.59 | 10.40 | 4.77 | 1.19 |
| Observable color | pink | orange | orange | orange | orange | red |
| **Glass Article** | **A19** | **A20** | **A21** | **A22** | **A23** | **A24** |
| Composition | C23 | C23 | C15 | C16 | C17 | C18 |
| Heat treatment temp. (° C.) | 575 | 575 | 600 | 600 | 600 | 600 |
| Heat treatment time (hr.) | 2 | 8 | 2 | 2 | 2 | 2 |
| L* | 96.73 | 95.89 | 82.63 | 83 | 83.43 | 88.03 |
| a* | 0.03 | 0.63 | 3.35 | 4.27 | 5.48 | 8.35 |
| b* | 0.75 | 1.84 | −6.62 | −6.11 | −5.49 | 4.10 |
| Observable color | yellow | peach | purple | purple | purple | orange |
| **Glass Article** | **A25** | **A26** | **A27** | **A28** | **A29** | **A30** |
| Composition | C19 | C20 | C22 | C23 | C2 | C3 |
| Heat treatment temp. (° C.) | 600 | 600 | 600 | 600 | 625 | 625 |

TABLE 12-continued

| | | | | | | |
|---|---|---|---|---|---|---|
| Heat treatment time (hr.) | 2 | 2 | 2 | 2 | 2 | 2 |
| L* | 87.99 | 86.66 | 90.23 | 96.4 | 89.29 | 87.6 |
| a* | 8.34 | 8.91 | 5.53 | 0.28 | 5.14 | 7.22 |
| b* | 5.45 | 8.48 | 3.52 | 1.24 | 9.97 | 10.51 |
| Observable color | orange | orange | orange | light orange | orange | red |
| **Glass Article** | **A31** | **A32** | **A33** | **A34** | **A35** | **A36** |
| Composition | C4 | C5 | C6 | C7 | C8 | C9 |
| Heat treatment temp. (° C.) | 625 | 625 | 625 | 625 | 625 | 625 |
| Heat treatment time (hr.) | 2 | 2 | 2 | 2 | 2 | 2 |
| L* | 83 | 86.74 | 88.94 | 87.28 | 78.03 | 80.49 |
| a* | 11.39 | 9.76 | 6.92 | 9.09 | 5.04 | 6.25 |
| b* | 2.59 | 2.60 | 4.75 | 3.44 | −9.39 | −8.92 |
| Observable color | red | red | red | red | purple | purple |
| **Glass Article** | **A37** | **A38** | **A39** | **A40** | **A41** | **A42** |
| Composition | C15 | C16 | C17 | C18 | C19 | C20 |
| Heat treatment temp. (° C.) | 625 | 625 | 625 | 625 | 625 | 625 |
| Heat treatment time (hr.) | 2 | 2 | 2 | 2 | 2 | 2 |
| L* | 84.25 | 85.21 | 85.58 | 87.5 | 87.39 | 86.09 |
| a* | 10.89 | 10.87 | 10.81 | 8.98 | 8.76 | 9.27 |
| b* | −0.89 | 0.55 | 0.90 | 4.56 | 5.39 | 8.00 |
| Observable color | magenta | red | red | orange | orange | orange |
| **Glass Article** | **A43** | **A44** | **A45** | **A46** | **A47** | **A48** |
| Composition | C22 | C23 | C15 | C16 | C17 | C18 |
| Heat treatment temp. (° C.) | 625 | 625 | 650 | 650 | 650 | 650 |
| Heat treatment time (hr.) | 2 | 2 | 2 | 2 | 2 | 2 |
| L* | 90.31 | 95.7 | 84.63 | 85.69 | 86.23 | 87.42 |
| a* | 5.73 | 0.89 | 11.19 | 11.18 | 10.85 | 9.14 |
| b* | 3.85 | 1.49 | −0.12 | 1.22 | 1.47 | 4.40 |
| Observable color | orange | orange | magenta | red | red | orange |
| **Glass Article** | **A49** | **A50** | **A51** | **A52** | | |
| Composition | C19 | C20 | C22 | C23 | | |
| Heat treatment temp. (° C.) | 650 | 650 | 650 | 650 | | |
| Heat treatment time (hr.) | 2 | 2 | 2 | 2 | | |
| L* | 87.42 | 86.18 | 90.14 | 95.53 | | |
| a* | 8.84 | 9.28 | 6.00 | 1.04 | | |
| b* | 5.24 | 8.10 | 3.89 | 1.42 | | |
| Observable color | orange | orange | orange | orange | | |

Referring now to Table 13, example glass articles A53-A114 were formed from example compositions C1-C14 and C24-C26 shown in Table 11 and were subjected to heat treatment at the temperature and for the period of time shown in Table 13. The observable colors of the resultant colored glass articles are shown in Table 13.

TABLE 13

| Glass Article | A53 | A54 | A55 | A56 | A57 | A58 |
|---|---|---|---|---|---|---|
| Composition | C1 | C2 | C3 | C4 | C5 | C6 |
| Heat treatment temp. (° C.) | 550 | 550 | 550 | 550 | 550 | 550 |
| Heat treatment time (hr.) | 2 | 2 | 2 | 2 | 2 | 2 |
| Observable color | red | clear, red | clear, red | clear | clear | red |

| Glass Article | A59 | A60 | A61 | A62 | A63 | A64 |
|---|---|---|---|---|---|---|
| Composition | C7 | C8 | C9 | C10 | C11 | C12 |
| Heat treatment temp. (° C.) | 550 | 550 | 550 | 550 | 550 | 550 |
| Heat treatment time (hr.) | 2 | 2 | 2 | 2 | 2 | 2 |
| Observable color | red | clear | clear, pink | clear | clear | clear |

| Glass Article | A65 | A66 | A67 | A68 | A69 | A70 |
|---|---|---|---|---|---|---|
| Composition | C13 | C14 | C24 | C1 | C2 | C3 |
| Heat treatment temp. (° C.) | 550 | 550 | 550 | 575 | 575 | 575 |
| Heat treatment time (hr.) | 2 | 2 | 8 | 2 | 2 | 2 |
| Observable color | clear | clear, purple | purple | orange | orange | red |

| Glass Article | A71 | A72 | A73 | A74 | A75 | A76 |
|---|---|---|---|---|---|---|
| Composition | C4 | C5 | C6 | C7 | C8 | C9 |
| Heat treatment temp. (° C.) | 575 | 575 | 575 | 575 | 575 | 575 |
| Heat treatment time (hr.) | 2 | 2 | 2 | 2 | 2 | 2 |
| Observable color | purple | purple | red | red | clear, red | clear, pink |

| Glass Article | A77 | A78 | A79 | A80 | A81 | A82 |
|---|---|---|---|---|---|---|
| Composition | C10 | C11 | C12 | C13 | C14 | C24 |
| Heat treatment temp. (° C.) | 575 | 575 | 575 | 575 | 575 | 575 |
| Heat treatment time (hr.) | 2 | 2 | 2 | 2 | 2 | 2 |
| Observable color | clear, purple | clear, purple | clear, purple | clear, purple | clear, red | purple |

| Glass Article | A83 | A84 | A85 | A86 | A87 | A88 |
|---|---|---|---|---|---|---|
| Composition | C25 | C26 | C24 | C25 | C1 | C2 |
| Heat treatment temp. (° C.) | 575 | 575 | 575 | 575 | 600 | 600 |
| Heat treatment time (hr.) | 2 | 2 | 8 | 8 | 2 | 2 |
| Observable color | purple | red | red | red | orange | orange |

| Glass Article | A89 | A90 | A91 | A92 | A93 | A94 |
|---|---|---|---|---|---|---|
| Composition | C3 | C4 | C5 | C6 | C7 | C8 |
| Heat treatment temp. (° C.) | 600 | 600 | 600 | 600 | 600 | 600 |
| Heat treatment time (hr.) | 2 | 2 | 2 | 2 | 2 | 2 |
| Observable color | red | purple | purple | red | red | purple |

| Glass Article | A95 | A96 | A97 | A98 | A99 | A100 |
|---|---|---|---|---|---|---|
| Composition | C9 | C10 | C11 | C12 | C13 | C14 |
| Heat treatment temp. (° C.) | 600 | 600 | 600 | 600 | 600 | 600 |
| Heat treatment time (hr.) | 2 | 2 | 2 | 2 | 2 | 2 |
| Observable color | purple | purple | purple | purple | purple | orange |

TABLE 13-continued

| Glass Article | A101 | A102 | A103 | A104 | A105 | A106 |
|---|---|---|---|---|---|---|
| Composition | C24 | C25 | C26 | C24 | C25 | C26 |
| Heat treatment temp. (° C.) | 600 | 600 | 600 | 625 | 625 | 625 |
| Heat treatment time (hr.) | 2 | 2 | 2 | 2 | 2 | 2 |
| Observable color | purple | red | red | red | red | red |

| Glass Article | A107 | A108 | A109 | A110 | A111 | A112 |
|---|---|---|---|---|---|---|
| Composition | C10 | C11 | C12 | C13 | C14 | C24 |
| Heat treatment temp. (° C.) | 650 | 650 | 650 | 650 | 650 | 650 |
| Heat treatment time (hr.) | 2 | 2 | 2 | 2 | 2 | 2 |
| Observable color | purple | purple | clear, purple | purple | orange | red |

| Glass Article | A113 | A114 |
|---|---|---|
| Composition | C25 | C26 |
| Heat treatment temp. (° C.) | 650 | 650 |
| Heat treatment time (hr.) | 2 | 2 |
| Observable color | red | red |

Figure 7:
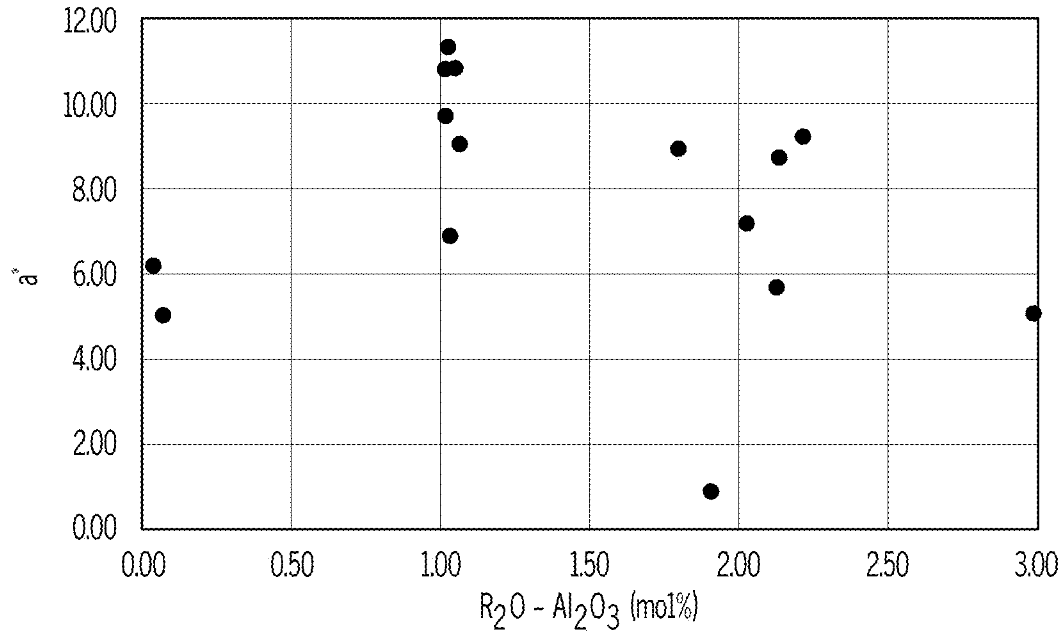
FIG. 7 is a plot of $R_2O—Al_2O_3$ vs. a* CIELAB space (x-axis: $R_2O—Al_2O_3$; y-axis: a*) of colored glass articles made from glass compositions and subjected to a heat treatment according to one or more embodiments described herein.
Figure 8:
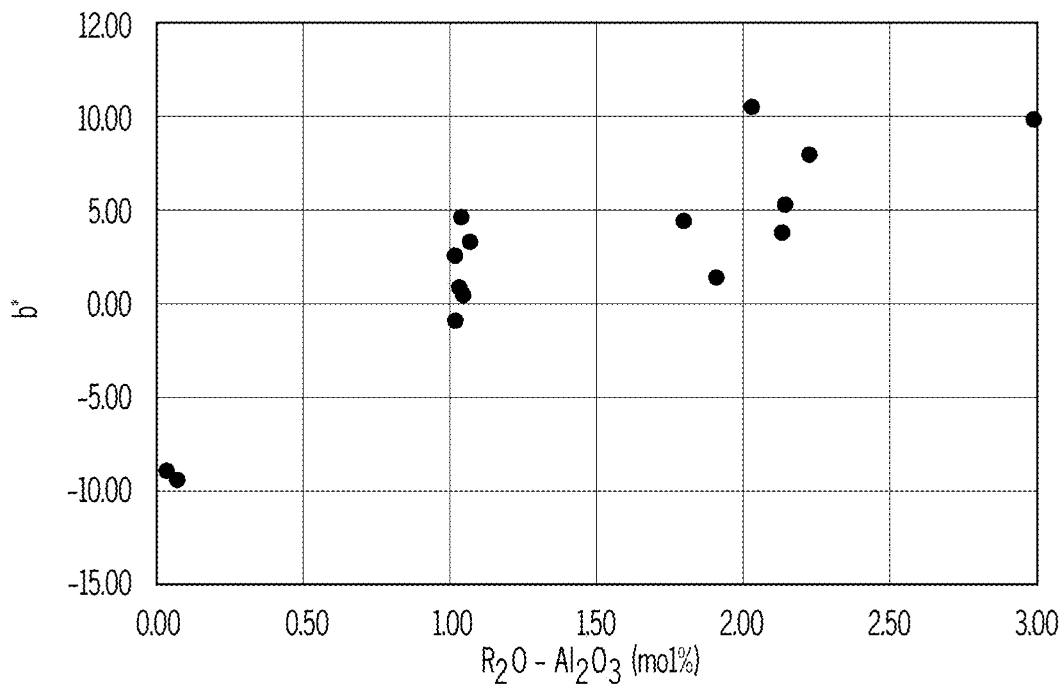
FIG. 8 is a plot of $R_2O—Al_2O_3$ vs. b* CIELAB space (x-axis: $R_2O—Al_2O_3$; y-axis: b*) of colored glass articles made from glass compositions and subjected to a heat treatment according to one or more embodiments described herein.

Referring now to FIGS. 7 and 8, plots show the relationship of $R_2O$—$Al_2O_3$ and a* and b*, respectively, of example glass articles A29-A44. As shown in FIG. 7, a* was a positive number, regardless of the $R_2O$—$Al_2O_3$ value, thereby resulting in observable colors towards red side of the CIELAB color space. As shown in FIG. 8, as $R_2O$—$Al_2O_3$ increased, b* increased, thereby shifting the observable colors from blue to yellow. For example, example glass articles A35 and A36, formed from example compositions C8 and C9 having an analyzed $R_2O$—$Al_2O_3$ of 0.07 mol % and 0.04 mol %, respectively, had a b* of −9.39 and −8.92, respectively, resulting in observably purple glass articles. Example glass articles A29 and A30, formed from example glass compositions C2 and C3 having an analyzed $R_2O$—$Al_2O_3$ of 2.98 mol % and 2.02 mol %, respectively, had a b* of 9.97 and 10.51, respectively, resulting in an observably orange glass article and an observably red glass article.

Moreover, example glass articles A33 and A34, formed from example glass compositions C6 and C7 including $Fe_2O_3$ and $ZrO_2$, respectively, had an observable red color.

As indicated by Tables 12 and 13 and FIGS. 7 and 8, the analyzed $R_2O$—$Al_2O_3$ may be adjusted, additional components may be added to the glass composition, and the glass article may be subjected to a certain heat treatment to provide a desired colored glass article.

Table 14 shows example glass compositions (in terms of mol %) containing $Cr_2O_3$ as a colorant and the transmittance color coordinate in the CIELAB color space, as measured at an article thickness of 1.5 mm under F2 illumination and a 10° standard observer angle, of the resultant colored glass articles.

TABLE 14

| Example | Cr-1 | Cr-2 | Cr-3 | Cr-4 | Cr-5 | Cr-6 |
|---|---|---|---|---|---|---|
| $SiO_2$ | 58.78 | 58.30 | 58.52 | 58.97 | 58.26 | 58.52 |
| $Al_2O_3$ | 16.68 | 16.35 | 16.50 | 16.41 | 16.38 | 16.56 |
| $B_2O_3$ | 5.93 | 5.93 | 6.01 | 5.98 | 5.93 | 6.04 |
| $Li_2O$ | 11.74 | 9.86 | 9.93 | 9.89 | 9.85 | 9.89 |
| $Na_2O$ | 6.26 | 4.25 | 4.27 | 4.27 | 4.26 | 4.30 |
| $K_2O$ | 0.48 | 0.48 | 0.48 | 0.49 | 0.48 | 0.49 |
| MgO | 0.02 | 2.91 | 2.95 | 2.91 | 2.94 | 2.93 |
| CaO | 0.01 | 0.01 | 0.01 | 0.01 | 0.01 | 0.02 |
| ZnO | — | 1 | 1.01 | 1 | 1 | 1.05 |
| $TiO_2$ | 0.01 | 0.01 | 0.01 | 0.01 | 0.01 | 0.01 |
| NiO | — | — | 0.023 | 0.012 | 0.043 | 0.089 |
| $CO_3O_4$ | — | 0.001 | 0.002 | 0.002 | 0.03 | 0.048 |
| CuO | — | 0.83 | 0.233 | 0.037 | 0.785 | 0.044 |
| $Cr_2O_3$ | 0.098 | 0.068 | 0.038 | 0.002 | 0.016 | 0.008 |
| $R_2O$ | 18.48 | 14.59 | 14.68 | 14.65 | 14.59 | 14.68 |
| R'O | 0.03 | 3.92 | 3.97 | 3.92 | 3.95 | 4 |
| $R_2O$ + R'O − $Al_2O_3$ | 1.83 | 2.16 | 2.15 | 2.16 | 2.16 | 2.12 |
| MgO + ZnO | 0.02 | 3.91 | 3.96 | 3.91 | 3.94 | 3.98 |
| $Al_2O_3$ + MgO + ZnO | 16.7 | 20.26 | 20.46 | 20.32 | 20.32 | 20.54 |
| Transmittance Color Coordinate | | | | | | |
| L* | 83.78 | 77.06 | 85.88 | 94.99 | 66.99 | 62.17 |
| a* | −12.60 | −26.24 | −9.49 | −0.45 | −10.12 | −2.12 |
| b* | 62.26 | 8.74 | 6.26 | 0.17 | −14.19 | −20.39 |

| Example | Cr-7 | Cr-8 | Cr-9 | Cr-10 | Cr-11 | Cr-12 |
|---|---|---|---|---|---|---|
| $SiO_2$ | 57.09 | 59.21 | 58.44 | 58.12 | 59.20 | 58.36 |
| $Al_2O_3$ | 16.10 | 16.64 | 16.21 | 16.56 | 16.58 | 16.11 |
| $B_2O_3$ | 5.90 | 5.62 | 5.70 | 6.07 | 5.67 | 5.69 |
| $Li_2O$ | 9.68 | 11.75 | 11.56 | 11.83 | 11.82 | 11.6 |
| $Na_2O$ | 4.21 | 6.18 | 6.09 | 6.21 | 6.16 | 6.07 |
| $K_2O$ | 0.47 | 0.47 | 0.47 | 0.48 | 0.45 | 0.46 |
| MgO | 2.86 | 0.02 | 0.02 | 0.02 | 0.02 | 0.02 |
| CaO | 0.02 | 0.01 | 0.01 | 0.01 | 0.01 | 0.01 |
| ZnO | 0.98 | — | — | — | — | — |
| $TiO_2$ | — | 0.01 | — | 0.01 | 0.01 | — |
| NiO | 0.014 | 0.078 | 0.039 | 0.071 | — | — |
| $CO_3O_4$ | 0.058 | 0.001 | 0.001 | 0.002 | 0.002 | 0.038 |
| CuO | 2.598 | 0.002 | 1.351 | 0.563 | 0.086 | 1.583 |
| $Cr_2O_3$ | 0.006 | 0.009 | 0.102 | 0.051 | 0.002 | 0.051 |
| $R_2O$ | 14.36 | 18.4 | 18.12 | 18.52 | 18.43 | 18.13 |
| R'O | 3.86 | 0.03 | 0.03 | 0.03 | 0.03 | 0.03 |
| $R_2O$ + R'O − $Al_2O_3$ | 2.12 | 1.79 | 1.94 | 1.99 | 1.88 | 2.05 |
| MgO + ZnO | 3.84 | 0.02 | 0.02 | 0.02 | 0.02 | 0.02 |
| $Al_2O_3$ + MgO + ZnO | 19.94 | 16.66 | 16.23 | 16.58 | 16.6 | 16.13 |
| Transmittance Color Coordinate | | | | | | |
| L* | 38.41 | 89.31 | 89.27 | 76.84 | 94.52 | 41.28 |
| a* | −14.36 | −0.65 | −0.77 | −14.83 | −1.14 | −18.17 |
| b* | −13.36 | 17.15 | 17.45 | 11.73 | −2.04 | −13.89 |

| Example | Cr-13 | Cr-14 | Cr-15 | Cr-16 | Cr-17 | Cr-18 |
|---|---|---|---|---|---|---|
| $SiO_2$ | 58.03 | 58.39 | 58.48 | 58.45 | 58.58 | 58.71 |
| $Al_2O_3$ | 16.57 | 16.49 | 16.53 | 16.49 | 16.42 | 16.54 |
| $B_2O_3$ | 6.03 | 6.01 | 6.09 | 6.04 | 5.97 | 5.99 |
| $Li_2O$ | 11.93 | 10.02 | 10.08 | 10.04 | 10.5 | 10.48 |
| $Na_2O$ | 6.23 | 4.28 | 4.26 | 4.25 | 4.71 | 4.76 |
| $K_2O$ | 0.48 | 0.48 | 0.49 | 0.48 | 0.48 | 0.49 |
| MgO | 0.02 | 2.95 | 2.94 | 2.94 | 0.96 | 0.97 |
| CaO | 0.01 | 0.02 | 0.01 | 0.02 | 0.98 | 0.98 |
| ZnO | — | 1.01 | 1.01 | 1.01 | 0.99 | 1.02 |
| $TiO_2$ | 0.01 | 0.01 | 0.01 | 0.01 | 0.01 | 0.01 |
| NiO | 0.093 | 0.021 | — | 0.082 | 0.019 | — |
| $CO_3O_4$ | 0.072 | 0.002 | 0.002 | 0.048 | 0.002 | 0.002 |
| CuO | 0.516 | 0.278 | 0.091 | 0.137 | 0.339 | 0.054 |
| $Cr_2O_3$ | 0.012 | 0.036 | 0.001 | 0.006 | 0.039 | 0.001 |
| $R_2O$ | 18.64 | 14.78 | 14.83 | 14.77 | 15.69 | 15.73 |
| R'O | 0.03 | 3.98 | 3.96 | 3.97 | 2.93 | 2.97 |
| $R_2O$ + R'O − $Al_2O_3$ | 2.1 | 2.27 | 2.26 | 2.25 | 2.2 | 2.16 |
| MgO + ZnO | 0.02 | 3.96 | 3.95 | 3.95 | 1.95 | 1.99 |
| $Al_2O_3$ + MgO + ZnO | 16.59 | 20.45 | 20.48 | 20.44 | 18.37 | 18.53 |

TABLE 14-continued

| Transmittance Color Coordinate | | | | | | |
|---|---|---|---|---|---|---|
| L* | 38.93 | 85.89 | 95.05 | 62.68 | 85.25 | 95.29 |
| a* | 1.10 | −9.54 | −0.84 | −2.13 | −10.39 | −0.68 |
| b* | −44.38 | 5.68 | −0.62 | −20.72 | 6.20 | −0.90 |

| Example | Cr-19 |
|---|---|
| $SiO_2$ | 58.51 |
| $Al_2O_3$ | 16.49 |
| $B_2O_3$ | 6.06 |
| $Li_2O$ | 10.47 |
| $Na_2O$ | 4.76 |
| $K_2O$ | 0.49 |
| MgO | 0.97 |
| CaO | 0.99 |
| ZnO | 1.01 |
| $TiO_2$ | 0.01 |
| NiO | 0.085 |
| $CO_3O_4$ | 0.048 |
| CuO | 0.111 |
| $Cr_2O_3$ | 0.005 |
| $R_2O$ | 15.72 |
| R'O | 2.97 |
| $R_2O$ + R'O − $Al_2O_3$ | 2.2 |
| MgO + ZnO | 1.98 |
| $Al_2O_3$ + MgO + ZnO | 18.47 |
| Transmittance Color Coordinate | |
| L* | 61.08 |
| a* | −2.34 |
| b* | −22.51 |

As indicated by the example glass compositions and colored glass articles in Table 14, the glass compositions described herein improve $Cr_2O_3$ solubility to form colored glass articles having the desired color. For example, example glass composition Cr-1 including 0.098 mol % $Cr_2O_3$ formed a colored glass article having a transmittance color coordinate in the CIELAB color space of L*=83.78, a*=−12.60, and b*=62.26.

As further indicated by the example glass compositions and colored glass articles in Table 14, adding other colorants in addition to $Cr_2O_3$ as described herein allows different color gamuts to be achieved. For example, example glass composition Cr-2 including 0.068 mol % $Cr_2O_3$, 0.001 mol % $Co_3O_4$, and 0.83 mol % CuO formed a colored glass article have a transmittance color coordinate in the CIELAB color space of L*=77.06, a*=−26.24, and b*=8.74. Example glass composition Cr-3, including 0.038 mol % $Cr_2O_3$, 0.023 mol % NiO, 0.002 mol % $Co_3O_4$, and 0.233 mol % CuO formed a colored glass article have a transmittance color coordinate in the CIELAB color space of L*=85.88, a*=−9.40, and b*=6.26.

Referring now to FIGS. 9-32, projected color gamuts were modeled for glass compositions containing $Cr_2O_3$ as a colorant. The modeled compositions included $Cr_2O_3$ as the sole colorant as well as $Cr_2O_3$ in combination with NiO, $Co_3O_4$, CuO, and various combinations thereof.

Figure 9:
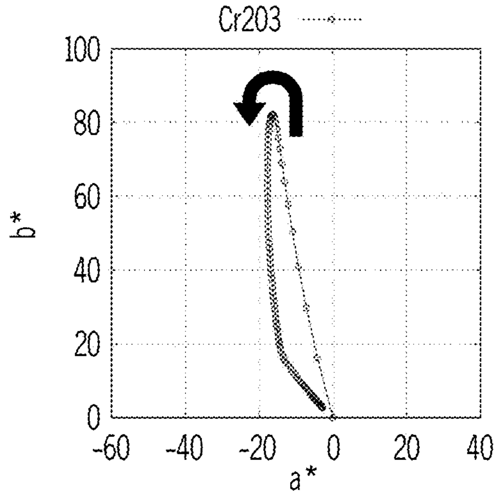
FIG. 9 is a plot of a projected a* vs. b* CIELAB space (x-axis: a*; y-axis: b*) of a colored glass article made from a glass composition according to one or more embodiments described herein.
Figure 10:
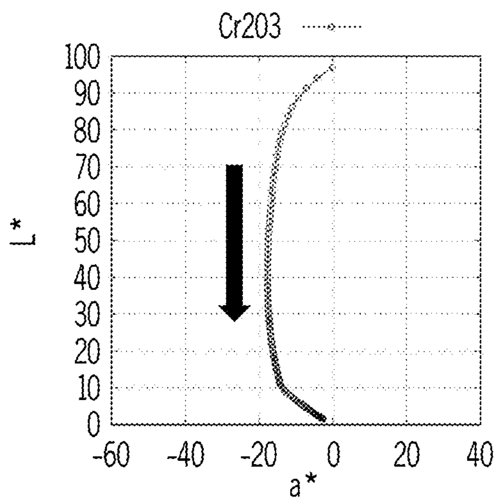
FIG. 10 is a plot of a projected a* vs. L* CIELAB space (x-axis: a*; y-axis: L*) of the colored glass article of FIG. 9.
Figure 11:
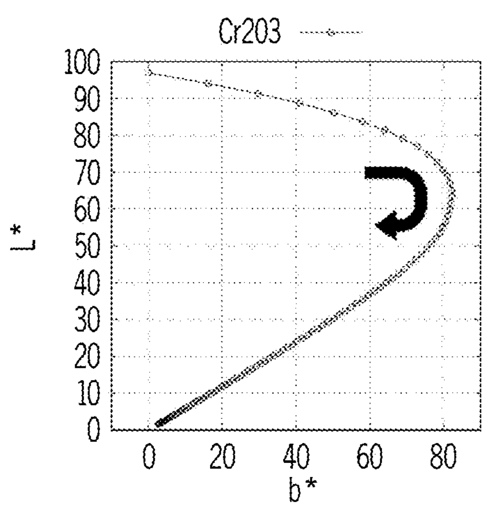
FIG. 11 is a plot of a projected b* vs. L* CIELAB space (x-axis: b*; y-axis: L*) of the colored glass article of FIG. 9.

Referring now to FIGS. 9-11, a projected color gamut for a glass composition including only $Cr_2O_3$ as a colorant is shown. As illustrated, a single colorant generates a line in the CIELAB color space. The points along the line correspond to different levels of $Cr_2O_3$ concentration from 0 mol % to 2 mol %. The arrows indicate the directions of increasing concentration. The $Cr_2O_3$ color gamut projects that a colored glass article having greater than or equal to 0 mol % and less than or equal to 2 mol % $Cr_2O_3$ may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −18 and less than or equal to 0, and b* greater than or equal to 0 and less than or equal to 82.

Figure 12:
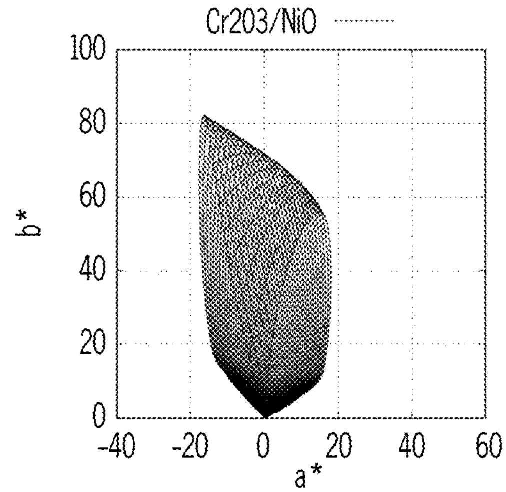
FIG. 12 is a plot of a projected a* vs. b* CIELAB space (x-axis: a*; y-axis: b*) of a colored glass article made from a glass composition according to one or more embodiments described herein.
Figure 13:
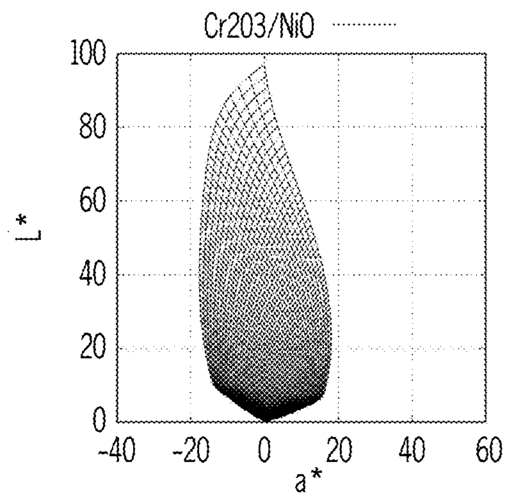
FIG. 13 is a plot of a projected a* vs. L* CIELAB space (x-axis: a*; y-axis: L*) of the colored glass article of FIG. 12.
Figure 14:
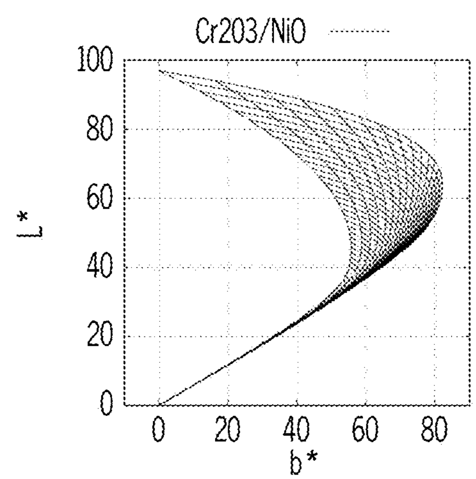
FIG. 14 is a plot of a projected b* vs. L* CIELAB space (x-axis: b*; y-axis: L*) of the colored glass article of FIG. 12.

Different color gamuts may be achieved by including other colorants in addition to $Cr_2O_3$. Referring now to FIGS. 12-14, a projected color gamut for a glass composition including $Cr_2O_3$ and NiO as colorants is shown. As illustrated, two colorants generate a surface in the CIELAB color space. The $Cr_2O_3$/NiO color gamut projects that a colored glass article having greater than or equal to 0 mol % and less than or equal to 2 mol % $Cr_2O_3$ and greater than or equal to 0 mol % and less than or equal to 4 mol % NiO may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −18 and less than or equal to 18, and b* greater than or equal to 0 and less than or equal to 82.

Figure 15:
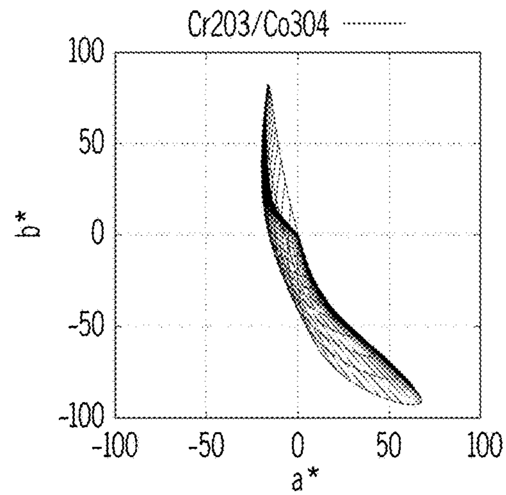
FIG. 15 is a plot of a projected a* vs. b* CIELAB space (x-axis: a*; y-axis: b*) of a colored glass article made from a glass composition according to one or more embodiments described herein.
Figure 16:
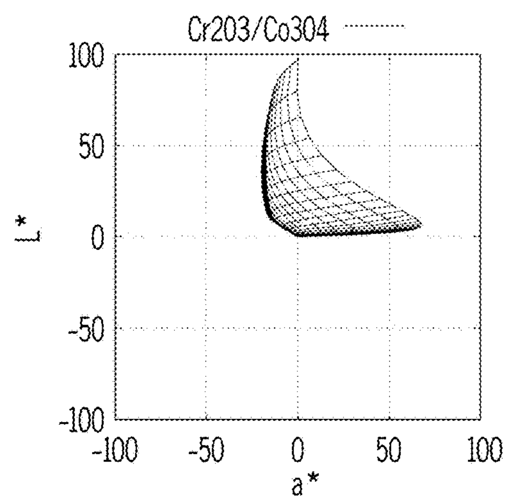
FIG. 16 is a plot of a projected a* vs. L* CIELAB space (x-axis: a*; y-axis: L*) of the colored glass article of FIG. 15.
Figure 17:
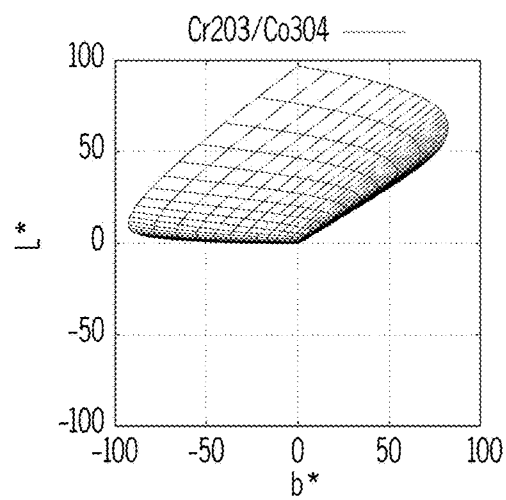
FIG. 17 is a plot of a projected b* vs. L* CIELAB space (x-axis: b*; y-axis: L*) of the colored glass article of FIG. 15.

Referring now to FIGS. 15-17, a projected color gamut for a glass composition including $Cr_2O_3$ and $Co_3O_4$ as colorants is shown. As illustrated, two colorants generate a surface in the CIELAB color space. The $Cr_2O_3$/$Co_3O_4$ color gamut projects that a colored glass article having greater than or equal to 0 mol % and less than or equal to 2 mol % $Cr_2O_3$ and greater than or equal to 0 mol % and less than or equal to 2 mol % $Co_3O_4$ may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −20 and less than or equal to 60, and b* greater than or equal to −90 and less than or equal to 85.

Figure 18:
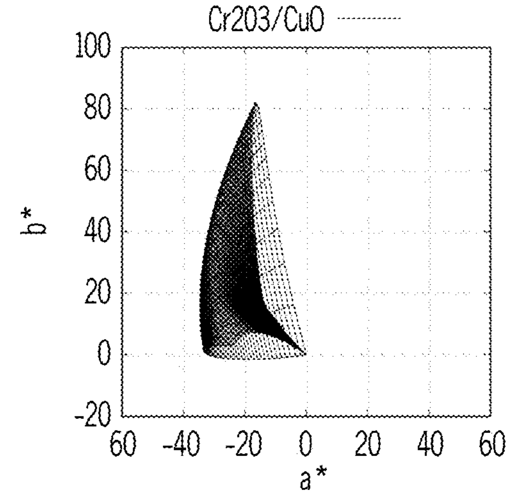
FIG. 18 is a plot of a projected a* vs. b* CIELAB space (x-axis: a*; y-axis: b*) of a colored glass article made from a glass composition according to one or more embodiments described herein.
Figure 19:
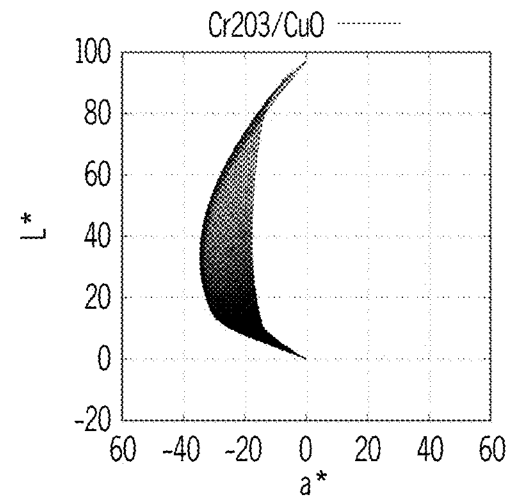
FIG. 19 is a plot of a projected a* vs. L* CIELAB space (x-axis: a*; y-axis: L*) of the colored glass article of FIG. 18.
Figure 20:
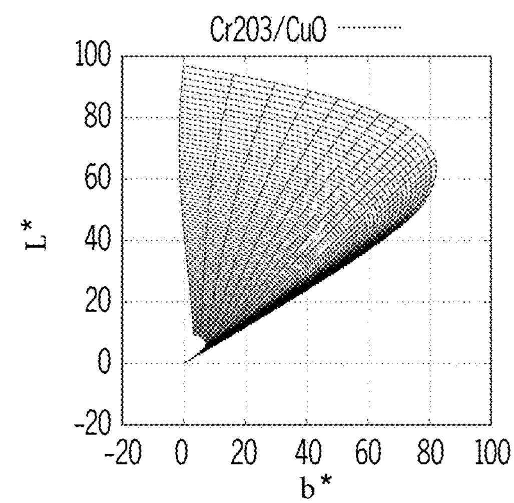
FIG. 20 is a plot of a projected b* vs. L* CIELAB space (x-axis: b*; y-axis: L*) of the colored glass article of FIG. 18.

Referring now to FIGS. 18-20, a projected color gamut for a glass composition including $Cr_2O_3$ and CuO as colorants is shown. As illustrated, two colorants generate a surface in the CIELAB color space. The $Cr_2O_3$/CuO color gamut projects that a colored glass article having greater than or equal to 0 mol % and less than or equal to 2 mol % $Cr_2O_3$ and greater than or equal to 0 mol % and less than or equal to 20 mol % CuO may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −35 and less than or equal to 0, and b* greater than or equal to 0 and less than or equal to 82.

Figure 21:
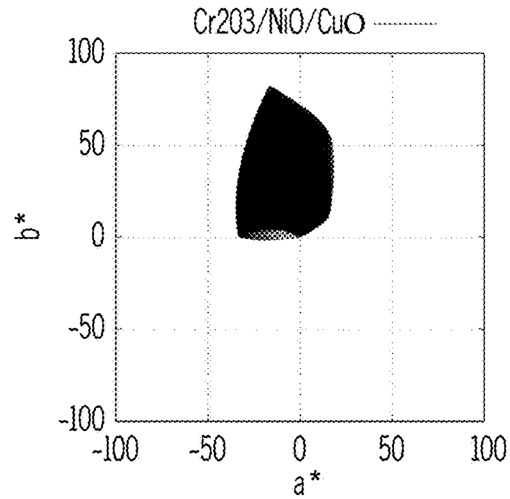
FIG. 21 is a plot of a projected a* vs. b* CIELAB space (x-axis: a*; y-axis: b*) of a colored glass article made from a glass composition according to one or more embodiments described herein.
Figure 22:
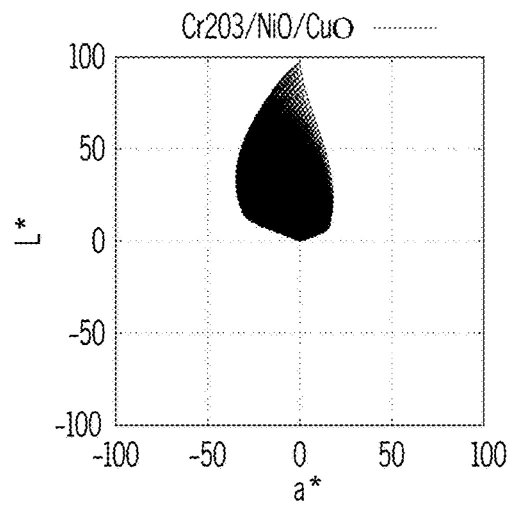
FIG. 22 is a plot of a projected a* vs. L* CIELAB space (x-axis: a*; y-axis: L*) of the colored glass article of FIG. 21.
Figure 23:
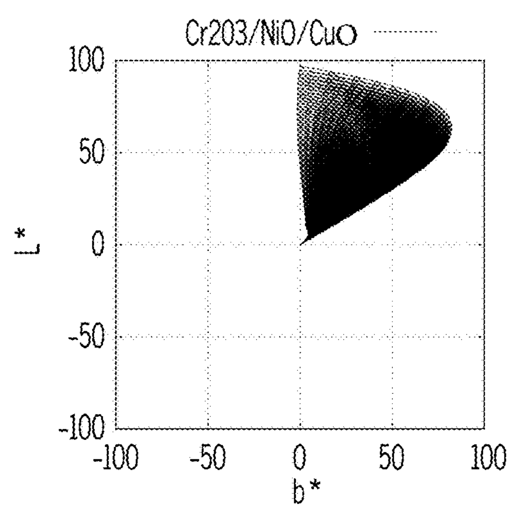
FIG. 23 is a plot of a projected b* vs. L* CIELAB space (x-axis: b*; y-axis: L*) of the colored glass article of FIG. 21.

Referring now to FIGS. 21-23, a projected color gamut for a glass composition including $Cr_2O_3$, NiO, and CuO as colorants is shown. As illustrated, three colorants create a volume in the CIELAB color space. The $Cr_2O_3$/NiO/CuO color gamut projects that a colored glass article having greater than or equal to 0 mol % and less than or equal to 2 mol % $Cr_2O_3$, greater than or equal to 0 mol % and less than or equal to 4 mol % NiO, and greater than or equal to 0 mol % and less than or equal to 20 mol % CuO may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −35 and less than or equal to 20, and b* greater than or equal to 0 and less than or equal to 75.

Figure 24:
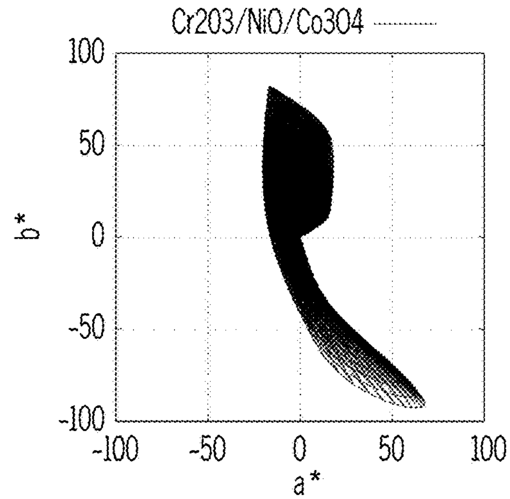
FIG. 24 is a plot of a projected a* vs. b* CIELAB space (x-axis: a*; y-axis: b*) of a colored glass article made from a glass composition according to one or more embodiments described herein.
Figure 25:
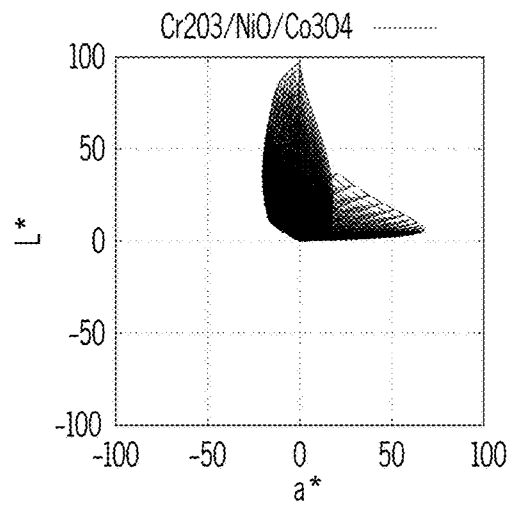
FIG. 25 is a plot of a projected a* vs. L* CIELAB space (x-axis: a*; y-axis: L*) of the colored glass article of FIG. 24.
Figure 26:
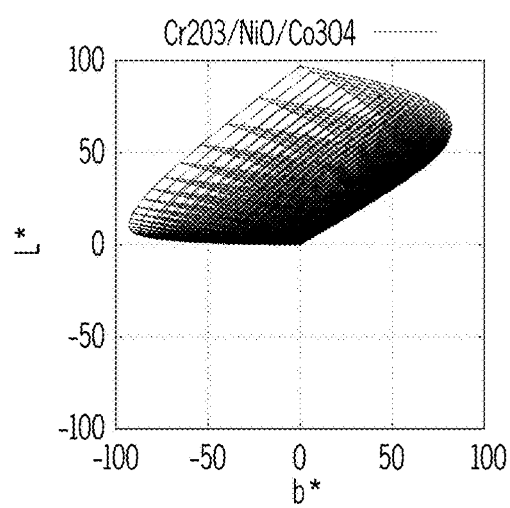
FIG. 26 is a plot of a projected b* vs. L* CIELAB space (x-axis: b*; y-axis: L*) of the colored glass article of FIG. 24.

Referring now to FIGS. 24-26, a projected color gamut for a glass composition including $Cr_2O_3$, NiO, and $Co_3O_4$ as colorants is shown. As illustrated, three colorants create a volume in the CIELAB color space. The $Cr_2O_3$/NiO/$Co_3O_4$ color gamut projects that a colored glass article having greater than or equal to 0 mol % and less than or equal to 2 mol % $Cr_2O_3$, greater than or equal to 0 mol % and less than or equal to 4 mol % NiO, and greater than or equal to 0 mol % and less than or equal to 2 mol % $Co_3O_4$ may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −15 and less than or equal to 65, and b* greater than or equal to −90 and less than or equal to 80.

Figure 27:
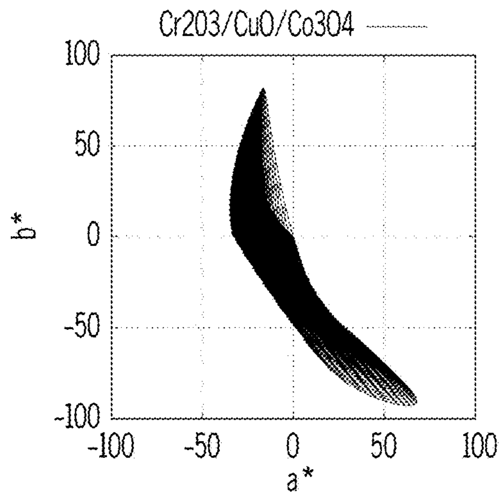
FIG. 27 is a plot of a projected a* vs. b* CIELAB space (x-axis: a*; y-axis: b*) of a colored glass article made from a glass composition according to one or more embodiments described herein.
Figure 28:
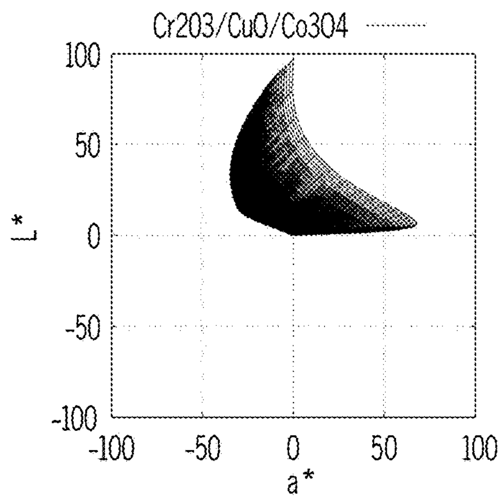
FIG. 28 is a plot of a projected a* vs. L* CIELAB space (x-axis: a*; y-axis: L*) of the colored glass article of FIG. 27.
Figure 29:
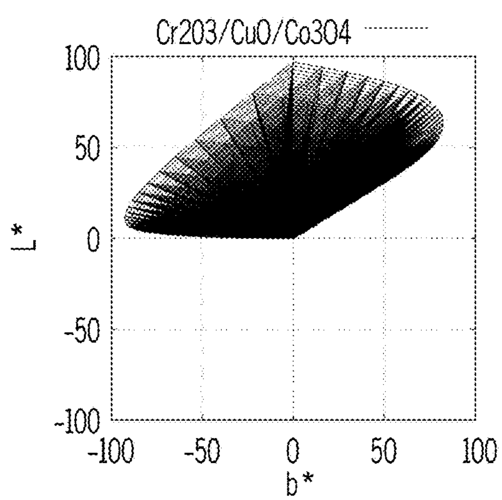
FIG. 29 is a plot of a projected b* vs. L* CIELAB space (x-axis: b*; y-axis: L*) of the colored glass article of FIG. 27.

Referring now to FIGS. 27-29, a projected color gamut for a glass composition including $Cr_2O_3$, CuO, and $Co_3O_4$ as colorants is shown. As illustrated, three colorants create a volume in the CIELAB color space. The $Cr_2O_3$/CuO/$Co_3O_4$ color gamut projects that a colored glass article having greater than or equal to 0 mol % and less than or equal to 2 mol % $Cr_2O_3$, greater than or equal to 0 mol % and less than or equal to 20 mol % CuO, and greater than or equal to 0 mol % and less than or equal to 2 mol % $Co_3O_4$ may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −35 and less than or equal to 60, and b* greater than or equal to −90 and less than or equal to 80.

Figure 30:
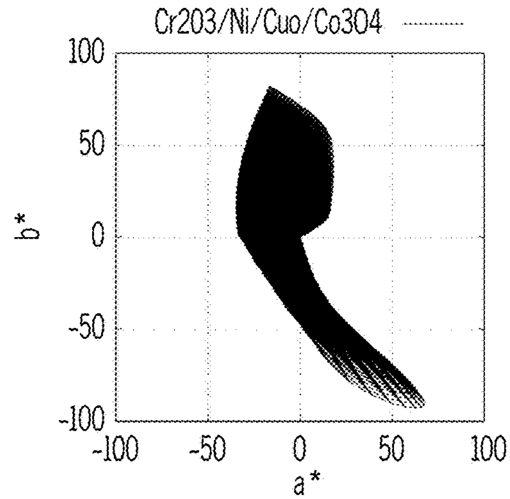
FIG. 30 is a plot of a projected a* vs. b* CIELAB space (x-axis: a*; y-axis: b*) of a colored glass article made from a glass composition according to one or more embodiments described herein.
Figure 31:
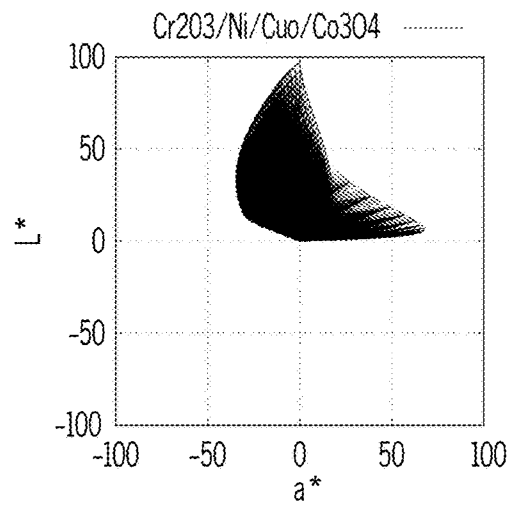
FIG. 31 is a plot of a projected a* vs. L* CIELAB space (x-axis: a*; y-axis: L*) of the colored glass article of FIG. 30.
Figure 32:
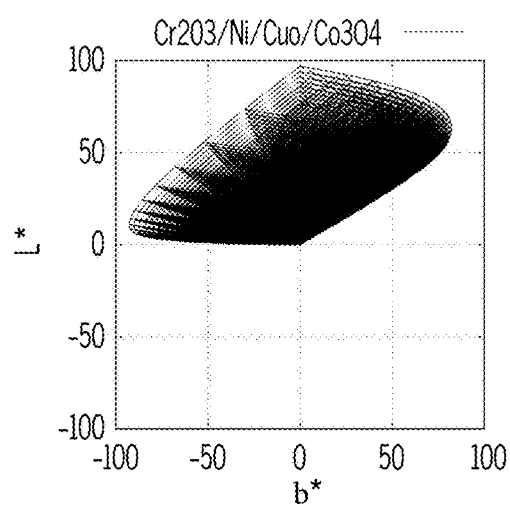
FIG. 32 is a plot of a projected b* vs. L* CIELAB space (x-axis: b*; y-axis: L*) of the colored glass article of FIG. 30.

Referring now to FIGS. 30-32, a projected color gamut for a glass composition including $Cr_2O_3$, NiO, CuO, and $Co_3O_4$ as colorants is shown. As illustrated, four colorants create an overlapping volume in the CIELAB color space. The $Cr_2O_3$/NiO/CuO/$Co_3O_4$ color gamut projects that a colored glass article having greater than or equal to 0 mol % and less than or equal to 2 mol % $Cr_2O_3$, greater than or equal to 0 mol % and less than or equal to 4 mol % NiO, greater than or equal to 0 mol % and less than or equal to 20 mol % CuO, and greater than or equal to 0 mol % and less than or equal to 2 mol % $Co_3O_4$ may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −35 and less than or equal to 60, and b* greater than or equal to −90 and less than or equal to 80.

Tables 15 and 16 show example glass compositions (in terms of mol %) containing Ag as a colorant.

TABLE 15

| Example (mol %) | Ag-1 | Ag-2 | Ag-3 | Ag-4 | Ag-5 | Ag-6 | Ag-7 | Ag-8 | Ag-9 | Ag-10 | Ag-11 | Ag-12 | Ag-13 | Ag-14 | Ag-15 |
|---|---|---|---|---|---|---|---|---|---|---|---|---|---|---|---|
| $SiO_2$ | 59.55 | 60.05 | 60.55 | 60.00 | 59.95 | 59.90 | 60.10 | 60.00 | 59.85 | 60.16 | 60.09 | 59.79 | 59.47 | 59.45 | 57.55 |
| $Al_2O_3$ | 16.50 | 16.50 | 16.50 | 16.50 | 16.50 | 16.50 | 16.50 | 16.50 | 16.50 | 15.90 | 15.93 | 15.89 | 15.82 | 16.50 | 16.50 |
| $B_2O_3$ | 6.00 | 6.00 | 6.00 | 6.00 | 6.00 | 6.00 | 6.00 | 6.00 | 6.00 | 6.08 | 6.06 | 6.04 | 5.99 | 6.00 | 6.00 |
| $Li_2O$ | 12.00 | 12.00 | 12.00 | 12.00 | 12.00 | 12.00 | 12.00 | 12.00 | 12.00 | 11.99 | 11.97 | 11.97 | 11.92 | 12.00 | 12.00 |
| $Na_2O$ | 5.70 | 5.20 | 4.70 | 5.20 | 5.20 | 5.20 | 5.20 | 5.20 | 5.20 | 5.41 | 5.41 | 5.89 | 6.37 | 5.50 | 6.50 |
| $K_2O$ | — | — | — | — | — | — | — | — | — | 0.20 | 0.20 | 0.20 | 0.19 | 0.20 | 0.20 |
| $SnO_2$ | 0.10 | 0.10 | 0.10 | 0.10 | 0.10 | 0.10 | 0.10 | 0.10 | 0.10 | 0.11 | 0.11 | 0.11 | 0.10 | 0.20 | 0.10 |
| Ag | 0.15 | 0.15 | 0.15 | 0.15 | 0.15 | 0.15 | 0.10 | 0.10 | 0.25 | 0.15 | 0.25 | 0.12 | 0.13 | 0.15 | 0.15 |
| $CeO_2$ | — | — | — | 0.05 | 0.10 | 0.15 | — | 0.10 | 0.10 | — | — | — | — | — | — |
| $Nd_2O_3$ | — | — | — | — | — | — | — | — | — | — | — | — | — | — | 1.00 |
| $Er_2O_3$ | — | — | — | — | — | — | — | — | — | — | — | — | — | — | — |
| $R_2O$—$Al_2O_3$ | 1.20 | 0.70 | 0.20 | 0.70 | 0.70 | 0.70 | 0.70 | 0.70 | 0.70 | 1.70 | 1.64 | 2.16 | 2.66 | 1.20 | 2.20 |

TABLE 16

| Example (mol %) | Ag-16 | Ag-17 | Ag-18 | Ag-19 | Ag-20 | Ag-21 | Ag-22 | Ag-23 | Ag-24 | Ag-25 | Ag-26 | Ag-27 | Ag-28 | Ag-29 |
|---|---|---|---|---|---|---|---|---|---|---|---|---|---|---|
| $SiO_2$ | 57.55 | 59.1 | 59.05 | 59.41 | 59.31 | 59.36 | 59.26 | 58.91 | 58.81 | 59.41 | 59.01 | 58.55 | 58.7 | 59.7 |
| $Al_2O_3$ | 16.50 | 16.00 | 16.00 | 15.97 | 15.97 | 15.97 | 15.97 | 15.97 | 15.97 | 15.97 | 15.89 | 16.5 | 16.4 | 16.5 |
| $B_2O_3$ | 6.00 | 6.00 | 6.00 | 6.00 | 6.00 | 6.00 | 6.00 | 6.00 | 6.00 | 6.00 | 6.00 | 6 | 6 | 6 |
| $Li_2O$ | 12.00 | 12.00 | 12.00 | 12.00 | 12.00 | 12.00 | 12.00 | 12.00 | 12.00 | 12.00 | 12.00 | 12 | 12 | 12 |
| $Na_2O$ | 6.50 | 6.50 | 6.50 | 6.17 | 6.17 | 6.17 | 6.17 | 6.67 | 6.67 | 6.17 | 6.65 | 6.5 | 6.5 | 5.5 |
| $K_2O$ | 0.20 | 0.20 | 0.20 | 0.20 | 0.20 | 0.20 | 0.20 | 0.20 | 0.20 | 0.20 | 0.20 | 0.2 | 0.2 | 0.2 |
| $SnO_2$ | 0.10 | 0.10 | 0.10 | 0.10 | 0.20 | 0.10 | 0.20 | 0.10 | 0.20 | 0.10 | 0.10 | 0.1 | 0.1 | 0.1 |
| Ag | 0.15 | 0.10 | 0.15 | 0.15 | 0.15 | 0.20 | 0.20 | 0.15 | 0.15 | 0.15 | 0.15 | 0.15 | 0.15 | 0.15 |
| $CeO_2$ | — | — | — | — | — | — | — | — | — | — | — | — | — | |

TABLE 16-continued

| Example (mol %) | Ag-16 | Ag-17 | Ag-18 | Ag-19 | Ag-20 | Ag-21 | Ag-22 | Ag-23 | Ag-24 | Ag-25 | Ag-26 | Ag-27 | Ag-28 | Ag-29 |
|---|---|---|---|---|---|---|---|---|---|---|---|---|---|---|
| $Nd_2O_3$ | — | — | — | — | — | — | — | — | — | — | — | — | — | |
| $Er_2O_3$ | 1.00 | — | — | — | — | — | — | — | — | — | — | — | — | |
| $R_2O—Al_2O_3$ | 2.20 | 2.70 | 2.70 | 2.40 | 2.40 | 2.40 | 2.40 | 2.90 | 2.90 | 2.40 | 2.96 | 2.2 | 2.3 | 1.2 |

The exemplary glass compositions of Tables 15 and 16 were used to produce glass coupons. These glass coupons were inserted into pre-heated, ambient-air electric ovens, held for a desired amount of time, and cooled in air to produce colored glass coupons. It should be noted that some glasses were heated at a particular ramp rate and/or cooled at a controlled rate; however, it was determined that neither the ramp rate nor cooling rate affected color generation.

Figure 33A:
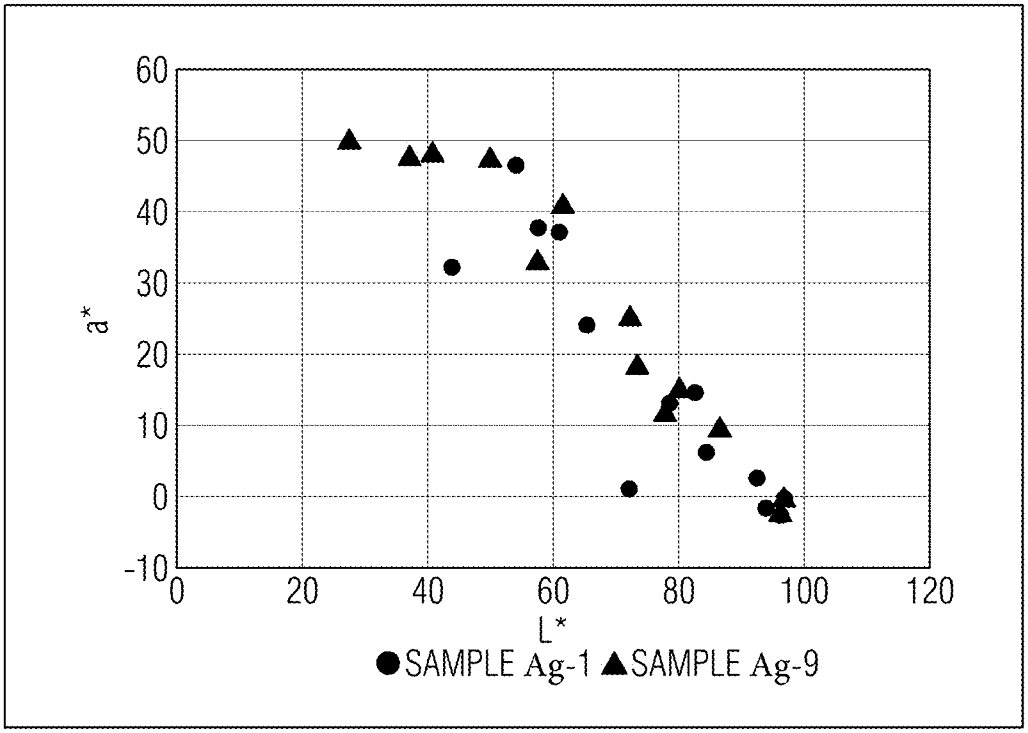
FIG. 33A graphically depicts a plot of projected a* vs. L* CIELAB spaces (y-axis: a*; x-axis: L*) of colored glass articles according to one or more embodiments of the present disclosure.
Figure 33B:
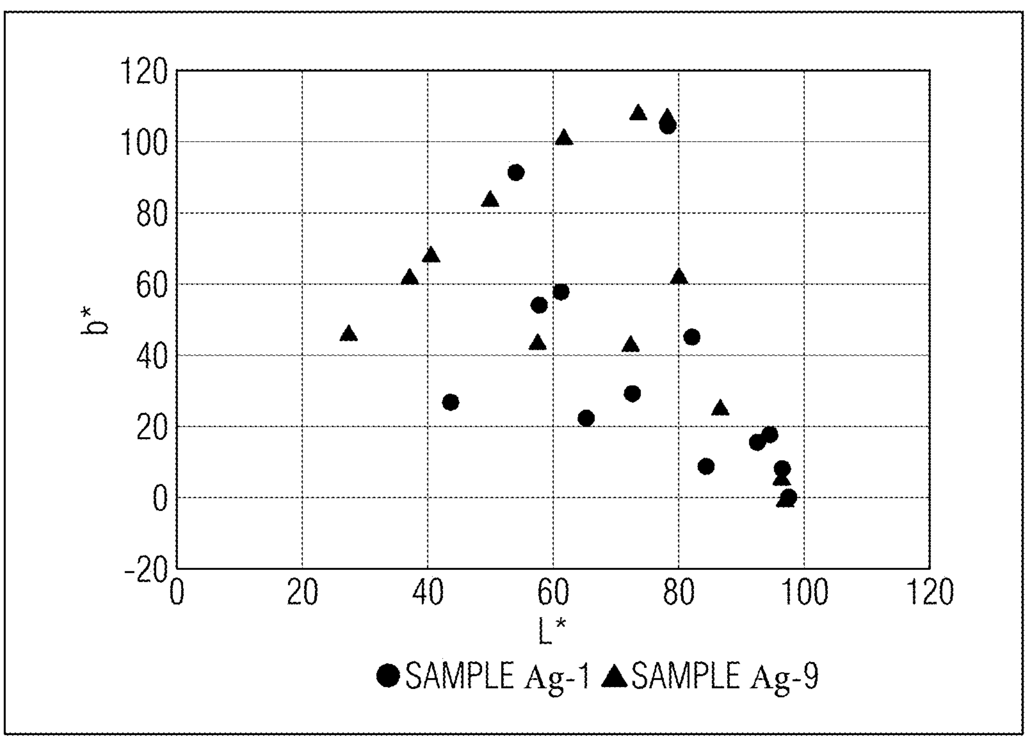
FIG. 33B graphically depicts a plot of projected b* vs. L* CIELAB spaces (y-axis: b*; x-axis: L*) of colored glass articles according to one or more embodiments of the present disclosure.
Figure 33C:
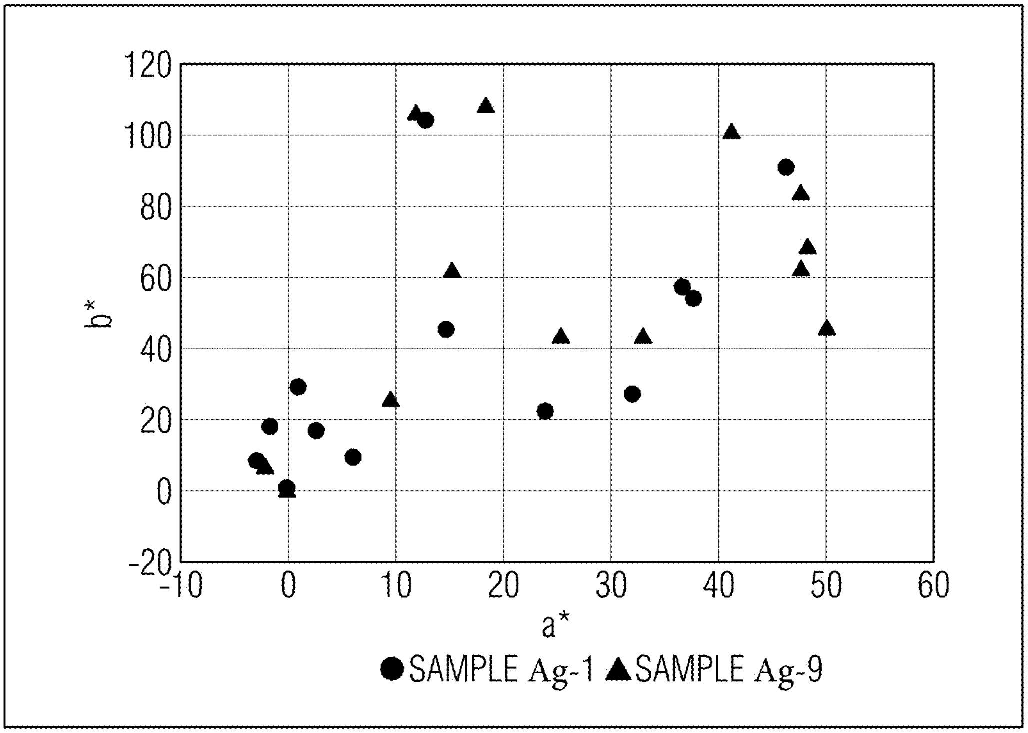
FIG. 33C graphically depicts a plot of projected a* vs. b* CIELAB spaces (y-axis: b*; x-axis: a*) of colored glass articles according to one or more embodiments of the present disclosure.

Plots of CIELAB spaces of colored glass coupons produced from Examples Ag-1 and Ag-9 are depicted in FIG. 33A (a* vs. L*), FIG. 33B (b* vs. L*), and FIG. 33C (a* vs. b*). Sample sets having thicknesses of 0.6 mm, 1.33 mm, and 2.06 mm were made from each composition and the samples were heat treated at various heat treatment times (575° C., 600° C., 625° C.), 650° ° C. and various heat treatment times (1 hour, 2 hours) to produce colored glass articles having the CIELAB L*, a*, b* values indicated in FIGS. 33A-33C.

Figure 34A:
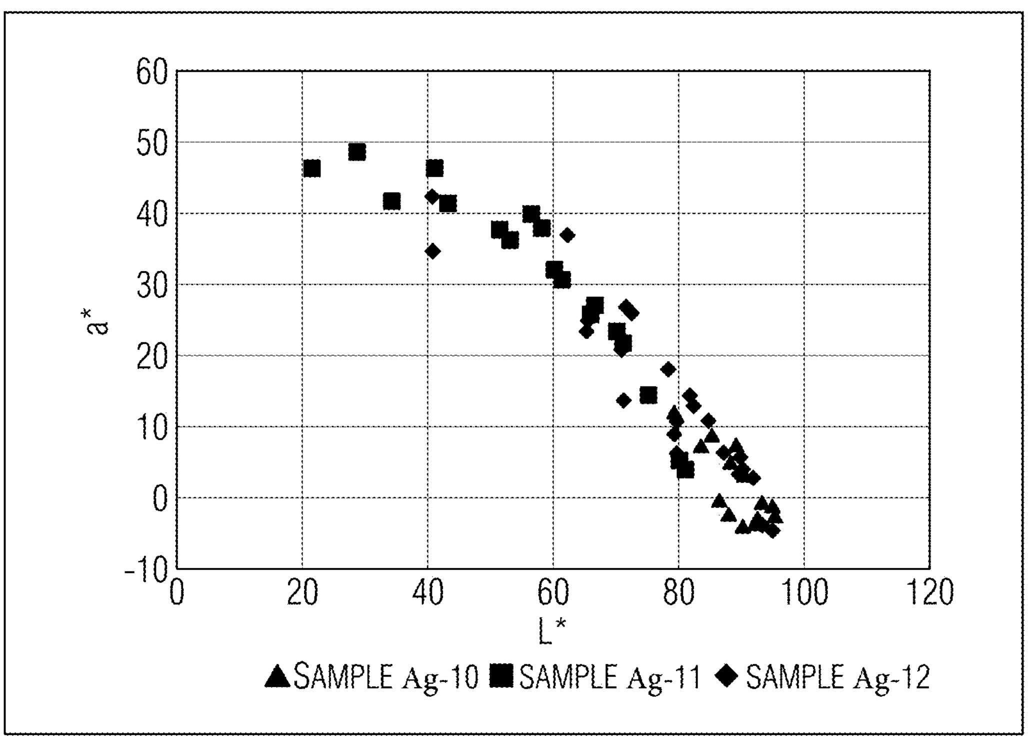
FIG. 34A graphically depicts a plot of projected a* vs. L* CIELAB spaces (y-axis: a*; x-axis: L*) of colored glass articles according to one or more embodiments of the present disclosure.
Figure 34B:
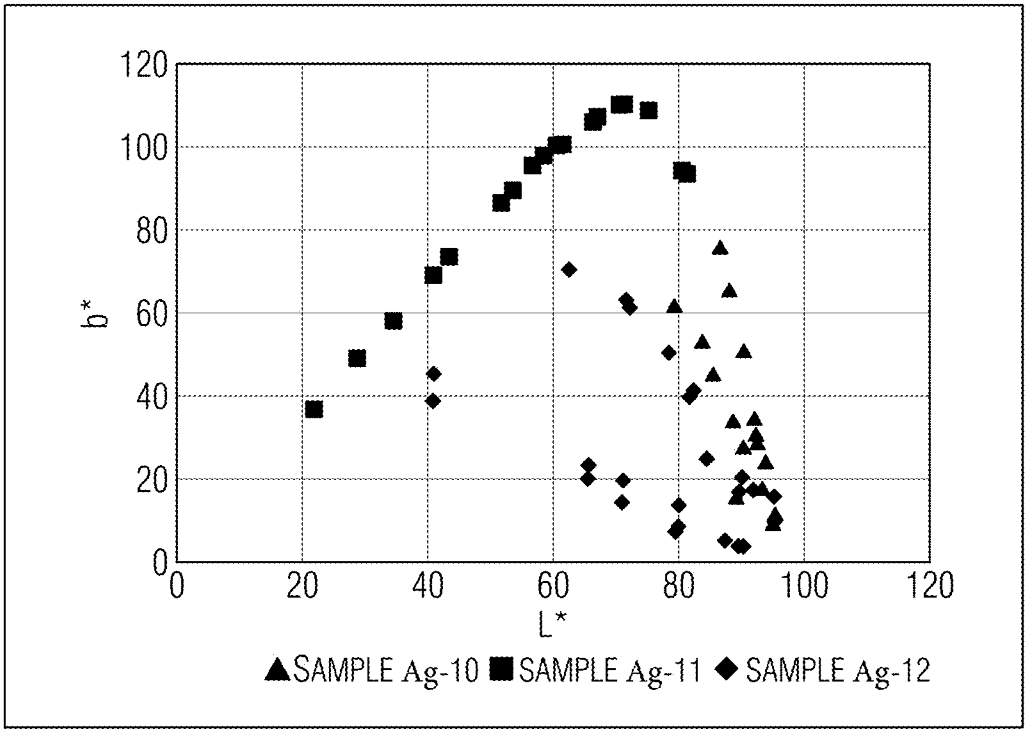
FIG. 34B graphically depicts a plot of projected b* vs. L* CIELAB spaces (y-axis: b*; x-axis: L*) of colored glass articles according to one or more embodiments of the present disclosure.
Figure 34C:
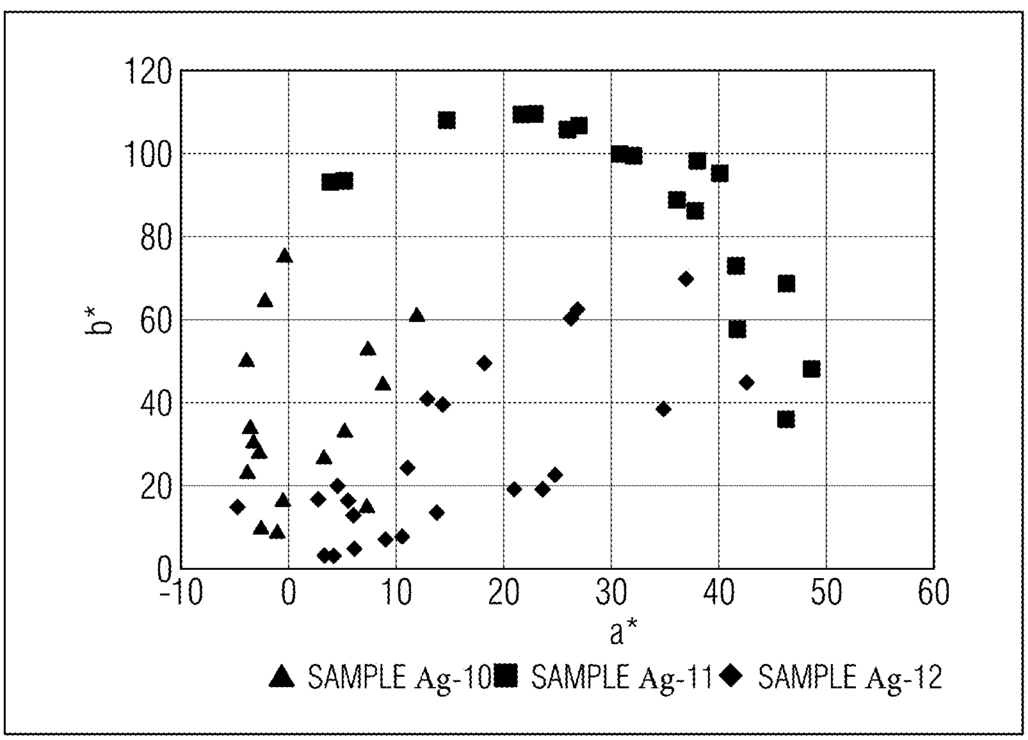
FIG. 34C graphically depicts a plot of projected a* vs. b* CIELAB spaces (y-axis: b*; x-axis: a*) of colored glass articles according to one or more embodiments of the present disclosure.

Plots of projected CIELAB spaces of colored glass coupons produced from Examples Ag-10-Ag-12 are depicted in FIG. 34A (a* vs. L*), FIG. 34B (b* vs. L*), and FIG. 34C (a* vs. b*). Sample sets having thicknesses of 0.6 mm, 1.33 mm, and 2.06 mm were made from each composition and the samples were heat treated at various heat treatment times (575° C., 600° C., 625° C., 650° C.) and various heat treatment times (1 hour, 2 hours) to produce colored glass articles having the CIELAB L*, a*, b* values indicated in FIGS. 34A-34C.

Figure 35:
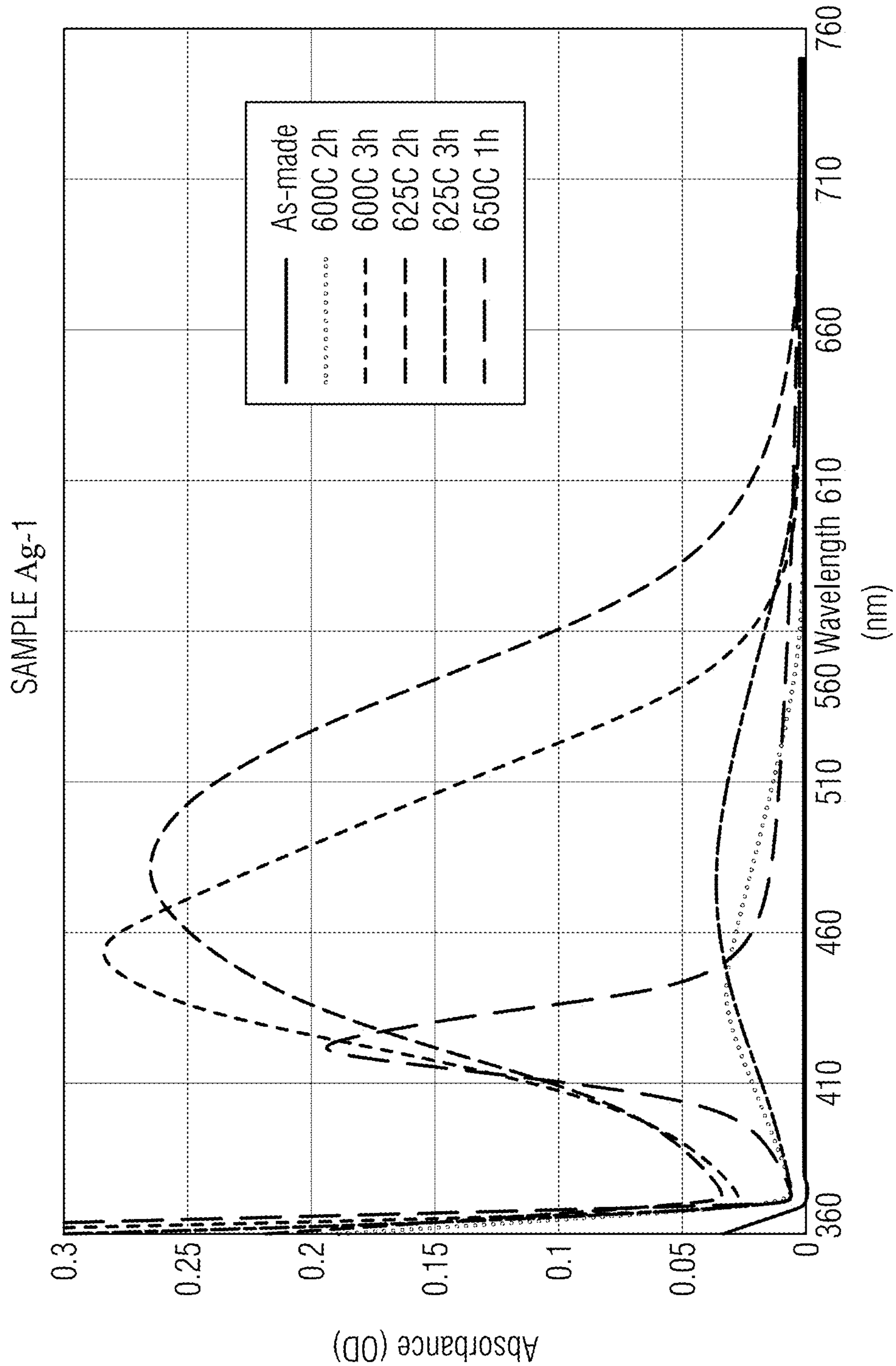
FIG. 35 graphically depicts absorbance spectra (y-axis) as a function of wavelength (x-axis) of colored glass articles according to one or more embodiments of the present disclosure.
Figure 36:
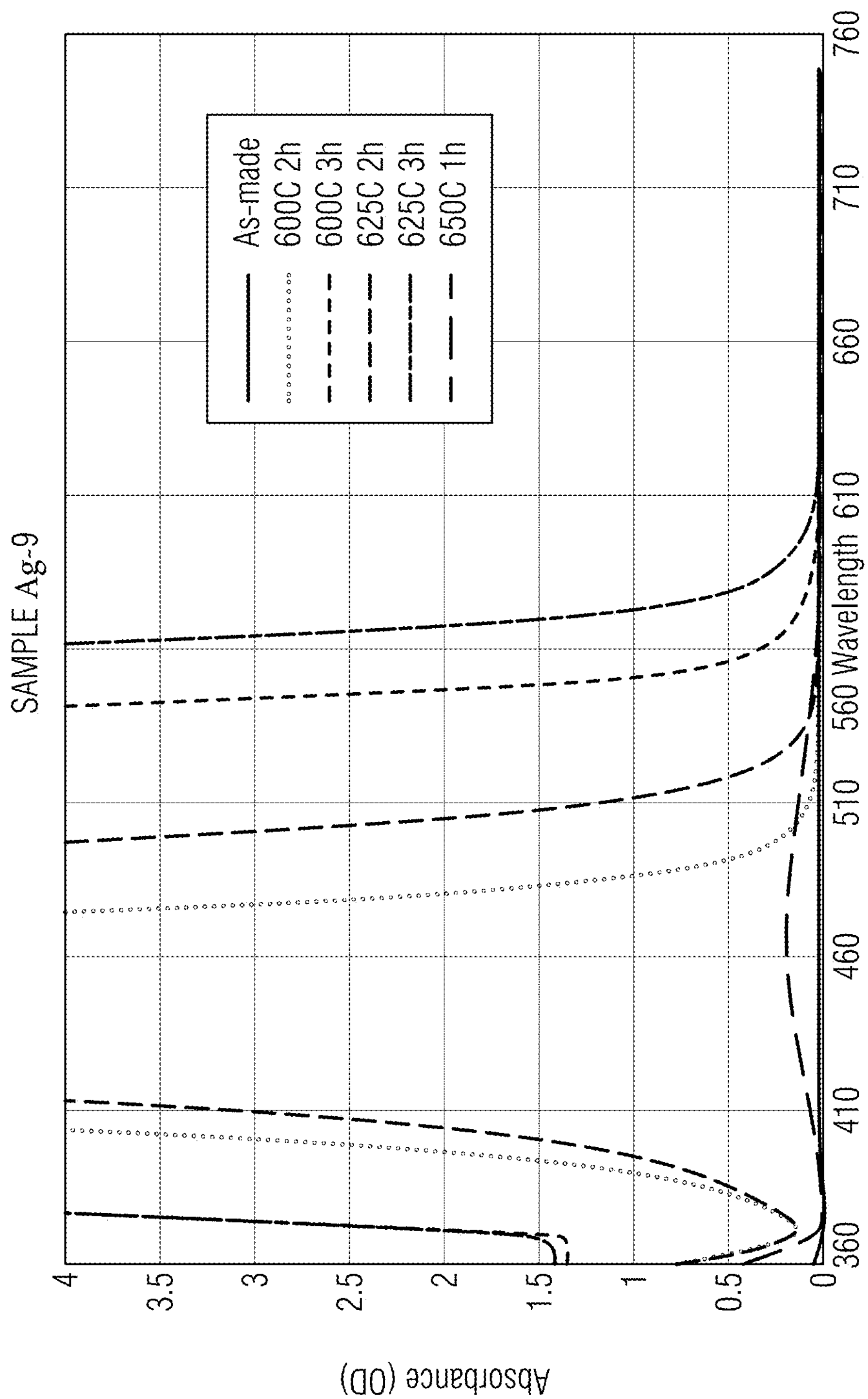
FIG. 36 graphically depicts absorbance spectra (y-axis) as a function of wavelength (x-axis) of colored glass articles according to one or more embodiments of the present disclosure.

FIGS. 35 and 36 depict the absorbance spectra (determined from the transmittance spectra T where the absorbance $A=\log_{10}(1/T)$) of colored glass coupons produced from Examples Ag-1 and Ag-9, respectively. Specifically, the absorbance spectra of glass coupons formed from the compositions of Examples Ag-1 and Ag-9 were collected from coupons in: as-made condition (no heat treatment); after exposure to a heat treatment of 600° C. for 2 hours; after exposure to a heat treatment of 600° ° C. for 3 hours; after exposure to a heat treatment of 625° C. for 2 hours; after exposure to a heat treatment of 625° C. for 3 hours; and after exposure to a heat treatment of 650° C. for 3 hours. As shown in FIGS. 35 and 36, the absorbance spectra varied considerably with changes in heat treatment temperature and heat treatment time.

Figure 37:
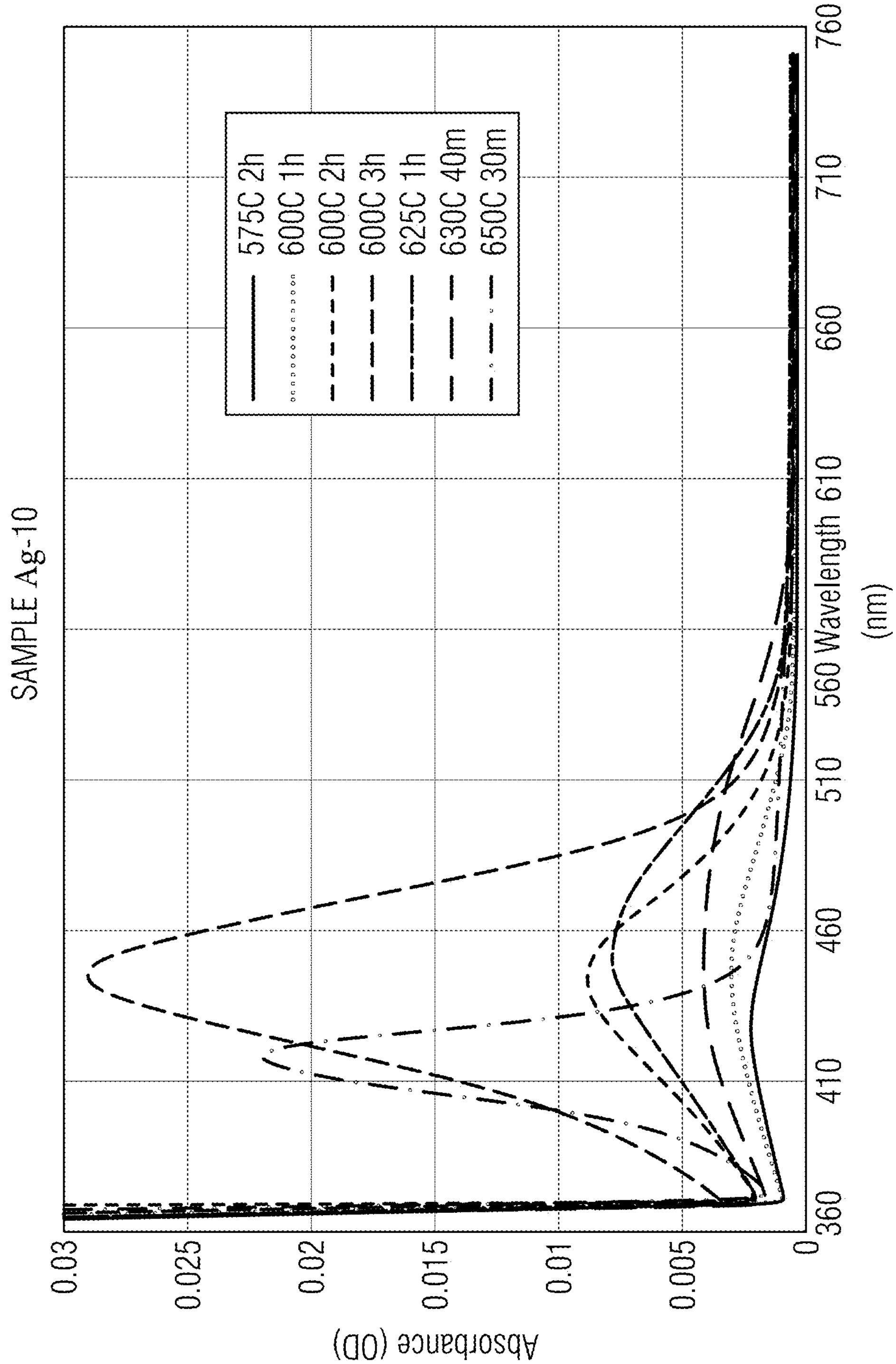
FIG. 37 graphically depicts absorbance spectra (y-axis) as a function of wavelength (x-axis) of colored glass articles according to one or more embodiments of the present disclosure.
Figure 38:
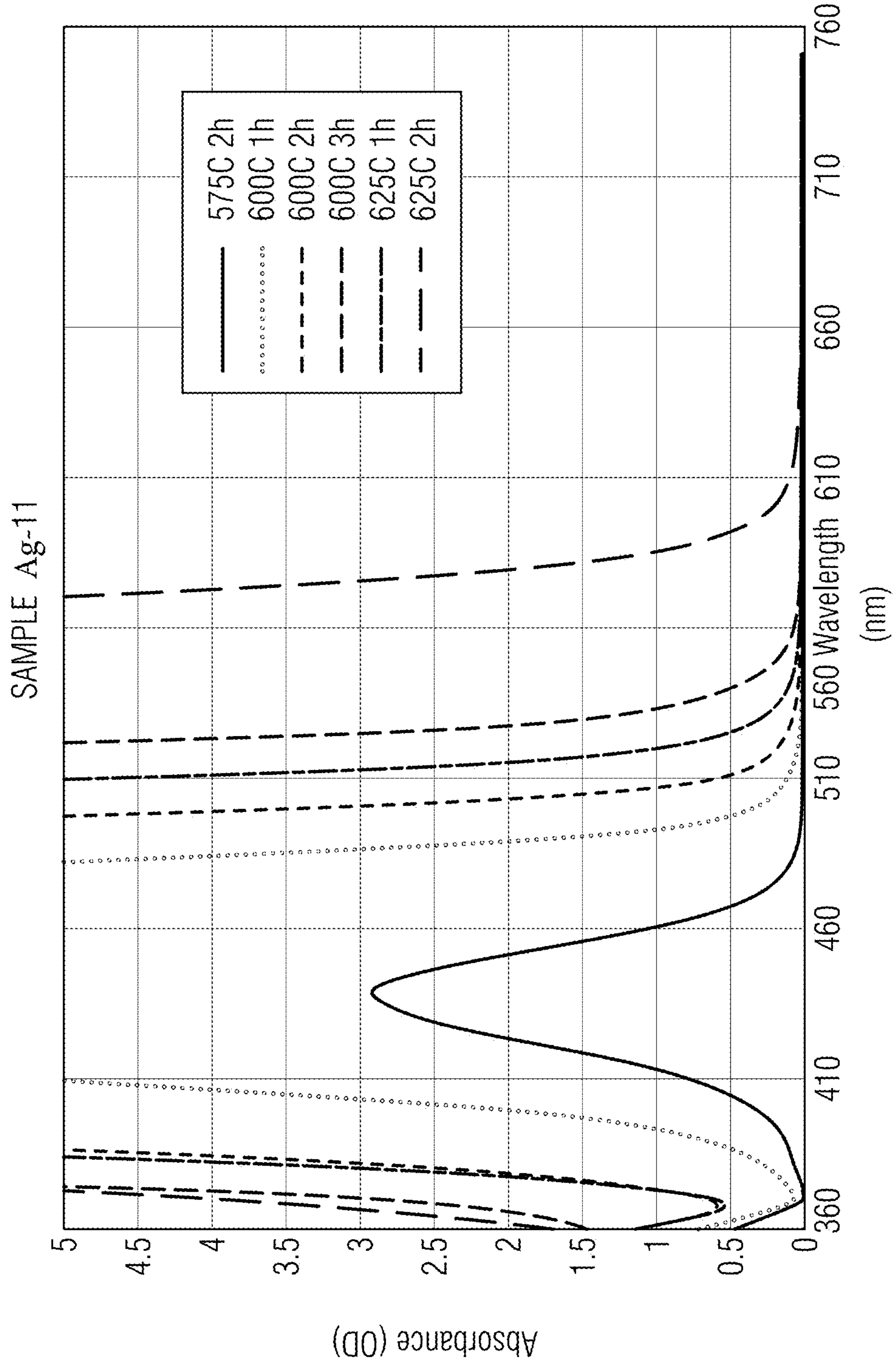
FIG. 38 graphically depicts absorbance spectra (y-axis) as a function of wavelength (x-axis) of colored glass articles according to one or more embodiments of the present disclosure.
Figure 39:
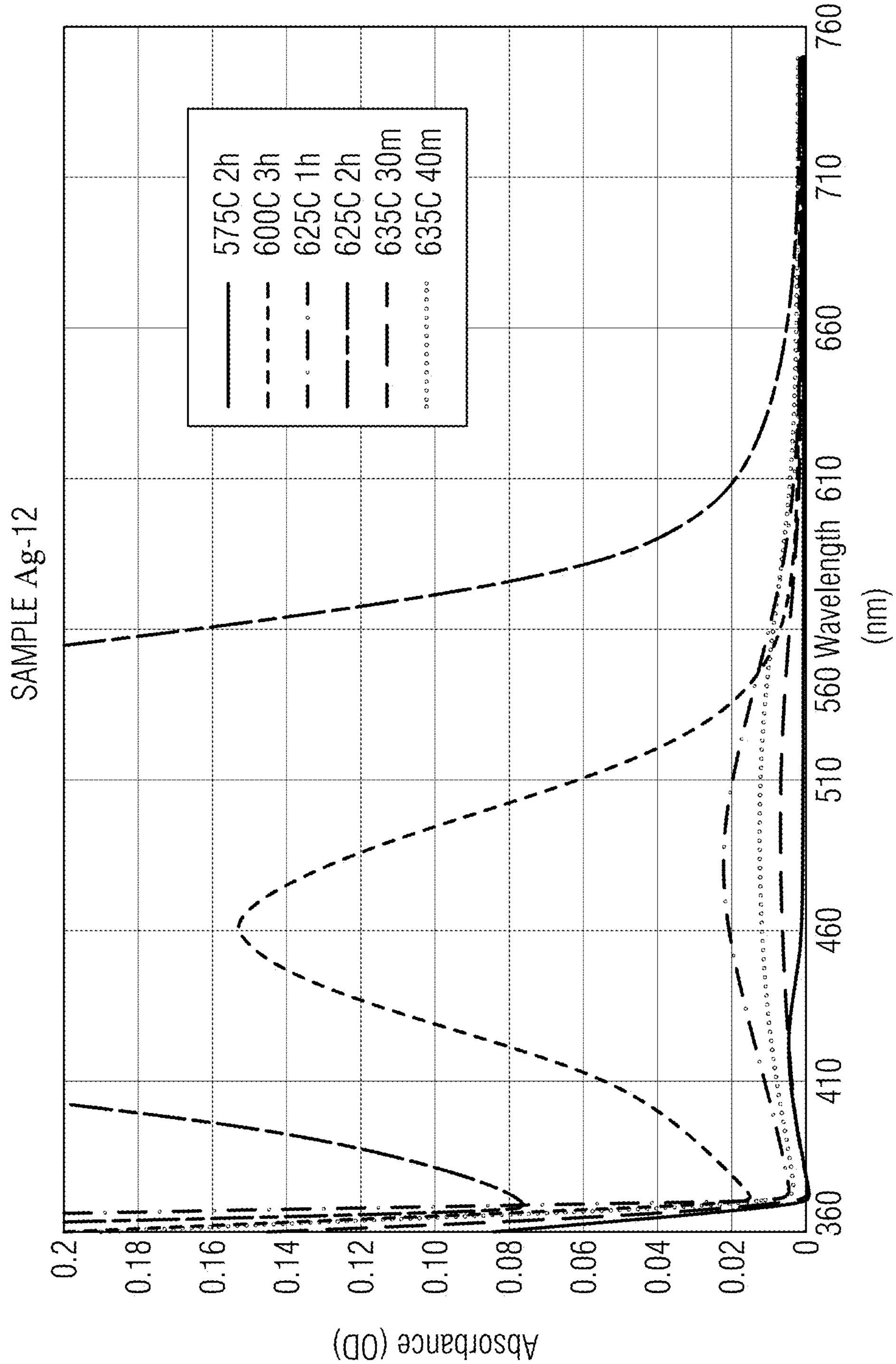
FIG. 39 graphically depicts absorbance (y-axis) as a function of wavelength (x-axis) spectra of colored glass articles according to one or more embodiments of the present disclosure.

FIGS. 37, 38 and 39 depict the absorbance spectra of colored glass coupons produced from Examples Ag-10-Ag-12, respectively. Specifically, the absorbance spectra of glass coupons formed from the compositions of examples Ag-10-Ag-12 were collected from coupons in: after exposure to a heat treatment of 575° C. for 2 hours; after exposure to a heat treatment of 600° C. for 1 hours; after exposure to a heat treatment of 600° C. for 2 hours; after exposure to a heat treatment of 600° C. for 3 hours; after exposure to a heat treatment of 625° C. for 1 hour; after exposure to a heat treatment of 630° ° C. for 4 hours; and after exposure to a heat treatment of 650° C. for 0.5 hour. As shown in FIGS. 37-39, the absorbance spectra varied considerably with changes in heat treatment temperature and heat treatment time.

Figure 40A:
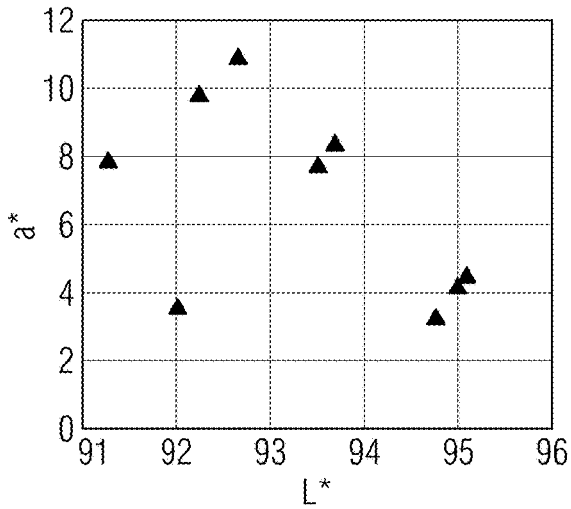
FIG. 40A graphically depicts a plot of a projected a* vs. L* CIELAB space (y-axis: a*; x-axis: L*) of a colored glass article according to one or more embodiments of the present disclosure.
Figure 40B:
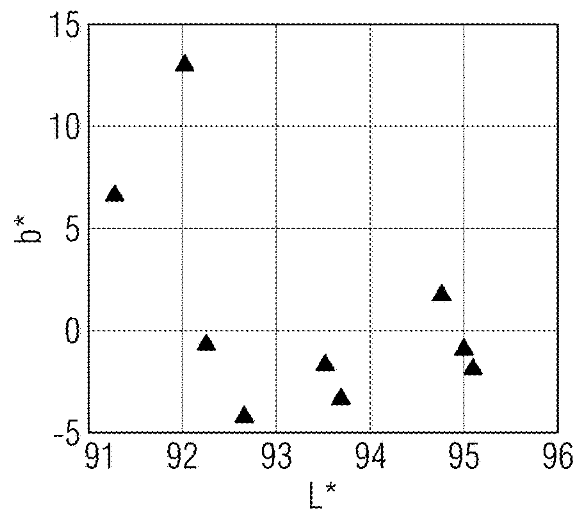
FIG. 40B graphically depicts a plot of a projected b* vs. L* CIELAB space (y-axis: b*; x-axis: L*) of a colored glass article according to one or more embodiments of the present disclosure.
Figure 40C:
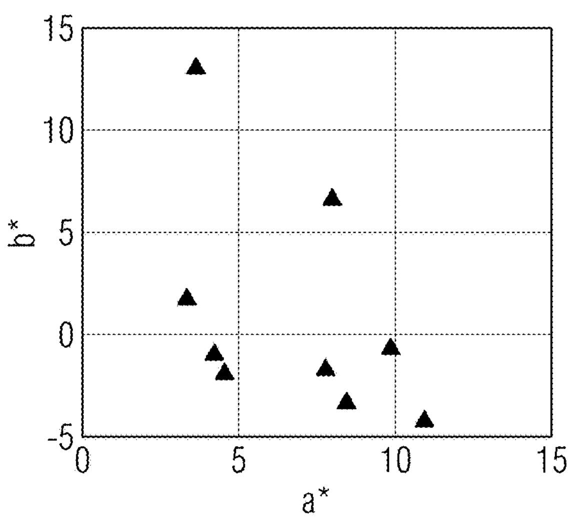
FIG. 40C graphically depicts a plot of a projected a* vs. b* CIELAB space (y-axis: b*; x-axis: a*) of a colored glass article according to one or more embodiments of the present disclosure.
Figure 41:
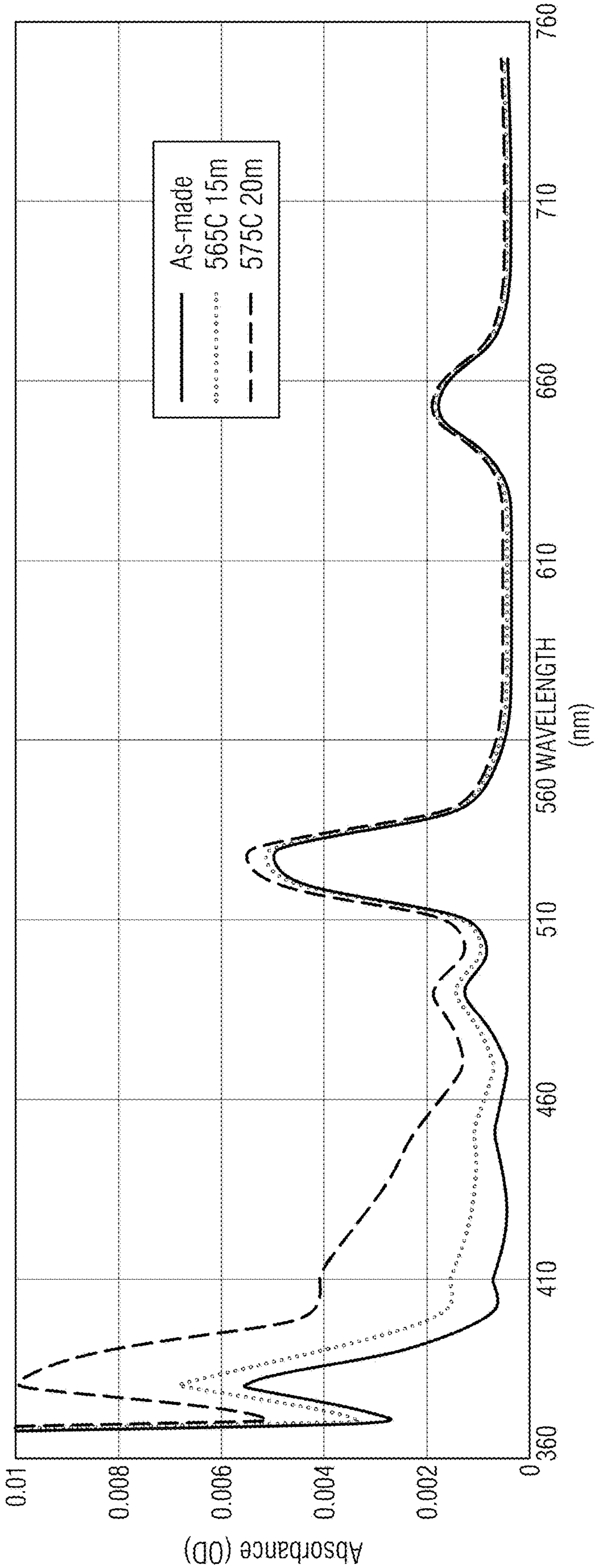
FIG. 41 graphically depicts an absorbance spectra (y-axis) as a function of wavelength (x-axis) of colored glass articles according to one or more embodiments of the present disclosure.

FIGS. 40A-40C are plots of CIELAB spaces of colored glass coupons produced from Example Ag-16 containing erbium. Specifically FIG. 40A is a plot of a* vs. L*, FIG. 40B is a plot b* vs. L*, and FIG. 40C is a plot of a* vs. b*. Sample sets having thicknesses of ~0.6 mm, ~1.33 mm, and ~2.06 mm were made from the composition and heat treated at various heat treatment temperatures and various heat treatment times (as indicated in Table 17) to produce colored glass articles having the CIELAB L*, a*, b* values indicated in FIGS. 40A-40C. The CIELAB space plots indicate that an entirely new range of colors can be achieved by adding erbium to the composition. FIG. 41 depicts the absorbance spectra of example Ag-16 in as-made condition (prior to heat treatment); after heat treatment at 565° C. for 15 minutes; and after heat treatment at 575° C. after 20 minutes.

TABLE 17

| Example | Heat Treatment (Temp (° C.)/Time (minutes)/Ramp Rate (° C./min)) | Thickness (mm) | L* | a* | b* |
|---|---|---|---|---|---|
| Ag-16 | as made | 0.60 | 95.09 | 4.58 | −1.73 |
| Ag-16 | 575/20/10 | 0.57 | 94.76 | 3.32 | 1.91 |
| Ag-16 | 565/15/10 | 0.60 | 95 | 4.26 | −0.83 |
| Ag-16 | as made | 1.34 | 93.7 | 8.44 | −3.23 |
| Ag-16 | 575/20/10 | 1.32 | 92.03 | 3.62 | 13.15 |
| Ag-16 | 565/15/10 | 1.32 | 93.51 | 7.83 | −1.61 |
| Ag-16 | as made | 2.06 | 92.66 | 10.98 | −4.12 |
| Ag-16 | 575/20/10 | 2.03 | 91.28 | 7.96 | 6.77 |
| Ag-16 | 565/15/10 | 2.04 | 92.25 | 9.9 | −0.62 |

Figure 42A:
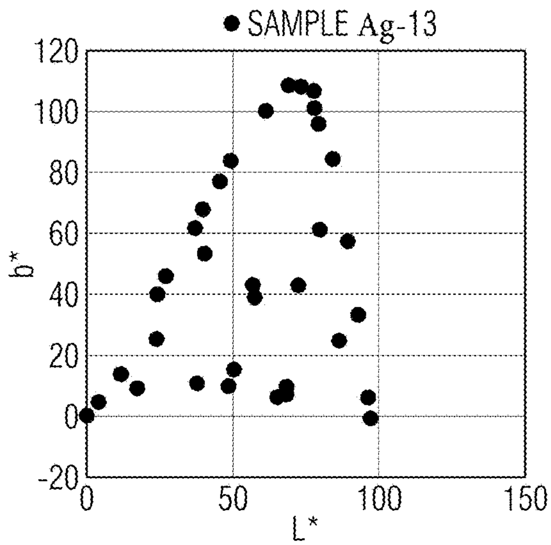
FIG. 42A graphically depicts a plot of a projected b* vs. L* CIELAB space (y-axis: b*; x-axis: L*) of a colored glass article according to one or more embodiments of the present disclosure.
Figure 42B:
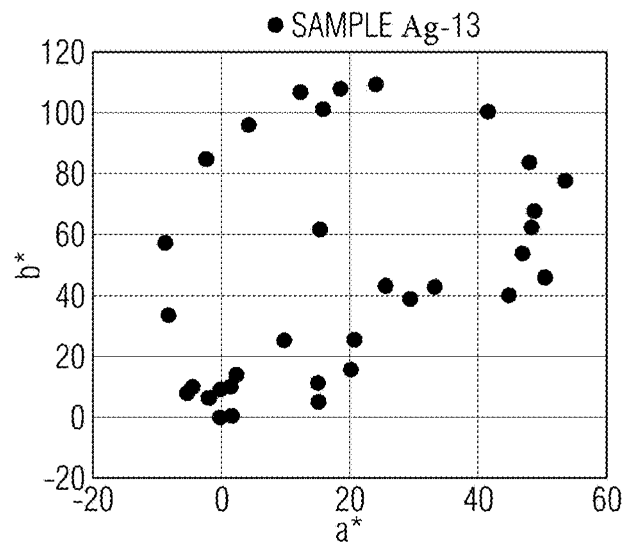
FIG. 42B graphically depicts a plot of a projected a* vs. b* CIELAB space (y-axis: b*; x-axis: a*) of a colored glass article according to one or more embodiments of the present disclosure.
Figure 42C:
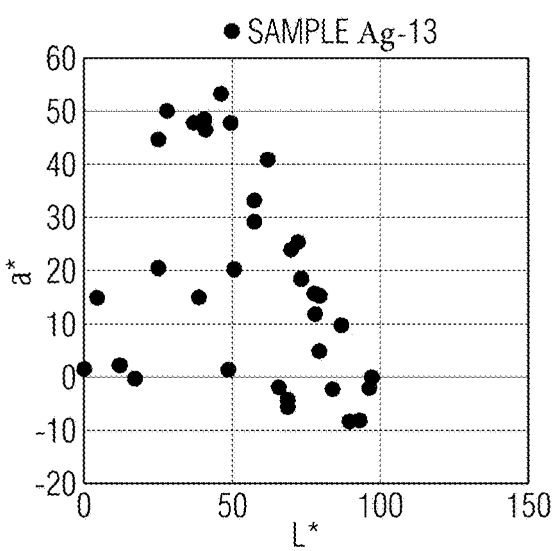
FIG. 42C graphically depicts a plot of a projected a* vs. L* CIELAB space (y-axis: a*; x-axis: L*) of a colored glass article according to one or more embodiments of the present disclosure.

FIGS. 42A-42C are plots of CIELAB spaces of colored glass coupons produced from Example Ag-13. In particular, coupons of glass formed from the composition of Example Ag-13 includes $R_2O—Al_2O_3$ values in the range between 2.5 and 3 mol %, specifically 2.66 mol %. The samples were heat treated at various heat treatment temperatures and heat treatment times to produce colored glass articles having a range of colors including green, brown, maroon, purple and pink, as indicated in the CIELAB spaces of FIGS. 42A-42C.

Figure 43:
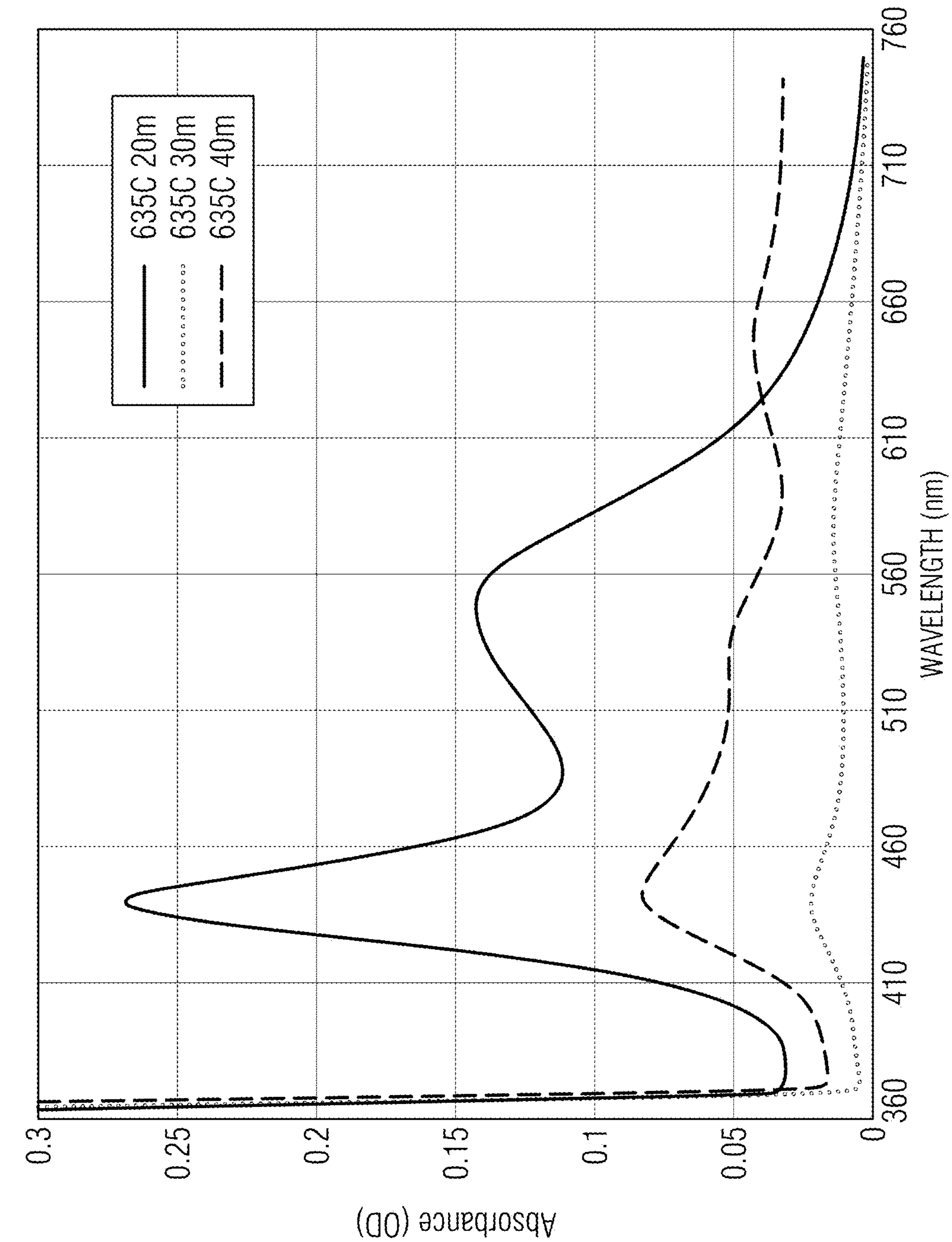
FIG. 43 graphically depicts an absorbance spectra (y-axis) as a function of wavelength (x-axis) of a colored glass article according to one or more embodiments of the present disclosure.
Figure 44C:
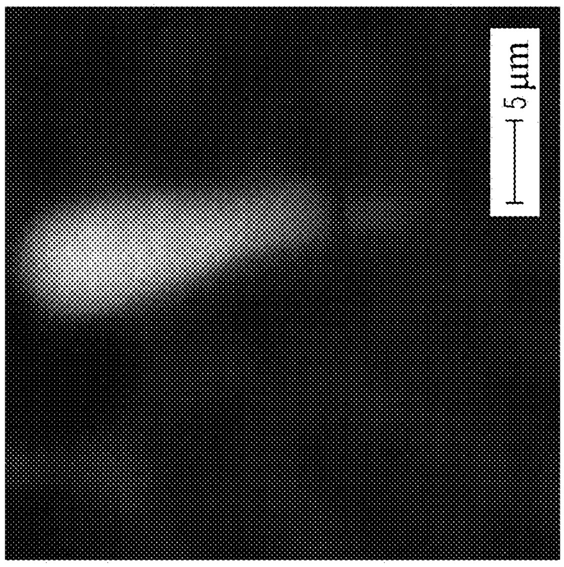
FIG. 44C is a magnified view of a portion of the TEM micrograph of FIG. 44B showing an anisotropic silver particle in a colored glass article according to one or more embodiments of the present disclosure.
Figure 44B:
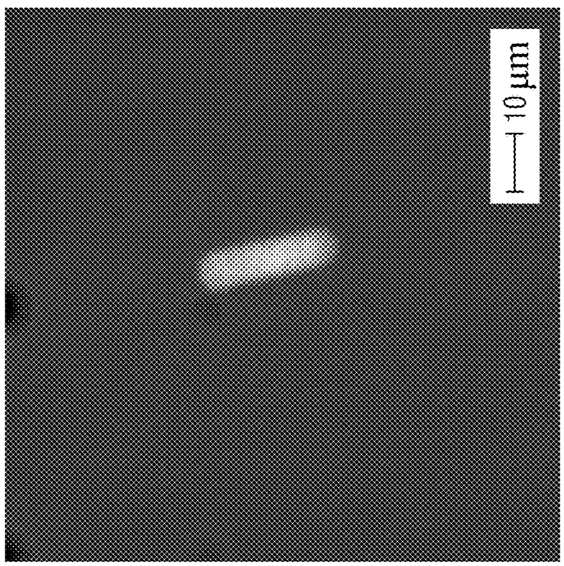
FIG. 44B is a magnified view of a portion of the TEM micrograph of FIG. 44A showing an anisotropic silver particle in a colored glass article according to one or more embodiments of the present disclosure.
Figure 44A:
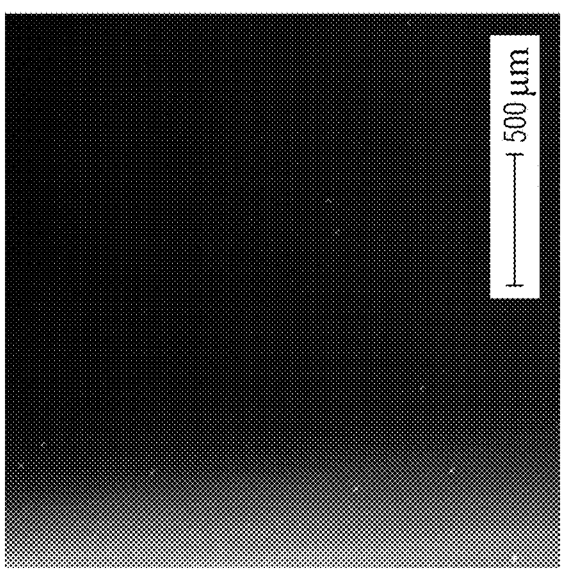
FIG. 44A is a transmission electron microscopy (TEM) micrograph of anisotropic silver particles in a colored glass article according to one or more embodiments of the present disclosure.

FIG. 43 is the absorbance spectra of Example Ag-13 for heat treatments at 635° C. for 20 minutes; 635° C. for 30 minutes; and 635° C. for 40 minutes. The heat treatment conditions produced a colored glass article that was green in color. As shown in FIG. 43 the absorbance spectra had two distinct peaks arising from the formation of anisotropic silver particles that support two distinct plasmon resonances. FIGS. 44A-44C are TEM micrographs of the anisotropic silver particles in the green glass formed from Example Ag-13 and show the random orientation of the anisotropic particles (FIG. 44A) and that the silver particles have an aspect ratio greater than 1 (FIGS. 44B and 44C).

As discussed herein, the $R_2O—Al_2O_3$ value of a composition influences both isotropic and anisotropic particle formation during heat treatment and hence the color of the resultant glass. When $R_2O—Al_2O_3<<1$ (i.e., 0.2 mol % or less), virtually no color is formed in the glass upon heat treatment. This is demonstrated by Example Ag-3, which has an $R_2O—Al_2O_3$ value of 0.2 mol %. Irrespective of heat treatment, the glass of Example Ag-3 remained nearly colorless and transparent after heat treatment. However, when the $R_2O—Al_2O_3$ value is increased to 0.7 mol % (as with glasses formed from Example Ag-2) and then to 1.2 mol % (as with glasses formed from Example Ag-1), a progressively broader and more saturated range of colors were produced by heat treatment.

Figure 45:
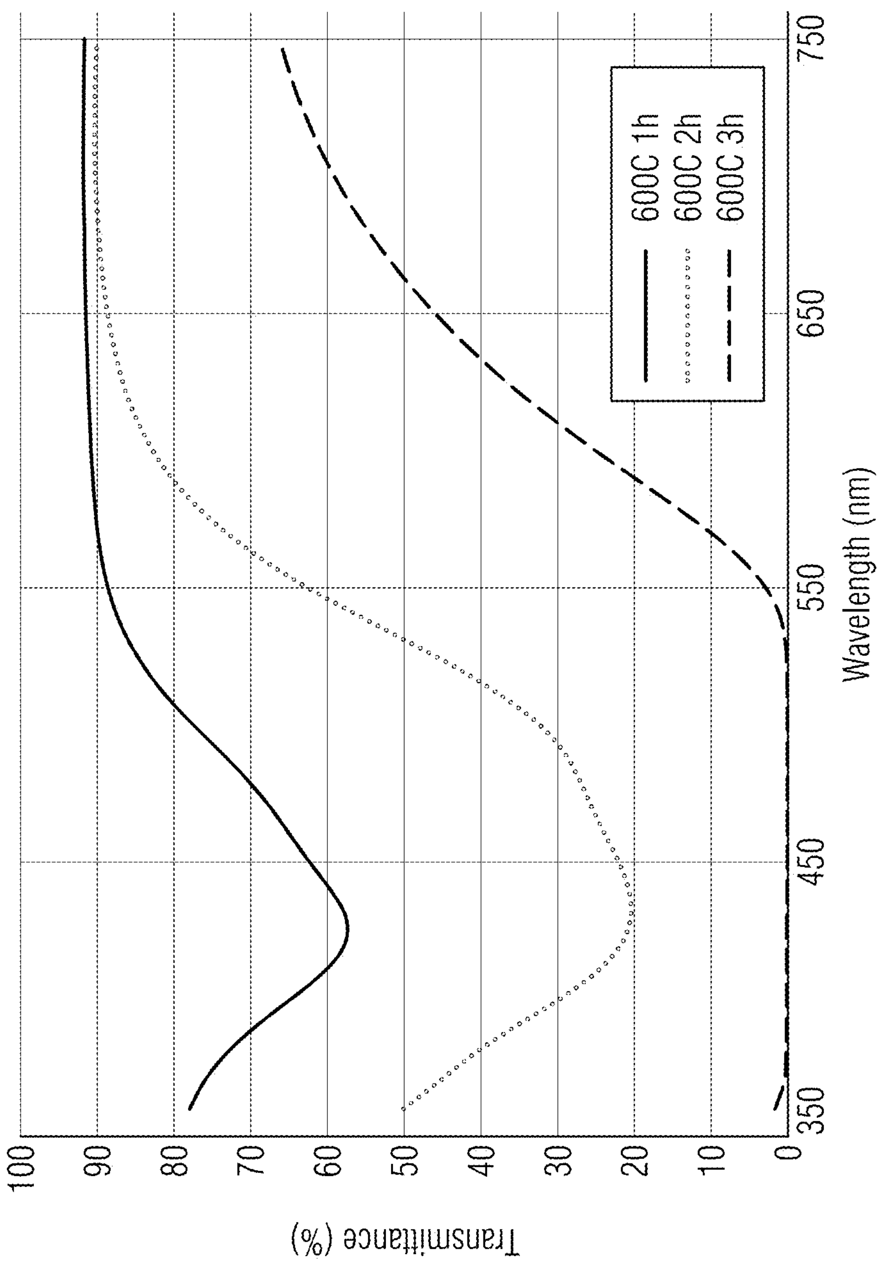
FIG. 45 graphically depicts a transmittance spectra (y-axis) as a function of wavelength (x-axis) of a colored glass article heat treated at the same temperature for different heat treatment times, according to one or more embodiments of the present disclosure.

Referring now to FIG. 45, a transmittance spectrum is shown for 1.3 mm coupons of glass formed from Example Ag-1 and heat treated at the same heat treatment temperature (600° C.) for different heat treatment times (1, 2, or 3 hours). The different heat treatment conditions yielded colored glass articles of different colors (yellow (solid line in FIG. 45), orange (dotted line in FIG. 45), and red (dashed line in FIG. 45), respectively), each of which had different transmittance spectra over the visible light range, as indicated in FIG. 45, with yellow samples being the most transparent and the red samples the least.

Figure 46:
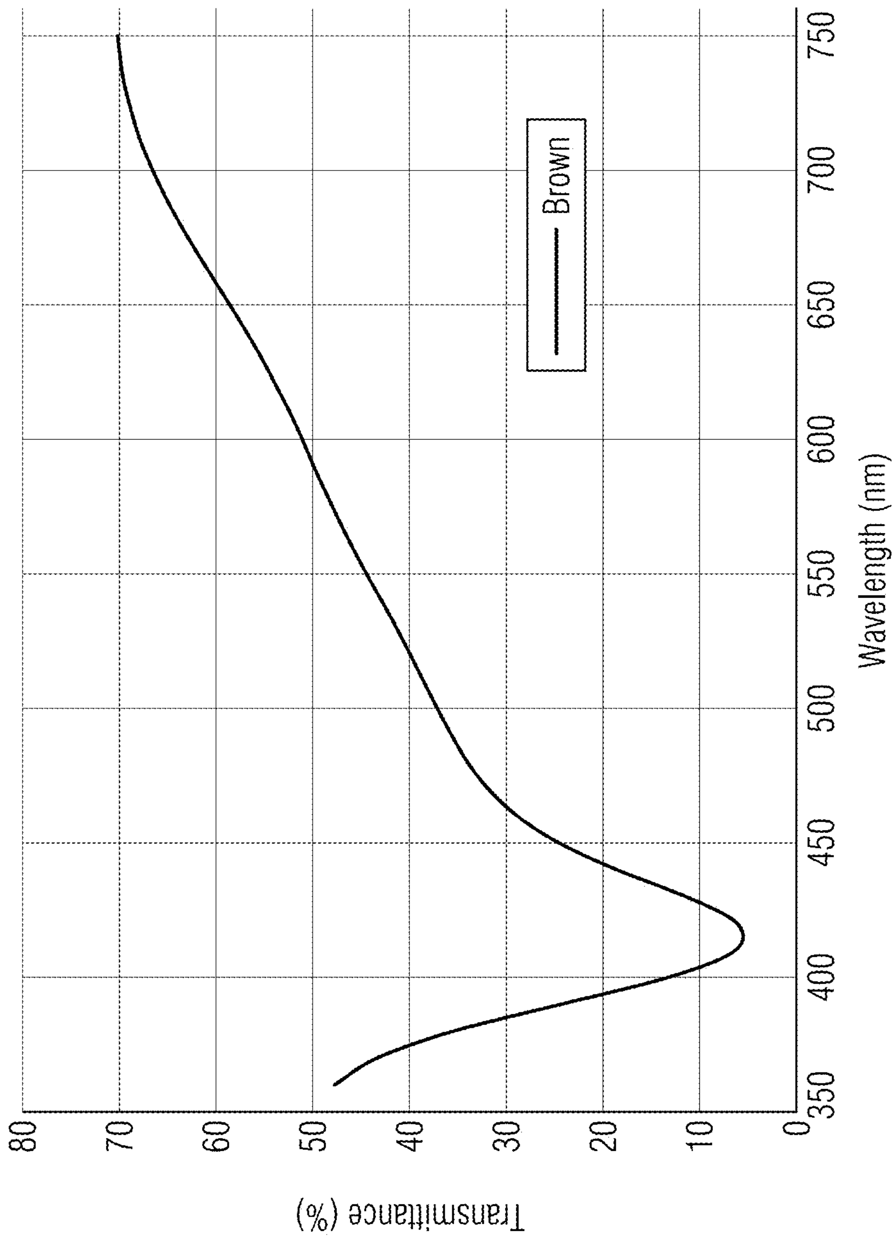
FIG. 46 graphically depicts a transmittance spectra (y-axis) as a function of wavelength (x-axis) of a colored glass article according to one or more embodiments of the present disclosure.

Referring now to FIG. 46, a transmittance spectrum is shown for a 1.3 mm coupon of glass formed from Example Ag-1 and heat treated at a heat treatment temperature of 650° C. for a heat treatment time of 1 hour, producing a colored glass article that was brown in color. As noted herein, colored glass articles that are brown in color can be produced by heat treatment at temperatures between 640° ° C. and 660° C. for heat treatment times between 30 and 90 minutes.

Figure 47:
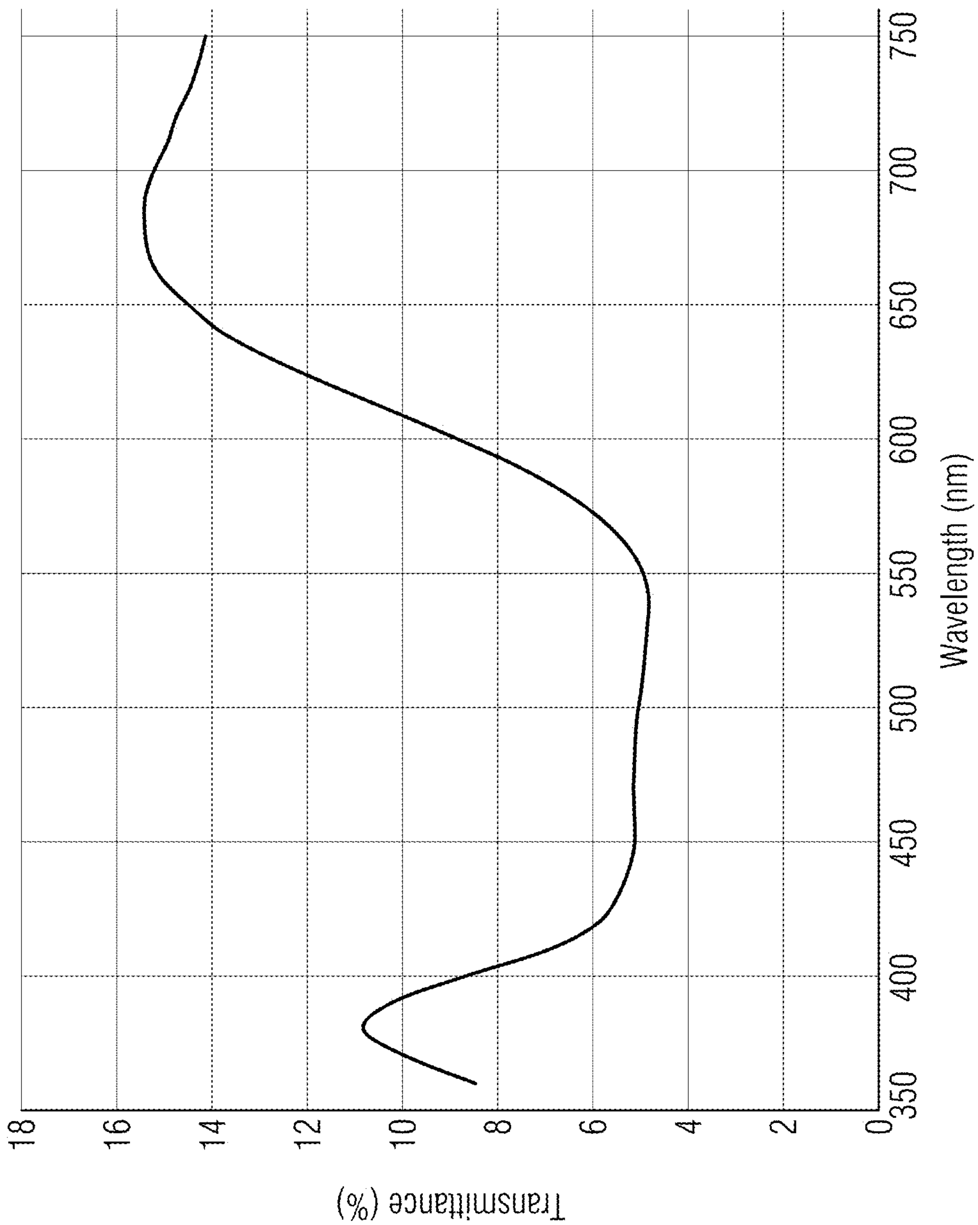
FIG. 47 graphically depicts a transmittance spectra (y-axis) as a function of wavelength (x-axis) of a colored glass article according to one or more embodiments of the present disclosure.

Referring now to FIG. 47, a transmittance spectrum is shown for a 1.3 mm coupon of glass formed from Example Ag-21 and heat treated with an initial heat treatment of 450° C. for 1 our followed by a second heat treatment of 635° C. for 1 hour, producing a colored glass article that was purple in color. It was determined that the initial heat treatment was not needed to produce color in the sample. As noted herein, colored glass articles that are purple in color can be produced by heat treatment at temperatures between 625° C. and 650° C. for heat treatment times between 30 and 90 minutes.

Figure 48:
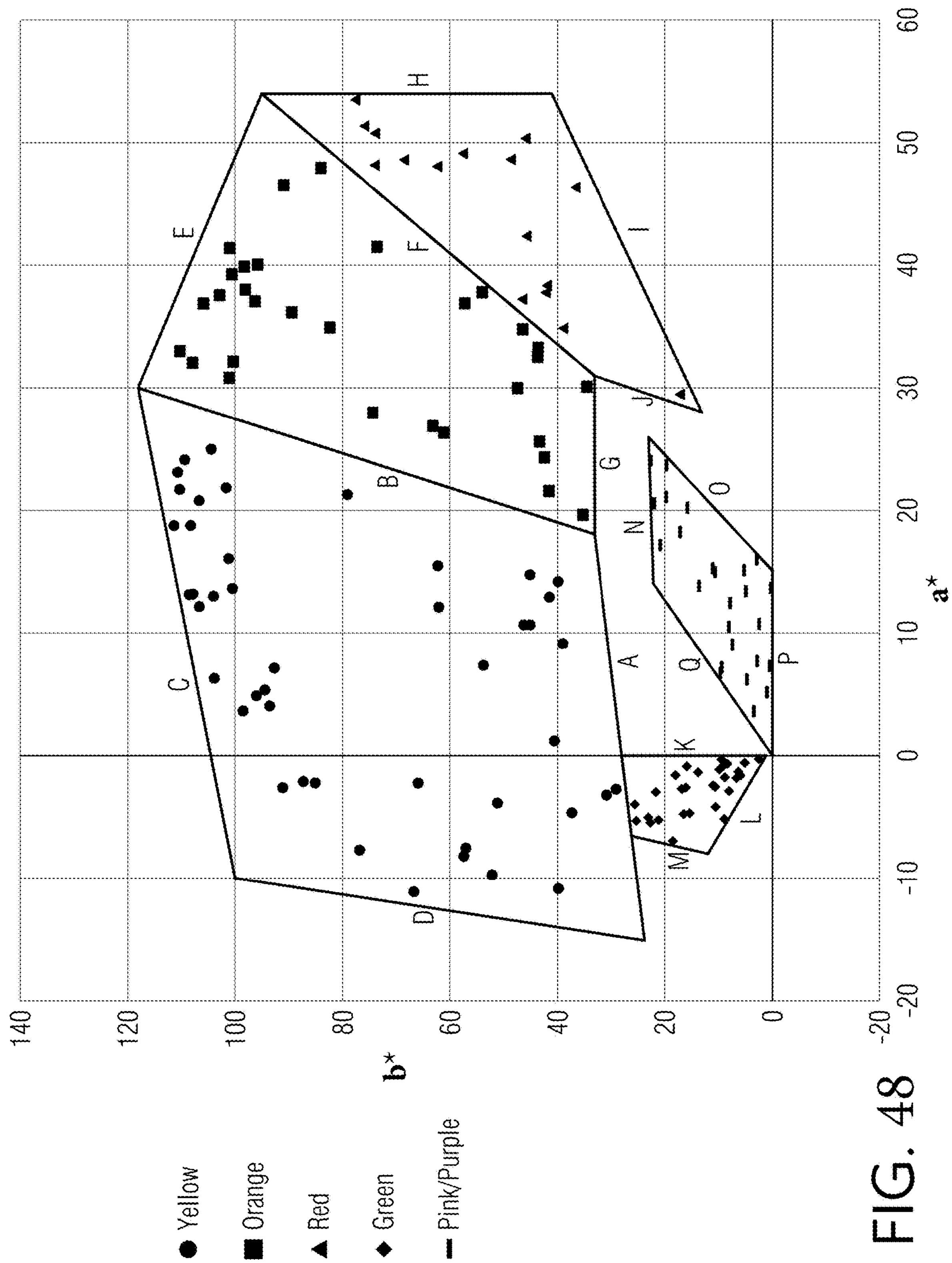
FIG. 48 is graphically depicts a plot of a projected a* vs. b* CIELAB space (y-axis: b*; x-axis: a*) of colored glass articles according to one or more embodiments of the present disclosure.

Referring now to Table 18 and FIG. 48, colored glass articles in the form of glass coupons were produced from the glass compositions of Tables 15 and 16. The glass coupons had thicknesses from ~0.5 mm to ~1.4 mm and were heat treated at various times and temperatures (as specified in Table 18) to produce colored glass articles with different color hues. PHCFR means that the glass coupon was placed directly into a pre-heated furnace, held for the indicated time, at which point the furnace was switched off and the glass coupon was cooled in the furnace at the cooling rate of the furnace (typically 2-3° C./minute). PHAC means that the glass coupon was placed directly into a pre-heated furnace, held for the indicated time, then removed and allowed to cool back to room temperature in ambient air. The CIELAB L*, a*, and b* coordinates of each colored glass article were determined and the a*, b* color coordinates were plotted as depicted in FIG. 48, where the x-axis is the a* coordinate and the y-axis is the b* coordinate. For reference, the L* coordinate (not depicted) is along an axis orthogonal to both the x-axis and the y-axis of FIG. 48 and extends through the point a*=0 and b*=0.

TABLE 18

| Example | Heat Treatment (Temp (° C.)/Time (hours)/Ramp Rate (° C./min)) | Thickness (mm) | L* | a* | b* |
|---|---|---|---|---|---|
| Ag-10 | 600/3/10 | 1.33 | 88.3 | −2.26 | 65.85 |
| Ag-10 | 600/3/10 | 1.29 | 90.44 | −3.88 | 51.15 |
| Ag-11 | 575/2/10 | 1.29 | 80.43 | 5.3 | 94.46 |
| Ag-11 | 575/2/10 | 1.32 | 81.29 | 3.96 | 93.62 |
| Ag-10 | 600/2/10 | 1.31 | 92.72 | −2.81 | 29.07 |
| Ag-10 | 600/2/10 | 1.28 | 92.55 | −3.22 | 30.79 |
| Ag-10 | 625/2/10 | 1.32 | 83.97 | 7.32 | 53.78 |
| Ag-10 | 625/2/10 | 1.32 | 79.43 | 12.07 | 62 |
| Ag-27 | 600/0.5/PHCFR | 1.26 | 89.41 | −8.22 | 57.36 |
| Ag-27 | 600/0.75/PHCFR | 1.35 | 83.95 | −2.24 | 85.2 |
| Ag-27 | 600/1/PHCFR | 1.32 | 79.51 | 4.83 | 96 |
| Ag-9 | 600/1/PHAC | 1.31 | 77.86 | 12.16 | 106.74 |
| Ag-9 | 600/2/PHAC | 1.31 | 73.48 | 18.67 | 108.37 |
| Ag-1 | 600/1/10 | 1.29 | 78.31 | 13 | 104.03 |
| Ag-13 | 635/0.3/10 | 0.61 | 78.07 | 16.01 | 101.22 |
| Ag-11 | 635/0.5/10 | 0.59 | 76.1 | 18.64 | 111.37 |
| Ag-23 | 625/0.5/10 | 1.28 | 86.72 | −2.66 | 91.23 |
| Ag-23 | 450/1/10 | 1.25 | 81.15 | 6.31 | 103.91 |
| Ag-21 | 575/2/10 | 1.16 | 90.82 | −7.55 | 56.94 |
| Ag-23 | 575/2/10 | 1.23 | 90.94 | −9.74 | 52.14 |
| Ag-23 | 575/3/10 | 1.35 | 83.93 | −2.13 | 87.35 |
| Ag-23 | 600/1/10 | 1.33 | 88.97 | −7.73 | 76.89 |
| Ag-23 | 625/0.75/10 | 1.37 | 77.37 | 13.14 | 107.83 |
| Ag-23 | 650/0.3/10 | 1.32 | 83.6 | 3.6 | 98.53 |
| Ag-23 | 615/0.5/10 | 1.33 | 90.72 | −11.12 | 66.64 |
| Ag-23 | 615/1/10 | 1.29 | 78.19 | 13.1 | 108.41 |
| Ag-23 | 640/0.5/10 | 1.25 | 73.27 | 21.82 | 101.59 |
| Ag-23 | 650/0.5/10 | 1.29 | 77.89 | 7.06 | 92.68 |

TABLE 18-continued

| Example | Heat Treatment (Temp (° C.)/Time (hours)/Ramp Rate (° C./min)) | Thickness (mm) | L* | a* | b* |
|---|---|---|---|---|---|
| Ag-22 | 575/3/10 | 1.34 | 78.23 | 13.57 | 100.58 |
| Ag-24 | 575/3/10 | 1.34 | 89.53 | 1.16 | 40.46 |
| Ag-20 | 625/2/10 | 1.37 | 83.21 | 9.05 | 39.01 |
| Ag-19 | 575/4/10 | 1.35 | 83.86 | 10.63 | 45.29 |
| Ag-22 | 600/1/10 | 1.31 | 83.83 | 10.63 | 46.05 |
| Ag-21 | 615/0.5/10 | 1.35 | 63.83 | 21.26 | 79.15 |
| Ag-23 | 635/0.6/10 | 1.26 | 69.96 | 24.92 | 104.44 |
| Ag-27 | 600/1.25/PHCFR | 1.31 | 69.76 | 24.11 | 109.37 |
| Ag-21 | 575/3/10 | 1.35 | 75.48 | 20.79 | 106.6 |
| Ag-11 | 600/1/10 | 1.32 | 71.5 | 21.65 | 110.29 |
| Ag-11 | 600/1/10 | 1.33 | 70.48 | 23.07 | 110.67 |
| Ag-9 | 625/1/PHAC | 1.31 | 79.96 | 15.43 | 62.16 |
| Ag-22 | 575/2/10 | 1.20 | 91.99 | −4.71 | 37.28 |
| Ag-11 | 650/0.5/10 | 1.35 | 93.59 | −10.87 | 39.72 |
| Ag-1 | 600/2/PHAC | 1.31 | 81.94 | 14.76 | 45.2 |
| Ag-12 | 600/2/10 | 1.34 | 82.02 | 14.23 | 39.93 |
| Ag-12 | 600/2/10 | 1.31 | 82.6 | 12.96 | 41.47 |
| Ag-27 | 600/0.25/PHCFR | 1.31 | 93.01 | −7.93 | 33.76 |
| Ag-11 | 600/3/10 | 1.34 | 53.38 | 36.16 | 89.47 |
| Ag-12 | 600/3/10 | 1.32 | 71.89 | 26.88 | 63.17 |
| Ag-12 | 600/3/10 | 1.33 | 72.44 | 26.28 | 61.16 |
| Ag-11 | 600/2/10 | 1.30 | 61.58 | 30.81 | 101 |
| Ag-11 | 600/2/10 | 1.32 | 60.37 | 32.13 | 100.26 |
| Ag-11 | 625/1/10 | 1.33 | 56.78 | 40.08 | 95.88 |
| Ag-11 | 625/1/10 | 1.35 | 58.43 | 38.04 | 98.02 |
| Ag-1 | 600/3/PHAC | 1.32 | 60.97 | 36.89 | 57.26 |
| Ag-9 | 625/2/PHAC | 1.32 | 61.72 | 41.44 | 100.95 |
| Ag-9 | 650/1/PHAC | 1.32 | 57.39 | 33.25 | 43.5 |
| Ag-1 | 600/2/10 | 1.33 | 54.05 | 46.56 | 90.95 |
| Ag-1 | 600/3/10 | 1.32 | 57.71 | 37.75 | 53.96 |
| Ag-9 | 600/3/10 | 1.32 | 49.88 | 47.94 | 84.03 |
| Ag-11 | 635/0.3/10 | 1.36 | 63.67 | 36.89 | 105.88 |
| Ag-11 | 635/0.5/10 | 1.32 | 60 | 39.32 | 100.53 |
| Ag-11 | 630/0.6/10 | 0.59 | 67.2 | 32.97 | 110.25 |
| Ag-11 | 650/0.5/10 | 0.56 | 61.12 | 27.94 | 74.46 |
| Ag-21 | 600/1/10 | 1.33 | 74.55 | 21.53 | 41.51 |
| Ag-22 | 625/1/10 | 1.35 | 57.25 | 32.53 | 43.57 |
| Ag-22 | 625/2/10 | 1.35 | 39.71 | 34.72 | 46.35 |
| Ag-22 | 575/4/10 | 1.37 | 66.13 | 32.1 | 107.91 |
| Ag-23 | 575/4/10 | 1.37 | 61.84 | 37.63 | 102.88 |
| Ag-22 | 600/2/10 | 1.28 | 64.47 | 34.95 | 82.43 |
| Ag-23 | 600/2/10 | 1.25 | 58.86 | 39.89 | 98.15 |
| Ag-22 | 600/3/10 | 1.24 | 62.11 | 37.06 | 96.27 |
| Ag-22 | 635/1/10 | 1.27 | 54.92 | 30.14 | 34.44 |
| Ag-22 | 635/2/10 | 1.28 | 42.76 | 29.96 | 47.39 |
| Ag-22 | 650/30/10 | 1.31 | 47.96 | 24.34 | 42.2 |
| Ag-11 | 600/3/10 | 1.32 | 43.41 | 41.48 | 73.52 |
| Ag-9 | 600 0.5/10 | 1.33 | 72.32 | 25.62 | 43.19 |
| Ag-24 | 575/4/10 | 1.35 | 73.2 | 19.64 | 35.14 |
| Ag-11 | 625/2/10 | 1.31 | 21.62 | 46.36 | 36.66 |
| Ag-11 | 625/2/10 | 1.30 | 28.68 | 48.69 | 48.74 |
| Ag-27 | 600/1.5/PHCFR | 1.31 | 46.01 | 53.51 | 77.81 |
| Ag-9 | 600/3/PHAC | 1.31 | 37.09 | 48.11 | 62.4 |
| Ag-9 | 625/3/PHAC | 1.29 | 27.58 | 50.33 | 46.01 |
| Ag-11 | 650/0.5/10 | 1.35 | 34.47 | 49.12 | 57.71 |
| Ag-21 | 600/2/10 | 1.27 | 25.15 | 38.39 | 41.98 |
| Ag-23 | 600/3/10 | 1.23 | 35.28 | 29.5 | 16.99 |
| Ag-23 | 635/1/10 | 1.27 | 29.58 | 37.33 | 46.53 |
| Ag-9 | 600/2/10 | 1.31 | 40.56 | 48.66 | 68.35 |
| Ag-21 | 575/4/10 | 1.36 | 46 | 51.36 | 75.97 |
| Ag-11 | 630/0.6/10 | 1.35 | 43.57 | 50.81 | 73.87 |
| Ag-22 | 615/1/10 | 1.31 | 45.53 | 48.19 | 73.96 |
| Ag-23 | 625/1/10 | 1.35 | 32.52 | 37.79 | 42.15 |
| Ag-12 | 625/2/10 | 1.31 | 40.9 | 42.34 | 45.72 |
| Ag-12 | 625/2/10 | 1.31 | 40.92 | 34.87 | 38.77 |
| Ag-10 | 575/2/10 | 1.28 | 95.61 | −2.57 | 10.47 |
| Ag-10 | 575/2/10 | 1.33 | 95.5 | −2.51 | 10.73 |
| Ag-12 | 575/2/10 | 1.30 | 95.46 | −4.72 | 15.2 |
| Ag-12 | 575/2/10 | 1.31 | 95.21 | −4.78 | 16.2 |
| Ag-10 | 600/1/10 | 1.29 | 94.06 | −0.93 | 15.68 |
| Ag-10 | 600/1/10 | 1.29 | 95.27 | −1.08 | 9.58 |
| Ag-1 | 575/1/PHAC | 1.30 | 96.33 | −2.88 | 7.92 |
| Ag-9 | 575/1/PHAC | 1.33 | 96.22 | −1.88 | 6.36 |
| Ag-13 | 635/0.5/10 | 0.59 | 65.97 | −1.78 | 6.53 |
| Ag-11 | 635/0.5/10 | 1.34 | 95.37 | −0.8 | 8.8 |
| Ag-11 | 635/0.5/10 | 0.61 | 95.46 | −0.63 | 8.11 |

TABLE 18-continued

| Example | Heat Treatment (Temp (° C.)/Time (hours)/Ramp Rate (° C./min)) | Thickness (mm) | L* | a* | b* |
|---|---|---|---|---|---|
| Ag-11 | 630/0.7/10 | 1.36 | 94.65 | −1.36 | 13.6 |
| Ag-11 | 630/0.7/10 | 0.57 | 96.13 | −0.64 | 4.96 |
| Ag-13 | 630/0.7/10 | 1.34 | 17.64 | −0.13 | 9.52 |
| Ag-10 | 650/0.5/10 | 0.57 | 93.1 | −2.63 | 16.08 |
| Ag-11 | 650/0.5/10 | 0.58 | 95.83 | −6.92 | 18.3 |
| Ag-13 | 635/0.6/10 | 0.50 | 68.86 | −5.21 | 8.63 |
| Ag-13 | 635/0.6/10 | 0.50 | 69.02 | −4.23 | 10.36 |
| Ag-19 | 625/0.6/10 | 1.28 | 91.48 | −0.24 | 1.94 |
| Ag-19 | 575/2/10 | 1.19 | 96.2 | −1.67 | 5.92 |
| Ag-20 | 575/2/10 | 1.18 | 96.23 | −1.37 | 6.17 |
| Ag-20 | 575/3/10 | 1.36 | 95.79 | −1.76 | 8.63 |
| Ag-20 | 575/4/10 | 1.35 | 94.03 | −2.99 | 21.48 |
| Ag-20 | 600/2/10 | 1.28 | 95.38 | −0.5 | 8.66 |
| Ag-20 | 635/2/10 | 1.29 | 93.27 | −5.41 | 22.51 |
| Ag-24 | 650/0.5/10 | 1.29 | 62.01 | −3.99 | 25.51 |
| Ag-24 | 645/0.5/10 | 1.22 | 53.04 | −2.71 | 16.67 |
| Ag-1 | 600/1/PHAC | 1.30 | 94.18 | −1.61 | 17.89 |
| Ag-20 | 650/0.5/10 | 1.31 | 93.44 | −5.26 | 21.04 |
| Ag-24 | 575/2/10 | 1.21 | 94.46 | −5.08 | 22.99 |
| Ag-20 | 635/2/10 | 1.29 | 93.27 | −5.41 | 22.51 |
| Ag-19 | 575/3/10 | 1.33 | 94.25 | −5.38 | 25.07 |
| Ag-12 | 625/1/10 | 1.34 | 65.54 | 23.63 | 19.56 |
| Ag-12 | 625/1/10 | 1.32 | 71.17 | 21.05 | 19.63 |
| Ag-12 | 635/0.5/10 | 1.35 | 71.32 | 13.82 | 13.62 |
| Ag-1 | 625/3/PHAC | 1.32 | 65.21 | 24.02 | 22.49 |
| Ag-12 | 635/0.5/10 | 1.35 | 64.18 | 18.22 | 17.04 |
| Ag-12 | 635/0.3/10 | 1.35 | 79.6 | 9.04 | 7.31 |
| Ag-13 | 635/0.3/10 | 1.34 | 38.54 | 15.27 | 11 |
| Ag-12 | 635/0.5/10 | 1.34 | 80.09 | 10.51 | 7.99 |
| Ag-12 | 630/0.7/10 | 1.37 | 72.96 | 14.97 | 10.44 |
| Ag-12 | 630/0.7/10 | 0.57 | 87.75 | 6.18 | 4.56 |
| Ag-13 | 650/0.5/10 | 1.36 | 4.61 | 15.13 | 5.16 |
| Ag-22 | 625/0.5/10 | 1.29 | 74.16 | 17.2 | 20.72 |
| Ag-21 | (450/1/10) + (635/0.6/10) | 1.26 | 60.75 | 10.74 | 2.34 |
| Ag-24 | (450/1/10) + (635/0.6/10) | 1.26 | 81.63 | 5.11 | 0.83 |
| Ag-21 | 625/1/10 | 1.33 | 21.04 | 16.09 | 2.81 |
| Ag-24 | 625/1/10 | 1.35 | 69.03 | 7.33 | 0.15 |
| Ag-20 | 635/0.6/10 | 1.28 | 89.93 | 6.67 | 9.6 |
| Ag-21 | 635/0.6/10 | 1.28 | 51.58 | 13.43 | 4.69 |
| Ag-24 | 635/0.6/10 | 1.27 | 78.17 | 7.73 | 2.76 |
| Ag-21 | 600/3/10 | 1.27 | 24.57 | 12.39 | 7.72 |
| Ag-19 | 635/1/10 | 1.28 | 84.58 | 3.58 | 3.24 |
| Ag-21 | 635/1/10 | 1.26 | 40.14 | 10.14 | −0.13 |
| Ag-24 | 635/1/10 | 1.29 | 78.27 | 4.37 | −0.11 |
| Ag-20 | 640/0.5/10 | 1.27 | 89.29 | 7.12 | 9.32 |
| Ag-21 | 640/0.5/10 | 1.28 | 39.19 | 13.64 | 0.14 |
| Ag-22 | 640/0.5/10 | 1.26 | 67.68 | 20.56 | 21.8 |
| Ag-13 | 650/0.5/10 | 0.55 | 50.65 | 20.25 | 15.66 |

As indicated in FIG. 48, the resultant colored glass articles may be grouped into regions of the a*-b* plot according to the hue of the colored glass article. That is, colored glass articles having similar color hues have combinations of discrete a* and b* values that fall within the same region of the a*-b* plot. In particular, colored glass articles that appear yellow have a*, b* values that fall within the region defined by the intersection of four lines: $b^*=0.2879 \cdot a^*+27.818$ (line A); $b^*=7.0833 \cdot a^*-94.5$ (line B); $b^*=0.45 \cdot a^*+104.5$ (line C); and $b^*=15.3 \cdot a^*+253$ (line D). The region defined by the intersection lines A, B, C, and D can be referred to as the "yellow region" and colored glass articles having combinations of discrete a* and b* values falling within this region will generally appear yellow.

Similarly, colored glass articles that appear orange have a*, b*values that fall within the region defined by the intersection of four lines: $b^*=7.0833 \cdot a^*-94.5$ (line B); $b^*=-0.9583 \cdot a^*+146.75$ (line E); $b^*=2.6957 \cdot a^*-50.565$ (line F); and $b^*=33$ (line G). The region defined by the intersection lines B, E, F, and G can be referred to as the "orange region" and colored glass articles having combinations of discrete a* and b* values falling within this region will generally appear orange.

Still referring to FIG. 48, colored glass articles that appear red have a*, b* values that fall within the region defined by the intersection of four lines: $b^*=2.6957 \cdot a^*-50.565$ (line F); $a^*=54$ (line H); $b^*=1.0769 \cdot a^*-17.154$ (line I); and $b^*=6.6667 \cdot a^*-173.67$ (line J). The region defined by the intersection lines F, H, I, and J can be referred to as the "red region" and colored glass articles having combinations of discrete a* and b* values falling within this region will generally appear orange.

Colored glass articles that appear green have a*, b* values that fall within the region defined by the intersection of four lines: $b^*=0.2879 \cdot a^*+27.818$ (line A); $a^*=0$ (line K); $b^*=-1.375 \cdot a^*+1$ (line L); and $b^*=9.333 \cdot a^*+86.667$ (line M), exclusive of a* greater than −0.3 and less than 0.3 and exclusive of b* greater than −0.5 and less than 0.5. The region defined by the intersection lines A, L, K, and M can be referred to as the "green region" and colored glass articles having combinations of discrete a* and b* values falling within this region will generally appear green.

Colored glass articles that appear pink/purple have a*, b* values that fall within the region defined by the intersection of four lines: $b^*=0.0833\cdot a^*+20.833$ (line N); $b^*=2.1182\cdot a^*-32.073$ (line O); $b^*=-0.3$ (line P); and $b^*=1.5929\cdot a^*-0.3$ (line Q), exclusive of a* greater than −0.3 and less than 0.3 and exclusive of b* greater than −0.5 and less than 0.5. The region defined by the intersection lines N, O, P, and Q can be referred to as the "pink/purple region" and colored glass articles having combinations of discrete a* and b* values falling within this region will generally appear pink/purple.

Referring now to Table 19, colored glass articles in the form of glass coupons were produced from the glass compositions of Tables 15 and 16. The glass coupons had thicknesses from ~0.5 mm to ~1.4 mm and were heat treated at various times and temperatures (as specified in Table 19) to produce colored glass articles with different color hues. PHCFR means that the glass coupon was placed directly into a pre-heated furnace, held for the indicated time, at which point the furnace was switched off and the glass coupon was cooled in the furnace at the cooling rate of the furnace (typically 2-3° C./minute). PHAC means that the glass coupon was placed directly into a pre-heated furnace, held for the indicated time, then removed and allowed to cool back to room temperature in ambient air. The CIELAB L*, a*, and b* coordinates of each colored glass article were determined. The average transmittance (%) for each sample over the wavelength range from 380 nm to 750 nm was also determined. The results are reported in Table 19.

TABLE 19

| Example | Heat Treatment (Temp (° C.)/ Time (hours)/ Ramp Rate (° C./min)) | Thick-ness (mm) | Average Visible Trans-mittance % (380-750 nm) | L* | a* | b* |
|---|---|---|---|---|---|---|
| Ag-10 | 575/2/10 | 1.28 | 86.1 | 95.61 | −2.57 | 10.47 |
| Ag-10 | 575/2/10 | 1.33 | 85.8 | 95.5 | −2.51 | 10.73 |
| Ag-12 | 575/2/10 | 1.30 | 83.4 | 95.46 | −4.72 | 15.2 |
| Ag-12 | 575/2/10 | 1.31 | 82.5 | 95.21 | −4.78 | 16.2 |
| Ag-10 | 600/1/10 | 1.29 | 82.6 | 94.06 | −0.93 | 15.68 |
| Ag-10 | 600/1/10 | 1.29 | 86.2 | 95.27 | −1.08 | 9.58 |
| Ag-11 | 600/1/10 | 1.32 | 44.0 | 71.5 | 21.65 | 110.29 |
| Ag-11 | 600/1/10 | 1.33 | 43.1 | 70.48 | 23.07 | 110.67 |
| Ag-12 | 600/2/10 | 1.34 | 62.0 | 82.02 | 14.23 | 39.93 |
| Ag-12 | 600/2/10 | 1.31 | 62.3 | 82.6 | 12.96 | 41.47 |
| Ag-10 | 600/3/10 | 1.33 | 64.4 | 88.3 | −2.26 | 65.85 |
| Ag-10 | 600/3/10 | 1.29 | 69.5 | 90.44 | −3.88 | 51.15 |
| Ag-11 | 600/3/10 | 1.32 | 24.6 | 43.41 | 41.48 | 73.52 |
| Ag-11 | 600/3/10 | 1.34 | 30.5 | 53.38 | 36.16 | 89.47 |
| Ag-12 | 600/3/10 | 1.32 | 49.3 | 71.89 | 26.88 | 63.17 |
| Ag-12 | 600/3/10 | 1.33 | 50.0 | 72.44 | 26.28 | 61.16 |
| Ag-11 | 575/2/10 | 1.29 | 51.8 | 80.43 | 5.3 | 94.46 |
| Ag-11 | 575/2/10 | 1.32 | 52.6 | 81.29 | 3.96 | 93.62 |
| Ag-12 | 600/1/10 | 1.36 | 76.5 | 89.88 | 5.59 | 16.84 |
| Ag-12 | 600/1/10 | 1.30 | 76.2 | 90.36 | 4.53 | 20.01 |
| Ag-10 | 600/2/10 | 1.31 | 77.1 | 92.72 | −2.81 | 29.07 |
| Ag-10 | 600/2/10 | 1.28 | 76.4 | 92.55 | −3.22 | 30.79 |
| Ag-11 | 600/2/10 | 1.30 | 36.2 | 61.58 | 30.81 | 101 |
| Ag-11 | 600/2/10 | 1.32 | 35.4 | 60.37 | 32.13 | 100.26 |
| Ag-10 | 625/1/10 | 1.33 | 74.6 | 90.4 | 3.5 | 27.63 |
| Ag-10 | 625/1/10 | 1.34 | 70.9 | 88.67 | 5.26 | 33.93 |
| Ag-11 | 625/1/10 | 1.33 | 34.4 | 56.78 | 40.08 | 95.88 |
| Ag-11 | 625/1/10 | 1.35 | 35.2 | 58.43 | 38.04 | 98.02 |
| Ag-12 | 625/1/10 | 1.34 | 45.9 | 65.54 | 23.63 | 19.56 |
| Ag-12 | 625/1/10 | 1.32 | 52.4 | 71.17 | 21.05 | 19.63 |
| Ag-10 | 635/0.5/10 | 1.32 | 76.2 | 89.49 | 7.4 | 15.81 |
| Ag-12 | 635/0.5/10 | 1.35 | 50.0 | 71.32 | 13.82 | 13.62 |
| Ag-10 | 625/2/10 | 1.32 | 59.4 | 83.97 | 7.32 | 53.78 |
| Ag-10 | 625/2/10 | 1.32 | 53.9 | 79.43 | 12.07 | 62 |
| Ag-11 | 625/2/10 | 1.31 | 16.8 | 21.62 | 46.36 | 36.66 |
| Ag-11 | 625/2/10 | 1.30 | 19.2 | 28.68 | 48.69 | 48.74 |
| Ag-12 | 625/2/10 | 1.31 | 24.2 | 40.92 | 34.87 | 38.77 |

TABLE 19-continued

| Example | Heat Treatment (Temp (° C.)/ Time (hours)/ Ramp Rate (° C./min)) | Thick-ness (mm) | Average Visible Trans-mittance % (380-750 nm) | L* | a* | b* |
|---|---|---|---|---|---|---|
| Ag-12 | 625/2/10 | 1.31 | 26.3 | 40.9 | 42.34 | 45.72 |
| Ag-16 | as made | 0.60 | 88.7 | 95.09 | 4.58 | −1.73 |
| Ag-16 | 575/0.33/10 | 0.57 | 86.5 | 94.76 | 3.32 | 1.91 |
| Ag-16 | 565/0.25/10 | 0.60 | 88.1 | 95 | 4.26 | −0.83 |
| Ag-16 | as made | 1.34 | 86.3 | 93.7 | 8.44 | −3.23 |
| Ag-16 | 575/0.33/10 | 1.32 | 77.1 | 92.03 | 3.62 | 13.15 |
| Ag-16 | 565/0.25/10 | 1.32 | 85.2 | 93.51 | 7.83 | −1.61 |
| Ag-16 | as made | 2.06 | 84.4 | 92.66 | 10.98 | −4.12 |
| Ag-16 | 575/0.33/10 | 2.03 | 77.6 | 91.28 | 7.96 | 6.77 |
| Ag-16 | 565/0.25/10 | 2.04 | 82.1 | 92.25 | 9.9 | −0.62 |
| Ag-28 | 600/0.5/ PHCFR | 1.26 | 63.2 | 89.41 | −8.22 | 57.36 |
| Ag-28 | 600/0.25/ PHCFR | 1.31 | 72.2 | 93.01 | −7.93 | 33.76 |
| Ag-28 | 600/0.75/ PHCFR | 1.35 | 54.9 | 83.95 | −2.24 | 85.2 |
| Ag-28 | 600/1/ PHCFR | 1.32 | 50.1 | 79.51 | 4.83 | 96 |
| Ag-28 | 600/1.25/ PHCFR | 1.31 | 42.4 | 69.76 | 24.11 | 109.37 |
| Ag-28 | 600/1.5/ PHCFR | 1.31 | 31.2 | 46.01 | 53.51 | 77.81 |
| Ag-1 | 600/1/PHAC | 1.30 | 81.9 | 94.18 | −1.61 | 17.89 |
| Ag-9 | 600/1/PHAC | 1.31 | 49.3 | 77.86 | 12.16 | 106.74 |
| Ag-1 | 600/2/PHAC | 1.31 | 61.0 | 81.94 | 14.76 | 45.2 |
| Ag-9 | 600/2/PHAC | 1.31 | 45.5 | 73.48 | 18.67 | 108.37 |
| Ag-1 | 600/3/PHAC | 1.32 | 41.6 | 60.97 | 36.89 | 57.26 |
| Ag-9 | 600/3/PHAC | 1.31 | 22.8 | 37.09 | 48.11 | 62.4 |
| Ag-1 | 625/1/PHAC | 1.27 | 68.7 | 84.18 | 6.08 | 9.04 |
| Ag-9 | 625/1/PHAC | 1.31 | 56.5 | 79.96 | 15.43 | 62.16 |
| Ag-1 | 625/2/PHAC | 1.33 | 26.8 | 43.55 | 32.19 | 26.91 |
| Ag-9 | 625/2/PHAC | 1.32 | 39.5 | 61.72 | 41.44 | 100.95 |
| Ag-1 | 625/3/PHAC | 1.32 | 45.8 | 65.21 | 24.02 | 22.49 |
| Ag-9 | 625/3/PHAC | 1.29 | 20.9 | 27.58 | 50.33 | 46.01 |
| Ag-9 | 650/1/PHAC | 1.32 | 37.5 | 57.39 | 33.25 | 43.5 |
| Ag-1 | 650/1/PHAC | 1.31 | 44.7 | 72.34 | 1.09 | 29.03 |
| Ag-9 | as made | 1.30 | 92.2 | 96.88 | −0.02 | −0.01 |
| Ag-1 | as made | 1.31 | 92.2 | 96.92 | −0.01 | 0.09 |
| Ag-1 | 575/1/PHAC | 1.30 | 86.9 | 96.33 | −2.88 | 7.92 |
| Ag-9 | 575/1/PHAC | 1.33 | 87.9 | 96.22 | −1.88 | 6.36 |
| Ag-1 | 600/0.5/10 | 1.32 | 80.0 | 92.34 | 2.78 | 16.14 |
| Ag-9 | 600/0.5/10 | 1.33 | 52.2 | 72.32 | 25.62 | 43.19 |
| Ag-1 | 600/1/10 | 1.29 | 50.2 | 78.31 | 13 | 104.03 |
| Ag-9 | 600/1/10 | 1.31 | 70.1 | 86.43 | 9.77 | 25.5 |
| Ag-1 | 600/2/10 | 1.33 | 33.9 | 54.05 | 46.56 | 90.95 |
| Ag-9 | 600/2/10 | 1.31 | 25.0 | 40.56 | 48.66 | 68.35 |
| Ag-1 | 600/3/10 | 1.32 | 39.4 | 57.71 | 37.75 | 53.96 |
| Ag-9 | 600/3/10 | 1.32 | 31.1 | 49.88 | 47.94 | 84.03 |
| Ag-12 | 635/0.5/10 | 1.35 | 41.5 | 64.18 | 18.22 | 17.04 |
| Ag-13 | 635/0.5/10 | 0.59 | 41.4 | 65.97 | −1.78 | 6.53 |
| Ag-10 | 635/0.33/10 | 1.34 | 74.0 | 87.67 | 9.78 | 15.76 |
| Ag-10 | 635/0.33/10 | 0.62 | 84.3 | 93.14 | 3.83 | 6.38 |
| Ag-11 | 635/0.33/10 | 1.36 | 39.5 | 63.67 | 36.89 | 105.88 |
| Ag-11 | 635/0.33/10 | 0.59 | 50.1 | 69.96 | 15.42 | 24.46 |
| Ag-29 | 635/0.33/10 | 1.34 | 85.1 | 94.52 | 0.48 | 9.73 |
| Ag-29 | 635/0.33/10 | 0.61 | 87.4 | 95.33 | 0.21 | 6.61 |
| Ag-12 | 635/0.33/10 | 1.35 | 61.6 | 79.6 | 9.04 | 7.31 |
| Ag-12 | 635/0.33/10 | 0.61 | 78.5 | 89.9 | 3.47 | 3.3 |
| Ag-13 | 635/0.33/10 | 1.34 | 20.6 | 38.54 | 15.27 | 11 |
| Ag-13 | 635/0.33/10 | 0.61 | 50.9 | 78.07 | 16.01 | 101.22 |
| Ag-10 | 635/0.5/10 | 1.34 | 74.7 | 88.54 | 8.59 | 17.4 |
| Ag-10 | 635/0.5/10 | 0.59 | 80.1 | 91.15 | 5.96 | 10.8 |
| Ag-11 | 635/0.5/10 | 1.32 | 36.8 | 60 | 39.32 | 100.53 |
| Ag-11 | 635/0.5/10 | 0.59 | 48.5 | 76.1 | 18.64 | 111.37 |
| Ag-29 | 635/0.5/10 | 1.34 | 86.7 | 95.37 | −0.8 | 8.8 |
| Ag-29 | 635/0.5/10 | 0.61 | 87.2 | 95.46 | −0.63 | 8.11 |
| Ag-12 | 635/0.5/10 | 1.34 | 63.3 | 80.09 | 10.51 | 7.99 |
| Ag-12 | 635/0.5/10 | 0.60 | 80.3 | 90.61 | 4.01 | 3.43 |
| Ag-10 | 630/0.66/10 | 1.35 | 72.0 | 87.8 | 8.65 | 22.02 |
| Ag-10 | 630/0.66/10 | 0.59 | 76.8 | 89.84 | 7.04 | 15.34 |
| Ag-11 | 630/0.66/10 | 1.35 | 27.9 | 43.57 | 50.81 | 73.87 |
| Ag-11 | 630/0.66/10 | 0.59 | 42.0 | 67.2 | 32.97 | 110.25 |
| Ag-29 | 630/0.66/10 | 1.36 | 83.9 | 94.65 | −1.36 | 13.6 |

TABLE 19-continued

| Example | Heat Treatment (Temp (° C.)/ Time (hours)/ Ramp Rate (° C./min)) | Thickness (mm) | Average Visible Transmittance % (380-750 nm) | L* | a* | b* |
|---|---|---|---|---|---|---|
| Ag-29 | 630/0.66/10 | 0.57 | 89.2 | 96.13 | −0.64 | 4.96 |
| Ag-12 | 630/0.66/10 | 1.37 | 53.7 | 72.96 | 14.97 | 10.44 |
| Ag-12 | 630/0.66/10 | 0.57 | 75.6 | 87.75 | 6.18 | 4.56 |
| Ag-13 | 630/0.66/10 | 1.34 | 3.2 | 17.64 | −0.13 | 9.52 |
| Ag-13 | 630/0.66/10 | 0.57 | 18.2 | 48.85 | 1.57 | 10.55 |
| Ag-10 | 650/0.5/10 | 1.35 | 65.2 | 85.98 | 3.06 | 28.27 |
| Ag-10 | 650/0.5/10 | 0.57 | 77.8 | 93.1 | −2.63 | 16.08 |
| Ag-11 | 650/0.5/10 | 1.35 | 24.5 | 34.47 | 49.12 | 57.71 |
| Ag-11 | 650/0.5/10 | 0.56 | 38.4 | 61.12 | 27.94 | 74.46 |
| Ag-29 | 650/0.5/10 | 1.35 | 71.1 | 93.59 | −10.87 | 39.72 |
| Ag-29 | 650/0.5/10 | 0.58 | 80.9 | 95.83 | −6.92 | 18.3 |
| Ag-12 | 650/0.5/10 | 1.33 | 35.2 | 61.52 | 12.86 | 25.33 |
| Ag-12 | 650/0.5/10 | 0.57 | 59.8 | 80.08 | 6.11 | 13.24 |
| Ag-13 | 650/0.5/10 | 1.36 | 2.1 | 4.61 | 15.13 | 5.16 |
| Ag-13 | 650/0.5/10 | 0.55 | 26.0 | 50.65 | 20.25 | 15.66 |
| Ag-13 | 635/0.6/10 | 0.50 | 39.8 | 68.86 | −5.21 | 8.63 |
| Ag-13 | 635/0.6/10 | 0.50 | 38.1 | 69.02 | −4.23 | 10.36 |
| Ag-19 | 625/0.5/10 | 1.28 | 81.6 | 91.48 | −0.24 | 1.94 |
| Ag-20 | 625/0.5/10 | 1.28 | 89.1 | 95.5 | 1.16 | 2.16 |
| Ag-21 | 625/0.5/10 | 1.28 | 18.7 | 40.92 | 11.24 | 24.65 |
| Ag-22 | 625/0.5/10 | 1.29 | 55.2 | 74.16 | 17.2 | 20.72 |
| Ag-23 | 625/0.5/10 | 1.28 | 58.9 | 86.72 | −2.66 | 91.23 |
| Ag-24 | 625/0.5/10 | 1.27 | 75.7 | 89.09 | 2.7 | 2.71 |
| Ag-19 | (450/1 + 635/ 0.6)/10 | 1.25 | 66.2 | 85.08 | 1.93 | 7.48 |
| Ag-20 | (450/1 + 635/ 0.6)/10 | 1.23 | 80.2 | 90.59 | 5.45 | 5.91 |
| Ag-21 | (450/1 + 635/ 0.6)/10 | 1.26 | 34.5 | 60.75 | 10.74 | 2.34 |
| Ag-22 | (450/1 + 635/ 0.6)/10 | 1.26 | 29.2 | 48.41 | 27.84 | 24.6 |
| Ag-23 | (450/1 + 635/ 0.6)/10 | 1.25 | 52.3 | 81.15 | 6.31 | 103.91 |
| Ag-24 | (450/1 + 635/ 0.6)/10 | 1.26 | 64.8 | 81.63 | 5.11 | 0.83 |
| Ag-19 | 575/2/10 | 1.19 | 88.5 | 96.2 | −1.67 | 5.92 |
| Ag-20 | 575/2/10 | 1.18 | 88.8 | 96.23 | −1.37 | 6.17 |
| Ag-21 | 575/2/10 | 1.16 | 67.3 | 90.82 | −7.55 | 56.94 |
| Ag-22 | 575/2/10 | 1.20 | 73.4 | 91.99 | −4.71 | 37.28 |
| Ag-23 | 575/2/10 | 1.23 | 65.7 | 90.94 | −9.74 | 52.14 |
| Ag-24 | 575/2/10 | 1.21 | 80.3 | 94.46 | −5.08 | 22.99 |
| Ag-19 | 575/3/10 | 1.33 | 79.0 | 94.25 | −5.38 | 25.07 |
| Ag-20 | 575/3/10 | 1.36 | 87.2 | 95.79 | −1.76 | 8.63 |
| Ag-21 | 575/3/10 | 1.35 | 48.1 | 75.48 | 20.79 | 106.6 |
| Ag-22 | 575/3/10 | 1.34 | 50.3 | 78.23 | 13.57 | 100.58 |
| Ag-23 | 575/3/10 | 1.35 | 54.8 | 83.93 | −2.13 | 87.35 |
| Ag-24 | 575/3/10 | 1.34 | 69.8 | 89.53 | 1.16 | 40.46 |
| Ag-19 | 600/1/10 | 1.31 | 87.2 | 94.83 | 1.61 | 4.63 |
| Ag-20 | 600/1/10 | 1.32 | 88.3 | 95.72 | −0.04 | 5.54 |
| Ag-21 | 600/1/10 | 1.33 | 54.1 | 74.55 | 21.53 | 41.51 |
| Ag-22 | 600/1/10 | 1.31 | 62.5 | 83.83 | 10.63 | 46.05 |
| Ag-23 | 600/1/10 | 1.33 | 61.7 | 88.97 | 7.73 | 76.89 |
| Ag-24 | 600/1/10 | 1.31 | 81.0 | 91.25 | 4.02 | 7.41 |
| Ag-19 | 625/0.75/10 | 1.35 | 67.6 | 83.95 | 3.26 | 8.39 |
| Ag-20 | 625/0.75/10 | 1.37 | 83.2 | 93.23 | 2.8 | 9.89 |
| Ag-21 | 625/0.75/10 | 1.37 | 7.7 | 14.26 | 16.11 | 14.63 |
| Ag-22 | 625/0.75/10 | 1.37 | 54.0 | 73.76 | 18.6 | 26.67 |
| Ag-23 | 625/0.75/10 | 1.37 | 49.0 | 77.37 | 13.14 | 107.83 |
| Ag-24 | 625/0.75/10 | 1.36 | 76.2 | 89.09 | 3.18 | 2.61 |
| Ag-19 | 625/1/10 | 1.34 | 71.6 | 86.86 | 3.84 | 2.74 |
| Ag-20 | 625/1/10 | 1.34 | 81.7 | 91.97 | 4.78 | 9 |
| Ag-21 | 625/1/10 | 1.33 | 6.9 | 21.04 | 16.09 | 2.81 |
| Ag-22 | 625/1/10 | 1.35 | 37.4 | 57.25 | 32.53 | 43.57 |
| Ag-23 | 625/1/10 | 1.35 | 17.4 | 32.52 | 37.79 | 42.15 |
| Ag-24 | 625/1/10 | 1.35 | 46.9 | 69.03 | 7.33 | 0.15 |
| Ag-19 | 625/2/10 | 1.36 | 56.7 | 77.84 | 3.78 | 3.15 |
| Ag-20 | 625/2/10 | 1.37 | 61.3 | 83.21 | 9.05 | 39.01 |
| Ag-21 | 625/2/10 | 1.36 | 1.7 | 6.03 | 5.89 | 6.3 |
| Ag-22 | 625/2/10 | 1.35 | 24.2 | 39.71 | 34.72 | 46.35 |
| Ag-23 | 625/2/10 | 1.37 | 1.0 | 0.84 | 1.4 | −0.02 |
| Ag-24 | 625/2/10 | 1.37 | 20.6 | 49.68 | 7.22 | 18.91 |
| Ag-19 | 635/0.6/10 | 1.27 | 78.4 | 90.97 | 0.85 | 2.76 |
| Ag-20 | 635/0.6/10 | 1.28 | 78.5 | 89.93 | 6.67 | 9.6 |

TABLE 19-continued

| Example | Heat Treatment (Temp (° C.)/ Time (hours)/ Ramp Rate (° C./min)) | Thickness (mm) | Average Visible Transmittance % (380-750 nm) | L* | a* | b* |
|---|---|---|---|---|---|---|
| Ag-21 | 635/0.6/10 | 1.28 | 24.9 | 51.58 | 13.43 | 4.69 |
| Ag-22 | 635/0.6/10 | 1.28 | 47.7 | 67.94 | 22.47 | 27.95 |
| Ag-23 | 635/0.6/10 | 1.26 | 44.4 | 69.96 | 24.92 | 104.44 |
| Ag-24 | 635/0.6/10 | 1.27 | 58.0 | 78.17 | 7.73 | 2.76 |
| Ag-19 | 650/0.33/10 | 1.31 | 48.7 | 75.06 | 5.45 | 37.69 |
| Ag-20 | 650/0.33/10 | 1.32 | 69.6 | 86.53 | 4.09 | 15.65 |
| Ag-21 | 650/0.33/10 | 1.31 | 15.4 | 40.77 | 8.5 | 13.14 |
| Ag-22 | 650/0.33/10 | 1.32 | 38.6 | 61.55 | 16.07 | 24.77 |
| Ag-23 | 650/0.33/10 | 1.32 | 55.2 | 83.6 | 3.6 | 98.53 |
| Ag-24 | 650/0.33/10 | 1.31 | 60.4 | 79.86 | 1.57 | 0.06 |
| Ag-19 | 575/4/10 | 1.35 | 62.5 | 83.86 | 10.63 | 45.29 |
| Ag-20 | 575/4/10 | 1.35 | 80.8 | 94.03 | −2.99 | 21.48 |
| Ag-21 | 575/4/10 | 1.36 | 31.9 | 46 | 51.36 | 75.97 |
| Ag-22 | 575/4/10 | 1.37 | 40.8 | 66.13 | 32.1 | 107.91 |
| Ag-23 | 575/4/10 | 1.37 | 38.5 | 61.84 | 37.63 | 102.88 |
| Ag-24 | 575/4/10 | 1.35 | 53.1 | 73.2 | 19.64 | 35.14 |
| Ag-19 | 600/2/10 | 1.27 | 65.2 | 81.77 | 8.74 | 17.89 |
| Ag-20 | 600/2/10 | 1.28 | 86.8 | 95.38 | −0.5 | 8.66 |
| Ag-21 | 600/2/10 | 1.27 | 19.1 | 25.15 | 38.39 | 41.98 |
| Ag-22 | 600/2/10 | 1.28 | 41.8 | 64.47 | 34.95 | 82.43 |
| Ag-23 | 600/2/10 | 1.25 | 37.3 | 58.86 | 39.89 | 98.15 |
| Ag-24 | 600/2/10 | 1.27 | 67.2 | 83.23 | 7.5 | 10.6 |
| Ag-19 | 600/3/10 | 1.26 | 52.0 | 71.68 | 13.7 | 17.07 |
| Ag-20 | 600/3/10 | 1.29 | 84.2 | 94.77 | −1.5 | 14.51 |
| Ag-21 | 600/3/10 | 1.27 | 9.3 | 24.57 | 12.39 | 7.72 |
| Ag-22 | 600/3/10 | 1.24 | 39.5 | 62.11 | 37.06 | 96.27 |
| Ag-23 | 600/3/10 | 1.23 | 21.5 | 35.28 | 29.5 | 16.99 |
| Ag-24 | 600/3/10 | 1.27 | 61.5 | 79.25 | 9.59 | 9.6 |
| Ag-19 | 615/0.5/10 | 1.33 | 86.3 | 94.4 | 1.3 | 5.3 |
| Ag-20 | 615/0.5/10 | 1.31 | 88.3 | 95.29 | 1.21 | 3.5 |
| Ag-21 | 615/0.5/10 | 1.35 | 40.0 | 63.83 | 21.26 | 79.15 |
| Ag-22 | 615/0.5/10 | 1.34 | 65.7 | 82.74 | 12.56 | 22.42 |
| Ag-23 | 615/0.5/10 | 1.33 | 64.2 | 90.72 | −11.12 | 66.64 |
| Ag-24 | 615/0.5/10 | 1.36 | 83.7 | 92.44 | 1.04 | 2.52 |
| Ag-19 | 615/1/10 | 1.27 | 80.4 | 90.96 | 0.89 | 3.45 |
| Ag-20 | 615/1/10 | 1.28 | 87.9 | 95.27 | 1.06 | 4.77 |
| Ag-21 | 615/1/10 | 1.30 | 25.5 | 48.52 | 11.08 | 17.34 |
| Ag-22 | 615/1/10 | 1.31 | 30.2 | 45.53 | 48.19 | 73.96 |
| Ag-23 | 615/1/10 | 1.29 | 50.1 | 78.19 | 13.1 | 108.41 |
| Ag-24 | 615/1/10 | 1.28 | 79.9 | 90.88 | 2.5 | 3.31 |
| Ag-19 | 635/1/10 | 1.28 | 67.1 | 84.58 | 3.58 | 3.24 |
| Ag-20 | 635/1/10 | 1.30 | 80.7 | 91.4 | 5.14 | 8.57 |
| Ag-21 | 635/1/10 | 1.26 | 17.2 | 40.14 | 10.14 | −0.13 |
| Ag-22 | 635/1/10 | 1.27 | 35.1 | 54.92 | 30.14 | 34.44 |
| Ag-23 | 635/1/10 | 1.27 | 15.8 | 29.58 | 37.33 | 46.53 |
| Ag-24 | 635/1/10 | 1.29 | 59.5 | 78.27 | 4.37 | −0.11 |
| Ag-19 | 635/2/10 | 1.27 | 36.9 | 65.94 | −0.53 | 17.41 |
| Ag-20 | 635/2/10 | 1.29 | 76.6 | 93.27 | −5.41 | 22.51 |
| Ag-21 | 635/2/10 | 1.26 | 0.4 | 1.28 | 1.76 | 1.45 |
| Ag-22 | 635/2/10 | 1.28 | 25.2 | 42.76 | 29.96 | 47.39 |
| Ag-23 | 635/2/10 | 1.27 | 1.4 | 3.97 | 1.91 | −0.02 |
| Ag-24 | 635/2/10 | 1.30 | 44.3 | 71.69 | 3.05 | 12.22 |
| Ag-19 | 640/0.5/10 | 1.30 | 49.2 | 72.62 | 5.98 | 9.06 |
| Ag-20 | 640/0.5/10 | 1.27 | 77.5 | 89.29 | 7.12 | 9.32 |
| Ag-21 | 640/0.5/10 | 1.28 | 14.4 | 39.19 | 13.64 | 0.14 |
| Ag-22 | 640/0.5/10 | 1.26 | 47.6 | 67.68 | 20.56 | 21.8 |
| Ag-23 | 640/0.5/10 | 1.25 | 47.4 | 73.27 | 21.82 | 101.59 |
| Ag-24 | 640/0.5/10 | 1.28 | 71.6 | 86.14 | 4.05 | 0.38 |
| Ag-19 | 650/0.5/10 | 1.31 | 59.2 | 81.01 | 3.36 | 10.21 |
| Ag-20 | 650/0.5/10 | 1.31 | 76.7 | 93.44 | −5.26 | 21.04 |
| Ag-21 | 650/0.5/10 | 1.32 | 5.3 | 20.93 | 4.42 | 17.31 |
| Ag-22 | 650/0.5/10 | 1.31 | 27.8 | 47.96 | 24.34 | 42.2 |
| Ag-23 | 650/0.5/10 | 1.29 | 48.8 | 77.89 | 7.06 | 92.68 |
| Ag-24 | 650/0.5/10 | 1.29 | 29.3 | 62.01 | −3.99 | 25.51 |
| Ag-24 | 645/0.5/10 | 1.22 | 22.6 | 53.04 | −2.71 | 16.67 |

Tables 20A-20E show example glass compositions (in terms of mol %) containing transition metal oxides and/or rare earth oxides as colorant(s), including the total amount of transition metal oxides and/or rare earth oxides present (i.e., Sum "TM+RE").

TABLE 20A

| Example (mol %) | TM-1 | TM-2 | TM-3 | TM-4 | TM-5 | TM-6 | TM-7 | TM-8 | TM-9 | TM-10 |
|---|---|---|---|---|---|---|---|---|---|---|
| $SiO_2$ | 61.74 | 60.04 | 61.06 | 61.24 | 61.20 | 60.38 | 59.54 | 61.59 | 61.62 | 61.34 |
| $Al_2O_3$ | 15.04 | 15.86 | 15.39 | 15.39 | 15.42 | 15.51 | 15.98 | 15.28 | 15.09 | 15.32 |
| $B_2O_3$ | 6.06 | 6.19 | 6.05 | 5.95 | 5.9 | 5.93 | 5.9 | 6.01 | 5.94 | 5.94 |
| $Li_2O$ | 9.03 | 8.93 | 8.94 | 9.93 | 9.95 | 8.65 | 8.69 | 9.28 | 9.3 | 9.39 |
| $Na_2O$ | 1.41 | 1.4 | 1.4 | 1.5 | 1.5 | 1.41 | 1.52 | 1.38 | 1.47 | 1.46 |
| $K_2O$ | 0.2 | 0.2 | 0.2 | 0.2 | 0.2 | 0.2 | 0.19 | 0.2 | 0.2 | 0.2 |
| CaO | 5.25 | 6.12 | 3.84 | 1.32 | 2.53 | 3.83 | 1.88 | 4.16 | 4.19 | 4.25 |
| MgO | 0.99 | 1 | 2.88 | 4.24 | 3.08 | 2.88 | 5.05 | 1.89 | 1.9 | 1.93 |
| NiO | 0.0154 | 0.0178 | 0.0170 | 0.0161 | 0.0154 | 0.0000 | 0.0000 | 0.0163 | 0.0000 | 0.0234 |
| $CO_3O_4$ | 0.0001 | 0.0001 | 0.0001 | 0.0000 | 0.0000 | 0.0000 | 0.0000 | 0.0000 | 0.0023 | 0.0094 |
| $Cr_2O_3$ | 0.0297 | 0.0287 | 0.0272 | 0.0280 | 0.0266 | 0.0008 | 0.0008 | 0.0256 | 0.0000 | 0.0000 |
| CuO | 0.2207 | 0.1959 | 0.1906 | 0.1750 | 0.1758 | 0.0008 | 0.0000 | 0.1638 | 0.2810 | 0.1165 |
| $CeO_2$ | 0.0000 | 0.0000 | 0.0000 | 0.0000 | 0.0000 | 0.2100 | 0.2100 | 0.0000 | 0.0000 | 0.0000 |
| $TiO_2$ | 0.01 | 0.01 | 0.01 | 0.01 | 0.01 | 0.99 | 1.02 | 0.01 | 0.01 | 0.01 |
| Sum TM + RE | 0.2759 | 0.2525 | 0.2449 | 0.2291 | 0.2278 | 1.2016 | 1.2308 | 0.2157 | 0.2933 | 0.1593 |

TABLE 20B

| Example (mol %) | TM-11 | TM-12 | TM-13 | TM-14 | TM-15 | TM-16 | TM-17 | TM-18 | TM-19 | TM-20 |
|---|---|---|---|---|---|---|---|---|---|---|
| $SiO_2$ | 61.06 | 61.24 | 61.14 | 61.48 | 61.47 | 61.13 | 61.11 | 61.32 | 61.1 | 61.18 |
| $Al_2O_3$ | 15.39 | 15.39 | 15.41 | 15.58 | 14.54 | 14.65 | 15.75 | 15.29 | 14.87 | 14.65 |
| $B_2O_3$ | 6.05 | 5.95 | 5.91 | 6.03 | 5.92 | 5.9 | 5.79 | 5.84 | 5.95 | 6.14 |
| $Li_2O$ | 8.94 | 9.93 | 9.96 | 9.69 | 9.92 | 10 | 9.24 | 9.35 | 9.96 | 10.05 |
| $Na_2O$ | 1.4 | 1.5 | 1.49 | 1.48 | 1.83 | 1.83 | 1.36 | 1.47 | 1.86 | 1.86 |
| $K_2O$ | 0.2 | 0.2 | 0.2 | 0.2 | 0.19 | 0.19 | 0.17 | 0.2 | 0.2 | 0.19 |
| CaO | 3.84 | 1.32 | 3.74 | 1.31 | 1.99 | 2.03 | 4.31 | 4.23 | 2.06 | 2.02 |
| MgO | 2.88 | 4.24 | 1.92 | 4.22 | 1.92 | 1.94 | 2.01 | 1.99 | 1.98 | 1.94 |
| NiO | 0.0170 | 0.0161 | 0.0164 | 0.0000 | 0.0000 | 0.0000 | 0.0215 | 0.0000 | 0.0000 | 0.0000 |
| $CO_3O_4$ | 0.0001 | 0.0000 | 0.0000 | 0.0000 | 0.0000 | 0.0000 | 0.0000 | 0.0025 | 0.0000 | 0.0000 |
| $Cr_2O_3$ | 0.0272 | 0.0280 | 0.0269 | 0.0000 | 0.0000 | 0.0000 | 0.0270 | 0.0000 | 0.0000 | 0.0000 |
| CuO | 0.1906 | 0.1750 | 0.1693 | 0.0000 | 0.0000 | 0.0000 | 0.1761 | 0.2642 | 0.0000 | 0.0000 |
| $CeO_2$ | 0.0000 | 0.0000 | 0.0000 | 0.0000 | 0.2000 | 0.2100 | 0.0000 | 0.0000 | 0.4200 | 0.4100 |
| $TiO_2$ | 0.01 | 0.01 | 0.01 | 0.01 | 0.99 | 0.99 | 0.01 | 0.05 | 1.01 | 1 |
| Sum TM + RE | 0.2449 | 0.2291 | 0.2226 | 0.0100 | 1.1900 | 1.2000 | 0.2346 | 0.3167 | 1.4300 | 1.4100 |

TABLE 20C

| Example | TM-21 | TM-22 | TM-23 |
|---|---|---|---|
| $SiO_2$ | 61.42 | 61.39 | 61.04 |
| $Al_2O_3$ | 14.92 | 14.87 | 14.73 |
| $B_2O_3$ | 5.62 | 5.78 | 5.8 |
| $Li_2O$ | 9.91 | 9.85 | 9.94 |
| $Na_2O$ | 1.87 | 1.86 | 1.84 |
| $K_2O$ | 0.2 | 0.2 | 0.19 |
| CaO | 2.06 | 2.06 | 2.03 |
| MgO | 1.99 | 1.97 | 1.95 |
| NiO | 0.0000 | 0.0000 | 0.0000 |

TABLE 20C-continued

| Example | TM-21 | TM-22 | TM-23 |
|---|---|---|---|
| $Co_3O_4$ | 0.0000 | 0.0000 | 0.0000 |
| $Cr_2O_3$ | 0.0000 | 0.0000 | 0.0000 |
| CuO | 0.0000 | 0.0000 | 0.0000 |
| $CeO_2$ | 0.4200 | 0.4200 | 0.4200 |
| $TiO_2$ | 1.02 | 1.02 | 1.01 |
| Sum TM + RE | 1.4400 | 1.4400 | 1.4300 |

TABLE 20D

| Example (mol %) | TM-24 | TM-25 | TM-26 | TM-27 | TM-28 | TM-29 | TM-30 | TM-31 | TM-32 | TM-33 |
|---|---|---|---|---|---|---|---|---|---|---|
| $SiO_2$ | 58.63 | 59.17 | 58.78 | 58.51 | 58.74 | 59.71 | 60.28 | 60.15 | 59.03 | 61.64 |
| $Al_2O_3$ | 16.38 | 16.61 | 16.52 | 16.52 | 16.30 | 16.46 | 16.48 | 15.79 | 16.35 | 15.05 |
| $B_2O_3$ | 6.05 | 5.71 | 5.95 | 6.06 | 6.09 | 5.95 | 6.08 | 6.14 | 5.85 | 5.87 |
| $Li_2O$ | 9.95 | 11.13 | 10.91 | 10.50 | 10.05 | 10.45 | 10.24 | 8.95 | 11.86 | 12.03 |
| $Na_2O$ | 4.28 | 5.76 | 5.23 | 4.77 | 4.27 | 4.78 | 4.29 | 1.41 | 6.32 | 3.93 |
| $K_2O$ | 0.20 | 0.19 | 0.19 | 0.20 | 0.19 | 0.20 | 0.20 | 0.20 | 0.19 | 0.39 |
| CaO | 0.04 | 0.02 | 0.03 | 0.04 | 0.05 | 0.03 | 0.03 | 1.98 | 0.08 | 0.02 |
| MgO | 3.96 | 0.99 | 2.00 | 3.01 | 3.92 | 1.99 | 2.00 | 5.01 | 0.00 | 0.75 |
| NiO | 0.01 | 0.01 | 0.01 | 0.01 | 0.01 | 0.01 | 0.01 | 0.01 | 0.00 | 0.01 |
| $CO_3O_4$ | 0.0044 | 0.0040 | 0.0044 | 0.0044 | 0.0044 | 0.0040 | 0.0044 | 0.0052 | 0.0132 | 0.0040 |
| $Cr_2O_3$ | 0.00 | 0.0138 | 0.0147 | 0.0147 | 0.0146 | 0.0147 | 0.0147 | 0.0176 | 0.0112 | 0.0116 |

TABLE 20D-continued

| Example (mol %) | TM-24 | TM-25 | TM-26 | TM-27 | TM-28 | TM-29 | TM-30 | TM-31 | TM-32 | TM-33 |
|---|---|---|---|---|---|---|---|---|---|---|
| CuO | 0.0027 | 0.0024 | 0.0021 | 0.0024 | 0.0021 | 0.0021 | 0.0021 | 0.0001 | 0.0027 | 0.0118 |
| $CeO_2$ | 0.0004 | 0.0258 | 0.0267 | 0.0267 | 0.0262 | 0.0263 | 0.0268 | 0.0291 | 0.0274 | 0.0240 |
| $TiO_2$ | 0.3340 | 0.2222 | 0.1944 | 0.2130 | 0.2046 | 0.2305 | 0.2183 | 0.1987 | 0.1659 | 0.1673 |
| Sum TM + RE | 0.3371 | 0.2653 | 0.2380 | 0.2568 | 0.2476 | 0.2736 | 0.2619 | 0.2455 | 0.2072 | 0.2047 |

TABLE 20E

| Example | TM-34 | TM-35 | TM-36 |
|---|---|---|---|
| $SiO_2$ | 60.95 | 61.66 | 60.89 |
| $Al_2O_3$ | 15.44 | 15.11 | 15.61 |
| $B_2O_3$ | 5.80 | 5.94 | 6.12 |
| $Li_2O$ | 9.78 | 11.97 | 9.49 |
| $Na_2O$ | 1.56 | 3.94 | 1.52 |
| $K_2O$ | 0.20 | 0.39 | 0.19 |
| CaO | 4.28 | 0.76 | 4.17 |
| MgO | 1.97 | 0.03 | 1.99 |
| NiO | 0.0000 | 0.0173 | 0.0000 |
| $Co_3O_4$ | 0.0017 | 0.0025 | 0.0010 |
| $Cr_2O_3$ | 0.0034 | 0.0277 | 0.0000 |
| CuO | 0.0000 | 0.1380 | 0.0000 |
| $CeO_2$ | 0.00 | 0.00 | 0.00 |

TABLE 20E-continued

| Example | TM-34 | TM-35 | TM-36 |
|---|---|---|---|
| $TiO_2$ | 0.01 | 0.01 | 0.01 |
| Sum TM + RE | 0.0052 | 0.1855 | 0.0010 |

Tables 21A-21 C show the dielectric constant (calculated) and dielectric constant (as measured at 10 GHz) for select examples from Tables 20A-20E. When calculated, the dielectric constant was calculated according to the formula: Dk=3.802946+0.01747*$B_2O_3$ (mol %)+0.058769*$Al_2O_3$ (mol %)+0.080876*$Li_2O$ (mol %)+0.148433*$Na_2O$ (mol %)+0.153264*$K_2O$ (mol %)+0.045179*MgO (mol %)+0.080113*CaO (mol %). Where measured, the dielectric constant was measured using a split post dielectric resonator (SPDR at a frequency of 10 GHz. Tables 21A-21C also show the CIELAB L*, a*, and b* coordinates for select examples from Tables 20A-2E at the indicated thickness.

TABLE 21A

| Example | TM-1 | TM-2 | TM-3 | TM-4 | TM-5 | TM-6 | TM-7 | TM-8 | TM-9 | TM-10 |
|---|---|---|---|---|---|---|---|---|---|---|
| Dk Relationship (calculated) | 6.2283 | 6.3393 | 6.2123 | 6.1651 | 6.2121 | 6.1945 | 6.1815 | 6.2106 | 6.2161 | 6.2415 |
| Dk (measured at 10 GHz) | 6.13 | 6.23 | 6.18 | 6.15 | 6.19 | 6.29 | 6.21 | 6.22 | | |
| L* | | | | | | | | 90.61 | 92.48 | 88.24 |
| a* | | | | | | | | −8.02 | −4.39 | −1.61 |
| b* | | | | | | | | 4.61 | −3.85 | −4.42 |
| Thickness (mm) | | | | | | | | 1.32 | 1.38 | 1.36 |

TABLE 21B

| Example | TM-11 | TM-12 | TM-13 | TM-14 | TM-15 | TM-16 | TM-17 | TM-18 | TM-19 | TM-20 |
|---|---|---|---|---|---|---|---|---|---|---|
| Dk Relationship (calculated) | 6.2123 | 6.1651 | 6.2555 | 6.1535 | 6.1101 | 6.1268 | 6.2410 | 6.2374 | 6.1475 | 6.1387 |
| Dk (measured at 10 GHz) | | | | | | | | | | |
| L* | 90.14 | 90.81 | 90.81 | 96.81 | 96.68 | 96.63 | 89.23 | 92.76 | 96.11 | 96.11 |
| a* | −8.48 | −7.43 | −7.6 | −0.02 | −0.4 | −0.39 | −7.87 | −4.26 | −1.36 | −1.36 |
| b* | 4.91 | 4.98 | 4.79 | 0.2 | 1.28 | 1.47 | 3.88 | −3.53 | 4.76 | 4.76 |
| Thickness (mm) | 1.38 | 1.34 | 1.34 | 1.32 | 1.34 | 1.34 | 1.32 | 1.37 | 1.34 | 1.34 |

TABLE 21C

| Example | TM-21 | TM-22 | TM-23 | TM-24 | TM-28 | TM-34 | TM-35 | TM-36 |
|---|---|---|---|---|---|---|---|---|
| Dk Relationship (calculated) | 6.1426 | 6.1352 | 6.1268 | | | 5.95 | 6.41 | 5.94 |

TABLE 21C-continued

| Example | TM-21 | TM-22 | TM-23 | TM-24 | TM-28 | TM-34 | TM-35 | TM-36 |
|---|---|---|---|---|---|---|---|---|
| Dk (measured at 10 GHz) | | | | 6.42 | 6.52 | 6.23 | 6.41 | 6.24 |
| L* | 96.11 | 96.11 | 96.22 | | | | | |
| a* | −1.36 | −1.36 | −1.3 | | | | | |
| b* | 4.76 | 4.76 | 4.44 | | | | | |
| Thickness (mm) | 1.34 | 1.34 | 1.36 | | | | | |

Tables 22A and 22B show the ion exchange characteristic (CS, DOL, and CT) for select glass articles from Tables 20A-20D at different thicknesses and ion exchange conditions (temperature, time, and ion exchange bath compositions).

TABLE 22A

| Example | Thickness (mm) | Temp (° C.) | Time (hrs.) | $KNO_3$ (wt. %) | $NaNO_3$ (wt. %) | $LiNO_3$ (wt. %) | CS (MPa) | DOL (μm) | CT (MPa) |
|---|---|---|---|---|---|---|---|---|---|
| TM-24 | 0.6 | 440 | 6.5 | 79.2 | 19.4 | 1.4 | 599 | 5.62 | 104.67 |
| TM-25 | 0.6 | 430 | 4 | 79 | 19.4 | 1.6 | 633 | 6.02 | 129.51 |
| TM-26 | 0.6 | 430 | 4 | 79 | 19.4 | 1.6 | 661 | 5.03 | 124.41 |
| TM-27 | 0.6 | 430 | 4 | 79 | 19.4 | 1.6 | 700 | 3.83 | 119.67 |
| TM-28 | 0.6 | 430 | 4 | 79 | 19.4 | 1.6 | 684 | 3.97 | 117.14 |
| TM-28 | 0.6 | 430 | 8 | 79 | 19.4 | 1.6 | 615 | 4.79 | 131.67 |
| TM-28 | 0.6 | 430 | 16 | 79 | 19.4 | 1.6 | 559 | 6.82 | 97.64 |
| TM-28 | 0.6 | 440 | 6 | 79 | 19.4 | 1.6 | 600 | 5.29 | 109.95 |
| TM-28 | 0.6 | 440 | 6 | 79.2 | 19.4 | 1.4 | 651 | 4.67 | 108.80 |
| TM-28 | 0.6 | 440 | 7 | 79.2 | 19.4 | 1.4 | 600 | 5.40 | 110.20 |
| TM-28 | 0.6 | 440 | 6.5 | 79.2 | 19.4 | 1.4 | 589 | 5.56 | 105.80 |
| TM-29 | 0.6 | 430 | 4 | 79 | 19.4 | 1.6 | 643 | 5.56 | 142.52 |
| TM-30 | 0.6 | 430 | 4 | 79 | 19.4 | 1.6 | 681 | 5.24 | 127.46 |
| TM-31 | 0.6 | 450 | 4 | 90 | 10 | 0 | 902 | 3.52 | 110 |
| TM-31 | 0.6 | 450 | 8 | 90 | 10 | 0 | 832 | 4.52 | 160 |
| TM-31 | 0.6 | 450 | 12 | 90 | 10 | 0 | 758 | 5.62 | 191 |
| TM-31 | 0.6 | 450 | 8 | 89 | 10 | 1 | 773 | 3.54 | 110 |
| TM-31 | 0.6 | 450 | 12 | 89 | 10 | 1 | 673 | 4.65 | 138 |
| TM-31 | 0.6 | 450 | 8 | 88.5 | 10 | 1.5 | 695 | 3.64 | 96 |
| TM-31 | 0.6 | 450 | 12 | 88.5 | 10 | 1.5 | 639 | 4.17 | 109 |
| TM-13 | 0.6 | 450 | 4 | 90 | 10 | 0 | 900 | 3.99 | 133 |
| TM-13 | 0.6 | 450 | 8 | 90 | 10 | 0 | 786 | 5.61 | 187 |
| TM-13 | 0.6 | 450 | 12 | 90 | 10 | 0 | 721 | 7.55 | 174 |
| TM-13 | 0.6 | 450 | 8 | 89 | 10 | 1 | 721 | 4.89 | 139 |
| TM-13 | 0.6 | 450 | 12 | 89 | 10 | 1 | 661 | 5.76 | 143 |
| TM-13 | 0.6 | 450 | 8 | 88.5 | 10 | 1.5 | 704 | 4.39 | 114 |
| TM-13 | 0.6 | 450 | 12 | 88.5 | 10 | 1.5 | 636 | 5.69 | 113 |

TABLE 22B

| Example | Thickness (mm) | Temp (° C.) | Time (hrs.) | $KNO_3$ (wt. %) | $NaNO_3$ (wt. %) | $LiNO_3$ (wt. %) | CS (MPa) | DOL (μm) | CT (MPa) |
|---|---|---|---|---|---|---|---|---|---|
| TM-32 | 1.33 | 400 | 16 | 89 | 10 | 1 | 672 | 9.1 | 72 |
| TM-32 | 1.33 | 400 | 24 | 89 | 10 | 1 | 627 | 11.2 | 78 |
| TM-32 | 1.33 | 430 | 8 | 80 | 20 | 0 | 518 | 11.6 | 97 |
| TM-32 | 0.6 | 380 | 8 | 79 | 18.7 | 2.3 | 641 | 4.1 | 100 |
| TM-32 | 0.6 | 380 | 10 | 79 | 18.7 | 2.3 | 612 | 4.7 | 102 |
| TM-32 | 0.6 | 380 | 12 | 79 | 18.7 | 2.3 | 599 | 5.2 | 100 |
| TM-32 | 0.6 | 410 | 4 | 79 | 19.5 | 1.5 | 633 | 5.3 | 109 |
| TM-32 | 0.6 | 410 | 5 | 79 | 19.5 | 1.5 | 612 | 5.9 | 108 |
| TM-32 | 0.6 | 410 | 6 | 79 | 19.5 | 1.5 | 601 | 6.1 | 107 |
| TM-32 | 0.6 | 400 | 5 | 79 | 19.8 | 1.2 | 695 | 5.0 | 112 |
| TM-32 | 0.6 | 400 | 5 | 79 | 20.1 | 0.9 | 671 | 5.3 | 116 |
| TM-32 | 0.6 | 400 | 5 | 79 | 19.4 | 1.6 | 645 | 5.0 | 107 |
| TM-32 | 0.6 | 430 | 2.5 | 79 | 19.4 | 1.6 | 591 | 6.0 | 101 |
| TM-32 | 0.6 | 430 | 3 | 79 | 19.4 | 1.6 | 569 | 6.1 | 98 |
| TM-32 | 0.6 | 430 | 3.5 | 79 | 19.4 | 1.6 | 557 | 6.8 | 96 |
| TM-32 | 0.6 | 430 | 2.5 | 75.6 | 24 | 0.4 | 609 | 6.41 | 126 |
| TM-32 | 0.6 | 430 | 2.5 | 76 | 24 | 0 | 602 | 7.57 | 129 |

TABLE 22B-continued

| Example | Thickness (mm) | Temp (° C.) | Time (hrs.) | $KNO_3$ (wt. %) | $NaNO_3$ (wt. %) | $LiNO_3$ (wt. %) | CS (MPa) | DOL (μm) | CT (MPa) |
|---|---|---|---|---|---|---|---|---|---|
| TM-32 | 0.55 | 400 | 3 | 79 | 19.8 | 1.2 | 749 | 3.69 | 108 |
| TM-8 | 0.6 | 450 | 4 | 89.8 | 10 | 0.2 | 693 | 5.54 | 139 |
| TM-8 | 0.6 | 450 | 4 | 89.8 | 10 | 0.2 | 637 | 7.54 | 134 |
| TM-8 | 0.6 | 450 | 8 | 89.5 | 10 | 0.5 | 664 | 5.56 | 134 |
| TM-8 | 0.6 | 450 | 8 | 88.5 | 11 | 0.5 | 661 | 5.59 | 138 |
| TM-8 | 0.6 | 450 | 8 | 87.5 | 12 | 0.5 | 645 | 5.69 | 142 |
| TM-8 | 0.6 | 450 | 8 | 86.5 | 13 | 0.5 | 636 | 5.74 | 145 |
| TM-8 | 0.6 | 450 | 8 | 89.5 | 10 | 0.5 | 667 | 5.52 | 136 |
| TM-8 | 0.55 | 450 | 6.75 | 87.3 | 12.5 | 0.2 | 668 | 5.64 | 140 |
| TM-8 | 0.55 | 450 | 6.75 | 87.5 | 12.5 | 0 | 686 | 5.63 | 157 |
| TM-8 | 0.6 | 440 | 8 | 88 | 11 | 1 | 667 | 4.32 | 121 |
| TM-8 | 0.6 | 440 | 10 | 88 | 11 | 1 | 638 | 5.10 | 127 |
| TM-8 | 0.6 | 440 | 12 | 88 | 11 | 1 | 614 | 5.64 | 129 |

Table 23 shows the fracture toughness ($K_{IC}$) for select examples from Tables 20A-20D and a comparative example of a non-colored glass article comprising 58.41 mol % $SiO_2$ 6.07 mol % $B_2O_3$, 17.84 mol % $Al_2O_3$, 1.73 mol % $Na_2O$, 0.20 mol % $K_2O$, 4.43 mol % MgO, 0.57 mol % CaO, 0.01 mol % $SnO_2$, and 10.71 mol % $Li_2O$. The fracture toughness was measured using the chevron notch short bar method and the dual cantilever beam method.

TABLE 23

| Example | $K_{IC}$ CNSB ($MPa \cdot m^{1/2}$) | $K_{IC}$ DCB ($MPa \cdot m^{1/2}$) |
|---|---|---|
| TM-32 | 0.774 | 0.816 |
| TM-8 | 0.8 | 0.839 |
| TM-33 | 0.794 | 0.813 |
| Comparative Example | 0.786 | 0.877 |

Figure 50:
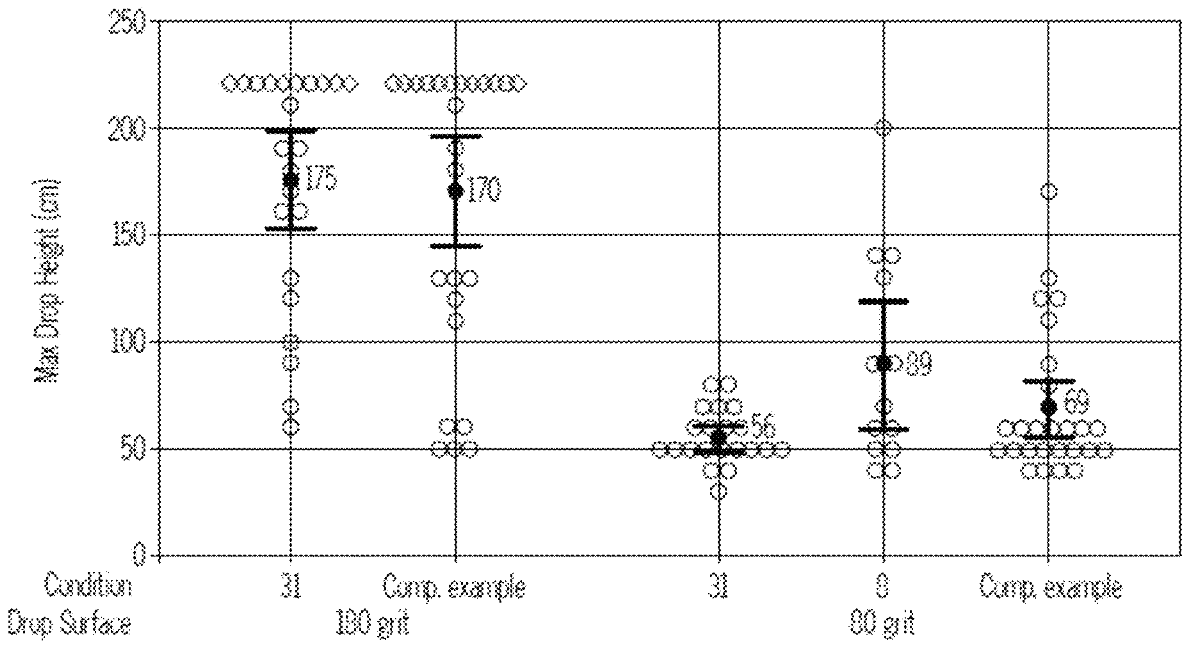
FIG. 50 graphically depicts the results of an incremental face drop on sandpaper (i.e., a "drop test") for select inventive examples and a comparative example.

FIG. 50 shows the results of an incremental face drop on sandpaper (i.e., a "drop test") for two different sandpaper conditions (180 grit) and (80 grit) for select examples from Tables 20A-20D and a comparative example of a non-colored glass article comprising 58.41 mol % $SiO_2$, 6.07 mol % $B_2O_3$, 17.84 mol % $Al_2O_3$, 1.73 mol % $Na_2O$, 0.20 mol % $K_2O$, 4.43 mol % MgO, 0.57 mol % CaO, 0.01 mol % $SnO_2$, and 10.71 mol % $Li_2O$. Prior to performing the drop test, the TM-33 samples were ion exchanged in a molten salt batch comprising 89.3 wt % $KNO_3$, 10 wt. % $NaNO_3$, and 0.7 wt. % $LiNO_3$ at 440° C. for 9 hours. The TM-8 samples were ion exchanged in a molten salt batch comprising 79 wt % $KNO_3$, 19.9 wt. % $NaNO_3$, and 1.6 wt. % $LiNO_3$ at 400° ° C. for 5 hours. The comparative examples were ion exchanged in a molten salt batch comprising 90.3 wt % $KNO_3$, 9 wt. % $NaNO_3$, and 0.7 wt. % $LiNO_3$ at 450° C. for 5 hours.

The circles in FIG. 50 indicate at what height the sample fractured. The diamonds represent samples that were dropped incrementally all the way to 220 cm and did not fracture. As exemplified by FIG. 50, Examples 8 and 32, colored glass articles exhibited similar drop performance as compared to a comparative example of a non-colored glass article.

Figure 51:
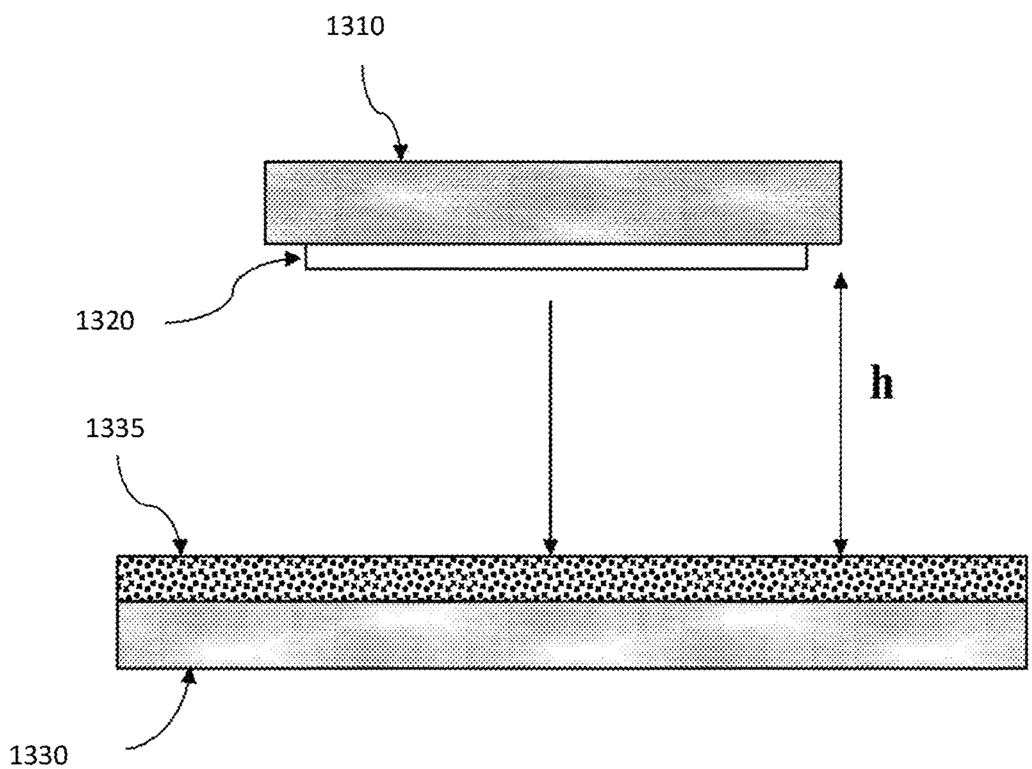
FIG. 51 schematically depicts a drop test conducted on ion exchange strengthened colored glass articles.

A typical drop test is schematically shown in FIG. 51. Each sample 1310 was affixed to a standard test vehicle 1320, which approximates the size, mass, and balance of a generic "smart" phone, and dropped from a drop height h onto a sheet of sandpaper 1330 having an abrasive surface 1335. The drop height h ranged from about 0.2 meter to 2.2 meters in incremental heights of 0.1 meter. Drop testing was carried out using a 180-grit silicon carbide sandpaper surface and an 80 grit silicon carbide sandpaper surface. The drop performance is reported in terms of the maximum drop height in cm before failure of the colored glass article.

Tables 24A and 24B show example glass compositions (in terms of mol %) containing transition metal oxides and/or rare earth oxides as colorant(s). Tables 24A and 24B also show the dielectric constant (Dk, as measured at 10 GHz) for the example compositions.

TABLE 24A

| Example (mol %) | TM-37 | TM-38 | TM-39 | TM-40 | TM-41 | TM-42 | TM-42 | TM-44 | TM-45 |
|---|---|---|---|---|---|---|---|---|---|
| $SiO_2$ | 58.5 | 59.5 | 59.6 | 59.2 | 59.1 | 61.1 | 61.5 | 59.1 | 59.3 |
| $Al_2O_3$ | 16.4 | 16.4 | 16.3 | 16.4 | 16.5 | 15.6 | 15.2 | 16.4 | 16.5 |
| $B_2O_3$ | 5.8 | 5.8 | 5.6 | 5.9 | 5.9 | 5.8 | 6.0 | 6.0 | 5.7 |
| $P_2O_5$ | 0.0 | 0.0 | 0.0 | 0.0 | 0.0 | 0.0 | 0.0 | 0.0 | 0.0 |
| $Li_2O$ | 11.8 | 9.2 | 8.7 | 9.4 | 9.0 | 9.3 | 8.2 | 9.4 | 8.8 |
| $Na_2O$ | 6.1 | 3.8 | 3.3 | 3.8 | 3.3 | 3.8 | 1.2 | 3.7 | 3.3 |
| $K_2O$ | 0.2 | 0.2 | 0.2 | 0.2 | 0.2 | 0.2 | 0.2 | 0.2 | 0.2 |
| MgO | 0.0 | 0.0 | 0.1 | 0.9 | 1.9 | 0.0 | 0.1 | 0.1 | 0.1 |
| CaO | 0.0 | 4.9 | 5.9 | 3.9 | 4.0 | 4.0 | 7.4 | 4.9 | 6.0 |
| $TiO_2$ | 1.0 | 0.0 | 0.0 | 0.0 | 0.0 | 0.0 | 0.0 | 0.0 | 0.0 |
| $Fe_2O_3$ | 0.00 | 0.00 | 0.00 | 0.00 | 0.00 | 0.00 | 0.01 | 0.00 | 0.00 |
| $CeO_2$ | 0.20 | 0.00 | 0.00 | 0.00 | 0.00 | 0.00 | 0.00 | 0.00 | 0.00 |
| NiO | 0.00 | 0.02 | 0.01 | 0.02 | 0.02 | 0.02 | 0.02 | 0.03 | 0.03 |
| $Co_3O_4$ | 0.00 | 0.00 | 0.00 | 0.00 | 0.00 | 0.00 | 0.00 | 0.01 | 0.01 |
| $Cr_2O_3$ | 0.00 | 0.03 | 0.03 | 0.03 | 0.03 | 0.03 | 0.03 | 0.00 | 0.00 |
| CuO | 0.00 | 0.16 | 0.16 | 0.16 | 0.16 | 0.16 | 0.16 | 0.12 | 0.13 |
| Cl | 0.01 | 0.01 | 0.01 | 0.01 | 0.01 | 0.01 | 0.01 | 0.01 | 0.01 |
| Dk | 6.7 | 6.44 | 6.44 | 6.43 | 6.39 | 6.37 | 6.23 | 6.47 | 6.46 |

TABLE 24A-continued

| Example (mol %) | TM-37 | TM-38 | TM-39 | TM-40 | TM-41 | TM-42 | TM-42 | TM-44 | TM-45 |
|---|---|---|---|---|---|---|---|---|---|
| (measured at 10 GHz) | | | | | | | | | |

TABLE 24B

| Example (mol %) | TM-46 | TM-47 | TM-48 | TM-49 | TM-50 | TM-51 | TM-52 | TM-52 | TM-54 |
|---|---|---|---|---|---|---|---|---|---|
| $SiO_2$ | 59.7 | 58.9 | 61.1 | 61.8 | 62.5 | 62.5 | 62.5 | 62.1 | 60.2 |
| $Al_2O_3$ | 16.3 | 16.7 | 15.5 | 15.2 | 14.8 | 14.7 | 14.8 | 15.2 | 15.9 |
| $B_2O_3$ | 5.8 | 5.9 | 5.9 | 5.6 | 6.0 | 6.0 | 6.0 | 5.9 | 6.0 |
| $P_2O_5$ | 0.0 | 0.0 | 0.0 | 0.0 | 0.0 | 0.0 | 0.0 | 0.0 | 0.0 |
| $Li_2O$ | 9.3 | 8.9 | 9.4 | 8.3 | 8.9 | 8.9 | 9.0 | 8.9 | 8.8 |
| $Na_2O$ | 3.7 | 3.3 | 3.8 | 1.2 | 1.4 | 1.4 | 1.4 | 1.4 | 1.4 |
| $K_2O$ | 0.2 | 0.2 | 0.2 | 0.2 | 0.2 | 0.2 | 0.2 | 0.2 | 0.2 |
| MgO | 0.9 | 1.9 | 0.0 | 0.1 | 1.9 | 2.9 | 3.9 | 5.1 | 0.1 |
| CaO | 3.9 | 4.0 | 3.9 | 7.5 | 4.1 | 3.1 | 2.1 | 1.1 | 7.2 |
| $TiO_2$ | 0.0 | 0.0 | 0.0 | 0.0 | 0.0 | 0.0 | 0.0 | 0.0 | 0.0 |
| $Fe_2O_3$ | 0.00 | 0.00 | 0.00 | 0.01 | 0.00 | 0.00 | 0.01 | 0.00 | 0.01 |
| $CeO_2$ | 0.00 | 0.00 | 0.00 | 0.00 | 0.00 | 0.00 | 0.00 | 0.00 | 0.00 |
| NiO | 0.03 | 0.03 | 0.03 | 0.03 | 0.02 | 0.02 | 0.02 | 0.02 | 0.02 |
| $Co_3O_4$ | 0.01 | 0.01 | 0.01 | 0.01 | 0.00 | 0.00 | 0.00 | 0.00 | 0.00 |
| $Cr_2O_3$ | 0.00 | 0.00 | 0.00 | 0.00 | 0.03 | 0.03 | 0.03 | 0.03 | 0.03 |
| CuO | 0.12 | 0.12 | 0.12 | 0.13 | 0.18 | 0.17 | 0.18 | 0.20 | 0.19 |
| Cl | 0.01 | 0.01 | 0.01 | 0.01 | 0.00 | 0.00 | 0.00 | 0.00 | 0.00 |
| Dk (measured at 10 GHz) | 6.44 | 6.38 | 6.34 | 6.18 | 6.44 | 6.44 | 6.43 | 6.39 | 6.37 |

Tables 25A-25BJ show example colored glass articles (in terms of mol %) containing transition metal oxides and/or rare earth oxides as colorant(s) and properties thereof. Examples TM476-TM442 were annealed at at 600° C. for 1 hour prior to analysis.

TABLE 25A

| Example | TM-55 | TM-56 | TM-57 | TM-58 | TM-59 | TM-60 | TM-61 | TM-62 | TM-63 | TM-64 |
|---|---|---|---|---|---|---|---|---|---|---|
| $SiO_2$ | 61.002 | 60.927 | 60.970 | 61.007 | 61.010 | 60.948 | 61.004 | 61.073 | 61.062 | 61.035 |
| $Al_2O_3$ | 15.489 | 15.485 | 15.422 | 15.381 | 15.380 | 15.350 | 15.307 | 15.296 | 15.263 | 15.237 |
| $B_2O_3$ | 6.051 | 6.055 | 6.050 | 6.048 | 6.007 | 6.008 | 6.006 | 6.011 | 6.013 | 6.015 |
| $P_2O_5$ | 0.000 | 0.000 | 0.000 | 0.000 | 0.000 | 0.000 | 0.000 | 0.000 | 0.000 | 0.000 |
| $Li_2O$ | 9.486 | 9.491 | 9.483 | 9.481 | 9.396 | 9.397 | 9.394 | 9.317 | 9.319 | 9.323 |
| $Na_2O$ | 1.581 | 1.601 | 1.608 | 1.612 | 1.655 | 1.700 | 1.673 | 1.680 | 1.695 | 1.710 |
| $K_2O$ | 0.196 | 0.197 | 0.199 | 0.196 | 0.197 | 0.202 | 0.196 | 0.196 | 0.196 | 0.197 |
| MgO | 1.959 | 1.949 | 1.921 | 1.902 | 1.867 | 1.861 | 1.846 | 1.833 | 1.828 | 1.808 |
| CaO | 4.201 | 4.214 | 4.211 | 4.204 | 4.229 | 4.237 | 4.240 | 4.246 | 4.258 | 4.259 |
| ZnO | 0.000 | 0.000 | 0.000 | 0.001 | 0.001 | 0.001 | 0.001 | 0.001 | 0.000 | 0.000 |
| $SnO_2$ | 0.001 | 0.002 | 0.002 | 0.003 | 0.002 | 0.003 | 0.002 | 0.003 | 0.002 | 0.003 |
| $Fe_2O_3$ | 0.007 | 0.007 | 0.007 | 0.007 | 0.008 | 0.007 | 0.007 | 0.007 | 0.007 | 0.007 |
| $TiO_2$ | 0.016 | 0.048 | 0.088 | 0.108 | 0.172 | 0.199 | 0.223 | 0.233 | 0.248 | 0.281 |
| $CeO_2$ | 0.009 | 0.020 | 0.037 | 0.045 | 0.073 | 0.084 | 0.096 | 0.102 | 0.105 | 0.122 |
| $ZrO_2$ | 0.002 | 0.003 | 0.004 | 0.004 | 0.004 | 0.003 | 0.003 | 0.004 | 0.003 | 0.004 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 0.025 | 0.068 | 0.125 | 0.153 | 0.244 | 0.283 | 0.319 | 0.334 | 0.353 | 0.403 |
| $R_2O$ | 11.262 | 11.289 | 11.290 | 11.289 | 11.248 | 11.299 | 11.263 | 11.192 | 11.211 | 11.230 |
| $Li_2O + Na_2O$ | 11.067 | 11.092 | 11.091 | 11.093 | 11.051 | 11.097 | 11.067 | 10.996 | 11.014 | 11.033 |
| $R_2O - Al_2O_3$ | −4.227 | −4.196 | −4.132 | −4.092 | −4.132 | −4.052 | −4.044 | −4.104 | −4.052 | −4.007 |
| R'O | 6.160 | 6.163 | 6.131 | 6.107 | 6.097 | 6.099 | 6.087 | 6.080 | 6.086 | 6.067 |
| Thickness (mm) | 2.400 | 2.400 | 2.400 | 2.400 | 2.400 | 2.400 | 2.400 | 2.400 | 2.400 | 2.400 |
| L* | 96.82 | 96.83 | 96.86 | 96.87 | 96.88 | 96.87 | 96.87 | 96.84 | 96.87 | 96.85 |
| a* | −0.07 | −0.07 | −0.06 | −0.05 | −0.06 | −0.08 | −0.1 | −0.1 | −0.11 | −0.14 |

TABLE 25A-continued

| Example | TM-55 | TM-56 | TM-57 | TM-58 | TM-59 | TM-60 | TM-61 | TM-62 | TM-63 | TM-64 |
|---|---|---|---|---|---|---|---|---|---|---|
| b* | 0.29 | 0.29 | 0.3 | 0.32 | 0.4 | 0.49 | 0.57 | 0.62 | 0.66 | 0.81 |
| Density ($g/cm^3$) | | | | | | | | | | |
| Liquidus Temp. (° C.) | | | | | | | | | | |

TABLE 25B

| Example | TM-65 | TM-66 | TM-67 | TM-68 | TM-69 | TM-70 | TM-71 | TM-72 | TM-73 | TM-74 |
|---|---|---|---|---|---|---|---|---|---|---|
| $SiO_2$ | 60.976 | 60.958 | 60.918 | 60.830 | 60.802 | 60.816 | 60.779 | 60.702 | 60.716 | 60.696 |
| $Al_2O_3$ | 15.190 | 15.176 | 15.147 | 15.121 | 15.063 | 14.993 | 14.977 | 14.982 | 14.810 | 14.781 |
| $B_2O_3$ | 6.021 | 6.020 | 6.021 | 6.050 | 6.051 | 6.005 | 6.006 | 6.008 | 6.010 | 6.011 |
| $P_2O_5$ | 0.000 | 0.000 | 0.000 | 0.000 | 0.000 | 0.000 | 0.000 | 0.000 | 0.000 | 0.000 |
| $Li_2O$ | 9.382 | 9.380 | 9.382 | 9.290 | 9.293 | 9.335 | 9.337 | 9.340 | 9.343 | 9.344 |
| $Na_2O$ | 1.716 | 1.729 | 1.742 | 1.786 | 1.814 | 1.829 | 1.843 | 1.850 | 1.893 | 1.908 |
| $K_2O$ | 0.200 | 0.198 | 0.199 | 0.197 | 0.199 | 0.198 | 0.199 | 0.197 | 0.200 | 0.200 |
| MgO | 1.788 | 1.780 | 1.769 | 1.729 | 1.699 | 1.666 | 1.658 | 1.651 | 1.581 | 1.567 |
| CaO | 4.255 | 4.256 | 4.275 | 4.321 | 4.323 | 4.334 | 4.335 | 4.359 | 4.360 | 4.372 |
| ZnO | 0.001 | 0.000 | 0.001 | 0.000 | 0.000 | 0.000 | 0.000 | 0.000 | 0.000 | 0.000 |
| $SnO_2$ | 0.003 | 0.003 | 0.003 | 0.002 | 0.003 | 0.003 | 0.003 | 0.003 | 0.003 | 0.003 |
| $Fe_2O_3$ | 0.007 | 0.007 | 0.007 | 0.007 | 0.006 | 0.006 | 0.006 | 0.006 | 0.006 | 0.006 |
| $TiO_2$ | 0.321 | 0.345 | 0.371 | 0.466 | 0.522 | 0.570 | 0.602 | 0.635 | 0.763 | 0.788 |
| $CeO_2$ | 0.137 | 0.145 | 0.161 | 0.197 | 0.221 | 0.241 | 0.250 | 0.263 | 0.312 | 0.320 |
| $ZrO_2$ | 0.003 | 0.003 | 0.004 | 0.004 | 0.004 | 0.004 | 0.004 | 0.005 | 0.004 | 0.005 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 0.458 | 0.489 | 0.532 | 0.663 | 0.743 | 0.811 | 0.853 | 0.897 | 1.075 | 1.107 |
| $R_2O$ | 11.298 | 11.308 | 11.323 | 11.274 | 11.306 | 11.362 | 11.379 | 11.387 | 11.435 | 11.452 |
| $Li_2O + Na_2O$ | 11.098 | 11.110 | 11.124 | 11.076 | 11.106 | 11.164 | 11.180 | 11.190 | 11.235 | 11.252 |
| $R_2O - Al_2O_3$ | −3.893 | −3.868 | −3.824 | −3.848 | −3.757 | −3.630 | −3.597 | −3.595 | −3.375 | −3.329 |
| R'O | 6.044 | 6.036 | 6.046 | 6.050 | 6.022 | 5.999 | 5.993 | 6.010 | 5.941 | 5.939 |
| Thickness (mm) | 2.400 | 2.400 | 2.400 | 2.400 | 2.400 | 2.400 | 2.400 | 2.400 | 2.400 | 2.400 |
| L* | 96.84 | 96.82 | 96.81 | 96.78 | 96.75 | 96.71 | 96.69 | 96.67 | 96.57 | 96.53 |
| a* | −0.18 | −0.2 | −0.23 | −0.33 | −0.39 | −0.47 | −0.51 | −0.56 | −0.74 | −0.79 |
| b* | 0.97 | 1.08 | 1.22 | 1.72 | 2.05 | 2.46 | 2.65 | 2.96 | 3.99 | 4.26 |
| Density ($g/cm^3$) | | | | | | | | | | |
| Liquidus Temp. (° C.) | | | | | | | | | | |

TABLE 25C

| Example | TM-75 | TM-76 | TM-77 | TM-78 | TM-79 | TM-80 | TM-81 | TM-82 | TM-83 | TM-84 |
|---|---|---|---|---|---|---|---|---|---|---|
| $SiO_2$ | 60.631 | 60.704 | 60.669 | 60.654 | 60.659 | 60.639 | 60.654 | 60.777 | 60.742 | 60.733 |
| $Al_2O_3$ | 14.741 | 14.741 | 14.749 | 14.758 | 14.738 | 14.739 | 14.725 | 14.647 | 14.654 | 14.635 |
| $B_2O_3$ | 6.012 | 6.041 | 6.042 | 6.040 | 6.040 | 6.040 | 5.987 | 5.986 | 5.987 | 5.986 |
| $P_2O_5$ | 0.000 | 0.000 | 0.000 | 0.000 | 0.000 | 0.000 | 0.000 | 0.000 | 0.000 | 0.000 |
| $Li_2O$ | 9.347 | 9.104 | 9.106 | 9.103 | 9.103 | 9.103 | 9.128 | 9.126 | 9.127 | 9.127 |
| $Na_2O$ | 1.931 | 1.972 | 1.966 | 1.971 | 1.976 | 1.975 | 1.991 | 1.981 | 1.982 | 1.995 |
| $K_2O$ | 0.201 | 0.202 | 0.203 | 0.200 | 0.201 | 0.199 | 0.201 | 0.201 | 0.202 | 0.199 |
| MgO | 1.544 | 1.537 | 1.529 | 1.530 | 1.527 | 1.519 | 1.513 | 1.489 | 1.490 | 1.491 |
| CaO | 4.396 | 4.427 | 4.439 | 4.438 | 4.438 | 4.449 | 4.451 | 4.427 | 4.434 | 4.439 |
| ZnO | 0.000 | 0.000 | 0.000 | 0.000 | 0.000 | 0.000 | 0.000 | 0.000 | 0.001 | 0.000 |
| $SnO_2$ | 0.003 | 0.003 | 0.003 | 0.003 | 0.003 | 0.003 | 0.003 | 0.003 | 0.003 | 0.003 |
| $Fe_2O_3$ | 0.006 | 0.006 | 0.006 | 0.006 | 0.006 | 0.006 | 0.006 | 0.006 | 0.006 | 0.006 |
| $TiO_2$ | 0.844 | 0.902 | 0.918 | 0.926 | 0.934 | 0.950 | 0.958 | 0.966 | 0.979 | 0.991 |
| $CeO_2$ | 0.338 | 0.359 | 0.365 | 0.367 | 0.370 | 0.373 | 0.379 | 0.387 | 0.388 | 0.391 |
| $ZrO_2$ | 0.005 | 0.004 | 0.004 | 0.004 | 0.005 | 0.004 | 0.004 | 0.004 | 0.004 | 0.005 |
| $La_2O_3$ | | | | | | | | | | |
| $SO_3$ | | | | | | | | | | |

TABLE 25C-continued

| Example | TM-75 | TM-76 | TM-77 | TM-78 | TM-79 | TM-80 | TM-81 | TM-82 | TM-83 | TM-84 |
|---|---|---|---|---|---|---|---|---|---|---|
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.182 | 1.261 | 1.283 | 1.292 | 1.304 | 1.323 | 1.337 | 1.353 | 1.367 | 1.381 |
| $R_2O$ | 11.479 | 11.278 | 11.275 | 11.274 | 11.281 | 11.278 | 11.320 | 11.309 | 11.312 | 11.320 |
| $Li_2O + Na_2O$ | 11.277 | 11.076 | 11.072 | 11.074 | 11.079 | 11.079 | 11.119 | 11.107 | 11.109 | 11.122 |
| $R_2O - Al_2O_3$ | −3.262 | −3.463 | −3.474 | −3.483 | −3.458 | −3.461 | −3.405 | −3.338 | −3.343 | −3.315 |
| R'O | 5.940 | 5.963 | 5.968 | 5.968 | 5.964 | 5.968 | 5.964 | 5.916 | 5.926 | 5.929 |
| Thickness (mm) | 2.400 | 2.400 | 2.400 | 2.400 | 2.400 | 2.400 | 2.400 | 2.400 | 2.400 | 2.400 |
| L* | 96.44 | 96.37 | 96.36 | 96.34 | 96.3 | 96.32 | 96.3 | 96.27 | 96.26 | 96.24 |
| a* | −0.89 | −0.99 | −1.01 | −1.03 | −1.05 | −1.07 | −1.1 | −1.12 | −1.15 | −1.17 |
| b* | 4.9 | 5.52 | 5.65 | 5.78 | 5.91 | 6.05 | 6.2 | 6.36 | 6.54 | 6.67 |
| Density ($g/cm^3$) | | | | | | | | | | |
| Liquidus Temp. (° C.) | | | | | | | | | | |

TABLE 25D

| Example | TM-85 | TM-86 | TM-87 | TM-88 | TM-89 | TM-90 | TM-91 | TM-92 | TM-93 | TM-94 |
|---|---|---|---|---|---|---|---|---|---|---|
| $SiO_2$ | 60.647 | 60.851 | 60.921 | 60.845 | 60.809 | 60.660 | 60.650 | 60.706 | 60.692 | 60.684 |
| $Al_2O_3$ | 14.685 | 14.689 | 14.621 | 14.656 | 14.674 | 14.606 | 14.621 | 14.595 | 14.584 | 14.598 |
| $B_2O_3$ | 5.989 | 6.014 | 6.012 | 6.014 | 6.016 | 6.038 | 6.039 | 6.038 | 6.039 | 6.040 |
| $P_2O_5$ | 0.000 | 0.000 | 0.000 | 0.000 | 0.000 | 0.000 | 0.000 | 0.000 | 0.000 | 0.000 |
| $Li_2O$ | 9.130 | 8.904 | 8.901 | 8.903 | 8.906 | 9.099 | 9.101 | 9.100 | 9.101 | 9.102 |
| $Na_2O$ | 1.995 | 1.991 | 2.005 | 2.013 | 2.009 | 2.015 | 2.006 | 1.995 | 2.006 | 2.008 |
| $K_2O$ | 0.200 | 0.201 | 0.203 | 0.202 | 0.200 | 0.203 | 0.201 | 0.200 | 0.200 | 0.202 |
| MgO | 1.490 | 1.492 | 1.481 | 1.488 | 1.485 | 1.481 | 1.479 | 1.472 | 1.474 | 1.474 |
| CaO | 4.455 | 4.446 | 4.433 | 4.445 | 4.447 | 4.436 | 4.436 | 4.425 | 4.425 | 4.414 |
| ZnO | 0.001 | 0.001 | 0.000 | 0.000 | 0.000 | 0.000 | 0.000 | 0.000 | 0.000 | 0.000 |
| $SnO_2$ | 0.003 | 0.003 | 0.003 | 0.003 | 0.003 | 0.003 | 0.003 | 0.003 | 0.003 | 0.003 |
| $Fe_2O_3$ | 0.006 | 0.006 | 0.006 | 0.006 | 0.006 | 0.006 | 0.006 | 0.006 | 0.006 | 0.006 |
| $TiO_2$ | 0.998 | 1.000 | 1.008 | 1.016 | 1.025 | 1.022 | 1.022 | 1.022 | 1.022 | 1.022 |
| $CeO_2$ | 0.395 | 0.397 | 0.400 | 0.405 | 0.415 | 0.426 | 0.431 | 0.433 | 0.443 | 0.442 |
| $ZrO_2$ | 0.004 | 0.004 | 0.004 | 0.004 | 0.005 | 0.005 | 0.005 | 0.004 | 0.005 | 0.005 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.393 | 1.397 | 1.408 | 1.421 | 1.440 | 1.448 | 1.453 | 1.455 | 1.465 | 1.464 |
| $R_2O$ | 11.326 | 11.096 | 11.109 | 11.118 | 11.115 | 11.317 | 11.308 | 11.295 | 11.307 | 11.312 |
| $Li_2O + Na_2O$ | 11.126 | 10.895 | 10.906 | 10.916 | 10.915 | 11.114 | 11.107 | 11.095 | 11.107 | 11.110 |
| $R_2O - Al_2O_3$ | −3.359 | −3.593 | −3.512 | −3.538 | −3.560 | −3.289 | −3.313 | −3.299 | −3.277 | −3.286 |
| R'O | 5.946 | 5.939 | 5.914 | 5.933 | 5.932 | 5.917 | 5.915 | 5.897 | 5.899 | 5.888 |
| Thickness (mm) | 2.400 | 2.400 | 2.400 | 2.400 | 2.400 | 2.400 | 2.400 | 2.400 | 2.400 | 2.400 |
| L* | 96.26 | 96.24 | 96.25 | 96.21 | 96.17 | 96.13 | 96.11 | 96.1 | 96.09 | 96.05 |
| a* | −1.18 | −1.18 | −1.2 | −1.22 | −1.27 | −1.31 | −1.32 | −1.33 | −1.35 | −1.37 |
| b* | 6.75 | 6.76 | 6.86 | 7.03 | 7.34 | 7.65 | 7.77 | 7.86 | 7.97 | 8.15 |
| Density ($g/cm^3$) | | | | | | | | | | |
| Liquidus Temp. (° C.) | | | | | | | | | | |

TABLE 25E

| Example | TM-95 | TM-96 | TM-97 | TM-98 | TM-99 | TM-100 | TM-101 | TM-102 | TM-103 | TM-104 |
|---|---|---|---|---|---|---|---|---|---|---|
| $SiO_2$ | 60.676 | 60.627 | 60.659 | 60.557 | 60.488 | 60.462 | 60.525 | 60.517 | 60.541 | 60.560 |
| $Al_2O_3$ | 14.658 | 14.671 | 14.658 | 14.704 | 14.707 | 14.707 | 14.666 | 14.666 | 14.647 | 14.641 |
| $B_2O_3$ | 5.992 | 5.992 | 5.992 | 5.995 | 6.001 | 6.002 | 6.000 | 6.000 | 6.000 | 6.000 |
| $P_2O_5$ | 0.000 | 0.000 | 0.000 | 0.000 | 0.000 | 0.000 | 0.000 | 0.000 | 0.000 | 0.000 |

TABLE 25E-continued

| Example | TM-95 | TM-96 | TM-97 | TM-98 | TM-99 | TM-100 | TM-101 | TM-102 | TM-103 | TM-104 |
|---|---|---|---|---|---|---|---|---|---|---|
| $Li_2O$ | 8.998 | 8.998 | 8.998 | 9.003 | 9.013 | 9.013 | 9.011 | 9.011 | 9.011 | 9.011 |
| $Na_2O$ | 2.020 | 2.027 | 2.017 | 2.033 | 2.029 | 2.027 | 2.024 | 2.030 | 2.025 | 2.023 |
| $K_2O$ | 0.203 | 0.204 | 0.201 | 0.201 | 0.203 | 0.202 | 0.203 | 0.204 | 0.204 | 0.202 |
| MgO | 1.480 | 1.483 | 1.475 | 1.479 | 1.477 | 1.489 | 1.485 | 1.485 | 1.485 | 1.479 |
| CaO | 4.449 | 4.461 | 4.461 | 4.475 | 4.468 | 4.480 | 4.467 | 4.468 | 4.463 | 4.455 |
| ZnO | 0.000 | 0.000 | 0.000 | 0.000 | 0.000 | 0.000 | 0.000 | 0.000 | 0.000 | 0.000 |
| $SnO_2$ | 0.004 | 0.003 | 0.003 | 0.003 | 0.003 | 0.003 | 0.003 | 0.003 | 0.003 | 0.003 |
| $Fe_2O_3$ | 0.006 | 0.006 | 0.006 | 0.006 | 0.006 | 0.006 | 0.006 | 0.006 | 0.006 | 0.006 |
| $TiO_2$ | 1.033 | 1.041 | 1.041 | 1.042 | 1.043 | 1.043 | 1.043 | 1.043 | 1.043 | 1.043 |
| $CeO_2$ | 0.476 | 0.481 | 0.484 | 0.498 | 0.558 | 0.562 | 0.562 | 0.563 | 0.568 | 0.572 |
| $ZrO_2$ | 0.006 | 0.005 | 0.004 | 0.004 | 0.004 | 0.005 | 0.005 | 0.004 | 0.005 | 0.005 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.509 | 1.522 | 1.525 | 1.540 | 1.601 | 1.605 | 1.604 | 1.606 | 1.611 | 1.615 |
| $R_2O$ | 11.221 | 11.229 | 11.217 | 11.237 | 11.244 | 11.241 | 11.238 | 11.245 | 11.239 | 11.236 |
| $Li_2O + Na_2O$ | 11.018 | 11.025 | 11.015 | 11.036 | 11.041 | 11.040 | 11.035 | 11.041 | 11.036 | 11.034 |
| $R_2O - Al_2O_3$ | −3.436 | −3.442 | −3.442 | −3.467 | −3.463 | −3.466 | −3.428 | −3.421 | −3.407 | −3.405 |
| R'O | 5.929 | 5.944 | 5.936 | 5.954 | 5.946 | 5.968 | 5.952 | 5.953 | 5.948 | 5.933 |
| Thickness (mm) | 2.400 | 2.400 | 2.400 | 2.400 | 2.400 | 2.400 | 2.400 | 2.400 | 2.400 | 2.400 |
| L* | 95.95 | 95.92 | 95.9 | 95.86 | 95.6 | 95.6 | 95.46 | 95.44 | 95.46 | 95.46 |
| a* | −1.45 | −1.48 | −1.49 | −1.52 | −1.67 | −1.66 | −1.66 | −1.67 | −1.68 | −1.68 |
| b* | 8.86 | 9.08 | 9.2 | 9.44 | 10.94 | 10.9 | 11.05 | 11.13 | 11.2 | 11.28 |
| Density ($g/cm^3$) | | | | | | | | | | |
| Liquidus Temp. (° C.) | | | | | | | | | | |

TABLE 25F

| Example | TM-105 | TM-106 | TM-107 | TM-108 | TM-109 | TM-110 | TM-111 | TM-112 | TM-113 | TM-114 |
|---|---|---|---|---|---|---|---|---|---|---|
| $SiO_2$ | 60.513 | 60.470 | 60.471 | 60.487 | 60.502 | 60.460 | 60.459 | 60.385 | 60.465 | 60.434 |
| $Al_2O_3$ | 14.673 | 14.696 | 14.696 | 14.680 | 14.667 | 14.697 | 14.697 | 14.715 | 14.659 | 14.675 |
| $B_2O_3$ | 6.003 | 6.005 | 6.005 | 6.031 | 6.031 | 6.033 | 6.033 | 6.054 | 6.051 | 6.053 |
| $P_2O_5$ | 0.000 | 0.000 | 0.000 | 0.000 | 0.000 | 0.000 | 0.000 | 0.000 | 0.000 | 0.000 |
| $Li_2O$ | 9.015 | 9.018 | 9.018 | 8.994 | 8.994 | 8.996 | 8.997 | 8.978 | 8.975 | 8.977 |
| $Na_2O$ | 2.018 | 2.016 | 2.014 | 2.023 | 2.020 | 2.029 | 2.025 | 2.029 | 2.028 | 2.023 |
| $K_2O$ | 0.201 | 0.202 | 0.203 | 0.201 | 0.203 | 0.202 | 0.201 | 0.203 | 0.202 | 0.201 |
| MgO | 1.484 | 1.491 | 1.484 | 1.484 | 1.484 | 1.480 | 1.487 | 1.477 | 1.476 | 1.469 |
| CaO | 4.456 | 4.459 | 4.465 | 4.473 | 4.471 | 4.474 | 4.468 | 4.475 | 4.455 | 4.453 |
| ZnO | 0.000 | 0.000 | 0.002 | 0.002 | 0.002 | 0.002 | 0.002 | 0.002 | 0.002 | 0.002 |
| $SnO_2$ | 0.004 | 0.003 | 0.004 | 0.003 | 0.003 | 0.003 | 0.003 | 0.003 | 0.003 | 0.004 |
| $Fe_2O_3$ | 0.006 | 0.006 | 0.006 | 0.006 | 0.006 | 0.006 | 0.006 | 0.006 | 0.006 | 0.006 |
| $TiO_2$ | 1.043 | 1.044 | 1.042 | 1.028 | 1.028 | 1.028 | 1.031 | 1.081 | 1.087 | 1.106 |
| $CeO_2$ | 0.578 | 0.585 | 0.585 | 0.584 | 0.586 | 0.585 | 0.588 | 0.589 | 0.586 | 0.591 |
| $ZrO_2$ | 0.005 | 0.005 | 0.005 | 0.004 | 0.004 | 0.005 | 0.004 | 0.004 | 0.005 | 0.005 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.622 | 1.629 | 1.627 | 1.611 | 1.614 | 1.613 | 1.619 | 1.670 | 1.674 | 1.698 |
| $R_2O$ | 11.234 | 11.236 | 11.235 | 11.218 | 11.217 | 11.227 | 11.222 | 11.210 | 11.205 | 11.201 |
| $Li_2O + Na_2O$ | 11.033 | 11.034 | 11.032 | 11.017 | 11.014 | 11.025 | 11.021 | 11.006 | 11.003 | 11.000 |
| $R_2O - Al_2O_3$ | −3.439 | −3.461 | −3.461 | −3.462 | −3.450 | −3.469 | −3.475 | −3.505 | −3.454 | −3.474 |
| R'O | 5.940 | 5.950 | 5.950 | 5.959 | 5.956 | 5.956 | 5.956 | 5.954 | 5.933 | 5.924 |
| Thickness (mm) | 2.400 | 2.400 | 2.400 | 2.400 | 2.400 | 2.400 | 2.400 | 2.400 | 2.400 | 2.400 |
| L* | 95.38 | 95.38 | 95.45 | 95.4 | 95.43 | 95.44 | 95.42 | 95.4 | 95.39 | 95.38 |
| a* | −1.7 | −1.7 | −1.72 | −1.72 | −1.73 | −1.73 | −1.73 | −1.79 | −1.8 | −1.83 |
| b* | 11.45 | 11.52 | 11.59 | 11.74 | 11.76 | 11.76 | 11.8 | 12.13 | 12.24 | 12.42 |
| Density ($g/cm^3$) | | | | | | | | | | |
| Liquidus Temp. (° C.) | | | | | | | | | | |

TABLE 25G

| Example | TM-115 | TM-116 | TM-117 | TM-118 | TM-119 | TM-120 | TM-121 | TM-122 | TM-123 | TM-124 |
|---|---|---|---|---|---|---|---|---|---|---|
| $SiO_2$ | 60.414 | 60.401 | 60.373 | 60.387 | 60.323 | 60.339 | 60.319 | 60.321 | 60.332 | 60.332 |
| $Al_2O_3$ | 14.673 | 14.662 | 14.685 | 14.665 | 14.700 | 14.681 | 14.696 | 14.696 | 14.696 | 14.701 |
| $B_2O_3$ | 6.052 | 6.053 | 6.054 | 6.054 | 6.055 | 5.988 | 5.989 | 5.989 | 5.989 | 5.988 |
| $P_2O_5$ | 0.000 | 0.000 | 0.000 | 0.000 | 0.000 | 0.000 | 0.000 | 0.000 | 0.000 | 0.000 |
| $Li_2O$ | 8.976 | 8.977 | 8.979 | 8.979 | 8.981 | 9.020 | 9.022 | 9.021 | 9.022 | 9.020 |
| $Na_2O$ | 2.026 | 2.022 | 2.028 | 2.023 | 2.031 | 2.026 | 2.023 | 2.023 | 2.017 | 2.021 |
| $K_2O$ | 0.200 | 0.202 | 0.202 | 0.201 | 0.202 | 0.203 | 0.202 | 0.204 | 0.202 | 0.203 |
| MgO | 1.484 | 1.480 | 1.472 | 1.465 | 1.468 | 1.478 | 1.480 | 1.478 | 1.476 | 1.473 |
| CaO | 4.470 | 4.461 | 4.455 | 4.464 | 4.474 | 4.487 | 4.484 | 4.485 | 4.484 | 4.488 |
| ZnO | 0.002 | 0.002 | 0.002 | 0.002 | 0.000 | 0.002 | 0.000 | 0.002 | 0.000 | 0.002 |
| $SnO_2$ | 0.004 | 0.004 | 0.003 | 0.004 | 0.003 | 0.004 | 0.004 | 0.003 | 0.003 | 0.004 |
| $Fe_2O_3$ | 0.006 | 0.006 | 0.006 | 0.006 | 0.006 | 0.006 | 0.006 | 0.006 | 0.006 | 0.006 |
| $TiO_2$ | 1.101 | 1.135 | 1.144 | 1.152 | 1.158 | 1.171 | 1.174 | 1.171 | 1.174 | 1.171 |
| $CeO_2$ | 0.587 | 0.591 | 0.593 | 0.594 | 0.594 | 0.592 | 0.597 | 0.596 | 0.594 | 0.586 |
| $ZrO_2$ | 0.005 | 0.004 | 0.005 | 0.005 | 0.005 | 0.005 | 0.005 | 0.005 | 0.005 | 0.005 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.688 | 1.727 | 1.737 | 1.746 | 1.751 | 1.763 | 1.771 | 1.767 | 1.768 | 1.757 |
| $R_2O$ | 11.202 | 11.201 | 11.209 | 11.203 | 11.214 | 11.249 | 11.247 | 11.249 | 11.241 | 11.245 |
| $Li_2O + Na_2O$ | 11.002 | 10.999 | 11.007 | 11.002 | 11.012 | 11.046 | 11.045 | 11.045 | 11.039 | 11.042 |
| $R_2O - Al_2O_3$ | −3.471 | −3.462 | −3.476 | −3.462 | −3.486 | −3.432 | −3.449 | −3.447 | −3.456 | −3.456 |
| R'O | 5.956 | 5.942 | 5.928 | 5.930 | 5.942 | 5.966 | 5.965 | 5.965 | 5.960 | 5.963 |
| Thickness (mm) | 2.400 | 2.400 | 2.400 | 2.400 | 2.400 | 2.400 | 2.400 | 2.400 | 2.400 | 2.400 |
| L* | 95.35 | 95.29 | 95.28 | 95.27 | 95.27 | 95.27 | 95.27 | 95.27 | 95.24 | 95.3 |
| a* | −1.84 | −1.91 | −1.92 | −1.93 | −1.93 | −1.97 | −1.97 | −1.96 | −1.96 | −1.95 |
| b* | 12.51 | 13.06 | 13.2 | 13.27 | 13.21 | 13.47 | 13.49 | 13.47 | 13.49 | 13.25 |
| Density ($g/cm^3$) | | | | | | | | | | |
| Liquidus Temp. (° C.) | | | | | | | | | | |

TABLE 25H

| Example | TM-125 | TM-126 | TM-127 | TM-128 | TM-129 | TM-130 | TM-131 | TM-132 | TM-133 | TM-134 |
|---|---|---|---|---|---|---|---|---|---|---|
| $SiO_2$ | 60.295 | 60.290 | 60.285 | 60.395 | 60.350 | 60.436 | 60.382 | 60.449 | 60.481 | 60.565 |
| $Al_2O_3$ | 14.728 | 14.745 | 14.743 | 14.679 | 14.719 | 14.678 | 14.724 | 14.692 | 14.681 | 14.678 |
| $B_2O_3$ | 5.979 | 5.979 | 5.978 | 5.975 | 5.976 | 5.972 | 5.973 | 5.970 | 5.968 | 5.967 |
| $P_2O_5$ | 0.000 | 0.000 | 0.000 | 0.000 | 0.000 | 0.000 | 0.000 | 0.000 | 0.000 | 0.000 |
| $Li_2O$ | 9.021 | 9.020 | 9.019 | 9.015 | 9.016 | 9.011 | 9.011 | 9.007 | 9.005 | 9.003 |
| $Na_2O$ | 2.028 | 2.023 | 2.025 | 2.014 | 2.025 | 2.034 | 2.032 | 2.020 | 2.021 | 2.020 |
| $K_2O$ | 0.202 | 0.202 | 0.201 | 0.203 | 0.202 | 0.203 | 0.201 | 0.202 | 0.202 | 0.199 |
| MgO | 1.480 | 1.477 | 1.482 | 1.476 | 1.472 | 1.467 | 1.471 | 1.473 | 1.478 | 1.472 |
| CaO | 4.496 | 4.507 | 4.506 | 4.492 | 4.492 | 4.479 | 4.491 | 4.477 | 4.484 | 4.463 |
| ZnO | 0.000 | 0.000 | 0.000 | 0.000 | 0.002 | 0.000 | 0.000 | 0.000 | 0.001 | 0.000 |
| $SnO_2$ | 0.004 | 0.004 | 0.004 | 0.004 | 0.004 | 0.004 | 0.004 | 0.003 | 0.003 | 0.003 |
| $Fe_2O_3$ | 0.006 | 0.006 | 0.006 | 0.006 | 0.006 | 0.006 | 0.006 | 0.006 | 0.006 | 0.006 |
| $TiO_2$ | 1.174 | 1.173 | 1.181 | 1.181 | 1.182 | 1.180 | 1.188 | 1.188 | 1.172 | 1.131 |
| $CeO_2$ | 0.583 | 0.570 | 0.565 | 0.556 | 0.550 | 0.525 | 0.514 | 0.506 | 0.493 | 0.488 |
| $ZrO_2$ | 0.005 | 0.005 | 0.005 | 0.004 | 0.004 | 0.005 | 0.004 | 0.005 | 0.005 | 0.005 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.756 | 1.744 | 1.747 | 1.737 | 1.732 | 1.705 | 1.702 | 1.694 | 1.665 | 1.619 |
| $R_2O$ | 11.251 | 11.245 | 11.245 | 11.231 | 11.243 | 11.248 | 11.244 | 11.230 | 11.227 | 11.222 |
| $Li_2O + Na_2O$ | 11.049 | 11.043 | 11.044 | 11.028 | 11.041 | 11.045 | 11.043 | 11.028 | 11.025 | 11.023 |
| $R_2O - Al_2O_3$ | −3.476 | −3.500 | −3.498 | −3.448 | −3.476 | −3.430 | −3.480 | −3.462 | −3.454 | −3.456 |
| R'O | 5.976 | 5.984 | 5.988 | 5.969 | 5.966 | 5.946 | 5.961 | 5.950 | 5.963 | 5.936 |
| Thickness (mm) | 2.400 | 2.400 | 2.400 | 2.400 | 2.400 | 2.400 | 2.400 | 2.400 | 2.400 | 2.400 |
| L* | 95.33 | 95.36 | 95.41 | 95.42 | 95.45 | 95.57 | 95.64 | 95.66 | 95.65 | 95.81 |
| a* | −1.93 | −1.91 | −1.9 | −1.89 | −1.88 | −1.8 | −1.78 | −1.75 | −1.7 | −1.58 |
| b* | 13.03 | 12.84 | 12.63 | 12.52 | 12.4 | 11.57 | 11.3 | 11.03 | 10.61 | 9.76 |

TABLE 25H-continued

| Example | TM-125 | TM-126 | TM-127 | TM-128 | TM-129 | TM-130 | TM-131 | TM-132 | TM-133 | TM-134 |
|---|---|---|---|---|---|---|---|---|---|---|
| Density ($g/cm^3$) | | | | | | | | | | |
| Liquidus Temp. (° C.) | | | | | | | | | | |

TABLE 25I

| Example | TM-135 | TM-136 | TM-137 | TM-138 | TM-139 | TM-140 | TM-141 | TM-142 | TM-143 | TM-144 |
|---|---|---|---|---|---|---|---|---|---|---|
| $SiO_2$ | 60.576 | 60.566 | 60.579 | 60.603 | 60.735 | 60.761 | 60.731 | 60.660 | 60.607 | 60.663 |
| $Al_2O_3$ | 14.676 | 14.702 | 14.695 | 14.690 | 14.628 | 14.622 | 14.646 | 14.681 | 14.746 | 14.719 |
| $B_2O_3$ | 5.966 | 5.966 | 6.031 | 6.026 | 6.024 | 6.024 | 6.027 | 6.028 | 6.006 | 6.005 |
| $P_2O_5$ | 0.000 | 0.000 | 0.000 | 0.000 | 0.000 | 0.000 | 0.000 | 0.000 | 0.000 | 0.000 |
| $Li_2O$ | 9.001 | 9.002 | 9.023 | 9.016 | 9.013 | 9.013 | 9.016 | 9.018 | 8.984 | 8.983 |
| $Na_2O$ | 2.013 | 2.026 | 2.010 | 2.016 | 2.015 | 2.008 | 2.017 | 2.008 | 2.018 | 2.006 |
| $K_2O$ | 0.201 | 0.199 | 0.202 | 0.200 | 0.199 | 0.200 | 0.200 | 0.199 | 0.199 | 0.201 |
| MgO | 1.483 | 1.487 | 1.487 | 1.488 | 1.470 | 1.475 | 1.474 | 1.499 | 1.503 | 1.505 |
| CaO | 4.474 | 4.474 | 4.474 | 4.468 | 4.452 | 4.446 | 4.448 | 4.465 | 4.499 | 4.476 |
| ZnO | 0.000 | 0.000 | 0.000 | 0.002 | 0.002 | 0.000 | 0.000 | 0.002 | 0.000 | 0.000 |
| $SnO_2$ | 0.003 | 0.003 | 0.003 | 0.004 | 0.003 | 0.003 | 0.004 | 0.003 | 0.003 | 0.003 |
| $Fe_2O_3$ | 0.006 | 0.006 | 0.006 | 0.006 | 0.006 | 0.006 | 0.006 | 0.006 | 0.006 | 0.006 |
| $TiO_2$ | 1.106 | 1.074 | 0.985 | 0.974 | 0.938 | 0.920 | 0.911 | 0.904 | 0.906 | 0.905 |
| $CeO_2$ | 0.488 | 0.489 | 0.501 | 0.501 | 0.509 | 0.515 | 0.516 | 0.522 | 0.521 | 0.524 |
| $ZrO_2$ | 0.005 | 0.005 | 0.005 | 0.005 | 0.005 | 0.005 | 0.004 | 0.006 | 0.004 | 0.004 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.594 | 1.563 | 1.486 | 1.475 | 1.447 | 1.435 | 1.427 | 1.426 | 1.426 | 1.429 |
| $R_2O$ | 11.215 | 11.227 | 11.235 | 11.233 | 11.227 | 11.222 | 11.233 | 11.226 | 11.200 | 11.190 |
| $Li_2O + Na_2O$ | 11.014 | 11.028 | 11.033 | 11.032 | 11.028 | 11.021 | 11.034 | 11.027 | 11.001 | 10.989 |
| $R_2O - Al_2O_3$ | −3.461 | −3.475 | −3.461 | −3.457 | −3.402 | −3.400 | −3.413 | −3.455 | −3.546 | −3.529 |
| R'O | 5.958 | 5.961 | 5.961 | 5.958 | 5.924 | 5.922 | 5.922 | 5.965 | 6.002 | 5.981 |
| Thickness (mm) | 2.400 | 2.400 | 2.400 | 2.400 | 2.400 | 2.400 | 2.400 | 2.400 | 2.400 | 2.400 |
| L* | 95.81 | 95.81 | 95.86 | 95.86 | 95.84 | 95.82 | 95.82 | 95.84 | 95.84 | 95.83 |
| a* | −1.59 | −1.53 | −1.49 | −1.47 | −1.53 | −1.42 | −1.41 | −1.42 | −1.42 | −1.41 |
| b* | 9.81 | 9.45 | 9.28 | 9.2 | 9.44 | 9.04 | 8.99 | 9.03 | 9.07 | 9.03 |
| Density ($g/cm^3$) | | | | | | | | | | |
| Liquidus Temp. (° C.) | | | | | | | | | | |

TABLE 25J

| Example | TM-145 | TM-146 | TM-147 | TM-148 | TM-149 | TM-150 | TM-151 | TM-152 | TM-153 | TM-154 |
|---|---|---|---|---|---|---|---|---|---|---|
| $SiO_2$ | 60.726 | 60.601 | 60.720 | 60.707 | 60.668 | 60.678 | 60.673 | 60.696 | 60.659 | 60.668 |
| $Al_2O_3$ | 14.705 | 14.758 | 14.696 | 14.703 | 14.697 | 14.703 | 14.703 | 14.666 | 14.706 | 14.704 |
| $B_2O_3$ | 6.005 | 6.008 | 6.006 | 6.006 | 6.013 | 6.013 | 6.013 | 6.011 | 6.014 | 6.013 |
| $P_2O_5$ | 0.000 | 0.000 | 0.000 | 0.000 | 0.000 | 0.000 | 0.000 | 0.000 | 0.000 | 0.000 |
| $Li_2O$ | 8.982 | 8.987 | 8.985 | 8.985 | 9.024 | 9.024 | 9.024 | 9.021 | 9.026 | 9.024 |
| $Na_2O$ | 2.009 | 2.018 | 2.010 | 2.008 | 2.016 | 2.009 | 2.013 | 2.009 | 2.005 | 2.008 |
| $K_2O$ | 0.200 | 0.199 | 0.199 | 0.200 | 0.198 | 0.198 | 0.201 | 0.199 | 0.199 | 0.199 |
| MgO | 1.498 | 1.519 | 1.508 | 1.509 | 1.509 | 1.511 | 1.506 | 1.550 | 1.527 | 1.527 |
| CaO | 4.441 | 4.469 | 4.442 | 4.448 | 4.440 | 4.440 | 4.440 | 4.427 | 4.418 | 4.417 |
| ZnO | 0.000 | 0.002 | 0.000 | 0.002 | 0.000 | 0.000 | 0.000 | 0.000 | 0.000 | 0.000 |
| $SnO_2$ | 0.003 | 0.003 | 0.003 | 0.003 | 0.003 | 0.003 | 0.004 | 0.004 | 0.003 | 0.004 |
| $Fe_2O_3$ | 0.006 | 0.006 | 0.006 | 0.006 | 0.006 | 0.006 | 0.006 | 0.006 | 0.006 | 0.006 |
| $TiO_2$ | 0.902 | 0.901 | 0.896 | 0.894 | 0.888 | 0.887 | 0.884 | 0.883 | 0.900 | 0.897 |
| $CeO_2$ | 0.519 | 0.524 | 0.524 | 0.525 | 0.532 | 0.524 | 0.528 | 0.522 | 0.533 | 0.528 |
| $ZrO_2$ | 0.004 | 0.004 | 0.004 | 0.005 | 0.005 | 0.005 | 0.004 | 0.004 | 0.005 | 0.005 |
| $La_2O_3$ | | | | | | | | | | |
| $SO_3$ | | | | | | | | | | |
| $WO_3$ | | | | | | | | | | |

TABLE 25J-continued

| Example | TM-145 | TM-146 | TM-147 | TM-148 | TM-149 | TM-150 | TM-151 | TM-152 | TM-153 | TM-154 |
|---|---|---|---|---|---|---|---|---|---|---|
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.421 | 1.426 | 1.420 | 1.418 | 1.420 | 1.411 | 1.411 | 1.406 | 1.433 | 1.425 |
| $R_2O$ | 11.191 | 11.205 | 11.193 | 11.193 | 11.238 | 11.230 | 11.238 | 11.229 | 11.229 | 11.231 |
| $Li_2O + Na_2O$ | 10.991 | 11.006 | 10.994 | 10.993 | 11.040 | 11.032 | 11.037 | 11.030 | 11.030 | 11.032 |
| $R_2O - Al_2O_3$ | −3.514 | −3.553 | −3.503 | −3.510 | −3.459 | −3.472 | −3.466 | −3.437 | −3.476 | −3.473 |
| R'O | 5.939 | 5.990 | 5.950 | 5.959 | 5.949 | 5.951 | 5.946 | 5.978 | 5.945 | 5.944 |
| Thickness (mm) | 2.400 | 2.400 | 2.400 | 2.400 | 2.400 | 2.400 | 2.400 | 2.400 | 2.400 | 2.400 |
| L* | 95.85 | 95.84 | 95.84 | 95.85 | 95.85 | 95.87 | 95.85 | 95.87 | 95.85 | 95.87 |
| a* | −1.41 | −1.41 | −1.41 | −1.41 | −1.4 | −1.4 | −1.4 | −1.39 | −1.4 | −1.39 |
| b* | 9.01 | 9.03 | 8.99 | 9.02 | 8.97 | 8.93 | 8.93 | 8.89 | 8.93 | 8.84 |
| Density ($g/cm^3$) | | | | | | | | | | |
| Liquidus Temp. (° C.) | | | | | | | | | | |

TABLE 25K

| Example | TM-155 | TM-156 | TM-157 | TM-158 | TM-159 | TM-160 | TM-161 | TM-162 | TM-163 | TM-164 |
|---|---|---|---|---|---|---|---|---|---|---|
| $SiO_2$ | 60.669 | 60.684 | 60.652 | 60.705 | 60.708 | 60.663 | 60.672 | 60.718 | 60.695 | 60.765 |
| $Al_2O_3$ | 14.704 | 14.681 | 14.707 | 14.679 | 14.679 | 14.692 | 14.728 | 14.714 | 14.720 | 14.679 |
| $B_2O_3$ | 6.014 | 6.021 | 6.022 | 6.018 | 6.018 | 6.018 | 6.007 | 6.006 | 6.006 | 6.004 |
| $P_2O_5$ | 0.000 | 0.000 | 0.000 | 0.000 | 0.000 | 0.000 | 0.000 | 0.000 | 0.000 | 0.000 |
| $Li_2O$ | 9.025 | 9.022 | 9.023 | 9.017 | 9.017 | 9.017 | 8.963 | 8.962 | 8.962 | 8.960 |
| $Na_2O$ | 2.010 | 2.008 | 2.015 | 2.005 | 2.003 | 2.003 | 2.006 | 2.007 | 2.010 | 2.007 |
| $K_2O$ | 0.199 | 0.199 | 0.198 | 0.199 | 0.198 | 0.198 | 0.199 | 0.197 | 0.200 | 0.199 |
| MgO | 1.525 | 1.533 | 1.536 | 1.541 | 1.538 | 1.554 | 1.550 | 1.543 | 1.540 | 1.538 |
| CaO | 4.418 | 4.416 | 4.417 | 4.409 | 4.414 | 4.421 | 4.431 | 4.419 | 4.430 | 4.418 |
| ZnO | 0.000 | 0.000 | 0.000 | 0.001 | 0.000 | 0.002 | 0.000 | 0.000 | 0.000 | 0.000 |
| $SnO_2$ | 0.004 | 0.003 | 0.003 | 0.004 | 0.003 | 0.004 | 0.004 | 0.004 | 0.003 | 0.003 |
| $Fe_2O_3$ | 0.006 | 0.006 | 0.006 | 0.006 | 0.006 | 0.006 | 0.006 | 0.006 | 0.006 | 0.006 |
| $TiO_2$ | 0.894 | 0.893 | 0.893 | 0.889 | 0.888 | 0.894 | 0.897 | 0.889 | 0.897 | 0.891 |
| $CeO_2$ | 0.528 | 0.527 | 0.524 | 0.523 | 0.525 | 0.524 | 0.533 | 0.530 | 0.527 | 0.525 |
| $ZrO_2$ | 0.004 | 0.004 | 0.004 | 0.005 | 0.004 | 0.005 | 0.005 | 0.004 | 0.004 | 0.004 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.422 | 1.420 | 1.417 | 1.411 | 1.413 | 1.418 | 1.430 | 1.419 | 1.424 | 1.416 |
| $R_2O$ | 11.234 | 11.230 | 11.235 | 11.221 | 11.218 | 11.218 | 11.168 | 11.167 | 11.172 | 11.166 |
| $Li_2O + Na_2O$ | 11.035 | 11.031 | 11.038 | 11.022 | 11.020 | 11.021 | 10.970 | 10.970 | 10.972 | 10.967 |
| $R_2O - Al_2O_3$ | −3.470 | −3.451 | −3.472 | −3.458 | −3.460 | −3.474 | −3.560 | −3.547 | −3.548 | −3.513 |
| R'O | 5.943 | 5.949 | 5.953 | 5.952 | 5.952 | 5.976 | 5.981 | 5.962 | 5.970 | 5.956 |
| Thickness (mm) | 2.400 | 2.400 | 2.400 | 2.400 | 2.400 | 2.400 | 2.400 | 2.400 | 2.400 | 2.400 |
| L* | 95.87 | 95.87 | 95.87 | 95.85 | 95.87 | 95.86 | 95.87 | 95.88 | 95.87 | 95.81 |
| a* | −1.38 | −1.38 | −1.38 | −1.38 | −1.38 | −1.38 | −1.38 | −1.38 | −1.38 | −1.37 |
| b* | 8.83 | 8.81 | 8.83 | 8.82 | 8.84 | 8.82 | 8.79 | 8.78 | 8.81 | 8.8 |
| Density ($g/cm^3$) | | | | | | | | | | |
| Liquidus Temp. (° C.) | | | | | | | | | | |

TABLE 25L

| | Example | | | | | | | | | |
|---|---|---|---|---|---|---|---|---|---|---|
| | TM-165 | TM-166 | TM-167 | TM-168 | TM-169 | TM-170 | TM-171 | TM-172 | TM-173 | TM-174 |
| $SiO_2$ | 60.799 | 60.679 | 60.695 | 60.729 | 60.761 | 60.660 | 60.675 | 60.669 | 60.706 | 60.775 |
| $Al_2O_3$ | 14.665 | 14.730 | 14.714 | 14.693 | 14.672 | 14.721 | 14.707 | 14.688 | 14.671 | 14.680 |

TABLE 25L-continued

| | Example | | | | | | | | | |
|---|---|---|---|---|---|---|---|---|---|---|
| | TM-165 | TM-166 | TM-167 | TM-168 | TM-169 | TM-170 | TM-171 | TM-172 | TM-173 | TM-174 |
| $B_2O_3$ | 6.004 | 6.007 | 6.015 | 6.014 | 6.013 | 6.015 | 6.015 | 6.010 | 6.008 | 5.974 |
| $P_2O_5$ | 0.000 | 0.000 | 0.000 | 0.000 | 0.000 | 0.000 | 0.000 | 0.000 | 0.000 | 0.000 |
| $Li_2O$ | 8.959 | 8.964 | 8.962 | 8.961 | 8.960 | 8.963 | 8.962 | 9.041 | 9.037 | 9.000 |
| $Na_2O$ | 2.007 | 2.008 | 2.010 | 2.002 | 2.009 | 2.016 | 2.010 | 2.002 | 2.004 | 2.006 |
| $K_2O$ | 0.199 | 0.199 | 0.199 | 0.199 | 0.198 | 0.199 | 0.199 | 0.200 | 0.198 | 0.199 |
| MgO | 1.535 | 1.546 | 1.551 | 1.552 | 1.548 | 1.558 | 1.551 | 1.536 | 1.525 | 1.504 |
| CaO | 4.406 | 4.425 | 4.417 | 4.413 | 4.406 | 4.430 | 4.442 | 4.426 | 4.425 | 4.439 |
| ZnO | 0.000 | 0.002 | 0.002 | 0.002 | 0.000 | 0.000 | 0.000 | 0.000 | 0.000 | 0.000 |
| $SnO_2$ | 0.003 | 0.003 | 0.003 | 0.003 | 0.004 | 0.003 | 0.004 | 0.003 | 0.003 | 0.004 |
| $Fe_2O_3$ | 0.006 | 0.006 | 0.006 | 0.006 | 0.006 | 0.006 | 0.006 | 0.006 | 0.006 | 0.006 |
| $TiO_2$ | 0.889 | 0.891 | 0.890 | 0.889 | 0.889 | 0.889 | 0.889 | 0.880 | 0.880 | 0.888 |
| $CeO_2$ | 0.524 | 0.534 | 0.531 | 0.532 | 0.530 | 0.534 | 0.535 | 0.535 | 0.533 | 0.521 |
| $ZrO_2$ | 0.004 | 0.005 | 0.005 | 0.004 | 0.004 | 0.005 | 0.005 | 0.004 | 0.004 | 0.005 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.413 | 1.425 | 1.422 | 1.422 | 1.419 | 1.423 | 1.424 | 1.415 | 1.412 | 1.409 |
| $R_2O$ | 11.165 | 11.171 | 11.171 | 11.162 | 11.166 | 11.178 | 11.171 | 11.243 | 11.239 | 11.204 |
| $Li_2O + Na_2O$ | 10.966 | 10.972 | 10.972 | 10.963 | 10.968 | 10.978 | 10.972 | 11.043 | 11.041 | 11.006 |
| $R_2O - Al_2O_3$ | −3.501 | −3.559 | −3.543 | −3.531 | −3.506 | −3.544 | −3.536 | −3.446 | −3.431 | −3.475 |
| R'O | 5.941 | 5.973 | 5.970 | 5.967 | 5.954 | 5.988 | 5.993 | 5.962 | 5.950 | 5.943 |
| Thickness (mm) | 2.400 | 2.400 | 2.400 | 2.400 | 2.400 | 2.400 | 2.400 | 2.400 | 2.400 | 2.400 |
| L* | 95.87 | 95.86 | 95.87 | 95.86 | 95.86 | 95.84 | 95.85 | 95.85 | 95.85 | 95.91 |
| a* | −1.37 | −1.38 | −1.38 | −1.38 | −1.38 | −1.38 | −1.38 | −1.38 | −1.38 | −1.36 |
| b* | 8.77 | 8.8 | 8.79 | 8.8 | 8.81 | 8.86 | 8.84 | 8.84 | 8.83 | 8.58 |
| Density ($g/cm^3$) | | | | | | | | | | |
| Liquidus Temp. (° C.) | | | | | | | | | | |

TABLE 25M

| | Example | | | | | | | | | |
|---|---|---|---|---|---|---|---|---|---|---|
| | TM-175 | TM-176 | TM-177 | TM-178 | TM-179 | TM-180 | TM-181 | TM-182 | TM-183 | TM-184 |
| $SiO_2$ | 60.747 | 60.799 | 60.778 | 60.734 | 60.742 | 60.783 | 60.797 | 60.807 | 60.903 | 60.905 |
| $Al_2O_3$ | 14.692 | 14.685 | 14.688 | 14.699 | 14.705 | 14.689 | 14.693 | 14.692 | 14.633 | 14.672 |
| $B_2O_3$ | 5.974 | 5.974 | 5.975 | 5.991 | 5.990 | 5.989 | 5.988 | 5.988 | 5.984 | 6.001 |
| $P_2O_5$ | 0.000 | 0.000 | 0.000 | 0.000 | 0.000 | 0.000 | 0.000 | 0.000 | 0.000 | 0.000 |
| $Li_2O$ | 8.999 | 8.999 | 9.001 | 9.018 | 9.018 | 9.016 | 9.014 | 9.013 | 9.008 | 8.984 |
| $Na_2O$ | 2.011 | 2.003 | 2.011 | 2.009 | 2.008 | 2.004 | 2.010 | 2.013 | 2.001 | 2.008 |
| $K_2O$ | 0.201 | 0.199 | 0.201 | 0.201 | 0.201 | 0.200 | 0.200 | 0.199 | 0.200 | 0.200 |
| MgO | 1.510 | 1.493 | 1.494 | 1.492 | 1.487 | 1.492 | 1.485 | 1.485 | 1.486 | 1.493 |
| CaO | 4.450 | 4.441 | 4.450 | 4.465 | 4.460 | 4.450 | 4.447 | 4.447 | 4.444 | 4.431 |
| ZnO | 0.000 | 0.002 | 0.002 | 0.002 | 0.000 | 0.002 | 0.000 | 0.001 | 0.000 | 0.000 |
| $SnO_2$ | 0.004 | 0.004 | 0.004 | 0.004 | 0.004 | 0.004 | 0.004 | 0.004 | 0.004 | 0.003 |
| $Fe_2O_3$ | 0.006 | 0.006 | 0.006 | 0.006 | 0.006 | 0.006 | 0.006 | 0.006 | 0.006 | 0.006 |
| $TiO_2$ | 0.888 | 0.884 | 0.884 | 0.887 | 0.888 | 0.883 | 0.887 | 0.884 | 0.887 | 0.887 |
| $CeO_2$ | 0.513 | 0.508 | 0.503 | 0.489 | 0.486 | 0.479 | 0.464 | 0.457 | 0.441 | 0.408 |
| $ZrO_2$ | 0.005 | 0.004 | 0.005 | 0.004 | 0.005 | 0.004 | 0.004 | 0.004 | 0.004 | 0.004 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.401 | 1.392 | 1.386 | 1.376 | 1.374 | 1.362 | 1.352 | 1.341 | 1.328 | 1.294 |
| $R_2O$ | 11.211 | 11.201 | 11.213 | 11.228 | 11.226 | 11.220 | 11.223 | 11.225 | 11.209 | 11.191 |
| $Li_2O + Na_2O$ | 11.011 | 11.002 | 11.012 | 11.027 | 11.026 | 11.019 | 11.024 | 11.026 | 11.009 | 10.991 |
| $R_2O - Al_2O_3$ | −3.481 | −3.484 | −3.475 | −3.471 | −3.479 | −3.470 | −3.470 | −3.467 | −3.423 | −3.482 |
| R'O | 5.961 | 5.936 | 5.945 | 5.958 | 5.947 | 5.944 | 5.932 | 5.933 | 5.930 | 5.924 |
| Thickness (mm) | 2.400 | 2.400 | 2.400 | 2.400 | 2.400 | 2.400 | 2.400 | 2.400 | 2.400 | 2.400 |
| L* | 95.91 | 95.95 | 95.96 | 96.05 | 96.03 | 96.08 | 95.85 | 96.15 | 96.19 | 96.29 |

TABLE 25M-continued

| | Example | | | | | | | | | |
|---|---|---|---|---|---|---|---|---|---|---|
| | TM-175 | TM-176 | TM-177 | TM-178 | TM-179 | TM-180 | TM-181 | TM-182 | TM-183 | TM-184 |
| a* | −1.34 | −1.33 | −1.32 | −1.29 | −1.28 | −1.27 | −1.22 | −1.22 | −1.19 | −1.1 |
| b* | 8.44 | 8.32 | 8.21 | 7.88 | 7.86 | 7.67 | 7.4 | 7.26 | 6.97 | 6.29 |
| Density ($g/cm^3$) | | | | | | | | | | |
| Liquidus Temp. (° C.) | | | | | | | | | | |

TABLE 25N

| | Example | | | | | | | | | |
|---|---|---|---|---|---|---|---|---|---|---|
| | TM-185 | TM-186 | TM-187 | TM-188 | TM-189 | TM-190 | TM-191 | TM-192 | TM-193 | TM-194 |
| $SiO_2$ | 60.915 | 60.903 | 61.594 | 61.212 | 61.723 | 61.723 | 61.723 | 61.723 | 61.566 | 61.654 |
| $Al_2O_3$ | 14.675 | 14.680 | 15.016 | 14.863 | 14.763 | 14.763 | 14.763 | 14.763 | 14.849 | 14.808 |
| $B_2O_3$ | 5.999 | 5.999 | 5.254 | 5.238 | 5.275 | 5.275 | 5.275 | 5.275 | 5.271 | 5.266 |
| $P_2O_5$ | 0.000 | 0.000 | 0.000 | 0.000 | 0.000 | 0.000 | 0.000 | 0.000 | 0.000 | 0.000 |
| $Li_2O$ | 8.982 | 8.981 | 9.695 | 9.665 | 9.147 | 9.147 | 9.147 | 9.147 | 9.142 | 9.132 |
| $Na_2O$ | 2.011 | 2.013 | 3.772 | 2.563 | 2.244 | 2.244 | 2.244 | 2.244 | 2.094 | 2.153 |
| $K_2O$ | 0.199 | 0.199 | 0.066 | 0.154 | 0.181 | 0.181 | 0.181 | 0.181 | 0.194 | 0.190 |
| MgO | 1.496 | 1.496 | 0.477 | 1.178 | 1.334 | 1.334 | 1.334 | 1.334 | 1.429 | 1.375 |
| CaO | 4.428 | 4.441 | 3.499 | 4.167 | 4.313 | 4.313 | 4.313 | 4.313 | 4.423 | 4.400 |
| ZnO | 0.001 | 0.000 | 0.000 | 0.008 | 0.016 | 0.016 | 0.016 | 0.016 | 0.024 | 0.024 |
| $SnO_2$ | 0.003 | 0.004 | 0.115 | 0.087 | 0.046 | 0.046 | 0.046 | 0.046 | 0.026 | 0.038 |
| $Fe_2O_3$ | 0.006 | 0.006 | 0.007 | 0.005 | 0.004 | 0.004 | 0.004 | 0.004 | 0.004 | 0.004 |
| $TiO_2$ | 0.886 | 0.886 | 0.188 | 0.474 | 0.549 | 0.549 | 0.549 | 0.549 | 0.587 | 0.562 |
| $CeO_2$ | 0.395 | 0.389 | 0.113 | 0.292 | 0.344 | 0.344 | 0.344 | 0.344 | 0.368 | 0.352 |
| $ZrO_2$ | 0.004 | 0.004 | 0.202 | 0.089 | 0.058 | 0.058 | 0.058 | 0.058 | 0.024 | 0.037 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.281 | 1.275 | 0.301 | 0.766 | 0.893 | 0.893 | 0.893 | 0.893 | 0.955 | 0.914 |
| $R_2O$ | 11.192 | 11.193 | 13.533 | 12.383 | 11.572 | 11.572 | 11.572 | 11.572 | 11.429 | 11.476 |
| $Li_2O + Na_2O$ | 10.993 | 10.994 | 13.467 | 12.229 | 11.391 | 11.391 | 11.391 | 11.391 | 11.235 | 11.286 |
| $R_2O - Al_2O_3$ | −3.484 | −3.487 | −1.483 | −2.480 | −3.191 | −3.191 | −3.191 | −3.191 | −3.419 | −3.332 |
| R'O | 5.925 | 5.937 | 3.976 | 5.353 | 5.662 | 5.662 | 5.662 | 5.662 | 5.876 | 5.799 |
| Thickness (mm) | 2.400 | 2.400 | 4.127 | 4.024 | 4.354 | 3.967 | 4.238 | 4.057 | 4.025 | 4.010 |
| L* | 96.32 | 96.21 | 96.54 | 96.42 | 96.22 | 96.19 | 96.3 | 96.28 | 96.1 | 96.19 |
| a* | −1.06 | −1.03 | −0.14 | −0.39 | −0.71 | −0.69 | −0.7 | −0.71 | −0.95 | −0.76 |
| b* | 6.06 | 5.92 | 0.72 | 2.2 | 4.11 | 3.99 | 4.02 | 4.06 | 5.52 | 4.33 |
| Density ($g/cm^3$) | | | 2.419 | | 2.429 | 2.429 | 2.429 | 2.429 | | |
| Liquidus Temp. (° C.) | | | | | | | | | | |

TABLE 25O

| | Example | | | | | | | | | |
|---|---|---|---|---|---|---|---|---|---|---|
| | TM-195 | TM-196 | TM-197 | TM-198 | TM-199 | TM-200 | TM-201 | TM-202 | TM-203 | TM-204 |
| $SiO_2$ | 61.220 | 61.167 | 61.145 | 61.056 | 61.074 | 60.985 | 60.554 | 60.376 | 60.288 | 60.985 |
| $Al_2O_3$ | 14.708 | 14.714 | 14.714 | 14.757 | 14.730 | 14.689 | 14.728 | 14.704 | 14.690 | 14.689 |
| $B_2O_3$ | 5.980 | 5.975 | 5.975 | 5.975 | 5.976 | 6.003 | 6.012 | 6.012 | 6.051 | 6.003 |
| $P_2O_5$ | 0.000 | 0.000 | 0.000 | 0.000 | 0.000 | 0.000 | 0.000 | 0.000 | 0.000 | 0.000 |
| $Li_2O$ | 9.074 | 9.066 | 9.066 | 9.066 | 9.068 | 9.109 | 9.122 | 9.123 | 9.083 | 9.109 |
| $Na_2O$ | 2.136 | 2.017 | 1.988 | 1.976 | 1.979 | 2.005 | 2.003 | 1.985 | 1.983 | 2.005 |
| $K_2O$ | 0.186 | 0.196 | 0.200 | 0.200 | 0.200 | 0.201 | 0.202 | 0.200 | 0.202 | 0.201 |

TABLE 25O-continued

| | Example | | | | | | | | | |
|---|---|---|---|---|---|---|---|---|---|---|
| | TM-195 | TM-196 | TM-197 | TM-198 | TM-199 | TM-200 | TM-201 | TM-202 | TM-203 | TM-204 |
| MgO | 1.368 | 1.457 | 1.459 | 1.488 | 1.496 | 1.516 | 1.500 | 1.497 | 1.504 | 1.516 |
| CaO | 4.357 | 4.436 | 4.443 | 4.467 | 4.450 | 4.471 | 4.491 | 4.492 | 4.493 | 4.471 |
| ZnO | 0.008 | 0.016 | 0.016 | 0.016 | 0.016 | 0.024 | 0.016 | 0.024 | 0.016 | 0.024 |
| $SnO_2$ | 0.043 | 0.012 | 0.013 | 0.012 | 0.023 | 0.025 | 0.015 | 0.016 | 0.017 | 0.025 |
| $Fe_2O_3$ | 0.004 | 0.004 | 0.004 | 0.004 | 0.003 | 0.004 | 0.003 | 0.003 | 0.003 | 0.004 |
| $TiO_2$ | 0.547 | 0.581 | 0.592 | 0.597 | 0.597 | 0.595 | 0.962 | 1.172 | 1.271 | 0.595 |
| $CeO_2$ | 0.329 | 0.341 | 0.367 | 0.368 | 0.366 | 0.368 | 0.385 | 0.391 | 0.390 | 0.368 |
| $ZrO_2$ | 0.041 | 0.014 | 0.014 | 0.014 | 0.019 | 0.005 | 0.002 | | | 0.005 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 0.876 | 0.922 | 0.960 | 0.966 | 0.963 | 0.963 | 1.347 | 1.563 | 1.661 | 0.963 |
| $R_2O$ | 11.396 | 11.279 | 11.254 | 11.242 | 11.247 | 11.316 | 11.327 | 11.308 | 11.267 | 11.316 |
| $Li_2O + Na_2O$ | 11.210 | 11.083 | 11.054 | 11.042 | 11.047 | 11.115 | 11.125 | 11.108 | 11.066 | 11.115 |
| $R_2O - Al_2O_3$ | −3.312 | −3.435 | −3.459 | −3.515 | −3.483 | −3.373 | −3.401 | −3.396 | −3.423 | −3.373 |
| R'O | 5.733 | 5.909 | 5.917 | 5.970 | 5.961 | 6.010 | 6.007 | 6.013 | 6.012 | 6.010 |
| Thickness (mm) | 4.063 | 4.071 | 4.177 | 4.123 | 4.387 | 4.114 | 4.191 | 4.286 | 3.986 | 2.441 |
| L* | 96.26 | 96.07 | 96.05 | 96.04 | 96.07 | 96.1 | 95.79 | 95.61 | 95.64 | 96.29 |
| a* | −0.71 | −0.92 | −1.02 | −1.02 | −0.99 | −1.01 | −1.5 | −1.81 | −1.92 | −0.63 |
| b* | 3.98 | 5.31 | 5.94 | 5.94 | 5.73 | 5.8 | 8.64 | 10.49 | 11.13 | 3.67 |
| Density ($g/cm^3$) | 2.427 | 2.427 | | 2.429 | 2.430 | 2.430 | | 2.437 | 2.439 | 2.430 |
| Liquidus Temp. (° C.) | | | | | | | | | | |

TABLE 25P

| | Example | | | | | | | | | |
|---|---|---|---|---|---|---|---|---|---|---|
| | TM-205 | TM-206 | TM-207 | TM-208 | TM-209 | TM-210 | TM-211 | TM-212 | TM-213 | TM-214 |
| $SiO_2$ | 60.554 | 60.376 | 60.288 | 60.152 | 60.135 | 60.130 | 60.007 | 60.152 | 60.135 | 60.130 |
| $Al_2O_3$ | 14.728 | 14.704 | 14.690 | 14.713 | 14.694 | 14.683 | 14.684 | 14.713 | 14.694 | 14.683 |
| $B_2O_3$ | 6.012 | 6.012 | 6.051 | 6.063 | 6.061 | 6.061 | 6.075 | 6.063 | 6.061 | 6.061 |
| $P_2O_5$ | 0.000 | 0.000 | 0.000 | 0.000 | 0.000 | 0.000 | 0.000 | 0.000 | 0.000 | 0.000 |
| $Li_2O$ | 9.122 | 9.123 | 9.083 | 9.101 | 9.097 | 9.098 | 9.199 | 9.101 | 9.097 | 9.098 |
| $Na_2O$ | 2.003 | 1.985 | 1.983 | 1.987 | 1.986 | 1.973 | 1.954 | 1.987 | 1.986 | 1.973 |
| $K_2O$ | 0.202 | 0.200 | 0.202 | 0.201 | 0.204 | 0.203 | 0.202 | 0.201 | 0.204 | 0.203 |
| MgO | 1.500 | 1.497 | 1.504 | 1.504 | 1.501 | 1.487 | 1.491 | 1.504 | 1.501 | 1.487 |
| CaO | 4.491 | 4.492 | 4.493 | 4.499 | 4.486 | 4.485 | 4.491 | 4.499 | 4.486 | 4.485 |
| ZnO | 0.016 | 0.024 | 0.016 | 0.024 | 0.024 | 0.024 | 0.016 | 0.024 | 0.024 | 0.024 |
| $SnO_2$ | 0.015 | 0.016 | 0.017 | 0.015 | 0.019 | 0.022 | 0.018 | 0.015 | 0.019 | 0.022 |
| $Fe_2O_3$ | 0.003 | 0.003 | 0.003 | 0.003 | 0.003 | 0.004 | 0.004 | 0.003 | 0.003 | 0.004 |
| $TiO_2$ | 0.962 | 1.172 | 1.271 | 1.343 | 1.399 | 1.433 | 1.462 | 1.343 | 1.399 | 1.433 |
| $CeO_2$ | 0.385 | 0.391 | 0.390 | 0.390 | 0.384 | 0.389 | 0.389 | 0.390 | 0.384 | 0.389 |
| $ZrO_2$ | 0.002 | | | | 0.003 | 0.004 | 0.003 | | 0.003 | 0.004 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.347 | 1.563 | 1.661 | 1.733 | 1.783 | 1.822 | 1.852 | 1.733 | 1.783 | 1.822 |
| $R_2O$ | 11.327 | 11.308 | 11.267 | 11.289 | 11.287 | 11.273 | 11.355 | 11.289 | 11.287 | 11.273 |
| $Li_2O + Na_2O$ | 11.125 | 11.108 | 11.066 | 11.088 | 11.083 | 11.070 | 11.153 | 11.088 | 11.083 | 11.070 |
| $R_2O - Al_2O_3$ | −3.401 | −3.396 | −3.423 | −3.424 | −3.407 | −3.410 | −3.329 | −3.424 | −3.407 | −3.410 |
| R'O | 6.007 | 6.013 | 6.012 | 6.027 | 6.011 | 5.996 | 5.997 | 6.027 | 6.011 | 5.996 |
| Thickness (mm) | 2.453 | 2.444 | 2.451 | 4.294 | 4.203 | 4.375 | 4.076 | 2.400 | 2.421 | 2.420 |
| L* | 96.14 | 96.07 | 96.02 | 95.56 | 95.62 | 95.61 | 95.49 | 96.03 | 96.04 | 96.01 |
| a* | −0.99 | −1.16 | −1.26 | −2.08 | −2.06 | −2.16 | −2.25 | −1.32 | −1.37 | −1.41 |
| b* | 5.6 | 6.53 | 7.12 | 12.16 | 11.93 | 12.57 | 13.31 | 7.4 | 7.63 | 7.84 |
| Density ($g/cm^3$) | | 2.437 | 2.439 | 2.440 | | 2.440 | | 2.440 | | 2.440 |
| Liquidus | | | | | | | | | | |

TABLE 25P-continued

| | Example | | | | | | | | | |
|---|---|---|---|---|---|---|---|---|---|---|
| | TM-205 | TM-206 | TM-207 | TM-208 | TM-209 | TM-210 | TM-211 | TM-212 | TM-213 | TM-214 |
| Temp. (° C.) | | | | | | | | | | |

TABLE 25Q

| | Example | | | | | | | | | |
|---|---|---|---|---|---|---|---|---|---|---|
| | TM-215 | TM-216 | TM-217 | TM-218 | TM-219 | TM-220 | TM-221 | TM-222 | TM-223 | TM-224 |
| $SiO_2$ | 60.007 | 60.059 | 59.947 | 59.925 | 59.694 | 60.059 | 59.947 | 59.925 | 59.694 | 59.634 |
| $Al_2O_3$ | 14.684 | 14.657 | 14.686 | 14.672 | 14.706 | 14.657 | 14.686 | 14.672 | 14.706 | 14.690 |
| $B_2O_3$ | 6.075 | 6.064 | 6.079 | 6.070 | 6.078 | 6.064 | 6.079 | 6.070 | 6.078 | 6.082 |
| $P_2O_5$ | 0.000 | 0.000 | 0.000 | 0.000 | 0.000 | 0.000 | 0.000 | 0.000 | 0.000 | 0.000 |
| $Li_2O$ | 9.199 | 9.182 | 9.204 | 9.191 | 9.195 | 9.182 | 9.204 | 9.191 | 9.195 | 9.201 |
| $Na_2O$ | 1.954 | 1.959 | 1.981 | 1.980 | 1.967 | 1.959 | 1.981 | 1.980 | 1.967 | 1.964 |
| $K_2O$ | 0.202 | 0.201 | 0.203 | 0.206 | 0.205 | 0.201 | 0.203 | 0.206 | 0.205 | 0.203 |
| MgO | 1.491 | 1.491 | 1.495 | 1.493 | 1.502 | 1.491 | 1.495 | 1.493 | 1.502 | 1.483 |
| CaO | 4.491 | 4.464 | 4.492 | 4.481 | 4.496 | 4.464 | 4.492 | 4.481 | 4.496 | 4.485 |
| ZnO | 0.016 | 0.024 | 0.016 | 0.032 | 0.048 | 0.024 | 0.016 | 0.032 | 0.048 | 0.056 |
| $SnO_2$ | 0.018 | 0.022 | 0.019 | 0.012 | 0.014 | 0.022 | 0.019 | 0.012 | 0.014 | 0.015 |
| $Fe_2O_3$ | 0.004 | 0.003 | 0.003 | 0.003 | 0.002 | 0.003 | 0.003 | 0.003 | 0.002 | 0.002 |
| $TiO_2$ | 1.462 | 1.468 | 1.482 | 1.490 | 1.497 | 1.468 | 1.482 | 1.490 | 1.497 | 1.504 |
| $CeO_2$ | 0.389 | 0.394 | 0.391 | 0.439 | 0.586 | 0.394 | 0.391 | 0.439 | 0.586 | 0.681 |
| $ZrO_2$ | 0.003 | 0.006 | 0.001 | 0.001 | | 0.006 | 0.001 | 0.001 | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.852 | 1.862 | 1.873 | 1.929 | 2.083 | 1.862 | 1.873 | 1.929 | 2.083 | 2.184 |
| $R_2O$ | 11.355 | 11.342 | 11.388 | 11.378 | 11.367 | 11.342 | 11.388 | 11.378 | 11.367 | 11.368 |
| $Li_2O + Na_2O$ | 11.153 | 11.141 | 11.185 | 11.171 | 11.162 | 11.141 | 11.185 | 11.171 | 11.162 | 11.165 |
| $R_2O - Al_2O_3$ | −3.329 | −3.315 | −3.298 | −3.294 | −3.340 | −3.315 | −3.298 | −3.294 | −3.340 | −3.322 |
| R'O | 5.997 | 5.979 | 6.003 | 6.006 | 6.046 | 5.979 | 6.003 | 6.006 | 6.046 | 6.024 |
| Thickness (mm) | 2.423 | 4.163 | 4.353 | 4.547 | 4.077 | 2.444 | 2.459 | 2.448 | 2.425 | 4.414 |
| L* | 95.98 | 95.39 | 95.46 | 95.07 | 94.15 | 95.94 | 95.92 | 95.74 | 95.14 | 93.33 |
| a* | −1.46 | −2.28 | −2.27 | −2.59 | −3 | −1.49 | −1.53 | −1.73 | −2.17 | −3.15 |
| b* | 8.19 | 13.49 | 13.41 | 16.27 | 21.96 | 8.33 | 8.57 | 10.16 | 14.23 | 26.17 |
| Density ($g/cm^3$) | | 2.441 | | 2.443 | | 2.441 | | 2.443 | | 2.456 |
| Liquidus Temp. (° C.) | | | | | | | | | | |

TABLE 25R

| | Example | | | | | | | | | |
|---|---|---|---|---|---|---|---|---|---|---|
| | TM-225 | TM-226 | TM-227 | TM-228 | TM-229 | TM-230 | TM-231 | TM-232 | TM-233 | TM-234 |
| $SiO_2$ | 59.620 | 59.511 | 59.558 | 59.634 | 59.620 | 59.511 | 59.558 | 59.578 | 59.529 | 59.531 |
| $Al_2O_3$ | 14.682 | 14.725 | 14.762 | 14.690 | 14.682 | 14.725 | 14.762 | 14.727 | 14.766 | 14.745 |
| $B_2O_3$ | 6.083 | 6.086 | 6.072 | 6.082 | 6.083 | 6.086 | 6.072 | 6.084 | 6.073 | 6.078 |
| $P_2O_5$ | 0.000 | 0.000 | 0.000 | 0.000 | 0.000 | 0.000 | 0.000 | 0.000 | 0.000 | 0.000 |
| $Li_2O$ | 9.204 | 9.207 | 9.084 | 9.201 | 9.204 | 9.207 | 9.084 | 9.102 | 9.086 | 9.093 |
| $Na_2O$ | 1.986 | 1.974 | 1.974 | 1.964 | 1.986 | 1.974 | 1.974 | 1.971 | 1.970 | 1.986 |
| $K_2O$ | 0.202 | 0.200 | 0.201 | 0.203 | 0.202 | 0.200 | 0.201 | 0.204 | 0.205 | 0.207 |
| MgO | 1.469 | 1.497 | 1.482 | 1.483 | 1.469 | 1.497 | 1.482 | 1.490 | 1.510 | 1.490 |
| CaO | 4.470 | 4.496 | 4.507 | 4.485 | 4.470 | 4.496 | 4.507 | 4.503 | 4.504 | 4.507 |
| ZnO | 0.048 | 0.048 | 0.064 | 0.056 | 0.048 | 0.048 | 0.064 | 0.048 | 0.056 | 0.064 |
| $SnO_2$ | 0.023 | 0.015 | 0.021 | 0.015 | 0.023 | 0.015 | 0.021 | 0.022 | 0.021 | 0.019 |
| $Fe_2O_3$ | 0.002 | 0.002 | 0.002 | 0.002 | 0.002 | 0.002 | 0.002 | 0.002 | 0.001 | 0.001 |

TABLE 25R-continued

| | Example | | | | | | | | | |
|---|---|---|---|---|---|---|---|---|---|---|
| | TM-225 | TM-226 | TM-227 | TM-228 | TM-229 | TM-230 | TM-231 | TM-232 | TM-233 | TM-234 |
| $TiO_2$ | 1.501 | 1.505 | 1.504 | 1.504 | 1.501 | 1.505 | 1.504 | 1.509 | 1.512 | 1.506 |
| $CeO_2$ | 0.704 | 0.729 | 0.757 | 0.681 | 0.704 | 0.729 | 0.757 | 0.756 | 0.763 | 0.769 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 2.205 | 2.234 | 2.261 | 2.184 | 2.205 | 2.234 | 2.261 | 2.265 | 2.274 | 2.275 |
| $R_2O$ | 11.392 | 11.382 | 11.259 | 11.368 | 11.392 | 11.382 | 11.259 | 11.277 | 11.261 | 11.286 |
| $Li_2O + Na_2O$ | 11.190 | 11.181 | 11.058 | 11.165 | 11.190 | 11.181 | 11.058 | 11.073 | 11.056 | 11.079 |
| $R_2O - Al_2O_3$ | −3.289 | −3.343 | −3.503 | −3.322 | −3.289 | −3.343 | −3.503 | −3.450 | −3.504 | −3.459 |
| R'O | 5.987 | 6.041 | 6.053 | 6.024 | 5.987 | 6.041 | 6.053 | 6.041 | 6.070 | 6.061 |
| Thickness (mm) | 4.551 | 4.166 | 4.152 | 2.482 | 2.478 | 2.454 | 2.423 | 4.194 | 4.282 | 4.847 |
| L* | 93.19 | 92.97 | 92.74 | 94.62 | 94.58 | 94.36 | 94.27 | 92.73 | 92.66 | 92.63 |
| a* | −3.19 | −3.17 | −3.2 | −2.4 | −2.42 | −2.48 | −2.5 | −3.19 | −3.21 | −3.2 |
| b* | 27.13 | 28.08 | 29.2 | 17.11 | 17.47 | 18.53 | 18.96 | 29.21 | 29.67 | 29.65 |
| Density ($g/cm^3$) | | 2.459 | 2.461 | 2.456 | | 2.459 | 2.461 | 2.461 | | 2.462 |
| Liquidus Temp. (° C.) | | | | | | | | | | |

TABLE 25S

| | Example | | | | | | | | | |
|---|---|---|---|---|---|---|---|---|---|---|
| | TM-235 | TM-236 | TM-237 | TM-238 | TM-239 | TM-240 | TM-241 | TM-242 | TM-243 | TM-244 |
| $SiO_2$ | 59.645 | 59.578 | 59.529 | 59.531 | 59.645 | 59.759 | 59.810 | 60.264 | 60.495 | 60.007 |
| $Al_2O_3$ | 14.728 | 14.727 | 14.766 | 14.745 | 14.728 | 14.750 | 14.715 | 14.777 | 14.795 | 14.684 |
| $B_2O_3$ | 6.084 | 6.084 | 6.073 | 6.078 | 6.084 | 6.080 | 6.079 | 6.075 | 6.062 | 6.075 |
| $P_2O_5$ | 0.000 | 0.000 | 0.000 | 0.000 | 0.000 | 0.000 | 0.000 | 0.000 | 0.000 | 0.000 |
| $Li_2O$ | 9.037 | 9.102 | 9.086 | 9.093 | 9.037 | 9.031 | 9.029 | 9.024 | 9.047 | 9.199 |
| $Na_2O$ | 1.958 | 1.971 | 1.970 | 1.986 | 1.958 | 1.962 | 1.976 | 1.996 | 1.983 | 1.954 |
| $K_2O$ | 0.205 | 0.204 | 0.205 | 0.207 | 0.205 | 0.204 | 0.205 | 0.206 | 0.202 | 0.202 |
| MgO | 1.487 | 1.490 | 1.510 | 1.490 | 1.487 | 1.489 | 1.481 | 1.493 | 1.491 | 1.491 |
| CaO | 4.497 | 4.503 | 4.504 | 4.507 | 4.497 | 4.505 | 4.494 | 4.524 | 4.521 | 4.491 |
| ZnO | 0.064 | 0.048 | 0.056 | 0.064 | 0.064 | 0.064 | 0.056 | 0.056 | 0.056 | 0.016 |
| $SnO_2$ | 0.019 | 0.022 | 0.021 | 0.019 | 0.019 | 0.025 | 0.030 | 0.021 | 0.013 | 0.018 |
| $Fe_2O_3$ | 0.001 | 0.002 | 0.001 | 0.001 | 0.001 | 0.001 | 0.001 | 0.001 | 0.001 | 0.004 |
| $TiO_2$ | 1.501 | 1.509 | 1.512 | 1.506 | 1.501 | 1.358 | 1.358 | 0.793 | 0.558 | 1.462 |
| $CeO_2$ | 0.765 | 0.756 | 0.763 | 0.769 | 0.765 | 0.768 | 0.766 | 0.769 | 0.771 | 0.389 |
| $ZrO_2$ | | | | | | | | | | 0.003 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 2.267 | 2.265 | 2.274 | 2.275 | 2.267 | 2.126 | 2.124 | 1.563 | 1.329 | 1.852 |
| $R_2O$ | 11.200 | 11.277 | 11.261 | 11.286 | 11.200 | 11.197 | 11.210 | 11.225 | 11.232 | 11.355 |
| $Li_2O + Na_2O$ | 10.994 | 11.073 | 11.056 | 11.079 | 10.994 | 10.993 | 11.005 | 11.020 | 11.030 | 11.153 |
| $R_2O - Al_2O_3$ | −3.528 | −3.450 | −3.504 | −3.459 | −3.528 | −3.553 | −3.505 | −3.552 | −3.562 | −3.329 |
| R'O | 6.048 | 6.041 | 6.070 | 6.061 | 6.048 | 6.058 | 6.031 | 6.073 | 6.068 | 5.997 |
| Thickness (mm) | 4.210 | 2.386 | 2.393 | 2.375 | 2.410 | 4.140 | 4.393 | 4.160 | 4.192 | 4.248 |
| L* | 92.66 | 94.28 | 94.27 | 94.27 | 94.28 | 92.93 | 93.19 | 93.99 | 94.22 | 94.67 |
| a* | −3.21 | −2.48 | −2.48 | −2.47 | −2.47 | −3.07 | −2.97 | −2.05 | −1.72 | −2.94 |
| b* | 29.76 | 18.74 | 18.77 | 18.73 | 18.72 | 27.63 | 25.82 | 17.53 | 15.2 | 20.12 |
| Density ($g/cm^3$) | 2.461 | 2.461 | | 2.462 | 2.461 | 2.459 | | 2.453 | 2.449 | |
| Liquidus Temp. (° C.) | | | | | | | | | | |

TABLE 25T

| | Example | | | | | | | | | |
|---|---|---|---|---|---|---|---|---|---|---|
| | TM-245 | TM-246 | TM-247 | TM-248 | TM-249 | TM-250 | TM-251 | TM-252 | TM-253 | TM-254 |
| $SiO_2$ | 60.007 | 59.645 | 59.645 | 59.759 | 59.810 | 60.264 | 60.495 | 60.539 | 60.584 | 60.764 |
| $Al_2O_3$ | 14.684 | 14.728 | 14.728 | 14.750 | 14.715 | 14.777 | 14.795 | 14.803 | 14.774 | 14.751 |
| $B_2O_3$ | 6.075 | 6.084 | 6.084 | 6.080 | 6.079 | 6.075 | 6.062 | 6.047 | 6.048 | 6.030 |
| $P_2O_5$ | 0.000 | 0.000 | 0.000 | 0.000 | 0.000 | 0.000 | 0.000 | 0.000 | 0.000 | 0.000 |
| $Li_2O$ | 9.199 | 9.037 | 9.037 | 9.031 | 9.029 | 9.024 | 9.047 | 9.025 | 9.027 | 8.941 |
| $Na_2O$ | 1.954 | 1.958 | 1.958 | 1.962 | 1.976 | 1.996 | 1.983 | 1.992 | 2.004 | 1.980 |
| $K_2O$ | 0.202 | 0.205 | 0.205 | 0.204 | 0.205 | 0.206 | 0.202 | 0.204 | 0.205 | 0.204 |
| MgO | 1.491 | 1.487 | 1.487 | 1.489 | 1.481 | 1.493 | 1.491 | 1.492 | 1.476 | 1.464 |
| CaO | 4.491 | 4.497 | 4.497 | 4.505 | 4.494 | 4.524 | 4.521 | 4.530 | 4.511 | 4.502 |
| ZnO | 0.016 | 0.064 | 0.064 | 0.064 | 0.056 | 0.056 | 0.056 | 0.056 | 0.051 | 0.055 |
| $SnO_2$ | 0.018 | 0.019 | 0.019 | 0.025 | 0.030 | 0.021 | 0.013 | 0.014 | 0.018 | 0.015 |
| $Fe_2O_3$ | 0.004 | 0.001 | 0.001 | 0.001 | 0.001 | 0.001 | 0.001 | 0.001 | 0.002 | 0.002 |
| $TiO_2$ | 1.462 | 1.501 | 1.501 | 1.358 | 1.358 | 0.793 | 0.558 | 0.526 | 0.526 | 0.518 |
| $CeO_2$ | 0.389 | 0.765 | 0.765 | 0.768 | 0.766 | 0.769 | 0.771 | 0.768 | 0.772 | 0.771 |
| $ZrO_2$ | 0.003 | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.852 | 2.267 | 2.267 | 2.126 | 2.124 | 1.563 | 1.329 | 1.295 | 1.297 | 1.289 |
| $R_2O$ | 11.355 | 11.200 | 11.200 | 11.197 | 11.210 | 11.225 | 11.232 | 11.220 | 11.235 | 11.125 |
| $Li_2O + Na_2O$ | 11.153 | 10.994 | 10.994 | 10.993 | 11.005 | 11.020 | 11.030 | 11.016 | 11.030 | 10.921 |
| $R_2O - Al_2O_3$ | −3.329 | −3.528 | −3.528 | −3.553 | −3.505 | −3.552 | −3.562 | −3.582 | −3.539 | −3.626 |
| R'O | 5.997 | 6.048 | 6.048 | 6.058 | 6.031 | 6.073 | 6.068 | 6.077 | 6.038 | 6.021 |
| Thickness (mm) | 4.242 | 4.220 | 4.685 | 2.420 | 2.403 | 2.365 | 2.406 | 4.160 | 4.388 | 4.256 |
| L* | 94.23 | 88.92 | 86.3 | 94.38 | 94.5 | 95.05 | 95.18 | 94.17 | 94.21 | 94.28 |
| a* | −3.04 | −2.7 | −1.69 | −2.33 | −2.25 | −1.44 | −1.19 | −1.68 | −1.64 | −1.63 |
| b* | 22.54 | 45.61 | 53.12 | 17.56 | 16.74 | 11.04 | 9.5 | 15.04 | 14.7 | 14.59 |
| Density ($g/cm^3$) | | 2.461 | 2.461 | 2.459 | | 2.453 | 2.449 | | 2.449 | 2.448 |
| Liquidus Temp. (° C.) | | | | | | | | | | |

TABLE 25U

| | Example | | | | | | | | | |
|---|---|---|---|---|---|---|---|---|---|---|
| | TM-255 | TM-256 | TM-257 | TM-258 | TM-259 | TM-260 | TM-261 | TM-262 | TM-263 | TM-264 |
| $SiO_2$ | 60.539 | 60.584 | 60.764 | 60.726 | 60.727 | 60.722 | 60.582 | 60.726 | 60.727 | 60.722 |
| $Al_2O_3$ | 14.803 | 14.774 | 14.751 | 14.753 | 14.741 | 14.746 | 14.729 | 14.753 | 14.741 | 14.746 |
| $B_2O_3$ | 6.047 | 6.048 | 6.030 | 6.034 | 6.034 | 6.033 | 6.085 | 6.034 | 6.034 | 6.033 |
| $P_2O_5$ | 0.000 | 0.000 | 0.000 | 0.000 | 0.000 | 0.000 | 0.000 | 0.000 | 0.000 | 0.000 |
| $Li_2O$ | 9.025 | 9.027 | 8.941 | 8.947 | 8.947 | 8.946 | 9.005 | 8.947 | 8.947 | 8.946 |
| $Na_2O$ | 1.992 | 2.004 | 1.980 | 1.993 | 2.014 | 2.003 | 2.023 | 1.993 | 2.014 | 2.003 |
| $K_2O$ | 0.204 | 0.205 | 0.204 | 0.204 | 0.205 | 0.201 | 0.203 | 0.204 | 0.205 | 0.201 |
| MgO | 1.492 | 1.476 | 1.464 | 1.466 | 1.466 | 1.473 | 1.662 | 1.466 | 1.466 | 1.473 |
| CaO | 4.530 | 4.511 | 4.502 | 4.505 | 4.498 | 4.507 | 4.330 | 4.505 | 4.498 | 4.507 |
| ZnO | 0.056 | 0.051 | 0.055 | 0.054 | 0.056 | 0.058 | 0.065 | 0.054 | 0.056 | 0.058 |
| $SnO_2$ | 0.014 | 0.018 | 0.015 | 0.018 | 0.015 | 0.013 | 0.014 | 0.018 | 0.015 | 0.013 |
| $Fe_2O_3$ | 0.001 | 0.002 | 0.002 | 0.002 | 0.001 | 0.001 | 0.001 | 0.002 | 0.001 | 0.001 |
| $TiO_2$ | 0.526 | 0.526 | 0.518 | 0.519 | 0.514 | 0.513 | 0.513 | 0.519 | 0.514 | 0.513 |
| $CeO_2$ | 0.768 | 0.772 | 0.771 | 0.775 | 0.775 | 0.780 | 0.783 | 0.775 | 0.775 | 0.780 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.295 | 1.297 | 1.289 | 1.293 | 1.289 | 1.293 | 1.295 | 1.293 | 1.289 | 1.293 |
| $R_2O$ | 11.220 | 11.235 | 11.125 | 11.143 | 11.166 | 11.149 | 11.231 | 11.143 | 11.166 | 11.149 |
| $Li_2O + Na_2O$ | 11.016 | 11.030 | 10.921 | 10.939 | 10.960 | 10.949 | 11.028 | 10.939 | 10.960 | 10.949 |
| $R_2O - Al_2O_3$ | −3.582 | −3.539 | −3.626 | −3.610 | −3.575 | −3.596 | −3.498 | −3.610 | −3.575 | −3.596 |
| R'O | 6.077 | 6.038 | 6.021 | 6.025 | 6.020 | 6.038 | 6.057 | 6.025 | 6.020 | 6.038 |

TABLE 25U-continued

| | Example | | | | | | | | | |
|---|---|---|---|---|---|---|---|---|---|---|
| | TM-255 | TM-256 | TM-257 | TM-258 | TM-259 | TM-260 | TM-261 | TM-262 | TM-263 | TM-264 |
| Thickness (mm) | 2.417 | 2.418 | 2.444 | 4.380 | 4.072 | 4.378 | 4.870 | 2.426 | 2.421 | 2.347 |
| L* | 95.22 | 95.18 | 95.19 | 94.18 | 94.14 | 94.12 | 94.17 | 95.15 | 95.12 | 95.14 |
| a* | −1.16 | −1.15 | −1.16 | −1.65 | −1.67 | −1.67 | −1.67 | −1.16 | −1.15 | −1.13 |
| b* | 9.3 | 9.35 | 9.39 | 15.04 | 15.31 | 15.34 | 15.23 | 9.48 | 9.53 | 9.33 |
| Density ($g/cm^3$) | | 2.449 | 2.448 | 2.449 | | 2.449 | 2.448 | 2.449 | | 2.449 |
| Liquidus Temp. (° C.) | | | | | | | | | | |

TABLE 25V

| | Example | | | | | | | | | |
|---|---|---|---|---|---|---|---|---|---|---|
| | TM-265 | TM-266 | TM-267 | TM-268 | TM-269 | TM-270 | TM-271 | TM-272 | TM-273 | TM-274 |
| $SiO_2$ | 60.582 | 60.596 | 60.718 | 60.784 | 60.787 | 60.748 | 60.743 | 60.678 | 60.746 | 61.209 |
| $Al_2O_3$ | 14.729 | 14.743 | 14.739 | 14.704 | 14.740 | 14.736 | 14.755 | 14.736 | 14.767 | 14.903 |
| $B_2O_3$ | 6.085 | 6.072 | 6.052 | 5.995 | 5.981 | 5.992 | 5.989 | 6.019 | 6.029 | 6.048 |
| $P_2O_5$ | 0.000 | 0.000 | 0.000 | 0.000 | 0.000 | 0.000 | 0.000 | 0.000 | 0.000 | 0.000 |
| $Li_2O$ | 9.005 | 8.986 | 8.956 | 9.047 | 9.027 | 9.043 | 9.039 | 9.092 | 9.107 | 9.136 |
| $Na_2O$ | 2.023 | 2.005 | 1.996 | 1.989 | 1.991 | 1.995 | 1.980 | 1.985 | 1.995 | 2.007 |
| $K_2O$ | 0.203 | 0.205 | 0.201 | 0.200 | 0.195 | 0.198 | 0.200 | 0.201 | 0.200 | 0.200 |
| MgO | 1.662 | 2.519 | 3.593 | 3.986 | 4.249 | 4.247 | 4.344 | 4.313 | 4.194 | 3.537 |
| CaO | 4.330 | 3.495 | 2.393 | 1.943 | 1.685 | 1.672 | 1.600 | 1.613 | 1.595 | 1.580 |
| ZnO | 0.065 | 0.059 | 0.051 | 0.051 | 0.046 | 0.047 | 0.049 | 0.053 | 0.054 | 0.055 |
| $SnO_2$ | 0.014 | 0.019 | 0.011 | 0.013 | 0.012 | 0.020 | 0.011 | 0.016 | 0.023 | 0.019 |
| $Fe_2O_3$ | 0.001 | 0.001 | 0.002 | 0.001 | 0.002 | 0.002 | 0.002 | 0.002 | 0.002 | 0.001 |
| $TiO_2$ | 0.513 | 0.513 | 0.509 | 0.506 | 0.506 | 0.508 | 0.508 | 0.506 | 0.505 | 0.509 |
| $CeO_2$ | 0.783 | 0.781 | 0.779 | 0.770 | 0.775 | 0.782 | 0.775 | 0.777 | 0.776 | 0.790 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.295 | 1.294 | 1.288 | 1.277 | 1.281 | 1.290 | 1.283 | 1.283 | 1.282 | 1.299 |
| $R_2O$ | 11.231 | 11.195 | 11.154 | 11.236 | 11.212 | 11.236 | 11.219 | 11.278 | 11.303 | 11.344 |
| $Li_2O + Na_2O$ | 11.028 | 10.991 | 10.952 | 11.036 | 11.017 | 11.038 | 11.019 | 11.077 | 11.103 | 11.143 |
| $R_2O - Al_2O_3$ | −3.498 | −3.548 | −3.585 | −3.469 | −3.529 | −3.500 | −3.535 | −3.459 | −3.464 | −3.559 |
| R'O | 6.057 | 6.073 | 6.037 | 5.980 | 5.980 | 5.966 | 5.993 | 5.979 | 5.844 | 5.171 |
| Thickness (mm) | 2.421 | 4.189 | 4.423 | 4.260 | 4.165 | 4.146 | 4.190 | 4.170 | 4.180 | 4.194 |
| L* | 95.13 | 94.35 | 94.58 | 94.8 | 94.76 | 94.78 | 94.75 | 94.75 | 94.71 | 94.51 |
| a* | −1.16 | −1.72 | −1.77 | −1.78 | −1.83 | −1.81 | −1.85 | −1.82 | −1.79 | −1.74 |
| b* | 9.58 | 14.79 | 14.19 | 13.48 | 13.89 | 13.69 | 14.02 | 13.79 | 13.72 | 14.37 |
| Density ($g/cm^3$) | 2.448 | | 2.439 | | 2.436 | | 2.436 | | 2.436 | |
| Liquidus Temp. (° C.) | | | | | | | | | | |

TABLE 25W

| | Example | | | | | | | | | |
|---|---|---|---|---|---|---|---|---|---|---|
| | TM-275 | TM-276 | TM-277 | TM-278 | TM-279 | TM-280 | TM-281 | TM-282 | TM-283 | TM-284 |
| $SiO_2$ | 61.198 | 60.698 | 60.742 | 60.693 | 60.701 | 60.455 | 60.382 | 60.392 | 60.334 | 60.509 |
| $Al_2O_3$ | 14.923 | 14.833 | 14.825 | 14.844 | 14.835 | 14.859 | 14.835 | 14.829 | 14.841 | 14.837 |
| $B_2O_3$ | 6.064 | 5.985 | 5.976 | 5.986 | 5.990 | 6.176 | 6.201 | 6.198 | 6.203 | 6.048 |
| $P_2O_5$ | 0.000 | 0.000 | 0.000 | 0.000 | 0.000 | 0.000 | 0.000 | 0.000 | 0.000 | 0.000 |

TABLE 25W-continued

| | Example | | | | | | | | | |
|---|---|---|---|---|---|---|---|---|---|---|
| | TM-275 | TM-276 | TM-277 | TM-278 | TM-279 | TM-280 | TM-281 | TM-282 | TM-283 | TM-284 |
| $Li_2O$ | 9.160 | 9.918 | 9.904 | 9.920 | 9.927 | 9.930 | 9.969 | 9.966 | 9.974 | 9.971 |
| $Na_2O$ | 2.012 | 1.985 | 1.982 | 1.983 | 1.979 | 1.978 | 1.994 | 1.980 | 1.975 | 1.973 |
| $K_2O$ | 0.206 | 0.201 | 0.203 | 0.199 | 0.200 | 0.203 | 0.206 | 0.201 | 0.206 | 0.203 |
| MgO | 3.493 | 3.468 | 3.454 | 3.461 | 3.090 | 2.719 | 1.422 | 1.269 | 0.981 | 0.909 |
| CaO | 1.577 | 1.552 | 1.547 | 1.546 | 1.910 | 2.307 | 3.613 | 3.782 | 4.101 | 4.149 |
| ZnO | 0.045 | 0.050 | 0.049 | 0.053 | 0.050 | 0.054 | 0.051 | 0.055 | 0.059 | 0.069 |
| $SnO_2$ | 0.020 | 0.022 | 0.017 | 0.017 | 0.014 | 0.018 | 0.018 | 0.020 | 0.020 | 0.018 |
| $Fe_2O_3$ | 0.001 | 0.001 | 0.001 | 0.001 | 0.001 | 0.001 | 0.001 | 0.001 | 0.001 | 0.001 |
| $TiO_2$ | 0.512 | 0.510 | 0.511 | 0.512 | 0.510 | 0.512 | 0.520 | 0.519 | 0.518 | 0.520 |
| $CeO_2$ | 0.783 | 0.772 | 0.784 | 0.779 | 0.786 | 0.782 | 0.784 | 0.782 | 0.785 | 0.788 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.294 | 1.281 | 1.295 | 1.291 | 1.296 | 1.294 | 1.303 | 1.302 | 1.303 | 1.308 |
| $R_2O$ | 11.379 | 12.104 | 12.089 | 12.103 | 12.106 | 12.112 | 12.169 | 12.147 | 12.155 | 12.147 |
| $Li_2O + Na_2O$ | 11.173 | 11.903 | 11.886 | 11.904 | 11.906 | 11.908 | 11.963 | 11.946 | 11.949 | 11.943 |
| $R_2O - Al_2O_3$ | −3.544 | −2.730 | −2.736 | −2.741 | −2.728 | −2.747 | −2.666 | −2.682 | −2.686 | −2.691 |
| R'O | 5.116 | 5.070 | 5.049 | 5.061 | 5.051 | 5.081 | 5.087 | 5.106 | 5.141 | 5.127 |
| Thickness (mm) | 4.614 | 4.276 | 4.301 | 5.387 | 4.217 | 4.340 | 4.301 | 4.267 | 4.995 | 4.099 |
| L* | 94.55 | 94.54 | 94.45 | 94.45 | 94.36 | 94.19 | 93.92 | 93.74 | 93.84 | 93.72 |
| a* | −1.72 | −1.74 | −1.76 | −1.75 | −1.69 | −1.72 | −1.63 | −1.59 | −1.58 | −1.56 |
| b* | 14.15 | 14.3 | 14.68 | 14.51 | 14.61 | 15.38 | 15.74 | 16.03 | 16.09 | 16.23 |
| Density ($g/cm^3$) | 2.431 | 2.431 | 2.431 | | 2.433 | 2.436 | 2.442 | | 2.444 | 2.445 |
| Liquidus Temp. (° C.) | | | | | | | | | | |

TABLE 25X

| | Example | | | | | | | | | |
|---|---|---|---|---|---|---|---|---|---|---|
| | TM-285 | TM-286 | TM-287 | TM-288 | TM-289 | TM-290 | TM-291 | TM-292 | TM-293 | TM-294 |
| $SiO_2$ | 60.571 | 60.555 | 60.483 | 60.662 | 60.562 | 60.471 | 60.403 | 60.151 | 60.028 | 60.072 |
| $Al_2O_3$ | 14.776 | 14.799 | 14.849 | 14.790 | 14.811 | 14.820 | 14.761 | 14.736 | 14.724 | 14.661 |
| $B_2O_3$ | 6.049 | 6.051 | 6.053 | 5.923 | 5.924 | 5.920 | 5.917 | 6.009 | 5.998 | 5.993 |
| $P_2O_5$ | 0.000 | 0.000 | 0.000 | 0.000 | 0.000 | 0.000 | 0.000 | 0.000 | 0.000 | 0.000 |
| $Li_2O$ | 9.972 | 9.975 | 9.979 | 9.994 | 9.995 | 9.989 | 9.983 | 10.074 | 10.057 | 10.048 |
| $Na_2O$ | 2.004 | 1.986 | 1.988 | 2.000 | 1.991 | 1.995 | 1.997 | 1.985 | 2.043 | 2.026 |
| $K_2O$ | 0.203 | 0.203 | 0.203 | 0.203 | 0.205 | 0.204 | 0.203 | 0.205 | 0.205 | 0.205 |
| MgO | 0.824 | 0.701 | 0.626 | 0.597 | 0.593 | 0.559 | 0.524 | 0.517 | 0.510 | 0.516 |
| CaO | 4.212 | 4.348 | 4.433 | 4.443 | 4.476 | 4.517 | 4.549 | 4.555 | 4.564 | 4.527 |
| ZnO | 0.056 | 0.055 | 0.062 | 0.053 | 0.052 | 0.060 | 0.052 | 0.036 | 0.000 | 0.000 |
| $SnO_2$ | 0.022 | 0.019 | 0.018 | 0.022 | 0.021 | 0.020 | 0.015 | 0.014 | 0.015 | 0.009 |
| $Fe_2O_3$ | 0.001 | 0.002 | 0.002 | 0.001 | 0.001 | 0.002 | 0.002 | 0.002 | 0.006 | 0.006 |
| $TiO_2$ | 0.518 | 0.517 | 0.520 | 0.519 | 0.605 | 0.715 | 0.955 | 1.148 | 1.342 | 1.510 |
| $CeO_2$ | 0.787 | 0.784 | 0.783 | 0.787 | 0.753 | 0.717 | 0.631 | 0.558 | 0.484 | 0.399 |
| $ZrO_2$ | | | | | | | | | 0.011 | 0.011 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.305 | 1.301 | 1.303 | 1.306 | 1.359 | 1.432 | 1.585 | 1.705 | 1.826 | 1.910 |
| $R_2O$ | 12.179 | 12.164 | 12.170 | 12.197 | 12.191 | 12.188 | 12.183 | 12.264 | 12.305 | 12.280 |
| $Li_2O + Na_2O$ | 11.976 | 11.961 | 11.966 | 11.994 | 11.986 | 11.984 | 11.980 | 12.060 | 12.100 | 12.074 |
| $R_2O - Al_2O_3$ | −2.597 | −2.635 | −2.679 | −2.592 | −2.620 | −2.633 | −2.578 | −2.472 | −2.418 | −2.381 |
| R'O | 5.092 | 5.104 | 5.121 | 5.093 | 5.122 | 5.136 | 5.125 | 5.108 | 5.074 | 5.044 |
| Thickness (mm) | 4.197 | 4.298 | 4.167 | 4.363 | 4.125 | 4.122 | 4.158 | 4.281 | 4.159 | 3.964 |
| L* | 93.75 | 93.71 | 93.64 | 93.7 | 93.88 | 93.95 | 94.17 | 94.36 | 94.69 | 95.1 |
| a* | −1.56 | −1.55 | −1.56 | −1.54 | −1.69 | −1.85 | −2.2 | −2.45 | −2.6 | −2.52 |
| b* | 16.22 | 16.4 | 16.57 | 16.29 | 16.68 | 16.98 | 17.87 | 18.42 | 18.03 | 16.21 |

TABLE 25X-continued

| | Example | | | | | | | | | |
|---|---|---|---|---|---|---|---|---|---|---|
| | TM-285 | TM-286 | TM-287 | TM-288 | TM-289 | TM-290 | TM-291 | TM-292 | TM-293 | TM-294 |
| Density ($g/cm^3$) | 2.444 | | 2.446 | 2.445 | 2.446 | | 2.443 | 2.442 | 2.441 | |
| Liquidus Temp. (° C.) | | | | | | | | | | |

TABLE 25Y

| Example | TM-295 | TM-296 | TM-297 | TM-298 | TM-299 | TM-300 | TM-301 | TM-302 | TM-303 | TM-304 |
|---|---|---|---|---|---|---|---|---|---|---|
| $SiO_2$ | 60.087 | 60.055 | 60.095 | 60.116 | 60.153 | 60.168 | 60.145 | 60.118 | 60.140 | 60.190 |
| $Al_2O_3$ | 14.651 | 14.728 | 14.688 | 14.686 | 14.656 | 14.675 | 14.666 | 14.690 | 14.688 | 14.665 |
| $B_2O_3$ | 5.989 | 5.983 | 5.987 | 5.984 | 5.985 | 5.974 | 5.973 | 5.959 | 5.969 | 5.961 |
| $P_2O_5$ | 0.000 | 0.000 | 0.000 | 0.000 | 0.000 | 0.000 | 0.000 | 0.000 | 0.000 | 0.000 |
| $Li_2O$ | 10.042 | 9.961 | 9.968 | 9.963 | 9.963 | 9.933 | 9.931 | 9.909 | 9.925 | 9.926 |
| $Na_2O$ | 2.027 | 2.036 | 2.031 | 2.036 | 2.040 | 2.032 | 2.044 | 2.049 | 2.032 | 2.032 |
| $K_2O$ | 0.203 | 0.205 | 0.206 | 0.203 | 0.204 | 0.203 | 0.204 | 0.203 | 0.201 | 0.203 |
| MgO | 0.518 | 0.516 | 0.517 | 0.517 | 0.508 | 0.510 | 0.511 | 0.512 | 0.510 | 0.506 |
| CaO | 4.523 | 4.545 | 4.531 | 4.521 | 4.510 | 4.521 | 4.524 | 4.535 | 4.533 | 4.527 |
| ZnO | 0.000 | 0.000 | 0.000 | 0.000 | 0.001 | 0.001 | 0.001 | 0.000 | 0.000 | 0.000 |
| $SnO_2$ | 0.012 | 0.012 | 0.015 | 0.017 | 0.017 | 0.016 | 0.028 | 0.034 | 0.024 | 0.020 |
| $Fe_2O_3$ | 0.006 | 0.006 | 0.006 | 0.006 | 0.006 | 0.006 | 0.006 | 0.006 | 0.006 | 0.006 |
| $TiO_2$ | 1.512 | 1.525 | 1.531 | 1.526 | 1.526 | 1.536 | 1.535 | 1.540 | 1.539 | 1.537 |
| $CeO_2$ | 0.401 | 0.398 | 0.394 | 0.392 | 0.398 | 0.395 | 0.396 | 0.402 | 0.397 | 0.399 |
| $ZrO_2$ | 0.014 | 0.014 | 0.015 | 0.017 | 0.019 | 0.015 | 0.021 | 0.027 | 0.020 | 0.015 |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.913 | 1.923 | 1.925 | 1.918 | 1.924 | 1.932 | 1.931 | 1.943 | 1.937 | 1.936 |
| $R_2O$ | 12.272 | 12.202 | 12.205 | 12.202 | 12.207 | 12.168 | 12.180 | 12.161 | 12.159 | 12.161 |
| $Li_2O + Na_2O$ | 12.069 | 11.997 | 11.999 | 11.999 | 12.003 | 11.965 | 11.975 | 11.958 | 11.957 | 11.958 |
| $R_2O—Al_2O_3$ | −2.379 | −2.526 | −2.482 | −2.484 | −2.449 | −2.507 | −2.486 | −2.529 | −2.529 | −2.504 |
| R'O | 5.042 | 5.061 | 5.049 | 5.038 | 5.019 | 5.031 | 5.036 | 5.048 | 5.043 | 5.033 |
| Thickness (mm) | 3.999 | 4.433 | 4.017 | 4.131 | 4.050 | 3.900 | 3.906 | 3.979 | 3.972 | 4.132 |
| L* | 95.13 | 95.17 | 95.14 | 95.18 | 95.17 | 95.16 | 95.3 | 95.27 | 95.2 | 95.11 |
| a* | −2.51 | −2.5 | −2.51 | −2.49 | −2.46 | −2.49 | −2.44 | −2.49 | −2.46 | −2.5 |
| b* | 16.02 | 15.9 | 15.93 | 15.76 | 15.57 | 15.79 | 15.18 | 15.49 | 15.49 | 15.87 |
| Density ($g/cm^3$) | 2.438 | | | | | | | | | 2.438 |
| Liquidus Temp. (° C.) | | | | | | | | | | |

TABLE 25Z

| Example | TM-305 | TM-306 | TM-307 | TM-308 | TM-309 | TM-310 | TM-311 | TM-312 | TM-313 | TM-314 |
|---|---|---|---|---|---|---|---|---|---|---|
| $SiO_2$ | 58.199 | 58.058 | 58.609 | 58.469 | 58.775 | 58.630 | 58.676 | 59.307 | 58.477 | 58.759 |
| $Al_2O_3$ | 16.223 | 16.266 | 16.263 | 16.460 | 16.189 | 16.387 | 16.250 | 16.526 | 16.342 | 16.414 |
| $B_2O_3$ | 5.981 | 5.921 | 5.875 | 5.985 | 5.920 | 5.870 | 5.954 | 5.580 | 5.840 | 5.601 |
| $P_2O_5$ | 0.000 | 0.000 | 0.000 | 0.000 | 0.000 | 0.000 | 0.000 | 0.000 | 0.000 | 0.000 |
| $Li_2O$ | 12.137 | 12.097 | 11.826 | 11.595 | 11.599 | 11.584 | 11.725 | 11.691 | 11.860 | 11.821 |
| $Na_2O$ | 6.086 | 6.085 | 6.114 | 6.176 | 6.115 | 6.149 | 6.084 | 6.079 | 6.163 | 6.141 |
| $K_2O$ | 0.189 | 0.187 | 0.194 | 0.189 | 0.195 | 0.194 | 0.194 | 0.186 | 0.198 | 0.193 |
| MgO | 0.014 | 0.011 | 0.013 | 0.014 | 0.014 | 0.014 | 0.016 | 0.014 | 0.016 | 0.014 |
| CaO | 0.009 | 0.009 | 0.005 | 0.010 | 0.009 | 0.009 | 0.010 | 0.009 | 0.013 | 0.013 |
| ZnO | 0.000 | 0.000 | 0.000 | 0.000 | 0.000 | 0.000 | 0.000 | 0.000 | 0.000 | 0.000 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.002 | 0.001 | 0.003 | 0.003 | 0.002 | 0.003 | 0.003 | 0.003 | 0.003 | 0.004 |
| $TiO_2$ | 0.952 | 0.955 | 0.987 | 0.982 | 0.971 | 0.982 | 0.973 | 0.493 | 0.977 | 0.977 |

TABLE 25Z-continued

| Example | TM-305 | TM-306 | TM-307 | TM-308 | TM-309 | TM-310 | TM-311 | TM-312 | TM-313 | TM-314 |
|---|---|---|---|---|---|---|---|---|---|---|
| $CeO_2$ | 0.200 | 0.400 | 0.103 | 0.106 | 0.199 | 0.161 | 0.103 | 0.102 | 0.100 | 0.054 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.152 | 1.355 | 1.090 | 1.088 | 1.170 | 1.143 | 1.076 | 0.595 | 1.077 | 1.031 |
| $R_2O$ | 18.412 | 18.369 | 18.134 | 17.960 | 17.908 | 17.927 | 18.003 | 17.956 | 18.221 | 18.155 |
| $Li_2O + Na_2O$ | 18.223 | 18.182 | 17.940 | 17.771 | 17.714 | 17.733 | 17.809 | 17.770 | 18.022 | 17.962 |
| $R_2O—Al_2O_3$ | 2.190 | 2.104 | 1.871 | 1.500 | 1.719 | 1.540 | 1.753 | 1.429 | 1.879 | 1.742 |
| R'O | 0.023 | 0.020 | 0.017 | 0.025 | 0.024 | 0.024 | 0.026 | 0.024 | 0.029 | 0.027 |
| Thickness (mm) | 1.307 | | 1.336 | 1.318 | 1.307 | 1.336 | 1.342 | | 1.322 | 1.343 |
| L* | 95.05 | | 96.71 | 96.69 | 96.05 | 96.61 | 96.59 | | 96.74 | 96.66 |
| a* | −0.8 | | −0.26 | −0.28 | −0.73 | −0.44 | −0.33 | | −0.28 | −0.14 |
| b* | 8.89 | | 1.46 | 1.5 | 5.28 | 2.41 | 1.41 | | 1.51 | 1.16 |
| Density (g/cm$^3$) | | | | | | | | | | |
| Liquidus Temp. (° C.) | | | | | | | | | | |

TABLE 25AA

| Example | TM-315 | TM-316 | TM-317 | TM-318 | TM-319 | TM-320 | TM-321 | TM-322 | TM-323 | TM-324 |
|---|---|---|---|---|---|---|---|---|---|---|
| $SiO_2$ | 58.511 | 58.511 | 58.538 | 58.515 | 58.649 | 58.452 | 58.373 | 58.402 | 58.367 | 57.989 |
| $Al_2O_3$ | 16.356 | 16.330 | 16.277 | 16.326 | 16.377 | 16.319 | 16.322 | 16.363 | 16.369 | 16.383 |
| $B_2O_3$ | 5.827 | 5.914 | 6.003 | 5.950 | 5.818 | 5.878 | 5.951 | 5.933 | 5.998 | 6.042 |
| $P_2O_5$ | 0.000 | 0.000 | 0.000 | 0.000 | 0.000 | 0.000 | 0.000 | 0.000 | 0.000 | 0.000 |
| $Li_2O$ | 11.808 | 11.823 | 11.749 | 11.818 | 11.767 | 11.840 | 11.791 | 11.210 | 10.681 | 10.423 |
| $Na_2O$ | 6.093 | 6.113 | 6.125 | 6.137 | 6.125 | 6.101 | 6.142 | 5.696 | 5.193 | 4.738 |
| $K_2O$ | 0.192 | 0.192 | 0.194 | 0.193 | 0.193 | 0.192 | 0.196 | 0.193 | 0.195 | 0.195 |
| MgO | 0.013 | 0.016 | 0.014 | 0.016 | 0.014 | 0.016 | 0.019 | 0.021 | 0.031 | 0.035 |
| CaO | 0.011 | 0.011 | 0.011 | 0.011 | 0.011 | 0.011 | 0.013 | 0.978 | 1.963 | 2.970 |
| ZnO | 0.000 | 0.000 | 0.000 | 0.000 | 0.000 | 0.000 | 0.000 | 0.016 | 0.016 | 0.032 |
| $SnO_2$ | 0.000 | 0.000 | 0.000 | 0.000 | 0.000 | 0.000 | 0.000 | 0.003 | 0.003 | 0.001 |
| $Fe_2O_3$ | 0.002 | 0.004 | 0.004 | 0.004 | 0.004 | 0.003 | 0.003 | 0.003 | 0.003 | 0.003 |
| $TiO_2$ | 0.976 | 0.977 | 0.973 | 0.972 | 0.981 | 0.978 | 0.978 | 0.973 | 0.974 | 0.975 |
| $CeO_2$ | 0.199 | 0.099 | 0.100 | 0.050 | 0.049 | 0.200 | 0.201 | 0.198 | 0.201 | 0.201 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.176 | 1.076 | 1.073 | 1.022 | 1.030 | 1.177 | 1.179 | 1.171 | 1.174 | 1.176 |
| $R_2O$ | 18.093 | 18.128 | 18.068 | 18.147 | 18.085 | 18.133 | 18.129 | 17.099 | 16.069 | 15.356 |
| $Li_2O + Na_2O$ | 17.901 | 17.936 | 17.874 | 17.954 | 17.892 | 17.941 | 17.933 | 16.906 | 15.874 | 15.161 |
| $R_2O—Al_2O_3$ | 1.738 | 1.799 | 1.791 | 1.820 | 1.708 | 1.814 | 1.807 | 0.736 | −0.300 | −1.027 |
| R'O | 0.024 | 0.027 | 0.026 | 0.027 | 0.026 | 0.027 | 0.032 | 1.015 | 2.009 | 3.037 |
| Thickness (mm) | 1.347 | 1.272 | 1.336 | 1.274 | | | | 0.712 | 0.722 | 0.692 |
| L* | 95.59 | 96.76 | 96.77 | 96.5 | | | | 96.48 | 96.57 | 96.59 |
| a* | −0.76 | −0.27 | −0.29 | −0.59 | | | | −0.37 | −0.32 | −0.28 |
| b* | 7.04 | 1.42 | 1.52 | 3.58 | | | | 2.57 | 1.68 | 1.54 |
| Density (g/cm$^3$) | | | | | | | | | | |
| Liquidus Temp. (° C.) | | | | | | | | | | |

TABLE 25AB

| Example | TM-325 | TM-326 | TM-327 | TM-328 | TM-329 | TM-330 | TM-331 | TM-332 | TM-333 | TM-334 |
|---|---|---|---|---|---|---|---|---|---|---|
| $SiO_2$ | 57.677 | 59.209 | 59.955 | 58.314 | 60.377 | 59.543 | 60.528 | 60.314 | 61.472 | 60.280 |
| $Al_2O_3$ | 16.598 | 16.296 | 16.473 | 16.409 | 15.513 | 15.983 | 15.053 | 15.076 | 14.543 | 15.163 |
| $B_2O_3$ | 6.075 | 6.018 | 6.029 | 5.942 | 5.928 | 5.900 | 5.913 | 6.022 | 5.921 | 5.811 |
| $P_2O_5$ | 0.000 | 0.000 | 0.000 | 0.000 | 0.000 | 0.000 | 0.000 | 0.000 | 0.000 | 0.000 |
| $Li_2O$ | 9.908 | 10.380 | 9.937 | 9.702 | 8.653 | 8.692 | 10.037 | 10.078 | 9.924 | 9.955 |
| $Na_2O$ | 4.237 | 4.716 | 4.177 | 4.237 | 1.410 | 1.522 | 1.842 | 1.855 | 1.831 | 1.865 |
| $K_2O$ | 0.195 | 0.197 | 0.193 | 0.197 | 0.195 | 0.194 | 0.196 | 0.196 | 0.193 | 0.197 |
| MgO | 0.045 | 0.029 | 0.031 | 0.044 | 2.883 | 5.050 | 2.025 | 2.023 | 1.916 | 2.022 |
| CaO | 4.039 | 1.960 | 1.985 | 3.959 | 3.826 | 1.878 | 2.095 | 2.114 | 1.992 | 2.131 |
| ZnO | 0.016 | 0.016 | 0.024 | 0.000 | 0.000 | 0.000 | 1.065 | 1.073 | 1.005 | 1.102 |
| $SnO_2$ | 0.002 | 0.002 | 0.003 | 0.000 | 0.000 | 0.000 | 0.002 | 0.002 | 0.005 | 0.003 |
| $Fe_2O_3$ | 0.004 | 0.003 | 0.003 | 0.003 | 0.003 | 0.003 | 0.003 | 0.004 | 0.004 | 0.002 |
| $TiO_2$ | 0.987 | 0.969 | 0.978 | 0.976 | 0.993 | 1.015 | 1.015 | 1.015 | 0.986 | 1.024 |
| $CeO_2$ | 0.203 | 0.199 | 0.199 | 0.202 | 0.209 | 0.213 | 0.216 | 0.218 | 0.201 | 0.424 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.191 | 1.168 | 1.177 | 1.178 | 1.202 | 1.228 | 1.230 | 1.233 | 1.187 | 1.448 |
| $R_2O$ | 14.339 | 15.292 | 14.307 | 14.137 | 10.258 | 10.407 | 12.075 | 12.130 | 11.948 | 12.017 |
| $Li_2O + Na_2O$ | 14.145 | 15.096 | 14.114 | 13.940 | 10.063 | 10.213 | 11.879 | 11.933 | 11.756 | 11.820 |
| $R_2O—Al_2O_3$ | −2.259 | −1.003 | −2.166 | −2.272 | −5.255 | −5.576 | −2.979 | −2.946 | −2.594 | −3.146 |
| R'O | 4.100 | 2.004 | 2.039 | 4.003 | 6.709 | 6.928 | 5.185 | 5.210 | 4.913 | 5.255 |
| Thickness (mm) | 0.675 | 0.627 | 1.378 | 0.675 | 1.322 | 1.332 | 1.349 | 1.333 | 1.343 | 1.349 |
| L* | 96.59 | 96.63 | 96.68 | 96.59 | 96.62 | 96.64 | 96.6 | 96.61 | 96.68 | 96.25 |
| a* | −0.25 | −0.23 | −0.35 | −0.25 | −0.33 | −0.32 | −0.38 | −0.38 | −0.28 | −0.83 |
| b* | 1.34 | 1.29 | 1.79 | 1.34 | 1.63 | 1.56 | 1.95 | 2 | 1.45 | 4.74 |
| Density ($g/cm^3$) | | | | | | | | | | |
| Liquidus Temp. (° C.) | | | | | | | | | | |

TABLE 25AC

| Example | TM-335 | TM-336 | TM-337 | TM-338 | TM-339 | TM-340 | TM-341 | TM-342 | TM-343 | TM-344 |
|---|---|---|---|---|---|---|---|---|---|---|
| $SiO_2$ | 61.125 | 60.995 | 60.539 | 60.743 | 59.214 | 59.453 | 61.006 | 61.358 | 60.911 | 60.803 |
| $Al_2O_3$ | 14.651 | 14.714 | 15.081 | 14.925 | 15.593 | 15.651 | 14.781 | 15.141 | 14.731 | 14.640 |
| $B_2O_3$ | 5.896 | 5.860 | 5.892 | 5.885 | 6.096 | 6.051 | 5.953 | 5.253 | 5.980 | 5.979 |
| $P_2O_5$ | 0.000 | 0.050 | 0.000 | 0.000 | 0.000 | 0.000 | 0.000 | 0.005 | 0.000 | 0.050 |
| $Li_2O$ | 10.003 | 9.977 | 9.977 | 9.982 | 10.145 | 9.941 | 9.813 | 9.591 | 9.903 | 9.987 |
| $Na_2O$ | 1.833 | 1.840 | 1.866 | 1.859 | 1.807 | 1.835 | 1.760 | 1.798 | 1.811 | 1.741 |
| $K_2O$ | 0.193 | 0.190 | 0.192 | 0.195 | 0.176 | 0.179 | 0.175 | 0.184 | 0.186 | 0.171 |
| MgO | 1.938 | 1.959 | 2.011 | 1.495 | 2.228 | 2.243 | 2.090 | 2.014 | 2.007 | 2.048 |
| CaO | 2.029 | 2.049 | 2.110 | 2.094 | 2.289 | 2.258 | 2.136 | 2.121 | 2.088 | 2.133 |
| ZnO | 1.017 | 1.034 | 1.068 | 1.591 | 1.189 | 1.113 | 1.072 | 1.067 | 1.055 | 1.133 |
| $SnO_2$ | 0.104 | 0.101 | 0.002 | 0.003 | 0.000 | 0.000 | 0.001 | 0.001 | 0.102 | 0.101 |
| $Fe_2O_3$ | 0.004 | 0.004 | 0.004 | 0.003 | 0.004 | 0.004 | 0.004 | 0.002 | 0.003 | 0.003 |
| $TiO_2$ | 0.994 | 1.002 | 1.016 | 1.007 | 1.034 | 1.041 | 0.995 | 1.031 | 1.005 | 0.993 |
| $CeO_2$ | 0.206 | 0.208 | 0.214 | 0.208 | 0.219 | 0.218 | 0.209 | 0.427 | 0.210 | 0.212 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.201 | 1.210 | 1.230 | 1.215 | 1.253 | 1.259 | 1.203 | 1.458 | 1.214 | 1.204 |
| $R_2O$ | 12.028 | 12.007 | 12.035 | 12.036 | 12.128 | 11.954 | 11.748 | 11.573 | 11.900 | 11.899 |
| $Li_2O + Na_2O$ | 11.835 | 11.817 | 11.843 | 11.841 | 11.952 | 11.775 | 11.572 | 11.389 | 11.713 | 11.728 |
| $R_2O—Al_2O_3$ | −2.623 | −2.707 | −3.046 | −2.889 | −3.466 | −3.698 | −3.034 | −3.568 | −2.831 | −2.741 |
| R'O | 4.984 | 5.042 | 5.190 | 5.180 | 5.705 | 5.615 | 5.298 | 5.202 | 5.150 | 5.314 |
| Thickness (mm) | 1.339 | 1.371 | 1.381 | 1.369 | 1.354 | 1.375 | 1.414 | 1.411 | 1.401 | 1.404 |
| L* | 96.63 | 96.59 | 96.64 | 96.57 | 96.56 | 96.59 | 96.57 | 96.26 | 96.6 | 96.63 |
| a* | −0.27 | −0.31 | −0.29 | −0.41 | −0.42 | −0.41 | −0.32 | −0.87 | −0.32 | −0.31 |
| b* | 1.67 | 1.88 | 1.56 | 2.15 | 2.15 | 2.11 | 2.01 | 4.96 | 1.91 | 1.83 |

TABLE 25AC-continued

| Example | TM-335 | TM-336 | TM-337 | TM-338 | TM-339 | TM-340 | TM-341 | TM-342 | TM-343 | TM-344 |
|---|---|---|---|---|---|---|---|---|---|---|
| Density ($g/cm^3$) | | | | | | | | | | |
| Liquidus Temp. (° C.) | | | | | | | | | | |

TABLE 25AD

| Example | TM-345 | TM-346 | TM-347 | TM-348 | TM-349 | TM-350 | TM-351 | TM-352 | TM-353 | TM-354 |
|---|---|---|---|---|---|---|---|---|---|---|
| $SiO_2$ | 59.468 | 60.460 | 64.701 | 64.666 | 64.271 | 64.556 | 64.764 | 64.074 | 63.986 | 63.749 |
| $Al_2O_3$ | 15.686 | 15.286 | 12.988 | 12.996 | 12.892 | 13.024 | 12.961 | 12.946 | 12.937 | 12.770 |
| $B_2O_3$ | 6.026 | 5.992 | 5.829 | 5.809 | 5.719 | 5.828 | 5.744 | 5.642 | 5.779 | 5.715 |
| $P_2O_5$ | 0.000 | 0.000 | 0.000 | 0.000 | 0.000 | 0.000 | 0.000 | 0.000 | 0.000 | 0.000 |
| $Li_2O$ | 9.952 | 9.668 | 11.984 | 12.021 | 11.714 | 12.066 | 10.021 | 9.964 | 9.946 | 9.646 |
| $Na_2O$ | 1.796 | 1.815 | 2.807 | 2.803 | 2.732 | 2.821 | 1.837 | 1.822 | 1.821 | 1.783 |
| $K_2O$ | 0.178 | 0.185 | 0.195 | 0.196 | 0.186 | 0.198 | 0.196 | 0.198 | 0.197 | 0.188 |
| MgO | 2.212 | 1.561 | 0.009 | 0.009 | 0.008 | 0.009 | 0.034 | 0.030 | 0.033 | 0.030 |
| CaO | 2.233 | 2.157 | 0.009 | 0.012 | 0.010 | 0.010 | 2.935 | 2.978 | 2.964 | 2.915 |
| ZnO | 1.152 | 1.616 | 0.000 | 0.000 | 0.000 | 0.000 | 0.000 | 0.000 | 0.000 | 0.000 |
| $SnO_2$ | 0.001 | 0.000 | 0.050 | 0.052 | 0.044 | 0.051 | 0.047 | 0.049 | 0.048 | 0.040 |
| $Fe_2O_3$ | 0.004 | 0.003 | 0.002 | 0.002 | 0.002 | 0.002 | 0.003 | 0.003 | 0.003 | 0.003 |
| $TiO_2$ | 1.041 | 1.030 | 0.980 | 0.984 | 0.972 | 0.981 | 0.982 | 0.983 | 0.976 | 0.966 |
| $CeO_2$ | 0.223 | 0.219 | 0.201 | 0.205 | 0.200 | 0.207 | 0.200 | 0.203 | 0.206 | 0.195 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.264 | 1.249 | 1.181 | 1.188 | 1.172 | 1.187 | 1.182 | 1.185 | 1.182 | 1.161 |
| $R_2O$ | 11.926 | 11.669 | 14.985 | 15.020 | 14.632 | 15.085 | 12.053 | 11.984 | 11.964 | 11.617 |
| $Li_2O + Na_2O$ | 11.748 | 11.484 | 14.791 | 14.824 | 14.446 | 14.887 | 11.857 | 11.786 | 11.767 | 11.429 |
| $R_2O—Al_2O_3$ | −3.760 | −3.617 | 1.997 | 2.024 | 1.740 | 2.061 | −0.908 | −0.962 | −0.974 | −1.153 |
| R'O | 5.597 | 5.333 | 0.018 | 0.022 | 0.018 | 0.019 | 2.969 | 3.008 | 2.997 | 2.945 |
| Thickness (mm) | 1.315 | 1.332 | 1.263 | 1.324 | 1.272 | 1.261 | 1.263 | 1.304 | 1.321 | 1.327 |
| L* | 96.66 | 96.61 | 96.73 | 96.77 | 96.79 | 96.8 | 96.77 | 96.77 | 96.77 | 96.78 |
| a* | −0.27 | −0.41 | −0.34 | −0.36 | −0.34 | −0.33 | −0.26 | −0.28 | −0.28 | −0.23 |
| b* | 1.44 | 2.11 | 1.83 | 1.89 | 1.81 | 1.75 | 1.43 | 1.51 | 1.56 | 1.4 |
| Density ($g/cm^3$) | | | | | | | | | | |
| Liquidus Temp. (° C.) | | | | | | | | | | |

TABLE 25AE

| Example | TM-355 | TM-356 | TM-357 | TM-358 | TM-359 | TM-360 | TM-361 | TM-362 | TM-363 | TM-364 |
|---|---|---|---|---|---|---|---|---|---|---|
| $SiO_2$ | 63.775 | 62.413 | 58.673 | 57.445 | 59.730 | 58.759 | 60.601 | 61.581 | 62.137 | 61.463 |
| $Al_2O_3$ | 12.781 | 14.797 | 17.014 | 16.961 | 16.736 | 16.344 | 14.931 | 14.390 | 14.227 | 14.564 |
| $B_2O_3$ | 5.553 | 5.933 | 5.551 | 6.208 | 5.451 | 6.259 | 5.818 | 5.932 | 5.692 | 5.707 |
| $P_2O_5$ | 0.000 | 0.000 | 0.000 | 0.000 | 0.000 | 0.000 | 0.000 | 0.000 | 0.000 | 0.000 |
| $Li_2O$ | 9.666 | 8.872 | 8.827 | 9.475 | 8.846 | 9.693 | 10.043 | 9.657 | 9.644 | 9.999 |
| $Na_2O$ | 1.784 | 1.356 | 1.414 | 1.390 | 1.407 | 1.399 | 1.862 | 1.852 | 1.855 | 1.837 |
| $K_2O$ | 0.189 | 0.003 | 0.190 | 0.186 | 0.193 | 0.190 | 0.195 | 0.195 | 0.197 | 0.186 |
| MgO | 0.030 | 2.804 | 2.224 | 2.225 | 2.132 | 2.070 | 1.986 | 1.871 | 1.894 | 2.013 |
| CaO | 2.932 | 1.938 | 4.900 | 4.803 | 4.724 | 4.534 | 2.068 | 1.982 | 1.964 | 1.994 |
| ZnO | 0.000 | 0.984 | 0.000 | 0.000 | 0.000 | 0.000 | 1.044 | 1.001 | 0.996 | 1.022 |
| $SnO_2$ | 0.040 | 0.005 | 0.000 | 0.000 | 0.000 | 0.000 | 0.000 | 0.000 | 0.000 | 0.000 |
| $Fe_2O_3$ | 0.003 | 0.002 | 0.005 | 0.004 | 0.004 | 0.004 | 0.002 | 0.001 | 0.002 | 0.003 |
| $TiO_2$ | 0.964 | 0.587 | 1.079 | 1.066 | 0.543 | 0.518 | 1.015 | 0.980 | 0.983 | 0.999 |
| $CeO_2$ | 0.198 | 0.303 | 0.116 | 0.228 | 0.225 | 0.222 | 0.425 | 0.552 | 0.402 | 0.203 |
| $ZrO_2$ | | | | | | | | | | |

TABLE 25AE-continued

| Example | TM-355 | TM-356 | TM-357 | TM-358 | TM-359 | TM-360 | TM-361 | TM-362 | TM-363 | TM-364 |
|---|---|---|---|---|---|---|---|---|---|---|
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.162 | 0.890 | 1.195 | 1.294 | 0.768 | 0.740 | 1.441 | 1.531 | 1.384 | 1.202 |
| $R_2O$ | 11.639 | 10.231 | 10.431 | 11.051 | 10.447 | 11.282 | 12.100 | 11.704 | 11.696 | 12.023 |
| $Li_2O + Na_2O$ | 11.450 | 10.228 | 10.241 | 10.865 | 10.253 | 11.092 | 11.905 | 11.509 | 11.499 | 11.837 |
| $R_2O—Al_2O_3$ | −1.142 | −4.566 | −6.583 | −5.910 | −6.289 | −5.062 | −2.831 | −2.686 | −2.530 | −2.541 |
| R'O | 2.961 | 5.726 | 7.124 | 7.028 | 6.856 | 6.604 | 5.099 | 4.853 | 4.854 | 5.029 |
| Thickness (mm) | 1.28 | 1.299 | | | | | 1.362 | | 1.335 | 1.322 |
| L* | 96.79 | 96.55 | | | | | 96.22 | | 96.11 | 96.44 |
| a* | −0.21 | −0.31 | | | | | −0.87 | | −0.91 | −0.38 |
| b* | 1.32 | 1.69 | | | | | 5.01 | | 5.37 | 2.02 |
| Density (g/cm$^3$) | | | | | | | | | | 2.426 |
| Liquidus Temp. (° C.) | | | | | | | | | | 1140 |

TABLE 25AF

| Example | TM-365 | TM-366 | TM-367 | TM-368 | TM-369 | TM-370 | TM-371 | TM-372 | TM-373 | TM-374 |
|---|---|---|---|---|---|---|---|---|---|---|
| $SiO_2$ | 60.804 | 60.576 | 60.231 | 61.469 | 62.340 | 61.703 | 60.724 | 61.098 | 62.294 | 61.677 |
| $Al_2O_3$ | 14.714 | 14.504 | 14.428 | 14.810 | 14.326 | 14.629 | 14.698 | 14.431 | 14.644 | 14.862 |
| $B_2O_3$ | 5.689 | 5.677 | 5.662 | 5.655 | 5.495 | 5.395 | 5.497 | 5.644 | 5.810 | 5.787 |
| $P_2O_5$ | 0.000 | 0.000 | 0.000 | 0.000 | 0.000 | 0.000 | 0.000 | 0.000 | 0.000 | 0.000 |
| $Li_2O$ | 10.162 | 10.324 | 10.089 | 10.236 | 10.071 | 9.945 | 9.983 | 10.156 | 10.125 | 10.095 |
| $Na_2O$ | 1.841 | 1.828 | 1.807 | 1.873 | 1.841 | 1.839 | 1.829 | 1.816 | 1.867 | 1.902 |
| $K_2O$ | 0.187 | 0.179 | 0.182 | 0.191 | 0.183 | 0.189 | 0.189 | 0.186 | 0.191 | 0.191 |
| MgO | 2.067 | 2.025 | 2.019 | 2.052 | 1.960 | 2.001 | 2.049 | 1.991 | 2.043 | 2.114 |
| CaO | 2.041 | 2.000 | 1.995 | 2.039 | 1.961 | 2.024 | 2.036 | 1.972 | 2.007 | 2.088 |
| ZnO | 1.057 | 1.074 | 1.083 | 1.040 | 1.018 | 1.043 | 1.053 | 1.005 | 0.994 | 1.047 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.002 | 0.002 | 0.002 | 0.002 | 0.001 | 0.002 | 0.002 | 0.002 | 0.004 | 0.003 |
| $TiO_2$ | 1.011 | 0.991 | 0.988 | 0.206 | 0.394 | 0.806 | 1.514 | 1.490 | 0.008 | 0.008 |
| $CeO_2$ | 0.416 | 0.811 | 1.505 | 0.417 | 0.400 | 0.413 | 0.416 | 0.204 | 0.002 | 0.210 |
| $ZrO_2$ | | | | | | | | | | |
| $La_2O_3$ | | | | | | | | | | |
| $SO_3$ | | | | | 0.002 | | | | | 0.005 |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.427 | 1.802 | 2.493 | 0.623 | 0.794 | 1.219 | 1.930 | 1.694 | 0.010 | 0.218 |
| $R_2O$ | 12.190 | 12.332 | 12.078 | 12.299 | 12.096 | 11.973 | 12.001 | 12.158 | 12.184 | 12.189 |
| $Li_2O + Na_2O$ | 12.002 | 12.152 | 11.895 | 12.108 | 11.912 | 11.783 | 11.811 | 11.972 | 11.993 | 11.998 |
| $R_2O—Al_2O_3$ | −2.524 | −2.172 | −2.350 | 2.510 | −2.230 | −2.656 | 2.697 | −2.273 | −2.460 | −2.673 |
| R'O | 5.165 | 5.099 | 5.098 | 5.131 | 4.939 | 5.069 | 5.138 | 4.968 | 5.045 | 5.248 |
| Thickness (mm) | 1.317 | 1.3 | 1.302 | 1.317 | 1.306 | 1.297 | 1.294 | 1.306 | 1.303 | 1.305 |
| L* | 96.16 | 95.24 | 78.05 | 96.40 | 96.39 | 96.26 | 91.74 | 96.35 | 96.69 | 96.61 |
| a* | −0.76 | −1.27 | 1.20 | −0.28 | −0.34 | −0.59 | −1.67 | −0.67 | 0.00 | −0.11 |
| b* | 4.40 | 9.54 | 50.71 | 1.90 | 2.25 | 3.50 | 24.78 | 3.67 | 0.20 | 0.78 |
| Density (g/cm$^3$) | 2.442 | 2.46 | 2.497 | 2.432 | 2.437 | 2.435 | 2.447 | 2.434 | | |
| Liquidus Temp. (° C.) | 1155 | 1165 | 1160 | 1155 | 1160 | 1150 | 1165 | 1155 | | |

TABLE 25AG

| Example | TM-375 | TM-376 | TM-377 | TM-378 | TM-379 | TM-380 | TM-381 | TM-382 | TM-383 | TM-384 |
|---|---|---|---|---|---|---|---|---|---|---|
| $SiO_2$ | 61.698 | 61.353 | 61.076 | 61.998 | 61.764 | 61.536 | 61.663 | 61.249 | 60.429 | 61.303 |
| $Al_2O_3$ | 14.856 | 14.696 | 14.518 | 14.656 | 14.822 | 14.693 | 14.631 | 14.539 | 14.544 | 14.612 |
| $B_2O_3$ | 5.763 | 5.805 | 5.715 | 5.892 | 5.795 | 5.770 | 5.640 | 5.794 | 5.777 | 5.777 |
| $P_2O_5$ | 0.000 | 0.000 | 0.000 | 0.000 | 0.000 | 0.000 | 0.000 | 0.000 | 0.000 | 0.000 |
| $Li_2O$ | 9.914 | 10.046 | 9.942 | 10.168 | 9.987 | 9.985 | 9.823 | 9.855 | 9.910 | 9.933 |
| $Na_2O$ | 1.896 | 1.870 | 1.850 | 1.874 | 1.884 | 1.923 | 1.896 | 1.867 | 1.868 | 1.888 |
| $K_2O$ | 0.193 | 0.187 | 0.185 | 0.187 | 0.193 | 0.195 | 0.194 | 0.187 | 0.191 | 0.189 |
| MgO | 2.093 | 2.078 | 2.037 | 2.032 | 2.085 | 2.073 | 2.067 | 2.058 | 2.064 | 2.030 |
| CaO | 2.083 | 2.058 | 2.036 | 1.999 | 2.051 | 2.018 | 2.039 | 2.013 | 2.029 | 2.006 |
| ZnO | 1.060 | 1.063 | 1.094 | 0.978 | 0.999 | 0.998 | 1.021 | 1.012 | 1.021 | 1.006 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.002 | 0.001 | 0.001 | 0.004 | 0.004 | 0.004 | 0.003 | 0.001 | 0.001 | 0.001 |
| $TiO_2$ | 0.007 | 0.008 | 0.007 | 0.199 | 0.405 | 0.593 | 0.593 | 0.583 | 0.588 | 0.198 |
| $CeO_2$ | 0.417 | 0.823 | 1.527 | 0.003 | 0.001 | 0.198 | 0.415 | 0.827 | 1.565 | 1.041 |
| $ZrO_2$ | | | | | | | | | | |
| $La_2O_3$ | | | | | | | | | | |
| $SO_3$ | 0.002 | | | | | | 0.001 | | | 0.001 |
| $WO_3$ | | | | | | | | | | |
| $Nb_2O_5$ | | | | | | 0.004 | 0.003 | | | |
| $Bi_2O_3$ | | | | | | | | | | |
| $MoO_3$ | | | | | | | | | | |
| $CeO_2 + TiO_2$ | 0.424 | 0.831 | 1.534 | 0.202 | 0.406 | 0.791 | 1.008 | 1.411 | 2.153 | 1.238 |
| $R_2O$ | 12.004 | 12.103 | 11.977 | 12.229 | 12.063 | 12.103 | 11.913 | 11.910 | 11.968 | 12.011 |
| $Li_2O + Na_2O$ | 11.811 | 11.916 | 11.792 | 12.042 | 11.870 | 11.908 | 11.719 | 11.722 | 11.778 | 11.821 |
| $R_2O—Al_2O_3$ | −2.852 | −2.593 | −2.540 | −2.428 | −2.759 | −2.590 | −2.718 | −2.629 | −2.576 | −2.601 |
| R'O | 5.237 | 5.199 | 5.167 | 5.010 | 5.135 | 5.089 | 5.126 | 5.083 | 5.113 | 5.042 |
| Thickness (mm) | 1.3 | 1.304 | 1.286 | 1.309 | 1.305 | 1.319 | 1.328 | 1.326 | 1.321 | 1.314 |
| L* | 96.45 | 95.83 | 94.16 | 96.67 | 96.73 | 96.53 | 96.30 | 95.50 | 88.89 | 95.31 |
| a* | −0.22 | −0.34 | −0.22 | −0.01 | 0.00 | −0.20 | −0.45 | −0.82 | −0.98 | −0.49 |
| b* | 1.63 | 4.04 | 8.95 | 0.21 | 0.21 | 1.27 | 2.86 | 6.82 | 21.58 | 6.20 |
| Density ($g/cm^3$) | | | | | | 2.423 | 2.432 | 2.457 | 2.489 | 2.462 |
| Liquidus Temp. (° C.) | | | | | | 1190 | 1170 | 1140 | 1155 | 1150 |

TABLE 25AH

| Example | TM-385 | TM-386 | TM-387 | TM-388 | TM-389 | TM-390 | TM-391 | TM-392 | TM-393 | TM-394 |
|---|---|---|---|---|---|---|---|---|---|---|
| $SiO_2$ | 61.406 | 60.866 | 60.079 | 61.338 | 62.505 | 62.054 | 60.320 | 62.899 | 62.147 | 59.768 |
| $Al_2O_3$ | 14.507 | 14.529 | 14.559 | 14.593 | 14.503 | 14.478 | 14.321 | 14.494 | 14.610 | 14.583 |
| $B_2O_3$ | 5.685 | 5.727 | 5.761 | 5.850 | 5.737 | 5.791 | 5.779 | 5.725 | 5.652 | 5.703 |
| $P_2O_5$ | 0.000 | 0.000 | 0.000 | 0.000 | 0.000 | 0.000 | 0.000 | 0.000 | 0.000 | 0.000 |
| $Li_2O$ | 9.875 | 9.927 | 9.953 | 9.969 | 8.673 | 9.182 | 11.182 | 9.853 | 9.914 | 9.943 |
| $Na_2O$ | 1.878 | 1.870 | 1.869 | 1.877 | 1.855 | 1.849 | 1.829 | 0.390 | 0.975 | 3.299 |
| $K_2O$ | 0.186 | 0.186 | 0.184 | 0.188 | 0.191 | 0.191 | 0.190 | 0.190 | 0.193 | 0.192 |
| MgO | 2.025 | 2.035 | 2.043 | 2.050 | 2.049 | 2.031 | 2.001 | 2.027 | 2.042 | 2.040 |
| CaO | 1.999 | 2.006 | 2.002 | 1.994 | 2.020 | 1.985 | 1.964 | 1.987 | 2.004 | 2.018 |
| ZnO | 0.993 | 1.009 | 1.004 | 1.002 | 1.048 | 1.029 | 1.011 | 1.019 | 1.037 | 1.029 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.001 | 0.001 | 0.001 | 0.001 | 0.003 | 0.003 | 0.003 | 0.003 | 0.003 | 0.003 |
| $TiO_2$ | 0.387 | 0.781 | 1.468 | 0.294 | 0.999 | 0.993 | 0.991 | 0.996 | 1.000 | 0.999 |
| $CeO_2$ | 1.039 | 1.040 | 1.043 | 0.834 | 0.407 | 0.406 | 0.400 | 0.408 | 0.414 | 0.408 |
| $ZrO_2$ | | | | | | | | | | |
| $La_2O_3$ | | | | | | | | | | |
| $SO_3$ | 0.004 | 0.010 | 0.020 | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.426 | 1.821 | 2.511 | 1.128 | 1.406 | 1.398 | 1.391 | 1.404 | 1.414 | 1.407 |
| $R_2O$ | 11.939 | 11.982 | 12.006 | 12.034 | 10.719 | 11.221 | 13.200 | 10.433 | 11.082 | 13.434 |
| $Li_2O + Na_2O$ | 11.754 | 11.796 | 11.822 | 11.846 | 10.528 | 11.031 | 13.011 | 10.243 | 10.889 | 13.243 |
| $R_2O—Al_2O_3$ | −2.567 | −2.547 | −2.553 | −2.559 | −3.784 | −3.257 | −1.121 | −4.061 | −3.528 | −1.148 |
| R'O | 5.017 | 5.050 | 5.050 | 5.045 | 5.118 | 5.044 | 4.976 | 5.033 | 5.083 | 5.088 |
| Thickness (mm) | 1.316 | 1.299 | 1.317 | 1.328 | 1.318 | 1.321 | 1.358 | 1.31 | 1.309 | 1.314 |
| L* | 94.98 | 93.05 | 78.73 | 95.79 | 96.36 | 96.27 | 96.05 | 96.35 | 96.26 | 95.50 |
| a* | −0.71 | −1.51 | 3.11 | −0.50 | −0.53 | −0.61 | −0.87 | −0.53 | −0.61 | −1.11 |
| b* | 8.07 | 15.87 | 66.05 | 4.71 | 2.96 | 3.51 | 5.36 | 2.86 | 3.37 | 7.62 |

TABLE 25AH-continued

| Example | TM-385 | TM-386 | TM-387 | TM-388 | TM-389 | TM-390 | TM-391 | TM-392 | TM-393 | TM-394 |
|---|---|---|---|---|---|---|---|---|---|---|
| Density ($g/cm^3$) | 2.465 | 2.463 | 2.477 | 2.454 | 2.434 | 2.438 | 2.451 | 2.43 | 2.435 | 2.452 |
| Liquidus Temp. (° C.) | 1185 | 1145 | 1150 | 1150 | | | | | | |

TABLE 25AI

| Example | TM-395 | TM-396 | TM-397 | TM-398 | TM-399 | TM-400 | TM-401 | TM-402 | TM-403 | TM-404 |
|---|---|---|---|---|---|---|---|---|---|---|
| $SiO_2$ | 62.861 | 63.118 | 63.125 | 61.304 | 61.305 | 61.386 | 60.739 | 60.354 | 60.167 | 60.820 |
| $Al_2O_3$ | 14.549 | 14.510 | 14.461 | 14.333 | 14.155 | 14.179 | 14.661 | 14.740 | 14.708 | 14.725 |
| $B_2O_3$ | 5.958 | 5.797 | 5.918 | 5.931 | 5.988 | 5.932 | 5.856 | 6.086 | 6.048 | 5.857 |
| $P_2O_5$ | 0.000 | 0.000 | 0.000 | 0.000 | 0.000 | 0.000 | 0.000 | 0.000 | 0.000 | 0.000 |
| $Li_2O$ | 10.097 | 10.044 | 10.014 | 9.879 | 10.270 | 10.157 | 10.088 | 10.193 | 10.326 | 10.041 |
| $Na_2O$ | 1.857 | 1.858 | 1.850 | 1.880 | 1.890 | 1.868 | 1.857 | 1.901 | 1.944 | 1.911 |
| $K_2O$ | 0.193 | 0.192 | 0.190 | 0.193 | 0.192 | 0.194 | 0.375 | 0.191 | 0.197 | 0.192 |
| MgO | 0.030 | 2.051 | 1.523 | 1.999 | 1.869 | 1.938 | 1.988 | 2.034 | 2.067 | 1.972 |
| CaO | 2.014 | 0.023 | 1.501 | 2.066 | 1.968 | 1.970 | 2.009 | 2.066 | 2.087 | 2.042 |
| ZnO | 1.032 | 1.011 | 0.016 | 1.011 | 0.977 | 0.990 | 1.002 | 1.007 | 1.019 | 0.998 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.003 | 0.002 | 0.003 | 0.003 | 0.003 | 0.003 | 0.003 | 0.003 | 0.003 | 0.003 |
| $TiO_2$ | 0.989 | 0.983 | 0.988 | 0.978 | 0.970 | 0.968 | 0.994 | 1.000 | 1.002 | 1.002 |
| $CeO_2$ | 0.406 | 0.404 | 0.401 | 0.406 | 0.397 | 0.398 | 0.410 | 0.410 | 0.417 | 0.411 |
| $ZrO_2$ | | | | | | | | | | |
| $La_2O_3$ | | | | | | | | | | |
| $SO_3$ | | | | | | | | | | 0.007 |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.396 | 1.388 | 1.389 | 1.384 | 1.367 | 1.366 | 1.404 | 1.410 | 1.418 | 1.414 |
| $R_2O$ | 12.147 | 12.094 | 12.055 | 11.953 | 12.352 | 12.218 | 12.319 | 12.285 | 12.467 | 12.144 |
| $Li_2O + Na_2O$ | 11.954 | 11.902 | 11.864 | 11.759 | 12.160 | 12.024 | 11.945 | 12.094 | 12.269 | 11.952 |
| $R_2O—Al_2O_3$ | −2.401 | −2.416 | −2.406 | −2.380 | −1.802 | −1.961 | −2.342 | −2.455 | −2.241 | −2.582 |
| R'O | 3.076 | 3.084 | 3.040 | 5.076 | 4.814 | 4.898 | 4.999 | 5.107 | 5.173 | 5.013 |
| Thickness (mm) | 1.307 | 1.318 | 1.321 | 1.288 | 1.298 | 1.292 | 1.305 | 1.299 | 1.294 | 1.299 |
| L* | 96.47 | 96.44 | 96.39 | 96.21 | 96.09 | 96.06 | 96.06 | 96.04 | 96.11 | 96.12 |
| a* | −0.64 | −0.51 | −0.56 | −0.76 | −0.85 | −0.87 | −0.83 | −0.86 | −0.79 | −0.75 |
| b* | 3.59 | 2.75 | 3.15 | 4.47 | 5.11 | 5.18 | 4.90 | 5.09 | 4.70 | 4.50 |
| Density ($g/cm^3$) | 2.419 | 2.408 | 2.402 | | | | | | | |
| Liquidus Temp. (° C.) | | | | | | | | | | |

TABLE 25AJ

| Example | TM-405 | TM-406 | TM-407 | TM-408 | TM-409 | TM-410 | TM-411 | TM-412 | TM-413 | TM-414 |
|---|---|---|---|---|---|---|---|---|---|---|
| $SiO_2$ | 60.732 | 60.871 | 62.547 | 61.554 | 63.613 | 61.314 | 61.240 | 61.373 | 62.031 | 60.955 |
| $Al_2O_3$ | 14.501 | 14.581 | 13.795 | 14.167 | 14.152 | 14.505 | 14.493 | 14.270 | 13.888 | 14.442 |
| $B_2O_3$ | 6.170 | 5.856 | 5.721 | 6.035 | 5.296 | 5.761 | 5.742 | 5.772 | 5.861 | 5.942 |
| $P_2O_5$ | 0.000 | 0.000 | 0.000 | 0.000 | 0.000 | 0.000 | 0.000 | 0.000 | 0.000 | 0.000 |
| $Li_2O$ | 10.077 | 10.205 | 10.024 | 10.419 | 9.319 | 9.960 | 10.022 | 10.060 | 10.080 | 10.205 |
| $Na_2O$ | 1.923 | 1.890 | 1.723 | 1.610 | 1.395 | 1.888 | 1.900 | 2.033 | 1.887 | 1.898 |
| $K_2O$ | 0.198 | 0.192 | 0.191 | 0.190 | 0.187 | 0.190 | 0.188 | 0.188 | 0.196 | 0.196 |
| MgO | 1.964 | 1.964 | 1.815 | 1.861 | 1.841 | 1.974 | 2.007 | 1.964 | 1.852 | 1.975 |
| CaO | 2.030 | 2.016 | 1.899 | 1.911 | 1.928 | 1.983 | 1.996 | 1.964 | 1.904 | 1.988 |
| ZnO | 0.977 | 1.008 | 0.944 | 0.865 | 0.905 | 0.986 | 0.980 | 0.976 | 0.937 | 0.983 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.003 | 0.003 | 0.003 | 0.003 | 0.003 | 0.003 | 0.003 | 0.003 | 0.003 | 0.003 |
| $TiO_2$ | 0.993 | 0.986 | 0.936 | 0.955 | 0.949 | 0.986 | 0.985 | 0.966 | 0.951 | 0.986 |

TABLE 25AJ-continued

| Example | TM-405 | TM-406 | TM-407 | TM-408 | TM-409 | TM-410 | TM-411 | TM-412 | TM-413 | TM-414 |
|---|---|---|---|---|---|---|---|---|---|---|
| $CeO_2$ | 0.413 | 0.408 | 0.374 | 0.381 | 0.375 | 0.409 | 0.410 | 0.398 | 0.392 | 0.411 |
| $ZrO_2$ | | | | | | | | | | |
| $La_2O_3$ | | | | | | | | | | |
| $SO_3$ | | | 0.011 | 0.029 | 0.023 | 0.025 | 0.017 | 0.016 | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.406 | 1.394 | 1.310 | 1.336 | 1.323 | 1.394 | 1.395 | 1.364 | 1.343 | 1.396 |
| $R_2O$ | 12.198 | 12.288 | 11.938 | 12.218 | 10.901 | 12.037 | 12.110 | 12.281 | 12.163 | 12.299 |
| $Li_2O + Na_2O$ | 12.000 | 12.096 | 11.748 | 12.028 | 10.714 | 11.847 | 11.922 | 12.093 | 11.967 | 12.103 |
| $R_2O—Al_2O_3$ | −2.303 | −2.293 | −1.857 | −1.949 | −3.251 | −2.468 | −2.383 | −1.989 | −1.725 | −2.144 |
| R'O | 4.971 | 4.988 | 4.659 | 4.637 | 4.674 | 4.944 | 4.984 | 4.904 | 4.693 | 4.946 |
| Thickness (mm) | 1.295 | 1.258 | 1.266 | 1.241 | 1.263 | 1.275 | 1.268 | 1.265 | 1.275 | 1.287 |
| L* | 96.02 | 96.13 | 95.00 | 94.27 | 94.24 | 96.26 | 96.25 | 96.25 | 96.12 | 96.10 |
| a* | −0.76 | −0.79 | −0.34 | −0.15 | −0.14 | −0.67 | −0.69 | −0.69 | −0.81 | −0.80 |
| b* | 4.55 | 4.71 | 3.46 | 3.17 | 3.16 | 3.89 | 4.07 | 4.09 | 4.88 | 4.87 |
| Density ($g/cm^3$) | | | | | | | | | | |
| Liquidus Temp. (° C.) | | | | | | | | | | |

TABLE 25AK

| Example | TM-415 | TM-416 | TM-417 | TM-418 | TM-419 | TM-420 | TM-421 | TM-422 | TM-423 | TM-424 |
|---|---|---|---|---|---|---|---|---|---|---|
| $SiO_2$ | 61.158 | 61.060 | 60.634 | 61.106 | 61.744 | 61.589 | 61.061 | 61.621 | 61.673 | 61.634 |
| $Al_2O_3$ | 14.319 | 14.694 | 14.390 | 14.826 | 14.594 | 14.535 | 14.435 | 14.574 | 14.682 | 14.321 |
| $B_2O_3$ | 6.075 | 5.747 | 5.425 | 5.681 | 5.710 | 5.565 | 5.561 | 5.555 | 5.156 | 5.664 |
| $P_2O_5$ | 0.000 | 0.000 | 0.000 | 0.000 | 0.000 | 0.000 | 0.000 | 0.000 | 0.000 | 0.000 |
| $Li_2O$ | 10.166 | 9.815 | 9.929 | 10.187 | 10.079 | 10.078 | 9.998 | 9.954 | 9.968 | 10.075 |
| $Na_2O$ | 1.885 | 1.899 | 1.835 | 1.894 | 1.855 | 1.841 | 1.842 | 1.867 | 1.813 | 1.880 |
| $K_2O$ | 0.193 | 0.196 | 0.183 | 0.191 | 0.190 | 0.183 | 0.186 | 0.188 | 0.180 | 0.187 |
| MgO | 1.887 | 2.059 | 2.030 | 2.102 | 2.034 | 2.030 | 2.038 | 2.016 | 2.057 | 2.000 |
| CaO | 1.950 | 2.052 | 2.037 | 2.083 | 2.009 | 2.004 | 2.027 | 2.006 | 2.031 | 2.001 |
| ZnO | 0.962 | 1.028 | 1.059 | 1.080 | 0.972 | 0.966 | 1.046 | 1.002 | 1.004 | 1.035 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.003 | 0.003 | 0.001 | 0.001 | 0.004 | 0.003 | 0.002 | 0.002 | 0.002 | 0.002 |
| $TiO_2$ | 0.976 | 1.009 | 1.466 | 0.006 | 0.797 | 0.992 | 0.985 | 0.797 | 0.603 | 0.197 |
| $CeO_2$ | 0.410 | 0.422 | 1.004 | 0.833 | 0.001 | 0.207 | 0.806 | 0.409 | 0.826 | 1.001 |
| $ZrO_2$ | | | | | | | | | | |
| $La_2O_3$ | | | | | | | | | | |
| $SO_3$ | | | | 0.002 | | | 0.009 | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.386 | 1.431 | 2.470 | 0.840 | 0.798 | 1.199 | 1.790 | 1.206 | 1.429 | 1.197 |
| $R_2O$ | 12.244 | 11.910 | 11.947 | 12.271 | 12.124 | 12.101 | 12.025 | 12.009 | 11.961 | 12.141 |
| $Li_2O + Na_2O$ | 12.051 | 11.714 | 11.764 | 12.080 | 11.934 | 11.919 | 11.839 | 11.821 | 11.781 | 11.954 |
| $R_2O—Al_2O_3$ | −2.075 | −2.785 | −2.443 | −2.554 | −2.470 | −2.433 | −2.410 | −2.565 | −2.721 | −2.180 |
| R'O | 4.799 | 5.139 | 5.125 | 5.265 | 5.016 | 5.001 | 5.112 | 5.025 | 5.092 | 5.036 |
| Thickness (mm) | 1.307 | 1.31 | 1.361 | 1.287 | 1.344 | 1.337 | 1.343 | 1.327 | 1.348 | 1.335 |
| L* | 96.08 | 96.06 | 76.71 | 96.21 | 96.60 | 96.56 | 91.80 | 96.44 | 96.06 | 95.80 |
| a* | −0.86 | −0.86 | 8.60 | −0.17 | −0.03 | −0.27 | −1.71 | −0.47 | −0.68 | −0.36 |
| b* | 5.17 | 5.19 | 86.33 | 2.30 | 0.48 | 1.43 | 23.03 | 2.69 | 4.71 | 4.28 |
| Density ($g/cm^3$) | | | | | | | | | | |
| Liquidus Temp. (° C.) | | | | | | | | | | |

TABLE 25AL

| Example | TM-425 | TM-426 | TM-427 | TM-428 | TM-429 | TM-430 | TM-431 | TM-432 | TM-433 | TM-434 |
|---|---|---|---|---|---|---|---|---|---|---|
| $SiO_2$ | 61.677 | 60.200 | 60.730 | 60.788 | 60.355 | 62.197 | 60.801 | 61.427 | 61.484 | 60.057 |
| $Al_2O_3$ | 14.558 | 14.755 | 14.881 | 15.062 | 15.208 | 14.409 | 15.150 | 14.397 | 14.684 | 15.049 |
| $B_2O_3$ | 5.047 | 6.116 | 6.167 | 6.152 | 5.901 | 5.743 | 6.238 | 6.058 | 6.037 | 6.175 |
| $P_2O_5$ | 0.000 | 0.000 | 0.000 | 0.000 | 0.000 | 0.000 | 0.000 | 0.000 | 0.000 | 0.000 |
| $Li_2O$ | 9.853 | 10.333 | 10.417 | 10.130 | 10.624 | 9.987 | 10.105 | 10.383 | 10.303 | 10.407 |
| $Na_2O$ | 1.799 | 1.918 | 1.973 | 1.951 | 1.981 | 1.899 | 1.989 | 1.886 | 1.928 | 1.945 |
| $K_2O$ | 0.182 | 0.196 | 0.195 | 0.196 | 0.196 | 0.197 | 0.198 | 0.191 | 0.197 | 0.197 |
| MgO | 2.023 | 2.024 | 2.078 | 2.082 | 2.131 | 1.971 | 2.133 | 1.901 | 2.024 | 2.100 |
| CaO | 2.012 | 2.029 | 2.081 | 2.084 | 2.094 | 2.045 | 2.118 | 1.948 | 2.045 | 2.099 |
| ZnO | 1.026 | 0.994 | 1.022 | 1.034 | 1.029 | 1.022 | 1.013 | 0.958 | 0.997 | 1.028 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.002 | 0.003 | 0.014 | 0.065 | 0.024 | 0.091 | 0.016 | 0.012 | 0.064 | 0.063 |
| $TiO_2$ | 0.796 | 0.998 | 0.008 | 0.007 | 0.007 | 0.008 | 0.007 | 0.007 | 0.007 | 0.007 |
| $CeO_2$ | 1.019 | 0.419 | 0.419 | 0.432 | 0.433 | 0.416 | 0.217 | 0.818 | 0.207 | 0.856 |
| $ZrO_2$ | | | | | | | | | | |
| $La_2O_3$ | | | | | | | | | | |
| $SO_3$ | | | | | | | | | 0.008 | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.816 | 1.416 | 0.427 | 0.439 | 0.440 | 0.423 | 0.225 | 0.825 | 0.214 | 0.863 |
| $R_2O$ | 11.834 | 12.447 | 12.584 | 12.277 | 12.801 | 12.082 | 12.292 | 12.460 | 12.428 | 12.549 |
| $Li_2O + Na_2O$ | 11.652 | 12.251 | 12.389 | 12.081 | 12.605 | 11.885 | 12.094 | 12.269 | 12.231 | 12.352 |
| $R_2O - Al_2O_3$ | −2.725 | −2.309 | −2.297 | −2.785 | −2.407 | −2.326 | −2.858 | −1.936 | −2.256 | −2.499 |
| R'O | 5.061 | 5.047 | 5.181 | 5.201 | 5.255 | 5.038 | 5.264 | 4.806 | 5.065 | 5.227 |
| Thickness (mm) | 1.334 | 1.409 | 1.403 | 1.389 | 1.389 | 1.396 | 1.38 | 1.4 | 1.385 | 1.397 |
| L* | 95.32 | 96.15 | 96.35 | 96.36 | 96.17 | 95.77 | 96.55 | 95.64 | 96.15 | 95.61 |
| a* | −1.27 | −0.79 | −0.20 | −0.18 | −0.14 | −0.22 | −0.06 | −0.39 | −0.15 | −0.32 |
| b* | 9.58 | 4.64 | 1.71 | 1.67 | 1.91 | 2.31 | 0.61 | 4.71 | 1.14 | 4.83 |
| Density ($g/cm^3$) | | | | | | | | | | |
| Liquidus Temp. (° C.) | | | | | | | | | | |

TABLE 25AM

| Example | TM-435 | TM-436 | TM-437 | TM-438 | TM-439 | TM-440 | TM-441 | TM-442 | TM-443 | TM-444 |
|---|---|---|---|---|---|---|---|---|---|---|
| $SiO_2$ | 59.613 | 60.633 | 61.035 | 60.100 | 60.869 | 60.983 | 60.730 | 60.650 | 62.003 | 63.308 |
| $Al_2O_3$ | 14.360 | 14.719 | 14.773 | 14.452 | 14.701 | 14.630 | 14.721 | 14.573 | 13.538 | 12.544 |
| $B_2O_3$ | 5.628 | 5.754 | 5.457 | 5.752 | 5.759 | 5.730 | 5.869 | 5.768 | 5.719 | 5.557 |
| $P_2O_5$ | 0.000 | 0.000 | 0.000 | 0.000 | 0.000 | 0.000 | 0.000 | 0.000 | 0.000 | 0.000 |
| $Li_2O$ | 9.937 | 9.964 | 10.013 | 10.067 | 9.839 | 9.975 | 10.077 | 9.971 | 10.095 | 10.014 |
| $Na_2O$ | 1.876 | 1.913 | 1.925 | 1.887 | 1.921 | 1.867 | 1.889 | 1.842 | 1.902 | 1.914 |
| $K_2O$ | 0.188 | 0.189 | 0.194 | 0.187 | 0.192 | 0.193 | 0.193 | 0.189 | 0.192 | 0.192 |
| MgO | 2.027 | 2.092 | 2.081 | 2.033 | 2.071 | 2.065 | 2.100 | 2.057 | 2.053 | 2.021 |
| CaO | 2.003 | 2.069 | 2.053 | 2.012 | 2.043 | 2.042 | 2.073 | 2.032 | 2.055 | 2.026 |
| ZnO | 1.002 | 1.026 | 1.009 | 0.989 | 1.010 | 1.072 | 1.106 | 1.074 | 1.019 | 1.000 |
| $SnO_2$ | 0.000 | 0.000 | 0.000 | 0.000 | 0.000 | 0.000 | 0.000 | 0.000 | | |
| $Fe_2O_3$ | 0.002 | 0.002 | 0.004 | 0.002 | 0.003 | 0.001 | 0.001 | 0.001 | 0.003 | 0.003 |
| $TiO_2$ | 1.447 | 0.006 | 0.990 | 0.971 | 0.790 | 0.606 | 0.202 | 0.799 | 0.989 | 0.991 |
| $CeO_2$ | 1.025 | 0.843 | 0.205 | 0.828 | 0.417 | 0.825 | 1.029 | 1.027 | 0.412 | 0.415 |
| $ZrO_2$ | | | | | | | | | | |
| $La_2O_3$ | | | | | | | | | | |
| $SO_3$ | | | 0.010 | | | 0.002 | | 0.007 | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 2.471 | 0.849 | 1.195 | 1.798 | 1.207 | 1.430 | 1.231 | 1.826 | 1.401 | 1.407 |
| $R_2O$ | 12.001 | 12.066 | 12.131 | 12.141 | 11.952 | 12.035 | 12.159 | 12.003 | 12.190 | 12.120 |
| $Li_2O + Na_2O$ | 11.813 | 11.877 | 11.938 | 11.954 | 11.760 | 11.842 | 11.966 | 11.814 | 11.998 | 11.927 |
| $R_2O - Al_2O_3$ | −2.359 | −2.653 | −2.642 | 2.311 | −2.749 | −2.594 | −2.562 | −2.570 | −1.349 | −0.424 |
| R'O | 5.032 | 5.188 | 5.143 | 5.034 | 5.124 | 5.179 | 5.279 | 5.163 | 5.128 | 5.046 |
| Thickness (mm) | 1.208 | 1.187 | 1.205 | 1.217 | 1.221 | 1.301 | 1.308 | 1.294 | 1.33 | 1.305 |
| L* | 75.42 | 95.92 | 96.39 | 90.40 | 96.13 | 95.26 | 95.24 | 93.27 | 95.86 | 94.41 |
| a* | 5.59 | −0.29 | −0.37 | −1.24 | −0.60 | −0.86 | −0.49 | −1.13 | −0.98 | −1.42 |
| b* | 71.57 | 3.76 | 2.56 | 24.31 | 4.30 | 8.13 | 6.74 | 15.33 | 6.22 | 12.10 |
| Density ($g/cm^3$) | | | | | | | | | 2.439 | 2.431 |

TABLE 25AM-continued

| Example | TM-435 | TM-436 | TM-437 | TM-438 | TM-439 | TM-440 | TM-441 | TM-442 | TM-443 | TM-444 |
|---|---|---|---|---|---|---|---|---|---|---|
| Liquidus Temp. (° C.) | | | | | | | | | 1160 | 1170 |

TABLE 25AN

| Example | TM-445 | TM-446 | TM-447 | TM-448 | TM-449 | TM-450 | TM-451 | TM-452 | TM-453 | TM-454 |
|---|---|---|---|---|---|---|---|---|---|---|
| $SiO_2$ | 63.846 | 61.725 | 61.403 | 61.676 | 62.297 | 62.861 | 64.138 | 60.358 | 61.846 | 59.290 |
| $Al_2O_3$ | 11.995 | 13.120 | 12.434 | 11.536 | 14.470 | 14.471 | 14.495 | 14.603 | 13.810 | 15.265 |
| $B_2O_3$ | 5.535 | 5.839 | 5.796 | 5.627 | 4.743 | 3.915 | 2.828 | 6.123 | 6.166 | 5.972 |
| $P_2O_5$ | 0.000 | 0.000 | 0.000 | 0.000 | 0.000 | 0.000 | 0.000 | 0.000 | 0.000 | 0.000 |
| $Li_2O$ | 10.169 | 10.534 | 11.632 | 12.150 | 10.019 | 10.236 | 10.024 | 10.395 | 10.165 | 10.420 |
| $Na_2O$ | 1.960 | 2.056 | 2.169 | 2.375 | 1.894 | 1.891 | 1.886 | 1.896 | 1.876 | 1.990 |
| $K_2O$ | 0.190 | 0.193 | 0.189 | 0.188 | 0.192 | 0.192 | 0.193 | 0.194 | 0.192 | 0.196 |
| MgO | 1.956 | 2.054 | 2.002 | 2.020 | 1.992 | 2.015 | 2.016 | 2.014 | 1.808 | 2.186 |
| CaO | 1.975 | 2.045 | 1.985 | 2.013 | 1.996 | 2.009 | 2.014 | 2.019 | 1.876 | 2.130 |
| ZnO | 0.969 | 1.004 | 0.978 | 0.992 | 0.986 | 0.995 | 0.991 | 0.984 | 0.908 | 1.047 |
| $SnO_2$ | | | | | | | | 0.000 | 0.000 | 0.000 |
| $Fe_2O_3$ | 0.003 | 0.003 | 0.003 | 0.003 | 0.003 | 0.003 | 0.003 | 0.003 | 0.013 | 0.040 |
| $TiO_2$ | 0.978 | 0.998 | 0.980 | 0.988 | 0.982 | 0.983 | 0.984 | 0.985 | 0.936 | 1.016 |
| $CeO_2$ | 0.407 | 0.410 | 0.409 | 0.416 | 0.410 | 0.412 | 0.411 | 0.412 | 0.391 | 0.434 |
| $ZrO_2$ | | | | | | | | | | |
| $La_2O_3$ | | | | | | | | | | |
| $SO_3$ | | | | | 0.002 | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.385 | 1.408 | 1.389 | 1.404 | 1.392 | 1.395 | 1.395 | 1.398 | 1.327 | 1.450 |
| $R_2O$ | 12.320 | 12.783 | 13.991 | 14.713 | 12.104 | 12.320 | 12.103 | 12.486 | 12.233 | 12.606 |
| $Li_2O + Na_2O$ | 12.130 | 12.590 | 13.802 | 14.525 | 11.912 | 12.128 | 11.910 | 12.292 | 12.042 | 12.410 |
| $R_2O - Al_2O_3$ | 0.325 | −0.337 | 1.556 | 3.177 | −2.366 | −2.151 | −2.391 | −2.117 | −1.577 | −2.660 |
| R'O | 4.900 | 5.103 | 4.966 | 5.025 | 4.974 | 5.019 | 5.021 | 5.017 | 4.591 | 5.364 |
| Thickness (mm) | 1.334 | 1.325 | 1.336 | 1.329 | 1.343 | 1.336 | 1.334 | 1.287 | 1.282 | 1.293 |
| L* | 94.98 | 95.45 | 95.91 | 96.06 | 95.96 | 95.97 | 95.97 | 96.09 | 96.11 | 95.96 |
| a* | −1.33 | −1.15 | −1.00 | −0.81 | −0.87 | −0.84 | −0.91 | −0.79 | −0.74 | −0.73 |
| b* | 10.46 | 8.02 | 6.34 | 4.98 | 5.43 | 5.27 | 5.73 | 4.71 | 4.51 | 4.83 |
| Density ($g/cm^3$) | 2.432 | 2.44 | 2.448 | 2.455 | 2.442 | 2.445 | 2.45 | | | |
| Liquidus Temp. (° C.) | 1135 | 1160 | 1165 | 1135 | 1195 | 1215 | 1245 | | | |

TABLE 25AO

| Example | TM-455 | TM-456 | TM-457 | TM-458 | TM-459 | TM-460 | TM-461 | TM-462 | TM-463 | TM-464 |
|---|---|---|---|---|---|---|---|---|---|---|
| $SiO_2$ | 59.744 | 59.186 | 60.509 | 60.421 | 60.579 | 60.333 | 61.608 | 63.053 | 61.230 | 61.869 |
| $Al_2O_3$ | 15.020 | 15.187 | 14.713 | 14.848 | 14.672 | 15.126 | 14.624 | 13.534 | 14.809 | 14.514 |
| $B_2O_3$ | 6.099 | 6.202 | 5.894 | 5.827 | 6.032 | 6.294 | 5.872 | 6.222 | 5.827 | 5.947 |
| $P_2O_5$ | 0.000 | 0.000 | 0.000 | 0.000 | 0.000 | 0.000 | 0.000 | 0.000 | 0.000 | 0.000 |
| $Li_2O$ | 10.340 | 10.557 | 10.257 | 10.063 | 10.197 | 10.361 | 9.941 | 10.267 | 10.019 | 10.253 |
| $Na_2O$ | 1.911 | 1.926 | 1.879 | 1.919 | 1.842 | 1.858 | 1.868 | 1.772 | 1.863 | 1.825 |
| $K_2O$ | 0.194 | 0.194 | 0.191 | 0.192 | 0.193 | 0.192 | 0.196 | 0.196 | 0.198 | 0.191 |
| MgO | 2.099 | 2.166 | 2.033 | 2.090 | 2.000 | 2.176 | 2.046 | 1.735 | 2.036 | 1.937 |
| CaO | 2.060 | 2.086 | 2.043 | 2.081 | 2.018 | 2.085 | 1.995 | 1.816 | 2.051 | 1.965 |
| ZnO | 1.021 | 1.010 | 1.003 | 1.026 | 1.046 | 1.069 | 1.024 | 0.950 | 1.051 | 1.024 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.064 | 0.023 | 0.056 | 0.090 | 0.003 | 0.002 | 0.002 | 0.002 | 0.002 | 0.002 |
| $TiO_2$ | 1.009 | 1.012 | 0.991 | 1.000 | 1.006 | 0.012 | 0.011 | 0.011 | 0.011 | 0.011 |
| $CeO_2$ | 0.425 | 0.433 | 0.417 | 0.423 | 0.407 | 0.426 | 0.410 | 0.379 | 0.421 | 0.396 |
| $ZrO_2$ | | | | | | | | | | |
| $La_2O_3$ | | | | | | | | | | |
| $SO_3$ | | 0.004 | | 0.006 | | 0.009 | | 0.007 | 0.049 | |
| $WO_3$ | | | | | | 0.052 | 0.396 | | | |
| $Nb_2O_5$ | | | | | | | | 0.049 | 0.423 | |

TABLE 25AO-continued

| Example | TM-455 | TM-456 | TM-457 | TM-458 | TM-459 | TM-460 | TM-461 | TM-462 | TM-463 | TM-464 |
|---|---|---|---|---|---|---|---|---|---|---|
| $Bi_2O_3$ | | | | | | | | | 0.001 | 0.059 |
| $MoO_3$ | | | | | | | | | | |
| $CeO_2 + TiO_2$ | 1.434 | 1.446 | 1.408 | 1.423 | 1.413 | 0.438 | 0.421 | 0.390 | 0.433 | 0.407 |
| $R_2O$ | 12.445 | 12.677 | 12.327 | 12.174 | 12.232 | 12.410 | 12.006 | 12.235 | 12.081 | 12.268 |
| $Li_2O + Na_2O$ | 12.252 | 12.483 | 12.136 | 11.982 | 12.039 | 12.219 | 11.810 | 12.039 | 11.883 | 12.078 |
| $R_2O - Al_2O_3$ | −2.575 | −2.510 | −2.386 | −2.674 | −2.441 | −2.716 | −2.619 | −1.299 | −2.728 | −2.246 |
| R'O | 5.180 | 5.263 | 5.079 | 5.196 | 5.064 | 5.330 | 5.064 | 4.501 | 5.138 | 4.925 |
| Thickness (mm) | 1.287 | 1.342 | 1.37 | 1.345 | 1.31 | 1.301 | 1.293 | 1.307 | 1.284 | 1.277 |
| L* | 95.79 | 95.98 | 95.92 | 95.15 | 96.09 | 96.36 | 96.41 | 96.33 | 96.20 | 96.38 |
| a* | −0.72 | −0.81 | −0.70 | −0.79 | −0.80 | −0.23 | −0.27 | −0.25 | −0.41 | −0.22 |
| b* | 5.53 | 5.05 | 5.12 | 7.39 | 4.80 | 1.80 | 1.84 | 1.90 | 2.50 | 1.74 |
| Density ($g/cm^3$) | | | | | | | | | | |
| Liquidus Temp. (° C.) | | | | | | | | | | |

TABLE 25AP

| Example | TM-465 | TM-466 | TM-467 | TM-468 | TM-469 | TM-470 | TM-471 | TM-472 | TM-473 | TM-474 |
|---|---|---|---|---|---|---|---|---|---|---|
| $SiO_2$ | 59.713 | 61.525 | 61.538 | 58.525 | 60.939 | 60.714 | 60.727 | 61.761 | 61.367 | 60.720 |
| $Al_2O_3$ | 15.337 | 14.475 | 14.604 | 16.084 | 14.420 | 14.467 | 15.292 | 14.234 | 14.109 | 14.621 |
| $B_2O_3$ | 6.242 | 6.186 | 5.924 | 5.610 | 6.037 | 6.081 | 5.891 | 6.159 | 5.959 | 5.925 |
| $P_2O_5$ | 0.000 | 0.000 | 0.000 | 0.002 | 0.026 | 0.050 | 0.027 | 0.049 | 0.002 | 0.002 |
| $Li_2O$ | 10.607 | 10.347 | 10.039 | 10.018 | 10.108 | 10.056 | 10.045 | 10.377 | 10.291 | 10.116 |
| $Na_2O$ | 1.892 | 1.864 | 1.877 | 2.003 | 1.879 | 1.898 | 1.965 | 1.900 | 1.877 | 1.915 |
| $K_2O$ | 0.179 | 0.195 | 0.192 | 0.199 | 0.192 | 0.193 | 0.194 | 0.190 | 0.191 | 0.195 |
| MgO | 2.128 | 1.943 | 2.024 | 2.554 | 1.958 | 1.997 | 2.152 | 1.909 | 1.876 | 1.994 |
| CaO | 1.961 | 1.975 | 1.978 | 2.298 | 1.999 | 2.037 | 2.141 | 1.940 | 1.931 | 2.048 |
| ZnO | 1.038 | 1.016 | 0.987 | 1.168 | 0.978 | 0.985 | 1.046 | 0.949 | 0.955 | 0.987 |
| $SnO_2$ | 0.000 | 0.000 | 0.000 | 0.002 | 0.048 | 0.097 | 0.051 | 0.097 | 0.053 | 0.053 |
| $Fe_2O_3$ | 0.003 | 0.002 | 0.002 | 0.003 | 0.003 | 0.003 | 0.003 | 0.003 | 0.003 | 0.003 |
| $TiO_2$ | 0.010 | 0.011 | 0.012 | 1.060 | 0.983 | 0.988 | 0.007 | 0.006 | 0.968 | 0.993 |
| $CeO_2$ | 0.387 | 0.408 | 0.411 | 0.458 | 0.413 | 0.416 | 0.441 | 0.407 | 0.402 | 0.412 |
| $ZrO_2$ | | | | | | | | | | |
| $La_2O_3$ | | | | | | | | | | |
| $SO_3$ | | 0.002 | 0.017 | | | | | | | |
| $WO_3$ | | | | | | | | | | |
| $Nb_2O_5$ | | | | | | | | | | |
| $Bi_2O_3$ | 0.500 | | | | | | | | | |
| $MoO_3$ | | 0.045 | 0.381 | | | | | | | |
| $CeO_2 + TiO_2$ | 0.397 | 0.420 | 0.423 | 1.518 | 1.396 | 1.403 | 0.448 | 0.413 | 1.370 | 1.405 |
| $R_2O$ | 12.678 | 12.405 | 12.108 | 12.219 | 12.178 | 12.147 | 12.205 | 12.468 | 12.359 | 12.226 |
| $Li_2O + Na_2O$ | 12.499 | 12.211 | 11.916 | 12.020 | 11.987 | 11.954 | 12.011 | 12.278 | 12.168 | 12.031 |
| $R_2O - Al_2O_3$ | −2.659 | −2.070 | −2.496 | −3.865 | −2.242 | −2.320 | −3.088 | −1.766 | −1.750 | −2.395 |
| R'O | 5.126 | 4.934 | 4.989 | 6.020 | 4.935 | 5.019 | 5.339 | 4.799 | 4.763 | 5.029 |
| Thickness (mm) | 1.297 | 1.328 | 1.333 | 1.348 | 1.335 | 1.341 | 1.355 | 1.346 | 1.354 | 1.35 |
| L* | 96.30 | 96.38 | 96.41 | 96.11 | 96.19 | 96.39 | 96.46 | 96.52 | 96.19 | 96.20 |
| a* | −0.28 | −0.23 | −0.28 | −0.80 | −0.74 | −0.57 | −0.11 | −0.06 | −0.69 | −0.72 |
| b* | 1.96 | 1.78 | 2.02 | 4.64 | 4.25 | 3.12 | 1.06 | 0.71 | 4.05 | 4.18 |
| Density ($g/cm^3$) | | | | | | | | | | |
| Liquidus Temp. (° C.) | | | | | | | | | | |

TABLE 25AQ

| Example | TM-475 | TM-476 | TM-477 | TM-478 | TM-479 | TM-480 | TM-481 | TM-482 | TM-483 | TM-484 |
|---|---|---|---|---|---|---|---|---|---|---|
| $SiO_2$ | 59.486 | 60.630 | 60.210 | 60.621 | 60.457 | 61.483 | 60.402 | 62.960 | 61.721 | 64.109 |
| $Al_2O_3$ | 15.281 | 14.950 | 15.185 | 14.934 | 15.052 | 14.394 | 15.135 | 13.779 | 14.375 | 13.328 |
| $B_2O_3$ | 6.085 | 5.820 | 5.908 | 5.873 | 5.911 | 5.920 | 5.788 | 5.728 | 5.972 | 5.796 |
| $P_2O_5$ | 0.000 | 0.000 | 0.000 | 0.000 | 0.000 | 0.000 | 0.000 | 0.000 | 0.000 | 0.000 |
| $Li_2O$ | 9.288 | 9.005 | 9.134 | 9.094 | 9.147 | 9.097 | 9.535 | 9.781 | 9.879 | 10.038 |
| $Na_2O$ | 1.521 | 1.367 | 1.359 | 1.842 | 1.841 | 1.828 | 1.358 | 1.647 | 1.367 | 1.455 |

TABLE 25AQ-continued

| Example | TM-475 | TM-476 | TM-477 | TM-478 | TM-479 | TM-480 | TM-481 | TM-482 | TM-483 | TM-484 |
|---|---|---|---|---|---|---|---|---|---|---|
| $K_2O$ | 0.194 | 0.166 | 0.165 | 0.165 | 0.162 | 0.167 | 0.168 | 0.165 | 0.166 | 0.166 |
| MgO | 5.002 | 4.692 | 4.755 | 4.560 | 4.693 | 4.289 | 3.108 | 3.321 | 3.897 | 2.914 |
| CaO | 1.759 | 1.936 | 1.840 | 1.487 | 1.511 | 1.420 | 3.059 | 1.196 | 1.204 | 0.790 |
| ZnO | 0.000 | 0.008 | 0.008 | 0.008 | 0.008 | 0.000 | 0.016 | 0.016 | 0.008 | 0.008 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.001 | 0.002 | 0.002 | 0.002 | 0.002 | 0.002 | 0.002 | 0.002 | 0.002 | 0.002 |
| $TiO_2$ | 0.976 | 1.011 | 1.016 | 0.997 | 0.803 | 1.080 | 1.012 | 0.999 | 0.998 | 0.990 |
| $CeO_2$ | 0.398 | 0.413 | 0.419 | 0.418 | 0.413 | 0.320 | 0.418 | 0.408 | 0.411 | 0.405 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.374 | 1.424 | 1.434 | 1.414 | 1.216 | 1.400 | 1.429 | 1.406 | 1.408 | 1.395 |
| $R_2O$ | 11.004 | 10.538 | 10.658 | 11.102 | 11.150 | 11.091 | 11.061 | 11.593 | 11.413 | 11.659 |
| $Li_2O + Na_2O$ | 10.809 | 10.372 | 10.494 | 10.937 | 10.988 | 10.925 | 10.893 | 11.428 | 11.246 | 11.493 |
| $R_2O - Al_2O_3$ | −4.277 | −4.411 | −4.527 | −3.832 | −3.902 | −3.303 | −4.074 | −2.186 | −2.963 | −1.669 |
| R'O | 6.761 | 6.636 | 6.602 | 6.054 | 6.212 | 5.709 | 6.182 | 4.532 | 5.109 | 3.712 |
| Thickness (mm) | 0.57 | 1.295 | 1.282 | 1.309 | 1.305 | 1.301 | 1.277 | 1.289 | 1.287 | 1.286 |
| L* | 96.38 | 96.34 | 96.35 | 96.38 | 96.37 | 96.39 | 96.34 | 96.28 | 96.35 | 96.29 |
| a* | −0.29 | −0.57 | −0.53 | −0.52 | −0.47 | −0.52 | −0.52 | −0.65 | −0.58 | −0.68 |
| b* | 1.68 | 3.13 | 2.92 | 2.88 | 2.63 | 2.80 | 2.98 | 3.83 | 3.28 | 3.91 |
| Density ($g/cm^3$) | | | | | | | | | | |
| Liquidus Temp. (° C.) | 1140 | | | | | | | | | |

TABLE 25AR

| Example | TM-485 | TM-486 | TM-487 | TM-488 | TM-489 | TM-490 | TM-491 | TM-492 | TM-493 | TM-494 |
|---|---|---|---|---|---|---|---|---|---|---|
| $SiO_2$ | 59.283 | 59.636 | 59.706 | 59.455 | 59.392 | 59.737 | 59.476 | 59.673 | 59.593 | 60.312 |
| $Al_2O_3$ | 14.546 | 14.386 | 14.531 | 14.696 | 14.568 | 14.718 | 14.658 | 14.710 | 14.781 | 14.488 |
| $B_2O_3$ | 4.841 | 4.902 | 4.734 | 4.835 | 4.826 | 4.789 | 4.812 | 4.734 | 4.864 | 5.668 |
| $P_2O_5$ | 0.000 | 0.000 | 0.000 | 0.000 | 0.000 | 0.000 | 0.000 | 0.000 | 0.000 | 0.000 |
| $Li_2O$ | 13.885 | 13.143 | 11.778 | 12.419 | 8.785 | 10.985 | 13.119 | 11.672 | 12.316 | 9.953 |
| $Na_2O$ | 0.879 | 0.864 | 2.169 | 0.872 | 5.816 | 0.858 | 0.870 | 2.187 | 0.870 | 1.822 |
| $K_2O$ | 0.171 | 0.814 | 0.765 | 1.309 | 0.166 | 2.465 | 0.811 | 0.775 | 1.286 | 0.166 |
| MgO | 2.026 | 1.939 | 1.998 | 2.030 | 2.064 | 2.040 | 2.060 | 2.044 | 2.062 | 2.000 |
| CaO | 1.987 | 1.958 | 1.970 | 2.002 | 2.002 | 2.010 | 2.015 | 2.010 | 2.031 | 1.999 |
| ZnO | 0.972 | 0.951 | 0.940 | 0.958 | 0.975 | 0.971 | 0.965 | 0.973 | 0.972 | 1.083 |
| $SnO_2$ | 0.000 | 0.000 | 0.000 | 0.000 | 0.000 | 0.000 | 0.000 | 0.000 | 0.000 | 0.000 |
| $Fe_2O_3$ | 0.002 | 0.002 | 0.002 | 0.002 | 0.002 | 0.002 | 0.003 | 0.003 | 0.003 | 0.002 |
| $TiO_2$ | 0.997 | 0.994 | 0.997 | 1.010 | 0.997 | 1.015 | 1.008 | 1.012 | 1.014 | 1.485 |
| $CeO_2$ | 0.411 | 0.410 | 0.410 | 0.412 | 0.407 | 0.410 | 0.205 | 0.206 | 0.206 | 1.014 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.408 | 1.404 | 1.407 | 1.422 | 1.404 | 1.425 | 1.213 | 1.218 | 1.221 | 2.499 |
| $R_2O$ | 14.935 | 14.821 | 14.712 | 14.600 | 14.767 | 14.308 | 14.799 | 14.634 | 14.472 | 11.940 |
| $Li_2O + Na_2O$ | 14.764 | 14.007 | 13.947 | 13.291 | 14.601 | 11.843 | 13.989 | 13.859 | 13.186 | 11.775 |
| $R_2O - Al_2O_3$ | 0.388 | 0.435 | 0.181 | −0.096 | 0.199 | −0.411 | 0.142 | −0.075 | −0.310 | −2.548 |
| R'O | 4.985 | 4.849 | 4.908 | 4.990 | 5.041 | 5.021 | 5.039 | 5.028 | 5.065 | 5.081 |
| Thickness (mm) | 1.221 | 1.223 | 1.217 | 1.17 | 1.227 | 1.237 | 1.281 | 1.253 | 1.24 | 1.352 |
| L* | 96.03 | 96.00 | 95.41 | 95.90 | 94.89 | 92.22 | 96.32 | 96.29 | 96.34 | 70.36 |
| a* | −0.78 | −0.83 | −1.06 | −0.92 | −1.28 | −1.52 | −0.47 | −0.55 | −0.46 | 8.58 |
| b* | 4.89 | 5.26 | 7.73 | 5.69 | 10.18 | 19.29 | 2.37 | 2.51 | 2.52 | 76.71 |
| Density ($g/cm^3$) | 2.447 | 2.448 | 2.453 | 2.447 | 2.46 | 2.447 | 2.436 | 2.444 | 2.437 | |
| Liquidus Temp. (° C.) | | | | | | | | | | |

TABLE 25AS

| Example | TM-495 | TM-496 | TM-497 | TM-498 | TM-499 | TM-500 | TM-501 | TM-502 | TM-503 | TM-504 |
|---|---|---|---|---|---|---|---|---|---|---|
| $SiO_2$ | 61.349 | 62.180 | 61.549 | 60.736 | 61.636 | 61.225 | 61.051 | 60.582 | 59.100 | 59.100 |
| $Al_2O_3$ | 14.663 | 14.334 | 14.333 | 14.536 | 14.206 | 14.525 | 14.611 | 14.511 | 14.500 | 14.500 |
| $B_2O_3$ | 5.943 | 5.761 | 5.893 | 5.760 | 5.984 | 5.717 | 5.837 | 5.949 | 5.000 | 5.000 |
| $P_2O_5$ | 0.000 | 0.000 | 0.000 | 0.000 | 0.000 | 0.000 | 0.000 | 0.000 | | |
| $Li_2O$ | 10.028 | 10.030 | 10.084 | 10.028 | 10.114 | 10.038 | 10.118 | 10.011 | 13.800 | 12.396 |
| $Na_2O$ | 1.861 | 1.868 | 1.850 | 1.837 | 1.858 | 1.841 | 1.860 | 1.819 | 1.000 | 2.404 |
| $K_2O$ | 0.168 | 0.168 | 0.165 | 0.165 | 0.168 | 0.167 | 0.165 | 0.160 | 0.200 | 0.200 |
| MgO | 2.051 | 1.965 | 1.982 | 2.028 | 1.945 | 2.018 | 2.031 | 2.052 | 3.000 | 2.579 |
| CaO | 2.029 | 1.943 | 1.954 | 2.013 | 1.929 | 2.003 | 2.023 | 2.009 | 0.500 | 1.202 |
| ZnO | 1.061 | 0.948 | 0.994 | 1.071 | 0.973 | 1.046 | 1.072 | 1.095 | 1.500 | 1.219 |
| $SnO_2$ | 0.000 | 0.000 | 0.000 | 0.000 | 0.000 | 0.000 | 0.000 | 0.000 | | |
| $Fe_2O_3$ | 0.002 | 0.002 | 0.002 | 0.002 | 0.002 | 0.002 | 0.002 | 0.002 | | |
| $TiO_2$ | 0.010 | 0.790 | 0.978 | 0.995 | 0.778 | 0.598 | 0.199 | 0.788 | 1.000 | 1.000 |
| $CeO_2$ | 0.826 | 0.001 | 0.206 | 0.815 | 0.395 | 0.813 | 1.024 | 1.013 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 0.837 | 0.791 | 1.184 | 1.810 | 1.173 | 1.412 | 1.223 | 1.801 | 1.400 | 1.400 |
| $R_2O$ | 12.057 | 12.066 | 12.099 | 12.030 | 12.140 | 12.046 | 12.143 | 11.990 | 15.000 | 15.000 |
| $Li_2O + Na_2O$ | 11.889 | 11.898 | 11.934 | 11.865 | 11.972 | 11.879 | 11.978 | 11.830 | 14.800 | 14.800 |
| $R_2O - Al_2O_3$ | −2.606 | −2.268 | −2.234 | −2.506 | −2.066 | −2.479 | −2.468 | −2.520 | 0.500 | 0.500 |
| R'O | 5.142 | 4.856 | 4.930 | 5.113 | 4.848 | 5.067 | 5.125 | 5.157 | 5.000 | 5.000 |
| Thickness (mm) | 1.372 | 1.367 | 1.383 | 1.358 | 1.388 | 1.377 | 1.364 | 1.159 | | |
| L* | 95.90 | 96.57 | 96.46 | 89.22 | 96.26 | 95.55 | 95.29 | 94.42 | | |
| a* | −0.31 | −0.01 | −0.33 | −1.81 | −0.57 | −0.83 | −0.52 | −1.22 | | |
| b* | 3.62 | 0.35 | 1.84 | 28.72 | 3.37 | 6.58 | 6.23 | 11.32 | | |
| Density ($g/cm^3$) | | | | | | | | | | |
| Liquidus Temp. (° C.) | | | | | | | | | | |

TABLE 25AT

| Example | TM-505 | TM-506 | TM-507 | TM-508 | TM-509 | TM-510 | TM-511 | TM-512 | TM-513 | TM-514 |
|---|---|---|---|---|---|---|---|---|---|---|
| $SiO_2$ | 59.100 | 59.100 | 59.100 | 59.100 | 59.100 | 59.100 | 59.100 | 59.100 | 59.100 | 59.100 |
| $Al_2O_3$ | 14.500 | 14.500 | 14.500 | 14.500 | 14.500 | 14.500 | 14.500 | 14.500 | 14.500 | 14.500 |
| $B_2O_3$ | 5.000 | 5.000 | 5.000 | 5.000 | 5.000 | 5.000 | 5.000 | 5.000 | 5.000 | 5.000 |
| $P_2O_5$ | | | | | | | | | | |
| $Li_2O$ | 13.026 | 11.341 | 11.765 | 12.437 | 10.270 | 10.737 | 11.184 | 11.835 | 8.800 | 9.423 |
| $Na_2O$ | 1.000 | 3.459 | 2.314 | 1.000 | 4.530 | 3.338 | 2.328 | 1.000 | 6.000 | 4.585 |
| $K_2O$ | 0.974 | 0.200 | 0.921 | 1.563 | 0.200 | 0.926 | 1.488 | 2.165 | 0.200 | 0.993 |
| MgO | 2.309 | 2.262 | 1.962 | 1.783 | 1.941 | 1.651 | 1.452 | 1.246 | 1.500 | 1.217 |
| CaO | 0.777 | 1.730 | 1.414 | 0.987 | 2.265 | 1.928 | 1.624 | 1.202 | 3.000 | 2.575 |
| ZnO | 1.915 | 1.008 | 1.623 | 2.230 | 0.794 | 1.421 | 1.924 | 2.552 | 0.500 | 1.208 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 15.000 | 15.000 | 15.000 | 15.000 | 15.000 | 15.000 | 15.000 | 15.000 | 15.000 | 15.000 |
| $Li_2O + Na_2O$ | 14.026 | 14.800 | 14.079 | 13.437 | 14.800 | 14.074 | 13.512 | 12.835 | 14.800 | 14.007 |
| $R_2O - Al_2O_3$ | 0.500 | 0.500 | 0.500 | 0.500 | 0.500 | 0.500 | 0.500 | 0.500 | 0.500 | 0.500 |
| R'O | 5.000 | 5.000 | 5.000 | 5.000 | 5.000 | 5.000 | 5.000 | 5.000 | 5.000 | 5.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |

TABLE 25AT-continued

| Example | TM-505 | TM-506 | TM-507 | TM-508 | TM-509 | TM-510 | TM-511 | TM-512 | TM-513 | TM-514 |
|---|---|---|---|---|---|---|---|---|---|---|
| Liquidus Temp. (° C.) | | | | | | | | | | |

TABLE 25AU

| Example | TM-515 | TM-516 | TM-517 | TM-518 | TM-519 | TM-520 | TM-521 | TM-522 | TM-523 | TM-524 |
|---|---|---|---|---|---|---|---|---|---|---|
| $SiO_2$ | 59.100 | 59.100 | 59.100 | 61.100 | 61.100 | 61.100 | 61.100 | 61.100 | 61.100 | 61.100 |
| $Al_2O_3$ | 14.500 | 14.500 | 14.500 | 14.500 | 14.500 | 14.500 | 14.500 | 14.500 | 14.500 | 14.500 |
| $B_2O_3$ | 5.000 | 5.000 | 5.000 | 5.000 | 5.000 | 5.000 | 5.000 | 5.000 | 5.000 | 5.000 |
| $P_2O_5$ | | | | | | | | | | |
| $Li_2O$ | 9.889 | 10.358 | 11.000 | 11.960 | 10.749 | 11.277 | 9.835 | 10.196 | 10.764 | 8.907 |
| $Na_2O$ | 3.526 | 2.458 | 1.000 | 0.870 | 2.081 | 0.870 | 2.995 | 1.997 | 0.870 | 3.923 |
| $K_2O$ | 1.585 | 2.184 | 3.000 | 0.170 | 0.170 | 0.853 | 0.170 | 0.807 | 1.366 | 0.170 |
| MgO | 1.005 | 0.792 | 0.500 | 2.000 | 2.000 | 2.000 | 2.000 | 2.000 | 2.000 | 2.000 |
| CaO | 2.258 | 1.937 | 1.500 | 2.000 | 2.000 | 2.000 | 2.000 | 2.000 | 2.000 | 2.000 |
| ZnO | 1.737 | 2.271 | 3.000 | 1.000 | 1.000 | 1.000 | 1.000 | 1.000 | 1.000 | 1.000 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 15.000 | 15.000 | 15.000 | 13.000 | 13.000 | 13.000 | 13.000 | 13.000 | 13.000 | 13.000 |
| $Li_2O + Na_2O$ | 13.415 | 12.816 | 12.000 | 12.830 | 12.830 | 12.147 | 12.830 | 12.193 | 11.634 | 12.830 |
| $R_2O - Al_2O_3$ | 0.500 | 0.500 | 0.500 | −1.500 | −1.500 | −1.500 | −1.500 | −1.500 | −1.500 | −1.500 |
| R'O | 5.000 | 5.000 | 5.000 | 5.000 | 5.000 | 5.000 | 5.000 | 5.000 | 5.000 | 5.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25AV

| Example | TM-525 | TM-526 | TM-527 | TM-528 | TM-529 | TM-530 | TM-531 | TM-532 | TM-533 | TM-534 |
|---|---|---|---|---|---|---|---|---|---|---|
| $SiO_2$ | 61.100 | 61.100 | 61.100 | 61.100 | 61.100 | 61.100 | 61.100 | 61.100 | 63.100 | 63.100 |
| $Al_2O_3$ | 14.500 | 14.500 | 14.500 | 14.500 | 14.500 | 14.500 | 14.500 | 14.500 | 14.500 | 14.500 |
| $B_2O_3$ | 5.000 | 5.000 | 5.000 | 5.000 | 5.000 | 5.000 | 5.000 | 5.000 | 5.000 | 5.000 |
| $P_2O_5$ | | | | | | | | | | |
| $Li_2O$ | 9.311 | 9.693 | 10.243 | 7.630 | 8.178 | 8.583 | 8.987 | 9.530 | 10.120 | 9.072 |
| $Na_2O$ | 2.878 | 2.004 | 0.870 | 5.200 | 3.950 | 3.028 | 2.108 | 0.870 | 0.730 | 1.778 |
| $K_2O$ | 0.812 | 1.303 | 1.887 | 0.170 | 0.871 | 1.389 | 1.905 | 2.600 | 0.150 | 0.150 |
| MgO | 2.000 | 2.000 | 2.000 | 2.000 | 2.000 | 2.000 | 2.000 | 2.000 | 2.000 | 2.000 |
| CaO | 2.000 | 2.000 | 2.000 | 2.000 | 2.000 | 2.000 | 2.000 | 2.000 | 2.000 | 2.000 |
| ZnO | 1.000 | 1.000 | 1.000 | 1.000 | 1.000 | 1.000 | 1.000 | 1.000 | 1.000 | 1.000 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |

TABLE 25AV-continued

| Example | TM-525 | TM-526 | TM-527 | TM-528 | TM-529 | TM-530 | TM-531 | TM-532 | TM-533 | TM-534 |
|---|---|---|---|---|---|---|---|---|---|---|
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 13.000 | 13.000 | 13.000 | 13.000 | 13.000 | 13.000 | 13.000 | 13.000 | 11.000 | 11.000 |
| $Li_2O + Na_2O$ | 12.188 | 11.697 | 11.113 | 12.830 | 12.129 | 11.611 | 11.095 | 10.400 | 10.850 | 10.850 |
| $R_2O - Al_2O_3$ | −1.500 | −1.500 | −1.500 | −1.500 | −1.500 | −1.500 | −1.500 | −1.500 | −3.500 | −3.500 |
| R'O | 5.000 | 5.000 | 5.000 | 5.000 | 5.000 | 5.000 | 5.000 | 5.000 | 5.000 | 5.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25AW

| Example | TM-535 | TM-536 | TM-537 | TM-538 | TM-539 | TM-540 | TM-541 | TM-542 | TM-543 | TM-544 |
|---|---|---|---|---|---|---|---|---|---|---|
| $SiO_2$ | 63.100 | 63.100 | 63.100 | 63.100 | 63.100 | 63.100 | 63.100 | 63.100 | 63.100 | 63.100 |
| $Al_2O_3$ | 14.500 | 14.500 | 14.500 | 14.500 | 14.500 | 14.500 | 14.500 | 14.500 | 14.500 | 14.500 |
| $B_2O_3$ | 5.000 | 5.000 | 5.000 | 5.000 | 5.000 | 5.000 | 5.000 | 5.000 | 5.000 | 5.000 |
| $P_2O_5$ | | | | | | | | | | |
| $Li_2O$ | 9.537 | 8.293 | 8.609 | 9.102 | 7.511 | 7.859 | 8.189 | 8.665 | 6.450 | 6.914 |
| $Na_2O$ | 0.730 | 2.557 | 1.701 | 0.730 | 3.339 | 2.450 | 1.704 | 0.730 | 4.400 | 3.350 |
| $K_2O$ | 0.733 | 0.150 | 0.690 | 1.168 | 0.150 | 0.691 | 1.107 | 1.605 | 0.150 | 0.737 |
| MgO | 2.000 | 2.000 | 2.000 | 2.000 | 2.000 | 2.000 | 2.000 | 2.000 | 2.000 | 2.000 |
| CaO | 2.000 | 2.000 | 2.000 | 2.000 | 2.000 | 2.000 | 2.000 | 2.000 | 2.000 | 2.000 |
| ZnO | 1.000 | 1.000 | 1.000 | 1.000 | 1.000 | 1.000 | 1.000 | 1.000 | 1.000 | 1.000 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 11.000 | 11.000 | 11.000 | 11.000 | 11.000 | 11.000 | 11.000 | 11.000 | 11.000 | 11.000 |
| $Li_2O + Na_2O$ | 10.267 | 10.850 | 10.310 | 9.832 | 10.850 | 10.309 | 9.893 | 9.395 | 10.850 | 10.263 |
| $R_2O - Al_2O_3$ | −3.500 | −3.500 | −3.500 | −3.500 | −3.500 | −3.500 | −3.500 | −3.500 | −3.500 | −3.500 |
| R'O | 5.000 | 5.000 | 5.000 | 5.000 | 5.000 | 5.000 | 5.000 | 5.000 | 5.000 | 5.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25AX

| Example | TM-545 | TM-546 | TM-547 | TM-548 | TM-549 | TM-550 | TM-551 | TM-552 | TM-553 | TM-554 |
|---|---|---|---|---|---|---|---|---|---|---|
| $SiO_2$ | 63.100 | 63.100 | 63.100 | 61.100 | 61.100 | 61.100 | 61.100 | 61.100 | 61.100 | 61.100 |
| $Al_2O_3$ | 14.500 | 14.500 | 14.500 | 12.500 | 12.500 | 12.500 | 12.500 | 12.500 | 12.500 | 12.500 |
| $B_2O_3$ | 5.000 | 5.000 | 5.000 | 5.000 | 5.000 | 5.000 | 5.000 | 5.000 | 5.000 | 5.000 |
| $P_2O_5$ | | | | | | | | | | |
| $Li_2O$ | 7.258 | 7.603 | 8.070 | 13.800 | 12.383 | 13.009 | 11.324 | 11.749 | 12.417 | 10.256 |
| $Na_2O$ | 2.570 | 1.788 | 0.730 | 1.000 | 2.417 | 1.000 | 3.476 | 2.317 | 1.000 | 4.544 |

TABLE 25AX-continued

| Example | TM-545 | TM-546 | TM-547 | TM-548 | TM-549 | TM-550 | TM-551 | TM-552 | TM-553 | TM-554 |
|---|---|---|---|---|---|---|---|---|---|---|
| $K_2O$ | 1.172 | 1.609 | 2.200 | 0.200 | 0.200 | 0.991 | 0.200 | 0.934 | 1.583 | 0.200 |
| MgO | 2.000 | 2.000 | 2.000 | 2.000 | 2.000 | 2.000 | 2.000 | 2.000 | 2.000 | 2.000 |
| CaO | 2.000 | 2.000 | 2.000 | 2.000 | 2.000 | 2.000 | 2.000 | 2.000 | 2.000 | 2.000 |
| ZnO | 1.000 | 1.000 | 1.000 | 1.000 | 1.000 | 1.000 | 1.000 | 1.000 | 1.000 | 1.000 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 11.000 | 11.000 | 11.000 | 15.000 | 15.000 | 15.000 | 15.000 | 15.000 | 15.000 | 15.000 |
| $Li_2O + Na_2O$ | 9.828 | 9.391 | 8.800 | 14.800 | 14.800 | 14.009 | 14.800 | 14.066 | 13.417 | 14.800 |
| $R_2O - Al_2O_3$ | −3.500 | −3.500 | −3.500 | 2.500 | 2.500 | 2.500 | 2.500 | 2.500 | 2.500 | 2.500 |
| R'O | 5.000 | 5.000 | 5.000 | 5.000 | 5.000 | 5.000 | 5.000 | 5.000 | 5.000 | 5.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25AY

| Example | TM-555 | TM-556 | TM-557 | TM-558 | TM-559 | TM-560 | TM-561 | TM-562 | TM-563 | TM-564 |
|---|---|---|---|---|---|---|---|---|---|---|
| $SiO_2$ | 61.100 | 61.100 | 61.100 | 61.100 | 61.100 | 61.100 | 61.100 | 61.100 | 61.100 | 61.100 |
| $Al_2O_3$ | 12.500 | 12.500 | 12.500 | 12.500 | 12.500 | 12.500 | 12.500 | 12.500 | 14.500 | 14.500 |
| $B_2O_3$ | 5.000 | 5.000 | 5.000 | 5.000 | 5.000 | 5.000 | 5.000 | 5.000 | 5.000 | 5.000 |
| $P_2O_5$ | | | | | | | | | | |
| $Li_2O$ | 10.727 | 11.173 | 11.818 | 8.800 | 9.430 | 9.897 | 10.366 | 11.000 | 13.800 | 12.394 |
| $Na_2O$ | 3.336 | 2.323 | 1.000 | 6.000 | 4.568 | 3.506 | 2.441 | 1.000 | 1.000 | 2.406 |
| $K_2O$ | 0.937 | 1.504 | 2.182 | 0.200 | 1.002 | 1.597 | 2.193 | 3.000 | 0.200 | 0.200 |
| MgO | 2.000 | 2.000 | 2.000 | 2.000 | 2.000 | 2.000 | 2.000 | 2.000 | 1.800 | 1.547 |
| CaO | 2.000 | 2.000 | 2.000 | 2.000 | 2.000 | 2.000 | 2.000 | 2.000 | 0.300 | 0.722 |
| ZnO | 1.000 | 1.000 | 1.000 | 1.000 | 1.000 | 1.000 | 1.000 | 1.000 | 0.900 | 0.731 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 15.000 | 15.000 | 15.000 | 15.000 | 15.000 | 15.000 | 15.000 | 15.000 | 15.000 | 15.000 |
| $Li_2O + Na_2O$ | 14.063 | 13.496 | 12.818 | 14.800 | 13.998 | 13.403 | 12.807 | 12.000 | 14.800 | 14.800 |
| $R_2O—Al_2O_3$ | 2.500 | 2.500 | 2.500 | 2.500 | 2.500 | 2.500 | 2.500 | 2.500 | 0.500 | 0.500 |
| R'O | 5.000 | 5.000 | 5.000 | 5.000 | 5.000 | 5.000 | 5.000 | 5.000 | 3.000 | 3.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25AZ

| Example | TM-565 | TM-566 | TM-567 | TM-568 | TM-569 | TM-570 | TM-571 | TM-572 | TM-573 | TM-574 |
|---|---|---|---|---|---|---|---|---|---|---|
| $SiO_2$ | 61.100 | 61.100 | 61.100 | 61.100 | 61.100 | 61.100 | 61.100 | 61.100 | 61.100 | 61.100 |
| $Al_2O_3$ | 14.500 | 14.500 | 14.500 | 14.500 | 14.500 | 14.500 | 14.500 | 14.500 | 14.500 | 14.500 |
| $B_2O_3$ | 5.000 | 5.000 | 5.000 | 5.000 | 5.000 | 5.000 | 5.000 | 5.000 | 5.000 | 5.000 |
| $P_2O_5$ | | | | | | | | | | |
| $Li_2O$ | 13.013 | 11.337 | 11.759 | 12.421 | 10.267 | 10.736 | 11.180 | 11.822 | 8.800 | 9.432 |
| $Na_2O$ | 1.000 | 3.463 | 2.309 | 1.000 | 4.533 | 3.328 | 2.317 | 1.000 | 6.000 | 4.564 |
| $K_2O$ | 0.987 | 0.200 | 0.932 | 1.579 | 0.200 | 0.937 | 1.502 | 2.178 | 0.200 | 1.004 |
| MgO | 1.378 | 1.357 | 1.172 | 1.061 | 1.164 | 0.986 | 0.865 | 0.740 | 0.900 | 0.728 |
| CaO | 0.469 | 1.039 | 0.850 | 0.595 | 1.360 | 1.156 | 0.974 | 0.724 | 1.800 | 1.542 |
| ZnO | 1.153 | 0.604 | 0.978 | 1.343 | 0.476 | 0.858 | 1.161 | 1.536 | 0.300 | 0.731 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 15.000 | 15.000 | 15.000 | 15.000 | 15.000 | 15.000 | 15.000 | 15.000 | 15.000 | 15.000 |
| $Li_2O + Na_2O$ | 14.013 | 14.800 | 14.068 | 13.421 | 14.800 | 14.063 | 13.498 | 12.822 | 14.800 | 13.996 |
| $R_2O—Al_2O_3$ | 0.500 | 0.500 | 0.500 | 0.500 | 0.500 | 0.500 | 0.500 | 0.500 | 0.500 | 0.500 |
| R'O | 3.000 | 3.000 | 3.000 | 3.000 | 3.000 | 3.000 | 3.000 | 3.000 | 3.000 | 3.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25BA

| Example | TM-575 | TM-576 | TM-577 | TM-578 | TM-579 | TM-580 | TM-581 | TM-582 | TM-583 | TM-584 |
|---|---|---|---|---|---|---|---|---|---|---|
| $SiO_2$ | 61.100 | 61.100 | 61.100 | 63.100 | 63.100 | 63.100 | 63.100 | 63.100 | 63.100 | 63.100 |
| $Al_2O_3$ | 14.500 | 14.500 | 14.500 | 14.500 | 14.500 | 14.500 | 14.500 | 14.500 | 14.500 | 14.500 |
| $B_2O_3$ | 5.000 | 5.000 | 5.000 | 1.000 | 1.000 | 1.000 | 1.000 | 1.000 | 1.000 | 1.000 |
| $P_2O_5$ | | | | | | | | | | |
| $Li_2O$ | 9.899 | 10.368 | 11.000 | 13.800 | 12.391 | 13.015 | 11.334 | 11.757 | 12.424 | 10.264 |
| $Na_2O$ | 3.501 | 2.437 | 1.000 | 1.000 | 2.409 | 1.000 | 3.466 | 2.313 | 1.000 | 4.536 |
| $K_2O$ | 1.599 | 2.195 | 3.000 | 0.200 | 0.200 | 0.985 | 0.200 | 0.930 | 1.576 | 0.200 |
| MgO | 0.600 | 0.472 | 0.300 | 2.000 | 2.000 | 2.000 | 2.000 | 2.000 | 2.000 | 2.000 |
| CaO | 1.350 | 1.159 | 0.900 | 2.000 | 2.000 | 2.000 | 2.000 | 2.000 | 2.000 | 2.000 |
| ZnO | 1.050 | 1.369 | 1.800 | 1.000 | 1.000 | 1.000 | 1.000 | 1.000 | 1.000 | 1.000 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 15.000 | 15.000 | 15.000 | 15.000 | 15.000 | 15.000 | 15.000 | 15.000 | 15.000 | 15.000 |
| $Li_2O + Na_2O$ | 13.401 | 12.805 | 12.000 | 14.800 | 14.800 | 14.015 | 14.800 | 14.070 | 13.424 | 14.800 |
| $R_2O—Al_2O_3$ | 0.500 | 0.500 | 0.500 | 0.500 | 0.500 | 0.500 | 0.500 | 0.500 | 0.500 | 0.500 |
| R'C | 3.000 | 3.000 | 3.000 | 5.000 | 5.000 | 5.000 | 5.000 | 5.000 | 5.000 | 5.000 |
| Thickness (mm) | | | | | | | | | | |
| L* | | | | | | | | | | |

TABLE 25BA-continued

| Example | TM-575 | TM-576 | TM-577 | TM-578 | TM-579 | TM-580 | TM-581 | TM-582 | TM-583 | TM-584 |
|---|---|---|---|---|---|---|---|---|---|---|
| a* | | | | | | | | | | |
| b* | | | | | | | | | | |
| Density ($g/cm^3$) | | | | | | | | | | |
| Liquidus Temp. (° C.) | | | | | | | | | | |

TABLE 25BB

| Example | TM-585 | TM-586 | TM-587 | TM-588 | TM-589 | TM-590 | TM-591 | TM-592 | TM-593 | TM-594 |
|---|---|---|---|---|---|---|---|---|---|---|
| $SiO_2$ | 63.100 | 63.100 | 63.100 | 63.100 | 63.100 | 63.100 | 63.100 | 63.100 | 55.100 | 55.100 |
| $Al_2O_3$ | 14.500 | 14.500 | 14.500 | 14.500 | 14.500 | 14.500 | 14.500 | 14.500 | 14.500 | 14.500 |
| $B_2O_3$ | 1.000 | 1.000 | 1.000 | 1.000 | 1.000 | 1.000 | 1.000 | 1.000 | 9.000 | 9.000 |
| $P_2O_5$ | | | | | | | | | | |
| $Li_2O$ | 10.733 | 11.179 | 11.824 | 8.800 | 9.429 | 9.896 | 10.364 | 11.000 | 13.800 | 12.391 |
| $Na_2O$ | 3.333 | 2.322 | 1.000 | 6.000 | 4.571 | 3.510 | 2.444 | 1.000 | 1.000 | 2.409 |
| $K_2O$ | 0.934 | 1.499 | 2.176 | 0.200 | 1.000 | 1.595 | 2.191 | 3.000 | 0.200 | 0.200 |
| MgO | 2.000 | 2.000 | 2.000 | 2.000 | 2.000 | 2.000 | 2.000 | 2.000 | 2.000 | 2.000 |
| CaO | 2.000 | 2.000 | 2.000 | 2.000 | 2.000 | 2.000 | 2.000 | 2.000 | 2.000 | 2.000 |
| ZnO | 1.000 | 1.000 | 1.000 | 1.000 | 1.000 | 1.000 | 1.000 | 1.000 | 1.000 | 1.000 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MOO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 15.000 | 15.000 | 15.000 | 15.000 | 15.000 | 15.000 | 15.000 | 15.000 | 15.000 | 15.000 |
| $Li_2O + Na_2O$ | 14.066 | 13.501 | 12.824 | 14.800 | 14.000 | 13.405 | 12.809 | 12.000 | 14.800 | 14.800 |
| $R_2O—Al_2O_3$ | 0.500 | 0.500 | 0.500 | 0.500 | 0.500 | 0.500 | 0.500 | 0.500 | 0.500 | 0.500 |
| R'O | 5.000 | 5.000 | 5.000 | 5.000 | 5.000 | 5.000 | 5.000 | 5.000 | 5.000 | 5.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25BC

| Example | TM-595 | TM-596 | TM-597 | TM-598 | TM-599 | TM-600 | TM-601 | TM-602 | TM-603 | TM-604 |
|---|---|---|---|---|---|---|---|---|---|---|
| $SiO_2$ | 55.100 | 55.100 | 55.100 | 55.100 | 55.100 | 55.100 | 55.100 | 55.100 | 55.100 | 55.100 |
| $Al_2O_3$ | 14.500 | 14.500 | 14.500 | 14.500 | 14.500 | 14.500 | 14.500 | 14.500 | 14.500 | 14.500 |
| $B_2O_3$ | 9.000 | 9.000 | 9.000 | 9.000 | 9.000 | 9.000 | 9.000 | 9.000 | 9.000 | 9.000 |
| $P_2O_5$ | | | | | | | | | | |
| $Li_2O$ | 13.016 | 11.333 | 11.757 | 12.425 | 10.264 | 10.732 | 11.179 | 11.825 | 8.800 | 9.428 |
| $Na_2O$ | 1.000 | 3.467 | 2.314 | 1.000 | 4.536 | 3.335 | 2.323 | 1.000 | 6.000 | 4.573 |
| $K_2O$ | 0.984 | 0.200 | 0.929 | 1.575 | 0.200 | 0.933 | 1.498 | 2.175 | 0.200 | 0.999 |
| MgO | 2.000 | 2.000 | 2.000 | 2.000 | 2.000 | 2.000 | 2.000 | 2.000 | 2.000 | 2.000 |
| CaO | 2.000 | 2.000 | 2.000 | 2.000 | 2.000 | 2.000 | 2.000 | 2.000 | 2.000 | 2.000 |
| ZnO | 1.000 | 1.000 | 1.000 | 1.000 | 1.000 | 1.000 | 1.000 | 1.000 | 1.000 | 1.000 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |

TABLE 25BC-continued

| Example | TM-595 | TM-596 | TM-597 | TM-598 | TM-599 | TM-600 | TM-601 | TM-602 | TM-603 | TM-604 |
|---|---|---|---|---|---|---|---|---|---|---|
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 15.000 | 15.000 | 15.000 | 15.000 | 15.000 | 15.000 | 15.000 | 15.000 | 15.000 | 15.000 |
| $Li_2O + Na_2O$ | 14.016 | 14.800 | 14.071 | 13.425 | 14.800 | 14.067 | 13.502 | 12.825 | 14.800 | 14.001 |
| $R_2O—Al_2O_3$ | 0.500 | 0.500 | 0.500 | 0.500 | 0.500 | 0.500 | 0.500 | 0.500 | 0.500 | 0.500 |
| R'O | 5.000 | 5.000 | 5.000 | 5.000 | 5.000 | 5.000 | 5.000 | 5.000 | 5.000 | 5.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25BD

| Example | TM-605 | TM-606 | TM-607 | TM-608 | TM-609 | TM-610 | TM-611 | TM-612 | TM-613 | TM-614 |
|---|---|---|---|---|---|---|---|---|---|---|
| $SiO_2$ | 55.100 | 55.100 | 55.100 | 60.700 | 60.700 | 60.700 | 60.700 | 60.700 | 60.700 | 60.700 |
| $Al_2O_3$ | 14.500 | 14.500 | 14.500 | 14.700 | 14.700 | 14.700 | 14.700 | 14.700 | 14.700 | 14.700 |
| $B_2O_3$ | 9.000 | 9.000 | 9.000 | 6.000 | 6.000 | 6.000 | 6.000 | 6.000 | 6.000 | 6.000 |
| $P_2O_5$ | | | | | | | | | | |
| $Li_2O$ | 9.895 | 10.364 | 11.000 | 9.000 | 9.000 | 9.000 | 9.000 | 9.000 | 9.000 | 9.000 |
| $Na_2O$ | 3.511 | 2.446 | 1.000 | 2.000 | 2.000 | 2.000 | 2.000 | 2.000 | 2.000 | 2.000 |
| $K_2O$ | 1.594 | 2.190 | 3.000 | 0.200 | 0.200 | 0.200 | 0.200 | 0.200 | 0.200 | 0.200 |
| MgO | 2.000 | 2.000 | 2.000 | 5.500 | 4.060 | 4.357 | 2.996 | 3.112 | 3.508 | 1.933 |
| CaO | 2.000 | 2.000 | 2.000 | 0.500 | 1.940 | 0.786 | 3.004 | 2.097 | 0.998 | 4.067 |
| ZnO | 1.000 | 1.000 | 1.000 | 0.000 | 0.000 | 0.857 | 0.000 | 0.791 | 1.494 | 0.000 |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 1.000 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.400 |
| $R_2O$ | 15.000 | 15.000 | 15.000 | 11.200 | 11.200 | 11.200 | 11.200 | 11.200 | 11.200 | 11.200 |
| $Li_2O + Na_2O$ | 13.406 | 12.810 | 12.000 | 11.000 | 11.000 | 11.000 | 11.000 | 11.000 | 11.000 | 11.000 |
| $R_2O—Al_2O_3$ | 0.500 | 0.500 | 0.500 | −3.500 | −3.500 | −3.500 | −3.500 | −3.500 | −3.500 | −3.500 |
| R'O | 5.000 | 5.000 | 5.000 | 6.000 | 6.000 | 6.000 | 6.000 | 6.000 | 6.000 | 6.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25BE

| Example | TM-615 | TM-616 | TM-617 | TM-618 | TM-619 | TM-620 | TM-621 | TM-622 | TM-623 | TM-624 |
|---|---|---|---|---|---|---|---|---|---|---|
| $SiO_2$ | 60.700 | 60.700 | 60.700 | 60.700 | 60.700 | 60.700 | 60.700 | 60.700 | 60.700 | 60.804 |
| $Al_2O_3$ | 14.700 | 14.700 | 14.700 | 14.700 | 14.700 | 14.700 | 14.700 | 14.700 | 14.700 | 14.704 |
| $B_2O_3$ | 6.000 | 6.000 | 6.000 | 6.000 | 6.000 | 6.000 | 6.000 | 6.000 | 6.000 | 6.002 |
| $P_2O_5$ | | | | | | | | | | |
| $Li_2O$ | 9.000 | 9.000 | 9.000 | 9.000 | 9.000 | 9.000 | 9.000 | 9.000 | 9.000 | 9.003 |
| $Na_2O$ | 2.000 | 2.000 | 2.000 | 2.000 | 2.000 | 2.000 | 2.000 | 2.000 | 2.000 | 2.001 |
| $K_2O$ | 0.200 | 0.200 | 0.200 | 0.200 | 0.200 | 0.200 | 0.200 | 0.200 | 0.200 | 0.200 |
| MgO | 2.091 | 2.298 | 2.655 | 0.500 | 0.785 | 0.997 | 1.210 | 1.500 | 4.500 | 3.634 |
| CaO | 3.118 | 2.302 | 1.211 | 5.500 | 4.360 | 3.511 | 2.658 | 1.500 | 1.500 | 2.368 |
| ZnO | 0.791 | 1.400 | 2.133 | 0.000 | 0.855 | 1.492 | 2.131 | 3.000 | | |
| $SnO_2$ | | | | | | | | | | |
| $Fe_2O_3$ | | | | | | | | | | |
| $TiO_2$ | 1.000 | 1.000 | 1.000 | 1.000 | 1.000 | 1.000 | 1.000 | 1.000 | 1.000 | 0.885 |
| $CeO_2$ | 0.400 | 0.400 | 0.400 | 0.400 | 0.400 | 0.400 | 0.400 | 0.400 | 0.400 | 0.400 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.400 | 1.400 | 1.400 | 1.400 | 1.400 | 1.400 | 1.400 | 1.400 | 1.400 | 1.285 |
| $R_2O$ | 11.200 | 11.200 | 11.200 | 11.200 | 11.200 | 11.200 | 11.200 | 11.200 | 11.200 | 11.203 |
| $Li_2O + Na_2O$ | 11.000 | 11.000 | 11.000 | 11.000 | 11.000 | 11.000 | 11.000 | 11.000 | 11.000 | 11.003 |
| $R_2O—Al_2O_3$ | −3.500 | −3.500 | −3.500 | −3.500 | −3.500 | −3.500 | −3.500 | −3.500 | −3.500 | −3.501 |
| R'O | 6.000 | 6.000 | 6.000 | 6.000 | 6.000 | 6.000 | 6.000 | 6.000 | 6.000 | 6.002 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25BF

| Example | TM-625 | TM-626 | TM-627 | TM-628 | TM-629 | TM-630 | TM-631 | TM-632 | TM-633 | TM-634 |
|---|---|---|---|---|---|---|---|---|---|---|
| $SiO_2$ | 62.143 | 60.881 | 62.128 | 63.193 | 60.958 | 62.199 | 63.132 | 64.227 | 61.061 | 62.392 |
| $Al_2O_3$ | 13.463 | 14.707 | 13.562 | 12.563 | 14.711 | 13.567 | 12.700 | 11.677 | 14.715 | 13.479 |
| $B_2O_3$ | 6.000 | 6.003 | 6.002 | 6.000 | 6.004 | 6.003 | 6.002 | 6.000 | 6.006 | 6.004 |
| $P_2O_5$ | | | | | | | | | | |
| $Li_2O$ | 9.589 | 9.005 | 9.546 | 10.018 | 9.006 | 9.547 | 9.956 | 10.440 | 9.009 | 9.593 |
| $Na_2O$ | 1.853 | 2.001 | 1.865 | 1.746 | 2.001 | 1.865 | 1.762 | 1.640 | 2.002 | 1.855 |
| $K_2O$ | 0.200 | 0.200 | 0.200 | 0.200 | 0.200 | 0.200 | 0.200 | 0.200 | 0.200 | 0.200 |
| MgO | 3.174 | 2.996 | 2.484 | 2.210 | 2.359 | 1.880 | 1.567 | 1.261 | 1.502 | 1.061 |
| CaO | 2.236 | 3.008 | 2.974 | 2.772 | 3.646 | 3.580 | 3.481 | 3.300 | 4.505 | 4.357 |
| ZnO | | | | | | | | | | |
| $SnO_2$ | | | | | | | | | | |
| $Fe_2O_3$ | | | | | | | | | | |
| $TiO_2$ | 1.000 | 0.800 | 0.894 | 1.000 | 0.715 | 0.814 | 0.895 | 1.000 | 0.601 | 0.718 |
| $CeO_2$ | 0.341 | 0.400 | 0.346 | 0.298 | 0.400 | 0.346 | 0.305 | 0.256 | 0.400 | 0.342 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.341 | 1.200 | 1.240 | 1.298 | 1.115 | 1.160 | 1.200 | 1.256 | 1.001 | 1.059 |
| $R_2O$ | 11.642 | 11.206 | 11.611 | 11.963 | 11.208 | 11.612 | 11.919 | 12.280 | 11.211 | 11.648 |
| $Li_2O + Na_2O$ | 11.442 | 11.006 | 11.411 | 11.763 | 11.008 | 11.412 | 11.718 | 12.080 | 11.011 | 11.447 |
| $R_2O—Al_2O_3$ | −1.821 | −3.502 | −1.951 | −0.600 | −3.502 | −1.954 | −0.782 | 0.603 | −3.503 | −1.832 |
| R'O | 5.411 | 6.003 | 5.458 | 4.982 | 6.004 | 5.460 | 5.047 | 4.560 | 6.006 | 5.418 |
| Thickness (mm) | | | | | | | | | | |
| L* | | | | | | | | | | |
| a * | | | | | | | | | | |
| b* | | | | | | | | | | |

TABLE 25BF-continued

| Example | TM-625 | TM-626 | TM-627 | TM-628 | TM-629 | TM-630 | TM-631 | TM-632 | TM-633 | TM-634 |
|---|---|---|---|---|---|---|---|---|---|---|
| Density ($g/cm^3$) | | | | | | | | | | |
| Liquidus Temp. (° C.) | | | | | | | | | | |

TABLE 25BG

| Example | TM-635 | TM-636 | TM-637 | TM-638 | TM-639 | TM-640 | TM-6411 | TM-642 | TM-643 | TM-644 |
|---|---|---|---|---|---|---|---|---|---|---|
| $SiO_2$ | 63.363 | 64.322 | 65.600 | 60.700 | 60.817 | 61.571 | 60.902 | 61.607 | 62.195 | 60.987 |
| $Al_2O_3$ | 12.578 | 11.687 | 10.500 | 14.700 | 13.823 | 13.139 | 13.182 | 12.468 | 12.019 | 12.547 |
| $B_2O_3$ | 6.003 | 6.002 | 6.000 | 6.000 | 6.877 | 6.901 | 7.518 | 7.625 | 7.547 | 8.153 |
| $P_2O_5$ | | | | | | | | | | |
| $Li_2O$ | 10.019 | 10.439 | 11.000 | 9.000 | 9.000 | 9.600 | 9.000 | 9.552 | 10.031 | 9.000 |
| $Na_2O$ | 1.747 | 1.641 | 1.500 | 2.000 | 2.000 | 1.850 | 2.000 | 1.862 | 1.742 | 2.000 |
| $K_2O$ | 0.200 | 0.200 | 0.200 | 0.200 | 0.200 | 0.200 | 0.200 | 0.200 | 0.200 | 0.200 |
| MgO | 0.740 | 0.423 | 0.000 | 4.500 | 3.623 | 4.050 | 2.982 | 3.289 | 3.727 | 2.347 |
| CaO | 4.249 | 4.142 | 4.000 | 1.500 | 2.377 | 1.350 | 3.018 | 2.159 | 1.242 | 3.653 |
| ZnO | | | | | | | | | | |
| $SnO_2$ | | | | | | | | | | |
| $Fe_2O_3$ | | | | | | | | | | |
| $TiO_2$ | 0.803 | 0.888 | 1.000 | 1.000 | 0.883 | 1.000 | 0.798 | 0.894 | 1.000 | 0.713 |
| $CeO_2$ | 0.299 | 0.256 | 0.200 | 0.400 | 0.400 | 0.340 | 0.400 | 0.345 | 0.297 | 0.400 |
| $ZrO_2$ | | | | | | | | | | |
| $La_2O_3$ | | | | | | | | | | |
| SO | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.102 | 1.144 | 1.200 | 1.400 | 1.283 | 1.340 | 1.198 | 1.239 | 1.297 | 1.113 |
| $R_2O$ | 11.966 | 12.281 | 12.700 | 11.200 | 11.200 | 11.650 | 11.200 | 11.614 | 11.973 | 11.200 |
| $Li_2O + Na_2O$ | 11.766 | 12.081 | 12.500 | 11.000 | 11.000 | 11.450 | 11.000 | 11.414 | 11.773 | 11.000 |
| $R_2O—Al_2O_3$ | −0.611 | 0.594 | 2.200 | −3.500 | −2.623 | −1.489 | −1.982 | −0.854 | −0.046 | −1.347 |
| R'O | 4.989 | 4.565 | 4.000 | 6.000 | 6.000 | 5.400 | 6.000 | 5.448 | 4.969 | 6.000 |
| Thickness (mm) | | | | | | | | | | |
| L* | | | | | | | | | | |
| a* | | | | | | | | | | |
| b* | | | | | | | | | | |
| Density ($g/cm^3$) | | | | | | | | | | |
| Liquidus Temp. (° C.) | | | | | | | | | | |

TABLE 25BH

| Example | TM-645 | TM-646 | TM-647 | TM-648 | TM-649 | TM-650 | TM-651 | TM-652 | TM-653 | TM-654 |
|---|---|---|---|---|---|---|---|---|---|---|
| $SiO_2$ | 61.683 | 62.202 | 62.803 | 61.100 | 61.838 | 62.374 | 62.901 | 63.600 | 60.661 | 62.068 |
| $Al_2O_3$ | 11.870 | 11.409 | 10.929 | 11.700 | 11.051 | 10.579 | 10.115 | 9.500 | 14.715 | 13.849 |
| $B_2O_3$ | 8.226 | 8.232 | 8.176 | 9.000 | 9.000 | 9.000 | 9.000 | 9.000 | 6.006 | 5.113 |
| $P_2O_5$ | | | | | | | | | | |
| $Li_2O$ | 9.549 | 9.963 | 10.451 | 9.000 | 9.590 | 10.019 | 10.441 | 11.000 | 9.009 | 9.600 |
| $Na_2O$ | 1.863 | 1.759 | 1.637 | 2.000 | 1.852 | 1.745 | 1.640 | 1.500 | 2.002 | 2.001 |
| $K_2O$ | 0.200 | 0.200 | 0.200 | 0.200 | 0.200 | 0.200 | 0.200 | 0.200 | 0.200 | 0.200 |
| MgO | 2.686 | 2.991 | 3.412 | 1.500 | 1.943 | 2.264 | 2.581 | 3.000 | 4.505 | 4.503 |
| CaO | 2.764 | 2.046 | 1.137 | 4.500 | 3.467 | 2.717 | 1.978 | 1.000 | 1.502 | 1.501 |
| ZnO | | | | | | | | | | |
| $SnO_2$ | | | | | | | | | | |
| $Fe_2O_3$ | | | | | | | | | | |
| $TiO_2$ | 0.813 | 0.895 | 1.000 | 0.600 | 0.718 | 0.804 | 0.888 | 1.000 | 1.001 | 0.852 |
| $CeO_2$ | 0.345 | 0.304 | 0.255 | 0.400 | 0.341 | 0.298 | 0.256 | 0.200 | 0.400 | 0.311 |
| $ZrO_2$ | | | | | | | | | | |

TABLE 25BH-continued

| Example | TM-645 | TM-646 | TM-647 | TM-648 | TM-649 | TM-650 | TM-651 | TM-652 | TM-653 | TM-654 |
|---|---|---|---|---|---|---|---|---|---|---|
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.158 | 1.199 | 1.255 | 1.000 | 1.059 | 1.102 | 1.144 | 1.200 | 1.401 | 1.163 |
| $R_2O$ | 11.612 | 11.922 | 12.288 | 11.200 | 11.643 | 11.964 | 12.281 | 12.700 | 11.211 | 11.802 |
| $Li_2O + Na_2O$ | 11.412 | 11.722 | 12.088 | 11.000 | 11.443 | 11.764 | 12.081 | 12.500 | 11.011 | 11.602 |
| $R_2O—Al_2O_3$ | −0.258 | 0.514 | 1.359 | −0.500 | 0.592 | 1.385 | 2.166 | 3.200 | −3.503 | −2.047 |
| R'O | 5.451 | 5.037 | 4.549 | 6.000 | 5.410 | 4.981 | 4.559 | 4.000 | 6.006 | 6.004 |
| Thickness (mm) | | | | | | | | | | |
| L* | | | | | | | | | | |
| a* | | | | | | | | | | |
| b* | | | | | | | | | | |
| Density (g/cm$^3$) | | | | | | | | | | |
| Liquidus Temp. (° C.) | | | | | | | | | | |

TABLE 25BI

| Example | TM-655 | TM-656 | TM-657 | TM-658 | TM-659 | TM-660 | TM-661 | TM-662 | TM-663 | TM-664 |
|---|---|---|---|---|---|---|---|---|---|---|
| $SiO_2$ | 62.777 | 63.086 | 63.874 | 64.293 | 64.083 | 64.816 | 65.297 | 65.769 | 65.400 | 66.069 |
| $Al_2O_3$ | 13.448 | 13.223 | 12.770 | 12.540 | 12.610 | 12.190 | 11.918 | 11.656 | 11.800 | 11.422 |
| $B_2O_3$ | 5.102 | 4.468 | 4.369 | 4.455 | 3.835 | 3.767 | 3.764 | 3.825 | 3.000 | 3.000 |
| $P_2O_5$ | | | | | | | | | | |
| $Li_2O$ | 9.908 | 10.028 | 10.368 | 10.553 | 10.447 | 10.764 | 10.973 | 11.179 | 11.000 | 11.291 |
| $Na_2O$ | 2.001 | 2.001 | 2.001 | 2.001 | 2.001 | 2.001 | 2.001 | 2.001 | 2.000 | 2.000 |
| $K_2O$ | 0.200 | 0.200 | 0.200 | 0.200 | 0.200 | 0.200 | 0.200 | 0.200 | 0.200 | 0.200 |
| MgO | 4.052 | 4.502 | 4.090 | 3.728 | 4.501 | 4.093 | 3.782 | 3.413 | 4.500 | 4.064 |
| CaO | 1.351 | 1.501 | 1.363 | 1.243 | 1.500 | 1.364 | 1.261 | 1.138 | 1.500 | 1.355 |
| ZnO | | | | | | | | | | |
| $SnO_2$ | | | | | | | | | | |
| $Fe_2O_3$ | | | | | | | | | | |
| $TiO_2$ | 0.850 | 0.745 | 0.728 | 0.742 | 0.639 | 0.628 | 0.627 | 0.637 | 0.500 | 0.500 |
| $CeO_2$ | 0.310 | 0.247 | 0.237 | 0.245 | 0.183 | 0.177 | 0.176 | 0.182 | 0.100 | 0.100 |
| $ZrO_2$ | | | | | | | | | | |
| $La_2O_3$ | | | | | | | | | | |
| $SO_3$ | | | | | | | | | | |
| $WO_3$ | | | | | | | | | | |
| $Nb_2O_5$ | | | | | | | | | | |
| $Bi_2O_3$ | | | | | | | | | | |
| $MoO_3$ | | | | | | | | | | |
| $CeO_2 + TiO_2$ | 1.160 | 0.991 | 0.965 | 0.988 | 0.823 | 0.805 | 0.804 | 0.820 | 0.600 | 0.600 |
| $R_2O$ | 12.110 | 12.229 | 12.569 | 12.754 | 12.647 | 12.965 | 13.173 | 13.380 | 13.200 | 13.491 |
| $Li_2O + Na_2O$ | 11.910 | 12.029 | 12.369 | 12.553 | 12.447 | 12.765 | 12.973 | 13.180 | 13.000 | 13.291 |
| $R_2O—Al_2O_3$ | −1.338 | −0.995 | −0.201 | 0.214 | 0.038 | 0.774 | 1.255 | 1.724 | 1.400 | 2.069 |
| R'O | 5.403 | 6.003 | 5.453 | 4.971 | 6.002 | 5.457 | 5.043 | 4.550 | 6.000 | 5.418 |
| Thickness (mm) | | | | | | | | | | |
| L* | | | | | | | | | | |
| a* | | | | | | | | | | |
| b* | | | | | | | | | | |
| Density (g/cm$^3$) | | | | | | | | | | |
| Liquidus Temp. (° C.) | | | | | | | | | | |

TABLE 25BJ

| Example | TM-665 | TM-666 | TM-667 |
|---|---|---|---|
| $SiO_2$ | 66.560 | 67.047 | 67.700 |
| $Al_2O_3$ | 11.144 | 10.869 | 10.500 |
| $B_2O_3$ | 3.000 | 3.000 | 3.000 |

TABLE 25BJ-continued

| Example | TM-665 | TM-666 | TM-667 |
|---|---|---|---|
| $P_2O$ | | | |
| $Li_2O$ | 11.504 | 11.716 | 12.000 |
| $Na_2O$ | 2.000 | 2.000 | 2.000 |

TABLE 25BJ-continued

| Example | TM-665 | TM-666 | TM-667 |
|---|---|---|---|
| $K_2O$ | 0.200 | 0.200 | 0.200 |
| MgO | 3.743 | 3.426 | 3.000 |
| CaO | 1.248 | 1.142 | 1.000 |
| ZnO | | | |
| $SnO_2$ | | | |
| $Fe_2O_3$ | | | |
| $TiO_2$ | 0.500 | 0.500 | 0.500 |
| $CeO_2$ | 0.100 | 0.100 | 0.100 |
| $ZrO_2$ | | | |
| $La_2O_3$ | | | |
| $SO_3$ | | | |
| $WO_3$ | | | |
| $Nb_2O_5$ | | | |
| $Bi_2O_3$ | | | |
| $MoO_3$ | | | |
| $CeO_2 + TiO_2$ | 0.600 | 0.600 | 0.600 |
| $R_2O$ | 13.704 | 13.916 | 14.200 |
| $Li_2O + Na_2O$ | 13.504 | 13.716 | 14.000 |
| $R_2O—Al_2O_3$ | 2.560 | 3.047 | 3.700 |
| R'O | 4.991 | 4.567 | 4.000 |
| Thickness (mm) | | | |
| L* | | | |
| a* | | | |
| b* | | | |
| Density (g/cm$^3$) | | | |
| Liquidus Temp. (° C.) | | | |

The change in b* value experienced as a result of the annealing process for Examples TM-476 to TM-502 was calculated, and is reported in Table 26 below.

TABLE 26

| Example | Delta b* |
|---|---|
| TM-476 | 0.28 |
| TM-477 | 0.20 |
| TM-478 | 0.30 |
| TM-479 | 0.39 |
| TM-480 | 0.62 |
| TM-481 | 0.11 |
| TM-482 | 0.92 |
| TM-483 | 0.45 |
| TM-484 | 1.22 |
| TM-485 | 1.26 |
| TM-486 | 1.41 |
| TM-487 | 4.01 |
| TM-488 | 2.00 |
| TM-489 | 6.06 |
| TM-490 | 15.85 |
| TM-491 | 0.42 |
| TM-492 | 0.19 |
| TM-493 | 0.56 |
| TM-494 | 58.97 |
| TM-495 | −0.07 |
| TM-496 | 0.05 |
| TM-497 | 0.22 |
| TM-498 | 20.43 |

TABLE 26-continued

| Example | Delta b* |
|---|---|
| TM-499 | 0.46 |
| TM-500 | 1.39 |
| TM-501 | −0.07 |
| TM-502 | 4.78 |

Figure 52:
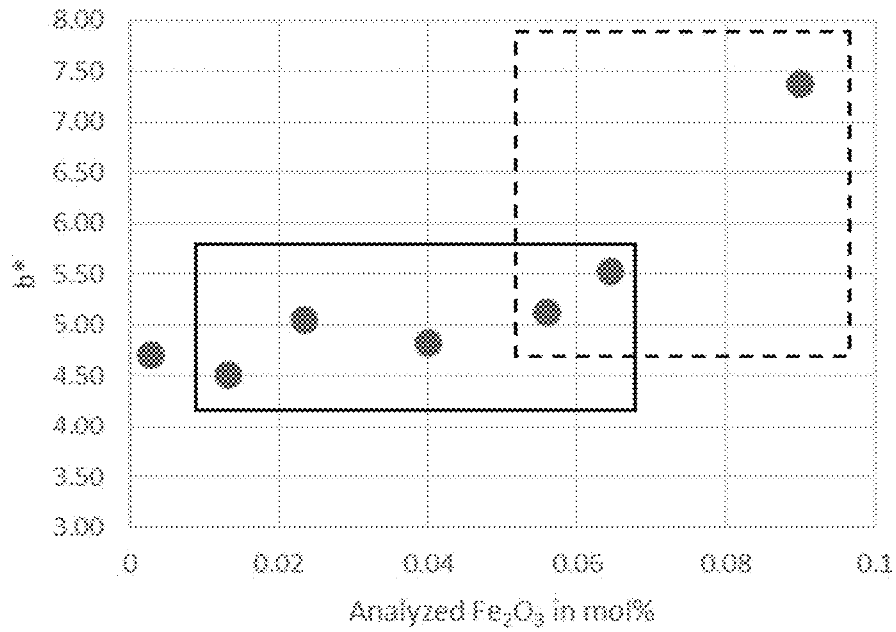
FIG. 52 is a plot of b* as a function of $Fe_2O_3$ content for a variety of glass compositions according to one or more embodiments of the present disclosure.

To investigate the impact of $Fe_2O_3$ content in the glass composition on the color and color stability of the colored glass articles, the b* value was plotted for a number of glass compositions with different $Fe_2O_3$ contents, as shown in FIG. 52. The solid box in FIG. 52 identifies a $Fe_2O_3$ content regime that minimizes the color sensitivity of the colored glass article while not significantly affecting the b* value. The dashed box in FIG. 52 identifies $Fe_2O_3$ contents that produced stable colors after 20 hours at a temperature of 600° C.

Figure 53:
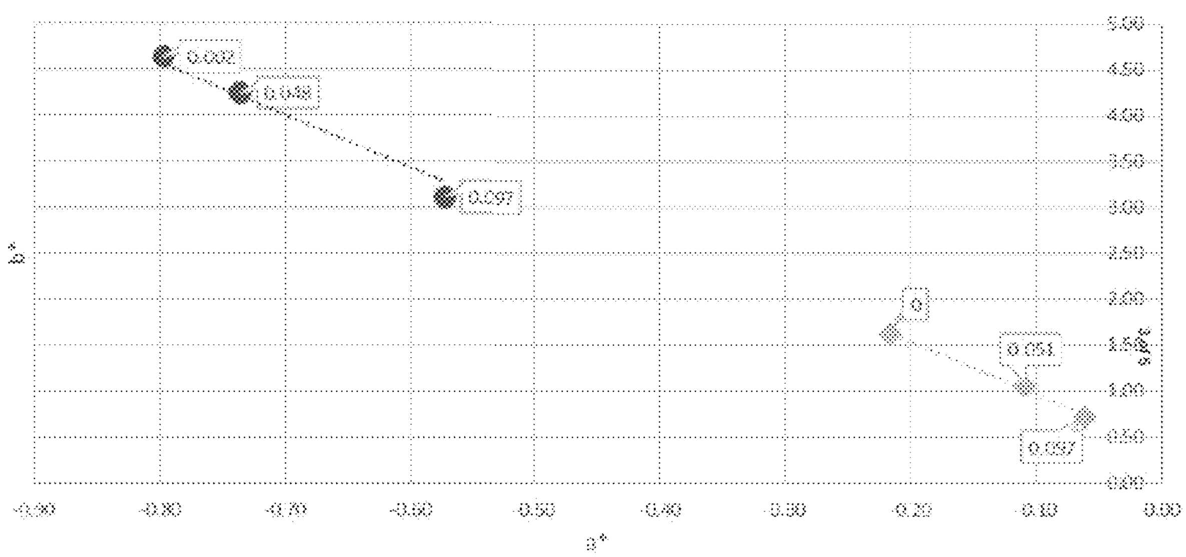
FIG. 53 is a plot of b* as a function of a* for glass compositions with various $SnO_2$ contents as labelled according to one or more embodiments of the present disclosure.

The effect of $SnO_2$ content on b* was investigated by plotting the a* and b* values for glass compositions with various analyzed $SnO_2$ contents, as shown in FIG. 53. In FIG. 53 the data points are labeled with the analyzed $SnO_2$ content. As shown in FIG. 53, increasing $SnO_2$ content decreases the b* value and increases the a* value of the colored glass article.

Figure 54:
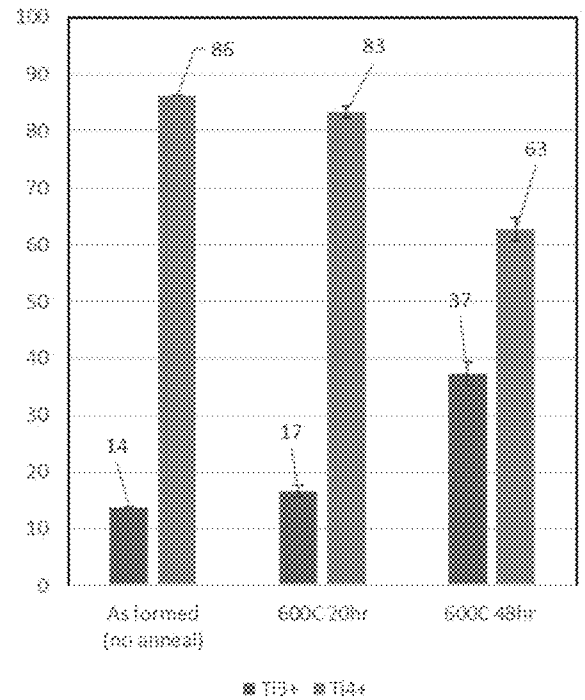
FIG. 54 is a plot of titanium oxidation state content as measured by XPS for glass articles subjected to various heat treatments.
Figure 55:
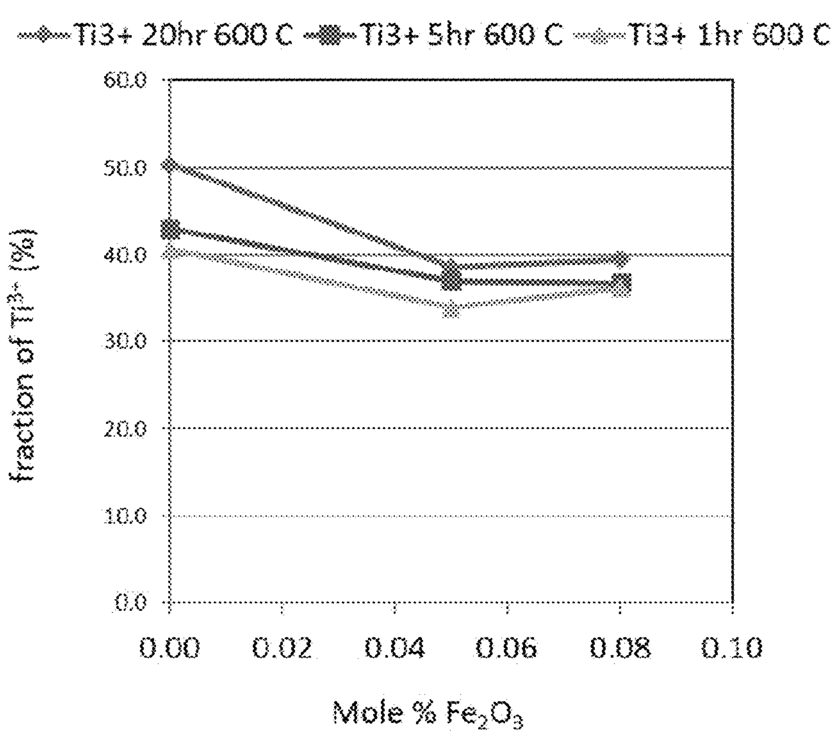
FIG. 55 is a plot of $Ti^{3+}$ oxidation state fraction as detected by XPS as a function of function of $Fe_2O_3$ content for a variety of glass compositions and annealing treatments according to one or more embodiments of the present disclosure.

To investigate the impact of $CeO_2$ on the stability of titanium oxidation states in the colored glass articles, and the associated color stability of the colored glass articles, XPS analysis was performed. Glass bars with a size of 3 mm×3 mm×10 mm were formed from the glass composition of Example TM-361 that includes $CeO_2$ and $TiO_2$, and a comparative composition that contains $TiO_2$ in the absence of $CeO_2$ was formed into bars of the same dimensions. The comparative composition as analyzed included 61.5 mol % $SiO_2$, 14.5 mol % $Al_2O_3$, 5.7 mol % $B_2O_3$, 9.8 mol % $Li_2O$, 1.8 mol % $Na_2O$, 0.2 mol % $K_2O$, 2.0 mol % MgO, 2.0 mol % CaO, 1.0 mol % ZnO, 1.5 mol % $TiO_2$, and 0.004 mol % $Fe_2O_3$. The Example TM-361 glass bars were fractured under ultra-high vacuum in as formed condition, after annealing at 600° ° C. for 24 hours, and after annealing at 600° C. for 48 hours. The oxidation state of titanium and cerium was determined by XPS analysis at the fracture site, with the predominant oxidation state for titanium being $Ti^{4+}$ and for cerium being $Ce^{3+}$. The results indicated that the content of $Ti^{3+}$ increased with increasing annealing time as shown in FIG. 54, and suggests that an observed color change may be due to the change of titanium oxidation state. In contrast, the XPS results for the comparative composition indicated that the titanium oxidation state did not change as a function of anneal time. XPS results also indicated that the presence of $Fe_2O_3$ in the glass compositions inhibits the transition of $Ti^{4+}$ to $Ti^{3+}$ when heat treated, as shown in FIG. 55, improving color stability.

Tables 27A-27Z show example colored glass articles (in terms of mol %) containing transition metal oxides and/or rare earth oxides as colorant(s). The density, thickness, and transmittance color coordinates in the CIELAB color space, as measured under F2 illumination and a 10° standard observer angle are also reported in Tables 27A-27Z.

TABLE 27A

| Example | TM-668 | TM-669 | TM-670 | TM-671 | TM-672 | TM-673 | TM-674 | TM-675 | TM-676 |
|---|---|---|---|---|---|---|---|---|---|
| $SiO_2$ | 59.628 | 59.304 | 59.086 | 59.387 | 59.413 | 59.364 | 59.216 | 59.208 | 59.194 |
| $Al_2O_3$ | 14.591 | 14.557 | 14.528 | 14.630 | 14.585 | 14.562 | 14.536 | 14.495 | 14.316 |
| $B_2O_3$ | 5.954 | 5.938 | 5.941 | 5.818 | 5.810 | 5.808 | 5.812 | 5.961 | 6.000 |
| $Li_2O$ | 9.971 | 9.943 | 9.949 | 9.452 | 9.439 | 9.436 | 9.444 | 9.266 | 9.327 |
| $Na_2O$ | 2.056 | 2.041 | 2.026 | 2.038 | 2.025 | 2.035 | 2.068 | 2.078 | 2.106 |
| $K_2O$ | 0.201 | 0.198 | 0.202 | 0.204 | 0.206 | 0.202 | 0.209 | 0.207 | 0.208 |

TABLE 27A-continued

| Example | TM-668 | TM-669 | TM-670 | TM-671 | TM-672 | TM-673 | TM-674 | TM-675 | TM-676 |
|---|---|---|---|---|---|---|---|---|---|
| MgO | 0.815 | 1.079 | 1.240 | 1.327 | 1.372 | 1.422 | 1.463 | 1.467 | 1.442 |
| CaO | 4.520 | 4.507 | 4.493 | 4.527 | 4.514 | 4.504 | 4.524 | 4.523 | 4.499 |
| ZnO | | | | | | | | | |
| $SnO_2$ | 0.023 | 0.020 | 0.020 | 0.020 | 0.022 | 0.020 | 0.019 | 0.022 | 0.034 |
| $Fe_2O_3$ | 0.062 | 0.040 | 0.026 | 0.019 | 0.016 | 0.011 | 0.009 | 0.008 | 0.008 |
| $ZrO_2$ | 0.023 | 0.022 | 0.023 | 0.020 | 0.020 | 0.019 | 0.015 | 0.016 | 0.045 |
| $TiO_2$ | 1.841 | 2.120 | 2.282 | 2.396 | 2.432 | 2.488 | 2.524 | 2.531 | 2.501 |
| $CeO_2$ | 0.310 | 0.225 | 0.177 | 0.153 | 0.140 | 0.121 | 0.114 | 0.113 | 0.119 |
| $Er_2O_3$ | 0.001 | 0.001 | 0.001 | 0.001 | 0.001 | 0.001 | 0.040 | 0.097 | 0.196 |
| $Nd_2O_3$ | | | | | | | | | |
| NiO | | | | | | | | | |
| $CO_3O_4$ | | | | | | | | | |
| $Cr_2O_3$ | | | | | | | | | |
| CuO | | | | | | | | | |
| Density (g/cc) | | | | | | | | | |
| Thickness (mm) | 4.240 | 4.008 | 4.078 | 4.120 | 4.284 | 4.319 | 4.212 | 4.128 | 4.357 |
| L* | 94.25 | 94.90 | 95.51 | 95.65 | 95.81 | 95.94 | 95.64 | 95.15 | 94.35 |
| a * | −2.21 | −2.07 | −1.82 | −1.68 | −1.57 | −1.46 | −0.24 | 0.95 | 2.63 |
| b* | 19.13 | 16.05 | 12.60 | 11.21 | 10.08 | 9.06 | 8.17 | 8.08 | 8.97 |
| Liquidus (° C.) | | | | | | | | | |

TABLE 27B

| Example | TM-677 | TM-678 | TM-679 | TM-680 | TM-681 | TM-682 | TM-683 | TM-684 | TM-685 |
|---|---|---|---|---|---|---|---|---|---|
| $SiO_2$ | 58.988 | 58.833 | 58.882 | 58.986 | 58.980 | 58.925 | 59.071 | 59.214 | 59.356 |
| $Al_2O_3$ | 14.288 | 14.198 | 14.241 | 14.164 | 14.147 | 14.160 | 14.164 | 14.182 | 14.152 |
| $B_2O_3$ | 6.028 | 6.066 | 5.965 | 5.972 | 5.978 | 5.989 | 5.998 | 5.988 | 5.982 |
| $Li_2O$ | 9.371 | 9.430 | 9.325 | 9.335 | 9.345 | 9.362 | 9.124 | 9.110 | 9.099 |
| $Na_2O$ | 2.123 | 2.128 | 2.110 | 2.098 | 2.081 | 2.075 | 2.103 | 2.098 | 2.114 |
| $K_2O$ | 0.205 | 0.206 | 0.203 | 0.206 | 0.200 | 0.197 | 0.206 | 0.207 | 0.206 |
| MgO | 1.479 | 1.482 | 1.521 | 1.504 | 1.510 | 1.509 | 1.506 | 1.508 | 1.505 |
| CaO | 4.512 | 4.514 | 4.550 | 4.521 | 4.518 | 4.521 | 4.527 | 4.543 | 4.531 |
| ZnO | | | | | | | | | |
| $SnO_2$ | 0.027 | 0.028 | 0.023 | 0.029 | 0.026 | 0.023 | 0.034 | 0.033 | 0.043 |
| $Fe_2O_3$ | 0.007 | 0.007 | 0.006 | 0.006 | 0.006 | 0.006 | 0.006 | 0.006 | 0.006 |
| $ZrO_2$ | 0.024 | 0.041 | 0.029 | 0.029 | 0.026 | 0.023 | 0.033 | 0.029 | 0.031 |
| $TiO_2$ | 2.539 | 2.539 | 2.561 | 2.551 | 2.555 | 2.560 | 2.568 | 2.426 | 2.316 |
| $CeO_2$ | 0.109 | 0.113 | 0.112 | 0.112 | 0.110 | 0.110 | 0.112 | 0.109 | 0.109 |
| $Er_2O_3$ | 0.291 | 0.409 | 0.463 | 0.482 | 0.513 | 0.532 | 0.542 | 0.541 | 0.542 |
| $Nd_2O_3$ | | | | | | | | | |
| NiC | | | | | | | | | |
| $CO_3O_4$ | | | | | | | | | |
| $Cr_2O_3$ | | | | | | | | | |
| CuO | | | | | | | | | |
| Density (g/cc) | | | 2.499 | | 2.504 | | 2.508 | | 2.505 |
| Thickness (mm) | 4.289 | 4.124 | 4.216 | 4.072 | 4.195 | 4.134 | 4.132 | 3.935 | 3.869 |
| L* | 93.94 | 93.12 | 92.96 | 92.83 | 92.72 | 92.63 | 92.46 | 92.83 | 92.95 |
| a* | 4.03 | 5.21 | 5.66 | 5.85 | 6.15 | 6.14 | 6.29 | 6.57 | 6.60 |
| b* | 8.24 | 9.81 | 9.99 | 10.56 | 10.50 | 10.82 | 11.66 | 7.99 | 6.61 |
| Liquidus (° C.) | | | | | | | | | |

TABLE 27C

| Example | TM-686 | TM-687 | TM-688 | TM-689 | TM-690 | TM-691 | TM-692 | TM-693 | TM-694 |
|---|---|---|---|---|---|---|---|---|---|
| $SiO_2$ | 59.941 | 60.557 | 60.916 | 61.013 | 61.055 | 61.063 | 61.043 | 61.151 | 61.284 |
| $Al_2O_3$ | 14.150 | 14.180 | 14.183 | 14.178 | 14.200 | 14.155 | 14.295 | 14.326 | 14.311 |
| $B_2O_3$ | 5.980 | 5.986 | 5.985 | 5.985 | 5.976 | 5.997 | 5.988 | 5.993 | 5.987 |
| $Li_2O$ | 9.098 | 9.151 | 9.149 | 9.150 | 9.135 | 9.162 | 9.147 | 9.155 | 9.146 |
| $Na_2O$ | 2.148 | 2.137 | 2.126 | 2.115 | 2.086 | 2.102 | 2.095 | 2.113 | 2.126 |
| $K_2O$ | 0.202 | 0.200 | 0.207 | 0.209 | 0.204 | 0.208 | 0.207 | 0.205 | 0.205 |
| MgO | 1.520 | 1.525 | 1.528 | 1.524 | 1.528 | 1.511 | 1.512 | 1.517 | 1.515 |

TABLE 27C-continued

| Example | TM-686 | TM-687 | TM-688 | TM-689 | TM-690 | TM-691 | TM-692 | TM-693 | TM-694 |
|---|---|---|---|---|---|---|---|---|---|
| CaO | 4.554 | 4.561 | 4.549 | 4.545 | 4.550 | 4.540 | 4.523 | 4.550 | 4.541 |
| ZnO | | | | | | | | | |
| $SnO_2$ | 0.021 | 0.019 | 0.023 | 0.019 | 0.019 | 0.023 | 0.019 | 0.019 | 0.018 |
| $Fe_2O_3$ | 0.006 | 0.006 | 0.005 | 0.005 | 0.006 | 0.006 | 0.006 | 0.006 | 0.006 |
| $ZrO_2$ | 0.016 | 0.012 | 0.016 | 0.018 | 0.016 | 0.017 | 0.015 | 0.014 | 0.013 |
| $TiO_2$ | 1.695 | 1.005 | 0.651 | 0.575 | 0.561 | 0.552 | 0.489 | 0.285 | 0.179 |
| $CeO_2$ | 0.107 | 0.106 | 0.107 | 0.106 | 0.106 | 0.106 | 0.105 | 0.105 | 0.106 |
| $Er_2O_3$ | 0.558 | 0.551 | 0.551 | 0.554 | 0.555 | 0.555 | 0.552 | 0.558 | 0.562 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | 2.489 | | 2.485 | | 2.485 | | 2.482 | |
| Thickness (mm) | 3.785 | 3.863 | 3.978 | 4.104 | 4.137 | 4.114 | 4.165 | 4.009 | 4.515 |
| L* | 93.47 | 93.69 | 93.80 | 93.82 | 93.81 | 93.80 | 93.89 | 93.94 | 93.86 |
| a* | 7.16 | 7.38 | 7.47 | 7.46 | 7.52 | 7.52 | 7.39 | 7.36 | 7.46 |
| b* | 1.91 | −0.29 | −0.89 | −0.95 | −1.00 | −1.06 | −1.10 | −1.37 | −1.45 |
| Liquidus (° C.) | | | | | | | | | |

TABLE 27D

| Example | TM-695 | TM-696 | TM-697 | TM-698 | TM-699 | TM-700 | TM-701 | TM-702 | TM-703 |
|---|---|---|---|---|---|---|---|---|---|
| $SiO_2$ | 61.374 | 61.330 | 61.313 | 61.341 | 61.095 | 60.891 | 60.838 | 60.750 | 60.691 |
| $Al_2O_3$ | 14.288 | 14.325 | 14.252 | 14.228 | 14.287 | 14.314 | 14.292 | 14.303 | 14.349 |
| $B_2O_3$ | 5.960 | 5.959 | 5.963 | 5.991 | 6.005 | 6.011 | 6.021 | 5.959 | 5.962 |
| $Li_2O$ | 9.147 | 9.146 | 9.153 | 9.057 | 9.077 | 9.086 | 9.101 | 9.197 | 9.201 |
| $Na_2O$ | 2.110 | 2.109 | 2.119 | 2.107 | 2.117 | 2.137 | 2.126 | 2.116 | 2.092 |
| $K_2O$ | 0.206 | 0.207 | 0.208 | 0.210 | 0.207 | 0.205 | 0.205 | 0.204 | 0.200 |
| MgO | 1.518 | 1.533 | 1.528 | 1.500 | 1.500 | 1.513 | 1.501 | 1.505 | 1.515 |
| CaO | 4.544 | 4.550 | 4.531 | 4.508 | 4.535 | 4.542 | 4.521 | 4.519 | 4.536 |
| ZnO | | | | | | | | | |
| $SnO_2$ | 0.021 | 0.021 | 0.013 | 0.015 | 0.014 | 0.018 | 0.017 | 0.017 | 0.015 |
| $Fe_2O_3$ | 0.006 | 0.006 | 0.006 | 0.006 | 0.006 | 0.006 | 0.006 | 0.006 | 0.006 |
| $ZrO_2$ | 0.014 | 0.015 | 0.012 | 0.014 | 0.013 | 0.019 | 0.022 | 0.017 | 0.017 |
| $TiO_2$ | 0.147 | 0.133 | 0.119 | 0.127 | 0.121 | 0.132 | 0.129 | 0.123 | 0.116 |
| $CeO_2$ | 0.104 | 0.104 | 0.218 | 0.336 | 0.459 | 0.564 | 0.656 | 0.715 | 0.734 |
| $Er_2O_3$ | 0.558 | 0.559 | 0.562 | 0.557 | 0.560 | 0.559 | 0.561 | 0.565 | 0.563 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | 2.481 | | | | | | | | |
| Thickness (mm) | 4.487 | 3.840 | 4.025 | 4.194 | 3.908 | 4.157 | 3.992 | 3.894 | 4.001 |
| L* | 93.91 | 93.94 | 93.62 | 93.53 | 93.15 | 92.80 | 92.47 | 92.20 | 92.17 |
| a* | 7.45 | 7.39 | 7.18 | 6.86 | 6.57 | 6.38 | 6.14 | 6.13 | 6.02 |
| b* | −1.51 | −1.55 | 0.06 | 1.83 | 3.97 | 5.85 | 7.67 | 8.57 | 8.73 |
| Liquidus (° C.) | | | | | | | | | |

TABLE 27E

| Example | TM-704 | TM-705 | TM-706 | TM-707 | TM-708 | TM-709 | TM-710 | TM-711 | TM-712 |
|---|---|---|---|---|---|---|---|---|---|
| $SiO_2$ | 60.652 | 60.743 | 60.892 | 60.628 | 61.227 | 61.093 | 60.899 | 60.944 | 60.957 |
| $Al_2O_3$ | 14.363 | 14.328 | 14.294 | 14.583 | 14.330 | 14.589 | 14.631 | 14.542 | 14.555 |
| $B_2O_3$ | 5.962 | 5.956 | 5.884 | 5.870 | 5.835 | 5.800 | 5.927 | 5.938 | 5.932 |
| $Li_2O$ | 9.202 | 9.192 | 9.156 | 9.132 | 9.079 | 9.024 | 9.127 | 9.143 | 9.135 |
| $Na_2O$ | 2.091 | 2.086 | 2.098 | 2.064 | 2.096 | 2.097 | 2.057 | 2.055 | 2.052 |
| $K_2O$ | 0.202 | 0.199 | 0.199 | 0.198 | 0.210 | 0.210 | 0.200 | 0.204 | 0.201 |
| MgO | 1.525 | 1.502 | 1.493 | 1.554 | 1.444 | 1.463 | 1.495 | 1.497 | 1.499 |

TABLE 27E-continued

| Example | TM-704 | TM-705 | TM-706 | TM-707 | TM-708 | TM-709 | TM-710 | TM-711 | TM-712 |
|---|---|---|---|---|---|---|---|---|---|
| CaO | 4.532 | 4.524 | 4.514 | 4.617 | 4.508 | 4.557 | 4.541 | 4.550 | 4.547 |
| ZnO | | | | | | | | | |
| $SnO_2$ | 0.017 | 0.021 | 0.028 | 0.018 | 0.010 | 0.009 | 0.011 | 0.014 | 0.014 |
| $Fe_2O_3$ | 0.006 | 0.006 | 0.006 | 0.006 | 0.006 | 0.006 | 0.006 | 0.006 | 0.006 |
| $ZrO_2$ | 0.017 | 0.023 | 0.026 | 0.012 | 0.010 | 0.015 | 0.014 | 0.016 | 0.014 |
| $TiO_2$ | 0.116 | 0.116 | 0.117 | 0.113 | 0.109 | 0.111 | 0.111 | 0.112 | 0.112 |
| $CeO_2$ | 0.749 | 0.745 | 0.739 | 0.774 | 0.776 | 0.792 | 0.780 | 0.781 | 0.782 |
| $Er_2O_3$ | 0.563 | 0.555 | 0.551 | 0.429 | 0.357 | 0.232 | 0.198 | 0.196 | 0.192 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | 2.512 | | 2.511 | | | | 2.470 | | 2.468 |
| Thickness (mm) | 3.805 | 3.844 | 3.954 | 3.868 | 4.114 | 4.092 | 3.929 | 4.050 | 4.004 |
| L* | 92.07 | 92.15 | 92.12 | 92.40 | 92.54 | 93.01 | 93.28 | 93.33 | 93.35 |
| a* | 6.04 | 5.99 | 6.06 | 5.00 | 4.34 | 2.88 | 2.45 | 2.38 | 2.37 |
| b* | 9.06 | 8.87 | 8.67 | 9.61 | 10.34 | 10.88 | 10.43 | 10.35 | 10.27 |
| Liquidus (° C.) | | | | | | | | | |

TABLE 27F

| Example | TM-713 | TM-714 | TM-715 | TM-716 | TM-717 | TM-718 | TM-719 | TM-720 | TM-721 |
|---|---|---|---|---|---|---|---|---|---|
| $SiO_2$ | 60.805 | 60.511 | 60.539 | 60.398 | 60.465 | 60.305 | 60.237 | 60.087 | 60.440 |
| $Al_2O_3$ | 14.567 | 14.567 | 14.473 | 14.452 | 14.399 | 14.360 | 14.248 | 14.199 | 14.056 |
| $B_2O_3$ | 5.940 | 5.959 | 5.952 | 5.961 | 5.953 | 6.029 | 6.057 | 6.097 | 6.121 |
| $Li_2O$ | 9.147 | 9.147 | 9.136 | 9.151 | 9.138 | 9.256 | 9.299 | 9.360 | 9.398 |
| $Na_2O$ | 2.047 | 2.030 | 2.027 | 2.050 | 2.062 | 2.065 | 2.075 | 2.069 | 2.083 |
| $K_2O$ | 0.203 | 0.199 | 0.201 | 0.205 | 0.208 | 0.208 | 0.209 | 0.207 | 0.206 |
| MgO | 1.496 | 1.496 | 1.487 | 1.500 | 1.494 | 1.501 | 1.511 | 1.504 | 1.495 |
| CaO | 4.551 | 4.528 | 4.521 | 4.548 | 4.535 | 4.531 | 4.525 | 4.545 | 4.565 |
| ZnO | | | | | | | | | |
| $SnO_2$ | 0.020 | 0.021 | 0.016 | 0.012 | 0.017 | 0.016 | 0.013 | 0.015 | 0.018 |
| $Fe_2O_3$ | 0.006 | 0.006 | 0.006 | 0.006 | 0.006 | 0.006 | 0.006 | 0.006 | 0.005 |
| $ZrO_2$ | 0.019 | 0.014 | 0.011 | 0.015 | 0.014 | 0.013 | 0.013 | 0.012 | 0.023 |
| $TiO_2$ | 0.290 | 0.840 | 1.167 | 1.280 | 1.296 | 1.312 | 1.323 | 1.330 | 0.843 |
| $CeO_2$ | 0.701 | 0.433 | 0.188 | 0.136 | 0.125 | 0.113 | 0.112 | 0.111 | 0.190 |
| $Er_2O_3$ | 0.206 | 0.246 | 0.273 | 0.281 | 0.284 | 0.283 | 0.369 | 0.453 | 0.550 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | 2.466 | | | | 2.460 | | 2.481 | |
| Thickness (mm) | 4.449 | 4.060 | 4.161 | 4.106 | 4.139 | 4.138 | 4.038 | 4.251 | 4.149 |
| L* | 93.59 | 94.24 | 94.63 | 94.69 | 94.70 | 94.68 | 94.28 | 93.97 | 93.56 |
| a* | 2.43 | 3.00 | 4.10 | 4.41 | 4.52 | 4.64 | 5.58 | 6.44 | 7.07 |
| b* | 9.90 | 7.73 | 2.95 | 1.94 | 1.54 | 1.28 | 1.07 | 0.81 | 1.45 |
| Liquidus (° C.) | | | | | | | | | |

TABLE 27G

| Example | TM-722 | TM-723 | TM-724 | TM-725 | TM-726 | TM-727 | TM-728 | TM-729 | TM-730 |
|---|---|---|---|---|---|---|---|---|---|
| $SiO_2$ | 60.497 | 60.632 | 60.782 | 60.845 | 60.918 | 60.910 | 60.982 | 60.980 | 61.257 |
| $Al_2O_3$ | 14.125 | 14.089 | 14.039 | 14.031 | 14.046 | 14.087 | 14.045 | 14.045 | 14.042 |
| $B_2O_3$ | 6.194 | 6.207 | 6.211 | 6.213 | 6.238 | 6.236 | 6.232 | 6.232 | 6.212 |
| $Li_2O$ | 9.290 | 9.309 | 9.315 | 9.318 | 9.207 | 9.204 | 9.198 | 9.198 | 9.183 |
| $Na_2O$ | 2.090 | 2.095 | 2.078 | 2.077 | 2.083 | 2.083 | 2.085 | 2.083 | 2.093 |
| $K_2O$ | 0.205 | 0.207 | 0.205 | 0.205 | 0.202 | 0.202 | 0.200 | 0.202 | 0.205 |
| MgO | 1.505 | 1.502 | 1.500 | 1.500 | 1.491 | 1.507 | 1.500 | 1.498 | 1.508 |
| CaO | 4.612 | 4.595 | 4.575 | 4.576 | 4.572 | 4.579 | 4.567 | 4.575 | 4.583 |
| ZnO | | | | | | | | | |
| $SnO_2$ | 0.024 | 0.022 | 0.022 | 0.021 | 0.026 | 0.022 | 0.028 | 0.034 | 0.029 |

TABLE 27G-continued

| Example | TM-722 | TM-723 | TM-724 | TM-725 | TM-726 | TM-727 | TM-728 | TM-729 | TM-730 |
|---|---|---|---|---|---|---|---|---|---|
| $Fe_2O_3$ | 0.006 | 0.006 | 0.006 | 0.006 | 0.006 | 0.006 | 0.006 | 0.006 | 0.006 |
| $ZrO_2$ | 0.022 | 0.023 | 0.023 | 0.023 | 0.031 | 0.021 | 0.026 | 0.023 | 0.014 |
| $TiO_2$ | 0.624 | 0.448 | 0.347 | 0.262 | 0.251 | 0.199 | 0.200 | 0.197 | 0.082 |
| $CeO_2$ | 0.226 | 0.252 | 0.268 | 0.282 | 0.284 | 0.291 | 0.276 | 0.272 | 0.112 |
| $Er_2O_3$ | 0.578 | 0.611 | 0.627 | 0.640 | 0.642 | 0.651 | 0.652 | 0.652 | 0.671 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | 2.495 | | | | | | | | |
| Thickness (mm) | 4.061 | 4.177 | 4.091 | 4.171 | 4.052 | 4.578 | 4.049 | 4.253 | 3.997 |
| L* | 93.49 | 93.39 | 93.40 | 93.28 | 93.32 | 93.34 | 93.37 | 93.39 | 93.54 |
| a* | 7.06 | 7.32 | 7.46 | 7.46 | 7.54 | 7.53 | 7.65 | 7.68 | 8.17 |
| b* | 1.32 | 1.36 | 1.24 | 1.20 | 1.01 | 1.04 | 0.67 | 0.44 | −1.79 |
| Liquidus (° C.) | | | | | | | | | |

TABLE 27H

| Example | TM-731 | TM-732 | TM-733 | TM-734 | TM-735 | TM-736 | TM-737 | TM-738 | TM-739 |
|---|---|---|---|---|---|---|---|---|---|
| $SiO_2$ | 61.394 | 61.473 | 61.524 | 61.457 | 61.632 | 61.793 | 61.891 | 61.878 | 62.038 |
| $Al_2O_3$ | 14.054 | 14.021 | 13.983 | 14.191 | 14.178 | 14.318 | 14.341 | 14.535 | 14.516 |
| $B_2O_3$ | 6.215 | 6.212 | 6.212 | 6.191 | 6.166 | 6.113 | 6.095 | 6.094 | 6.073 |
| $Li_2O$ | 9.187 | 9.182 | 9.183 | 9.146 | 9.108 | 9.030 | 9.005 | 8.963 | 8.932 |
| $Na_2O$ | 2.077 | 2.078 | 2.088 | 2.089 | 2.082 | 2.067 | 2.071 | 2.068 | 2.046 |
| $K_2O$ | 0.207 | 0.207 | 0.209 | 0.207 | 0.210 | 0.203 | 0.203 | 0.198 | 0.200 |
| MgO | 1.525 | 1.509 | 1.515 | 1.525 | 1.525 | 1.504 | 1.505 | 1.488 | 1.476 |
| CaO | 4.557 | 4.551 | 4.526 | 4.588 | 4.543 | 4.565 | 4.538 | 4.565 | 4.549 |
| ZnO | | | | | | | | | |
| $SnO_2$ | 0.018 | 0.020 | 0.022 | 0.019 | 0.015 | 0.019 | 0.013 | 0.017 | 0.021 |
| $Fe_2O_3$ | 0.006 | 0.006 | 0.006 | 0.006 | 0.005 | 0.006 | 0.006 | 0.006 | 0.006 |
| $ZrO_2$ | 0.011 | 0.015 | 0.017 | 0.009 | 0.011 | 0.010 | 0.008 | 0.008 | 0.009 |
| $TiO_2$ | 0.026 | 0.017 | 0.014 | 0.011 | 0.010 | 0.013 | 0.011 | 0.011 | 0.011 |
| $CeO_2$ | 0.036 | 0.022 | 0.018 | 0.012 | 0.010 | 0.008 | 0.006 | 0.005 | 0.004 |
| $Er_2O_3$ | 0.685 | 0.683 | 0.679 | 0.547 | 0.501 | 0.351 | 0.305 | 0.162 | 0.118 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | | | 2.472 | | | | 2.425 | |
| Thickness (mm) | 3.886 | 4.061 | 3.923 | 4.245 | 3.768 | 3.894 | 3.894 | 3.870 | 3.841 |
| L* | 93.53 | 93.56 | 93.58 | 93.92 | 94.15 | 94.67 | 94.82 | 95.59 | 95.85 |
| a* | 8.34 | 8.29 | 8.21 | 7.36 | 6.93 | 5.59 | 5.16 | 3.13 | 2.42 |
| b* | −2.07 | −2.09 | −2.06 | −1.91 | −1.83 | −1.51 | −1.38 | −0.79 | −0.55 |
| Liquidus (° C.) | | | | | | | | | |

TABLE 27I

| Example | TM-740 | TM-741 | TM-742 | TM-743 | TM-744 | TM-745 | TM-746 | TM-747 | TM-748 |
|---|---|---|---|---|---|---|---|---|---|
| $SiO_2$ | 62.017 | 62.079 | 60.560 | 60.560 | 60.610 | 60.610 | 60.660 | 60.660 | 60.710 |
| $Al_2O_3$ | 14.531 | 14.513 | 14.740 | 14.740 | 14.740 | 14.740 | 14.740 | 14.740 | 14.740 |
| $B_2O_3$ | 6.074 | 6.066 | 6.000 | 6.000 | 6.000 | 6.000 | 6.000 | 6.000 | 6.000 |
| $Li_2O$ | 8.934 | 8.923 | 9.000 | 9.000 | 9.000 | 9.000 | 9.000 | 9.000 | 9.000 |
| $Na_2O$ | 2.041 | 2.043 | 2.000 | 2.000 | 2.000 | 2.000 | 2.000 | 2.000 | 2.000 |
| $K_2O$ | 0.200 | 0.201 | 0.200 | 0.200 | 0.200 | 0.200 | 0.200 | 0.200 | 0.200 |
| MgO | 1.479 | 1.482 | 1.500 | 1.500 | 1.500 | 1.500 | 1.500 | 1.500 | 1.500 |
| CaO | 4.553 | 4.535 | 4.500 | 4.500 | 4.500 | 4.500 | 4.500 | 4.500 | 4.500 |
| ZnO | | | | | | | | | |
| $SnO_2$ | 0.021 | 0.019 | | | | | | | |
| $Fe_2O_3$ | 0.006 | 0.006 | | | | | | | |

TABLE 27I-continued

| Example | TM-740 | TM-741 | TM-742 | TM-743 | TM-744 | TM-745 | TM-746 | TM-747 | TM-748 |
|---|---|---|---|---|---|---|---|---|---|
| $ZrO_2$ | 0.017 | 0.014 | | | | | | | |
| $TiO_2$ | 0.011 | 0.011 | 0.900 | 0.900 | 0.800 | 0.800 | 0.700 | 0.700 | 0.600 |
| $CeO_2$ | 0.004 | 0.004 | 0.354 | 0.354 | 0.391 | 0.391 | 0.428 | 0.428 | 0.465 |
| $Er_2O_3$ | 0.109 | 0.102 | 0.250 | 0.250 | 0.262 | 0.262 | 0.275 | 0.275 | 0.287 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | | | | | | | | |
| Thickness (mm) | 3.893 | 4.004 | 0.626 | 2.458 | 0.606 | 2.463 | 0.604 | 2.456 | 0.616 |
| L* | 95.89 | 95.92 | 96.15 | 95.04 | 96.15 | 94.78 | 96.11 | 94.75 | 96.17 |
| a* | 2.31 | 2.19 | 0.61 | 2.00 | 0.63 | 2.13 | 0.67 | 2.24 | 0.74 |
| b* | −0.50 | −0.47 | 1.75 | 5.39 | 1.68 | 6.12 | 1.70 | 5.91 | 1.46 |
| Liquidus (° C.) | | | | | | | | | |

TABLE 27J

| Example | TM-749 | TM-750 | TM-751 | TM-752 | TM-753 | TM-754 | TM-755 | TM-756 | TM-757 |
|---|---|---|---|---|---|---|---|---|---|
| $SiO_2$ | 60.710 | 60.760 | 60.760 | 60.810 | 60.810 | 60.860 | 60.860 | 60.910 | 60.910 |
| $Al_2O_3$ | 14.740 | 14.740 | 14.740 | 14.740 | 14.740 | 14.740 | 14.740 | 14.740 | 14.740 |
| $B_2O_3$ | 6.000 | 6.000 | 6.000 | 6.000 | 6.000 | 6.000 | 6.000 | 6.000 | 6.000 |
| $Li_2O$ | 9.000 | 9.000 | 9.000 | 9.000 | 9.000 | 9.000 | 9.000 | 9.000 | 9.000 |
| $Na_2O$ | 2.000 | 2.000 | 2.000 | 2.000 | 2.000 | 2.000 | 2.000 | 2.000 | 2.000 |
| $K_2O$ | 0.200 | 0.200 | 0.200 | 0.200 | 0.200 | 0.200 | 0.200 | 0.200 | 0.200 |
| MgO | 1.500 | 1.500 | 1.500 | 1.500 | 1.500 | 1.500 | 1.500 | 1.500 | 1.500 |
| CaO | 4.500 | 4.500 | 4.500 | 4.500 | 4.500 | 4.500 | 4.500 | 4.500 | 4.500 |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | 0.600 | 0.500 | 0.500 | 0.400 | 0.400 | 0.300 | 0.300 | 0.200 | 0.200 |
| $CeO_2$ | 0.465 | 0.503 | 0.503 | 0.540 | 0.540 | 0.577 | 0.577 | 0.614 | 0.614 |
| $Er_2O_3$ | 0.287 | 0.299 | 0.299 | 0.312 | 0.312 | 0.324 | 0.324 | 0.336 | 0.336 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | | | | | | | 2.478 | |
| Thickness (mm) | 2.444 | 0.622 | 2.436 | 0.602 | 2.441 | 0.621 | 2.454 | 0.603 | 2.430 |
| L* | 94.51 | 96.03 | 94.64 | 96.14 | 94.30 | 95.98 | 94.34 | 95.93 | 94.25 |
| a* | 2.35 | 0.81 | 2.52 | 0.81 | 2.67 | 0.88 | 2.83 | 0.99 | 2.99 |
| b* | 6.48 | 1.68 | 5.44 | 1.32 | 6.26 | 1.67 | 5.64 | 1.54 | 5.40 |
| Liquidus (° C.) | | | | | | | | | |

TABLE 27K

| Example | TM-758 | TM-759 | TM-760 | TM-761 | TM-762 | TM-763 | TM-764 | TM-765 | TM-766 |
|---|---|---|---|---|---|---|---|---|---|
| $SiO_2$ | 60.960 | 60.960 | 60.890 | 60.890 | 60.920 | 60.920 | 60.960 | 60.960 | 61.000 |
| $Al_2O_3$ | 14.740 | 14.740 | 14.740 | 14.740 | 14.740 | 14.740 | 14.740 | 14.740 | 14.740 |
| $B_2O_3$ | 6.000 | 6.000 | 6.000 | 6.000 | 6.000 | 6.000 | 6.000 | 6.000 | 6.000 |
| $Li_2O$ | 9.000 | 9.000 | 9.000 | 9.000 | 9.000 | 9.000 | 9.000 | 9.000 | 9.000 |
| $Na_2O$ | 2.000 | 2.000 | 2.000 | 2.000 | 2.000 | 2.000 | 2.000 | 2.000 | 2.000 |
| $K_2O$ | 0.200 | 0.200 | 0.200 | 0.200 | 0.200 | 0.200 | 0.200 | 0.200 | 0.200 |
| MgO | 1.500 | 1.500 | 1.500 | 1.500 | 1.500 | 1.500 | 1.500 | 1.500 | 1.500 |
| CaO | 4.500 | 4.500 | 4.500 | 4.500 | 4.500 | 4.500 | 4.500 | 4.500 | 4.500 |
| ZnO | | | | | | | | | |
| $SnO_2$ | | | | | | | | | |
| $Fe_2O_3$ | | | | | | | | | |
| $ZrO_2$ | | | | | | | | | |

TABLE 27K-continued

| Example | TM-758 | TM-759 | TM-760 | TM-761 | TM-762 | TM-763 | TM-764 | TM-765 | TM-766 |
|---|---|---|---|---|---|---|---|---|---|
| $TiO_2$ | 0.100 | 0.100 | 0.752 | 0.752 | 0.691 | 0.691 | 0.610 | 0.610 | 0.529 |
| $CeO_2$ | 0.652 | 0.652 | | | 0.023 | 0.023 | 0.053 | 0.053 | 0.083 |
| $Er_2O_3$ | 0.349 | 0.349 | 0.423 | 0.423 | 0.430 | 0.430 | 0.440 | 0.440 | 0.450 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | 2.482 | | | | | | | |
| Thickness (mm) | 0.617 | 2.448 | 0.528 | 2.425 | 0.530 | 2.392 | 0.531 | 2.389 | 0.542 |
| L* | 96.08 | 93.98 | 96.24 | 94.92 | 96.22 | 95.00 | 96.20 | 94.97 | 96.20 |
| a* | 0.99 | 3.26 | 1.28 | 4.62 | 1.30 | 4.62 | 1.32 | 4.61 | 1.34 |
| b* | 1.14 | 5.64 | −0.23 | −0.98 | −0.23 | −1.02 | −0.17 | −0.78 | −0.14 |
| Liquidus (° C.) | | | | | | | | | |

TABLE 27L

| Example | TM-767 | TM-768 | TM-769 | TM-770 | TM-771 | TM-772 | TM-773 | TM-774 | TM-775 |
|---|---|---|---|---|---|---|---|---|---|
| $SiO_2$ | 61.000 | 61.040 | 61.040 | 61.080 | 61.080 | 61.120 | 61.120 | 61.160 | 61.160 |
| $Al_2O_3$ | 14.740 | 14.740 | 14.740 | 14.740 | 14.740 | 14.740 | 14.740 | 14.740 | 14.740 |
| $B_2O_3$ | 6.000 | 6.000 | 6.000 | 6.000 | 6.000 | 6.000 | 6.000 | 6.000 | 6.000 |
| $Li_2O$ | 9.000 | 9.000 | 9.000 | 9.000 | 9.000 | 9.000 | 9.000 | 9.000 | 9.000 |
| $Na_2O$ | 2.000 | 2.000 | 2.000 | 2.000 | 2.000 | 2.000 | 2.000 | 2.000 | 2.000 |
| $K_2O$ | 0.200 | 0.200 | 0.200 | 0.200 | 0.200 | 0.200 | 0.200 | 0.200 | 0.200 |
| MgO | 1.500 | 1.500 | 1.500 | 1.500 | 1.500 | 1.500 | 1.500 | 1.500 | 1.500 |
| CaO | 4.500 | 4.500 | 4.500 | 4.500 | 4.500 | 4.500 | 4.500 | 4.500 | 4.500 |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | 0.529 | 0.448 | 0.448 | 0.367 | 0.367 | 0.286 | 0.286 | 0.205 | 0.205 |
| $CeO_2$ | 0.083 | 0.113 | 0.113 | 0.143 | 0.143 | 0.174 | 0.174 | 0.204 | 0.204 |
| $Er_2O_3$ | 0.450 | 0.460 | 0.460 | 0.470 | 0.470 | 0.480 | 0.480 | 0.490 | 0.490 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | | | | | | | | |
| Thickness (mm) | 2.387 | 0.539 | 2.425 | 0.481 | 2.347 | 0.492 | 2.349 | 0.518 | 2.369 |
| L* | 94.91 | 96.20 | 94.81 | 96.22 | 94.90 | 96.22 | 94.84 | 96.19 | 94.65 |
| a* | 4.62 | 1.34 | 4.67 | 1.19 | 4.51 | 1.24 | 4.60 | 1.35 | 4.65 |
| b* | −0.47 | −0.08 | −0.15 | −0.01 | −0.18 | 0.00 | −0.04 | 0.00 | 0.29 |
| Liquidus (° C.) | | | | | | | | | |

TABLE 27M

| Example | TM-776 | TM-777 | TM-778 | TM-779 | TM-780 | TM-781 | TM-782 | TM-783 | TM-784 |
|---|---|---|---|---|---|---|---|---|---|
| $SiO_2$ | 61.200 | 61.200 | 60.360 | 60.360 | 60.360 | 60.360 | 59.760 | 59.760 | 60.360 |
| $Al_2O_3$ | 14.740 | 14.740 | 14.740 | 14.740 | 14.740 | 14.740 | 14.740 | 14.740 | 14.740 |
| $B_2O_3$ | 6.000 | 6.000 | 6.000 | 6.000 | 6.000 | 6.000 | 6.000 | 6.000 | 6.000 |
| $Li_2O$ | 9.000 | 9.000 | 9.000 | 9.000 | 9.000 | 9.000 | 9.000 | 9.000 | 9.000 |
| $Na_2O$ | 2.000 | 2.000 | 2.000 | 2.000 | 2.000 | 2.000 | 2.000 | 2.000 | 2.000 |
| $K_2O$ | 0.200 | 0.200 | 0.200 | 0.200 | 0.200 | 0.200 | 0.200 | 0.200 | 0.200 |
| MgO | 1.500 | 1.500 | 1.500 | 1.500 | 1.500 | 1.500 | 1.500 | 1.500 | 1.500 |
| CaO | 4.500 | 4.500 | 4.500 | 4.500 | 4.500 | 4.500 | 4.500 | 4.500 | 4.500 |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | 0.124 | 0.124 | 0.400 | 0.400 | 0.900 | 0.900 | 1.500 | 1.500 | 0.500 |

TABLE 27M-continued

| Example | TM-776 | TM-777 | TM-778 | TM-779 | TM-780 | TM-781 | TM-782 | TM-783 | TM-784 |
|---|---|---|---|---|---|---|---|---|---|
| $CeO_2$ | 0.234 | 0.234 | 0.800 | 0.800 | 0.300 | 0.300 | 0.600 | 0.600 | 1.000 |
| $Er_2O_3$ | 0.500 | 0.500 | 0.500 | 0.500 | 0.500 | 0.500 | 0.200 | 0.200 | 0.200 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | | | 2.527 | | 2.516 | | 2.500 | 2.480 |
| Thickness (mm) | 0.529 | 2.530 | 0.556 | 2.386 | 0.557 | 2.382 | 0.591 | 2.387 | |
| L* | 96.10 | 94.64 | 95.65 | 92.55 | 96.04 | 94.22 | 92.85 | 80.58 | |
| a* | 1.41 | 4.71 | 1.11 | 3.67 | 1.23 | 4.15 | −1.03 | 3.09 | |
| b* | 0.06 | 0.38 | 2.47 | 11.15 | 1.07 | 4.68 | 18.74 | 59.89 | |
| Liquidus (° C.) | | | 1140 | 1140 | 1130 | 1130 | 1110 | 1110 | |

TABLE 27N

| Example | TM-785 | TM-786 | TM-787 | TM-788 | TM-789 | TM-790 | TM-791 | TM-792 | TM-793 |
|---|---|---|---|---|---|---|---|---|---|
| $SiO_2$ | 61.560 | 61.560 | 61.660 | 61.660 | 61.760 | 61.760 | 61.860 | 61.860 | 61.960 |
| $Al_2O_3$ | 14.740 | 14.740 | 14.740 | 14.740 | 14.740 | 14.740 | 14.740 | 14.740 | 14.740 |
| $B_2O_3$ | 6.000 | 6.000 | 6.000 | 6.000 | 6.000 | 6.000 | 6.000 | 6.000 | 6.000 |
| $Li_2O$ | 9.000 | 9.000 | 9.000 | 9.000 | 9.000 | 9.000 | 9.000 | 9.000 | 9.000 |
| $Na_2O$ | 2.000 | 2.000 | 2.000 | 2.000 | 2.000 | 2.000 | 2.000 | 2.000 | 2.000 |
| $K_2O$ | 0.200 | 0.200 | 0.200 | 0.200 | 0.200 | 0.200 | 0.200 | 0.200 | 0.200 |
| MgO | 1.500 | 1.500 | 1.500 | 1.500 | 1.500 | 1.500 | 1.500 | 1.500 | 1.500 |
| CaO | 4.500 | 4.500 | 4.500 | 4.500 | 4.500 | 4.500 | 4.500 | 4.500 | 4.500 |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | | | | | | | | | |
| $CeO_2$ | | | | | | | | | |
| $Er_2O_3$ | 0.500 | 0.500 | 0.400 | 0.400 | 0.300 | 0.300 | 0.200 | 0.200 | 0.100 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | 2.469 | | 2.459 | | 2.458 | | 2.441 | |
| Thickness (mm) | 0.562 | 2.396 | 0.573 | 2.389 | 0.548 | 2.388 | 0.550 | 2.388 | 0.581 |
| L* | 96.22 | 94.94 | 96.27 | 95.19 | 96.41 | 95.55 | 96.53 | 95.88 | 96.64 |
| a* | 1.45 | 4.94 | 1.17 | 4.25 | 0.85 | 3.33 | 0.58 | 2.39 | 0.31 |
| b* | −0.30 | −1.30 | −0.26 | −1.07 | −0.10 | −0.81 | −0.02 | −0.53 | 0.07 |
| Liquidus (° C.) | 1120 | 1120 | 1120 | 1120 | 1125 | 1125 | 1110 | 1110 | 1125 |

TABLE 27O

| Example | TM-794 | TM-795 | TM-796 | TM-797 | TM-798 | TM-799 | TM-800 | TM-801 | TM-802 |
|---|---|---|---|---|---|---|---|---|---|
| $SiO_2$ | 61.960 | 61.380 | 61.380 | 61.380 | 61.380 | 61.380 | 61.340 | 61.340 | 61.340 |
| $Al_2O_3$ | 14.740 | 14.700 | 14.700 | 14.700 | 14.700 | 14.700 | 14.700 | 14.700 | 14.700 |
| $B_2O_3$ | 6.000 | 6.000 | 6.000 | 6.000 | 6.000 | 6.000 | 6.000 | 6.000 | 6.000 |
| $Li_2O$ | 9.000 | 9.000 | 9.000 | 9.000 | 9.000 | 9.000 | 9.000 | 9.000 | 9.000 |
| $Na_2O$ | 2.000 | 2.000 | 2.000 | 2.000 | 2.000 | 2.000 | 2.000 | 2.000 | 2.000 |
| $K_2O$ | 0.200 | 0.200 | 0.200 | 0.200 | 0.200 | 0.200 | 0.200 | 0.200 | 0.200 |
| MgO | 1.500 | 1.500 | 1.500 | 1.500 | 1.500 | 1.500 | 1.500 | 1.500 | 1.500 |
| CaO | 4.500 | 4.500 | 4.500 | 4.500 | 4.500 | 4.500 | 4.500 | 4.500 | 4.500 |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | | 0.358 | 0.358 | 0.358 | 0.358 | 0.358 | 0.320 | 0.320 | 0.320 |
| $CeO_2$ | | 0.120 | 0.120 | 0.120 | 0.120 | 0.120 | 0.030 | 0.030 | 0.030 |

TABLE 27O-continued

| Example | TM-794 | TM-795 | TM-796 | TM-797 | TM-798 | TM-799 | TM-800 | TM-801 | TM-802 |
|---|---|---|---|---|---|---|---|---|---|
| $Er_2O_3$ | 0.100 | 0.237 | 0.237 | 0.237 | 0.237 | 0.237 | 0.409 | 0.409 | 0.409 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | 2.431 | | | | | | | | |
| Thickness (mm) | 2.392 | | 0.562 | 2.402 | 0.535 | 2.374 | | 0.561 | 2.408 |
| L* | 96.26 | | 96.49 | 95.65 | 96.51 | 95.70 | | 96.30 | 95.14 |
| a* | 1.28 | | 0.68 | 2.65 | 0.65 | 2.58 | | 1.19 | 4.30 |
| b* | −0.20 | | 0.08 | 0.12 | 0.10 | 0.11 | | −0.19 | −0.97 |
| Liquidus (° C.) | 1125 | 1115 | | | | | 1125 | | |

TABLE 27P

| | Example | | | | | | | | |
|---|---|---|---|---|---|---|---|---|---|
| | TM-803 | TM-804 | TM-805 | TM-806 | TM-807 | TM-808 | TM-809 | TM-810 | TM-811 |
| $SiO_2$ | 58.830 | 58.830 | 59.370 | 59.370 | 60.430 | 60.430 | 58.560 | 58.560 | 59.730 |
| $Al_2O_3$ | 14.700 | 14.700 | 14.700 | 14.700 | 14.700 | 14.700 | 14.700 | 14.700 | 14.700 |
| $B_2O_3$ | 6.000 | 6.000 | 6.000 | 6.000 | 6.000 | 6.000 | 6.000 | 6.000 | 6.000 |
| $Li_2O$ | 9.000 | 9.000 | 9.000 | 9.000 | 9.000 | 9.000 | 9.000 | 9.000 | 9.000 |
| $Na_2O$ | 2.000 | 2.000 | 2.000 | 2.000 | 2.000 | 2.000 | 2.000 | 2.000 | 2.000 |
| $K_2O$ | 0.200 | 0.200 | 0.200 | 0.200 | 0.200 | 0.200 | 0.200 | 0.200 | 0.200 |
| MgO | 1.500 | 1.500 | 1.500 | 1.500 | 1.500 | 1.500 | 1.500 | 1.500 | 1.500 |
| CaO | 4.500 | 4.500 | 4.500 | 4.500 | 4.500 | 4.500 | 4.500 | 4.500 | 4.500 |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | 2.551 | 2.551 | 1.852 | 1.852 | 0.507 | 0.507 | 3.130 | 3.130 | 1.624 |
| $CeO_2$ | 0.707 | 0.707 | 0.795 | 0.795 | 0.964 | 0.964 | 0.003 | 0.003 | 0.192 |
| $Er_2O_3$ | 0.010 | 0.010 | 0.080 | 0.080 | 0.200 | 0.200 | 0.410 | 0.410 | 0.550 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | 2.483 | | 2.487 | | 2.495 | | 2.502 | |
| Thickness (mm) | 0.565 | 2.476 | 0.591 | 2.430 | 0.575 | 2.435 | 0.559 | 2.406 | 0.565 |
| L* | 87.33 | 64.75 | 92.00 | 78.90 | 95.85 | 93.09 | 95.41 | 91.78 | 95.74 |
| a* | 0.33 | 15.46 | −1.61 | 3.33 | 0.23 | 1.12 | 1.56 | 5.49 | 1.20 |
| b* | 45.88 | 90.85 | 24.64 | 67.66 | 3.28 | 13.25 | 0.97 | 4.52 | 2.75 |
| Liquidus (° C.) | | 1125 | | 1155 | | 1135 | | 1110 | |

TABLE 27Q

| | Example | | | | | | | | |
|---|---|---|---|---|---|---|---|---|---|
| | TM-812 | TM-813 | TM-814 | TM-815 | TM-816 | TM-817 | TM-818 | TM-819 | TM-820 |
| $SiO_2$ | 59.730 | 60.570 | 60.570 | 60.638 | 60.638 | 58.787 | 58.787 | 59.878 | 59.878 |
| $Al_2O_3$ | 14.700 | 14.700 | 14.700 | 14.700 | 14.700 | 14.700 | 14.700 | 14.700 | 14.700 |
| $B_2O_3$ | 6.000 | 6.000 | 6.000 | 6.000 | 6.000 | 6.000 | 6.000 | 6.000 | 6.000 |
| $Li_2O$ | 9.000 | 9.000 | 9.000 | 9.000 | 9.000 | 9.000 | 9.000 | 9.000 | 9.000 |
| $Na_2O$ | 2.000 | 2.000 | 2.000 | 2.000 | 2.000 | 2.000 | 2.000 | 2.000 | 2.000 |
| $K_2O$ | 0.200 | 0.200 | 0.200 | 0.200 | 0.200 | 0.200 | 0.200 | 0.200 | 0.200 |
| MgO | 1.500 | 1.500 | 1.500 | 1.500 | 1.500 | 1.500 | 1.500 | 1.500 | 1.500 |
| CaO | 4.500 | 4.500 | 4.500 | 4.500 | 4.500 | 4.500 | 4.500 | 4.500 | 4.500 |
| ZnO | | | | | | | | | |
| $SnO_2$ | | | | | | | | | |

TABLE 27Q-continued

| | Example | | | | | | | | |
|---|---|---|---|---|---|---|---|---|---|
| | TM-812 | TM-813 | TM-814 | TM-815 | TM-816 | TM-817 | TM-818 | TM-819 | TM-820 |
| $Fe_2O_3$ | | | | | | | | | |
| $ZrO_2$ | | | | | | | | | |
| $TiO_2$ | 1.624 | 0.548 | 0.548 | 0.594 | 0.594 | 2.071 | 2.071 | 1.212 | 1.212 |
| $CeO_2$ | 0.192 | 0.327 | 0.327 | 0.808 | 0.808 | 0.988 | 0.988 | 0.875 | 0.875 |
| $Er_2O_3$ | 0.550 | 0.650 | 0.650 | 0.060 | 0.060 | 0.254 | 0.254 | 0.135 | 0.135 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | 2.510 | 2.510 | | | | | | | |
| Thickness (mm) | 2.402 | 2.404 | 0.560 | 0.578 | 2.414 | 0.578 | 2.404 | 0.586 | 2.399 |
| L* | 93.48 | 94.01 | 95.87 | 96.22 | 94.48 | 85.96 | 60.04 | 93.85 | 87.70 |
| a* | 3.59 | 5.22 | 1.70 | −0.17 | −0.52 | 0.43 | 15.34 | −1.03 | −0.49 |
| b* | 11.00 | 3.02 | 0.65 | 2.75 | 11.35 | 47.04 | 85.82 | 13.22 | 38.02 |
| Liquidus (° C.) | 1105 | 1125 | | | | | | | |

TABLE 27R

| | Example | | | | | | | | |
|---|---|---|---|---|---|---|---|---|---|
| | TM-821 | TM-822 | TM-823 | TM-824 | TM-825 | TM-826 | TM-827 | TM-828 | TM-829 |
| $SiO_2$ | 59.963 | 59.963 | 57.421 | 57.421 | 58.991 | 58.991 | 61.419 | 61.419 | 61.419 |
| $Al_2O_3$ | 14.700 | 14.700 | 14.700 | 14.700 | 14.700 | 14.700 | 14.700 | 14.700 | 14.700 |
| $B_2O_3$ | 6.000 | 6.000 | 6.000 | 6.000 | 6.000 | 6.000 | 6.000 | 6.000 | 6.000 |
| $Li_2O$ | 9.000 | 9.000 | 9.000 | 9.000 | 9.000 | 9.000 | 9.000 | 9.000 | 9.000 |
| $Na_2O$ | 2.000 | 2.000 | 2.000 | 2.000 | 2.000 | 2.000 | 2.000 | 2.000 | 2.000 |
| $K_2O$ | 0.200 | 0.200 | 0.200 | 0.200 | 0.200 | 0.200 | 0.200 | 0.200 | 0.200 |
| MgO | 1.500 | 1.500 | 1.500 | 1.500 | 1.500 | 1.500 | 1.500 | 1.500 | 1.500 |
| CaO | 4.500 | 4.500 | 4.500 | 4.500 | 4.500 | 4.500 | 4.500 | 4.500 | 4.500 |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | 1.633 | 1.633 | 4.104 | 4.104 | 2.575 | 2.575 | 0.350 | 0.350 | 0.350 |
| $CeO_2$ | 0.067 | 0.067 | 0.077 | 0.077 | 0.072 | 0.072 | 0.080 | 0.080 | 0.080 |
| $Er_2O_3$ | 0.437 | 0.437 | 0.498 | 0.498 | 0.462 | 0.462 | 0.251 | 0.251 | 0.251 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | 2.484 | | | | 2.501 | | 2.451 | | |
| Thickness (mm) | 0.580 | 2.430 | 0.638 | 2.447 | 0.550 | 2.408 | 0.542 | 2.410 | 0.551 |
| L* | 96.06 | 94.61 | 87.69 | 80.63 | 95.26 | 91.27 | 96.45 | 95.61 | 96.47 |
| a* | 1.24 | 4.21 | 1.92 | 6.64 | 0.89 | 3.57 | 0.75 | 2.89 | 0.73 |
| b* | 0.74 | 2.71 | 20.46 | 48.88 | 6.33 | 27.02 | 0.02 | −0.27 | 0.02 |
| Liquidus (° C.) | 1105 | | | | 1095 | | 1130 | | |

TABLE 27S

| | Example | | | | | | | | |
|---|---|---|---|---|---|---|---|---|---|
| | TM-830 | TM-831 | TM-832 | TM-833 | TM-834 | TM-835 | TM-836 | TM-837 | TM-838 |
| $SiO_2$ | 61.419 | 61.326 | 61.326 | 61.326 | 61.326 | 61.655 | 61.655 | 61.598 | 61.598 |
| $Al_2O_3$ | 14.700 | 14.700 | 14.700 | 14.700 | 14.700 | 14.700 | 14.700 | 14.700 | 14.700 |
| $B_2O_3$ | 6.000 | 6.000 | 6.000 | 6.000 | 6.000 | 6.000 | 6.000 | 6.000 | 6.000 |
| $Li_2O$ | 9.000 | 9.000 | 9.000 | 9.000 | 9.000 | 9.000 | 9.000 | 9.000 | 9.000 |
| $Na_2O$ | 2.000 | 2.000 | 2.000 | 2.000 | 2.000 | 2.000 | 2.000 | 2.000 | 2.000 |

TABLE 27S-continued

| | Example | | | | | | | | |
|---|---|---|---|---|---|---|---|---|---|
| | TM-830 | TM-831 | TM-832 | TM-833 | TM-834 | TM-835 | TM-836 | TM-837 | TM-838 |
| $K_2O$ | 0.200 | 0.200 | 0.200 | 0.200 | 0.200 | 0.200 | 0.200 | 0.200 | 0.200 |
| MgO | 1.500 | 1.500 | 1.500 | 1.500 | 1.500 | 1.500 | 1.500 | 1.500 | 1.500 |
| CaO | 4.500 | 4.500 | 4.500 | 4.500 | 4.500 | 4.500 | 4.500 | 4.500 | 4.500 |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | 0.350 | 0.419 | 0.419 | 0.419 | 0.419 | 0.030 | 0.030 | 0.003 | 0.003 |
| $CeO_2$ | 0.080 | 0.104 | 0.104 | 0.104 | 0.104 | 0.010 | 0.010 | 0.094 | 0.094 |
| $Er_2O_3$ | 0.251 | 0.251 | 0.251 | 0.251 | 0.251 | 0.405 | 0.405 | 0.405 | 0.405 |
| $Nd_2O_3$ | | | | | | | | | |
| NiO | | | | | | | | | |
| $Co_3O_4$ | | | | | | | | | |
| $Cr_2O_3$ | | | | | | | | | |
| CuO | | | | | | | | | |
| Density (g/cc) | | 2.454 | | | | 2.461 | | 2.465 | |
| Thickness (mm) | 2.370 | 0.551 | 2.413 | 0.559 | 2.371 | 0.565 | 2.416 | 0.549 | 2.400 |
| L* | 95.65 | 96.43 | 95.60 | 96.46 | 95.62 | 96.31 | 95.22 | 96.31 | 95.17 |
| a* | 2.80 | 0.75 | 2.84 | 0.73 | 2.74 | 1.23 | 4.22 | 1.18 | 4.18 |
| b* | −0.19 | 0.09 | 0.02 | 0.07 | 0.15 | −0.23 | −1.08 | −0.15 | −0.75 |
| Liquidus (° C.) | | 1140 | | | | 1105 | | 1135 | |

TABLE 27T

| | Example | | | | | | | | |
|---|---|---|---|---|---|---|---|---|---|
| | TM-839 | TM-840 | TM-841 | TM-842 | TM-843 | TM-844 | TM-845 | TM-846 | TM-847 |
| $SiO_2$ | 61.581 | 61.581 | 61.318 | 61.318 | 60.750 | 60.750 | 60.692 | 60.692 | 60.865 |
| $Al_2O_3$ | 14.700 | 14.700 | 14.700 | 14.700 | 15.437 | 15.437 | 15.420 | 15.420 | 15.465 |
| $B_2O_3$ | 6.000 | 6.000 | 6.000 | 6.000 | 5.979 | 5.979 | 5.972 | 5.972 | 5.991 |
| $Li_2O$ | 9.000 | 9.000 | 9.000 | 9.000 | 9.462 | 9.462 | 9.452 | 9.452 | 9.471 |
| $Na_2O$ | 2.000 | 2.000 | 2.000 | 2.000 | 1.535 | 1.535 | 1.540 | 1.540 | 1.539 |
| $K_2O$ | 0.200 | 0.200 | 0.200 | 0.200 | 0.201 | 0.201 | 0.201 | 0.201 | 0.198 |
| MgO | 1.500 | 1.500 | 1.500 | 1.500 | 1.988 | 1.988 | 1.995 | 1.995 | 1.999 |
| CaO | 4.500 | 4.500 | 4.500 | 4.500 | 4.229 | 4.229 | 4.232 | 4.232 | 4.242 |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | 0.100 | 0.100 | 0.372 | 0.372 | | | | | |
| $CeO_2$ | 0.010 | 0.010 | 0.001 | 0.001 | | | | | |
| $Er_2O_3$ | 0.409 | 0.409 | 0.409 | 0.409 | 0.420 | 0.420 | 0.496 | 0.496 | 0.204 |
| $Nd_2O_3$ | | | | | | | | | |
| NiO | | | | | | | | | 0.026 |
| $Co_3O_4$ | | | | | | | | | |
| $Cr_2O_3$ | | | | | | | | | |
| CuO | | | | | | | | | |
| Density (g/cc) | 2.462 | | 2.465 | | | | | | |
| Thickness (mm) | 0.541 | 2.399 | 0.537 | 2.405 | 0.546 | 2.418 | 0.527 | 2.354 | 0.573 |
| L* | 96.34 | 95.16 | 96.30 | 95.11 | 96.24 | 95.11 | 96.23 | 94.80 | 96.10 |
| a* | 1.16 | 4.24 | 1.19 | 4.30 | 1.17 | 4.33 | 1.32 | 4.79 | 0.56 |
| b* | −0.20 | −1.06 | −0.18 | −0.95 | −0.17 | −0.95 | −0.13 | −0.63 | 1.43 |
| Liquidus (° C.) | 1125 | | 1125 | | | | | | |

TABLE 27U

| | Example | | | | | | | | |
|---|---|---|---|---|---|---|---|---|---|
| | TM-848 | TM-849 | TM-850 | TM-851 | TM-852 | TM-853 | TM-854 | TM-855 | TM-856 |
| $SiO_2$ | 60.865 | 60.865 | 60.865 | 60.883 | 60.883 | 60.478 | 60.478 | 60.599 | 60.599 |
| $Al_2O_3$ | 15.465 | 15.465 | 15.465 | 15.473 | 15.473 | 15.366 | 15.366 | 15.396 | 15.396 |
| $B_2O_3$ | 5.991 | 5.991 | 5.991 | 5.986 | 5.986 | 5.946 | 5.946 | 5.963 | 5.963 |
| $Li_2O$ | 9.471 | 9.471 | 9.471 | 9.492 | 9.492 | 9.428 | 9.428 | 9.446 | 9.446 |

TABLE 27U-continued

| | Example | | | | | | | | |
|---|---|---|---|---|---|---|---|---|---|
| | TM-848 | TM-849 | TM-850 | TM-851 | TM-852 | TM-853 | TM-854 | TM-855 | TM-856 |
| $Na_2O$ | 1.539 | 1.539 | 1.539 | 1.546 | 1.546 | 1.533 | 1.533 | 1.539 | 1.539 |
| $K_2O$ | 0.198 | 0.198 | 0.198 | 0.198 | 0.198 | 0.205 | 0.205 | 0.203 | 0.203 |
| MgO | 1.999 | 1.999 | 1.999 | 1.995 | 1.995 | 1.978 | 1.978 | 1.992 | 1.992 |
| CaO | 4.242 | 4.242 | 4.242 | 4.243 | 4.243 | 4.218 | 4.218 | 4.224 | 4.224 |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | | | | | | | | | |
| $CeO_2$ | | | | | | | | | |
| $Er_2O_3$ | 0.204 | 0.204 | 0.204 | 0.160 | 0.160 | 0.828 | 0.828 | 0.626 | 0.626 |
| $Nd_2O_3$ | | | | | | | | | |
| NiO | 0.026 | 0.026 | 0.026 | 0.024 | 0.024 | 0.020 | 0.020 | 0.012 | 0.012 |
| $Co_3O_4$ | | | | | | | | | |
| $Cr_2O_3$ | | | | | | | | | |
| CuO | | | | | | | | | |
| Density (g/cc) | | | | | | | | | |
| Thickness (mm) | 2.354 | 0.541 | 2.370 | 0.589 | 2.415 | 0.549 | 2.448 | 0.550 | 2.386 |
| L* | 93.89 | 96.12 | 93.98 | 96.13 | 94.08 | 95.61 | 92.62 | 95.91 | 93.67 |
| a* | 2.29 | 0.58 | 2.24 | 0.44 | 1.87 | 2.13 | 6.69 | 1.69 | 5.60 |
| b* | 6.03 | 1.47 | 6.13 | 1.45 | 5.99 | 0.65 | 3.68 | 0.37 | 1.87 |
| Liquidus (° C.) | | | | | | | | | |

TABLE 27V

| | Example | | | | | | | | |
|---|---|---|---|---|---|---|---|---|---|
| | TM-857 | TM-858 | TM-859 | TM-860 | TM-861 | TM-862 | TM-863 | TM-864 | TM-865 |
| $SiO_2$ | 60.750 | 60.692 | 60.865 | 60.883 | 60.478 | 60.599 | 58.500 | 58.500 | 58.500 |
| $Al_2O_3$ | 15.437 | 15.420 | 15.465 | 15.473 | 15.366 | 15.396 | 16.420 | 16.420 | 16.420 |
| $B_2O_3$ | 5.979 | 5.972 | 5.991 | 5.986 | 5.946 | 5.963 | 5.970 | 5.970 | 5.970 |
| $Li_2O$ | 9.462 | 9.452 | 9.471 | 9.492 | 9.428 | 9.446 | 11.940 | 11.940 | 11.940 |
| $Na_2O$ | 1.535 | 1.540 | 1.539 | 1.546 | 1.533 | 1.539 | 6.470 | 6.470 | 6.470 |
| $K_2O$ | 0.201 | 0.201 | 0.198 | 0.198 | 0.205 | 0.203 | 0.200 | 0.200 | 0.200 |
| MgO | 1.988 | 1.995 | 1.999 | 1.995 | 1.978 | 1.992 | | | |
| CaO | 4.229 | 4.232 | 4.242 | 4.243 | 4.218 | 4.224 | | | |
| ZnO | | | | | | | | | |
| $SnO_2$ | | | | | | | | | |
| $Fe_2O_3$ | | | | | | | | | |
| $ZrO_2$ | | | | | | | | | |
| $TiO_2$ | | | | | | | | | |
| $CeO_2$ | | | | | | | | | |
| $Er_2O_3$ | 0.420 | 0.496 | 0.204 | 0.160 | 0.828 | 0.626 | 0.500 | 0.500 | 0.500 |
| $Nd_2O_3$ | | | | | | | | | |
| NiO | | | 0.026 | 0.024 | 0.020 | 0.012 | 0.025 | 0.025 | 0.025 |
| $Co_3O_4$ | | | | | | | | | |
| $Cr_2O_3$ | | | | | | | | | |
| CuO | | | | | | | | | |
| Density (g/cc) | | | | | | | | | |
| Thickness (mm) | 2.384 | 2.412 | 2.410 | 2.403 | 2.391 | 2.423 | 0.540 | 0.549 | 2.415 |
| L* | 95.08 | 94.81 | 93.75 | 93.98 | 92.61 | 93.57 | 95.38 | 95.68 | 92.56 |
| a* | 4.26 | 4.89 | 2.31 | 1.90 | 6.58 | 5.62 | 1.29 | 1.30 | 4.63 |
| b* | −0.95 | −0.97 | 6.25 | 6.01 | 3.77 | 1.94 | 2.40 | 1.55 | 6.03 |
| Liquidus (° C.) | | | | | | | | | |

TABLE 27W

| | Example | | | | | | | | |
|---|---|---|---|---|---|---|---|---|---|
| | TM-866 | TM-867 | TM-868 | TM-869 | TM-870 | TM-871 | TM-872 | TM-873 | TM-874 |
| $SiO_2$ | 58.500 | 58.500 | 58.500 | 58.500 | 58.500 | 59.180 | 58.830 | 59.120 | 58.950 |
| $Al_2O_3$ | 16.420 | 16.420 | 16.420 | 16.420 | 16.420 | 15.950 | 14.570 | 15.930 | 15.900 |
| $B_2O_3$ | 5.970 | 5.970 | 5.970 | 5.970 | 5.970 | 5.890 | 5.970 | 5.830 | 6.030 |

TABLE 27W-continued

| | Example | | | | | | | | |
|---|---|---|---|---|---|---|---|---|---|
| | TM-866 | TM-867 | TM-868 | TM-869 | TM-870 | TM-871 | TM-872 | TM-873 | TM-874 |
| $Li_2O$ | 11.940 | 11.940 | 11.940 | 11.940 | 11.940 | 12.010 | 12.200 | 12.100 | 12.160 |
| $Na_2O$ | 6.470 | 6.470 | 6.470 | 6.470 | 6.470 | 6.270 | 6.310 | 6.230 | 6.220 |
| $K_2O$ | 0.200 | 0.200 | 0.200 | 0.200 | 0.200 | 0.200 | 0.200 | 0.190 | 0.200 |
| MgO | | | | | | 0.020 | 0.020 | 0.020 | 0.020 |
| CaO | | | | | | 0.010 | 0.010 | 0.010 | 0.010 |
| ZnO | | | | | | | | | |
| $SnO_2$ | | | | | | | | | |
| $Fe_2O_3$ | | | | | | 0.004 | 0.005 | 0.004 | 0.004 |
| $ZrO_2$ | | | | | | | | | |
| $TiO_2$ | | | | | | | | | |
| $CeO_2$ | | | | | | | | | |
| $Er_2O_3$ | 0.500 | 0.500 | 0.500 | 0.500 | 0.500 | 0.450 | 1.850 | 0.450 | 0.450 |
| $Nd_2O_3$ | | | | | | | | | |
| NiO | 0.025 | | | | | 0.001 | 0.010 | 0.086 | 0.040 |
| $Co_3O_4$ | | | | | | | | 0.009 | 0.003 |
| $Cr_2O_3$ | | | | | | 0.001 | 0.003 | 0.001 | 0.001 |
| CuO | | | | | | 0.002 | 0.015 | 0.002 | 0.001 |
| Density (g/cc) | | | | | | | | | |
| Thickness (mm) | 2.386 | 0.567 | 0.562 | 2.415 | 2.427 | 1.348 | 1.349 | 1.350 | 1.350 |
| L* | 92.64 | 96.29 | 96.29 | 95.04 | 95.03 | 95.76 | 93.70 | 91.72 | 93.92 |
| a* | 4.59 | 1.32 | 1.31 | 4.77 | 4.78 | 3.04 | 7.94 | 3.05 | 3.00 |
| b* | 5.86 | −0.23 | −0.22 | −1.28 | −1.28 | −0.87 | −1.71 | 10.60 | 4.49 |
| Liquidus (° C.) | | 1100 | | | | | | | |

TABLE 27X

| | Example | | | | | | | | |
|---|---|---|---|---|---|---|---|---|---|
| | TM-875 | TM-876 | TM-877 | TM-878 | TM-879 | TM-880 | TM-881 | TM-882 | TM-883 |
| $SiO_2$ | 58.940 | 59.090 | 60.890 | 60.890 | 61.410 | 60.940 | 61.950 | 60.940 | 58.670 |
| $Al_2O_3$ | 15.160 | 15.910 | 14.880 | 14.930 | 15.340 | 15.430 | 14.760 | 15.300 | 16.520 |
| $B_2O_3$ | 5.960 | 5.950 | 5.950 | 5.620 | 5.720 | 5.820 | 5.610 | 5.710 | 5.920 |
| $Li_2O$ | 12.160 | 12.020 | 9.610 | 9.490 | 9.440 | 9.550 | 9.390 | 9.490 | 11.850 |
| $Na_2O$ | 6.280 | 6.270 | 1.510 | 1.530 | 1.480 | 1.480 | 1.500 | 1.500 | 6.240 |
| $K_2O$ | 0.200 | 0.200 | 0.200 | 0.210 | 0.200 | 0.200 | 0.200 | 0.200 | 0.190 |
| MgO | 0.020 | 0.020 | 2.010 | 2.040 | 1.960 | 2.010 | 1.920 | 2.040 | 0.010 |
| CaO | 0.010 | 0.010 | 4.300 | 4.420 | 4.260 | 4.340 | 4.170 | 4.390 | 0.020 |
| ZnO | | | | | | | | | 0.040 |
| $SnO_2$ | | | | | | | | | |
| $Fe_2O_3$ | 0.004 | 0.004 | 0.006 | 0.006 | 0.006 | 0.006 | 0.006 | 0.006 | 0.005 |
| $ZrO_2$ | | | | | | | | | |
| $TiO_2$ | | | | | | | | | |
| $CeO_2$ | | | | | | | | | |
| $Er_2O_3$ | 1.170 | 0.460 | 0.620 | 0.830 | 0.160 | 0.200 | 0.480 | 0.420 | |
| $Nd_2O_3$ | | | | | | | | | 0.520 |
| NiO | 0.053 | 0.003 | 0.012 | 0.020 | 0.023 | 0.025 | 0.001 | | |
| $Co_3O_4$ | | 0.012 | 0.002 | 0.002 | 0.001 | 0.001 | 0.002 | 0.002 | |
| $Cr_2O_3$ | 0.002 | 0.001 | | | | | | | |
| CuO | 0.009 | 0.025 | | | | | | | |
| Density (g/cc) | | | | | | | | | |
| Thickness (mm) | 1.336 | 1.348 | 2.423 | 2.391 | 2.403 | 2.410 | 2.412 | 2.384 | 1.230 |
| L* | 93.39 | 87.55 | 93.57 | 92.61 | 93.98 | 93.75 | 94.81 | 95.08 | 90.96 |
| a* | 5.72 | 2.01 | 5.62 | 6.58 | 1.90 | 2.31 | 4.89 | 4.26 | −2.23 |
| b* | 3.16 | −11.44 | 1.94 | 3.77 | 6.01 | 6.25 | −0.97 | −0.95 | −8.98 |
| Liquidus (° C.) | | | | | | | | | |

TABLE 27Y

| | Example | | | | | | | | |
|---|---|---|---|---|---|---|---|---|---|
| | TM-884 | TM-885 | TM-886 | TM-887 | TM-888 | TM-889 | TM-890 | TM-891 | TM-892 |
| $SiO_2$ | 58.510 | 57.810 | 58.000 | 57.880 | 57.740 | 57.520 | 57.600 | 57.570 | 59.130 |
| $Al_2O_3$ | 16.390 | 16.210 | 16.250 | 16.110 | 16.080 | 16.330 | 16.370 | 16.070 | 16.500 |

TABLE 27Y-continued

| | Example | | | | | | | | |
|---|---|---|---|---|---|---|---|---|---|
| | TM-884 | TM-885 | TM-886 | TM-887 | TM-888 | TM-889 | TM-890 | TM-891 | TM-892 |
| $B_2O_3$ | 5.840 | 5.810 | 5.600 | 5.690 | 5.760 | 5.830 | 5.740 | 5.990 | 5.890 |
| $Li_2O$ | 11.760 | 11.720 | 11.620 | 11.740 | 11.790 | 11.780 | 11.760 | 10.970 | 11.890 |
| $Na_2O$ | 6.210 | 6.110 | 6.080 | 6.050 | 6.040 | 5.190 | 4.270 | 4.230 | 6.200 |
| $K_2O$ | 0.190 | 0.190 | 0.180 | 0.190 | 0.180 | 0.190 | 0.190 | 0.190 | 0.190 |
| MgO | | | | | | | 0.930 | 1.850 | 0.010 |
| CaO | 0.020 | 0.020 | 0.020 | 0.020 | 0.020 | 0.020 | 0.020 | 0.020 | 0.010 |
| ZnO | 0.010 | | | | | 1.010 | 1.030 | 1.000 | |
| $SnO_2$ | | | | | | | | | |
| $Fe_2O_3$ | 0.006 | 0.009 | 0.009 | 0.009 | 0.009 | 0.009 | 0.009 | 0.009 | 0.004 |
| $ZrO_2$ | | | | | | | | | |
| $TiO_2$ | | | | | | | | | |
| $CeO_2$ | | | | | | | | | |
| $Er_2O_3$ | | | | | | | | | |
| $Nd_2O_3$ | 1.040 | 2.090 | 2.110 | 2.080 | 2.060 | 2.100 | 2.070 | 2.090 | 0.160 |
| NiO | | | 0.112 | 0.214 | 0.307 | | | | 0.003 |
| $Co_3O_4$ | | | | | | | | | 0.001 |
| $Cr_2O_3$ | | | | | | | | | 0.001 |
| CuO | | | | | | | | | |
| Density (g/cc) | | | | | | | | | |
| Thickness (mm) | 1.260 | 1.270 | 1.290 | 1.300 | 1.280 | 1.310 | 1.310 | 1.250 | 1.361 |
| L* | 87.17 | 82.21 | 79.65 | 77.99 | 76.39 | 81.84 | 81.50 | 81.59 | 94.46 |
| a* | −2.88 | −2.53 | −3.97 | −4.64 | −5.20 | −2.50 | −2.50 | −2.62 | −0.94 |
| b* | −14.35 | −20.64 | −10.21 | −0.58 | 6.85 | −21.17 | −21.72 | −21.75 | −3.02 |
| Liquidus (° C.) | | | | | | | | | |

TABLE 27Z

| Example | TM-893 | TM-894 | TM-895 |
|---|---|---|---|
| $SiO_2$ | 58.920 | 58.640 | 58.970 |
| $Al_2O_3$ | 16.400 | 16.470 | 16.540 |
| $B_2O_3$ | 5.900 | 5.960 | 5.910 |
| $Li_2O$ | 12.050 | 12.050 | 11.780 |
| $Na_2O$ | 6.160 | 6.200 | 6.160 |
| $K_2O$ | 0.190 | 0.190 | 0.190 |
| MgO | 0.010 | 0.010 | 0.010 |
| CaO | 0.010 | 0.010 | 0.010 |
| ZnO | | | |
| $SnO_2$ | | | |
| $Fe_2O_3$ | 0.004 | 0.005 | 0.005 |
| $ZrO_2$ | | | |
| $TiO_2$ | | | |
| $CeO_2$ | | | |
| $Er_2O_3$ | | | |
| $Nd_2O_3$ | 0.320 | 0.410 | 0.390 |

TABLE 27Z-continued

| Example | TM-893 | TM-894 | TM-895 |
|---|---|---|---|
| NiO | 0.006 | 0.013 | 0.004 |
| $Co_3O_4$ | 0.001 | 0.002 | 0.002 |
| $Cr_2O_3$ | 0.001 | 0.001 | 0.001 |
| CuO | 0.011 | 0.024 | 0.011 |
| Density (g/cc) | | | |
| Thickness (mm) | 1.373 | 1.368 | 1.381 |
| L* | 92.34 | 91.24 | 91.58 |
| a* | −1.73 | −2.11 | −2.05 |
| b* | −5.70 | −7.32 | −7.47 |
| Liquidus (° C.) | | | |

Tables 28A-28C show example glass compositions (in terms of mol %) containing gold (Au) as a colorant.

TABLE 28A

| | Ex. (mol %) | | | | | | | | |
|---|---|---|---|---|---|---|---|---|---|
| | SPR-1 | SPR-2 | SPR-3 | SPR-4 | SPR-5 | SPR-6 | SPR-7 | SPR-8 | SPR-9 |
| $SiO_2$ | 60.610 | 60.886 | 60.779 | 60.735 | 60.801 | 59.984 | 59.847 | 60.214 | 60.910 |
| $Al_2O_3$ | 14.400 | 14.464 | 14.443 | 14.430 | 14.427 | 14.765 | 14.715 | 14.608 | 14.544 |
| $B_2O_3$ | 5.896 | 5.974 | 5.969 | 5.829 | 5.899 | 6.133 | 6.082 | 6.027 | 5.850 |
| $P_2O_5$ | 0.031 | 0.027 | 0.027 | 0.031 | 0.031 | 0.000 | 0.000 | 0.000 | 0.000 |
| $Li_2O$ | 10.074 | 9.955 | 9.947 | 10.047 | 10.037 | 10.424 | 10.479 | 10.415 | 9.760 |
| $Na_2O$ | 4.254 | 4.283 | 4.315 | 4.259 | 4.249 | 4.239 | 4.235 | 4.224 | 4.274 |
| $K_2O$ | 0.189 | 0.188 | 0.190 | 0.188 | 0.454 | 0.197 | 0.199 | 0.195 | 0.204 |
| MgO | 2.872 | 2.881 | 2.891 | 2.874 | 2.890 | 2.959 | 2.975 | 2.917 | 3.006 |
| CaO | 0.034 | 0.034 | 0.033 | 0.034 | 0.031 | 0.016 | 0.017 | 0.016 | 0.014 |
| ZnO | 0.985 | 0.999 | 0.993 | 0.985 | 0.994 | 1.045 | 1.020 | 1.012 | 1.015 |
| $TiO_2$ | 0.006 | 0.006 | 0.006 | 0.006 | 0.004 | 0.007 | 0.007 | 0.007 | 0.006 |
| $ZrO_2$ | 0.501 | 0.223 | 0.300 | 0.448 | 0.027 | 0.000 | 0.000 | 0.000 | 0.000 |
| $SnO_2$ | 0.071 | 0.016 | 0.035 | 0.054 | 0.105 | 0.053 | 0.052 | 0.052 | 0.050 |
| $Fe_2O_3$ | 0.024 | 0.024 | 0.024 | 0.024 | 0.025 | 0.146 | 0.096 | 0.047 | 0.048 |
| NiO | 0.000 | 0.000 | 0.000 | 0.000 | 0.000 | 0.000 | 0.233 | 0.229 | 0.000 |
| $Co_3O_4$ | 0.000 | 0.000 | 0.000 | 0.000 | 0.000 | 0.001 | 0.002 | 0.002 | 0.000 |
| $HfO_2$ | 0.006 | 0.003 | 0.006 | 0.006 | 0.000 | 0.000 | 0.000 | 0.000 | 0.000 |

TABLE 28A-continued

| | Ex. (mol %) | | | | | | | | |
|---|---|---|---|---|---|---|---|---|---|
| | SPR-1 | SPR-2 | SPR-3 | SPR-4 | SPR-5 | SPR-6 | SPR-7 | SPR-8 | SPR-9 |
| $MnO_2$ | 0.019 | 0.000 | 0.000 | 0.021 | 0.000 | 0.000 | 0.000 | 0.000 | 0.000 |
| $As_2O_3$ | 0.002 | 0.001 | 0.001 | 0.002 | 0.001 | 0.000 | 0.000 | 0.000 | 0.001 |
| Au | 0.000000 | 0.004966 | 0.004973 | 0.000000 | 0.000000 | 0.001997 | 0.001770 | 0.001802 | 0.000677 |
| $SO_3$ | 0.000 | 0.003 | 0.008 | 0.000 | 0.000 | 0.000 | 0.010 | 0.005 | 0.005 |
| Cl | 0.025 | 0.027 | 0.029 | 0.027 | 0.025 | 0.029 | 0.030 | 0.029 | 0.314 |

TABLE 28B

| | Ex. (mol %) | | | | | | | | |
|---|---|---|---|---|---|---|---|---|---|
| | SPR-10 | SPR-11 | SPR-12 | SPR-13 | SPR-14 | SPR-15 | SPR-16 | SPR-17 | SPR-18 |
| $SiO_2$ | 60.874 | 61.382 | 60.006 | 61.945 | 62.849 | 61.812 | 61.880 | 61.363 | 61.235 |
| $Al_2O_3$ | 14.545 | 14.424 | 14.896 | 14.480 | 14.514 | 15.558 | 15.478 | 15.755 | 15.656 |
| $B_2O_3$ | 5.794 | 5.826 | 5.882 | 5.946 | 5.984 | 5.879 | 5.985 | 5.914 | 5.887 |
| $P_2O_5$ | 0.000 | 0.000 | 0.000 | 0.000 | 0.000 | 0.000 | 0.000 | 0.000 | 0.000 |
| $Li_2O$ | 8.957 | 9.890 | 10.033 | 10.946 | 10.972 | 11.048 | 10.969 | 11.170 | 11.146 |
| $Na_2O$ | 4.264 | 4.299 | 4.326 | 6.323 | 5.323 | 5.337 | 5.379 | 5.421 | 5.382 |
| $K_2O$ | 0.200 | 0.193 | 0.194 | 0.191 | 0.196 | 0.193 | 0.196 | 0.194 | 0.194 |
| MgO | 2.941 | 2.862 | 3.102 | 0.016 | 0.011 | 0.018 | 0.016 | 0.018 | 0.014 |
| CaO | 0.014 | 0.015 | 0.016 | 0.007 | 0.007 | 0.006 | 0.008 | 0.006 | 0.006 |
| ZnO | 1.990 | 1.011 | 1.074 | 0.000 | 0.000 | 0.000 | 0.000 | 0.000 | 0.000 |
| $TiO_2$ | 0.007 | 0.007 | 0.008 | 0.007 | 0.006 | 0.006 | 0.006 | 0.006 | 0.008 |
| $ZrO_2$ | 0.000 | 0.000 | 0.316 | 0.001 | 0.000 | 0.001 | 0.001 | 0.001 | 0.320 |
| $SnO_2$ | 0.051 | 0.057 | 0.052 | 0.109 | 0.110 | 0.108 | 0.056 | 0.055 | 0.054 |
| $Fe_2O_3$ | 0.048 | 0.004 | 0.068 | 0.003 | 0.004 | 0.003 | 0.004 | 0.069 | 0.069 |
| NiO | 0.000 | 0.000 | 0.000 | 0.000 | 0.000 | 0.000 | 0.000 | 0.000 | 0.000 |
| $Co_3O_4$ | 0.000 | 0.000 | 0.000 | 0.000 | 0.000 | 0.000 | 0.000 | 0.000 | 0.000 |
| $HfO_2$ | 0.000 | 0.000 | 0.000 | 0.000 | 0.000 | 0.000 | 0.000 | 0.000 | 0.003 |
| $MnO_2$ | 0.000 | 0.000 | 0.000 | 0.000 | 0.000 | 0.000 | 0.000 | 0.000 | 0.000 |
| $As_2O_3$ | 0.001 | 0.001 | 0.001 | 0.000 | 0.001 | 0.001 | 0.001 | 0.000 | 0.001 |
| Au | 0.000488 | 0.000357 | 0.000000 | 0.001297 | 0.000261 | 0.001960 | 0.000000 | 0.000327 | 0.000655 |
| $SO_3$ | 0.000 | 0.009 | 0.000 | 0.000 | 0.000 | 0.002 | 0.000 | 0.007 | 0.003 |
| Cl | 0.312 | 0.020 | 0.025 | 0.025 | 0.022 | 0.025 | 0.022 | 0.022 | 0.020 |

TABLE 28C

| Ex. (mol %) | SPR-19 | SPR-20 | SPR-21 | SPR-22 |
|---|---|---|---|---|
| $SiO_2$ | 60.872 | 60.616 | 62.173 | 61.281 |
| $Al_2O_3$ | 16.544 | 16.474 | 14.974 | 14.343 |
| $B_2O_3$ | 5.853 | 5.964 | 5.722 | 5.820 |
| $P_2O_5$ | 0.000 | 0.000 | 0.000 | 0.018 |
| $Li_2O$ | 11.078 | 10.927 | 9.237 | 6.759 |
| $Na_2O$ | 5.336 | 5.358 | 2.332 | 7.465 |
| $K_2O$ | 0.193 | 0.195 | 0.182 | 0.589 |
| MgO | 0.019 | 0.016 | 2.433 | 2.027 |
| CaO | 0.007 | 0.008 | 1.555 | 0.542 |
| ZnO | 0.000 | 0.000 | 0.976 | 0.973 |
| $TiO_2$ | 0.007 | 0.007 | 0.010 | 0.006 |
| $ZrO_2$ | 0.001 | 0.309 | 0.302 | 0.000 |
| $SnO_2$ | 0.055 | 0.054 | 0.042 | 0.104 |
| $Fe_2O_3$ | 0.003 | 0.047 | 0.043 | 0.044 |
| NiO | 0.000 | 0.000 | 0.000 | 0.000 |
| $Co_3O_4$ | 0.000 | 0.000 | 0.000 | 0.000 |
| $HfO_2$ | 0.000 | 0.000 | 0.000 | 0.000 |
| $MnO_2$ | 0.000 | 0.000 | 0.000 | 0.000 |

TABLE 28C-continued

| Ex. (mol %) | SPR-19 | SPR-20 | SPR-21 | SPR-22 |
|---|---|---|---|---|
| $As_2O_3$ | 0.000 | 0.001 | 0.000 | 0.000 |
| Au | 0.000987 | 0.000157 | 0.000563 | 0.002166 |
| $SO_3$ | 0.006 | 0.002 | 0.006 | 0.005 |
| Cl | 0.024 | 0.022 | 0.011 | 0.020 |

Referring now to Table 29, colored glass articles in the form of glass coupons were produced from the glass compositions of Tables 28A-28C. The glass coupons had the indicated thicknesses and were heat treated at various times and temperatures (as indicated) to produce colored glass articles with different color hues. The CIELAB L*, a*, and b* coordinates of each colored glass article were determined. The average transmittance (%) for each sample over the wavelength range from 380 nm to 750 nm was also determined. The results are reported in Table 29.

TABLE 29

| Example | Thickness (mm) | Temp (° C.) | Time (Hr.) | L* | a* | b* | Average transmittance (380 nm-750 nm) |
|---|---|---|---|---|---|---|---|
| SPR-1 | 1.32 | 620 | 10 | 80.8 | 15 | 10.88 | 62.083 |
| SPR-2 | 1.31 | 632 | 0.25 | 69.7 | 1.33 | −15.5 | 53.986 |
| SPR-2 | 1.35 | 545 | 2 | 88 | 8.84 | −1.45 | 77.737 |

TABLE 29-continued

| Example | Thickness (mm) | Temp (° C.) | Time (Hr.) | L* | a* | b* | Average transmittance (380 nm-750 nm) |
|---|---|---|---|---|---|---|---|
| SPR-2 | 1.36 | 553 | 1.5 | 88.9 | 7.79 | −1.3 | 79.081 |
| SPR-2 | 1.36 | 630 | 6 | 77.1 | 19.7 | 2.28 | 61.052 |
| SPR-2 | 1.42 | 603 | 1.5 | 69.1 | 9.07 | −12.3 | 54.353 |
| SPR-2 | 1.39 | 632 | 0.5 | 69.7 | 6.74 | −12.2 | 54.045 |
| SPR-2 | 1.29 | 705 | 0.25 | 73.7 | 20 | −5.76 | 60.047 |
| SPR-2 | 1.35 | 655 | 1.5 | 75.2 | 20.5 | −1.62 | 60.186 |
| SPR-2 | 1.38 | 630 | 6 | 76.9 | 20.1 | 2.43 | 60.776 |
| SPR-2 | 1.34 | 545 | 1 | 88.3 | 8.75 | −1.28 | 78.270 |
| SPR-2 | 1.36 | 553 | 2 | 89.2 | 7.76 | −1.14 | 79.523 |
| SPR-2 | 1.36 | 630 | 1.5 | 77.2 | 20 | 2.26 | 61.288 |
| SPR-2 | 1.4 | 632 | 6 | 69.5 | 7.02 | −12.4 | 54.092 |
| SPR-2 | 1.43 | 603 | 0.5 | 69 | 9.22 | −12.6 | 54.475 |
| SPR-2 | 1.32 | 632 | 0.25 | 69.4 | 1.26 | −15.9 | 53.842 |
| SPR-2 | 1.29 | 705 | 0.25 | 73.9 | 20 | −5.92 | 60.530 |
| SPR-2 | 1.35 | 655 | 1.5 | 75.2 | 20.6 | 1.95 | 60.438 |
| SPR-2 | 1.37 | 630 | 6 | 77 | 20.2 | 2.07 | 61.092 |
| SPR-2 | 1.29 | 560 | 0.25 | 91.9 | 4.36 | −0.78 | 83.484 |
| SPR-2 | 1.29 | 580 | 0.25 | 92 | 4.2 | −0.87 | 83.677 |
| SPR-2 | 1.22 | 600 | 0.25 | 76.4 | 8.13 | −12.5 | 65.670 |
| SPR-2 | 1.22 | 560 | 0.50 | 91.4 | 5 | −0.94 | 82.705 |
| SPR-2 | 1.21 | 580 | 0.50 | 75.5 | 11.5 | −12.3 | 64.875 |
| SPR-2 | 1.2 | 600 | 0.50 | 70.9 | 2.8 | −15.7 | 57.149 |
| SPR-2 | 1.26 | 560 | 0.75 | 87.3 | 9 | −2.33 | 77.093 |
| SPR-2 | 1.28 | 580 | 0.75 | 70.3 | 10.9 | −14.8 | 58.437 |
| SPR-2 | 1.3 | 600 | 0.75 | 70.3 | 4.83 | −13.4 | 55.255 |
| SPR-2 | 1.27 | 560 | 2 | 75.2 | 15.9 | 4.84 | 61.011 |
| SPR-2 | 1.47 | 620 | 0.25 | 66.7 | −1.17 | −19 | 51.231 |
| SPR-2 | 1.45 | 630 | 0.25 | 66.6 | −1.27 | −18.7 | 50.691 |
| SPR-2 | 1.45 | 640 | 0.25 | 66.3 | −0.3 | −18.2 | 50.110 |
| SPR-2 | 1.48 | 650 | 0.25 | 66.3 | 1.82 | 16.9 | 49.961 |
| SPR-2 | 1.48 | 660 | 0.25 | 67.4 | 4.84 | −14.3 | 51.179 |
| SPR-2 | 1.49 | 670 | 0.25 | 67.9 | 6.81 | −13 | 51.865 |
| SPR-2 | 1.33 | 680 | 0.25 | 70.7 | 8.42 | −11.5 | 55.644 |
| SPR-2 | 1.3 | 690 | 0.25 | 72.3 | 13.3 | −9.69 | 58.346 |
| SPR-2 | 1.3 | 700 | 0.25 | 72.7 | 14.9 | −8.33 | 58.842 |
| SPR-2 | 1.32 | 710 | 0.25 | 74.9 | 18 | −3.59 | 60.103 |
| SPR-2 | 1.29 | 620 | 0.50 | 70.7 | 4.6 | 12.7 | 55.193 |
| SPR-2 | 1.31 | 640 | 0.50 | 70.7 | 10.4 | −11.8 | 56.589 |
| SPR-2 | 0.9 | 660 | 0.50 | 81.5 | 13.6 | −2.27 | 68.459 |
| SPR-2 | 0.87 | 680 | 0.50 | 83 | 14.2 | 0 | 69.595 |
| SPR-2 | 0.86 | 700 | 0.50 | 83.3 | 13.9 | 0.36 | 69.916 |
| SPR-2 | 0.81 | 620 | 0.75 | 79.8 | 5.56 | −7.92 | 67.047 |
| SPR-2 | 0.69 | 640 | 0.75 | 83.7 | 9.69 | −3.81 | 72.165 |
| SPR-2 | 0.72 | 660 | 0.75 | 85.4 | 11.4 | −0.42 | 73.325 |
| SPR-2 | 1.28 | 680 | 0.75 | 78.3 | 17.9 | 0.24 | 62.902 |
| SPR-2 | 1.29 | 700 | 0.75 | 78.4 | 17.6 | 0.44 | 62.728 |
| SPR-2 | 1.29 | 620 | 2.00 | 75.3 | 17.7 | −3.72 | 60.833 |
| SPR-2 | 1.42 | 580 | 2 | 89.9 | 5.08 | 1.36 | 80.246 |
| SPR-2 | 1.3 | 600 | 2 | 70.6 | 11.1 | −12 | 56.982 |
| SPR-2 | 1.34 | 640 | 2 | 76.3 | 20.2 | 0.48 | 60.676 |
| SPR-2 | 1.35 | 660 | 2 | 76.6 | 19.3 | 0.15 | 60.827 |
| SPR-2 | 1.18 | 680 | 2 | 79.4 | 17.7 | 1.36 | 64.066 |
| SPR-2 | 1.35 | 550 | 1 | 85.4 | 11.2 | 2.58 | 74.328 |
| SPR-2 | 1.34 | 550 | 1.25 | 80 | 16.2 | 4.65 | 67.893 |
| SPR-2 | 1.27 | 540 | 1.25 | 92.1 | 4.47 | −0.39 | 83.614 |
| SPR-2 | 1.27 | 710 | 2.5 | 78.8 | 19.2 | 3.29 | 62.662 |
| SPR-2 | 1.34 | 625 | 1.25 | 72.1 | 15.3 | 8.48 | 58.196 |
| SPR-2 | 1.39 | 540 | 1.5 | 87 | 9.82 | −1.71 | 76.314 |
| SPR-2 | 1.35 | 590 | 0.917 | 70.8 | 8.23 | −10.7 | 55.681 |
| SPR-2 | 1.34 | 555 | 1 | 92.7 | 4.09 | 0.34 | 84.664 |
| SPR-2 | 1.335 | 635 | 1 | 70 | 11.7 | −12.7 | 56.278 |
| SPR-2 | 1.365 | 595 | 1 | 70.9 | 9.62 | −10.6 | 56.159 |
| SPR-2 | 1.279 | 615 | 1 | 70.9 | 6.71 | −12.2 | 55.936 |
| SPR-2 | 1.331 | 580 | 0.5 | 68.7 | 3.09 | −17.4 | 55.139 |
| SPR-2 | 0.641 | 525 | 2 | 94.3 | 2.41 | −0.16 | 87.417 |
| SPR-2 | 2.077 | 525 | 2 | 89 | 7.39 | 0.62 | 78.548 |
| SPR-2 | 0.64 | 545 | 2 | 94.5 | 2.23 | −0.11 | 87.779 |
| SPR-2 | 2.06 | 545 | 2 | 89.7 | 6.76 | −0.51 | 79.648 |
| SPR-3 | 1.3 | 630 | 6 | 77.6 | 18.6 | 1.33 | 61.990 |
| SPR-3 | 1.31 | 575 | 1 | 74 | 16.2 | −7.99 | 61.103 |
| SPR-3 | 1.29 | 632 | 0.5 | 72.7 | 7.67 | −9.49 | 57.240 |
| SPR-3 | 1.25 | 603 | 1.5 | 73.2 | 8.79 | −9.7 | 58.809 |
| SPR-3 | 1.26 | 655 | 1.5 | 77.1 | 18.5 | −0.67 | 62.079 |
| SPR-3 | 1.37 | 575 | 1 | 73.3 | 17.7 | −8.38 | 60.550 |
| SPR-3 | 1.33 | 635 | 1 | 72.5 | 13.9 | −8.58 | 58.373 |
| SPR-3 | 1.37 | 615 | 1 | 70.7 | 8.26 | −11.1 | 55.575 |

TABLE 29-continued

| Example | Thickness (mm) | Temp (° C.) | Time (Hr.) | L* | a* | b* | Average transmittance (380 nm-750 nm) |
|---|---|---|---|---|---|---|---|
| SPR-3 | 1.34 | 595 | 1 | 72.6 | 9.35 | −8.15 | 57.204 |
| SPR-3 | 1.27 | 555 | 1 | 93.2 | 3.16 | −0.23 | 85.431 |
| SPR-3 | 1.367 | 575 | 1 | 73 | 17.5 | −8.56 | 60.095 |
| SPR-3 | 1.33 | 635 | 1 | 72.7 | 14.9 | −7.76 | 58.572 |
| SPR-3 | 1.336 | 595 | 1 | 72.6 | 9.13 | −8.28 | 57.195 |
| SPR-3 | 1.242 | 603 | 1.5 | 73.1 | 8.86 | −9.73 | 58.626 |
| SPR-3 | 1.293 | 632 | 0.5 | 72.7 | 7.74 | −9.49 | 57.192 |
| SPR-3 | 1.356 | 615 | 1 | 70.8 | 8.14 | −11.1 | 55.630 |
| SPR-3 | 0.565 | 632 | 0.5 | 85.6 | 4.05 | −4.57 | 74.432 |
| SPR-3 | 1.512 | 632 | 0.5 | 69.3 | 8.38 | −10.7 | 53.145 |
| SPR-4 | 1.33 | 580 | 0.25 | 91.1 | 4.08 | −1.11 | 82.311 |
| SPR-4 | 1.34 | 600 | 0.25 | 73.9 | 9.69 | −11.7 | 61.448 |
| SPR-4 | 1.32 | 560 | 0.50 | 91.9 | 3.7 | 0.66 | 83.379 |
| SPR-4 | 1.34 | 580 | 0.50 | 73.1 | 12.9 | −10.7 | 60.597 |
| SPR-4 | 1.23 | 600 | 0.50 | 73.6 | 3.67 | −11.4 | 58.393 |
| SPR-4 | 1.23 | 560 | 0.75 | 88.4 | 6.93 | −1.86 | 78.551 |
| SPR-4 | 1.24 | 580 | 0.75 | 74.3 | 9.95 | −8.94 | 60.566 |
| SPR-4 | 1.23 | 600 | 0.75 | 74.4 | 5.31 | −8.99 | 58.880 |
| SPR-4 | 1.3 | 560 | 2.00 | 77.7 | 13.3 | −0.84 | 62.143 |
| SPR-4 | 1.3 | 580 | 2.00 | 74.4 | 10.8 | −6.76 | 59.556 |
| SPR-4 | 1.32 | 600 | 2.00 | 74.7 | 13.4 | −5.8 | 60.238 |
| SPR-4 | 1.28 | 560 | 0.25 | 72.4 | 10.6 | −9.29 | 57.846 |
| SPR-4 | 1.28 | 620 | 2 | 78.8 | 17.2 | 1.61 | 63.224 |
| SPR-4 | 1.32 | 640 | 2 | 78.8 | 17.6 | 4.07 | 62.054 |
| SPR-4 | 1.32 | 660 | 2 | 78.7 | 17.7 | 3.8 | 62.119 |
| SPR-4 | 1.2 | 680 | 2 | 80.6 | 16.3 | 4.42 | 64.227 |
| SPR-4 | 1.342 | 660 | 6 | 76.9 | 18.6 | 1.38 | 60.789 |
| SPR-4 | 1.389 | 600 | 1 | 72.8 | 9.91 | −6.88 | 56.945 |
| SPR-4 | 1.285 | 600 | 10 | 79.1 | 17.3 | 3.94 | 62.620 |
| SPR-4 | 1.289 | 620 | 10 | 78.7 | 17.7 | 3.31 | 62.257 |
| SPR-4 | 1.295 | 640 | 10 | 78.3 | 17.9 | 2.64 | 62.079 |
| SPR-4 | 1.308 | 660 | 2 | 77.6 | 18.3 | 1.83 | 61.500 |
| SPR-4 | 0.528 | 710 | 2.5 | 89.7 | 7.57 | 2.52 | 78.250 |
| SPR-4 | 2.043 | 710 | 2.5 | 73.1 | 22.9 | 9.92 | 53.254 |
| SPR-5 | 1.348 | 660 | 6 | 83.1 | 9.17 | 10.21 | 64.324 |
| SPR-5 | 1.32 | 600 | 10 | 82.4 | 9.71 | 9.07 | 63.785 |
| SPR-5 | 1.293 | 620 | 10 | 82.8 | 9.49 | 8.88 | 64.444 |
| SPR-5 | 1.35 | 640 | 10 | 82.6 | 9.48 | 9.53 | 63.931 |
| SPR-5 | 1.315 | 660 | 2 | 82.8 | 9.65 | 9.27 | 64.280 |
| SPR-6 | 1.31 | 600 | 1 | 64.6 | 24.8 | −4.62 | 48.155 |
| SPR-7 | 1.36 | 600 | 1 | 64.1 | 23.1 | 23.31 | 44.240 |
| SPR-8 | 1.27 | 600 | 1 | 69.2 | 13.3 | 34.5 | 45.285 |
| SPR-9 | 1.33 | 600 | 1 | 87.3 | 10.2 | −3.02 | 77.166 |
| SPR-10 | 1.303 | 600 | 1 | 88.1 | 6.56 | −4.17 | 78.834 |
| SPR-11 | 1.302 | 625 | 2 | 81.4 | 15.7 | 6.6 | 65.169 |
| SPR-12 | 1.307 | 600 | 2 | 84.2 | 12.7 | 1.32 | 69.833 |
| SPR-13 | 1.306 | 625 | 2 | 89.3 | 5.14 | 9.97 | 74.122 |
| SPR-14 | 1.291 | 575 | 2 | 87.4 | 9.35 | 8.2 | 72.514 |
| SPR-14 | 1.321 | 625 | 2 | 87.6 | 7.22 | 10.51 | 71.412 |
| SPR-14 | 0.502 | 625 | 2 | 92.7 | 3.39 | 4.56 | 82.163 |
| SPR-14 | 1.304 | 625 | 2 | 85.3 | 9.75 | 11.19 | 67.746 |
| SPR-14 | 2.015 | 625 | 2 | 82.9 | 10.7 | 15.3 | 62.880 |
| SPR-14 | 0.612 | 625 | 2 | 92.1 | 3.93 | 12.8 | 78.141 |
| SPR-14 | 2.063 | 625 | 2 | 85.8 | 8.06 | 34.2 | 62.357 |
| SPR-15 | 1.298 | 625 | 2 | 83 | 11.4 | 2.59 | 68.255 |
| SPR-16 | 1.327 | 625 | 2 | 86.7 | 9.76 | 2.6 | 73.863 |
| SPR-16 | 0.6 | 625 | 2 | 90 | 6.98 | 1.73 | 79.393 |
| SPR-16 | 1.97 | 625 | 2 | 79.4 | 13.9 | 1.64 | 63.678 |
| SPR-16 | 0.62 | 625 | 2 | 90.3 | 6.77 | 1.82 | 79.780 |
| SPR-16 | 2.039 | 625 | 2 | 80.4 | 15.3 | 3.72 | 64.446 |
| SPR-16 | 0.623 | 625 | 2 | 91.5 | 6.22 | 7.06 | 79.380 |
| SPR-16 | 2.089 | 625 | 2 | 81.6 | 17.2 | 20.79 | 60.538 |
| SPR-17 | 1.325 | 625 | 2 | 88.9 | 6.92 | 4.75 | 75.258 |
| SPR-18 | 1.318 | 625 | 2 | 87.3 | 9.09 | 3.44 | 73.391 |
| SPR-19 | 1.308 | 625 | 2 | 78 | 5.04 | −9.39 | 63.809 |
| SPR-20 | 1.332 | 625 | 2 | 80.5 | 6.25 | −8.92 | 68.187 |
| SPR-20 | 0.632 | 625 | 2 | 87.7 | 2.61 | −5.06 | 77.726 |
| SPR-20 | 1.353 | 625 | 2 | 79 | 5.44 | −9.99 | 65.901 |
| SPR-20 | 0.632 | 625 | 2 | 69 | 8.35 | −14.9 | 53.661 |
| SPR-20 | 0.622 | 625 | 2 | 88.1 | 1.98 | −5.62 | 78.812 |
| SPR-20 | 2.058 | 625 | 2 | 68 | 6.29 | −18 | 53.414 |
| SPR-14 | 1.291 | 575 | 2 | 87.4 | 9.35 | 8.2 | 72.514 |
| SPR-14 | 1.321 | 625 | 2 | 87.6 | 7.22 | 10.51 | 71.412 |
| SPR-14 | 0.502 | 625 | 2 | 92.7 | 3.39 | 4.56 | 82.163 |
| SPR-14 | 1.304 | 625 | 2 | 85.3 | 9.75 | 11.19 | 67.746 |
| SPR-14 | 2.015 | 625 | 2 | 82.9 | 10.7 | 15.3 | 62.880 |

TABLE 29-continued

| Example | Thickness (mm) | Temp (° C.) | Time (Hr.) | L* | a* | b* | Average transmittance (380 nm-750 nm) |
|---|---|---|---|---|---|---|---|
| SPR-14 | 0.612 | 625 | 2 | 92.1 | 3.93 | 12.8 | 78.141 |
| SPR-14 | 2.063 | 625 | 2 | 85.8 | 8.06 | 34.2 | 62.357 |
| SPR-14 | 1.291 | 575 | 2 | 87.4 | 9.35 | 8.2 | 72.514 |
| SPR-14 | 1.321 | 625 | 2 | 87.6 | 7.22 | 10.51 | 71.412 |
| SPR-14 | 0.502 | 625 | 2 | 92.7 | 3.39 | 4.56 | 82.163 |
| SPR-14 | 1.304 | 625 | 2 | 85.3 | 9.75 | 11.19 | 67.746 |
| SPR-14 | 2.015 | 625 | 2 | 82.9 | 10.7 | 15.3 | 62.880 |
| SPR-14 | 0.612 | 625 | 2 | 92.1 | 3.93 | 12.8 | 78.141 |
| SPR-14 | 2.063 | 625 | 2 | 85.8 | 8.06 | 34.2 | 62.357 |
| SPR-16 | 1.327 | 625 | 2 | 86.7 | 9.76 | 2.6 | 73.863 |
| SPR-16 | 0.6 | 625 | 2 | 90 | 6.98 | 1.73 | 79.393 |
| SPR-16 | 1.97 | 625 | 2 | 79.4 | 13.9 | 1.64 | 63.678 |
| SPR-16 | 0.62 | 625 | 2 | 90.3 | 6.77 | 1.82 | 79.780 |
| SPR-16 | 2.039 | 625 | 2 | 80.4 | 15.3 | 3.72 | 64.446 |
| SPR-16 | 0.623 | 625 | 2 | 91.5 | 6.22 | 7.06 | 79.380 |
| SPR-16 | 2.089 | 625 | 2 | 81.6 | 17.2 | 20.79 | 60.538 |
| SPR-20 | 1.332 | 625 | 2 | 80.5 | 6.25 | −8.92 | 68.187 |
| SPR-20 | 0.632 | 625 | 2 | 87.7 | 2.61 | −5.06 | 77.726 |
| SPR-20 | 1.353 | 625 | 2 | 79 | 5.44 | −9.99 | 65.901 |
| SPR-20 | 0.632 | 625 | 2 | 69 | 8.35 | −14.9 | 53.661 |
| SPR-20 | 0.622 | 625 | 2 | 88.1 | 1.98 | −5.62 | 78.812 |
| SPR-20 | 2.058 | 625 | 2 | 68 | 6.29 | −18 | 53.414 |
| SPR-16 | 1.327 | 625 | 2 | 86.7 | 9.76 | 2.6 | 73.863 |
| SPR-16 | 0.6 | 625 | 2 | 90 | 6.98 | 1.73 | 79.393 |
| SPR-16 | 1.97 | 625 | 2 | 79.4 | 13.9 | 1.64 | 63.678 |
| SPR-16 | 0.62 | 625 | 2 | 90.3 | 6.77 | 1.82 | 79.780 |
| SPR-16 | 2.039 | 625 | 2 | 80.4 | 15.3 | 3.72 | 64.446 |
| SPR-16 | 0.623 | 625 | 2 | 91.5 | 6.22 | 7.06 | 79.380 |
| SPR-16 | 2.089 | 625 | 2 | 81.6 | 17.2 | 20.79 | 60.538 |
| SPR-20 | 1.332 | 625 | 2 | 80.5 | 6.25 | −8.92 | 68.187 |
| SPR-20 | 0.632 | 625 | 2 | 87.7 | 2.61 | −5.06 | 77.726 |
| SPR-20 | 1.353 | 625 | 2 | 79 | 5.44 | −9.99 | 65.901 |
| SPR-20 | 0.632 | 625 | 2 | 69 | 8.35 | −14.9 | 53.661 |
| SPR-20 | 0.622 | 625 | 2 | 88.1 | 1.98 | −5.62 | 78.812 |
| SPR-20 | 2.058 | 625 | 2 | 68 | 6.29 | −18 | 53.414 |
| SPR-21 | 1.381 | 620 | 8 | 84.2 | −3.45 | −7.17 | 70.463 |
| SPR-22 | 3.069 | 640 | 8 | 72.6 | 16.9 | 68.63 | 40.945 |
| SPR-22 | 3.085 | 660 | 8 | 71.9 | 17.5 | 66.16 | 40.588 |
| SPR-22 | 3.1 | 680 | 8 | 71 | 17.9 | 65.27 | 39.780 |
| SPR-22 | 3.15 | 700 | 8 | 72.3 | 17.5 | 64.89 | 41.003 |
| SPR-22 | 3.4 | 620 | 2 | 72 | 18.4 | 67.51 | 40.834 |
| SPR-22 | 3.07 | 640 | 2 | 71 | 18.5 | 66.03 | 40.098 |

Tables 30A-30NN show example glass compositions (in terms of mol %) containing transition metal oxides and/or rare earth oxides as colorants.

TABLE 30A

| Ex. (mol %) | ORA-1 | ORA-2 | ORA-3 | ORA-4 | ORA-5 | ORA-6 | ORA-6 | ORA-7 | ORA-8 |
|---|---|---|---|---|---|---|---|---|---|
| $SiO_2$ | 60.93 | 61.53 | 58.99 | 57.22 | 57.78 | 58.75 | 58.75 | 59.03 | 58.53 |
| $Al_2O_3$ | 16.20 | 15.91 | 16.99 | 18.71 | 17.54 | 16.67 | 16.67 | 16.52 | 16.50 |
| $B_2O_3$ | 5.66 | 5.59 | 6.15 | 5.68 | 5.96 | 5.92 | 5.92 | 5.86 | 5.58 |
| $P_2O_5$ | 0.00 | 0.00 | 0.00 | 0.00 | 0.00 | 0.00 | 0.00 | 0.00 | 0.00 |
| $Li_2O$ | 10.49 | 10.61 | 11.02 | 10.75 | 10.92 | 11.78 | 11.78 | 11.65 | 11.55 |
| $Na_2O$ | 1.67 | 1.68 | 1.74 | 1.71 | 1.68 | 6.26 | 6.26 | 6.22 | 6.17 |
| $K_2O$ | 0.30 | 0.30 | 0.30 | 0.29 | 0.29 | 0.48 | 0.48 | 0.48 | 0.47 |
| MgO | 3.78 | 3.65 | 3.98 | 4.67 | 4.31 | 0.02 | 0.02 | 0.02 | 0.02 |
| CaO | 0.52 | 0.50 | 0.55 | 0.61 | 0.57 | 0.01 | 0.01 | 0.01 | 0.01 |
| ZnO | 0.00 | 0.00 | 0.00 | 0.00 | 0.00 | 0.00 | 0.00 | 0.01 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.005 | 0.005 | 0.005 | 0.006 | 0.005 | 0.004 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.127 | 0.042 | 0.153 | 0.243 | 0.206 | 0.000 | 0.000 | 0.177 | 0.000 |
| $Co_3O_4$ | 0.055 | 0.068 | 0.025 | 0.049 | 0.001 | 0.000 | 0.000 | 0.001 | 0.001 |
| $Cr_2O_3$ | 0.000 | 0.000 | 0.000 | 0.000 | 0.000 | 0.098 | 0.098 | 0.000 | 0.000 |
| CuO | 0.247 | 0.104 | 0.088 | 0.034 | 0.724 | 0.000 | 0.000 | 0.000 | 1.151 |
| $HfO_2$ | 0.000 | 0.000 | 0.000 | 0.000 | 0.000 | 0.000 | 0.000 | 0.000 | 0.000 |

TABLE 30A-continued

| Ex. (mol %) | ORA-1 | ORA-2 | ORA-3 | ORA-4 | ORA-5 | ORA-6 | ORA-6 | ORA-7 | ORA-8 |
|---|---|---|---|---|---|---|---|---|---|
| $MnO_2$ | 0.000 | 0.000 | 0.000 | 0.000 | 0.000 | 0.000 | 0.000 | 0.000 | 0.000 |
| $As_2O_3$ | 0.001 | 0.000 | 0.001 | 0.001 | 0.001 | 0.001 | 0.001 | 0.001 | 0.001 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.002 | 0.002 | 0.000 | 0.000 | 0.002 | 0.000 |
| Cl | 0.007 | 0.007 | 0.009 | 0.007 | 0.007 | 0.011 | 0.011 | 0.011 | 0.011 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30B

| Ex (mol %) | ORA-9 | ORA-10 | ORA-11 | ORA-11 | ORA-12 | ORA-14 | ORA-15 | ORA-16 |
|---|---|---|---|---|---|---|---|---|
| $SiO_2$ | 58.95 | 60.10 | 57.65 | 57.65 | 56.77 | 58.04 | 59.63 | 57.80 |
| $Al_2O_3$ | 16.55 | 15.85 | 16.16 | 16.16 | 16.65 | 17.65 | 16.71 | 17.65 |
| $B_2O_3$ | 5.97 | 5.74 | 5.95 | 5.95 | 5.90 | 6.20 | 6.16 | 5.87 |
| $P_2O_5$ | 0.00 | 0.00 | 0.00 | 0.00 | 0.00 | 0.00 | 0.00 | 0.00 |
| $Li_2O$ | 11.70 | 9.81 | 11.61 | 11.61 | 9.84 | 11.04 | 10.94 | 10.85 |
| $Na_2O$ | 6.22 | 4.23 | 6.10 | 6.10 | 4.24 | 1.68 | 1.67 | 1.69 |
| $K_2O$ | 0.48 | 0.47 | 0.47 | 0.47 | 0.48 | 0.29 | 0.29 | 0.29 |
| MgO | 0.02 | 2.69 | 0.02 | 0.02 | 2.98 | 4.34 | 3.95 | 4.35 |
| CaO | 0.01 | 0.02 | 0.01 | 0.01 | 0.02 | 0.57 | 0.54 | 0.58 |
| ZnO | 0.02 | 0.96 | 0.00 | 0.00 | 1.04 | 0.00 | 0.00 | 0.00 |
| $TiO_2$ | 0.01 | 0.01 | 1.91 | 1.91 | 1.95 | 0.01 | 0.01 | 0.01 |
| $ZrO_2$ | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 |
| $Fe_2O_3$ | 0.004 | 0.005 | 0.004 | 0.004 | 0.004 | 0.006 | 0.005 | 0.005 |
| $CeO_2$ | 0.000 | 0.000 | 0.100 | 0.100 | 0.102 | 0.000 | 0.000 | 0.000 |
| NiO | 0.000 | 0.000 | 0.000 | 0.000 | 0.000 | 0.000 | 0.058 | 0.048 |
| $Co_3O_4$ | 0.046 | 0.001 | 0.001 | 0.001 | 0.001 | 0.001 | 0.011 | 0.013 |
| $Cr_2O_3$ | 0.000 | 0.098 | 0.000 | 0.000 | 0.000 | 0.000 | 0.000 | 0.000 |
| CuO | 0.000 | 0.010 | 0.000 | 0.000 | 0.000 | 0.155 | 0.020 | 0.845 |
| $HfO_2$ | 0.000 | 0.000 | 0.000 | 0.000 | 0.000 | 0.000 | 0.000 | 0.000 |
| $MnO_2$ | 0.000 | 0.000 | 0.000 | 0.000 | 0.000 | 0.000 | 0.000 | 0.000 |
| $As_2O_3$ | 0.001 | 0.001 | 0.001 | 0.001 | 0.000 | 0.001 | 0.001 | 0.000 |
| $Sb_2O_3$ | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 |
| $SO_3$ | 0.000 | 0.000 | 0.000 | 0.000 | 0.015 | 0.009 | 0.002 | 0.000 |
| Cl | 0.011 | 0.007 | 0.011 | 0.011 | 0.011 | 0.007 | 0.007 | 0.007 |
| F | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 |

TABLE 30C

| Ex. (mol %) | ORA-17 | ORA-18 | ORA-21 | ORA-22 | ORA-23 | ORA-24 | ORA-25 |
|---|---|---|---|---|---|---|---|
| $SiO_2$ | 56.37 | 58.62 | 58.27 | 58.49 | 58.94 | 58.49 | 57.45 |
| $Al_2O_3$ | 18.99 | 17.25 | 16.34 | 16.49 | 16.40 | 16.55 | 18.22 |
| $B_2O_3$ | 6.02 | 5.97 | 5.92 | 6.01 | 5.98 | 6.04 | 5.91 |
| $P_2O_5$ | 0.00 | 0.00 | 0.00 | 0.00 | 0.00 | 0.00 | 0.00 |
| $Li_2O$ | 11.02 | 10.73 | 9.89 | 9.97 | 9.93 | 9.93 | 10.77 |
| $Na_2O$ | 1.69 | 1.68 | 4.25 | 4.26 | 4.26 | 4.30 | 1.69 |
| $K_2O$ | 0.28 | 0.29 | 0.48 | 0.48 | 0.49 | 0.49 | 0.29 |
| MgO | 4.81 | 4.17 | 2.91 | 2.95 | 2.90 | 2.93 | 4.45 |
| CaO | 0.61 | 0.59 | 0.01 | 0.01 | 0.01 | 0.02 | 0.60 |
| ZnO | 0.00 | 0.00 | 1.00 | 1.01 | 1.00 | 1.05 | 0.00 |
| $TiO_2$ | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $Fe_2O_3$ | 0.006 | 0.005 | 0.004 | 0.005 | 0.005 | 0.005 | 0.006 |
| $CeO_2$ | 0.000 | 0.000 | 0.000 | 0.000 | 0.000 | 0.000 | 0.000 |
| NiO | 0.141 | 0.108 | 0.000 | 0.023 | 0.012 | 0.089 | 0.053 |

TABLE 30C-continued

| Ex. (mol %) | ORA-17 | ORA-18 | ORA-21 | ORA-22 | ORA-23 | ORA-24 | ORA-25 |
|---|---|---|---|---|---|---|---|
| $CO_3O_4$ | 0.029 | 0.001 | 0.001 | 0.002 | 0.002 | 0.048 | 0.013 |
| $Cr_2O_3$ | 0.000 | 0.000 | 0.068 | 0.038 | 0.002 | 0.008 | 0.000 |
| CuO | 0.006 | 0.576 | 0.829 | 0.233 | 0.037 | 0.044 | 0.525 |
| $HfO_2$ | 0.000 | 0.000 | 0.000 | 0.000 | 0.000 | 0.000 | 0.000 |
| $MnO_2$ | 0.000 | 0.000 | 0.000 | 0.000 | 0.000 | 0.000 | 0.000 |
| $As_2O_3$ | 0.001 | 0.001 | 0.000 | 0.000 | 0.000 | 0.000 | 0.000 |
| $Sb_2O_3$ | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 |
| $SO_3$ | 0.000 | 0.000 | 0.001 | 0.006 | 0.003 | 0.000 | 0.000 |
| Cl | 0.007 | 0.009 | 0.011 | 0.011 | 0.011 | 0.009 | 0.005 |
| F | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 |

TABLE 30D

| Ex. (mol %) | ORA-26 | ORA-27 | ORA-28 | ORA-29 | ORA-30 | ORA-31 | ORA-32 | ORA-33 | ORA-34 |
|---|---|---|---|---|---|---|---|---|---|
| $SiO_2$ | 57.72 | 57.57 | 57.20 | 56.72 | 56.18 | 59.18 | 58.40 | 58.81 | 58.08 |
| $Al_2O_3$ | 17.62 | 17.48 | 17.51 | 17.36 | 17.14 | 16.63 | 16.20 | 16.54 | 16.54 |
| $B_2O_3$ | 6.01 | 5.97 | 5.91 | 5.90 | 5.81 | 5.62 | 5.70 | 5.76 | 6.07 |
| $P_2O_5$ | 0.00 | 0.00 | 0.00 | 0.00 | 0.00 | 0.00 | 0.00 | 0.00 | 0.00 |
| $Li_2O$ | 10.85 | 10.80 | 10.79 | 10.68 | 10.55 | 11.79 | 11.60 | 11.86 | 11.87 |
| $Na_2O$ | 1.67 | 1.67 | 1.67 | 1.68 | 1.65 | 6.18 | 6.09 | 6.17 | 6.20 |
| $K_2O$ | 0.29 | 0.29 | 0.29 | 0.28 | 0.28 | 0.46 | 0.47 | 0.47 | 0.48 |
| MgO | 4.25 | 4.22 | 4.23 | 4.19 | 4.15 | 0.02 | 0.02 | 0.02 | 0.02 |
| CaO | 0.58 | 0.58 | 0.58 | 0.58 | 0.56 | 0.01 | 0.01 | 0.01 | 0.01 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.00 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.006 | 0.006 | 0.006 | 0.006 | 0.006 | 0.004 | 0.003 | 0.004 | 0.004 |
| $CeO_2$ | 0.000 | 0.000 | 0.000 | 0.000 | 0.000 | 0.000 | 0.000 | 0.000 | 0.000 |
| NiO | 0.057 | 0.057 | 0.053 | 0.052 | 0.052 | 0.077 | 0.039 | 0.127 | 0.071 |
| $Co_3O_4$ | 0.012 | 0.012 | 0.012 | 0.011 | 0.012 | 0.001 | 0.001 | 0.032 | 0.002 |
| $Cr_2O_3$ | 0.000 | 0.000 | 0.000 | 0.000 | 0.000 | 0.009 | 0.101 | 0.000 | 0.051 |
| CuO | 0.905 | 1.330 | 1.735 | 2.536 | 3.586 | 0.002 | 1.350 | 0.176 | 0.563 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.000 | 0.000 | 0.005 | 0.004 | 0.006 | 0.004 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.005 | 0.004 | 0.006 | 0.000 | 0.000 | 0.001 | 0.011 | 0.000 | 0.000 |
| Cl | 0.005 | 0.005 | 0.004 | 0.005 | 0.004 | 0.009 | 0.009 | 0.013 | 0.015 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30E

| Ex. (mol %) | ORA-35 | ORA-36 | ORA-37 | ORA-38 | ORA-39 | ORA-40 | ORA-41 | ORA-42 | ORA-43 |
|---|---|---|---|---|---|---|---|---|---|
| $SiO_2$ | 59.17 | 58.32 | 58.74 | 57.99 | 57.84 | 58.16 | 58.35 | 58.45 | 58.41 |
| $Al_2O_3$ | 16.57 | 16.10 | 16.54 | 16.56 | 17.76 | 17.85 | 16.48 | 16.52 | 16.48 |
| $B_2O_3$ | 5.67 | 5.69 | 5.75 | 6.03 | 6.08 | 6.00 | 6.00 | 6.09 | 6.04 |
| $P_2O_5$ | 0.00 | 0.00 | 0.00 | 0.00 | 0.00 | 0.00 | 0.00 | 0.00 | 0.00 |
| $Li_2O$ | 11.86 | 11.64 | 11.91 | 11.97 | 11.03 | 10.89 | 10.06 | 10.12 | 10.07 |
| $Na_2O$ | 6.16 | 6.07 | 6.13 | 6.22 | 1.69 | 1.69 | 4.28 | 4.26 | 4.25 |
| $K_2O$ | 0.45 | 0.46 | 0.46 | 0.48 | 0.29 | 0.29 | 0.48 | 0.49 | 0.48 |
| MgO | 0.02 | 0.02 | 0.02 | 0.02 | 4.35 | 4.37 | 2.94 | 2.94 | 2.93 |
| CaO | 0.01 | 0.01 | 0.01 | 0.01 | 0.58 | 0.58 | 0.02 | 0.01 | 0.02 |
| ZnO | 0.00 | 0.00 | 0.00 | 0.00 | 0.00 | 0.00 | 1.01 | 1.01 | 1.01 |
| $TiO_2$ | 0.01 | 0.00 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |

TABLE 30E-continued

| Ex. (mol %) | ORA-35 | ORA-36 | ORA-37 | ORA-38 | ORA-39 | ORA-40 | ORA-41 | ORA-42 | ORA-43 |
|---|---|---|---|---|---|---|---|---|---|
| $SnO_2$ | 0.00 | 0.00 | 0.00 | 0.00 | 0.00 | 0.00 | 0.00 | 0.00 | 0.00 |
| $Fe_2O_3$ | 0.004 | 0.003 | 0.004 | 0.004 | 0.005 | 0.005 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.000 | 0.000 | 0.242 | 0.093 | 0.252 | 0.051 | 0.021 | 0.000 | 0.082 |
| $Co_3O_4$ | 0.002 | 0.038 | 0.068 | 0.072 | 0.053 | 0.001 | 0.002 | 0.002 | 0.048 |
| $Cr_2O_3$ | 0.002 | 0.051 | 0.000 | 0.012 | 0.001 | 0.001 | 0.036 | 0.001 | 0.006 |
| CuO | 0.086 | 1.582 | 0.092 | 0.515 | 0.022 | 0.066 | 0.278 | 0.091 | 0.137 |
| $HfO_2$ | 0.000 | 0.000 | 0.000 | 0.000 | 0.000 | 0.000 | 0.000 | 0.000 | 0.000 |
| $MnO_2$ | 0.006 | 0.005 | 0.004 | 0.007 | 0.006 | 0.005 | 0.004 | 0.005 | 0.004 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.003 | 0.000 | 0.010 | 0.012 | 0.002 | 0.005 | 0.014 |
| Cl | 0.009 | 0.007 | 0.013 | 0.015 | 0.009 | 0.009 | 0.013 | 0.013 | 0.013 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30F

| Ex. (mol %) | ORA-44 | ORA-45 | ORA-46 | ORA-47 | ORA-48 | ORA-49 | ORA-50 | ORA-51 | ORA-52 |
|---|---|---|---|---|---|---|---|---|---|
| $SiO_2$ | 58.30 | 58.71 | 58.54 | 58.67 | 58.47 | 58.47 | 58.61 | 58.63 | 57.36 |
| $Al_2O_3$ | 16.45 | 16.46 | 16.41 | 16.53 | 16.48 | 16.43 | 16.48 | 16.55 | 17.09 |
| $B_2O_3$ | 6.08 | 5.98 | 5.96 | 5.99 | 6.05 | 6.03 | 6.04 | 6.10 | 6.18 |
| $P_2O_5$ | 0.00 | 0.00 | 0.00 | 0.00 | 0.00 | 0.00 | 0.00 | 0.00 | 0.00 |
| $Li_2O$ | 10.10 | 10.05 | 10.53 | 10.51 | 10.50 | 10.52 | 10.53 | 9.94 | 10.16 |
| $Na_2O$ | 4.26 | 4.24 | 4.71 | 4.75 | 4.76 | 4.74 | 4.76 | 4.29 | 4.32 |
| $K_2O$ | 0.48 | 0.48 | 0.48 | 0.49 | 0.49 | 0.48 | 0.49 | 0.29 | 0.49 |
| MgO | 2.91 | 2.93 | 0.96 | 0.97 | 0.97 | 0.98 | 0.97 | 2.93 | 3.12 |
| CaO | 0.02 | 0.02 | 0.98 | 0.98 | 0.99 | 0.99 | 0.99 | 0.02 | 0.02 |
| ZnO | 1.00 | 1.01 | 0.99 | 1.02 | 1.01 | 1.01 | 1.01 | 1.02 | 1.08 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.005 | 0.005 | 0.005 | 0.005 | 0.005 | 0.004 | 0.004 |
| $CeO_2$ | 0.000 | 0.000 | 0.000 | 0.000 | 0.000 | 0.000 | 0.000 | 0.000 | 0.000 |
| NiO | 0.250 | 0.053 | 0.019 | 0.000 | 0.085 | 0.250 | 0.053 | 0.086 | 0.025 |
| $Co_3O_4$ | 0.053 | 0.001 | 0.002 | 0.002 | 0.048 | 0.053 | 0.001 | 0.049 | 0.010 |
| $Cr_2O_3$ | 0.001 | 0.000 | 0.039 | 0.001 | 0.005 | 0.000 | 0.000 | 0.005 | 0.001 |
| CuO | 0.058 | 0.036 | 0.339 | 0.054 | 0.111 | 0.010 | 0.036 | 0.060 | 0.103 |
| $HfO_2$ | 0.000 | 0.000 | 0.000 | 0.000 | 0.000 | 0.000 | 0.000 | 0.000 | 0.000 |
| $MnO_2$ | 0.006 | 0.005 | 0.005 | 0.004 | 0.006 | 0.005 | 0.004 | 0.003 | 0.000 |
| $As_2O_3$ | 0.000 | 0.001 | 0.001 | 0.001 | 0.001 | 0.001 | 0.001 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.001 | 0.002 | 0.006 | 0.002 | 0.007 | 0.000 | 0.009 | 0.000 | 0.005 |
| Cl | 0.013 | 0.011 | 0.011 | 0.015 | 0.013 | 0.013 | 0.013 | 0.013 | 0.013 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30G

| Ex. (mol %) | ORA-53 | ORA-54 | ORA-56 | ORA-57 | ORA-58 | ORA-59 | ORA-60 | ORA-61 | ORA-62 |
|---|---|---|---|---|---|---|---|---|---|
| $SiO_2$ | 57.87 | 58.57 | 58.46 | 58.81 | 57.89 | 59.54 | 59.30 | 54.94 | 61.12 |
| $Al_2O_3$ | 17.10 | 16.44 | 16.41 | 16.50 | 16.88 | 16.00 | 16.52 | 18.22 | 15.01 |
| $B_2O_3$ | 5.76 | 5.80 | 5.84 | 5.78 | 5.98 | 6.02 | 5.63 | 6.53 | 5.46 |
| $P_2O_5$ | 0.00 | 0.00 | 0.00 | 0.00 | 0.00 | 0.00 | 0.00 | 0.00 | 0.00 |
| $Li_2O$ | 9.89 | 9.90 | 9.84 | 9.82 | 10.00 | 10.04 | 9.71 | 10.84 | 9.12 |
| $Na_2O$ | 4.33 | 4.22 | 4.21 | 4.22 | 4.30 | 4.23 | 4.27 | 4.68 | 3.84 |
| $K_2O$ | 0.49 | 0.47 | 0.47 | 0.47 | 0.49 | 0.29 | 0.29 | 0.31 | 0.26 |
| MgO | 3.08 | 2.90 | 2.91 | 2.93 | 3.05 | 2.75 | 2.86 | 3.21 | 2.66 |
| CaO | 0.02 | 0.01 | 0.01 | 0.01 | 0.01 | 0.01 | 0.01 | 0.01 | 0.01 |

TABLE 30G-continued

| Ex. (mol %) | ORA-53 | ORA-54 | ORA-56 | ORA-57 | ORA-58 | ORA-59 | ORA-60 | ORA-61 | ORA-62 |
|---|---|---|---|---|---|---|---|---|---|
| ZnO | 1.06 | 0.99 | 0.99 | 1.03 | 1.06 | 0.95 | 1.00 | 1.10 | 0.90 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.004 | 0.004 | 0.004 | 0.004 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.084 | 0.048 | 0.049 | 0.037 | 0.097 | 0.023 | 0.090 | 0.049 | 0.050 |
| $Co_3O_4$ | 0.048 | 0.002 | 0.035 | 0.016 | 0.053 | 0.010 | 0.046 | 0.002 | 0.032 |
| $Cr_2O_3$ | 0.001 | 0.001 | 0.001 | 0.001 | 0.001 | 0.000 | 0.000 | 0.000 | 0.000 |
| CuO | 0.241 | 0.633 | 0.735 | 0.336 | 0.172 | 0.114 | 0.245 | 0.084 | 1.500 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.000 | 0.000 | 0.000 | 0.000 | 0.000 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.003 | 0.007 | 0.000 | 0.002 | 0.005 | 0.000 | 0.002 |
| Cl | 0.013 | 0.007 | 0.009 | 0.013 | 0.013 | 0.011 | 0.011 | 0.011 | 0.011 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30H

| Ex (mol %) | ORA-63 | ORA-64 | ORA-65 | ORA-66 | ORA-67 | ORA-68 | ORA-69 | ORA-70 | ORA-71 |
|---|---|---|---|---|---|---|---|---|---|
| $SiO_2$ | 56.53 | 55.78 | 58.58 | 58.56 | 57.21 | 57.93 | 58.24 | 57.46 | 58.16 |
| $Al_2O_3$ | 17.59 | 17.97 | 16.59 | 16.88 | 16.96 | 17.01 | 16.43 | 16.92 | 16.96 |
| $B_2O_3$ | 6.17 | 6.34 | 5.92 | 5.97 | 6.16 | 5.96 | 6.05 | 6.19 | 5.86 |
| $P_2O_5$ | 0.00 | 0.00 | 0.00 | 0.00 | 0.00 | 0.00 | 0.00 | 0.00 | 0.00 |
| $Li_2O$ | 10.10 | 10.32 | 9.82 | 9.88 | 9.97 | 9.92 | 9.84 | 10.02 | 9.82 |
| $Na_2O$ | 4.35 | 4.34 | 4.27 | 4.29 | 4.30 | 4.31 | 4.24 | 4.32 | 4.35 |
| $K_2O$ | 0.29 | 0.29 | 0.48 | 0.29 | 0.29 | 0.29 | 0.29 | 0.29 | 0.30 |
| MgO | 3.25 | 3.42 | 2.94 | 2.98 | 3.04 | 3.03 | 2.93 | 3.02 | 3.02 |
| CaO | 0.02 | 0.02 | 0.02 | 0.02 | 0.02 | 0.02 | 0.02 | 0.02 | 0.02 |
| ZnO | 1.07 | 1.11 | 1.02 | 1.03 | 1.05 | 1.06 | 1.02 | 1.04 | 1.05 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.005 | 0.005 | 0.004 | 0.005 | 0.004 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.037 | 0.112 | 0.034 | 0.063 | 0.476 | 0.000 | 0.063 | 0.057 | 0.232 |
| $Co_3O_4$ | 0.017 | 0.057 | 0.002 | 0.002 | 0.018 | 0.005 | 0.033 | 0.039 | 0.057 |
| $Cr_2O_3$ | 0.000 | 0.000 | 0.030 | 0.000 | 0.000 | 0.000 | 0.000 | 0.000 | 0.000 |
| CuO | 0.548 | 0.232 | 0.260 | 0.008 | 0.487 | 0.444 | 0.824 | 0.595 | 0.145 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.003 | 0.001 | 0.000 | 0.002 | 0.001 | 0.003 | 0.002 |
| $As_2O_3$ | 0.000 | 0.000 | 0.001 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.006 | 0.000 | 0.012 | 0.000 | 0.006 | 0.000 | 0.000 | 0.000 | 0.005 |
| Cl | 0.013 | 0.013 | 0.011 | 0.011 | 0.011 | 0.009 | 0.009 | 0.011 | 0.013 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30I

| Ex (mol %) | ORA-72 | ORA-73 | ORA-74 | ORA-75 | ORA-76 | ORA-77 | ORA-78 | ORA-79 | ORA-80 |
|---|---|---|---|---|---|---|---|---|---|
| $SiO_2$ | 57.12 | 59.37 | 58.01 | 55.88 | 59.19 | 55.91 | 57.08 | 59.16 | 59.23 |
| $Al_2O_3$ | 17.20 | 16.56 | 16.75 | 17.76 | 16.28 | 17.42 | 17.50 | 16.52 | 16.54 |
| $B_2O_3$ | 6.36 | 5.79 | 6.24 | 6.48 | 5.92 | 5.76 | 6.14 | 5.82 | 5.86 |
| $P_2O_5$ | 0.00 | 0.00 | 0.00 | 0.00 | 0.00 | 0.00 | 0.00 | 0.00 | 0.00 |
| $Li_2O$ | 10.08 | 9.75 | 10.06 | 10.29 | 9.77 | 9.68 | 9.98 | 11.85 | 11.83 |

TABLE 30I-continued

| Ex (mol %) | ORA-72 | ORA-73 | ORA-74 | ORA-75 | ORA-76 | ORA-77 | ORA-78 | ORA-79 | ORA-80 |
|---|---|---|---|---|---|---|---|---|---|
| $Na_2O$ | 4.35 | 4.27 | 4.31 | 4.36 | 4.24 | 4.26 | 4.37 | 6.18 | 6.21 |
| $K_2O$ | 0.29 | 0.29 | 0.29 | 0.29 | 0.29 | 0.29 | 0.29 | 0.19 | 0.20 |
| MgO | 3.11 | 2.90 | 2.90 | 3.39 | 2.79 | 3.37 | 3.20 | 0.02 | 0.02 |
| CaO | 0.02 | 0.02 | 0.02 | 0.02 | 0.02 | 0.02 | 0.02 | 0.01 | 0.01 |
| ZnO | 1.06 | 1.02 | 1.02 | 1.17 | 1.00 | 1.25 | 1.13 | 0.00 | 0.00 |
| $TiO_2$ | 0.01 | 0.01 | 0.01 | 0.01 | 0.49 | 2.04 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.005 | 0.004 | 0.004 | 0.005 | 0.004 | 0.005 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.106 | 0.015 | 0.291 | 0.200 | 0.000 | 0.000 | 0.000 | 0.083 | 0.000 |
| $Co_3O_4$ | 0.047 | 0.001 | 0.057 | 0.050 | 0.001 | 0.001 | 0.054 | 0.048 | 0.001 |
| $Cr_2O_3$ | 0.000 | 0.000 | 0.000 | 0.000 | 0.000 | 0.000 | 0.000 | 0.005 | 0.000 |
| CuO | 0.238 | 0.000 | 0.013 | 0.077 | 0.000 | 0.000 | 0.215 | 0.093 | 0.061 |
| $HfO_2$ | 0.000 | 0.000 | 0.000 | 0.000 | 0.000 | 0.000 | 0.000 | 0.000 | 0.000 |
| $MnO_2$ | 0.002 | 0.000 | 0.004 | 0.002 | 0.000 | 0.001 | 0.001 | 0.003 | 0.005 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.003 | 0.000 | 0.005 |
| Cl | 0.011 | 0.009 | 0.013 | 0.011 | 0.009 | 0.009 | 0.011 | 0.011 | 0.015 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30J

| Ex (mol %) | ORA-81 | ORA-82 | ORA-83 | ORA-84 | ORA-85 | ORA-86 | ORA-87 | ORA-88 | ORA-89 |
|---|---|---|---|---|---|---|---|---|---|
| $SiO_2$ | 59.07 | 59.29 | 59.35 | 59.18 | 59.52 | 59.10 | 58.23 | 58.92 | 58.45 |
| $Al_2O_3$ | 16.48 | 16.51 | 16.56 | 16.41 | 16.38 | 16.53 | 16.16 | 16.40 | 16.34 |
| $B_2O_3$ | 5.81 | 5.83 | 5.82 | 6.00 | 5.84 | 5.96 | 5.74 | 6.02 | 6.02 |
| $P_2O_5$ | 0.00 | 0.00 | 0.00 | 0.00 | 0.00 | 0.00 | 0.00 | 0.00 | 0.00 |
| $Li_2O$ | 11.88 | 11.80 | 11.84 | 11.95 | 11.82 | 11.88 | 11.68 | 11.83 | 11.82 |
| $Na_2O$ | 6.19 | 6.18 | 6.19 | 6.18 | 6.17 | 6.19 | 6.05 | 6.20 | 6.19 |
| $K_2O$ | 0.19 | 0.19 | 0.19 | 0.19 | 0.19 | 0.19 | 0.19 | 0.19 | 0.19 |
| MgO | 0.02 | 0.02 | 0.02 | 0.02 | 0.02 | 0.02 | 0.02 | 0.02 | 0.02 |
| CaO | 0.01 | 0.01 | 0.01 | 0.01 | 0.01 | 0.01 | 0.01 | 0.01 | 0.01 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 1.91 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.004 | 0.036 | 0.025 | 0.003 | 0.004 | 0.004 | 0.058 |
| $CeO_2$ | 0.000 | 0.000 | 0.001 | 0.001 | 0.003 | 0.099 | 0.002 | 0.000 | 0.000 |
| NiO | 0.249 | 0.026 | 0.000 | 0.000 | 0.000 | 0.000 | 0.000 | 0.000 | 0.057 |
| $Co_3O_4$ | 0.053 | 0.010 | 0.001 | 0.001 | 0.001 | 0.001 | 0.001 | 0.015 | 0.035 |
| $Cr_2O_3$ | 0.000 | 0.000 | 0.000 | 0.000 | 0.000 | 0.000 | 0.000 | 0.000 | 0.000 |
| CuO | 0.009 | 0.106 | 0.000 | 0.000 | 0.000 | 0.000 | 0.000 | 0.370 | 0.791 |
| $HfO_2$ | 0.000 | 0.000 | 0.000 | 0.000 | 0.000 | 0.000 | 0.000 | 0.000 | 0.000 |
| $MnO_2$ | 0.004 | 0.005 | 0.001 | 0.000 | 0.001 | 0.000 | 0.001 | 0.001 | 0.004 |
| $As_2O_3$ | 0.000 | 0.000 | 0.000 | 0.000 | 0.000 | 0.000 | 0.000 | 0.001 | 0.001 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.000 | 0.000 | 0.000 |
| Cl | 0.011 | 0.011 | 0.007 | 0.009 | 0.007 | 0.011 | 0.007 | 0.011 | 0.013 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30K

| Ex. (mol %) | ORA-90 | ORA-91 | ORA-92 | ORA-93 | ORA-94 | ORA-95 | ORA-96 | ORA-97 | ORA-98 |
|---|---|---|---|---|---|---|---|---|---|
| $SiO_2$ | 58.93 | 58.59 | 58.63 | 58.78 | 58.92 | 58.98 | 58.92 | 59.17 | 58.67 |
| $Al_2O_3$ | 16.35 | 16.35 | 16.56 | 16.41 | 16.34 | 16.42 | 16.52 | 16.45 | 16.52 |
| $B_2O_3$ | 5.98 | 6.07 | 6.13 | 6.10 | 5.99 | 6.04 | 6.01 | 5.97 | 5.92 |

TABLE 30K-continued

| Ex. (mol %) | ORA-90 | ORA-91 | ORA-92 | ORA-93 | ORA-94 | ORA-95 | ORA-96 | ORA-97 | ORA-98 |
|---|---|---|---|---|---|---|---|---|---|
| $P_2O_5$ | 0.00 | 0.00 | 0.00 | 0.00 | 0.00 | 0.00 | 0.00 | 0.00 | 0.00 |
| $Li_2O$ | 11.84 | 11.80 | 11.87 | 11.82 | 11.77 | 11.87 | 11.87 | 11.88 | 11.85 |
| $Na_2O$ | 6.20 | 6.21 | 6.24 | 6.21 | 6.18 | 6.22 | 6.24 | 6.21 | 6.24 |
| $K_2O$ | 0.20 | 0.20 | 0.20 | 0.20 | 0.19 | 0.20 | 0.19 | 0.19 | 0.19 |
| MgO | 0.02 | 0.02 | 0.02 | 0.02 | 0.02 | 0.02 | 0.02 | 0.02 | 0.01 |
| CaO | 0.00 | 0.01 | 0.00 | 0.01 | 0.00 | 0.00 | 0.00 | 0.00 | 0.02 |
| ZnO | 0.00 | 0.00 | 0.00 | 0.00 | 0.00 | 0.00 | 0.00 | 0.00 | 0.04 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.003 | 0.003 | 0.003 | 0.003 | 0.003 | 0.003 | 0.003 | 0.003 | 0.005 |
| $CeO_2$ | 0.000 | 0.000 | 0.000 | 0.000 | 0.000 | 0.000 | 0.000 | 0.000 | 0.000 |
| NiO | 0.000 | 0.061 | 0.006 | 0.013 | 0.014 | 0.011 | 0.014 | 0.018 | 0.000 |
| $Co_3O_4$ | 0.031 | 0.034 | 0.035 | 0.035 | 0.034 | 0.002 | 0.001 | 0.000 | 0.000 |
| $Cr_2O_3$ | 0.016 | 0.000 | 0.048 | 0.029 | 0.015 | 0.055 | 0.037 | 0.047 | 0.000 |
| CuO | 0.411 | 0.628 | 0.229 | 0.364 | 0.504 | 0.147 | 0.142 | 0.015 | 0.000 |
| $HfO_2$ | 0.000 | 0.000 | 0.000 | 0.000 | 0.000 | 0.000 | 0.000 | 0.000 | 0.000 |
| $MnO_2$ | 0.007 | 0.004 | 0.004 | 0.004 | 0.003 | 0.004 | 0.004 | 0.005 | 0.000 |
| $As_2O_3$ | 0.001 | 0.001 | 0.001 | 0.001 | 0.001 | 0.001 | 0.001 | 0.001 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.001 | 0.000 | 0.000 | 0.000 | 0.005 | 0.002 | 0.000 | 0.006 | 0.000 |
| Cl | 0.011 | 0.013 | 0.013 | 0.015 | 0.011 | 0.013 | 0.013 | 0.013 | 0.015 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.517 |
| $Er_2O_3$ | 0.000 | 0.000 | 0.000 | 0.000 | 0.000 | 0.000 | 0.000 | 0.000 | 0.000 |

TABLE 30L

| Ex. (mol %) | ORA-99 | ORA-100 | ORA-101 | ORA-102 | ORA-103 | ORA-104 | ORA-105 | ORA-106 | ORA-107 |
|---|---|---|---|---|---|---|---|---|---|
| $SiO_2$ | 58.51 | 57.81 | 58.00 | 57.88 | 57.74 | 57.52 | 57.60 | 57.57 | 58.73 |
| $Al_2O_3$ | 16.39 | 16.21 | 16.25 | 16.11 | 16.08 | 16.33 | 16.37 | 16.07 | 16.47 |
| $B_2O_3$ | 5.84 | 5.81 | 5.60 | 5.69 | 5.76 | 5.83 | 5.74 | 5.99 | 6.09 |
| $P_2O_5$ | 0.00 | 0.00 | 0.00 | 0.00 | 0.00 | 0.00 | 0.00 | 0.00 | 0.00 |
| $Li_2O$ | 11.76 | 11.72 | 11.62 | 11.74 | 11.79 | 11.78 | 11.76 | 10.97 | 11.98 |
| $Na_2O$ | 6.21 | 6.11 | 6.08 | 6.05 | 6.04 | 5.19 | 4.27 | 4.23 | 6.24 |
| $K_2O$ | 0.19 | 0.19 | 0.18 | 0.19 | 0.18 | 0.19 | 0.19 | 0.19 | 0.19 |
| MgO | 0.00 | 0.00 | 0.00 | 0.00 | 0.00 | 0.00 | 0.93 | 1.85 | 0.02 |
| CaO | 0.02 | 0.02 | 0.02 | 0.02 | 0.02 | 0.02 | 0.02 | 0.02 | 0.01 |
| ZnO | 0.01 | 0.00 | 0.00 | 0.00 | 0.00 | 1.01 | 1.03 | 1.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.006 | 0.009 | 0.009 | 0.009 | 0.009 | 0.009 | 0.009 | 0.009 | 0.004 |
| $CeO_2$ | 0.000 | 0.000 | 0.000 | 0.000 | 0.000 | 0.000 | 0.000 | 0.000 | 0.000 |
| NiO | 0.000 | 0.000 | 0.112 | 0.214 | 0.306 | 0.000 | 0.000 | 0.000 | 0.015 |
| $Co_3O_4$ | 0.000 | 0.000 | 0.000 | 0.000 | 0.000 | 0.000 | 0.000 | 0.000 | 0.003 |
| $Cr_2O_3$ | 0.000 | 0.000 | 0.000 | 0.000 | 0.000 | 0.000 | 0.000 | 0.000 | 0.028 |
| CuO | 0.000 | 0.000 | 0.000 | 0.000 | 0.000 | 0.000 | 0.000 | 0.000 | 0.200 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.000 | 0.000 | 0.000 | 0.000 | 0.000 | 0.001 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.003 | 0.000 | 0.005 | 0.008 | 0.000 | 0.000 | 0.001 | 0.000 |
| Cl | 0.017 | 0.018 | 0.014 | 0.016 | 0.014 | 0.016 | 0.016 | 0.016 | 0.013 |
| F | 0.000 | 0.000 | 0.000 | 0.000 | 0.000 | 0.000 | 0.000 | 0.000 | 0.000 |
| $Nd_2O_3$ | 1.042 | 2.094 | 2.105 | 2.077 | 2.055 | 2.101 | 2.069 | 2.087 | 0.000 |
| $Er_2O_3$ | 0.000 | 0.000 | 0.000 | 0.000 | 0.000 | 0.000 | 0.000 | 0.000 | 0.000 |

TABLE 30M

| Ex. (mol %) | ORA-108 | ORA-109 | ORA-110 | ORA-111 | ORA-112 | ORA-113 | ORA-114 | ORA-115 | ORA-116 |
|---|---|---|---|---|---|---|---|---|---|
| $SiO_2$ | 59.04 | 58.88 | 59.31 | 59.45 | 60.14 | 60.08 | 60.58 | 59.80 | 59.18 |
| $Al_2O_3$ | 16.49 | 16.45 | 16.59 | 16.60 | 16.68 | 16.98 | 16.85 | 17.22 | 15.95 |
| $B_2O_3$ | 5.75 | 5.91 | 6.10 | 5.88 | 6.10 | 6.18 | 6.08 | 6.24 | 5.89 |

TABLE 30M-continued

| Ex. (mol %) | ORA-108 | ORA-109 | ORA-110 | ORA-111 | ORA-112 | ORA-113 | ORA-114 | ORA-115 | ORA-116 |
|---|---|---|---|---|---|---|---|---|---|
| $P_2O_5$ | 0.03 | 0.02 | 0.02 | 0.02 | 0.02 | 0.02 | 0.04 | 0.00 | 0.00 |
| $Li_2O$ | 11.98 | 12.01 | 12.09 | 12.08 | 12.25 | 12.27 | 12.27 | 12.29 | 12.01 |
| $Na_2O$ | 6.18 | 5.68 | 5.27 | 4.78 | 4.34 | 3.87 | 3.86 | 3.89 | 6.27 |
| $K_2O$ | 0.18 | 0.19 | 0.19 | 0.19 | 0.19 | 0.19 | 0.20 | 0.19 | 0.20 |
| MgO | 0.02 | 0.02 | 0.02 | 0.02 | 0.03 | 0.02 | 0.02 | 0.02 | 0.02 |
| CaO | 0.03 | 0.02 | 0.02 | 0.02 | 0.02 | 0.02 | 0.03 | 0.01 | 0.01 |
| ZnO | 0.00 | 0.00 | 0.00 | 0.00 | 0.00 | 0.00 | 0.00 | 0.00 | 0.00 |
| $TiO_2$ | 0.00 | 0.01 | 0.00 | 0.01 | 0.00 | 0.01 | 0.00 | 0.01 | 0.01 |
| $ZrO_2$ | 0.00 | 0.51 | 0.00 | 0.51 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.027 | 0.016 | 0.016 | 0.016 | 0.016 | 0.016 | 0.028 | 0.004 | 0.004 |
| $CeO_2$ | 0.000 | 0.000 | 0.000 | 0.000 | 0.000 | 0.000 | 0.000 | 0.000 | 0.000 |
| NiO | 0.018 | 0.017 | 0.019 | 0.014 | 0.016 | 0.017 | 0.000 | 0.018 | 0.001 |
| $Co_3O_4$ | 0.003 | 0.000 | 0.000 | 0.000 | 0.000 | 0.000 | 0.000 | 0.000 | 0.000 |
| $Cr_2O_3$ | 0.028 | 0.029 | 0.030 | 0.031 | 0.029 | 0.030 | 0.000 | 0.030 | 0.001 |
| CuO | 0.181 | 0.219 | 0.294 | 0.343 | 0.160 | 0.284 | 0.000 | 0.271 | 0.002 |
| $HfO_2$ | 0.000 | 0.006 | 0.000 | 0.006 | 0.000 | 0.000 | 0.000 | 0.000 | 0.000 |
| $MnO_2$ | 0.024 | 0.015 | 0.012 | 0.012 | 0.016 | 0.013 | 0.022 | 0.001 | 0.001 |
| $As_2O_3$ | 0.000 | 0.000 | 0.000 | 0.000 | 0.000 | 0.000 | 0.000 | 0.000 | 0.001 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.001 | 0.004 | 0.000 | 0.000 | 0.000 | 0.004 | 0.000 | 0.002 |
| Cl | 0.011 | 0.013 | 0.011 | 0.011 | 0.009 | 0.009 | 0.009 | 0.007 | 0.009 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.451 |

TABLE 30N

| | Ex. (mol %) | | | | | | | | |
|---|---|---|---|---|---|---|---|---|---|
| | ORA-117 | ORA-118 | ORA-119 | ORA-120 | ORA-121 | ORA-122 | ORA-123 | ORA-124 | ORA-125 |
| $SiO_2$ | 58.83 | 59.12 | 58.95 | 58.94 | 59.09 | 58.96 | 59.27 | 58.89 | 59.84 |
| $Al_2O_3$ | 14.57 | 15.93 | 15.90 | 15.16 | 15.91 | 17.23 | 17.31 | 17.36 | 17.03 |
| $B_2O_3$ | 5.97 | 5.83 | 6.03 | 5.96 | 5.95 | 6.10 | 6.00 | 6.03 | 6.00 |
| $P_2O_5$ | 0.00 | 0.00 | 0.00 | 0.00 | 0.00 | 0.00 | 0.00 | 0.00 | 0.00 |
| $Li_2O$ | 12.20 | 12.10 | 12.16 | 12.16 | 12.02 | 10.39 | 10.34 | 11.33 | 11.12 |
| $Na_2O$ | 6.31 | 6.23 | 6.22 | 6.28 | 6.27 | 2.80 | 2.79 | 2.82 | 2.81 |
| $K_2O$ | 0.20 | 0.19 | 0.20 | 0.20 | 0.20 | 0.10 | 0.10 | 0.10 | 0.10 |
| MgO | 0.02 | 0.02 | 0.02 | 0.02 | 0.02 | 0.99 | 0.99 | 1.00 | 0.98 |
| CaO | 0.01 | 0.01 | 0.01 | 0.01 | 0.01 | 2.03 | 2.04 | 1.02 | 0.99 |
| ZnO | 0.00 | 0.00 | 0.00 | 0.00 | 0.00 | 1.04 | 1.06 | 1.06 | 1.02 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.004 | 0.004 | 0.004 | 0.005 | 0.005 | 0.004 | 0.005 |
| $CeO_2$ | 0.000 | 0.000 | 0.000 | 0.000 | 0.000 | 0.000 | 0.000 | 0.000 | 0.000 |
| NiO | 0.010 | 0.086 | 0.040 | 0.053 | 0.003 | 0.000 | 0.000 | 0.000 | 0.000 |
| $Co_3O_4$ | 0.000 | 0.009 | 0.002 | 0.000 | 0.012 | 0.037 | 0.048 | 0.038 | 0.047 |
| $Cr_2O_3$ | 0.003 | 0.001 | 0.001 | 0.002 | 0.001 | 0.049 | 0.000 | 0.052 | 0.000 |
| CuO | 0.015 | 0.002 | 0.001 | 0.009 | 0.025 | 0.253 | 0.024 | 0.271 | 0.037 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.002 | 0.000 | 0.002 | 0.004 | 0.005 | 0.007 | 0.004 |
| $As_2O_3$ | 0.002 | 0.001 | 0.001 | 0.001 | 0.001 | 0.001 | 0.001 | 0.001 | 0.001 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.007 | 0.000 | 0.000 | 0.011 | 0.000 | 0.000 | 0.000 | 0.004 |
| Cl | 0.016 | 0.009 | 0.013 | 0.014 | 0.013 | 0.011 | 0.009 | 0.011 | 0.009 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 1.850 | 0.447 | 0.453 | 1.168 | 0.460 | 0.000 | 0.000 | 0.000 | 0.000 |

TABLE 30O

| | Ex. (mol %) | | | | | | | | |
|---|---|---|---|---|---|---|---|---|---|
| | ORA-126 | ORA-127 | ORA-128 | ORA-129 | ORA-130 | ORA-131 | ORA-132 | ORA-133 | ORA-134 |
| $SiO_2$ | 58.98 | 58.50 | 58.20 | 58.36 | 58.82 | 58.06 | 58.50 | 58.41 | 58.97 |
| $Al_2O_3$ | 16.66 | 17.08 | 16.22 | 16.36 | 16.60 | 16.27 | 16.29 | 16.43 | 16.39 |
| $B_2O_3$ | 6.03 | 6.12 | 5.98 | 6.00 | 5.85 | 5.92 | 5.96 | 6.08 | 5.91 |
| $P_2O_5$ | 0.00 | 0.00 | 0.00 | 0.00 | 0.00 | 0.00 | 0.00 | 0.00 | 0.00 |
| $Li_2O$ | 11.18 | 11.27 | 12.14 | 12.00 | 12.03 | 12.10 | 12.08 | 12.33 | 12.05 |
| $Na_2O$ | 2.79 | 2.80 | 6.09 | 6.11 | 6.18 | 6.09 | 6.14 | 6.17 | 6.15 |
| $K_2O$ | 0.10 | 0.10 | 0.19 | 0.20 | 0.19 | 0.19 | 0.20 | 0.20 | 0.19 |
| MgO | 0.95 | 0.97 | 0.01 | 0.02 | 0.01 | 0.01 | 0.02 | 0.01 | 0.01 |
| CaO | 1.94 | 2.00 | 0.01 | 0.01 | 0.01 | 0.01 | 0.01 | 0.01 | 0.01 |
| ZnO | 1.01 | 1.03 | 0.00 | 0.00 | 0.00 | 0.00 | 0.00 | 0.00 | 0.00 |
| $TiO_2$ | 0.01 | 0.01 | 0.95 | 0.01 | 0.01 | 0.96 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.005 | 0.005 | 0.002 | 0.048 | 0.004 | 0.001 | 0.051 | 0.004 | 0.004 |
| $CeO_2$ | 0.000 | 0.000 | 0.200 | 0.002 | 0.000 | 0.400 | 0.000 | 0.002 | 0.004 |
| NiO | 0.000 | 0.000 | 0.000 | 0.000 | 0.037 | 0.000 | 0.000 | 0.000 | 0.000 |
| $Co_3O_4$ | 0.035 | 0.047 | 0.000 | 0.001 | 0.000 | 0.001 | 0.000 | 0.000 | 0.002 |
| $Cr_2O_3$ | 0.049 | 0.000 | 0.000 | 0.000 | 0.000 | 0.000 | 0.000 | 0.000 | 0.000 |
| CuO | 0.246 | 0.042 | 0.000 | 0.182 | 0.232 | 0.000 | 0.000 | 0.044 | 0.279 |
| $HfO_2$ | 0.000 | 0.000 | 0.000 | 0.000 | 0.000 | 0.000 | 0.000 | 0.000 | 0.000 |
| $MnO_2$ | 0.001 | 0.007 | 0.000 | 0.687 | 0.000 | 0.000 | 0.737 | 0.000 | 0.001 |
| $As_2O_3$ | 0.001 | 0.001 | 0.000 | 0.001 | 0.000 | 0.001 | 0.001 | 0.001 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.299 | 0.000 |
| $SO_3$ | 0.007 | 0.000 | 0.000 | 0.000 | 0.010 | 0.000 | 0.001 | 0.000 | 0.000 |
| Cl | 0.009 | 0.011 | 0.007 | 0.009 | 0.009 | 0.009 | 0.009 | 0.011 | 0.009 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30P

| | Ex. (mol %) | | | | | | | | |
|---|---|---|---|---|---|---|---|---|---|
| | ORA-135 | ORA-136 | ORA-137 | ORA-138 | ORA-139 | ORA-140 | ORA-141 | ORA-142 | ORA-143 |
| $SiO_2$ | 58.37 | 58.70 | 57.48 | 58.61 | 56.91 | 57.48 | 58.88 | 58.26 | 58.47 |
| $Al_2O_3$ | 16.51 | 16.37 | 16.31 | 16.26 | 16.71 | 16.60 | 16.55 | 16.75 | 16.46 |
| $B_2O_3$ | 6.14 | 6.07 | 5.90 | 5.88 | 5.94 | 5.97 | 5.98 | 6.09 | 5.98 |
| $P_2O_5$ | 0.00 | 0.00 | 0.00 | 0.00 | 0.00 | 0.00 | 0.00 | 0.00 | 0.00 |
| $Li_2O$ | 12.18 | 12.14 | 11.91 | 11.83 | 11.83 | 11.87 | 11.96 | 12.09 | 11.59 |
| $Na_2O$ | 6.19 | 6.20 | 6.08 | 6.11 | 6.16 | 6.17 | 6.19 | 6.25 | 6.18 |
| $K_2O$ | 0.19 | 0.20 | 0.20 | 0.19 | 0.20 | 0.22 | 0.19 | 0.20 | 0.19 |
| MgO | 0.02 | 0.01 | 0.02 | 0.01 | 0.01 | 0.02 | 0.02 | 0.02 | 0.01 |
| CaO | 0.01 | 0.01 | 0.01 | 0.00 | 0.01 | 0.01 | 0.01 | 0.01 | 0.01 |
| ZnO | 0.00 | 0.00 | 0.00 | 0.00 | 0.00 | 0.00 | 0.00 | 0.00 | 0.00 |
| $TiO_2$ | 0.01 | 0.01 | 1.98 | 0.99 | 2.00 | 0.01 | 0.01 | 0.01 | 0.98 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.003 | 0.003 | 0.002 | 0.107 | 0.099 | 0.101 | 0.003 |
| $CeO_2$ | 0.000 | 0.002 | 0.101 | 0.103 | 0.214 | 0.000 | 0.103 | 0.212 | 0.106 |
| NiO | 0.000 | 0.000 | 0.000 | 0.000 | 0.000 | 0.000 | 0.000 | 0.000 | 0.000 |
| $Co_3O_4$ | 0.006 | 0.004 | 0.000 | 0.000 | 0.000 | 0.000 | 0.000 | 0.000 | 0.000 |
| $Cr_2O_3$ | 0.000 | 0.000 | 0.000 | 0.000 | 0.000 | 0.000 | 0.000 | 0.000 | 0.000 |
| CuO | 0.359 | 0.269 | 0.000 | 0.000 | 0.000 | 0.000 | 0.000 | 0.000 | 0.000 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.001 | 0.000 | 0.001 | 1.514 | 0.003 | 0.000 | 0.000 |
| $As_2O_3$ | 0.001 | 0.001 | 0.000 | 0.000 | 0.000 | 0.000 | 0.000 | 0.000 | 0.001 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.012 | 0.000 | 0.000 | 0.008 | 0.000 | 0.005 | 0.000 |
| Cl | 0.013 | 0.011 | 0.013 | 0.009 | 0.013 | 0.013 | 0.011 | 0.015 | 0.011 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30Q

| | Ex. (mol %) | | | | | | | | |
|---|---|---|---|---|---|---|---|---|---|
| | ORA-144 | ORA-145 | ORA-146 | ORA-147 | ORA-148 | ORA-149 | ORA-150 | ORA-151 | ORA-152 |
| $SiO_2$ | 58.78 | 58.63 | 59.36 | 59.68 | 60.20 | 60.62 | 61.26 | 61.65 | 59.16 |
| $Al_2O_3$ | 16.19 | 16.39 | 16.55 | 16.53 | 16.44 | 16.49 | 16.37 | 16.41 | 16.55 |
| $B_2O_3$ | 5.92 | 5.87 | 5.78 | 5.78 | 5.85 | 5.88 | 5.89 | 5.93 | 5.92 |
| $P_2O_5$ | 0.00 | 0.00 | 0.00 | 0.00 | 0.00 | 0.00 | 0.00 | 0.00 | 0.00 |
| $Li_2O$ | 11.60 | 11.58 | 11.67 | 11.82 | 11.81 | 11.82 | 11.78 | 11.80 | 11.85 |
| $Na_2O$ | 6.11 | 6.15 | 6.20 | 5.69 | 5.22 | 4.74 | 4.25 | 3.77 | 6.17 |
| $K_2O$ | 0.19 | 0.19 | 0.19 | 0.19 | 0.19 | 0.19 | 0.19 | 0.19 | 0.19 |
| MgO | 0.01 | 0.01 | 0.01 | 0.02 | 0.02 | 0.01 | 0.02 | 0.02 | 0.02 |
| CaO | 0.01 | 0.01 | 0.01 | 0.01 | 0.01 | 0.01 | 0.01 | 0.01 | 0.01 |
| ZnO | 0.00 | 0.00 | 0.00 | 0.00 | 0.00 | 0.00 | 0.00 | 0.00 | 0.00 |
| $TiO_2$ | 0.97 | 0.98 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.002 | 0.003 | 0.004 | 0.004 | 0.004 | 0.004 | 0.004 | 0.004 | 0.004 |
| $CeO_2$ | 0.199 | 0.161 | 0.000 | 0.000 | 0.000 | 0.000 | 0.000 | 0.000 | 0.000 |
| NiO | 0.000 | 0.000 | 0.019 | 0.020 | 0.018 | 0.020 | 0.020 | 0.020 | 0.105 |
| $Co_3O_4$ | 0.000 | 0.000 | 0.000 | 0.000 | 0.000 | 0.000 | 0.000 | 0.000 | 0.000 |
| $Cr_2O_3$ | 0.000 | 0.000 | 0.028 | 0.034 | 0.030 | 0.030 | 0.028 | 0.029 | 0.000 |
| CuO | 0.000 | 0.000 | 0.158 | 0.196 | 0.192 | 0.154 | 0.163 | 0.157 | 0.000 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.000 | 0.000 | 0.000 | 0.001 | 0.000 | 0.001 |
| $As_2O_3$ | 0.001 | 0.001 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.006 | 0.000 | 0.000 | 0.000 | 0.000 | 0.000 | 0.000 | 0.000 |
| Cl | 0.011 | 0.011 | 0.009 | 0.009 | 0.009 | 0.009 | 0.007 | 0.007 | 0.009 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30R

| | Ex. (mol %) | | | | | | | | |
|---|---|---|---|---|---|---|---|---|---|
| | ORA-153 | ORA-154 | ORA-155 | ORA-156 | ORA-157 | ORA-158 | ORA-159 | ORA-160 | ORA-161 |
| $SiO_2$ | 59.09 | 59.33 | 58.93 | 59.20 | 59.10 | 58.51 | 59.65 | 58.74 | 58.81 |
| $Al_2O_3$ | 16.57 | 16.52 | 16.51 | 16.48 | 16.68 | 16.44 | 16.41 | 16.72 | 16.49 |
| $B_2O_3$ | 5.93 | 5.85 | 6.02 | 5.92 | 5.87 | 6.05 | 5.91 | 6.00 | 6.01 |
| $P_2O_5$ | 0.00 | 0.00 | 0.00 | 0.00 | 0.00 | 0.00 | 0.00 | 0.00 | 0.00 |
| $Li_2O$ | 11.95 | 11.83 | 12.04 | 11.94 | 11.67 | 11.97 | 11.68 | 11.98 | 11.85 |
| $Na_2O$ | 6.17 | 6.19 | 6.20 | 6.16 | 6.20 | 6.18 | 6.10 | 6.28 | 6.20 |
| $K_2O$ | 0.19 | 0.19 | 0.20 | 0.19 | 0.19 | 0.19 | 0.19 | 0.20 | 0.19 |
| MgO | 0.02 | 0.02 | 0.02 | 0.01 | 0.01 | 0.02 | 0.01 | 0.02 | 0.01 |
| CaO | 0.01 | 0.01 | 0.01 | 0.01 | 0.01 | 0.01 | 0.01 | 0.01 | 0.01 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.004 | 0.004 | 0.004 | 0.004 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.058 | 0.033 | 0.000 | 0.000 | 0.000 | 0.000 | 0.000 | 0.000 | 0.000 |
| $Co_3O_4$ | 0.001 | 0.000 | 0.004 | 0.019 | 0.000 | 0.000 | 0.000 | 0.000 | 0.000 |
| $Cr_2O_3$ | 0.000 | 0.000 | 0.000 | 0.000 | 0.000 | 0.000 | 0.014 | 0.030 | 0.000 |
| CuO | 0.000 | 0.010 | 0.058 | 0.046 | 0.244 | 0.617 | 0.000 | 0.000 | 0.402 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.001 | 0.000 | 0.000 | 0.000 | 0.000 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.006 | 0.000 | 0.000 | 0.007 | 0.000 |
| Cl | 0.009 | 0.009 | 0.011 | 0.009 | 0.009 | 0.011 | 0.007 | 0.013 | 0.011 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30S

| | Ex. (mol %) | | | | | | | | |
|---|---|---|---|---|---|---|---|---|---|
| | ORA-162 | ORA-163 | ORA-164 | ORA-165 | ORA-166 | ORA-167 | ORA-168 | ORA-169 | ORA-170 |
| $SiO_2$ | 58.68 | 58.44 | 58.49 | 58.71 | 59.24 | 58.85 | 58.57 | 58.74 | 59.78 |
| $Al_2O_3$ | 16.47 | 16.41 | 16.39 | 16.49 | 16.63 | 16.54 | 16.54 | 16.51 | 16.48 |
| $B_2O_3$ | 6.01 | 5.89 | 5.79 | 6.02 | 5.72 | 5.96 | 6.07 | 6.02 | 5.96 |
| $P_2O_5$ | 0.00 | 0.00 | 0.00 | 0.00 | 0.00 | 0.00 | 0.00 | 0.00 | 0.00 |
| $Li_2O$ | 11.98 | 11.80 | 11.83 | 9.89 | 11.15 | 10.92 | 10.51 | 9.98 | 10.47 |
| $Na_2O$ | 6.21 | 6.11 | 6.12 | 4.28 | 5.77 | 5.24 | 4.77 | 4.28 | 4.78 |
| $K_2O$ | 0.20 | 0.21 | 0.21 | 0.20 | 0.19 | 0.20 | 0.20 | 0.20 | 0.20 |
| MgO | 0.02 | 0.02 | 0.02 | 0.04 | 0.02 | 0.03 | 0.04 | 0.05 | 0.03 |
| CaO | 0.01 | 0.01 | 0.01 | 4.00 | 1.00 | 2.00 | 3.01 | 3.99 | 1.99 |
| ZnO | 0.00 | 0.00 | 0.00 | 0.00 | 0.00 | 0.00 | 0.00 | 0.00 | 0.01 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.072 | 0.071 | 0.004 | 0.004 | 0.004 | 0.004 | 0.005 | 0.004 |
| $CeO_2$ | 0.000 | 0.001 | 0.000 | 0.000 | 0.000 | 0.000 | 0.000 | 0.000 | 0.000 |
| NiO | 0.000 | 0.000 | 0.000 | 0.000 | 0.014 | 0.015 | 0.015 | 0.016 | 0.015 |
| $Co_3O_4$ | 0.000 | 0.000 | 0.000 | 0.003 | 0.002 | 0.002 | 0.002 | 0.002 | 0.002 |
| $Cr_2O_3$ | 0.000 | 0.000 | 0.000 | 0.000 | 0.026 | 0.027 | 0.027 | 0.027 | 0.026 |
| CuO | 0.410 | 0.000 | 0.000 | 0.338 | 0.224 | 0.195 | 0.213 | 0.185 | 0.231 |
| $HfO_2$ | 0.000 | 0.000 | 0.000 | 0.000 | 0.000 | 0.000 | 0.000 | 0.000 | 0.000 |
| $MnO_2$ | 0.000 | 1.030 | 1.031 | 0.001 | 0.000 | 0.000 | 0.000 | 0.001 | 0.000 |
| $As_2O_3$ | 0.000 | 0.000 | 0.000 | 0.001 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.002 | 0.000 | 0.000 | 0.000 | 0.000 | 0.000 | 0.006 |
| Cl | 0.011 | 0.009 | 0.013 | 0.009 | 0.007 | 0.009 | 0.009 | 0.009 | 0.007 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30T

| | Ex. (mol %) | | | | | | | | |
|---|---|---|---|---|---|---|---|---|---|
| | ORA-171 | ORA-172 | ORA-173 | ORA-174 | ORA-175 | ORA-176 | ORA-177 | ORA-178 | ORA-179 |
| $SiO_2$ | 60.35 | 59.09 | 59.09 | 59.24 | 58.84 | 58.90 | 59.35 | 58.51 | 58.20 |
| $Al_2O_3$ | 16.50 | 16.38 | 16.40 | 16.33 | 16.50 | 16.51 | 16.27 | 16.30 | 16.50 |
| $B_2O_3$ | 6.09 | 5.92 | 5.97 | 5.95 | 5.98 | 5.97 | 5.91 | 5.92 | 5.89 |
| $P_2O_5$ | 0.00 | 0.00 | 0.00 | 0.00 | 0.00 | 0.00 | 0.00 | 0.00 | 0.00 |
| $Li_2O$ | 10.25 | 9.97 | 9.90 | 9.91 | 10.02 | 9.95 | 9.92 | 9.72 | 9.77 |
| $Na_2O$ | 4.29 | 4.26 | 4.25 | 4.25 | 4.25 | 4.25 | 4.24 | 4.22 | 4.22 |
| $K_2O$ | 0.20 | 0.20 | 0.20 | 0.20 | 0.20 | 0.20 | 0.20 | 0.21 | 0.21 |
| MgO | 0.03 | 0.04 | 0.04 | 0.04 | 0.04 | 0.05 | 0.04 | 0.05 | 0.05 |
| CaO | 2.00 | 3.93 | 3.95 | 3.92 | 4.00 | 3.98 | 3.89 | 3.92 | 3.97 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.004 | 0.004 | 0.004 | 0.004 | 0.004 | 0.074 | 0.075 |
| $CeO_2$ | 0.000 | 0.000 | 0.000 | 0.000 | 0.000 | 0.000 | 0.000 | 0.000 | 0.000 |
| NiO | 0.015 | 0.029 | 0.029 | 0.000 | 0.000 | 0.000 | 0.000 | 0.000 | 0.000 |
| $Co_3O_4$ | 0.002 | 0.009 | 0.009 | 0.006 | 0.006 | 0.006 | 0.006 | 0.000 | 0.000 |
| $Cr_2O_3$ | 0.027 | 0.000 | 0.000 | 0.000 | 0.000 | 0.000 | 0.000 | 0.000 | 0.000 |
| CuO | 0.219 | 0.132 | 0.129 | 0.132 | 0.130 | 0.160 | 0.155 | 0.000 | 0.000 |
| $HfO_2$ | 0.000 | 0.000 | 0.000 | 0.000 | 0.000 | 0.000 | 0.000 | 0.000 | 0.000 |
| $MnO_2$ | 0.000 | 0.001 | 0.001 | 0.000 | 0.000 | 0.000 | 0.000 | 1.056 | 1.081 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.004 | 0.000 | 0.000 | 0.000 | 0.006 |
| Cl | 0.007 | 0.009 | 0.009 | 0.011 | 0.009 | 0.011 | 0.009 | 0.009 | 0.011 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30U

| | Ex. (mol %) | | | | | | | | |
|---|---|---|---|---|---|---|---|---|---|
| | ORA-180 | ORA-181 | ORA-182 | ORA-183 | ORA-184 | ORA-185 | ORA-186 | ORA-187 | ORA-188 |
| $SiO_2$ | 58.69 | 58.89 | 58.60 | 58.69 | 57.79 | 57.28 | 57.43 | 57.09 | 57.38 |
| $Al_2O_3$ | 16.22 | 16.37 | 16.48 | 16.37 | 17.33 | 17.18 | 17.16 | 17.37 | 17.30 |
| $B_2O_3$ | 5.96 | 6.02 | 6.05 | 6.08 | 6.04 | 6.31 | 6.21 | 6.13 | 6.17 |
| $P_2O_5$ | 0.00 | 0.00 | 0.00 | 0.00 | 0.00 | 0.00 | 0.00 | 0.00 | 0.00 |
| $Li_2O$ | 10.10 | 10.06 | 10.15 | 10.20 | 9.91 | 10.07 | 9.97 | 10.08 | 10.17 |
| $Na_2O$ | 4.22 | 4.31 | 4.30 | 4.28 | 4.32 | 4.34 | 4.32 | 4.34 | 4.31 |
| $K_2O$ | 0.21 | 0.20 | 0.20 | 0.20 | 0.20 | 0.20 | 0.20 | 0.20 | 0.20 |
| MgO | 0.05 | 0.04 | 0.04 | 0.04 | 0.05 | 0.05 | 0.05 | 0.05 | 0.05 |
| CaO | 3.88 | 3.94 | 3.98 | 3.95 | 4.31 | 4.22 | 4.26 | 4.27 | 4.26 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.57 | 0.00 | 0.00 | 0.00 | 0.00 | 0.00 | 0.00 | 0.00 | 0.00 |
| $Fe_2O_3$ | 0.075 | 0.004 | 0.004 | 0.004 | 0.005 | 0.004 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.000 | 0.029 | 0.030 | 0.028 | 0.000 | 0.000 | 0.000 | 0.000 | 0.000 |
| $Co_3O_4$ | 0.001 | 0.009 | 0.009 | 0.009 | 0.000 | 0.000 | 0.000 | 0.000 | 0.000 |
| $Cr_2O_3$ | 0.000 | 0.000 | 0.000 | 0.000 | 0.015 | 0.015 | 0.010 | 0.010 | 0.005 |
| CuO | 0.001 | 0.113 | 0.120 | 0.119 | 0.001 | 0.321 | 0.370 | 0.420 | 0.135 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.000 | 0.000 | 0.001 | 0.002 | 0.002 | 0.001 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.008 | 0.000 | 0.000 | 0.000 | 0.000 | 0.000 | 0.006 |
| Cl | 0.011 | 0.013 | 0.015 | 0.013 | 0.011 | 0.009 | 0.009 | 0.011 | 0.011 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30V

| | Ex. (mol %) | | | | | | | | |
|---|---|---|---|---|---|---|---|---|---|
| | ORA-189 | ORA-190 | ORA-191 | ORA-192 | ORA-193 | ORA-194 | ORA-195 | ORA-196 | ORA-197 |
| $SiO_2$ | 58.03 | 58.38 | 58.51 | 57.61 | 59.47 | 59.58 | 59.21 | 59.10 | 61.08 |
| $Al_2O_3$ | 16.91 | 16.78 | 16.62 | 17.18 | 16.37 | 16.35 | 16.41 | 16.46 | 15.56 |
| $B_2O_3$ | 6.14 | 6.05 | 6.18 | 6.16 | 5.81 | 5.65 | 5.93 | 5.93 | 5.79 |
| $P_2O_5$ | 0.00 | 0.00 | 0.00 | 0.00 | 0.00 | 0.00 | 0.00 | 0.00 | 0.00 |
| $Li_2O$ | 10.13 | 10.06 | 10.08 | 10.16 | 9.22 | 8.75 | 9.38 | 8.95 | 9.29 |
| $Na_2O$ | 4.30 | 4.28 | 4.28 | 4.35 | 3.76 | 3.28 | 3.77 | 3.27 | 3.79 |
| $K_2O$ | 0.20 | 0.20 | 0.20 | 0.20 | 0.19 | 0.20 | 0.20 | 0.20 | 0.20 |
| MgO | 0.04 | 0.05 | 0.05 | 0.05 | 0.05 | 0.06 | 0.95 | 1.91 | 0.05 |
| CaO | 4.11 | 4.07 | 3.99 | 4.19 | 4.89 | 5.91 | 3.94 | 3.95 | 4.01 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.004 | 0.004 | 0.004 | 0.005 | 0.004 | 0.005 | 0.005 |
| $CeO_2$ | 0.000 | 0.000 | 0.000 | 0.000 | 0.000 | 0.000 | 0.000 | 0.000 | 0.000 |
| NiO | 0.000 | 0.004 | 0.000 | 0.000 | 0.016 | 0.015 | 0.016 | 0.017 | 0.016 |
| $Co_3O_4$ | 0.008 | 0.009 | 0.004 | 0.004 | 0.000 | 0.000 | 0.000 | 0.000 | 0.000 |
| $Cr_2O_3$ | 0.019 | 0.039 | 0.019 | 0.039 | 0.030 | 0.029 | 0.028 | 0.028 | 0.029 |
| CuO | 0.090 | 0.053 | 0.045 | 0.028 | 0.162 | 0.164 | 0.157 | 0.162 | 0.160 |
| $HfO_2$ | 0.000 | 0.000 | 0.000 | 0.000 | 0.000 | 0.000 | 0.000 | 0.000 | 0.000 |
| $MnO_2$ | 0.000 | 0.007 | 0.002 | 0.001 | 0.004 | 0.003 | 0.004 | 0.001 | 0.004 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.002 | 0.000 | 0.000 | 0.000 | 0.000 | 0.000 | 0.001 | 0.000 | 0.000 |
| Cl | 0.009 | 0.009 | 0.009 | 0.011 | 0.007 | 0.007 | 0.009 | 0.007 | 0.009 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30W

| | Ex. (mol %) | | | | | | | | |
|---|---|---|---|---|---|---|---|---|---|
| | ORA-198 | ORA-199 | ORA-200 | ORA-201 | ORA-202 | ORA-203 | ORA-204 | ORA-205 | ORA-206 |
| $SiO_2$ | 61.52 | 59.08 | 59.30 | 59.66 | 58.87 | 61.10 | 61.75 | 58.14 | 58.87 |
| $Al_2O_3$ | 15.16 | 16.42 | 16.47 | 16.33 | 16.67 | 15.45 | 15.23 | 16.87 | 16.53 |
| $B_2O_3$ | 5.98 | 5.95 | 5.73 | 5.77 | 5.85 | 5.89 | 5.57 | 6.08 | 5.91 |
| $P_2O_5$ | 0.00 | 0.00 | 0.00 | 0.00 | 0.00 | 0.00 | 0.00 | 0.00 | 0.02 |
| $Li_2O$ | 8.24 | 9.44 | 8.83 | 9.31 | 8.94 | 9.43 | 8.33 | 9.92 | 9.92 |
| $Na_2O$ | 1.20 | 3.75 | 3.26 | 3.74 | 3.29 | 3.77 | 1.20 | 4.34 | 4.29 |
| $K_2O$ | 0.20 | 0.19 | 0.19 | 0.19 | 0.20 | 0.20 | 0.20 | 0.20 | 0.19 |
| MgO | 0.07 | 0.05 | 0.06 | 0.93 | 1.94 | 0.05 | 0.07 | 0.05 | 0.05 |
| CaO | 7.41 | 4.92 | 5.96 | 3.89 | 4.05 | 3.95 | 7.46 | 4.19 | 3.99 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.005 | 0.005 | 0.005 | 0.004 | 0.005 | 0.005 | 0.005 | 0.004 | 0.025 |
| $CeO_2$ | 0.000 | 0.000 | 0.000 | 0.000 | 0.000 | 0.000 | 0.000 | 0.000 | 0.000 |
| NiO | 0.016 | 0.031 | 0.030 | 0.032 | 0.033 | 0.034 | 0.030 | 0.029 | 0.030 |
| $Co_3O_4$ | 0.000 | 0.008 | 0.008 | 0.008 | 0.008 | 0.008 | 0.008 | 0.009 | 0.009 |
| $Cr_2O_3$ | 0.028 | 0.000 | 0.000 | 0.000 | 0.000 | 0.000 | 0.000 | 0.000 | 0.000 |
| CuO | 0.160 | 0.122 | 0.132 | 0.116 | 0.124 | 0.117 | 0.128 | 0.146 | 0.124 |
| $HfO_2$ | 0.000 | 0.000 | 0.000 | 0.000 | 0.000 | 0.000 | 0.000 | 0.000 | 0.000 |
| $MnO_2$ | 0.000 | 0.004 | 0.000 | 0.004 | 0.000 | 0.002 | 0.002 | 0.000 | 0.020 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.005 | 0.000 | 0.000 | 0.000 | 0.000 | 0.005 | 0.000 | 0.000 |
| Cl | 0.007 | 0.009 | 0.007 | 0.007 | 0.009 | 0.009 | 0.005 | 0.000 | 0.000 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30X

| | Ex. (mol %) | | | | | | | | |
|---|---|---|---|---|---|---|---|---|---|
| | ORA-207 | ORA-208 | ORA-209 | ORA-210 | ORA-211 | ORA-211 | ORA-212 | ORA-213 | ORA-214 |
| $SiO_2$ | 58.64 | 58.03 | 58.01 | 59.08 | 59.03 | 59.03 | 58.05 | 59.09 | 62.20 |
| $Al_2O_3$ | 16.67 | 16.82 | 16.91 | 16.49 | 16.44 | 16.44 | 16.96 | 16.53 | 14.80 |
| $B_2O_3$ | 5.97 | 6.11 | 6.09 | 5.87 | 5.90 | 5.90 | 6.03 | 6.09 | 6.05 |
| $P_2O_5$ | 0.02 | 0.00 | 0.00 | 0.03 | 0.02 | 0.02 | 0.00 | 0.00 | 0.00 |
| $Li_2O$ | 9.82 | 10.05 | 10.04 | 9.96 | 9.94 | 9.94 | 9.97 | 11.78 | 8.89 |
| $Na_2O$ | 4.29 | 4.36 | 4.35 | 4.24 | 4.28 | 4.28 | 4.36 | 6.21 | 1.41 |
| $K_2O$ | 0.19 | 0.20 | 0.20 | 0.19 | 0.19 | 0.19 | 0.20 | 0.19 | 0.20 |
| MgO | 0.05 | 0.04 | 0.05 | 0.05 | 0.05 | 0.05 | 0.05 | 0.01 | 0.06 |
| CaO | 4.13 | 4.17 | 4.22 | 3.95 | 4.02 | 4.02 | 4.23 | 0.01 | 6.18 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.020 | 0.020 | 0.005 | 0.025 | 0.019 | 0.019 | 0.020 | 0.004 | 0.005 |
| $CeO_2$ | 0.000 | 0.000 | 0.000 | 0.000 | 0.000 | 0.000 | 0.000 | 0.000 | 0.000 |
| NiO | 0.034 | 0.030 | 0.018 | 0.018 | 0.017 | 0.017 | 0.017 | 0.019 | 0.016 |
| $Co_3O_4$ | 0.009 | 0.009 | 0.002 | 0.002 | 0.002 | 0.002 | 0.002 | 0.002 | 0.000 |
| $Cr_2O_3$ | 0.000 | 0.000 | 0.027 | 0.026 | 0.026 | 0.026 | 0.029 | 0.026 | 0.029 |
| CuO | 0.141 | 0.136 | 0.061 | 0.038 | 0.045 | 0.045 | 0.079 | 0.028 | 0.157 |
| $HfO_2$ | 0.000 | 0.000 | 0.000 | 0.000 | 0.000 | 0.000 | 0.000 | 0.000 | 0.000 |
| $MnO_2$ | 0.015 | 0.002 | 0.003 | 0.022 | 0.014 | 0.014 | 0.002 | 0.001 | 0.001 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.000 | 0.000 | 0.000 |
| Cl | 0.000 | 0.000 | 0.000 | 0.000 | 0.000 | 0.000 | 0.000 | 0.000 | 0.000 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30Y

| | Ex. (mol %) | | | | | | | | |
|---|---|---|---|---|---|---|---|---|---|
| | ORA-215 | ORA-216 | ORA-217 | ORA-218 | ORA-219 | ORA-220 | ORA-221 | ORA-222 | ORA-223 |
| $SiO_2$ | 61.74 | 62.49 | 62.52 | 62.48 | 62.06 | 60.17 | 60.04 | 60.22 | 61.06 |
| $Al_2O_3$ | 15.04 | 14.77 | 14.73 | 14.78 | 15.15 | 15.89 | 15.86 | 15.81 | 15.39 |
| $B_2O_3$ | 6.06 | 5.96 | 5.99 | 5.99 | 5.88 | 6.03 | 6.19 | 6.14 | 6.05 |
| $P_2O_5$ | 0.00 | 0.00 | 0.00 | 0.00 | 0.00 | 0.00 | 0.00 | 0.00 | 0.00 |
| $Li_2O$ | 9.03 | 8.90 | 8.91 | 8.96 | 8.90 | 8.81 | 8.93 | 8.96 | 8.94 |
| $Na_2O$ | 1.41 | 1.40 | 1.41 | 1.40 | 1.41 | 1.40 | 1.40 | 1.41 | 1.40 |
| $K_2O$ | 0.20 | 0.20 | 0.20 | 0.20 | 0.20 | 0.20 | 0.20 | 0.20 | 0.20 |
| MgO | 0.99 | 1.94 | 2.92 | 3.90 | 5.06 | 0.07 | 1.00 | 1.98 | 2.88 |
| CaO | 5.25 | 4.10 | 3.08 | 2.06 | 1.07 | 7.19 | 6.12 | 5.02 | 3.84 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.005 | 0.005 | 0.005 | 0.005 | 0.005 | 0.006 | 0.005 | 0.005 | 0.005 |
| $CeO_2$ | 0.000 | 0.000 | 0.000 | 0.000 | 0.000 | 0.000 | 0.000 | 0.000 | 0.000 |
| NiO | 0.015 | 0.017 | 0.018 | 0.021 | 0.018 | 0.017 | 0.018 | 0.018 | 0.017 |
| $Co_3O_4$ | 0.000 | 0.000 | 0.000 | 0.000 | 0.000 | 0.000 | 0.000 | 0.000 | 0.000 |
| $Cr_2O_3$ | 0.030 | 0.028 | 0.029 | 0.028 | 0.029 | 0.029 | 0.029 | 0.029 | 0.027 |
| CuO | 0.221 | 0.181 | 0.172 | 0.181 | 0.197 | 0.193 | 0.196 | 0.199 | 0.191 |
| $HfO_2$ | 0.000 | 0.000 | 0.000 | 0.000 | 0.000 | 0.000 | 0.000 | 0.000 | 0.000 |
| $MnO_2$ | 0.001 | 0.001 | 0.000 | 0.000 | 0.001 | 0.001 | 0.001 | 0.002 | 0.001 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.000 | 0.000 | 0.000 |
| Cl | 0.000 | 0.000 | 0.000 | 0.000 | 0.000 | 0.000 | 0.000 | 0.000 | 0.000 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30Z

| | Ex. (mol %) | | | | | | | | |
|---|---|---|---|---|---|---|---|---|---|
| | ORA-224 | ORA-225 | ORA-226 | ORA-227 | ORA-228 | ORA-229 | ORA-230 | ORA-231 | ORA-232 |
| $SiO_2$ | 60.16 | 60.87 | 58.66 | 59.73 | 61.24 | 61.20 | 61.14 | 59.00 | 59.98 |
| $Al_2O_3$ | 15.99 | 15.63 | 17.75 | 16.64 | 15.39 | 15.42 | 15.41 | 17.77 | 16.87 |
| $B_2O_3$ | 5.99 | 5.96 | 6.06 | 6.05 | 5.95 | 5.90 | 5.91 | 5.86 | 6.19 |
| $P_2O_5$ | 0.00 | 0.00 | 0.00 | 0.00 | 0.00 | 0.00 | 0.00 | 0.00 | 0.00 |
| $Li_2O$ | 8.89 | 8.88 | 10.62 | 10.31 | 9.93 | 9.95 | 9.96 | 10.51 | 9.96 |
| $Na_2O$ | 1.43 | 1.42 | 1.58 | 1.54 | 1.50 | 1.50 | 1.49 | 1.60 | 1.51 |
| $K_2O$ | 0.20 | 0.20 | 0.20 | 0.19 | 0.20 | 0.20 | 0.20 | 0.20 | 0.20 |
| MgO | 4.06 | 4.91 | 4.28 | 4.32 | 4.24 | 3.08 | 1.92 | 4.28 | 4.31 |
| CaO | 2.99 | 1.86 | 0.61 | 0.97 | 1.32 | 2.53 | 3.74 | 0.62 | 0.97 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.005 | 0.005 | 0.004 | 0.004 | 0.005 | 0.004 | 0.005 | 0.004 | 0.004 |
| $CeO_2$ | 0.000 | 0.000 | 0.000 | 0.000 | 0.000 | 0.000 | 0.000 | 0.000 | 0.001 |
| NiO | 0.017 | 0.017 | 0.017 | 0.018 | 0.016 | 0.015 | 0.016 | 0.033 | 0.000 |
| $Co_3O_4$ | 0.000 | 0.000 | 0.000 | 0.000 | 0.000 | 0.000 | 0.000 | 0.009 | 0.000 |
| $Cr_2O_3$ | 0.029 | 0.028 | 0.028 | 0.027 | 0.028 | 0.027 | 0.027 | 0.000 | 0.000 |
| CuO | 0.230 | 0.212 | 0.187 | 0.175 | 0.175 | 0.176 | 0.169 | 0.123 | 0.000 |
| $HfO_2$ | 0.000 | 0.000 | 0.000 | 0.000 | 0.000 | 0.000 | 0.000 | 0.000 | 0.000 |
| $MnO_2$ | 0.003 | 0.000 | 0.001 | 0.001 | 0.001 | 0.001 | 0.001 | 0.001 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.000 | 0.000 | 0.000 |
| Cl | 0.000 | 0.000 | 0.000 | 0.000 | 0.000 | 0.000 | 0.000 | 0.000 | 0.007 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30AA

| | Ex. (mol %) | | | | | | | | |
|---|---|---|---|---|---|---|---|---|---|
| | ORA-233 | ORA-234 | ORA-235 | ORA-236 | ORA-237 | ORA-238 | ORA-239 | ORA-240 | ORA-241 |
| $SiO_2$ | 61.48 | 60.82 | 61.59 | 60.38 | 59.54 | 58.78 | 58.67 | 58.87 | 58.93 |
| $Al_2O_3$ | 15.58 | 15.90 | 15.28 | 15.51 | 15.98 | 16.53 | 16.55 | 16.50 | 16.41 |
| $B_2O_3$ | 6.03 | 5.95 | 6.01 | 5.93 | 5.90 | 6.31 | 6.19 | 6.27 | 6.25 |
| $P_2O_5$ | 0.00 | 0.00 | 0.00 | 0.00 | 0.00 | 0.00 | 0.00 | 0.00 | 0.00 |
| $Li_2O$ | 9.69 | 9.52 | 9.28 | 8.65 | 8.69 | 9.66 | 9.62 | 9.59 | 9.69 |
| $Na_2O$ | 1.48 | 1.44 | 1.38 | 1.41 | 1.52 | 1.45 | 1.46 | 1.46 | 1.45 |
| $K_2O$ | 0.20 | 0.20 | 0.20 | 0.20 | 0.19 | 0.19 | 0.19 | 0.19 | 0.19 |
| MgO | 4.22 | 3.17 | 1.89 | 2.88 | 5.05 | 2.18 | 2.16 | 2.17 | 2.16 |
| CaO | 1.31 | 2.86 | 4.16 | 3.83 | 1.88 | 4.75 | 4.78 | 4.78 | 4.78 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.99 | 1.02 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.004 | 0.003 | 0.003 | 0.005 | 0.005 | 0.006 | 0.005 |
| $CeO_2$ | 0.004 | 0.001 | 0.000 | 0.209 | 0.213 | 0.000 | 0.000 | 0.000 | 0.000 |
| NiO | 0.000 | 0.008 | 0.016 | 0.000 | 0.000 | 0.009 | 0.039 | 0.040 | 0.000 |
| $Co_3O_4$ | 0.000 | 0.000 | 0.000 | 0.000 | 0.000 | 0.001 | 0.004 | 0.004 | 0.004 |
| $Cr_2O_3$ | 0.000 | 0.013 | 0.026 | 0.001 | 0.001 | 0.014 | 0.036 | 0.024 | 0.035 |
| CuO | 0.000 | 0.098 | 0.164 | 0.001 | 0.000 | 0.106 | 0.281 | 0.101 | 0.091 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.000 | 0.000 | 0.000 | 0.000 | 0.001 | 0.003 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.000 | 0.000 | 0.000 |
| Cl | 0.005 | 0.007 | 0.005 | 0.009 | 0.007 | 0.000 | 0.000 | 0.000 | 0.000 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30BB

| Ex. (mol %) | ORA-242 | ORA-243 | ORA-244 | ORA-245 | ORA-246 | ORA-247 | ORA-248 | ORA-249 | ORA-250 |
|---|---|---|---|---|---|---|---|---|---|
| $SiO_2$ | 58.94 | 59.48 | 58.54 | 58.48 | 58.76 | 60.53 | 60.31 | 61.47 | 60.28 |
| $Al_2O_3$ | 16.76 | 16.21 | 16.48 | 16.62 | 16.48 | 15.05 | 15.08 | 14.54 | 15.16 |
| $B_2O_3$ | 5.90 | 6.16 | 6.32 | 6.27 | 6.24 | 5.91 | 6.02 | 5.92 | 5.81 |
| $P_2O_5$ | 0.00 | 0.00 | 0.00 | 0.00 | 0.00 | 0.00 | 0.00 | 0.00 | 0.00 |
| $Li_2O$ | 9.32 | 9.56 | 9.85 | 9.80 | 9.71 | 10.04 | 10.08 | 9.92 | 9.95 |
| $Na_2O$ | 1.47 | 1.47 | 1.45 | 1.45 | 1.45 | 1.84 | 1.86 | 1.83 | 1.86 |
| $K_2O$ | 0.19 | 0.20 | 0.19 | 0.19 | 0.19 | 0.20 | 0.20 | 0.19 | 0.20 |
| MgO | 2.20 | 2.07 | 2.17 | 2.18 | 2.16 | 2.03 | 2.02 | 1.92 | 2.02 |
| CaO | 4.89 | 4.69 | 4.73 | 4.76 | 4.74 | 2.09 | 2.11 | 1.99 | 2.13 |
| ZnO | 0.00 | 0.00 | 0.00 | 0.00 | 0.00 | 1.07 | 1.07 | 1.01 | 1.10 |
| $TiO_2$ | 0.01 | 0.01 | 0.01 | 0.01 | 0.01 | 1.01 | 1.02 | 0.99 | 1.02 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.005 | 0.005 | 0.005 | 0.005 | 0.005 | 0.003 | 0.004 | 0.004 | 0.002 |
| $CeO_2$ | 0.000 | 0.000 | 0.000 | 0.000 | 0.000 | 0.216 | 0.218 | 0.201 | 0.424 |
| NiO | 0.000 | 0.036 | 0.022 | 0.021 | 0.019 | 0.000 | 0.000 | 0.000 | 0.000 |
| $Co_3O_4$ | 0.001 | 0.001 | 0.003 | 0.003 | 0.002 | 0.000 | 0.000 | 0.000 | 0.000 |
| $Cr_2O_3$ | 0.025 | 0.034 | 0.029 | 0.030 | 0.031 | 0.000 | 0.000 | 0.000 | 0.000 |
| CuO | 0.279 | 0.101 | 0.212 | 0.193 | 0.187 | 0.000 | 0.000 | 0.000 | 0.000 |
| $HfO_2$ | 0.000 | 0.000 | 0.000 | 0.000 | 0.000 | 0.000 | 0.000 | 0.000 | 0.000 |
| $MnO_2$ | 0.004 | 0.001 | 0.000 | 0.000 | 0.001 | 0.000 | 0.000 | 0.000 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.000 | 0.000 | 0.014 |
| Cl | 0.000 | 0.000 | 0.000 | 0.000 | 0.000 | 0.011 | 0.009 | 0.007 | 0.007 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30CC

| Ex. (mol %) | ORA-251 | ORA-252 | ORA-253 | ORA-254 | ORA-255 | ORA-256 | ORA-257 | ORA-258 | ORA-259 |
|---|---|---|---|---|---|---|---|---|---|
| $SiO_2$ | 61.13 | 60.99 | 60.54 | 60.74 | 59.21 | 59.45 | 61.01 | 61.36 | 60.91 |
| $Al_2O_3$ | 14.65 | 14.71 | 15.08 | 14.92 | 15.59 | 15.65 | 14.78 | 15.14 | 14.73 |
| $B_2O_3$ | 5.90 | 5.86 | 5.89 | 5.89 | 6.10 | 6.05 | 5.95 | 5.25 | 5.98 |
| $P_2O_5$ | 0.00 | 0.05 | 0.00 | 0.00 | 0.00 | 0.00 | 0.00 | 0.00 | 0.00 |
| $Li_2O$ | 10.00 | 9.98 | 9.98 | 9.98 | 10.15 | 9.94 | 9.81 | 9.59 | 9.90 |
| $Na_2O$ | 1.83 | 1.84 | 1.87 | 1.86 | 1.81 | 1.83 | 1.76 | 1.80 | 1.81 |
| $K_2O$ | 0.19 | 0.19 | 0.19 | 0.19 | 0.18 | 0.18 | 0.18 | 0.18 | 0.19 |
| MgO | 1.94 | 1.96 | 2.01 | 1.49 | 2.23 | 2.24 | 2.09 | 2.01 | 2.01 |
| CaO | 2.03 | 2.05 | 2.11 | 2.09 | 2.29 | 2.26 | 2.14 | 2.12 | 2.09 |
| ZnO | 1.02 | 1.03 | 1.07 | 1.59 | 1.19 | 1.11 | 1.07 | 1.07 | 1.05 |
| $TiO_2$ | 0.99 | 1.00 | 1.02 | 1.01 | 1.03 | 1.04 | 0.99 | 1.03 | 1.00 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.10 | 0.10 | 0.00 | 0.00 | 0.00 | 0.00 | 0.00 | 0.00 | 0.10 |
| $Fe_2O_3$ | 0.004 | 0.004 | 0.004 | 0.003 | 0.004 | 0.004 | 0.004 | 0.002 | 0.003 |
| $CeO_2$ | 0.206 | 0.208 | 0.214 | 0.208 | 0.219 | 0.218 | 0.209 | 0.427 | 0.210 |
| NiO | 0.000 | 0.000 | 0.000 | 0.000 | 0.000 | 0.000 | 0.000 | 0.000 | 0.000 |
| $Co_3O_4$ | 0.000 | 0.000 | 0.000 | 0.000 | 0.000 | 0.000 | 0.000 | 0.000 | 0.000 |
| $Cr_2O_3$ | 0.000 | 0.000 | 0.000 | 0.000 | 0.000 | 0.000 | 0.000 | 0.000 | 0.000 |
| CuO | 0.000 | 0.000 | 0.000 | 0.000 | 0.000 | 0.000 | 0.000 | 0.000 | 0.000 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.000 | 0.000 | 0.000 | 0.000 | 0.000 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.021 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.009 | 0.000 | 0.000 | 0.000 | 0.007 | 0.000 | 0.000 | 0.002 |
| Cl | 0.007 | 0.009 | 0.007 | 0.007 | 0.007 | 0.005 | 0.005 | 0.007 | 0.007 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30DD

| Ex. (mol %) | ORA-260 | ORA-261 | ORA-262 | ORA-263 | ORA-264 | ORA-265 | ORA-266 | ORA-267 | ORA-268 |
|---|---|---|---|---|---|---|---|---|---|
| $SiO_2$ | 60.80 | 59.47 | 60.46 | 64.70 | 64.67 | 64.27 | 64.56 | 64.76 | 64.07 |
| $Al_2O_3$ | 14.64 | 15.69 | 15.29 | 12.99 | 13.00 | 12.89 | 13.02 | 12.96 | 12.95 |
| $B_2O_3$ | 5.98 | 6.03 | 5.99 | 5.83 | 5.81 | 5.72 | 5.83 | 5.74 | 5.64 |
| $P_2O_5$ | 0.05 | 0.00 | 0.00 | 0.00 | 0.00 | 0.00 | 0.00 | 0.00 | 0.00 |
| $Li_2O$ | 9.99 | 9.95 | 9.67 | 11.98 | 12.02 | 11.71 | 12.07 | 10.02 | 9.96 |
| $Na_2O$ | 1.74 | 1.80 | 1.82 | 2.81 | 2.80 | 2.73 | 2.82 | 1.84 | 1.82 |
| $K_2O$ | 0.17 | 0.18 | 0.18 | 0.19 | 0.20 | 0.19 | 0.20 | 0.20 | 0.20 |
| MgO | 2.05 | 2.21 | 1.56 | 0.01 | 0.01 | 0.01 | 0.01 | 0.03 | 0.03 |
| CaO | 2.13 | 2.23 | 2.16 | 0.01 | 0.01 | 0.01 | 0.01 | 2.93 | 2.98 |
| ZnO | 1.13 | 1.15 | 1.62 | 0.00 | 0.00 | 0.00 | 0.00 | 0.00 | 0.00 |
| $TiO_2$ | 0.99 | 1.04 | 1.03 | 0.98 | 0.98 | 0.97 | 0.98 | 0.98 | 0.98 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.10 | 0.00 | 0.00 | 0.05 | 0.05 | 0.04 | 0.05 | 0.05 | 0.05 |
| $Fe_2O_3$ | 0.003 | 0.004 | 0.003 | 0.002 | 0.002 | 0.002 | 0.002 | 0.003 | 0.003 |
| $CeO_2$ | 0.212 | 0.223 | 0.219 | 0.201 | 0.205 | 0.200 | 0.207 | 0.200 | 0.203 |
| NiO | 0.000 | 0.000 | 0.000 | 0.000 | 0.000 | 0.000 | 0.000 | 0.000 | 0.000 |
| $Co_3O_4$ | 0.000 | 0.000 | 0.000 | 0.000 | 0.000 | 0.000 | 0.000 | 0.000 | 0.000 |
| $Cr_2O_3$ | 0.000 | 0.000 | 0.000 | 0.000 | 0.000 | 0.000 | 0.000 | 0.000 | 0.000 |
| CuO | 0.000 | 0.000 | 0.000 | 0.000 | 0.000 | 0.000 | 0.000 | 0.000 | 0.000 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.000 | 0.000 | 0.000 | 0.000 | 0.000 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.021 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.000 | 0.000 | 0.003 |
| Cl | 0.007 | 0.007 | 0.005 | 0.012 | 0.014 | 1.019 | 0.016 | 0.011 | 0.012 |
| F | 0.000 | 0.000 | 0.000 | 0.231 | 0.231 | 0.230 | 0.231 | 0.266 | 1.093 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30EE

| Ex. (mol %) | ORA-269 | ORA-270 | ORA-271 | ORA-272 | ORA-273 | ORA-274 | ORA-275 | ORA-276 | ORA-277 |
|---|---|---|---|---|---|---|---|---|---|
| $SiO_2$ | 63.99 | 63.75 | 63.77 | 61.32 | 60.98 | 63.28 | 62.41 | 63.31 | 62.35 |
| $Al_2O_3$ | 12.94 | 12.77 | 12.78 | 15.29 | 15.41 | 14.67 | 14.80 | 14.64 | 15.09 |
| $B_2O_3$ | 5.78 | 5.72 | 5.55 | 5.84 | 6.08 | 5.87 | 5.93 | 5.67 | 5.93 |
| $P_2O_5$ | 0.00 | 0.00 | 0.00 | 0.00 | 0.00 | 0.00 | 0.00 | 0.00 | 0.00 |
| $Li_2O$ | 9.95 | 9.65 | 9.67 | 9.35 | 9.57 | 8.88 | 8.87 | 8.78 | 8.95 |
| $Na_2O$ | 1.82 | 1.78 | 1.78 | 1.47 | 1.42 | 1.35 | 1.36 | 1.36 | 1.36 |
| $K_2O$ | 0.20 | 0.19 | 0.19 | 0.20 | 0.20 | 0.00 | 0.00 | 0.00 | 0.00 |
| MgO | 0.03 | 0.03 | 0.03 | 1.99 | 1.96 | 2.78 | 2.80 | 2.75 | 2.89 |
| CaO | 2.96 | 2.92 | 2.93 | 4.23 | 4.22 | 1.91 | 1.94 | 1.91 | 2.00 |
| ZnO | 0.00 | 0.00 | 0.00 | 0.00 | 0.00 | 0.95 | 0.98 | 0.97 | 1.01 |
| $TiO_2$ | 0.98 | 0.97 | 0.96 | 0.05 | 0.01 | 0.01 | 0.59 | 0.29 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.05 | 0.04 | 0.04 | 0.00 | 0.00 | 0.00 | 0.00 | 0.00 | 0.10 |
| $Fe_2O_3$ | 0.003 | 0.003 | 0.003 | 0.005 | 0.005 | 0.002 | 0.002 | 0.002 | 0.002 |
| $CeO_2$ | 0.206 | 0.195 | 0.198 | 0.000 | 0.000 | 0.299 | 0.303 | 0.305 | 0.308 |
| NiO | 0.000 | 0.000 | 0.000 | 0.000 | 0.022 | 0.000 | 0.000 | 0.000 | 0.000 |
| $Co_3O_4$ | 0.000 | 0.000 | 0.000 | 0.002 | 0.009 | 0.000 | 0.000 | 0.000 | 0.000 |
| $Cr_2O_3$ | 0.000 | 0.000 | 0.000 | 0.000 | 0.000 | 0.000 | 0.000 | 0.000 | 0.000 |
| CuO | 0.000 | 0.000 | 0.000 | 0.264 | 0.113 | 0.000 | 0.000 | 0.000 | 0.000 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.001 | 0.000 | 0.000 | 0.000 | 0.000 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.001 | 0.000 | 0.000 |
| Cl | 0.011 | 1.011 | 1.064 | 0.000 | 0.009 | 0.004 | 0.004 | 0.005 | 0.005 |
| F | 1.094 | 0.989 | 1.022 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30FF

| Ex. (mol %) | ORA-278 | ORA-279 | ORA-280 | ORA-281 | ORA-282 | ORA-283 | ORA-285 | ORA-286 |
|---|---|---|---|---|---|---|---|---|
| $SiO_2$ | 61.95 | 63.09 | 58.67 | 60.98 | 61.10 | 60.60 | 58.94 | 60.54 |
| $Al_2O_3$ | 15.17 | 15.05 | 17.01 | 17.21 | 14.87 | 14.93 | 14.50 | 15.63 |
| $B_2O_3$ | 5.83 | 5.88 | 5.55 | 4.81 | 5.95 | 5.82 | 5.75 | 6.08 |
| $P_2O_5$ | 0.51 | 0.50 | 0.00 | 0.00 | 0.00 | 0.00 | 0.00 | 0.00 |
| $Li_2O$ | 8.90 | 8.97 | 8.83 | 8.11 | 9.96 | 10.04 | 13.39 | 9.65 |
| $Na_2O$ | 1.36 | 1.36 | 1.41 | 1.45 | 1.86 | 1.86 | 1.39 | 1.47 |
| $K_2O$ | 0.00 | 0.00 | 0.19 | 0.20 | 0.20 | 0.19 | 0.19 | 0.20 |
| MgO | 2.92 | 2.87 | 2.22 | 2.19 | 1.98 | 1.99 | 1.79 | 1.96 |
| CaO | 2.00 | 0.96 | 4.90 | 4.90 | 2.06 | 2.07 | 3.99 | 4.38 |
| ZnO | 1.02 | 1.00 | 0.00 | 0.00 | 0.00 | 1.04 | 0.00 | 0.00 |
| $TiO_2$ | 0.01 | 0.01 | 1.08 | 0.01 | 1.01 | 1.02 | 0.01 | 0.01 |
| $ZrO_2$ | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 |
| $SnO_2$ | 0.00 | 0.00 | 0.00 | 0.00 | 0.57 | 0.00 | 0.00 | 0.00 |
| $Fe_2O_3$ | 0.003 | 0.002 | 0.005 | 0.005 | 0.002 | 0.002 | 0.005 | 0.005 |
| $CeO_2$ | 0.316 | 0.309 | 0.116 | 0.122 | 0.416 | 0.425 | 0.000 | 0.000 |
| NiO | 0.000 | 0.000 | 0.000 | 0.000 | 0.000 | 0.000 | 0.003 | 0.005 |
| $Co_3O_4$ | 0.000 | 0.000 | 0.000 | 0.000 | 0.000 | 0.000 | 0.001 | 0.001 |
| $Cr_2O_3$ | 0.000 | 0.000 | 0.001 | 0.001 | 0.000 | 0.000 | 0.000 | 0.000 |
| CuO | 0.000 | 0.000 | 0.000 | 0.000 | 0.000 | 0.000 | 0.045 | 0.071 |
| $HfO_2$ | 0.000 | 0.000 | 0.000 | 0.000 | 0.000 | 0.000 | 0.000 | 0.000 |
| $MnO_2$ | 0.000 | 0.000 | 0.000 | 0.000 | 0.000 | 0.000 | 0.000 | 0.001 |
| $As_2O_3$ | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 |
| $SO_3$ | 0.000 | 0.002 | 0.000 | 0.000 | 0.022 | 0.000 | 0.000 | 0.000 |
| Cl | 0.005 | 0.004 | 0.007 | 0.007 | 0.005 | 0.007 | 0.000 | 0.000 |
| F | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 |

TABLE 30GG

| Ex. (mol %) | ORA-287 | ORA-288 | ORA-289 | ORA-290 | ORA-291 | ORA-292 | ORA-293 | ORA-294 | ORA-295 |
|---|---|---|---|---|---|---|---|---|---|
| $SiO_2$ | 60.42 | 61.34 | 59.26 | 59.32 | 59.30 | 59.57 | 59.31 | 59.28 | 58.55 |
| $Al_2O_3$ | 15.76 | 15.32 | 16.06 | 16.19 | 16.14 | 16.03 | 16.28 | 16.36 | 16.45 |
| $B_2O_3$ | 6.15 | 5.94 | 6.27 | 6.18 | 6.25 | 6.16 | 6.03 | 6.10 | 6.20 |
| $P_2O_5$ | 0.00 | 0.00 | 0.00 | 0.00 | 0.00 | 0.00 | 0.00 | 0.00 | 0.00 |
| $Li_2O$ | 9.52 | 9.39 | 9.69 | 9.52 | 9.61 | 9.59 | 9.45 | 9.36 | 9.72 |
| $Na_2O$ | 1.46 | 1.46 | 1.48 | 1.47 | 1.47 | 1.47 | 1.49 | 1.48 | 1.46 |
| $K_2O$ | 0.20 | 0.20 | 0.19 | 0.19 | 0.19 | 0.19 | 0.19 | 0.19 | 0.19 |
| MgO | 1.99 | 1.93 | 2.17 | 2.21 | 2.18 | 2.15 | 2.25 | 2.26 | 2.34 |
| CaO | 4.43 | 4.25 | 4.63 | 4.67 | 4.60 | 4.59 | 4.73 | 4.74 | 4.80 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.006 | 0.005 | 0.006 | 0.006 | 0.006 | 0.006 | 0.006 | 0.006 | 0.006 |
| $CeO_2$ | 0.000 | 0.000 | 0.000 | 0.000 | 0.000 | 0.000 | 0.000 | 0.000 | 0.000 |
| NiO | 0.006 | 0.023 | 0.018 | 0.018 | 0.018 | 0.017 | 0.017 | 0.018 | 0.021 |
| $Co_3O_4$ | 0.001 | 0.009 | 0.002 | 0.002 | 0.002 | 0.002 | 0.002 | 0.002 | 0.002 |
| $Cr_2O_3$ | 0.000 | 0.000 | 0.030 | 0.030 | 0.031 | 0.029 | 0.029 | 0.026 | 0.028 |
| CuO | 0.053 | 0.116 | 0.179 | 0.185 | 0.190 | 0.188 | 0.193 | 0.188 | 0.219 |
| $HfO_2$ | 0.000 | 0.000 | 0.000 | 0.000 | 0.000 | 0.000 | 0.000 | 0.000 | 0.000 |
| $MnO_2$ | 0.001 | 0.001 | 0.002 | 0.001 | 0.000 | 0.001 | 0.003 | 0.000 | 0.001 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.000 | 0.000 | 0.000 |
| Cl | 0.000 | 0.000 | 0.000 | 0.000 | 0.000 | 0.000 | 0.000 | 0.000 | 0.000 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30HH

| Ex (mol %) | ORA-296 | ORA-297 | ORA-298 | ORA-299 | ORA-300 | ORA-301 | ORA-302 | ORA-303 | ORA-304 |
|---|---|---|---|---|---|---|---|---|---|
| $SiO_2$ | 59.81 | 60.62 | 59.28 | 59.05 | 59.84 | 60.24 | 60.81 | 61.20 | 61.86 |
| $Al_2O_3$ | 15.83 | 15.58 | 16.34 | 16.45 | 15.99 | 15.84 | 14.91 | 14.79 | 14.33 |
| $B_2O_3$ | 6.23 | 6.09 | 5.99 | 6.02 | 6.09 | 6.04 | 6.13 | 6.11 | 6.06 |
| $P_2O_5$ | 0.00 | 0.00 | 0.00 | 0.00 | 0.00 | 0.00 | 0.00 | 0.00 | 0.00 |
| $Li_2O$ | 9.63 | 9.44 | 11.71 | 11.72 | 9.46 | 10.42 | 10.64 | 12.51 | 10.59 |
| $Na_2O$ | 1.50 | 1.55 | 6.22 | 6.25 | 1.59 | 2.57 | 2.57 | 2.59 | 4.49 |
| $K_2O$ | 0.20 | 0.19 | 0.19 | 0.20 | 0.20 | 0.20 | 0.19 | 0.20 | 0.20 |
| MgO | 2.07 | 1.99 | 0.02 | 0.02 | 2.11 | 0.05 | 0.05 | 0.03 | 0.03 |
| CaO | 4.48 | 4.26 | 0.01 | 0.01 | 4.40 | 4.33 | 4.39 | 2.28 | 2.17 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.006 | 0.007 | 0.003 | 0.003 | 0.005 | 0.004 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.016 | 0.008 | 0.011 | 0.008 | 0.009 | 0.009 | 0.011 | 0.008 | 0.010 |
| $Co_3O_4$ | 0.002 | 0.003 | 0.000 | 0.001 | 0.002 | 0.001 | 0.002 | 0.001 | 0.001 |
| $Cr_2O_3$ | 0.029 | 0.027 | 0.024 | 0.027 | 0.028 | 0.028 | 0.029 | 0.028 | 0.027 |
| CuO | 0.189 | 0.222 | 0.173 | 0.219 | 0.243 | 0.239 | 0.249 | 0.235 | 0.219 |
| $HfO_2$ | 0.000 | 0.000 | 0.000 | 0.000 | 0.000 | 0.000 | 0.000 | 0.000 | 0.000 |
| $MnO_2$ | 0.003 | 0.001 | 0.004 | 0.000 | 0.003 | 0.004 | 0.001 | 0.000 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.010 | 0.000 | 0.000 | 0.000 | 0.002 |
| Cl | 0.000 | 0.000 | 0.011 | 0.011 | 0.009 | 0.013 | 0.011 | 0.009 | 0.011 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30II

| Ex (mol %) | ORA-305 | ORA-306 | ORA-307 | ORA-308 | ORA-309 | ORA-310 | ORA-311 | ORA-312 | ORA-313 |
|---|---|---|---|---|---|---|---|---|---|
| $SiO_2$ | 61.95 | 61.15 | 60.57 | 61.14 | 61.00 | 60.47 | 60.78 | 60.81 | 61.72 |
| $Al_2O_3$ | 14.34 | 14.82 | 14.66 | 14.53 | 14.33 | 14.61 | 14.55 | 14.61 | 14.54 |
| $B_2O_3$ | 6.01 | 6.02 | 6.06 | 5.91 | 6.04 | 6.02 | 6.01 | 5.97 | 5.97 |
| $P_2O_5$ | 0.00 | 0.00 | 0.00 | 0.00 | 0.00 | 0.00 | 0.00 | 0.00 | 0.00 |
| $Li_2O$ | 10.57 | 10.62 | 11.00 | 12.82 | 11.15 | 11.14 | 11.10 | 11.03 | 11.15 |
| $Na_2O$ | 2.53 | 2.57 | 2.88 | 2.88 | 4.80 | 2.91 | 2.88 | 2.87 | 2.84 |
| $K_2O$ | 1.17 | 0.20 | 0.19 | 0.19 | 0.19 | 1.18 | 0.20 | 0.48 | 0.19 |
| MgO | 0.04 | 2.07 | 0.05 | 0.03 | 0.03 | 0.04 | 1.98 | 1.69 | 1.06 |
| CaO | 3.12 | 2.27 | 4.33 | 2.24 | 2.17 | 3.30 | 2.23 | 2.26 | 2.25 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.004 | 0.004 | 0.004 | 0.004 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.008 | 0.008 | 0.009 | 0.008 | 0.008 | 0.009 | 0.008 | 0.008 | 0.007 |
| $Co_3O_4$ | 0.001 | 0.002 | 0.001 | 0.002 | 0.001 | 0.001 | 0.002 | 0.001 | 0.002 |
| $Cr_2O_3$ | 0.027 | 0.028 | 0.028 | 0.027 | 0.026 | 0.027 | 0.027 | 0.027 | 0.027 |
| CuO | 0.219 | 0.238 | 0.209 | 0.208 | 0.222 | 0.260 | 0.212 | 0.212 | 0.219 |
| $HfO_2$ | 0.000 | 0.000 | 0.000 | 0.000 | 0.000 | 0.000 | 0.000 | 0.000 | 0.000 |
| $MnO_2$ | 0.003 | 0.001 | 0.000 | 0.000 | 0.000 | 0.000 | 0.000 | 0.000 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.011 | 0.000 | 0.000 | 0.000 | 0.000 |
| Cl | 0.011 | 0.007 | 0.009 | 0.011 | 0.009 | 0.013 | 0.007 | 0.009 | 0.009 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30JJ

| Ex. (mol %) | ORA-314 | ORA-315 | ORA-316 | ORA-317 | ORA-318 | ORA-319 | ORA-320 | ORA-321 | ORA-322 |
|---|---|---|---|---|---|---|---|---|---|
| $SiO_2$ | 61.88 | 61.90 | 59.24 | 58.96 | 58.61 | 59.56 | 58.58 | 58.78 | 58.94 |
| $Al_2O_3$ | 14.54 | 14.59 | 16.01 | 16.03 | 16.22 | 16.07 | 16.18 | 16.41 | 16.13 |
| $B_2O_3$ | 6.00 | 5.90 | 6.00 | 6.26 | 6.25 | 5.89 | 6.25 | 5.95 | 6.12 |
| $P_2O_5$ | 0.00 | 0.00 | 0.00 | 0.00 | 0.00 | 0.00 | 0.00 | 0.00 | 0.00 |
| $Li_2O$ | 11.95 | 11.43 | 10.10 | 10.11 | 10.07 | 9.74 | 10.08 | 9.86 | 10.05 |
| $Na_2O$ | 2.87 | 3.34 | 1.47 | 1.47 | 1.47 | 1.48 | 1.47 | 1.47 | 1.49 |
| $K_2O$ | 0.19 | 0.19 | 0.19 | 0.19 | 0.19 | 0.20 | 0.19 | 0.19 | 0.19 |
| MgO | 0.03 | 0.03 | 2.15 | 2.15 | 2.24 | 2.16 | 2.31 | 2.30 | 2.22 |
| CaO | 2.25 | 2.28 | 4.55 | 4.57 | 4.67 | 4.62 | 4.67 | 4.78 | 4.62 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.006 | 0.006 | 0.006 | 0.006 | 0.006 | 0.006 | 0.006 |
| $CeO_2$ | 0.000 | 0.000 | 0.000 | 0.000 | 0.000 | 0.000 | 0.000 | 0.000 | 0.000 |
| NiO | 0.010 | 0.009 | 0.020 | 0.020 | 0.019 | 0.017 | 0.020 | 0.016 | 0.018 |
| $Co_3O_4$ | 0.001 | 0.001 | 0.002 | 0.002 | 0.002 | 0.002 | 0.002 | 0.002 | 0.002 |
| $Cr_2O_3$ | 0.027 | 0.028 | 0.030 | 0.029 | 0.031 | 0.029 | 0.030 | 0.023 | 0.029 |
| CuO | 0.203 | 0.262 | 0.214 | 0.187 | 0.197 | 0.203 | 0.191 | 0.193 | 0.183 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.000 | 0.003 | 0.001 | 0.002 | 0.002 | 0.002 | 0.001 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.010 | 0.000 | 0.000 | 0.000 | 0.000 | 0.000 | 0.000 | 0.000 | 0.000 |
| Cl | 0.009 | 0.009 | 0.000 | 0.000 | 0.000 | 0.000 | 0.000 | 0.000 | 0.000 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30KK

| Ex (mol %) | ORA-323 | ORA-324 | ORA-325 | ORA-326 | ORA-327 | ORA-328 | ORA-329 | ORA-330 | ORA-331 |
|---|---|---|---|---|---|---|---|---|---|
| $SiO_2$ | 60.45 | 60.59 | 60.02 | 60.41 | 59.73 | 60.46 | 60.17 | 60.03 | 61.68 |
| $Al_2O_3$ | 15.53 | 15.42 | 15.80 | 15.59 | 16.01 | 15.63 | 15.79 | 15.79 | 15.01 |
| $B_2O_3$ | 5.89 | 5.98 | 6.00 | 6.00 | 6.01 | 6.00 | 6.00 | 5.99 | 5.96 |
| $P_2O_5$ | 0.00 | 0.00 | 0.00 | 0.00 | 0.00 | 0.00 | 0.00 | 0.00 | 0.00 |
| $Li_2O$ | 9.95 | 9.47 | 9.51 | 9.51 | 9.52 | 9.50 | 9.51 | 9.49 | 9.44 |
| $Na_2O$ | 1.45 | 1.41 | 1.30 | 1.42 | 1.40 | 1.40 | 1.26 | 1.40 | 1.38 |
| $K_2O$ | 0.19 | 0.18 | 0.18 | 0.19 | 0.19 | 0.19 | 0.18 | 0.19 | 0.19 |
| MgO | 1.98 | 2.14 | 2.22 | 2.12 | 2.22 | 2.07 | 2.19 | 2.18 | 1.95 |
| CaO | 4.28 | 4.57 | 4.71 | 4.52 | 4.67 | 4.52 | 4.65 | 4.67 | 4.16 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.006 | 0.006 | 0.006 | 0.006 | 0.006 | 0.006 | 0.006 | 0.006 | 0.005 |
| $CeO_2$ | 0.000 | 0.000 | 0.000 | 0.000 | 0.000 | 0.000 | 0.000 | 0.000 | 0.000 |
| NiO | 0.018 | 0.018 | 0.018 | 0.017 | 0.019 | 0.012 | 0.019 | 0.015 | 0.017 |
| $Co_3O_4$ | 0.002 | 0.002 | 0.002 | 0.002 | 0.002 | 0.002 | 0.002 | 0.002 | 0.002 |
| $Cr_2O_3$ | 0.028 | 0.030 | 0.031 | 0.030 | 0.030 | 0.029 | 0.029 | 0.029 | 0.028 |
| CuO | 0.209 | 0.180 | 0.185 | 0.181 | 0.187 | 0.182 | 0.185 | 0.185 | 0.173 |
| $HfO_2$ | 0.000 | 0.000 | 0.000 | 0.000 | 0.000 | 0.000 | 0.000 | 0.000 | 0.000 |
| $MnO_2$ | 0.002 | 0.002 | 0.003 | 0.001 | 0.001 | 0.001 | 0.000 | 0.001 | 0.001 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.000 | 0.000 | 0.000 |
| Cl | 0.000 | 0.000 | 0.000 | 0.000 | 0.000 | 0.000 | 0.000 | 0.000 | 0.000 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30LL

| Ex. (mol %) | ORA-332 | ORA-333 | ORA-334 | ORA-335 | ORA-336 | ORA-337 | ORA-338 | ORA-339 | ORA-340 |
|---|---|---|---|---|---|---|---|---|---|
| $SiO_2$ | 61.47 | 61.47 | 61.51 | 61.27 | 61.46 | 61.87 | 61.25 | 61.30 | 61.64 |
| $Al_2O_3$ | 15.03 | 15.11 | 15.06 | 15.13 | 15.05 | 14.90 | 15.13 | 15.02 | 14.94 |
| $B_2O_3$ | 5.96 | 5.99 | 5.97 | 5.97 | 5.98 | 5.92 | 6.04 | 5.90 | 5.84 |
| $P_2O_5$ | 0.00 | 0.00 | 0.00 | 0.00 | 0.00 | 0.00 | 0.00 | 0.00 | 0.00 |
| $Li_2O$ | 12.21 | 12.11 | 12.06 | 12.22 | 12.23 | 12.02 | 12.17 | 12.35 | 12.33 |
| $Na_2O$ | 3.92 | 3.95 | 3.94 | 3.95 | 3.92 | 3.93 | 3.95 | 3.93 | 3.90 |
| $K_2O$ | 0.39 | 0.39 | 0.39 | 0.39 | 0.39 | 0.40 | 0.39 | 0.39 | 0.39 |
| MgO | 0.02 | 0.02 | 0.02 | 0.02 | 0.02 | 0.02 | 0.02 | 0.02 | 0.02 |
| CaO | 0.77 | 0.77 | 0.77 | 0.77 | 0.77 | 0.75 | 0.77 | 0.77 | 0.75 |
| ZnO | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.004 | 0.004 | 0.004 | 0.004 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.014 | 0.007 | 0.005 | 0.005 | 0.004 | 0.019 | 0.021 | 0.024 | 0.023 |
| $Co_3O_4$ | 0.002 | 0.001 | 0.001 | 0.002 | 0.002 | 0.001 | 0.001 | 0.002 | 0.002 |
| $Cr_2O_3$ | 0.025 | 0.023 | 0.029 | 0.024 | 0.027 | 0.023 | 0.030 | 0.023 | 0.028 |
| CuO | 0.181 | 0.154 | 0.234 | 0.232 | 0.137 | 0.134 | 0.209 | 0.251 | 0.136 |
| $HfO_2$ | 0.000 | 0.000 | 0.000 | 0.000 | 0.000 | 0.000 | 0.000 | 0.000 | 0.000 |
| $MnO_2$ | 0.000 | 0.000 | 0.002 | 0.000 | 0.000 | 0.000 | 0.001 | 0.000 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.000 | 0.000 | 0.000 | 0.000 |
| Cl | 0.000 | 0.000 | 0.000 | 0.000 | 0.000 | 0.000 | 0.000 | 0.000 | 0.000 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30MM

| Ex. (mol %) | ORA-341 | ORA-342 | ORA-343 | ORA-344 | ORA-345 | ORA-346 | ORA-347 | ORA-348 | ORA-349 |
|---|---|---|---|---|---|---|---|---|---|
| $SiO_2$ | 61.24 | 58.93 | 58.82 | 58.94 | 58.90 | 61.76 | 62.65 | 63.64 | 64.54 |
| $Al_2O_3$ | 15.06 | 16.47 | 16.44 | 16.45 | 16.45 | 15.01 | 15.08 | 14.99 | 15.05 |
| $B_2O_3$ | 6.06 | 5.91 | 5.95 | 5.92 | 5.92 | 5.81 | 4.87 | 3.93 | 2.96 |
| $P_2O_5$ | 0.00 | 0.00 | 0.00 | 0.00 | 0.00 | 0.00 | 0.00 | 0.00 | 0.00 |
| $Li_2O$ | 12.33 | 10.13 | 10.23 | 12.25 | 12.30 | 12.33 | 12.32 | 12.36 | 12.30 |
| $Na_2O$ | 3.92 | 4.26 | 4.26 | 6.19 | 6.19 | 3.78 | 3.78 | 3.79 | 3.82 |
| $K_2O$ | 0.39 | 0.29 | 0.29 | 0.20 | 0.20 | 0.39 | 0.38 | 0.39 | 0.39 |
| MgO | 0.02 | 2.98 | 2.97 | 0.02 | 0.02 | 0.03 | 0.03 | 0.03 | 0.04 |
| CaO | 0.76 | 0.03 | 0.03 | 0.01 | 0.01 | 0.61 | 0.62 | 0.62 | 0.64 |
| ZnO | 0.00 | 0.99 | 0.99 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 | 0.00 |
| $Fe_2O_3$ | 0.004 | 0.004 | 0.004 | 0.003 | 0.003 | 0.004 | 0.004 | 0.004 | 0.004 |
| $CeO_2$ | 0.000 | 0.000 | 0.000 | 0.000 | 0.000 | 0.000 | 0.000 | 0.000 | 0.000 |
| NiO | 0.018 | 0.000 | 0.000 | 0.000 | 0.000 | 0.019 | 0.022 | 0.022 | 0.021 |
| $Co_3O_4$ | 0.002 | 0.000 | 0.000 | 0.000 | 0.000 | 0.002 | 0.002 | 0.002 | 0.002 |
| $Cr_2O_3$ | 0.025 | 0.000 | 0.000 | 0.000 | 0.000 | 0.021 | 0.021 | 0.022 | 0.022 |
| CuO | 0.145 | 0.000 | 0.000 | 0.000 | 0.000 | 0.206 | 0.199 | 0.184 | 0.203 |
| $HfO_2$ | 0.000 | 0.000 | 0.000 | 0.000 | 0.000 | 0.000 | 0.000 | 0.000 | 0.000 |
| $MnO_2$ | 0.004 | 0.000 | 0.000 | 0.000 | 0.000 | 0.000 | 0.000 | 0.000 | 0.000 |
| $As_2O_3$ | 0.000 | 0.000 | 0.000 | 0.000 | 0.000 | 0.000 | 0.000 | 0.000 | 0.000 |
| $Sb_2O_3$ | 0.000 | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 | 0.000 |
| $SO_3$ | 0.000 | 0.000 | 0.000 | 0.000 | 0.000 | 0.021 | 0.000 | 0.002 | 0.000 |
| Cl | 0.000 | 0.011 | 0.011 | 0.014 | 0.014 | 0.007 | 0.007 | 0.007 | 0.011 |
| F | 0.000 | 0.000 | 0.000 | 0.000 | 0.000 | 0.000 | 0.000 | 0.000 | 0.000 |
| $Nd_2O_3$ | 0.000 | 0.000 | 0.000 | 0.000 | 0.000 | 0.000 | 0.000 | 0.000 | 0.000 |
| $Er_2O_3$ | 0.000 | 0.000 | 0.000 | 0.000 | 0.000 | 0.000 | 0.000 | 0.000 | 0.000 |

TABLE 30NN

| Ex. (mol %) | ORA-350 | ORA-351 | ORA-352 | ORA-353 | ORA-354 |
|---|---|---|---|---|---|
| $SiO_2$ | 65.24 | 66.43 | 61.57 | 61.66 | 61.64 |
| $Al_2O_3$ | 15.13 | 15.10 | 15.07 | 15.16 | 15.12 |
| $B_2O_3$ | 2.02 | 1.03 | 5.87 | 5.82 | 5.81 |
| $P_2O_5$ | 0.00 | 0.00 | 0.00 | 0.00 | 0.00 |
| $Li_2O$ | 12.43 | 12.27 | 12.38 | 12.29 | 12.38 |
| $Na_2O$ | 3.81 | 3.82 | 3.82 | 3.79 | 3.78 |
| $K_2O$ | 0.41 | 0.40 | 0.39 | 0.39 | 0.38 |
| MgO | 0.04 | 0.03 | 0.03 | 0.03 | 0.03 |
| CaO | 0.64 | 0.64 | 0.63 | 0.65 | 0.67 |
| ZnO | 0.00 | 0.00 | 0.00 | 0.00 | 0.00 |
| $TiO_2$ | 0.01 | 0.01 | 0.01 | 0.01 | 0.01 |
| $ZrO_2$ | 0.00 | 0.00 | 0.00 | 0.00 | 0.00 |
| $WO_3$ | 0.00 | 0.00 | 0.00 | 0.00 | 0.00 |
| $SnO_2$ | 0.00 | 0.00 | 0.00 | 0.00 | 0.00 |
| $Fe_2O_3$ | 0.004 | 0.004 | 0.004 | 0.004 | 0.004 |
| $CeO_2$ | 0.000 | 0.000 | 0.000 | 0.000 | 0.000 |
| NiO | 0.020 | 0.022 | 0.023 | 0.023 | 0.022 |
| $Co_3O_4$ | 0.002 | 0.002 | 0.002 | 0.002 | 0.001 |
| $Cr_2O_3$ | 0.022 | 0.022 | 0.021 | 0.022 | 0.021 |
| CuO | 0.219 | 0.212 | 0.174 | 0.137 | 0.123 |
| $HfO_2$ | 0.000 | 0.000 | 0.000 | 0.000 | 0.000 |
| $MnO_2$ | 0.001 | 0.000 | 0.004 | 0.000 | 0.001 |
| $As_2O_3$ | 0.000 | 0.000 | 0.000 | 0.000 | 0.000 |
| $Sb_2O_3$ | 0.000 | 0.000 | 0.000 | 0.000 | 0.000 |
| $V_2O_5$ | 0.000 | 0.000 | 0.000 | 0.000 | 0.000 |
| $SO_3$ | 0.004 | 0.000 | 0.000 | 0.007 | 0.000 |
| Cl | 0.011 | 0.011 | 0.009 | 0.007 | 0.007 |
| F | 0.000 | 0.000 | 0.000 | 0.000 | 0.000 |
| $Nd_2O_3$ | 0.000 | 0.000 | 0.000 | 0.000 | 0.000 |
| $Er_2O_3$ | 0.000 | 0.000 | 0.000 | 0.000 | 0.000 |

Referring now to Table 31, colored glass articles in the form of glass coupons were produced from the glass compositions of Tables 30A-30NN. The glass coupons had the indicated thicknesses. The CIELAB L*, a*, and b* coordinates of each colored glass article were determined. The average transmittance (%) for each sample over the wavelength range from 380 nm to 750 nm was also determined. The results are reported in Table 31.

TABLE 31

| Example | L* | a* | b* | Thickness (mm) | Average transmittance (380 nm-750 nm ) |
|---|---|---|---|---|---|
| ORA-1 | 54.3 | −2.25 | −23.3 | 1.496 | 38.08 |
| ORA-2 | 53.5 | 5.59 | −47.3 | 1.504 | 45.89 |
| ORA-3 | 73.5 | −1.65 | 3.45 | 1.518 | 56.14 |
| ORA-4 | 58.6 | −2.44 | −0.74 | 1.355 | 42.35 |
| ORA-5 | 81.6 | −6.19 | 26.71 | 1.503 | 48.95 |
| ORA-6 | 80.9 | −10.9 | 60.97 | 1.551 | 44.81 |
| ORA-6 | 82.2 | −11.5 | 61.28 | 1.52 | 46.21 |
| ORA-7 | 84 | 2.38 | 24.44 | 1.51 | 67.97 |
| ORA-8 | 86 | −9.09 | −0.48 | 1.499 | 56.39 |
| ORA-8 | 85.7 | −9.4 | −0.84 | 1.502 | 55.96 |
| ORA-8 | 85.7 | −9.37 | −0.86 | 1.5 | 55.85 |
| ORA-9 | 60.3 | 2.68 | 46.7 | 1.5 | 52.41 |
| ORA-10 | 81.4 | −12.9 | 44.23 | 1.496 | 45.38 |
| ORA-11 | 96.2 | 1.07 | 6.85 | 1.534 | 82.97 |
| ORA-11 | 96.1 | 1.08 | 7 | 1.53 | 82.78 |
| ORA-12 | 96.6 | −0.46 | 2.3 | 1.34 | 87.06 |
| ORA-14 | 96.3 | −0.49 | 0.14 | 1.516 | 89.66 |
| ORA-15 | 85.6 | −1.05 | 2.82 | 1.504 | 72.58 |
| ORA-16 | 80 | −7.58 | −2.04 | 1.51 | 52.17 |
| ORA-17 | 74.4 | −1.63 | 2.16 | 1.509 | 58.32 |
| ORA-18 | 88.8 | −3.39 | 17.58 | 1.505 | 66.53 |
| ORA-21 | 77.1 | −17.9 | 8.2 | 1.453 | 39.68 |
| ORA-22 | 87 | −8.47 | 5.42 | 1.33 | 64.68 |
| ORA-23 | 95.3 | −0.43 | 0.29 | 1.34 | 88.58 |
| ORA-23 | 95.3 | −0.43 | 0.43 | 1.34 | 88.58 |
| ORA-24 | 65.9 | −2.01 | −18.5 | 1.33 | 51.58 |
| ORA-25 | 81.5 | −5.99 | −3.18 | 1.535 | 58.24 |
| ORA-26 | 77.9 | −9.15 | −1.49 | 1.537 | 47.20 |
| ORA-27 | 73.6 | 11.9 | 1.72 | 1.526 | 37.11 |
| ORA-28 | 68.3 | −14.4 | 6.15 | 1.538 | 27.56 |
| ORA-29 | 55.7 | −17.4 | 17.39 | 1.554 | 13.76 |
| ORA-30 | 41.5 | 16.8 | 27.15 | 1.553 | 5.89 |
| ORA-31 | 89.8 | −0.72 | 16.26 | 1.4 | 72.68 |

TABLE 31-continued

| Example | L* | a* | b* | Thickness (mm) | Average transmittance (380 nm-750 nm ) |
|---|---|---|---|---|---|
| ORA-32 | 26.9 | −12 | 15.29 | 1.32 | 3.08 |
| ORA-33 | 65.6 | −2.29 | −12.4 | 1.31 | 50.51 |
| ORA-34 | 79.1 | −13.5 | 10.74 | 1.31 | 46.61 |
| ORA-35 | 95 | −1.05 | −1.88 | 1.32 | 87.51 |
| ORA-36 | 46.4 | −17.7 | −13.5 | 1.3 | 13.49 |
| ORA-37 | 42.9 | −1.87 | −22.3 | 1.34 | 33.01 |
| ORA-38 | 43.4 | −0.37 | −42 | 1.33 | 28.23 |
| ORA-39 | 60.9 | −2.38 | 0.5 | 1.32 | 44.34 |
| ORA-40 | 94.3 | −0.51 | 8.43 | 1.34 | 84.53 |
| ORA-41 | 87.1 | −8.58 | 5.19 | 1.32 | 64.68 |
| ORA-42 | 95.2 | −0.73 | −0.52 | 1.31 | 88.13 |
| ORA-43 | 65.5 | 2.16 | −19.2 | 1.35 | 50.85 |
| ORA-44 | 59.3 | −2.83 | −0.51 | 1.34 | 42.93 |
| ORA-45 | 94.5 | −0.38 | 9.12 | 1.31 | 85.15 |
| ORA-46 | 86.6 | −9.29 | 5.62 | 1.31 | 62.94 |
| ORA-47 | 95.4 | −0.61 | 0.79 | 1.34 | 88.84 |
| ORA-48 | 65.2 | −2.41 | 20.2 | 1.29 | 50.75 |
| ORA-49 | 57.6 | −3.12 | −2.32 | 1.34 | 41.79 |
| ORA-50 | 94.3 | −0.35 | 9.09 | 1.33 | 84.83 |
| ORA-51 | 66.3 | −1.99 | −18.3 | 1.32 | 51.94 |
| ORA-52 | 90 | −1.31 | −2.91 | 1.31 | 79.81 |
| ORA-52 | 89.2 | −1.62 | −3.62 | 1.29 | 78.10 |
| ORA-53 | 66.3 | 1.99 | −19.6 | 1.33 | 51.11 |
| ORA-53 | 66.6 | −2.1 | −19.5 | 1.33 | 51.36 |
| ORA-54 | 88.8 | −6.42 | 4.63 | 1.33 | 65.58 |
| ORA-54 | 88.8 | −6.54 | 4.6 | 1.35 | 65.42 |
| ORA-56 | 68.8 | −6.69 | −18.2 | 1.32 | 43.78 |
| ORA-56 | 69.6 | −6.37 | −17.8 | 1.29 | 45.12 |
| ORA-57 | 83 | −4 | 7.77 | 1.29 | 65.47 |
| ORA-57 | 83.6 | 3.74 | 7.38 | 1.29 | 66.76 |
| ORA-58 | 64.6 | −2.21 | −20.4 | 1.29 | 49.14 |
| ORA-58 | 64.1 | −2.17 | −20.6 | 1.29 | 48.62 |
| ORA-59 | 89 | −1.7 | −3.4 | 1.3 | 77.55 |
| ORA-60 | 67 | −1.93 | −18.2 | 1.29 | 51.74 |
| ORA-61 | 93.4 | −0.84 | 7.53 | 1.34 | 83.00 |
| ORA-62 | 63.5 | −11.9 | −9.2 | 1.31 | 28.70 |
| ORA-63 | 83.1 | −3.99 | −6.93 | 1.27 | 65.15 |
| ORA-64 | 62.7 | −2.12 | −21.6 | 1.31 | 46.93 |
| ORA-65 | 87.2 | −8.3 | 5.82 | 1.33 | 65.10 |
| ORA-66 | 93.7 | −0.3 | 9.8 | 1.36 | 83.86 |
| ORA-67 | 74.4 | −2.49 | 32.99 | 1.14 | 46.62 |
| ORA-68 | 90.5 | 4.5 | −5.85 | 1.34 | 74.29 |
| ORA-69 | 68.8 | −7.32 | −15.8 | 1.33 | 42.51 |
| ORA-70 | 68 | −4.44 | −20.9 | 1.35 | 47.23 |
| ORA-71 | 57 | −2.73 | −5.3 | 1.37 | 41.30 |
| ORA-72 | 63.6 | −2.73 | −18.7 | 1.42 | 46.95 |
| ORA-73 | 96.1 | −0.12 | 3.25 | 1.35 | 89.72 |
| ORA-74 | 55.7 | −2.73 | 0.04 | 1.36 | 39.84 |
| ORA-75 | 62.8 | −2.25 | −5.79 | 1.36 | 47.14 |
| ORA-76 | 96.8 | −0.02 | 0.27 | 1.35 | 91.59 |
| ORA-77 | 95.9 | 0.01 | 0.7 | 1.33 | 88.60 |
| ORA-78 | 65.4 | 0.92 | −37.5 | 1.36 | 53.47 |
| ORA-79 | 76.6 | −2.14 | −16.2 | 0.621 | 63.69 |
| ORA-79 | 76.6 | −2.14 | −16.2 | 0.621 | 63.69 |
| ORA-79 | 76.6 | −2.14 | −16.2 | 0.621 | 63.69 |
| ORA-80 | 96.7 | −0.25 | −0.13 | 0.62 | 91.23 |
| ORA-80 | 96.7 | −0.25 | −0.13 | 0.62 | 91.23 |
| ORA-80 | 96.7 | −0.25 | −0.13 | 0.62 | 91.23 |
| ORA-81 | 71.2 | −2.05 | −7.46 | 0.643 | 56.43 |
| ORA-81 | 71.2 | −2.05 | −7.46 | 0.643 | 56.43 |
| ORA-81 | 71.2 | −2.05 | −7.46 | 0.643 | 56.43 |
| ORA-82 | 86.6 | −1.81 | −6.31 | 1.33 | 74.45 |
| ORA-83 | 96.9 | −0.02 | 0.12 | 1.24 | 92.02 |
| ORA-84 | 96.7 | −0.11 | 0.25 | 1.3 | 91.05 |
| ORA-85 | 96.8 | −0.07 | 0.21 | 1.32 | 91.52 |
| ORA-86 | 96.9 | −0.03 | 0.21 | 1.28 | 91.43 |
| ORA-87 | 96.7 | −0.02 | 0.47 | 1.25 | 91.39 |
| ORA-88 | 79.3 | −4.44 | −11.8 | 1.26 | 60.21 |
| ORA-89 | 60.4 | −8.61 | −17.1 | 1.34 | 31.09 |
| ORA-90 | 67.8 | −6.25 | −30.3 | 1.34 | 46.93 |
| ORA-91 | 62.4 | −6.04 | −26.3 | 1.35 | 38.76 |
| ORA-92 | 63 | −10.3 | −24.5 | 1.35 | 38.11 |
| ORA-93 | 64.1 | −8.04 | −28.3 | 1.33 | 41.34 |
| ORA-94 | 65.3 | −6.48 | −29.5 | 1.33 | 43.18 |
| ORA-95 | 84.5 | −12.4 | 12.15 | 1.29 | 52.71 |

TABLE 31-continued

| Example | L* | a* | b* | Thickness (mm) | Average transmittance (380 nm-750 nm ) |
|---|---|---|---|---|---|
| ORA-96 | 83 | 13.6 | 13.11 | 1.35 | 49.38 |
| ORA-97 | 90.1 | −8.32 | 29.93 | 1.3 | 61.02 |
| ORA-98 | 91 | −2.23 | −8.98 | 1.23 | 85.94 |
| ORA-99 | 87.2 | −2.88 | −14.4 | 1.26 | 81.26 |
| ORA-100 | 82.2 | −2.53 | −20.6 | 1.27 | 74.80 |
| ORA-101 | 79.7 | −3.97 | −10.2 | 1.29 | 68.13 |
| ORA-102 | 78 | −4.64 | −0.58 | 1.3 | 62.62 |
| ORA-103 | 76.4 | −5.2 | 6.85 | 1.28 | 58.13 |
| ORA-104 | 81.8 | −2.5 | −21.2 | 1.31 | 74.47 |
| ORA-105 | 81.5 | −2.5 | −21.7 | 1.31 | 74.29 |
| ORA-106 | 81.6 | −2.62 | −21.8 | 1.25 | 74.67 |
| ORA-107 | 88.2 | −6.98 | 0.45 | 1.2 | 69.06 |
| ORA-108 | 88.5 | −6.04 | 2.77 | 1.22 | 69.99 |
| ORA-109 | 90.6 | −5.74 | 6.05 | 1.2 | 71.88 |
| ORA-110 | 90.6 | −5.52 | 7.3 | 1.2 | 72.19 |
| ORA-111 | 90.3 | −5.35 | 9.22 | 1.28 | 70.83 |
| ORA-112 | 90.5 | −5.31 | 8.41 | 1.28 | 70.71 |
| ORA-113 | 90.8 | 4.31 | 9.47 | 1.28 | 72.44 |
| ORA-114 | 96.8 | −0.06 | 0.39 | 1.27 | 91.19 |
| ORA-115 | 90 | −5.24 | 7.76 | 1.29 | 70.45 |
| ORA-116 | 95.8 | 3.04 | −0.87 | 1.348 | 88.26 |
| ORA-117 | 93.7 | 7.94 | −1.71 | 1.349 | 81.56 |
| ORA-118 | 91.7 | 3.05 | 10.6 | 1.35 | 79.00 |
| ORA-119 | 93.9 | 3 | 4.49 | 1.35 | 83.88 |
| ORA-120 | 93.4 | 5.72 | 3.16 | 1.336 | 81.16 |
| ORA-121 | 87.6 | 2.01 | −11.4 | 1.348 | 77.16 |
| ORA-122 | 68.3 | −2.07 | −0.58 | 1.348 | 51.93 |
| ORA-123 | 69.5 | −8.73 | −13 | 1.341 | 45.19 |
| ORA-124 | 68.1 | −1.99 | −0.92 | 1.348 | 51.96 |
| ORA-125 | 70.4 | 8.27 | −13.1 | 1.315 | 46.55 |
| ORA-126 | 68 | −9.3 | −15.1 | 1.32 | 43.43 |
| ORA-127 | 65.6 | −2.31 | −3.05 | 1.346 | 49.46 |
| ORA-128 | 95.1 | −0.8 | 8.89 | 1.307 | 79.31 |
| ORA-129 | 95.2 | −0.91 | 5.02 | 1.324 | 83.78 |
| ORA-130 | 93.2 | −1.14 | 3.86 | 1.327 | 81.89 |
| ORA-131 | 78.2 | 4.27 | 62.38 | 1.258 | 45.39 |
| ORA-132 | 96.1 | −0.4 | 3.04 | 1.297 | 87.72 |
| ORA-133 | 95 | −1.08 | 5.27 | 1.299 | 79.59 |
| ORA-134 | 92.2 | −3.32 | −5.34 | 1.252 | 79.12 |
| ORA-135 | 88.4 | 4.18 | −9.77 | 1.345 | 72.86 |
| ORA-136 | 91.1 | −3.29 | −7 | 1.282 | 78.05 |
| ORA-137 | 91.9 | −1.07 | 25.91 | 1.287 | 68.35 |
| ORA-138 | 96.7 | −0.26 | 1.46 | 1.336 | 88.98 |
| ORA-139 | 88.5 | −0.11 | 48.07 | 1.334 | 59.06 |
| ORA-140 | 94.5 | −1.1 | 11.46 | 1.279 | 79.19 |
| ORA-141 | 96.1 | −0.18 | 1.02 | 1.332 | 88.70 |
| ORA-142 | 96.2 | −0.17 | 1.49 | 1.337 | 88.52 |
| ORA-143 | 96.7 | −0.28 | 1.5 | 1.318 | 88.86 |
| ORA-144 | 96.1 | −0.73 | 5.28 | 1.307 | 83.38 |
| ORA-145 | 96.6 | −0.44 | 2.41 | 1.336 | 87.24 |
| ORA-146 | 88.8 | −7.87 | 4.43 | 1.413 | 67.88 |
| ORA-147 | 87.6 | −8.98 | 6.75 | 1.431 | 64.56 |
| ORA-148 | 89 | −7.38 | 6.6 | 1.403 | 67.49 |
| ORA-149 | 88.9 | −7.22 | 8.14 | 1.423 | 66.30 |
| ORA-150 | 89.2 | −6.44 | 8.75 | 1.407 | 67.20 |
| ORA-151 | 89.4 | −5.91 | 9.7 | 1.416 | 67.40 |
| ORA-152 | 90.4 | 0.96 | 13.31 | 1.293 | 78.86 |
| ORA-153 | 92.9 | 0.53 | 8.35 | 1.3 | 83.61 |
| ORA-154 | 94.5 | 0.2 | 4.69 | 1.319 | 86.92 |
| ORA-155 | 93.3 | 0.72 | −4.48 | 1.307 | 86.34 |
| ORA-156 | 81.8 | 1.41 | −19 | 1.305 | 71.94 |
| ORA-157 | 95.4 | −1.73 | −1.38 | 1.29 | 86.14 |
| ORA-157 | 95.4 | −1.74 | −1.39 | 1.29 | 86.24 |
| ORA-158 | 91.5 | −5.47 | −3.07 | 1.291 | 72.48 |
| ORA-158 | 91.6 | −5.45 | −3.08 | 1.297 | 72.65 |
| ORA-159 | 95.2 | −2.99 | 9.81 | 1.297 | 79.31 |
| ORA-160 | 93.6 | −6.18 | 23.4 | 1.313 | 69.68 |
| ORA-161 | 92.6 | −4.67 | −3.67 | 1.337 | 76.40 |
| ORA-162 | 92.8 | 4.35 | −3.35 | 1.323 | 77.22 |
| ORA-163 | 95.4 | −0.71 | 6.06 | 1.373 | 84.14 |
| ORA-164 | 95.2 | −0.7 | 6.73 | 1.364 | 83.63 |
| ORA-165 | 94.5 | −1.61 | −2.24 | 0.591 | 85.07 |
| ORA-165 | 94.5 | −1.61 | −2.24 | 0.591 | 85.07 |
| ORA-166 | 88.8 | −6.46 | 1.89 | 1.379 | 70.52 |
| ORA-167 | 88.7 | 6.58 | 1.85 | 1.377 | 70.18 |

TABLE 31-continued

| Example | L* | a* | b* | Thickness (mm) | Average transmittance (380 nm-750 nm ) |
|---|---|---|---|---|---|
| ORA-168 | 88.5 | −6.82 | 1.68 | 1.372 | 69.73 |
| ORA-169 | 93.2 | −2.95 | 1.1 | 0.594 | 81.55 |
| ORA-169 | 88.8 | −6.58 | 2 | 1.346 | 70.28 |
| ORA-169 | 93.2 | −2.95 | 1.1 | 0.594 | 81.55 |
| ORA-169 | 88.8 | −6.58 | 2 | 1.346 | 70.28 |
| ORA-170 | 89.1 | −5.87 | 4.95 | 1.318 | 69.39 |
| ORA-171 | 89 | −6.19 | 3.17 | 1.31 | 70.18 |
| ORA-172 | 87.1 | −1.71 | −5.56 | 1.351 | 75.02 |
| ORA-173 | 86.9 | −1.8 | −5.68 | 1.336 | 74.68 |
| ORA-174 | 91 | −1.63 | −7.21 | 1.333 | 81.25 |
| ORA-175 | 90.9 | −1.63 | −7.29 | 1.334 | 81.23 |
| ORA-176 | 90.8 | −1.78 | −7.35 | 1.334 | 80.73 |
| ORA-177 | 90.8 | −1.79 | −7.47 | 1.341 | 80.64 |
| ORA-178 | 95.4 | −0.71 | 6 | 1.345 | 83.71 |
| ORA-179 | 95.3 | −0.71 | 6.32 | 1.305 | 83.46 |
| ORA-180 | 87.5 | 1.64 | −5.58 | 1.297 | 75.73 |
| ORA-181 | 87.2 | −1.67 | −5.61 | 1.344 | 75.35 |
| ORA-182 | 87.3 | −1.66 | −5.44 | 1.319 | 75.35 |
| ORA-183 | 95.3 | −0.74 | 5.85 | 1.32 | 83.75 |
| ORA-184 | 95 | −3.11 | 9.96 | 1.329 | 78.73 |
| ORA-185 | 92.2 | 5.34 | −0.33 | 1.316 | 76.11 |
| ORA-186 | 92.9 | −4.43 | −0.54 | 1.314 | 78.05 |
| ORA-187 | 91.3 | 6.12 | −2 | 1.322 | 72.83 |
| ORA-188 | 95.8 | −1.22 | 0.53 | 1.326 | 88.30 |
| ORA-189 | 86.7 | −3.8 | −7.01 | 1.309 | 73.91 |
| ORA-190 | 83.9 | −7.84 | 0.86 | 1.293 | 60.45 |
| ORA-191 | 90 | −3.89 | −1.84 | 1.313 | 76.65 |
| ORA-192 | 88.2 | −8.1 | 16.38 | 1.31 | 61.57 |
| ORA-193 | 89.3 | 7.44 | 4.68 | 1.354 | 69.18 |
| ORA-194 | 89.9 | −6.8 | 4.48 | 1.363 | 70.85 |
| ORA-195 | 90.1 | −6.59 | 4.83 | 1.362 | 71.57 |
| ORA-196 | 90 | −6.64 | 4.98 | 1.365 | 71.16 |
| ORA-197 | 90 | −6.8 | 4.19 | 1.382 | 71.46 |
| ORA-198 | 90.5 | −5.77 | 5.27 | 1.361 | 72.91 |
| ORA-199 | 86.9 | −1.7 | 5.41 | 1.364 | 74.70 |
| ORA-200 | 87 | 1.74 | −5.51 | 1.364 | 74.67 |
| ORA-201 | 87.3 | 1.89 | −4.41 | 1.376 | 74.90 |
| ORA-202 | 87.8 | −1.81 | −3.85 | 1.358 | 75.67 |
| ORA-203 | 86.9 | −1.61 | −4.9 | 1.389 | 74.89 |
| ORA-204 | 87.2 | −1.62 | −5.07 | 1.355 | 75.24 |
| ORA-205 | 87.4 | −1.7 | −5.65 | 1.314 | 75.59 |
| ORA-205 | 87.3 | −1.67 | −5.68 | 1.315 | 75.37 |
| ORA-206 | 87.9 | −1.23 | −3.69 | 1.302 | 76.36 |
| ORA-206 | 88 | 1.25 | −3.65 | 1.301 | 76.58 |
| ORA-207 | 87.5 | −1.37 | −3.75 | 1.309 | 75.65 |
| ORA-207 | 87.4 | −1.36 | −3.78 | 1.308 | 75.41 |
| ORA-208 | 87.6 | −1.45 | 4.46 | 1.312 | 75.88 |
| ORA-208 | 87.5 | −1.43 | −4.48 | 1.314 | 75.62 |
| ORA-209 | 90.4 | −4.83 | 6.02 | 1.3 | 72.97 |
| ORA-209 | 90.5 | 4.84 | 6.06 | 1.302 | 73.14 |
| ORA-210 | 91 | −3.76 | 5.05 | 1.315 | 77.53 |
| ORA-210 | 90.9 | −3.74 | 5.02 | 1.317 | 77.31 |
| ORA-211 | 90.6 | −4.15 | 5.26 | 1.346 | 75.81 |
| ORA-211 | 90.5 | −4.12 | 5.23 | 1.347 | 75.68 |
| ORA-212 | 90.1 | −4.9 | 4.65 | 1.308 | 74.40 |
| ORA-212 | 90.2 | −4.89 | 4.68 | 1.314 | 74.67 |
| ORA-213 | 90.6 | −5.49 | 13.08 | 1.323 | 68.09 |
| ORA-213 | 90.7 | −5.51 | 13.1 | 1.326 | 68.27 |
| ORA-214 | 92.8 | −3.85 | 3.17 | 0.845 | 79.23 |
| ORA-215 | 92.7 | −3.99 | 3.32 | 0.847 | 78.78 |
| ORA-216 | 92.8 | −3.83 | 3.41 | 0.845 | 79.16 |
| ORA-217 | 90.4 | −6 | 5.4 | 1.341 | 72.46 |
| ORA-218 | 90.8 | −5.49 | 5.48 | 1.323 | 73.73 |
| ORA-219 | 90.7 | −5.64 | 5.2 | 1.322 | 73.41 |
| ORA-220 | 90.3 | −6.17 | 4.9 | 1.368 | 71.92 |
| ORA-221 | 90.3 | −6.16 | 5.17 | 1.359 | 72.03 |
| ORA-222 | 93.9 | −2.73 | 2.55 | 0.59 | 82.65 |
| ORA-222 | 90.3 | −6.15 | 5.5 | 1.362 | 72.03 |
| ORA-223 | 90.1 | −6.28 | 5.36 | 1.383 | 71.59 |
| ORA-224 | 90.5 | −5.94 | 5.3 | 1.385 | 72.56 |
| ORA-225 | 90.6 | −5.8 | 5.38 | 1.384 | 72.92 |
| ORA-226 | 90.7 | −5.24 | 5.85 | 1.339 | 73.19 |
| ORA-227 | 91 | −5.02 | 5.84 | 1.342 | 74.24 |
| ORA-228 | 90.8 | −5.53 | 5.47 | 1.337 | 73.77 |
| ORA-229 | 90.9 | −5.58 | 5.08 | 1.332 | 73.87 |

TABLE 31-continued

| Example | L* | a* | b* | Thickness (mm) | Average transmittance (380 nm-750 nm ) |
|---|---|---|---|---|---|
| ORA-230 | 94 | −2.69 | 2.43 | 0.6 | 82.99 |
| ORA-230 | 90.8 | −5.65 | 5.25 | 1.337 | 73.64 |
| ORA-231 | 89.7 | −1.37 | −2 | 1.329 | 78.60 |
| ORA-232 | 96.8 | −0.02 | 0.21 | 1.322 | 91.63 |
| ORA-233 | 96.8 | −0.03 | 0.23 | 1.318 | 91.77 |
| ORA-234 | 93.8 | −2.97 | 2.61 | 1.327 | 82.14 |
| ORA-235 | 90.6 | 5.94 | 5.03 | 1.321 | 72.83 |
| ORA-236 | 96.6 | 0.33 | 1.63 | 1.322 | 87.69 |
| ORA-237 | 96.6 | −0.32 | 1.56 | 1.332 | 87.82 |
| ORA-238 | 93 | −3.03 | 1.62 | 1.291 | 81.13 |
| ORA-238 | 93 | −3.03 | 1.62 | 1.291 | 81.13 |
| ORA-239 | 85.7 | −8.09 | 5.15 | 1.326 | 62.69 |
| ORA-240 | 88.7 | −4.59 | 5.53 | 1.332 | 72.22 |
| ORA-241 | 89.1 | −6.01 | 1.55 | 1.314 | 72.28 |
| ORA-242 | 90.4 | −6.46 | 0.69 | 1.321 | 72.03 |
| ORA-243 | 89.2 | −5.77 | 8.31 | 1.315 | 70.97 |
| ORA-244 | 89 | −6.09 | 3.66 | 1.292 | 70.53 |
| ORA-245 | 88.8 | −6.28 | 4.01 | 1.287 | 70.10 |
| ORA-246 | 88.8 | −6.35 | 3.73 | 1.29 | 70.14 |
| ORA-247 | 96.6 | −0.38 | 1.95 | 1.349 | 87.28 |
| ORA-248 | 96.6 | −0.38 | 2 | 1.333 | 87.22 |
| ORA-249 | 96.7 | −0.28 | 1.45 | 1.343 | 88.96 |
| ORA-250 | 96.3 | −0.83 | 4.74 | 1.349 | 82.83 |
| ORA-251 | 96.6 | −0.27 | 1.67 | 1.339 | 89.17 |
| ORA-252 | 96.6 | −0.31 | 1.88 | 1.371 | 88.85 |
| ORA-253 | 96.6 | −0.29 | 1.56 | 1.381 | 88.86 |
| ORA-254 | 96.6 | −0.41 | 2.15 | 1.369 | 86.92 |
| ORA-255 | 96.6 | −0.42 | 2.15 | 1.354 | 86.72 |
| ORA-256 | 96.6 | −0.41 | 2.11 | 1.375 | 86.92 |
| ORA-257 | 96.6 | −0.32 | 2.01 | 1.414 | 88.77 |
| ORA-258 | 96.3 | −0.87 | 4.96 | 1.411 | 82.51 |
| ORA-259 | 96.6 | −0.32 | 1.91 | 1.401 | 88.78 |
| ORA-260 | 96.6 | −0.31 | 1.83 | 1.404 | 88.95 |
| ORA-261 | 96.7 | −0.27 | 1.44 | 1.315 | 89.03 |
| ORA-262 | 96.6 | −0.41 | 2.11 | 1.332 | 86.94 |
| ORA-263 | 96.7 | −0.34 | 1.83 | 1.263 | 88.74 |
| ORA-264 | 96.8 | −0.36 | 1.89 | 1.324 | 88.80 |
| ORA-265 | 96.8 | −0.34 | 1.81 | 1.272 | 88.97 |
| ORA-266 | 96.8 | −0.33 | 1.75 | 1.261 | 88.99 |
| ORA-267 | 96.8 | 0.26 | 1.43 | 1.263 | 89.53 |
| ORA-268 | 96.8 | −0.28 | 1.51 | 1.304 | 89.42 |
| ORA-269 | 96.8 | −0.28 | 1.56 | 1.321 | 89.37 |
| ORA-270 | 96.8 | −0.23 | 1.4 | 1.327 | 89.74 |
| ORA-271 | 96.8 | −0.21 | 1.32 | 1.28 | 89.88 |
| ORA-272 | 92.8 | −3.11 | −4.14 | 1.369 | 79.89 |
| ORA-273 | 89.3 | −1.59 | −4.49 | 1.23 | 78.30 |
| ORA-274 | 96.6 | −0.2 | 1.2 | 1.289 | 88.42 |
| ORA-275 | 96.6 | −0.31 | 1.69 | 1.299 | 87.36 |
| ORA-276 | 96.6 | −0.26 | 1.45 | 1.315 | 87.84 |
| ORA-277 | 96.7 | −0.01 | 0.21 | 1.298 | 91.71 |
| ORA-278 | 96.7 | −0.19 | 1.11 | 1.303 | 88.71 |
| ORA-279 | 96.7 | −0.19 | 1.05 | 1.243 | 88.99 |
| ORA-280 | 96.5 | −0.19 | 1.08 | 1.367 | 88.79 |
| ORA-281 | 96.6 | −0.02 | 0.34 | 1.365 | 90.95 |
| ORA-282 | 96.1 | −0.91 | 5.37 | 1.335 | 82.02 |
| ORA-283 | 96.2 | −0.87 | 5.01 | 1.362 | 82.65 |
| ORA-285 | 95.4 | −0.54 | −0.7 | 1.3 | 88.76 |
| ORA-286 | 95.4 | −0.53 | −0.43 | 1.213 | 88.69 |
| ORA-287 | 95.5 | −0.46 | −0.44 | 1.247 | 88.87 |
| ORA-288 | 88.2 | −1.61 | −5.12 | 1.358 | 76.98 |
| ORA-289 | 88.8 | 6.53 | 3.4 | 1.303 | 69.77 |
| ORA-290 | 88.6 | −6.67 | 3.46 | 1.347 | 69.42 |
| ORA-291 | 88.6 | −6.64 | 3.63 | 1.337 | 69.49 |
| ORA-292 | 88.9 | −6.44 | 3.1 | 1.315 | 70.14 |
| ORA-293 | 89.1 | −6.33 | 3.54 | 1.317 | 70.63 |
| ORA-294 | 90.1 | −5.12 | 2.87 | 1.283 | 73.82 |
| ORA-295 | 88.7 | 5.52 | 3.65 | 1.295 | 69.94 |
| ORA-296 | 89.1 | −6.18 | 2.93 | 1.284 | 70.87 |
| ORA-297 | 89.3 | −5.84 | 2.18 | 1.276 | 71.76 |
| ORA-298 | 85.5 | −9.77 | 1.11 | 1.983 | 62.28 |
| ORA-299 | 83.3 | −11.3 | −2.01 | 1.942 | 58.42 |
| ORA-300 | 84.4 | −10.1 | 1.39 | 1.985 | 59.90 |
| ORA-301 | 83.9 | −10.7 | 0.11 | 1.976 | 59.06 |
| ORA-302 | 84.1 | −10.3 | −0.85 | 1.99 | 60.61 |
| ORA-303 | 83.9 | −10.9 | −2.46 | 1.974 | 60.24 |

TABLE 31-continued

| Example | L* | a* | b* | Thickness (mm) | Average transmittance (380 nm-750 nm ) |
|---|---|---|---|---|---|
| ORA-304 | 83.6 | −11.1 | −2.68 | 2.024 | 59.85 |
| ORA-305 | 83.4 | −11.3 | −2.58 | 2.013 | 59.25 |
| ORA-306 | 83.9 | −11 | −0.94 | 2.023 | 59.74 |
| ORA-307 | 83.9 | −10.6 | −2.28 | 2.021 | 60.85 |
| ORA-308 | 83.9 | −10.8 | −3.2 | 2.019 | 60.99 |
| ORA-309 | 83.4 | −11.3 | −4.16 | 2.014 | 59.89 |
| ORA-310 | 82.9 | −11.9 | 4.29 | 2.008 | 58.39 |
| ORA-311 | 84.1 | −10.8 | −1.86 | 2.022 | 60.79 |
| ORA-312 | 84.4 | −10.5 | −1.75 | 2.011 | 61.54 |
| ORA-313 | 84.1 | −10.8 | −1.53 | 2.022 | 60.38 |
| ORA-314 | 84.1 | −10.6 | −1.84 | 2.014 | 60.78 |
| ORA-315 | 84 | −10.5 | −1.42 | 2.024 | 60.65 |
| ORA-316 | 88.4 | 5.82 | 3.86 | 1.36 | 68.96 |
| ORA-317 | 88.5 | −6.69 | 3.82 | 1.351 | 69.77 |
| ORA-318 | 88.7 | −6.56 | 4.04 | 1.338 | 69.78 |
| ORA-319 | 88.8 | −6.52 | 3.2 | 1.351 | 69.96 |
| ORA-320 | 88.6 | −6.59 | 3.6 | 1.35 | 69.49 |
| ORA-321 | 90 | −5.2 | 2.89 | 1.341 | 73.54 |
| ORA-322 | 88.7 | −6.57 | 3.72 | 1.342 | 69.95 |
| ORA-323 | 88.7 | −6.5 | 3.67 | 1.347 | 69.93 |
| ORA-324 | 84.9 | −9.6 | 5.11 | 2.025 | 61.02 |
| ORA-325 | 84.7 | −9.71 | 5.35 | 2.05 | 60.45 |
| ORA-326 | 84.9 | −9.54 | 5.42 | 2.044 | 60.89 |
| ORA-327 | 84.9 | −9.44 | 5.75 | 2.041 | 60.80 |
| ORA-328 | 85.7 | −9.03 | 4.42 | 2.067 | 62.94 |
| ORA-329 | 85.1 | −9.12 | 5.7 | 2.062 | 61.55 |
| ORA-330 | 85.3 | −9.36 | 4.7 | 2.068 | 61.81 |
| ORA-331 | 85.1 | −9.15 | 5.71 | 2.064 | 61.50 |
| ORA-332 | 93.7 | −2.75 | 0.62 | 0.552 | 82.99 |
| ORA-333 | 94.5 | −2.19 | 0.53 | 0.546 | 85.24 |
| ORA-334 | 93.9 | −3.05 | 0.33 | 0.534 | 82.84 |
| ORA-335 | 93.7 | −2.77 | −0.43 | 0.53 | 83.12 |
| ORA-336 | 94 | −2.49 | 0.13 | 0.534 | 84.29 |
| ORA-337 | 94.1 | −2.33 | 1.16 | 0.545 | 84.11 |
| ORA-338 | 93.4 | −3.17 | 1.18 | 0.544 | 81.64 |
| ORA-339 | 93.2 | −2.76 | 0.74 | 0.54 | 81.94 |
| ORA-340 | 93.3 | −2.73 | 1.3 | 0.549 | 82.49 |
| ORA-341 | 84.8 | −9.28 | 1.57 | 2.083 | 62.39 |
| ORA-341 | 96.8 | −0.01 | 0.19 | 1.331 | 91.81 |
| ORA-343 | 96.8 | −0.02 | 0.2 | 1.332 | 91.81 |
| ORA-344 | 96.9 | −0.01 | 0.18 | 1.329 | 92.01 |
| ORA-345 | 96.9 | 0 | 0.18 | 1.331 | 92.03 |
| ORA-346 | 93.6 | −2.4 | 0.58 | 0.515 | 83.13 |
| ORA-347 | 93.3 | −2.39 | 0.5 | 0.506 | 82.66 |
| ORA-348 | 93.8 | −2.11 | 0.77 | 0.477 | 83.67 |
| ORA-349 | 93.8 | −2.08 | 0.73 | 0.476 | 83.61 |
| ORA-350 | 93.8 | −2.14 | 0.72 | 0.471 | 83.22 |
| ORA-351 | 93.6 | −2.09 | 1.01 | 0.479 | 82.66 |
| ORA-352 | 93.8 | −2.19 | 0.91 | 0.499 | 83.75 |
| ORA-353 | 94.3 | −1.78 | 1.01 | 0.433 | 85.13 |
| ORA-354 | 94.4 | −1.79 | 0.92 | 0.444 | 85.42 |

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A colored glass article, comprising:

greater than or equal to 50 mol % and less than or equal to 80 mol % $SiO_2$;

greater than or equal to 712 mol % and less than or equal to 20 mol % $Al_2O_3$;

greater than or equal to 1 mol % and less than or equal to 15 mol % $B_2O_3$;

greater than or equal to 1 mol % and less than or equal to 20 mol % $Li_2O$;

greater than 0 mol % and less than or equal to 15 mol % $Na_2O$;

greater than or equal to 1 mol % and less than or equal to 35 mol % $R_2O$, where $R_2O$ is the sum of $Li_2O$, $Na_2O$, and $K_2O$;

greater than $1\times10^{-6}$ mol % and less than or equal to 5 mol % of a colorant, wherein the colorant comprises at least one of $Cr_2O_3$, Au, Ag, CuO, NiO, $Co_3O_4$, $TiO_2$, $CeO_2$; and greater than or equal to 12 mol % and less than or equal to 24 mol % of ($Al_2O_3$+MgO+CaO+ZnO), wherein the colored glass article comprises a thickness within a range of greater than or equal to 0.4 mm to less than or equal to 5 mm;

wherein the colored glass article comprises a surface compressive stress greater than or equal to 200 MPa and a central tension greater than or equal to 60 MPa; and wherein the colored glass article comprises a dielectric constant within a range of 5.6 to 6.4 at a frequency of 10 GHz.

2. The colored glass article of claim 1, wherein, at the thickness of the colored glass article, glass of the colored glass article comprises a transmittance color coordinate in CIELAB color space, as measured under F2 illumination and a 10° standard observer angle, comprising an L* value greater than or equal to 55 and less than or equal to 96.5, a* greater than or equal to −35 and less than or equal to 60 but excluding a* greater than −0.3 and less than 0.3, and b* greater than or equal to −90 and less than or equal to 80 but excluding b* greater than −0.5 and less than 0.5.

3. The colored glass article of claim 2, wherein, at the thickness of the colored glass article, glass of the article comprises an average transmittance of greater than or equal to 10% and less than or equal to 92% at the thickness over a wavelength range of 380 nm to 750 nm.

4. The colored glass article of claim 1, wherein, at 2.06 mm thickness, glass compositionally matching that of the article comprises a transmittance color coordinate in CIELAB color space, as measured under F2 illumination and a 10° standard observer angle, comprising an L* value greater than or equal to 55 and less than or equal to 96.5, a* greater than or equal to −35 and less than or equal to 60 but excluding a* greater than −0.3 and less than 0.3, and b* greater than or equal to −90 and less than or equal to 80 but excluding b* greater than −0.5 and less than 0.5.

5. The colored glass article of claim 1, wherein, at the thickness of the colored glass article, glass of the article comprises a transmittance color coordinate in CIELAB color space comprising an L* value greater than or equal to 55 and less than or equal to 96.5 and an a* value and a b* value, wherein |a*| is ≥0.3 and |b*| is ≥0.5, as measured under F2 illumination and a 10° standard observer angle.

6. The colored glass article of claim 1, wherein, at 2.06 mm thickness, glass compositionally matching that of the article comprises a transmittance color coordinate in CIELAB color space comprising an L* value greater than or equal to 55 and less than or equal to 96.5 and an a* value and a b* value, wherein |a*| is ≥0.3 and |b*| is ≥0.5, as measured under F2 illumination and a 10° standard observer angle.

7. A colored glass article comprising:

greater than or equal to 50 mol % and less than or equal to 80 mol % $SiO_2$;

greater than or equal to 1 mol % and less than or equal to 12 mol % $B_2O_3$;

greater than or equal to 1 mol % and less than or equal to 20 mol % $Li_2O$;

greater than 0 mol % and less than or equal to 15 mol % $Na_2O$;

greater than or equal to 1 mol % and less than or equal to 35 mol % $R_2O$, wherein $R_2O$ is the sum of $Li_2O$, $Na_2O$, and $K_2O$;

greater than $1\times10^{-6}$ mol % and less than or equal to 5 mol % of a colorant, wherein the colorant comprises at least one of $Cr_2O_3$, Au, Ag, CuO, NiO, $Co_3O_4$, $TiO_2$, $CeO_2$; and greater than or equal to 12 mol % and less than or equal to 24 mol % of ($Al_2O_3$+MgO+CaO+ZnO), wherein the colored glass article comprises a thickness within a range of greater than or equal to 0.4 mm to less than or equal to 5 mm;

wherein, at the thickness of the colored glass article, the colored glass article comprises a transmittance color coordinate in CIELAB color space comprising an L* value greater than or equal to 55 and less than or equal to 96.5 and an a* value and a b* value, wherein |a*| is ≥0.3 and |b*| is ≥0.5, as measured under F2 illumination and a 10° standard observer angle;

wherein the colored glass article comprises a surface compressive stress greater than or equal to 200 MPa and a central tension greater than or equal to 60 MPa; and wherein the colored glass article comprises a dielectric constant within a range of 5.6 to 6.4 at a frequency of 10 GHz.

8. The colored glass article of claim 7, the colored glass article comprises greater than or equal to 7 mol % and less than or equal to 18 mol % $Li_2O$.

9. The colored glass article of claim 8, the colored glass article comprises greater than or equal to 0.01 mol % and less than or equal to 12 mol % $Na_2O$.

10. The colored glass article of claim 9, wherein the glass of the glass article is such that constituents thereof satisfy the following inequality: [5.72*$Al_2O_3$ (mol %)−21.4*ZnO (mol %)−2.5*$P_2O_5$ (mol %)−35*$Li_2O$ (mol %)−16.6*$B_2O_3$ (mol %)−20.5*MgO (mol %)−23.3*$Na_2O$ (mol %)−27.9*SrO (mol %)−18.5*$K_2O$ (mol %)−26.3*CaO (mol %)]>−609 mol %.

11. A colored glass article comprising:

greater than or equal to 50 mol % and less than or equal to 80 mol % $SiO_2$;

greater than or equal to 712 mol % and less than or equal to 20 mol % $Al_2O_3$;

greater than or equal to 1 mol % and less than or equal to 15 mol % $B_2O_3$;

greater than or equal to 1 mol % and less than or equal to 20 mol % $Li_2O$;

greater than 0 mol % and less than or equal to 15 mol % $Na_2O$;

greater than or equal to 1 mol % and less than or equal to 35 mol % $R_2O$, wherein $R_2O$ is the sum of $Li_2O$, $Na_2O$, and $K_2O$;

greater than $1\times10^{-6}$ mol % and less than or equal to 5 mol % of a colorant, wherein the colorant comprises at least one transition and/or rare earth metal; and greater than or equal to 12 mol % and less than or equal to 24 mol % of ($Al_2O_3$+MgO+CaO+ZnO), wherein the colored glass article comprises a thickness within a range of greater than or equal to 0.4 mm to less than or equal to 5 mm;

wherein, at the thickness of the colored glass article, the colored glass article comprises a transmittance color coordinate in CIELAB color space comprising an L* value greater than or equal to 55 and less than or equal to 96.5 and an a* value and a b* value, wherein |a*| is ≥0.3 and |b*| is ≥0.5, as measured under F2 illumination and a 10° standard observer angle;

wherein the colored glass article comprises a surface compressive stress greater than or equal to 200 MPa and a central tension greater than or equal to 60 MPa; and wherein the colored glass article comprises a dielectric constant within a range of 5.6 to 6.4 at a frequency of 10 GHz.

12. The colored glass article of claim 11, wherein the colorant comprises at least one transition and/or rare earth metal selected from the group consisting of Ag, Au, Ni, Co, Cr, Cu, Ce, Ti, V, Mn, Nb, Mo, Hf, W, Nd, and Er.

13. The colored glass article of claim 12, wherein the colorant comprises at least one transition and/or rare earth metal selected from the group consisting of Cr, Au, Ag, Cu, Ni, Co, Ti, and Ce.

14. The colored glass article of claim 13, wherein the colorant comprises gold.

15. The colored glass article of claim 14, wherein the colorant further comprises less than or equal to 1 mol % of a cation "M", wherein "M" is at least one of F, Cl, Br, Ti, V, Cr, Mn, Fe, Co, Ni, Cu, Se, Nb, Mo, Ru, Rh, Pd, Ag, Cd, In, Te, W, Ir, Pt, Ce, Pr, Nd, Sm, Eu, Gd, Tb, Dy, Ho, and Er.

16. A colored glass article comprising:

greater than or equal to 50 mol % and less than or equal to 80 mol % $SiO_2$;

greater than or equal to 7-12 mol % and less than or equal to 20 mol % $Al_2O_3$;

greater than or equal to 1 mol % and less than or equal to 15 mol % $B_2O_3$;

greater than or equal to 1 mol % and less than or equal to 20 mol % $Li_2O$;

greater than 0 mol % and less than or equal to 15 mol % $Na_2O$;

greater than or equal to 1 mol % and less than or equal to 35 mol % $R_2O$, wherein $R_2O$ is the sum of $Li_2O$, $Na_2O$, and $K_2O$;

greater than $1\times10^{-6}$ mol % and less than or equal to 5 mol % of a colorant, wherein the colorant comprises at least one of $Cr_2O_3$, Au, Ag, CuO, NiO, $Co_3O_4$, $TiO_2$, $CeO_2$; and greater than or equal to 12 mol % and less than or equal to 24 mol % of ($Al_2O_3$+MgO+CaO+ZnO), wherein the colored glass article comprises a thickness within a range of greater than or equal to 0.4 mm to less than or equal to 5 mm;

wherein, at the thickness of the colored glass article, the colored glass article comprises a transmittance color coordinate in CIELAB color space comprising an L* value greater than or equal to 55 and less than or equal to 96.5 and an a* value and a b* value, wherein |a*| is ≥0.3 and |b*| is ≥0.5, as measured under F2 illumination and a 10° standard observer angle; and wherein the colored glass article comprises a dielectric constant within a range of 5.6 to 6.4 at a frequency of 10 GHz.

17. The colored glass article of claim 16, wherein the colored glass article is configured to receive a surface compressive stress of at least 200 MPa when placed in a bath of molten $KNO_3$ and/or $NaNO_3$ salt at a temperature of 450° C. for 24 hours.

18. The colored glass article of claim 16, wherein the colored glass article comprises a surface compressive stress and a central tension.

19. The colored glass article of claim 18, wherein the surface compressive stress is greater than or equal to 200 MPa.

* * * * *